US011093919B2

(12) United States Patent
Katzin et al.

(10) Patent No.: US 11,093,919 B2
(45) **Date of Patent: *Aug. 17, 2021**

(54) MERCHANT-CONSUMER BRIDGING PLATFORM APPARATUSES, METHODS AND SYSTEMS

(71) Applicant: VISA INTERNATIONAL SERVICE ASSOCIATION, San Francisco, CA (US)

(72) Inventors: Edward Katzin, Hillsborough, CA (US); Phillip L. Kumnick, Phoenix, AZ (US); Theodore David Harris, San Francisco, CA (US); Patrick Faith, Pleasanton, CA (US); Jennifer A. Schulz, Pacific Palisades, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,792

(22) Filed: Nov. 13, 2018

(65) Prior Publication Data

US 2019/0080307 A1 Mar. 14, 2019

Related U.S. Application Data

(63) Continuation of application No. 13/366,083, filed on Feb. 3, 2012, now Pat. No. 10,204,327.

(Continued)

(51) Int. Cl.

*G06Q 10/00* (2012.01)
*G06Q 20/20* (2012.01)

(Continued)

(52) U.S. Cl.

CPC .......... *G06Q 20/20* (2013.01); *G06Q 20/027* (2013.01); *G06Q 20/12* (2013.01); *G06Q 20/4016* (2013.01)

(58) Field of Classification Search

None

See application file for complete search history.

(56) References Cited

U.S. PATENT DOCUMENTS

| | | | |
|---|---|---|---|
| 789,106 | A | 5/1905 | Seymour |
| 5,237,164 | A | 8/1993 | Takada |

(Continued)

FOREIGN PATENT DOCUMENTS

| | | | |
|---|---|---|---|
| EP | 0855659 | A1 | 7/1998 |
| JP | 2008545210 | A | 12/2008 |

(Continued)

OTHER PUBLICATIONS

Olston (Christopher Olston and Marc Najork (2010), "Web Crawling", Foundations and Trends in Information Retrieval: vol. 4: No. 3 , pp. 175-246, http://infolab.stanford.edu/~olston/publications/crawling_survey.pdf), (Year: 2010).*

(Continued)

*Primary Examiner* — Rutao Wu
*Assistant Examiner* — Scott M Ross
(74) *Attorney, Agent, or Firm* — Loeb & Loeb, LLP

(57) ABSTRACT

The MERCHANT-CONSUMER BRIDGING PLATFORM APPARATUSES, METHODS AND SYSTEMS ("MCB-Platform") various activity requests (e.g., transaction request, merchant information update request, offer issuance request, etc.) via MCB-Platform components into transaction records and merchant database updates outputs. In one implementation, a method is disclosed, comprising: receiving an activity request including merchant information associated with a merchant; retrieving a previously stored mer- (Continued)

Example Logic Flow: Merchant Database Update chant record from a database; determining merchant information update indicia based on a comparison of the merchant information and the previously stored merchant record; determining a confidence metric for the merchant information update; retrieving a confidence requirement based on the activity request; determining, within a low-latency processing time-frame, whether the determined confidence metric satisfies the retrieved confidence requirement; performing the requested activity and updating the previously stored merchant record with the merchant information update indicia when the determined confidence metric satisfies the retrieved confidence requirement; and declining the activity request when the determined confidence metric satisfies the retrieved confidence requirement.

20 Claims, 150 Drawing Sheets

Related U.S. Application Data

(60) Provisional application No. 61/444,100, filed on Feb. 17, 2011, provisional application No. 61/439,879, filed on Feb. 5, 2011.

(51) Int. Cl.
*G06Q 20/02* (2012.01)
*G06Q 20/12* (2012.01)
*G06Q 20/40* (2012.01)

(56) References Cited

U.S. PATENT DOCUMENTS 5,311,594 A 5/1994 Penzias
5,446,890 A 8/1995 Renslo
5,459,656 A 10/1995 Fields
5,510,777 A 4/1996 Pilc
5,521,362 A 5/1996 Powers
5,530,438 A 6/1996 Bickham
5,536,045 A 7/1996 Adams
5,615,110 A 3/1997 Wong
5,615,264 A 3/1997 Kazmierczak
5,649,118 A 7/1997 Carlisle
5,815,657 A 9/1998 Williams
5,850,446 A 12/1998 Berger
5,878,337 A 3/1999 Joao
5,903,830 A 5/1999 Joao
5,943,624 A 8/1999 Fox
5,963,924 A 10/1999 Williams
6,064,990 A 5/2000 Goldsmith
6,092,053 A 7/2000 Boesch
6,202,052 B1 3/2001 Miller
6,202,933 B1 3/2001 Poore
6,263,447 B1 7/2001 French
6,267,292 B1 7/2001 Walker
6,336,099 B1 1/2002 Barnett
6,473,500 B1 10/2002 Risafi
6,529,725 B1 3/2003 Joao
6,535,855 B1 3/2003 Cahill
6,601,761 B1 8/2003 Katis
6,735,572 B2 5/2004 Landesmann
6,853,982 B2 2/2005 Smith
6,857,073 B2 2/2005 French
6,873,974 B1 3/2005 Schutzer
6,898,598 B2 5/2005 Himmel
6,934,528 B2 8/2005 Loureiro
6,999,943 B1 2/2006 Johnson
7,024,383 B1 4/2006 Mancini
7,028,052 B2 4/2006 Chapman
7,047,041 B2 5/2006 Vanska
7,051,002 B2 5/2006 Keresman, III
7,089,208 B1 8/2006 Levchin
7,096,003 B2 8/2006 Joao
7,111,789 B2 9/2006 Rajasekaran
7,155,411 B1 12/2006 Blinn
7,177,848 B2 2/2007 Hogan
7,194,437 B1 3/2007 Britto
7,206,847 B1 4/2007 Alberth
7,212,979 B1 5/2007 Matz
RE39,736 E 7/2007 Morrill
7,268,667 B2 9/2007 Beenau
7,268,668 B2 9/2007 Beenau
7,290,704 B1 11/2007 Ball
7,318,049 B2 1/2008 Iannacci
7,337,119 B1 2/2008 Geschwender
7,337,144 B1 2/2008 Blinn
7,343,149 B2 3/2008 Benco
7,343,351 B1 3/2008 Bishop
7,349,885 B2 3/2008 Gangi
7,356,505 B2 4/2008 March
7,357,310 B2 4/2008 Calabrese
7,359,880 B2 4/2008 Abel
7,373,669 B2 5/2008 Eisen
7,379,899 B1 5/2008 Junger
7,392,222 B1 6/2008 Hamilton
7,395,242 B2 7/2008 Blinn
7,398,250 B2 7/2008 Blinn
7,413,113 B1 8/2008 Zhu
7,450,966 B2 11/2008 Vanska
7,477,780 B2 1/2009 Boncyk
7,499,889 B2 3/2009 Golan
7,500,607 B2 3/2009 Williams
7,533,064 B1 5/2009 Boesch
7,536,360 B2 5/2009 Stolfo
7,571,139 B1 8/2009 Giordano
7,571,140 B2 8/2009 Weichert
7,593,858 B2 9/2009 Matz
7,603,311 B1 10/2009 Yadav-Ranjan
7,630,937 B1 12/2009 Mo
7,634,295 B2 12/2009 Hayaashi
7,644,037 B1 1/2010 Ostrovsky
7,644,859 B1 1/2010 Zhu
7,660,749 B2 2/2010 Koski
7,676,434 B2 3/2010 Evans
7,685,067 B1 3/2010 Britto
7,698,221 B2 4/2010 Blinn
7,707,113 B1 4/2010 Dimartino
7,708,194 B2 5/2010 Vawter
7,708,198 B2 5/2010 Gangi
7,712,658 B2 5/2010 Gangi
7,739,194 B2 6/2010 Blinn
7,742,984 B2 6/2010 Mohsenzadeh
7,774,076 B2 8/2010 Skowronek
7,783,569 B2 8/2010 Abel
7,784,684 B2 8/2010 Labrou
7,801,829 B2 9/2010 Gray
7,802,719 B2 9/2010 Johnson
7,810,720 B2 10/2010 Lovett
7,819,307 B2 10/2010 Lyons
7,828,206 B2 11/2010 Hessburg
7,828,992 B2 11/2010 Kilickiran
7,837,125 B2 11/2010 Biskupski
7,844,530 B2 11/2010 Ziade
7,849,014 B2 12/2010 Erikson
7,870,027 B1 1/2011 Tannenbaum
7,877,299 B2 1/2011 Bui
7,878,400 B2 2/2011 Harris
7,890,370 B2 2/2011 Whitsitt
7,895,119 B2 2/2011 Praisner
7,899,744 B2 3/2011 Bishop
7,904,360 B2 3/2011 Evans
7,908,227 B2 3/2011 Zizzimopoulos
7,926,714 B1 4/2011 Zhu
7,933,779 B2 4/2011 Rooks
7,942,337 B2 5/2011 Jain
7,962,418 B1 6/2011 Wei
7,967,196 B1 6/2011 Bierbaum
7,971,782 B1 7/2011 Shams
7,996,259 B1 8/2011 Distefano, III
8,016,192 B2 9/2011 Messerges
8,020,763 B1 9/2011 Kowalchyk

(56) References Cited

U.S. PATENT DOCUMENTS 8,024,260 B1 9/2011 Hogl
8,028,041 B2 9/2011 Olliphant
8,032,438 B1 10/2011 Barton
8,041,338 B2 10/2011 Chen
8,050,997 B1 11/2011 Nosek
8,060,413 B2 11/2011 Castell
8,074,876 B2 12/2011 Foss
8,108,261 B2 1/2012 Carlier
8,127,982 B1 3/2012 Casey
8,140,418 B1 3/2012 Casey
8,145,188 B2 3/2012 Park
8,145,561 B1 3/2012 Zhu
8,145,566 B1 3/2012 Ahuja
8,145,569 B2 3/2012 Gong
8,145,898 B2 3/2012 Kamalakantha
8,150,767 B2 4/2012 Wankmueller
8,150,772 B2 4/2012 Mardikar
8,151,328 B1 4/2012 Lundy
8,151,330 B2 4/2012 Vishik
8,151,336 B2 4/2012 Savoor
8,155,999 B2 4/2012 De Boer
8,156,000 B1 4/2012 Thompson
8,156,026 B2 4/2012 Junger
8,156,042 B2 4/2012 Winkelman, III
8,156,549 B2 4/2012 Rice
8,157,178 B2 4/2012 Dewan
8,157,181 B2 4/2012 Bates
8,160,935 B2 4/2012 Bui
8,160,959 B2 4/2012 Rackley, III
8,165,961 B1 4/2012 Dimartino
8,166,068 B2 4/2012 Stevens
RE43,351 E 5/2012 Jordan
8,170,921 B2 5/2012 Stocker
8,175,235 B2 5/2012 Mumford
8,175,965 B2 5/2012 Moore
8,175,967 B2 5/2012 OLeary
8,175,968 B2 5/2012 OLeary
8,175,975 B2 5/2012 Cai
8,175,979 B2 5/2012 Baentsch
8,176,416 B1 5/2012 Williams
8,179,563 B2 5/2012 King
8,180,289 B1 5/2012 Glickman
8,180,705 B2 5/2012 Kowalchyk
8,190,513 B2 5/2012 Felger
8,191,775 B2 6/2012 Hildred
8,195,233 B2 6/2012 Morikuni
8,195,544 B2 6/2012 Horsfall
8,195,547 B2 6/2012 Aaltonen
8,195,565 B2 6/2012 Bishop
8,195,576 B1 6/2012 Grigg
8,196,131 B1 6/2012 Von Behren
8,200,582 B1 6/2012 Zhu
8,204,774 B2 6/2012 Chwast
8,204,829 B2 6/2012 Alvarez
8,209,245 B2 6/2012 Dennes
8,209,744 B2 6/2012 Zhu
8,214,288 B2 7/2012 Olliphant
8,214,289 B2 7/2012 Scipioni
8,214,291 B2 7/2012 Pelegero
8,214,292 B2 7/2012 Duggal
8,214,293 B2 7/2012 Powell
8,214,886 B2 7/2012 Foley
8,215,546 B2 7/2012 Lin
8,219,411 B2 7/2012 Matz
8,219,474 B2 7/2012 Sutton
8,219,490 B2 7/2012 Hammad
8,220,047 B1 7/2012 Soghoian
8,224,702 B2 7/2012 Mangerink
8,224,754 B2 7/2012 Pastusiak
8,224,773 B2 7/2012 Spiegel
8,225,997 B1 7/2012 Bierbaum
8,227,936 B1 7/2012 Folk
8,229,354 B2 7/2012 Sklovsky
8,229,808 B1 7/2012 Heit
8,229,844 B2 7/2012 Felger
8,229,851 B2 7/2012 Doran
8,229,854 B2 7/2012 Stephen
8,233,841 B2 7/2012 Griffin
8,234,183 B2 7/2012 Smith
8,239,276 B2 8/2012 Lin
8,244,580 B2 8/2012 Mankoff
8,249,965 B2 8/2012 Tumminaro
8,255,278 B1 8/2012 Young
8,255,323 B1 8/2012 Casey
8,255,324 B2 8/2012 Bercy
8,275,704 B2 9/2012 Bishop
8,280,777 B2 10/2012 Mengerink
8,281,998 B2 10/2012 Tang
8,282,002 B2 10/2012 Shams
8,285,640 B2 10/2012 Scipioni
8,285,820 B2 10/2012 Olliphant
8,285,832 B2 10/2012 Schwab
8,286,875 B2 10/2012 Tang
8,290,433 B2 10/2012 Fisher
8,290,819 B2 10/2012 Bawcutt
8,290,829 B1 10/2012 Katz
8,295,898 B2 10/2012 Ashfield
8,296,187 B2 10/2012 Light
8,296,204 B2 10/2012 Templeton
8,296,228 B1 10/2012 Kloor
8,296,231 B2 10/2012 Britto
8,301,500 B2 10/2012 Pharris
8,301,510 B2 10/2012 Boesch
8,301,556 B2 10/2012 Hogl
8,311,520 B2 11/2012 Choi
8,312,096 B2 11/2012 Cohen
8,321,267 B2 11/2012 Hoerenz
8,321,294 B2 11/2012 Carlier
8,321,315 B2 11/2012 Abel
8,321,338 B2 11/2012 Baumgart
8,321,343 B2 11/2012 Ramavarjula
8,326,756 B2 12/2012 Egendorf
8,326,769 B1 12/2012 Weisman
8,326,770 B1 12/2012 Weisman
8,327,450 B2 12/2012 Clement
8,332,272 B2 12/2012 Fisher
8,332,275 B2 12/2012 Poon
8,332,323 B2 12/2012 Stals
8,335,720 B2 12/2012 Juang
8,335,726 B1 12/2012 Ling
8,335,822 B2 12/2012 Ahmed
8,335,921 B2 12/2012 Von Behren
8,335,932 B2 12/2012 Von Behren
8,340,666 B2 12/2012 Ramer
8,341,029 B1 12/2012 Ramalingam
8,346,643 B2 1/2013 Boyer
8,346,659 B1 1/2013 Mohsenzadeh
8,346,663 B2 1/2013 Kawan
8,352,323 B2 1/2013 Fisher
8,352,362 B2 1/2013 Mohsenzadeh
8,352,499 B2 1/2013 Bharat
8,352,749 B2 1/2013 Von Behren
8,355,987 B2 1/2013 Hirson
8,359,070 B1 1/2013 Zhu
8,364,587 B2 1/2013 Nuzum
8,364,590 B1 1/2013 Casey
8,370,264 B1 2/2013 Wei
8,380,177 B2 2/2013 Laracey
8,401,904 B1 3/2013 Simakov
8,412,586 B1 4/2013 Foulser
8,412,630 B2 4/2013 Ross
8,417,633 B1 4/2013 Chmara
8,423,462 B1 4/2013 Amacker
2001/0037297 A1 3/2001 McNair
2001/0056359 A1 12/2001 Abreu
2002/0040325 A1 4/2002 Takae
2002/0077976 A1 6/2002 Meyer
2002/0107755 A1 8/2002 Steed
2002/0112014 A1 8/2002 Bennett
2002/0116271 A1 8/2002 Mankoff
2002/0143614 A1 10/2002 MacLean
2003/0014307 A1 1/2003 Heng
2003/0026404 A1 2/2003 Joyce
2003/0028481 A1 2/2003 Flitcroft

(56) References Cited

U.S. PATENT DOCUMENTS

2003/0065643 A1* 4/2003 Musgrove .......... G06Q 30/0605
2003/0080185 A1 5/2003 Werther
2003/0097318 A1 5/2003 Yu
2003/0101134 A1 5/2003 Liu
2003/0174823 A1 9/2003 Justice
2003/0177361 A1 9/2003 Wheeler
2003/0191711 A1 10/2003 Jamison
2003/0200142 A1 10/2003 Hicks
2003/0200184 A1 10/2003 Dominguez
2003/0212642 A1 11/2003 Weller
2003/0220858 A1* 11/2003 Lam ...................... G06Q 30/04 705/35
2004/0078332 A1 4/2004 Ferguson
2004/0103037 A1 5/2004 Wetmore
2004/0128197 A1 7/2004 Bam
2004/0138999 A1 7/2004 Friedman
2004/0148255 A1 7/2004 Beck
2004/0215963 A1 10/2004 Kaplan
2004/0230536 A1 11/2004 Fung
2004/0236646 A1 11/2004 Wu
2004/0254891 A1 12/2004 Blinn
2004/0267608 A1 12/2004 Mansfield
2005/0010483 A1 1/2005 Ling
2005/0037735 A1 2/2005 Courts
2005/0065819 A1 3/2005 Pamela
2005/0080747 A1 4/2005 Anderson
2005/0080821 A1 4/2005 Breil
2005/0097320 A1 5/2005 Golan
2005/0137969 A1 6/2005 Shah
2005/0171894 A1 8/2005 Traynor
2005/0192893 A1 9/2005 Keeling
2005/0192895 A1 9/2005 Rogers
2005/0220326 A1 10/2005 Sim
2005/0234817 A1 10/2005 VanFleet
2005/0246278 A1 11/2005 Gerber
2005/0254714 A1 11/2005 Anne
2005/0261967 A1 11/2005 Barry
2006/0053056 A1 3/2006 Alspach-Goss
2006/0085328 A1 4/2006 Cohen
2006/0085477 A1 4/2006 Phillips
2006/0124729 A1 6/2006 Martin
2006/0129427 A1 6/2006 Wennberg
2006/0163349 A1 7/2006 Neugebauer
2006/0178986 A1 8/2006 Giordano
2006/0190347 A1 8/2006 Cuervo
2006/0226216 A1 10/2006 Keithley
2006/0277143 A1 12/2006 Almonte
2006/0293947 A1 12/2006 Nicholson
2007/0011025 A1 1/2007 Cracchiolo
2007/0038515 A1 2/2007 Postrel
2007/0038516 A1 2/2007 Apple
2007/0055571 A1 3/2007 Fox
2007/0087820 A1 4/2007 Van
2007/0094066 A1 4/2007 Kumar
2007/0100691 A1 5/2007 Patterson
2007/0100728 A1 5/2007 Rotman
2007/0106607 A1 5/2007 Seib
2007/0113289 A1 5/2007 Blumenau
2007/0143204 A1 6/2007 Claus
2007/0150413 A1 6/2007 Morgenstern
2007/0180119 A1 8/2007 Khivesara
2007/0208662 A1 9/2007 Jeronimus
2007/0214078 A1 9/2007 Coppinger
2007/0214250 A1 9/2007 Ahmed
2007/0226152 A1 9/2007 Jones
2007/0233590 A1 10/2007 Hardison
2007/0239502 A1 10/2007 Babu
2007/0276765 A1 11/2007 Hazel
2008/0004116 A1 1/2008 Van
2008/0004952 A1 1/2008 Koli
2008/0010096 A1 1/2008 Patterson
2008/0021829 A1 1/2008 Kranzley
2008/0077489 A1 3/2008 Gilley
2008/0086365 A1 4/2008 Zollino
2008/0091553 A1 4/2008 Koski
2008/0091616 A1 4/2008 Helwin
2008/0097856 A1 4/2008 Blagg
2008/0114737 A1 5/2008 Neely
2008/0126145 A1 5/2008 Racklet, III
2008/0133351 A1 6/2008 White
2008/0140568 A1 6/2008 Henry
2008/0147883 A1 6/2008 Philyaw
2008/0162361 A1 7/2008 Sklovsky
2008/0167965 A1 7/2008 Von
2008/0172274 A1 7/2008 Hurowitz
2008/0172331 A1 7/2008 Graves
2008/0177574 A1 7/2008 Marcos
2008/0177672 A1 7/2008 Brunner
2008/0223918 A1 9/2008 Williams
2008/0270300 A1 10/2008 Jones
2008/0272188 A1 11/2008 Keithley
2008/0319905 A1 12/2008 Carlson
2009/0006181 A1 1/2009 Ghosh
2009/0024527 A1 1/2009 Sellen
2009/0037255 A1 2/2009 Chiu
2009/0048934 A1 2/2009 Haddad
2009/0061884 A1 3/2009 Rajan
2009/0063261 A1 3/2009 Scribner
2009/0064056 A1 3/2009 Anderson
2009/0076953 A1 3/2009 Saville
2009/0076966 A1 3/2009 Bishop
2009/0089176 A1 4/2009 Mccabe
2009/0089193 A1 4/2009 Paintin
2009/0104888 A1 4/2009 Cox
2009/0106151 A1 4/2009 Nelsen
2009/0119176 A1 5/2009 Johnson
2009/0119211 A1 5/2009 Johnson
2009/0132347 A1 5/2009 Anderson
2009/0132395 A1* 5/2009 Lam ...................... G06Q 30/02 705/30
2009/0144104 A1 6/2009 Johnson
2009/0164344 A1 6/2009 Shiftan
2009/0171778 A1 7/2009 Powell
2009/0182664 A1 7/2009 Trombley
2009/0210300 A1 8/2009 Cansler
2009/0222347 A1 9/2009 Whitten
2009/0233579 A1 9/2009 Castell
2009/0234751 A1 9/2009 Chan
2009/0241159 A1 9/2009 Campagna
2009/0254471 A1 10/2009 Seidel
2009/0254479 A1 10/2009 Pharris
2009/0254535 A1 10/2009 Eickelmann
2009/0265274 A1 10/2009 Hahn-Carlson
2009/0271265 A1 10/2009 Lay
2009/0288012 A1 11/2009 Hertel
2009/0307135 A1 12/2009 Gupta
2009/0313132 A1 12/2009 McKenna
2009/0327045 A1 12/2009 Olives
2009/0327088 A1 12/2009 Puthupparambil
2010/0004989 A1 1/2010 Bonalle
2010/0005025 A1 1/2010 Kumar
2010/0009663 A1 1/2010 Chang
2010/0010964 A1 1/2010 Skowronek
2010/0023386 A1 1/2010 Avisar
2010/0023455 A1 1/2010 Dispensa
2010/0036741 A1 2/2010 Cleven
2010/0036775 A1 2/2010 Edens
2010/0042456 A1 2/2010 Stinchcombe
2010/0042537 A1 2/2010 Smith
2010/0042540 A1 2/2010 Graves
2010/0049879 A1 2/2010 Leavitt
2010/0063903 A1 3/2010 Whipple
2010/0076873 A1 3/2010 Taylor
2010/0078471 A1 4/2010 Lin
2010/0078472 A1 4/2010 Lin
2010/0082444 A1 4/2010 Lin
2010/0082445 A1 4/2010 Hodge
2010/0082447 A1 4/2010 Lin
2010/0082455 A1 4/2010 Rosenblatt
2010/0082480 A1 4/2010 Korosec
2010/0082481 A1 4/2010 Lin
2010/0082485 A1 4/2010 Lin
2010/0082490 A1 4/2010 Rosenblatt
2010/0082491 A1 4/2010 Rosenblatt

(56) References Cited

U.S. PATENT DOCUMENTS

| | | | |
|---|---|---|---|
| 2010/0088188 | A1 | 4/2010 | Kumar |
| 2010/0094730 | A1 | 4/2010 | Koski |
| 2010/0100480 | A1 | 4/2010 | Altman |
| 2010/0121707 | A1 | 5/2010 | Goeldi |
| 2010/0125492 | A1 | 5/2010 | Lin |
| 2010/0125495 | A1 | 5/2010 | Smith |
| 2010/0125803 | A1 | 5/2010 | Johnson |
| 2010/0131347 | A1 | 5/2010 | Sarptipi |
| 2010/0131415 | A1 | 5/2010 | Sartipi |
| 2010/0155470 | A1 | 6/2010 | Woronec |
| 2010/0161433 | A1 | 6/2010 | White |
| 2010/0174599 | A1 | 7/2010 | Rosenblatt |
| 2010/0185505 | A1 | 7/2010 | Sprogoe |
| 2010/0185531 | A1 | 7/2010 | Van |
| 2010/0191578 | A1 | 7/2010 | Tran |
| 2010/0191622 | A1 | 7/2010 | Reiss |
| 2010/0191770 | A1 | 7/2010 | Cho |
| 2010/0198626 | A1 | 8/2010 | Cho |
| 2010/0211445 | A1 | 8/2010 | Bodington |
| 2010/0211452 | A1 | 8/2010 | D |
| 2010/0211499 | A1 | 8/2010 | Zanzot |
| 2010/0217682 | A1 | 8/2010 | Chan |
| 2010/0250351 | A1 | 9/2010 | Gillenson |
| 2010/0276484 | A1 | 11/2010 | Banerjee |
| 2010/0305848 | A1 | 12/2010 | Stallman |
| 2010/0306075 | A1 | 12/2010 | Drance |
| 2010/0306113 | A1 | 12/2010 | Grey |
| 2010/0312645 | A1 | 12/2010 | Niekadlik |
| 2010/0312676 | A1 | 12/2010 | Muthukumaran |
| 2010/0332262 | A1 | 12/2010 | Horvitz |
| 2010/0332283 | A1 | 12/2010 | Ng |
| 2011/0047075 | A1 | 2/2011 | Fourez |
| 2011/0078082 | A1 | 3/2011 | Gupta |
| 2011/0082789 | A1 | 4/2011 | Boyd |
| 2011/0099057 | A1 | 4/2011 | Tenyer |
| 2011/0105183 | A1 | 5/2011 | Hsiao |
| 2011/0106698 | A1 | 5/2011 | Issacson |
| 2011/0137742 | A1 | 6/2011 | Parikh |
| 2011/0178896 | A1 | 7/2011 | Nakajima |
| 2011/0184827 | A1 | 7/2011 | Hubert |
| 2011/0215146 | A1 | 9/2011 | Shams |
| 2011/0218870 | A1 | 9/2011 | Shams |
| 2011/0246290 | A1 | 10/2011 | Howard |
| 2011/0258123 | A1 | 10/2011 | Dawkins |
| 2011/0296508 | A1 | 12/2011 | Os |
| 2011/0320344 | A1 | 12/2011 | Faith |
| 2012/0011063 | A1 | 1/2012 | Killian |
| 2012/0022943 | A1 | 1/2012 | Howard |
| 2012/0023026 | A1 | 1/2012 | Chen |
| 2012/0030101 | A1 | 2/2012 | Boyd |
| 2012/0036071 | A1 | 2/2012 | Fulton |
| 2012/0084204 | A1 | 4/2012 | Castell |
| 2012/0095895 | A1 | 4/2012 | Aston |
| 2012/0101881 | A1 | 4/2012 | Taylor |
| 2012/0116966 | A1 | 5/2012 | Tan |
| 2012/0118950 | A1 | 5/2012 | Belk |
| 2012/0123838 | A1 | 5/2012 | Sparks |
| 2012/0136780 | A1 | 5/2012 | El-Awady |
| 2012/0158585 | A1 * | 6/2012 | Ganti ................ G06Q 20/4016 705/44 |
| 2012/0166333 | A1 | 6/2012 | von Behren |
| 2012/0173431 | A1 | 7/2012 | Ritchie |
| 2012/0190386 | A1 | 7/2012 | Anderson |
| 2012/0215640 | A1 | 8/2012 | Ramer |
| 2012/0215650 | A1 | 8/2012 | Oba |
| 2012/0221421 | A1 | 8/2012 | Hammad |
| 2012/0221502 | A1 | 8/2012 | Jerram |
| 2012/0231844 | A1 | 9/2012 | Coppinger |
| 2012/0259763 | A1 | 10/2012 | Pessin |
| 2012/0304273 | A1 | 11/2012 | Bailey |
| 2012/0310826 | A1 | 12/2012 | Chatterjee |
| 2012/0323664 | A1 | 12/2012 | Klems |
| 2013/0009075 | A1 | 1/2013 | Tong |

FOREIGN PATENT DOCUMENTS

| | | | |
|---|---|---|---|
| KR | 100432430 | B1 | 5/2004 |
| KR | 20060117177 | A | 11/2006 |
| KR | 20070104087 | A | 10/2007 |
| WO | 0165502 | A2 | 9/2001 |
| WO | 03023674 | A1 | 3/2003 |
| WO | 2010148737 | A1 | 12/2010 |

OTHER PUBLICATIONS

Kinne, Jan; Axenbeck, Janna (2018) : Web mining of firm websites: A framework for web scraping and a pilot study for Germany, ZEW Discussion Papers, No. 18-033, Zentrum für Europäische Wirtschaftsforschung (ZEW), Mannheim, (Year: 2018).*

Christopher Olston and Marc Najork (2010), "Web Crawling," Foundations and Trends in Information Retrieval: vol. 4: No. 3, pp. 175-246, http://infolab.stanford.edu/—olston/publications/crawling_survey.pdf.

David Breitkopf, "ACS to Take Over Mich. WC Distribution Program", American Banker, New York, NY: Jul. 20, 2006, vol. 171. Issue 138, p. 6.

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

Gopalan, NP & Selvan, B Siva. TCP/IP Illustrated. Prentice-Hall. 2008. pp. 101-102, 175-176 and 235. 7 pages.

Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.

International Search Report for PCT/US09/54921 dated Oct. 21, 2009. (2 pages).

International Search Report and Written Opinion for PCT/US2010/048344 dated Nov. 15, 2010. (7 pages).

International Search Report and Written Opinion for PCT/US2010/033229 dated Dec. 29, 2010. (8 pages).

International Search Report and Written Opinion for PCT/US2010/041860 dated Feb. 1, 2011. (8 pages).

International Search Report and Written Opinion dated Jun. 6, 2012 corresponding to PCT/US12/23856. (7 pages).

International Search Report for PCT/US2010/033547 dated Dec. 14, 2010 (3 pages).

International Search Report and Written Opinion for PCT/US2010/033861 dated Dec. 9, 2010 (7 pages).

Notice of Allowance dated Aug. 15, 2018 for U.S. Appl. No. 13/366,083 (pp. 1-19).

* cited by examiner

MCB-Platform Example: Matching Merchant Offers to Consumers 1.00a

MCB-Platform Example: Merchant-Consumer Cloud 1 00b

Example Logic Flow: Offer Matching 2.00b

Example Logic Flow: Offer Matching 2.00b

Example Logic Flow: Consumer-Merchant Matching 2 00d

Example Logic Flow: Merchant Information 2.00e

Example Embodiment: Consumer Merchant Checkout Stack 3.00a

Example Data Flow: Transaction at Merchant POS

Example Logic Flow: Transaction at Merchant POS

Example Data Flow: Mobile to Mobile POS Redemption

Example Logic Flow: Mobile to Mobile POS Redemption

Example Data Flow: Enrollment Tokenization

Example Logic Flow: Enrollment Tokenization

Example Data Flow: Acquirer Routing 5 60

Example Logic Flow: Acquirer Routing 5 60

Example Data Flow: MCB-Platform Merchant DB Updates 6 00a

Example Data Structure: Extracted Information 600b

Example Logic Flow: "Spider" Merchant Sites

Example Logic Flow: "Spider" Merchant Sites

Example Logic Flow: Merchant Database Update

Example Logic Flow: Merchant Database Update

Example Logic Flow: Scoring Mechanism

Example Logic Flow: Progressive Scoring

Example UI: Consumer Registration 7.00a

Example UI: Consumer Registration 700b

Example UI: Consumer Registration 7.00c

Example UI: Consumer Registration 7.00d

Example UI: Consumer Registration 7.00e

Example UI: Consumer Registration 7.00f

Example UI: Consumer Registration 700g

Example UI: Consumer Registration 7.00h

Example UI: Consumer Registration 7.00i

Example UI: Consumer Registration 7.00j

Example UI: Consumer Registration 700K

Example UI: Consumer Registration 700

Example UI: Consumer Registration 8.00a

Example UI: Consumer Registration 8.00b

Example UI: Consumer Registration 8.00b

Example UI: Receiving Offers 8.00d

Example UI: Offer Bridging 8.00e

Example UI: Offer Bridging 8.00f

Example UI: Offer Redemption 8 00g

Example UI: Offer Redemption 8.00h

Example UI: Offer Bridging via Social Media 9.00a

Example UI: Offer Bridging via Social Media 9.00b

Example UI: Offer Bridging via Social Media 9 00c

Example UI: Offer Bridging via Social Media 9 00d

Example UI: Offer Bridging via Social Media 9.00e

Example UI: Offer Bridging via Social Media 9 00f

Example Mobile UI: Offer Bridging via Social Media 9.00g

Example Mobile UI: Offer Bridging via Social Media 9.00h

Example Data Flow: UVE Program configuration 10 00b

Example Data Flow: UVE Program configuration 10 00b

Example Data Flow: Closed Loop Gift Card Value Exchange/Transfer 11 01a

Example Data Flow: Open Loop Gift Card Value Exchange/Transfer 201c

Example Logic Flow: Closed Loop Gift Card Universal Value Exchange (CLGC -UVE) Component 12 00a Example Logic Flow: Closed Loop Gift Card Universal Value Exchange (CLGC -UVE) Component 12 00a Example Logic Flow: Gift Card Universal Value Exchange (GC -UVE) Component 12 00b Example Data Flow: Source/Destination Universal Value Exchange 13 01

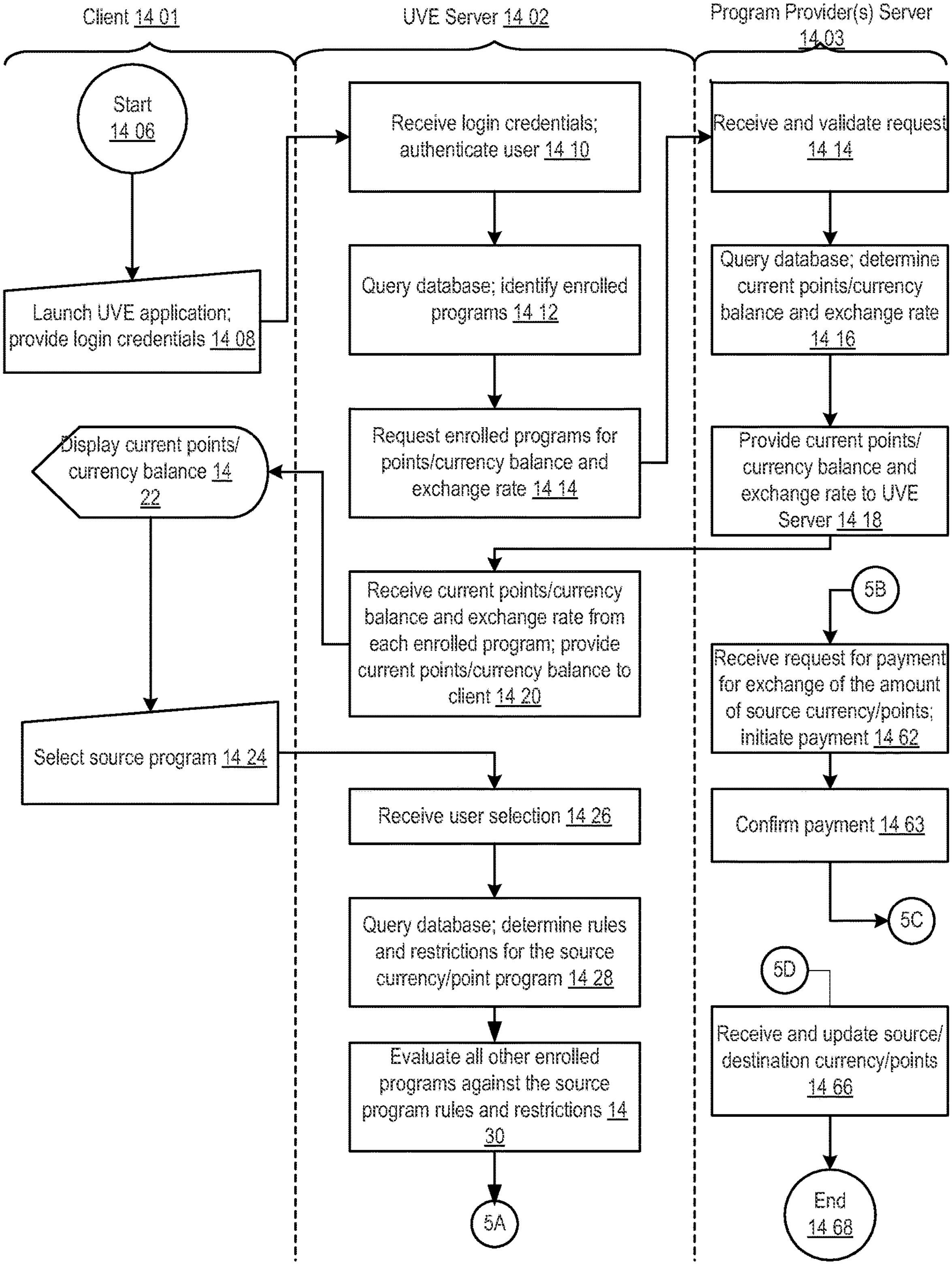
Figure 14A Example Logic Flow: Source/Destination Universal Value Exchange (SD-UVE) Component 501

Example Logic Flow: Source/Destination Universal Value Exchange Component 501

Example Logic Flow: Equivalent Value Determination (EVD) Component 15 01

Example Logic Flow: Equivalent Value Determination Component 15 01

Example Logic Flow: Cross-Ecosystem Universal Value Exchange (CE-UVE) Component 16 01

Example: Universal Value Exchange -- Exchange Mode

Example: Universal Value Exchange -- Exchange Mode

Example: Universal Value Exchange -- Exchange Mode

Example: Universal Value Exchange -- Exchange Mode

Example: Universal Value Exchange -- Exchange Rate Mode

Example: Universal Value Exchange -- Management mode

Example: Universal Value Exchange -- Management Mode

Example: Universal Value Exchange -- Management Mode

Example: Universal Value Exchange -- Management Mode

Example: Universal Value Exchange -- UVE Points Mode

Example: Universal Value Exchange -- UVE Points Mode

Example: Universal Value Exchange -- Source/Destination Exchange mode

Example: Universal Value Exchange -- Source/Destination Exchange Mode

Example: Universal Value Exchange -- Source/Destination Exchange Mode

Example: Centralized Personal Information Platform

Example: User Profile Attributes Data Model

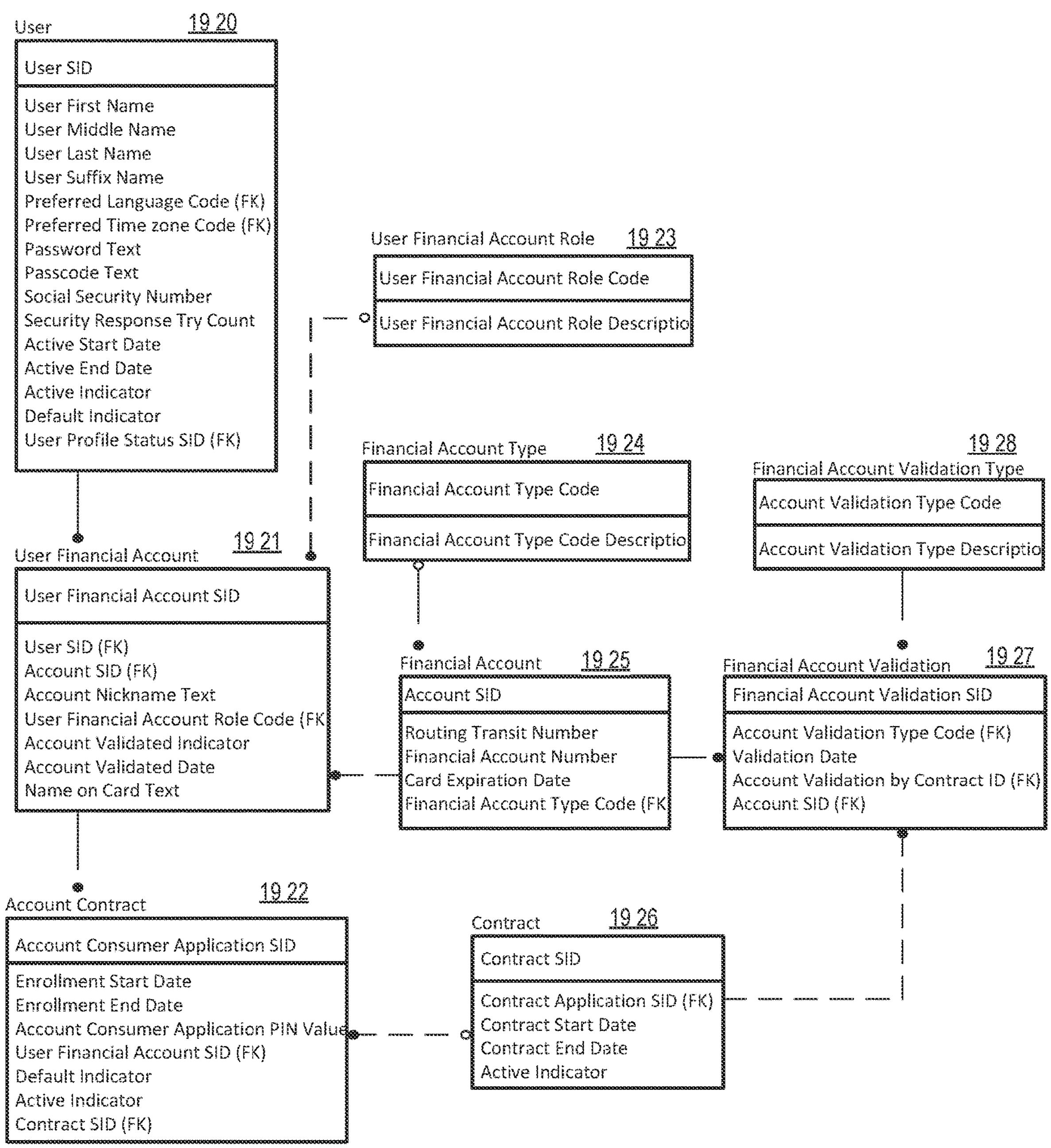
FIGURE 19B Example: User Profile Attributes Data Model

Example: User Profile Attributes Data Model

Example: User Profile Attributes Data Model

Example: User Profile Attributes Data Model

Example: User Profile Attributes Data Model

Example: Centralized Personal Information Platform Components

Example: Search Results Aggregation

Example: Search Results Aggregation ("SRA") component 2200

Example: Card-Based Transaction Execution

Example: Card-Based Transaction Execution

Example: Card-Based Transaction Execution

Example: Card-Based Transaction Execution

Example: Card-Based Transaction Execution ("CTE") component 2400

Example: Card-Based Transaction Execution ("CTE") component 2400

Example: Card-Based Transaction Execution ("CTE") component 2400

Example: Card-Based Transaction Execution ("CTE") component 2400

Example: Card-Based Transaction Execution ("CTE") component 2400

Example: Transaction Data Aggregation

Example: Transaction Data Aggregation (TDA) component 600

Example: Social Data Aggregation

Example: Social Data Aggregation ("SDA") component 2800

Example: Value-Add Service Enrollment

Example: Value-Add Service Enrollment ("VASE") component 3000

Example: Aggregated Data Record Normalization ("ADRN") component 3100

Example: Aggregated Data Record Normalization ("ADRN") component 3100

Example: Data Field Recognition ("DFR") component 3200

Example: Entity Type Classification ("ETC") component 3300

Example: Cross-Entity Correlation ("CEC") component 3400

Example: Entity Attribute Association ("EAA") component 3500

Example: Entity Profile-Graph Updating ("EPGU") component 3600

Example: Search Term Generation ("STG") component 3700

Example: Virtual Wallet Mobile App - Feature Overview

Example: Virtual Wallet Mobile App - Shopping Mode

Example: Virtual Wallet Mobile App - Shopping Mode

Example: Virtual Wallet Mobile App - Shopping Mode

Example: Virtual Wallet Mobile App - SocialPay Mode

Example: Virtual Wallet Mobile App - Shopping Mode

Example: Virtual Wallet Mobile App - Shopping Mode 39 19l
39 19m
39 19o
39 19n

Example: Virtual Wallet Mobile App - Shopping Mode

Example: Virtual Wallet Mobile App - Payment Mode

Example: Virtual Wallet Mobile App - Dynamic Payment Optimization

Example: Virtual Wallet Mobile App

Example: Virtual Wallet Mobile App

Example: Virtual Wallet Mobile App

Example: Virtual Wallet Mobile App

Example: Virtual Wallet Mobile App - History

Example: Virtual Wallet Mobile App - Snap Mode

Example: Virtual Wallet Mobile App - Snap Mode

Example: Virtual Wallet Mobile App - Snap Mode

Example: Virtual Wallet Mobile App - Snap Mode

Example: Virtual Wallet Mobile App - Snap Mode

FIGURE 43
43 11
43 12
Carrier
8:11 PM
Search for great deals...
Come Back! Extra 10% off...
Expires in 01:29 mm:ss.
Get $50 off with Visa credit
for your cart contents
$25 @johnq #dinnnmovielastnite
@john.q: you owe me $15... (Pay)
Multiple: $85 off (15-day ship)
HiBuy: Holiday sale!
(interactively explore our aisles)
BigBuy: $25 off for buys > $75
Add-On: Use vWallet rewards
Expires in 15:55 mm:ss.
Amzn: -5% + 2-day shipping
Shop
History
Snap
Settings
43 13
43 14
43 15
43 16
43 17
43 18
43 19
43 20
43 21
43 10

Example: Virtual Wallet Mobile App - Offers

Example: Virtual Wallet Mobile App

Example: Virtual Wallet Mobile App

Example Data Flow: User Purchase Checkout

Example Logic Flow: User Purchase Checkout ("UPC") component 4600

Example Data Flow: Purchase Transaction Authorization

Example Data Flow: Purchase Transaction Authorization

Example: Purchase Transaction Authorization ("PTA") component 4800

Example: Purchase Transaction Authorization ("PTA") component 4800

Example Data Flow: Purchase Transaction Clearance

Example Data Flow: Purchase Transaction Clearance

Example Logic Flow: Purchase Transaction Clearance ("PTC") component 5000

Example Logic Flow: Purchase Transaction Clearance ("PTC") component 5000

MERCHANT-CONSUMER BRIDGING PLATFORM APPARATUSES, METHODS AND SYSTEMS

RELATED APPLICATIONS

This application is a continuation of U.S. patent application Ser. No. 13/366,083, filed on Feb. 3, 2012, entitled "Merchant-Consumer Bridging Platform Apparatuses, Methods and Systems," which claims priority to U.S. provisional patent application Ser. No. 61/439,879, filed Feb. 5, 2011, entitled "Apparatuses, Methods And Systems For A Merchant-Consumer Bridging Platform," and U.S. provisional patent application Ser. No. 61/444,100, filed Feb. 17, 2011, entitled "Apparatuses, Methods And Systems For A Universal Value Exchange Merchant-Consumer Bridging Platform."

The application is also related to PCT application serial no. PCT/US2012/023856, filed Feb. 3, 2012, entitled "Merchant-Consumer Bridging Platform Apparatuses, Methods And Systems."

The entire contents of the aforementioned applications are herein expressly incorporated by reference.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to merchant promotion distribution and redemption, and more particularly, to MERCHANT-CONSUMER BRIDGING PLATFORM APPARATUSES, METHODS AND SYSTEMS.

BACKGROUND

Consumers may shop for products they are interested at a variety of places, e.g., a supermarket, a department store, etc. For example, a consumer may go to a supermarket to look for a desired product. He may find and pick up the desired product at the supermarket, bring the product to a check-out lane, and pay for the product at a point of sale (POS) terminal at the supermarket to complete the purchase.

Service providers such as banks and merchants run loyalty or rewards programs to reward their customers for being loyal to their business, encourage more spending, or entice new customers. These rewards may be in the form of points, cash back, gift cards, miles, etc.

BRIEF DESCRIPTION OF THE DRAWINGS

The accompanying appendices and/or drawings illustrate various non-limiting, example, innovative aspects in accordance with the present descriptions:

FIGS. 14A-B show logic flow diagrams illustrating source/destination value exchange component embodiment of the MCB-Platform;

FIGS. 19A-F show block diagrams illustrating example aspects of data models within a centralized personal information platform in some embodiments of the MCB-Platform;

Figure 1A:
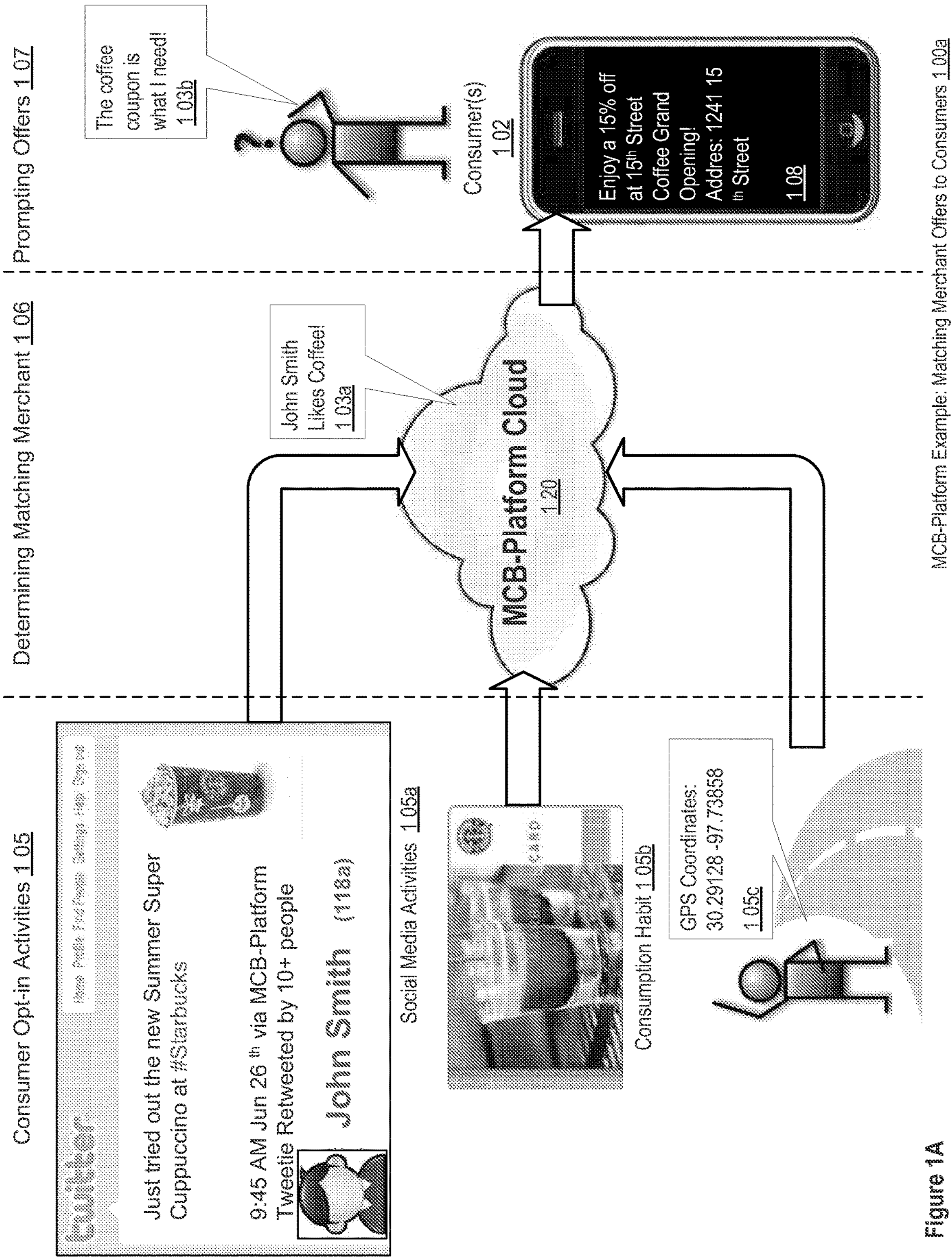
FIGS. 1A-1C provides block diagrams illustrating various example embodiments of the MCB-Platform.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The MERCHANT-CONSUMER BRIDGING PLATFORM APPARATUSES, METHODS AND SYSTEMS (hereinafter "MCB-Platform") provides a merchant-consumer bridging platform, whereby merchants and consumer electronic wallet accounts are registered with the MCB-Platform to facilitate consumer targeted offer distribution, redemption and payment during a purchasing transaction. In one implementation, the MCB-Platform may maintain a merchant database storing merchant information to provide matching offers to a consumer. In one implementation, the MCB-Platform may monitor and update merchant information such as, but not limited to merchant inventory, merchant product category, merchant geographical location, merchant business promotion, and/or the like.

In one embodiment, a consumer may register his smartphone (e.g., an Apple iPhone) with an electronic wallet service on the MCB-Platform. The consumer may receive discount information, electronic coupons, offers, rewards, etc., from an enrolled merchant website via emails, text messages, and/or the like. For example, if McDonalds is an enrolled merchant at MCB-Platform, a registered consumer may receive a "$2.99 happy meal" SMS from the MCB-Platform, and may walk to a McDonalds store to purchase the "$2.99 happy meal" by providing his electronic wallet information, e.g., by swiping a MCB-Platform magstripe card, by engaging a NFC contactless handshake via his smartphone, and/or the like.

For another example, a consumer may visit a merchant's website, and select a desired product from the merchant's website to associate the product to his electronic wallet account. In one implementation, the consumer may pick up the product at an enrolled merchant store and the MCB-Platform may automatically process the payment with the enrolled merchant store, upon submission of the consumer's electronic wallet information. In further implementations, the consumer may engage in MCB-Platform in multiple channels, such as, but not limited to mobile networks/devices, social networks, and/or the like.

In a further embodiment, the MCB-Platform may facilitate a merchant collecting information related to consumer's purchasing habits, preferences of products, and/or the like, based on which the merchants may design targeted campaign programs and marketing promotions. For another example, the MCB-Platform may facilitate loyalty/affinity programs for merchants. In one implementation, the merchant registry at a MCB-Platform database may match a consumer loyalty/affinity program membership, which facilitates delivery of offers, rewards and/or the like, to consumers. For example, a merchant may launch a "15% off invitation" offer to attract first-time consumers, and a "25% off loyalty" offer for returning consumers.

MCB-Platform

Figure 1B:
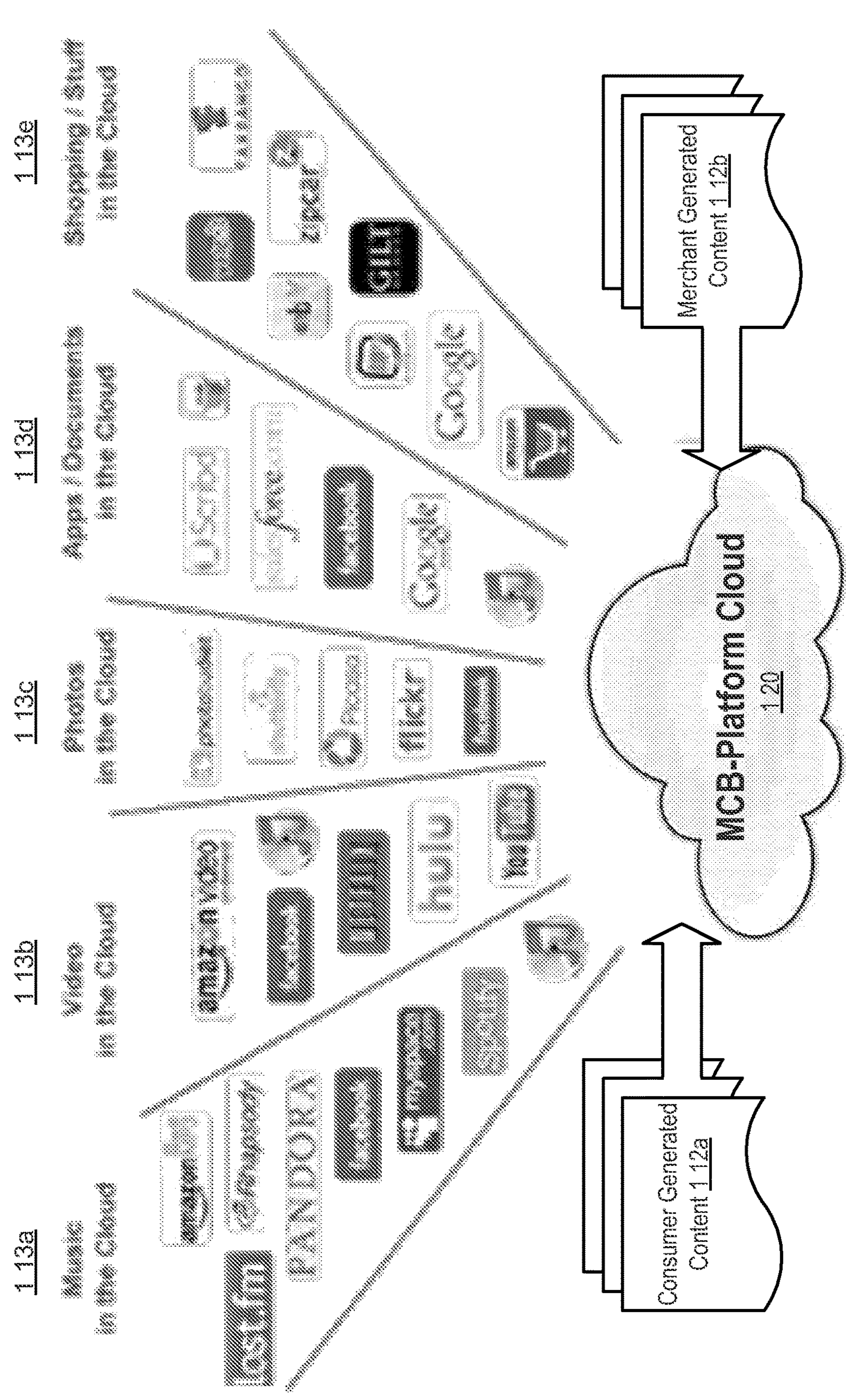
Figure 1C:
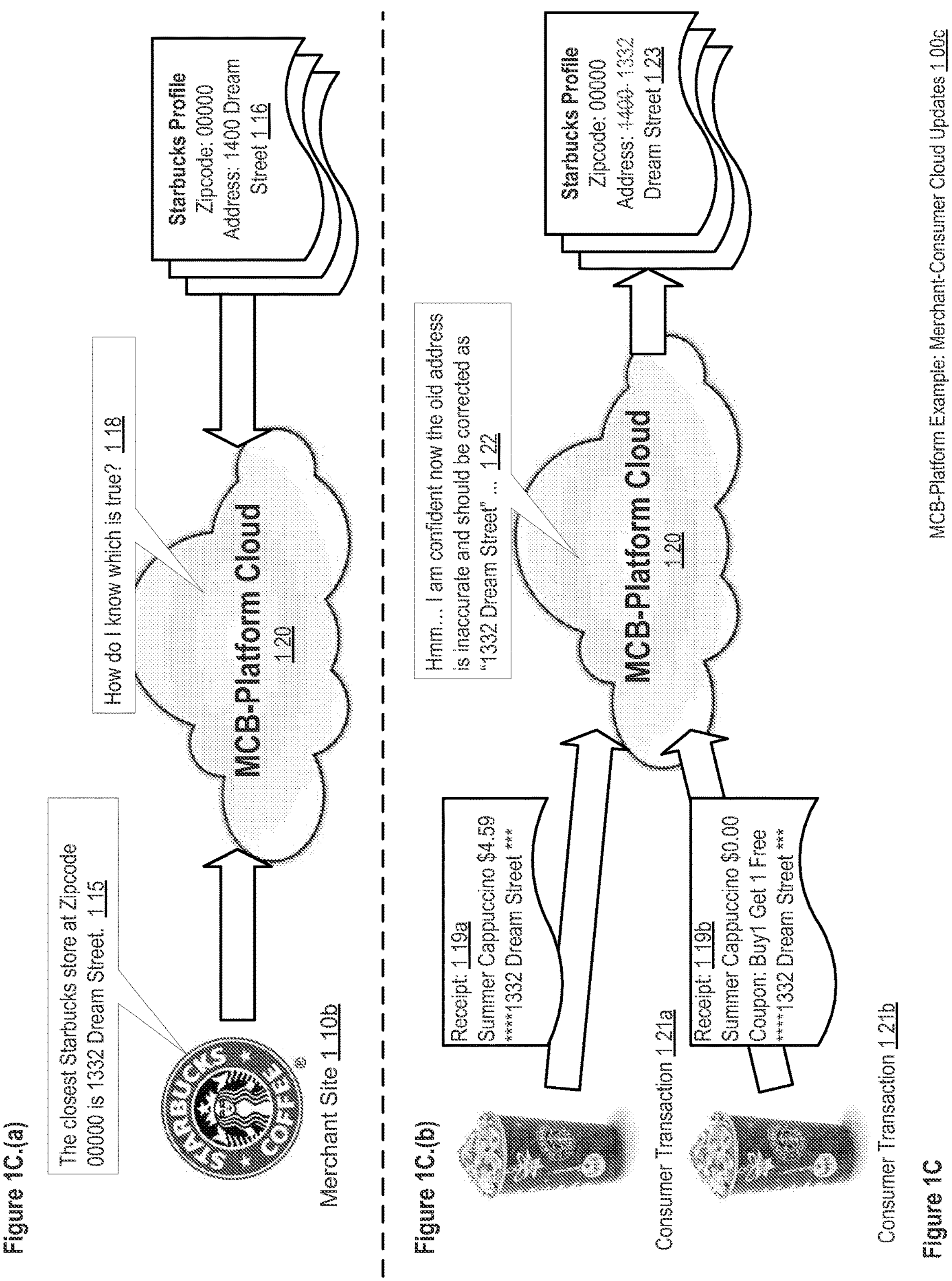

FIGS. 1A-1C provides block diagrams illustrating various example embodiments of the MCB-Platform. FIG. 1A shows exemplary aspects of matching merchant offers to consumers based on consumer opt-in activities 100*a* within implementations of the MCB-Platform. In one implementation, a consumer may engage in a plurality of opt-in activities 105 that reflect his preferences and interests in consumer goods, purchasing patterns, and/or the like. For example, the consumer "John Smith" may tweet his purchase of a Starbucks coffee, e.g., at 118*a*; such social media activities 105*a* may be captured by the MCB-Platform to track consumer behaviors. For another example, the MCB-Platform may obtain information as to "John Smith's" membership with Starbucks, as he added a Starbucks card to his electronic wallet, showing his loyalty and constant consumption habits 105*b* in Starbucks coffee. For another example, the MCB-Platform 120 may obtain GPS coordinates of "John Smith" 105*c* (e.g., via consumer's smartphone, etc.), based on which the MCB-Platform may recommend offers from nearby merchant stores to the consumer. The consumer opt-in activities 105 may comprise a variety of other activities, such as, but not limited to consumer browsing history, in-store transaction history, shopping cart history, wish list, various social media activities (e.g., "like" or comment on a merchant link or product on Facebook, etc), blog experiences, and/or the like.

In one implementation, the MCB-Platform 120, upon obtaining the consumer opt-in activity data 105, may find merchant offers that match with the consumer's interest 106. For example, the MCB-Platform 120 may determine "John Smith" is interested in coffee products 103*a* based on his constant purchasing at Starbucks. In one implementation, the MCB-Platform 120 may prompt matched offers 107 to the user, e.g., via his mobile wallet at 108. Such offers may comprise a coupon of a coffee shop located close to "John Smith's" location based on his GPS coordinates, which matches the consumer's interests in coffee 103*b*.

FIG. 1B provides a diagram illustrating aspects of merchant-consumer cloud 100*b* within embodiments of the MCB-Platform. In one implementation, the MCB-Platform cloud 120 may obtain various information into the cloud. For example, MCB-Platform may obtain consumer generated content 112*a*, such as consumer user profile, social media posts, comments, "like" activities, purchasing history, wish list, mobile wallet information, loyalty program information, web browsing history, and/or the like. For another example, the MCB-Platform may obtain merchant generated content 112*b*, such as but not limited to merchant profile information, merchant store location, merchant inventory information, merchant website server ID, merchant web server address, merchant terminal ID, merchant terminal transaction history, and/or the like. Such obtained consumer and/or merchant contents 112*a/b* may provide information as to consumer's interests in merchant products, and the most update merchant offers and promotions.

In further implementations, the MCB-Platform cloud 120 may obtain various information from the Internet and/or the cloud, such as music 113*a*, video 113*b*, photos 113*c*, applications and documents 113*d*, shopping experiences 113*e*, and/or the like. Within implementations, such contents may provide insights to the MCB-Platform cloud 120 on merchant updates, e.g., a news article reporting a merchant store's grand opening, a Facebook advertisement of a merchant, etc. Further implementations of MCB-Platform web claws are described in FIGS. 6A-6D.

FIG. 1C provides a diagram illustrating aspects of merchant-consumer cloud update 100*c* within embodiments of the MCB-Platform. In one implementation, as shown in FIG. 1C. (a), the MCB-Platform cloud 120 may receive information as to the merchant store location, e.g., an address line from the merchant "Starbucks" website 110*b* indicates the closest store at zipcode "00000" is at "1332 Dream Street" 115. The MCB-Platform may compare this address with the previously stored merchant profile and find inconsistency, as the stored address is at "1400 Dream Street" 116. The MCB-Platform cloud 120 may not update or change the stored merchant address immediately as it is uncertain which information is accurate 118, but instead may determine how much confidence it has on the received information 115 from the merchant site 110*b*. For example, a confidence score may be generated associated with the received information 115, as further discussed in FIGS. 6 and 19A-19F.

Continuing on in FIG. 1C. (b), the MCB-Platform cloud 120 may receive further indications of address change of the Starbucks store, e.g., receiving a consumer transaction record 121*a* indicating a purchase of Starbucks coffee at "1332 Dream Street" 119*a*, and another consumer transaction record 121*b* showing redemption of Starbucks coupon at the same address 119*b*. Such information may enhance the confidence level that the Starbucks store location should be at "1332 Dream Street" instead of the previously stored "1400 Dream Street," e.g., at 122. The MCB-Platform may then update the stored merchant profile of Starbucks to correct the store location information, e.g., at 123.

Figure 2A:
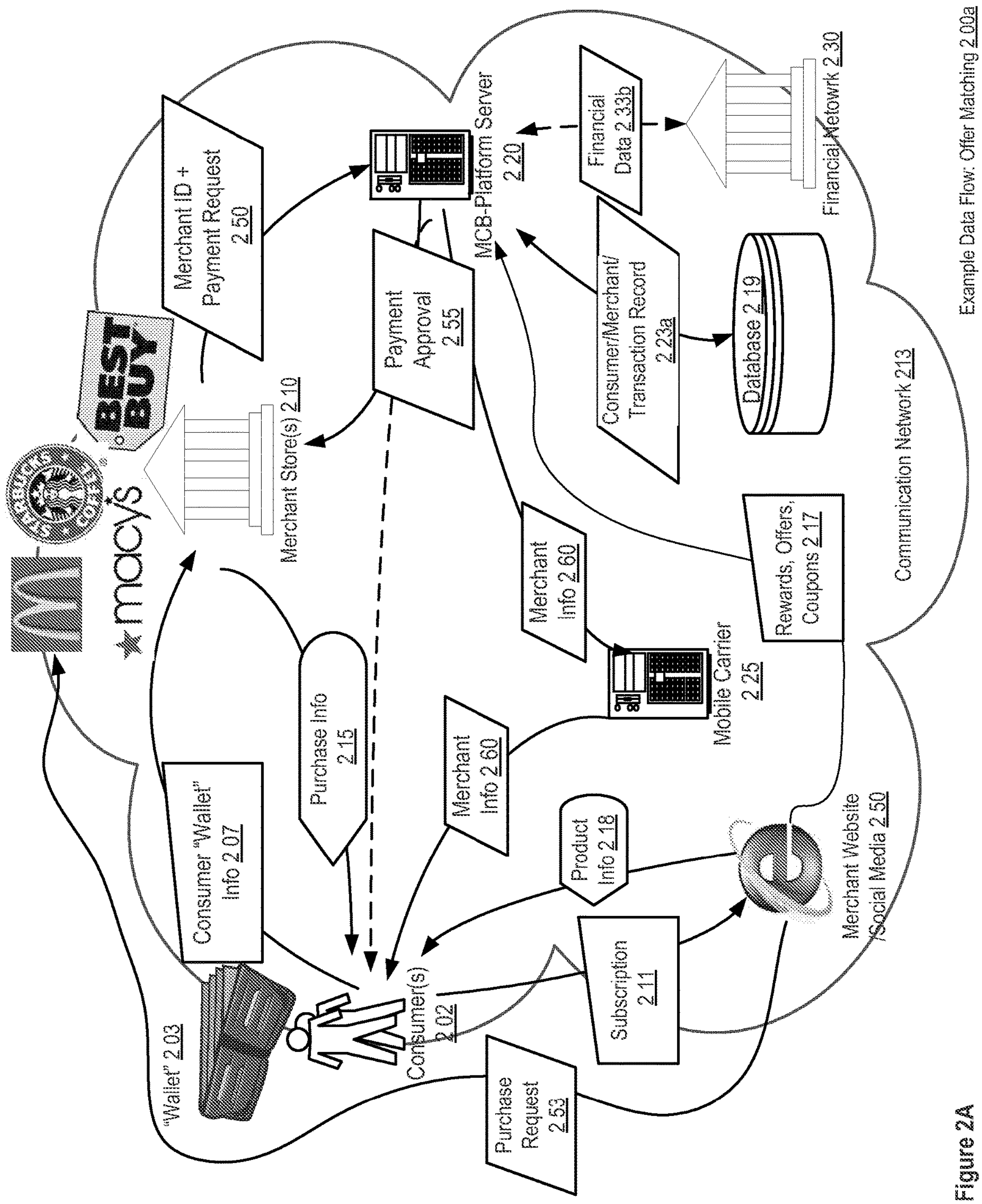
FIG. 2A shows a block diagram illustrating data flows 200*a* between MBC-Platform server and affiliated entities within various embodiments of the MCB-Platform.

FIG. 2A shows a block diagram illustrating data flows 200*a* between MBC-Platform server and affiliated entities within various embodiments of the MCB-Platform. Within various embodiments, one or more consumers user(s) 202, MCB-PLATFORM server 220, MCB-PLATFORM database(s) 219, merchant store(s) 210, mobile carrier 225, financial network(s)/system(s) 230, merchant website(s) and/or social media 250 are shown to interact via various communication network 213.

In one embodiment, a consumer 202, may be associated with an electronic wallet 203, which may comprise one or more of a bank account, a MCB-Platform service account, a merchant membership account, and/or the like, possessed with the consumer 202. For example, a consumer may possess an electronic wallet linked a Bank of America checking account, a Chase credit card account, a Sam's Club membership account, and/or the like. For another example, the consumer's electronic wallet may be registered for the MCB-Platform service.

In one embodiment, upon registering with a MBC-Platform, the consumer 202 may visit a participating merchant store's website and obtain product information 218. For example, the consumer 202 may browse a merchant's online catalogue, a third party shopping website featuring the merchant's product (e.g., Amazon.com, Zappos.com, etc.) and/or visit product advertisement via social media 250 (e.g., Facebook, Twitter, etc.). The consumer 203 may submit an online purchase request and/or a subscription to a desired product 213. For example, a consumer device (e.g., a browser running on a consumer smartphone, computers, etc.) may generate a Hypertext Transfer Protocol Secure (HTTPS) POST message to make a subscription/purchase request including the desired item information in the form of data formatted according to the XML. Below is an example HTTP(S) POST message including an XML-formatted subscription message 211 for the MCB-Platform server:

```
POST /SubscriptionRequest.php HTTP/1.1
Host: 206.205.82.130
Content-Type: Application/XML
Content-Length: 418
<?XML version = "1.0" encoding = "UTF-8"?>
<SubscriptionRequest>
<Time> 12:30:30 </Time>
<Date> 10-10-2015 </Date>
```

-continued

```
<MerchantID> Amazon </MerchantID>
<MerchantName> Amazon.com </MerchantName>
<MerchantURL> www.amazon.com </MarchentURL>
<PickupLocation> 1332 Dream Street </PickUpLocation>
<StoreName> Starbucks
...
<TransactionType> Wish List </TransactionType>
...
<ItemID> BF00001 </ItemID>
<ItemName> Starbucks Coffee Mug </ItemName>
<ItemPrice> $15.99 </ItemPrice>
...
<Consumer>
    <ID> JS001 </ID>
    <Name> John Smith </Name>
    <CardNo> 0000 0000 0000 0000 </CardNo>
    <WalletID> JS-W-001 </WalletID>
    ...
</Consumer>
</SubscriptionRequest>
```

The merchant website 250 may synchronize the purchase request 253 (e.g., which may take a similar form to the subscription request 211) to a merchant store 210 for consumer's pickup, and may also provide the consumer a geographical location of a merchant store that features the desired product.

In one embodiment, the consumer 202 may provide his MCB-Platform wallet information 207 to a merchant store 210 prior to his check-out. For example, in one implementation, the consumer may swipe a MBC-Platform membership magstripe card at a POS terminal of the merchant store. For another example, the consumer may operate a smart phone for registration with the POS via short messages. For another example, the consumer may register with the merchant via bar code scan of the consumer's MBC-Platform membership card and/or the product.

In one embodiment, the merchant store 210 may obtain the "wallet" information 207 at its POS terminal, which may comprise the consumer's wallet account information (e.g., a wallet ID, the associated bank information, etc.), the product reservation information, and/or the like. The merchant store 210 may generate a payment request 250 to a MCB-Platform server, wherein the payment request may comprise merchant store/terminal identification information, consumer wallet identification information, a payment amount, and/or the like. For example, the merchant terminal 210 may generate a HTTPS POST message to make a payment request including the desired item information in the form of data formatted according to the XML. Below is an example HTTP(S) POST message including an XML-formatted payment request message 250 for the MCB-Platform server:

```
POST /SubscriptionRequest.php HTTP/1.1
Host: 206.205.82.135
Content-Type: Application/XML
Content-Length: 418
<?XML version = "1.0" encoding = "UTF-8"?>
<PaymentRequest>
<Time> 18:30:30 </Time>
<Date> 10-10-2015 </Date>
<MerchantID> STUX </MerchantID>
<MerchantName> Starbucks </MerchantName>
<ReferredURL> www.amazon.com </ReferredURL>
<TerminalID> ST0001 </TerminalID>
...
<TransactionType> Purchase </TransactionType>
...
```

-continued

```
        <Item>
            <ItemID> BF00001 </ItemID>
            <ItemName> Starbucks Coffee Mug </ItemName>
            <ItemPrice> $25.99 </ItemPrice>
            ...
        </Item>
        ...
        <Consumer>
            <ID> JS001 </ID>
            <Name> John Smith </Name>
            <CardNo> 0000 0000 0000 0000 </CardNo>
            <CardType> Visa </CardType>
            <WalletID> JS-W-001 </WalletID>
            ...
        </Consumer>
        <BIN> 000000r </BIN>
        ...
        </PaymentRequest>
```

Figure 3A:
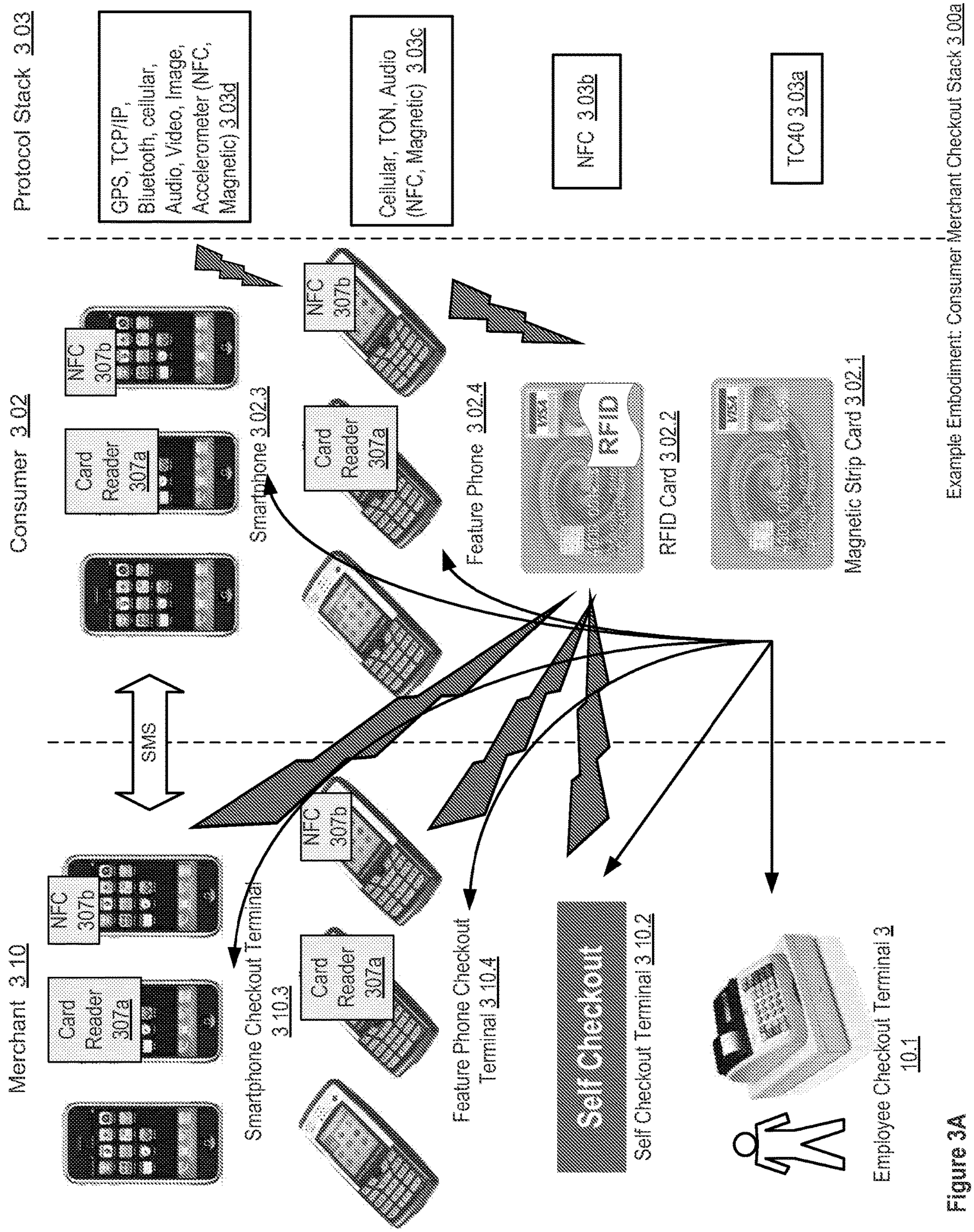
FIG. 3A provides a block diagram illustrating consumer merchant checkout stack 300*a* within embodiments of the MCB-Platform.
Figure 3B:
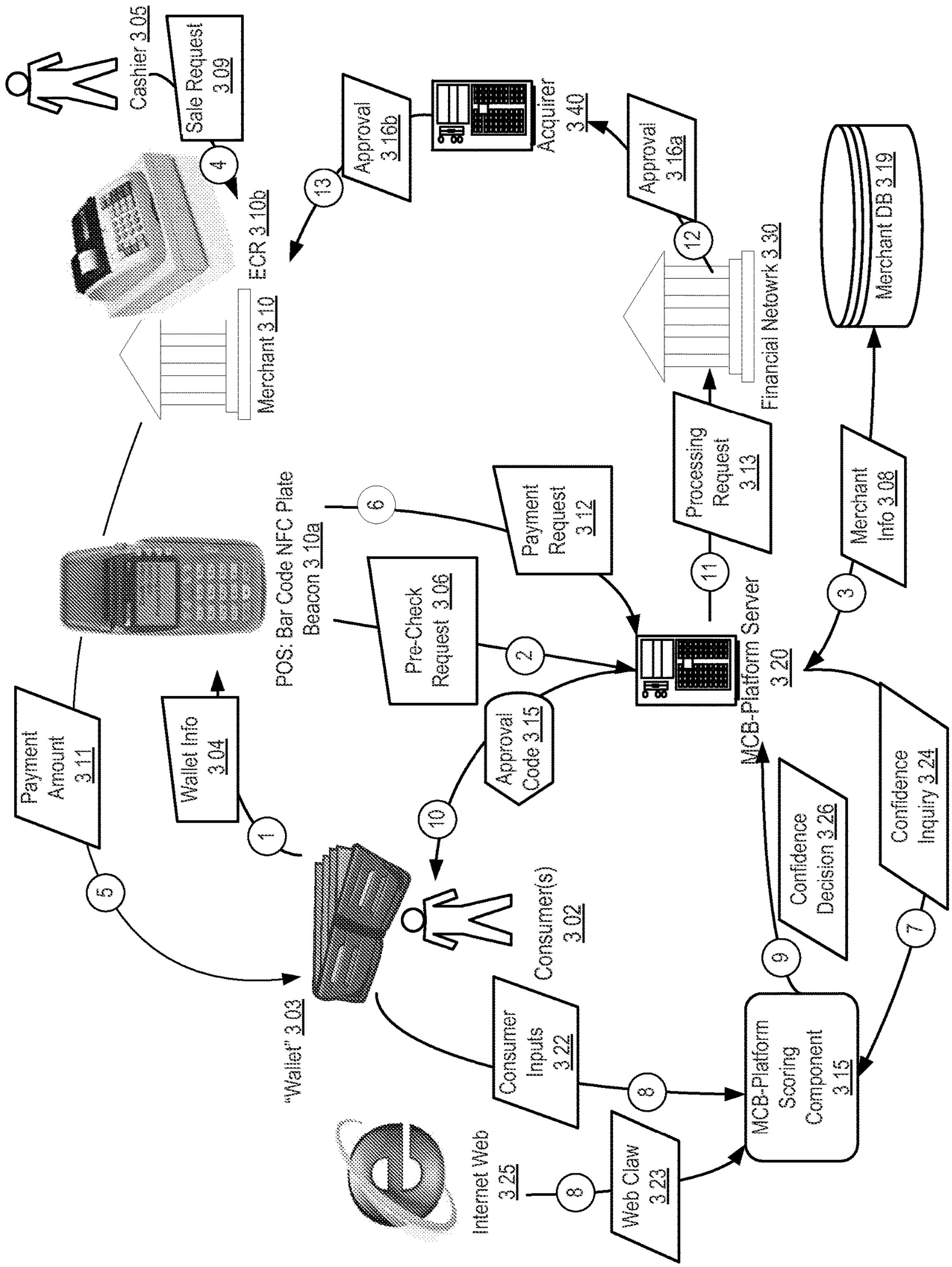
FIGS. 3B-3C provide a data flow and a logic flow diagram illustrating transaction at merchant POS within implementations of the MCB-Platform.
Figure 3C:
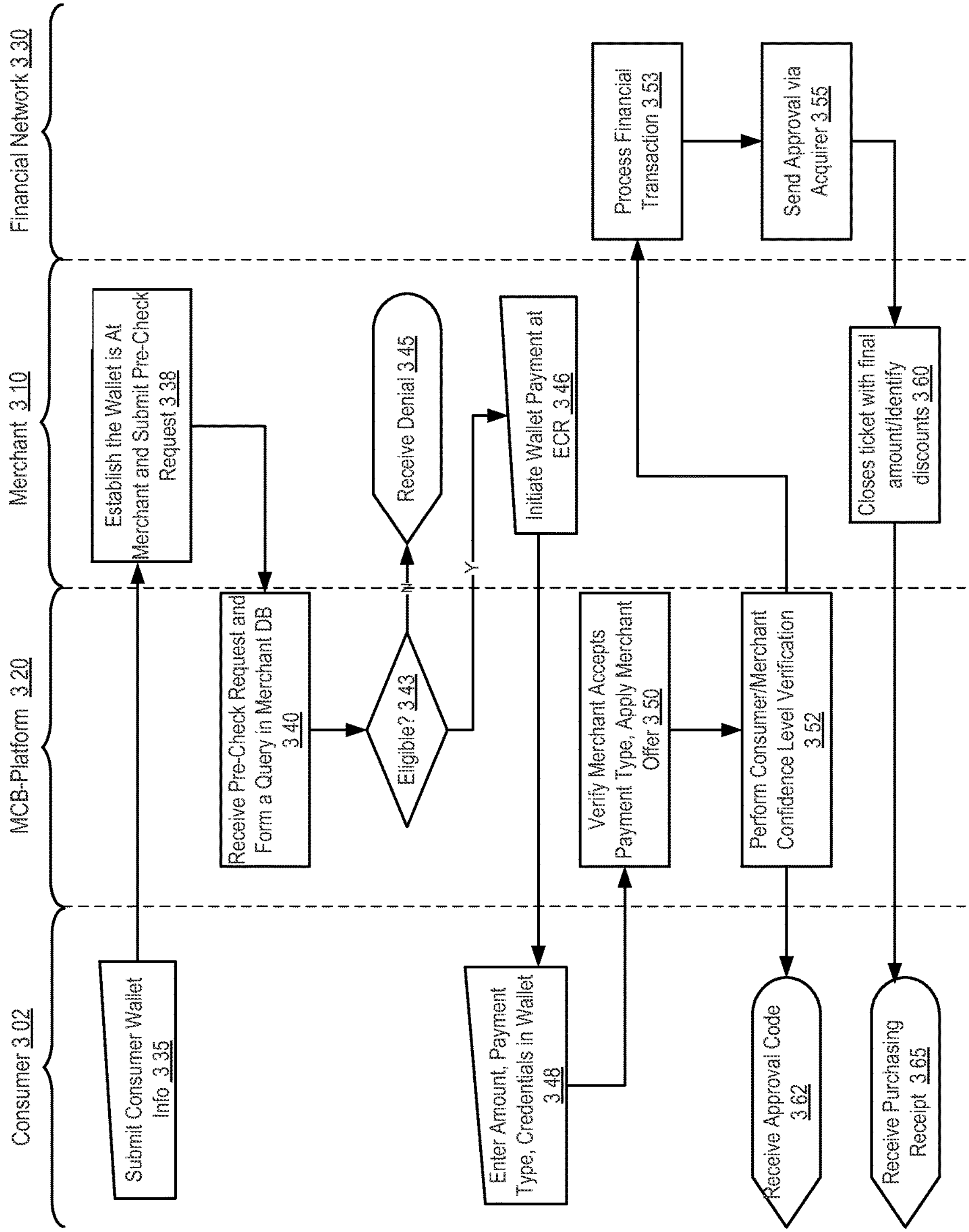

In one embodiment, the MCB-Platform server 220 may process the payment request, and communicate with a financial network 230 to exchange financial data 233*b* to perform the financial transaction (as further illustrated in FIGS. 3B-3C). In another implementation, the MCB-Platform server 220 may be integrated with a financial payment platform.

In one embodiment, the MCB-Platform server 220 may send payment approval 255 (e.g., see also 316*b* in FIG. 3B) to the merchant store POS terminal 210 and the consumer 202 to notify the completion of the payment. In one implementation, the MCB-Platform may send the merchant information 260, and the transaction approval details to a mobile carrier 225 wherein the consumer is a subscriber. The mobile carrier 225 may send the transaction information and merchant information 60 to the consumer 202 via text messages, emails, customer service robot calls, and/or the like.

In one embodiment, the MCB-Platform server 220 may establish data records of registered consumers, merchants, past transactions 223 for storage in a database 219. A merchant registry at the MCB-Platform may comprise data entries such as, but not limited to merchant ID, merchant URL, URI, US DMA, MSA, NAICS codes, position coordinates, latitude, longitude, consumer preferences, opt-in activities, history, offer notifications, messaging campaign settings, campaign management, offer delivery, messaging, redemption, analytics, and/or the like.

For example, an exemplar XML code of a merchant record may take a form similar to the following:

```
POST /Merchant.php HTTP/1.1
Host: 206.205.82.135
Content-Type: Application/XML
Content-Length: 418
<?XML version = "1.0" encoding = "UTF-8"?>
<Merchant>
    <MerchantID> 123456789 </MerchantID>
    <MerchantName> All Grocery </MerchantName>
    </MerchantAddress> 111 White road </MerchantAddress>
    <MerchantGPSInfo>    N 66666 W 7777777 </MerchantGPSInfo>
    ...
    </MerchantTerminalID>11111111</MerchantTerminalID>
    <MerchantLicenseInfo>
                    .....
    </MerchantLicenseInfo>
    <MerchantWebsite> www.allGrocery.com </MerchantWebsite>
    <MerchantParticipatingSite>
        <Site1>
            www.amazon.com
        </Site1>
        ...
```

-continued

```
    </MerchantParticipatingSite>
    <MerchantProduct>
        <Product1>
            <ProductID> 00023213 </ProductID>
            <ProductBrand> Green Farm </ProductBrand>
            <ProductBarCode> ... </ProductBarCode>
            ...
        </Product1>
    ...
    </MerchantProduct>
...
</Merchant>
```

Further implementations of the database 219 are discussed in FIG. 3.

In a further implementation, the MCB-Platform may support wholesale API delivery of embodiments of the MCB-Platform.

Figure 2B:
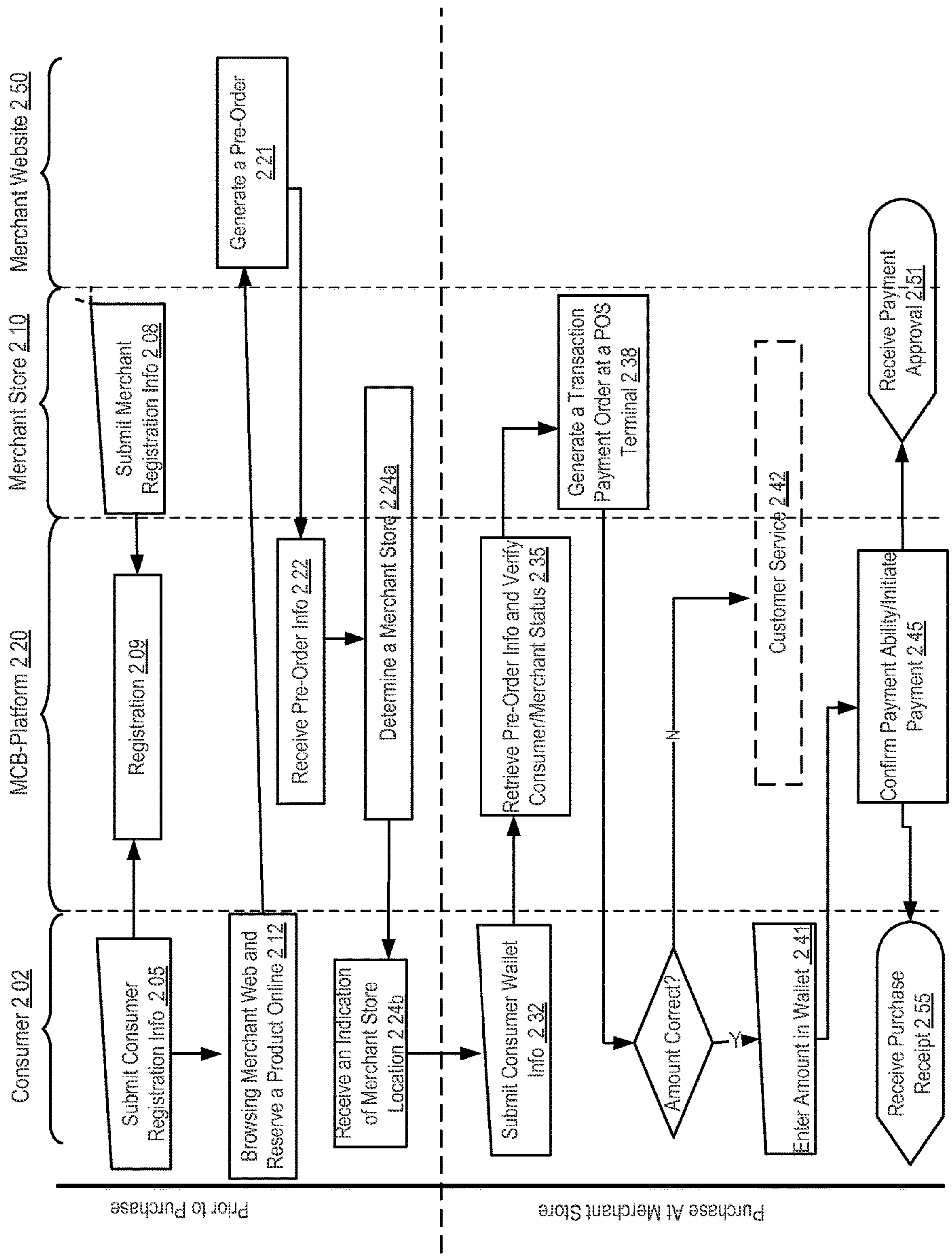
FIGS. 2B-2E show logic flow diagrams illustrating various embodiments of the MCB-Platform.

FIG. 2B provides a logic flow 200*b* diagram illustrating embodiments of the MCB-Platform. In one embodiment, the consumer 202 and a merchant 210 may register to the MCB-Platform 220 prior to an in-store purchase. For example, in one implementation, the consumer 202 may submit identifying information (e.g. consumer name, address, phone number, email address, social media account, and/or the like) and financial information to associate his bank account information, merchant membership information and/or the like 205 to the MCB-Platform 220 to create an electronic wallet. In another implementation, the merchant 210 may enroll in the MCB-Platform 220 by providing its identification information, geographical location information, website URL information, and/or the like. In one implementation, the merchant may be registered as a brand 208, e.g., the brand "GAP" may be registered associated with its retail stores, etc. In another implementation, a POS terminal at a merchant may be registered separately at the MCB-Platform, e.g., one terminal at Whole Food, Inc., located at 10110 White Street, etc.

In one implementation, upon registration 209, a merchant may bridge with consumers in a variety of electronic wallet vehicles. For example, the merchant may cooperate with carriers to provide smartphone applications for NFC handshakes. For another example, a merchant may equip MCB-Platform products barcode/NFC plate reading machines at its POS terminals. For another example, a merchant may accept magstripe cards to provide electronic wallet information.

In one embodiment, a consumer may browse a merchant website to reserve a desired product online 212. In another implementation, a consumer may retrieve coupon information from the merchant website, e.g., a "$2.99 happy meal" from McDonalds, etc. In another implementation, a consumer may click a product advertisement on a social media platform (e.g., Facebook, Twitter, etc.) and select to reserve a product.

The merchant web-server may generate a pre-order 221 and transmit the tentative pre-order information 222 to the MCB-Platform. For example, the pre-order information may comprise product information, consumer wallet information, and/or the like. In one implementation, the MCB-Platform 220 may form a query based on the product information for a list of locations of merchant stores that feature the product, e.g., at 224*a*. In a further implementation, the consumer information may comprise GPS information of the consumer, e.g., the consumer may operate a GPS-enabled smart phone (e.g., Apple iPhone, etc.) to submit the pre-order; the consumer wallet information may comprise one or more consumer's home addresses, etc. The MCB-Platform may then provide a list of merchant stores ranked by the distance to the consumer's location, e.g., 224*b*.

In one implementation, at a merchant store, the consumer may submit consumer's wallet information 232. For example, while waiting in the line for check-out, the consumer may swipe a magstripe card at a POS terminal. For another example, the consumer wallet information may be submitted via a bar code reading and/or NFC handshake machine.

In one implementation, the MCB-Platform may receive consumer wallet information from a merchant store, and then retrieve the consumer's pre-order information, and verify the consumer/merchant status 235. For example, in one implementation, upon receiving consumer wallet information, the MCB-Platform may confirm the wallet holder (e.g., the consumer) is physically present at a merchant store, and also confirm the merchant store is an MCB-Platform service enrolled acceptor. In a further implementation, the MCB-Platform may verify whether restriction may be applied for the MCB-Platform wallet service. For example, a consumer may specify a maximum payment amount allowable in MCB-Platform purchase to improve security.

In one embodiment, the merchant store may generate a transaction payment order at a POS terminal 238 based on the pre-order information associated with the consumer wallet. The consumer may then verify whether the payment amount is correct, e.g., whether the payment amount matches the amount that was offered online, etc. If the consumer agrees with the payment amount, he may enter an amount in his electronic wallet 241 to purchase. For example, the consumer may choose a variety of payment methods, such as, but not limited to mobile pay with electronic cash register (ECR), and/or the like. If the amount is not correct, e.g., a consumer receive a payment of "$4.56" for an order of "$2.99 happy meal" at McDonalds, etc., the consumer may request customer service 242.

In one embodiment, when the MCB-Platform receives consumer's payment notification, the MCB-Platform may confirm payment ability of the consumer and initiate payment 245. For example, the MCB-Platform may communicate with a financial account of the consumer to check payment ability, and if a checking amount with insufficient funds is associated with the wallet, the MCB-Platform may reject the transaction.

In one embodiment, the MCB-Platform may send payment approval to the merchant store 251 to approve the transaction, and the consumer may receive a purchase receipt 255 from the merchant. In another example, the consumer may receive a report of transaction from the MCB-Platform via emails, text messages, and/or the like.

Figure 2C:
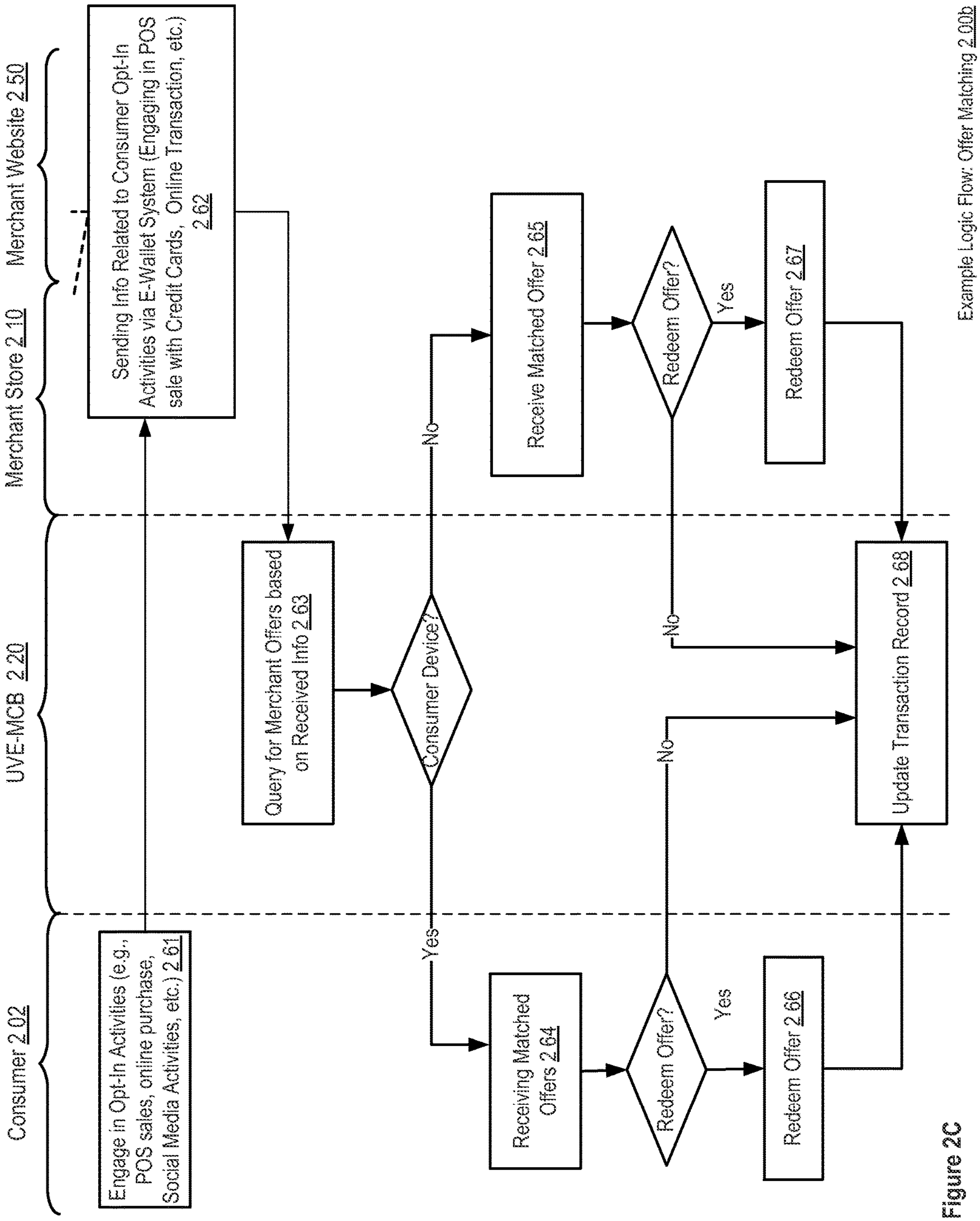

FIG. 2C provides a logic flow diagram 200*c* illustrating alternative embodiments of the MCB-Platform. In one embodiment, a consumer 102 may engage in opt-in activities 261, such as, but not limited to POS sale transactions with a credit/debit card, online purchase on a merchant website using electronic wallet account, and/or the like. The merchant store 110, and/or the merchant website 150 (or a third party shopping site carrying the merchant's products) may collect information related to the consumer's opt-in activities and send such information 262 to the MCB-Platform 120.

In one embodiment, the MCB-Platform 120 may form a query for merchant offers based on received information 263. For example, in one implementation, if the received information indicates the consumer engaged in online grocery purchase and delivery, the MCB-Platform may query for online grocery delivery offers from the merchants. The MCB-Platform may then determine whether there is a consumer device available, e.g., whether the consumer has a registered phone number, email, membership card, and/or the like. If yes, the MCB-Platform may send a list of matched offers to the consumer 264. Otherwise if not, the MCB-Platform may send the matched offers to the merchant store 265.

In one embodiment, upon receiving a list of matched offers, the consumer 102, and/or the merchant store 110 may determine whether there is any indication of redeeming the offer. If yes, the offer may be redeemed by the consumer 266 and/or the merchant store 267. For example, the consumer may receive an offer code for "10% OFF grocery delivery" via SMS, and he may redeem the offer by entering the offer code at the check-out page of ordering grocery delivery online. For another example, the merchant store may receive an indication of redeem the offer "10% OFF grocery delivery" when the consumer proceeds at check-out by providing his wallet information, and the merchant may redeem the offer by applying the discount for the consumer.

In one implementation, the MCB-Platform 120 may update the transaction record 268, recording information such as, but not limited to consumer information, product information, transaction time, transaction amount, offer redeemed, and/or the like.

Figure 2D:
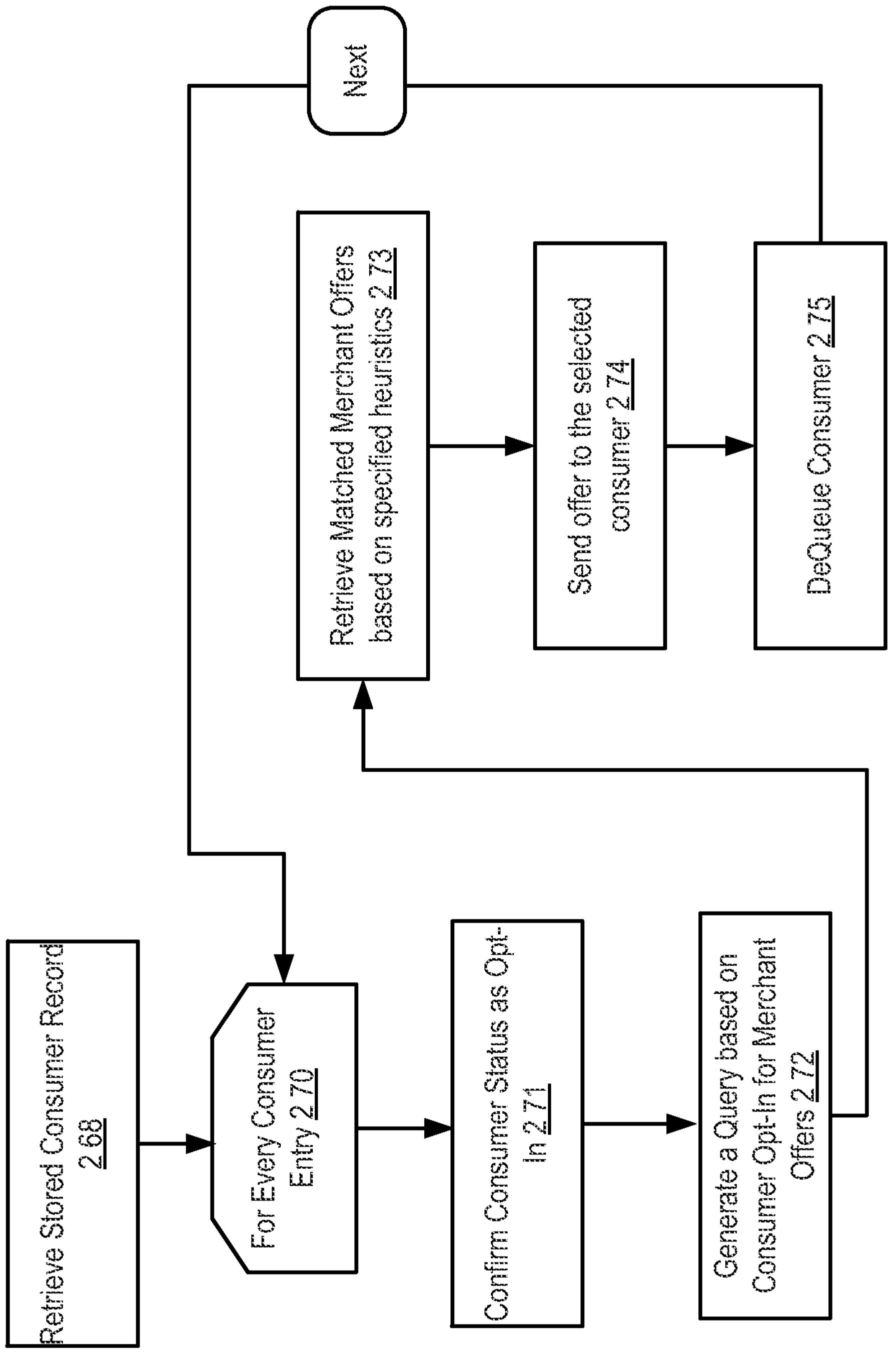

FIG. 2D provides a logic flow 200*d* illustrating matching offers for consumers within one embodiment of the MCB-Platform. In one embodiment, the MCB-Platform may retrieve a stored record of consumers 268. For each consumer entry 270, the MCB-Platform may confirm the consumer status as opt-in 271, e.g., the consumer is actively engaged in opt-in activities such as, but not limited to online purchase, POS sales with a credit card, and/or the like. The MCB-Platform may then generate a query based on the consumer opt-in information to match merchant offers 272. In one implementation, the MCB-Platform may extract information indicative of consumer preferences from the consumer opt-in information. For example, if a consumer's opt-in activities reflect a pattern of shopping for organic grocery products, the MCB-Platform may store this consumer preference information and match merchant offers related to organic products for the consumer.

In one implementation, the MCB-Platform may retrieve matched merchant offers based on specified heuristics 273. For example, the list of matched merchant offers may be sorted by the top sponsored merchants. For another example, the list of matched offers may be sorted by relevance.

In one implementation, the MCB-Platform may send the list of matched offers to the selected consumer 274, such as, but not limited to emails, SMS, customer service calls, and/or the like. The MCB-Platform may then de-queue the consumer entry, and proceed with the next consumer entry in the consumer record.

In one implementation, the MCB-Platform may update the matched offers for each consumers periodically, e.g., on a daily basis, and/or the like.

Figure 2E:
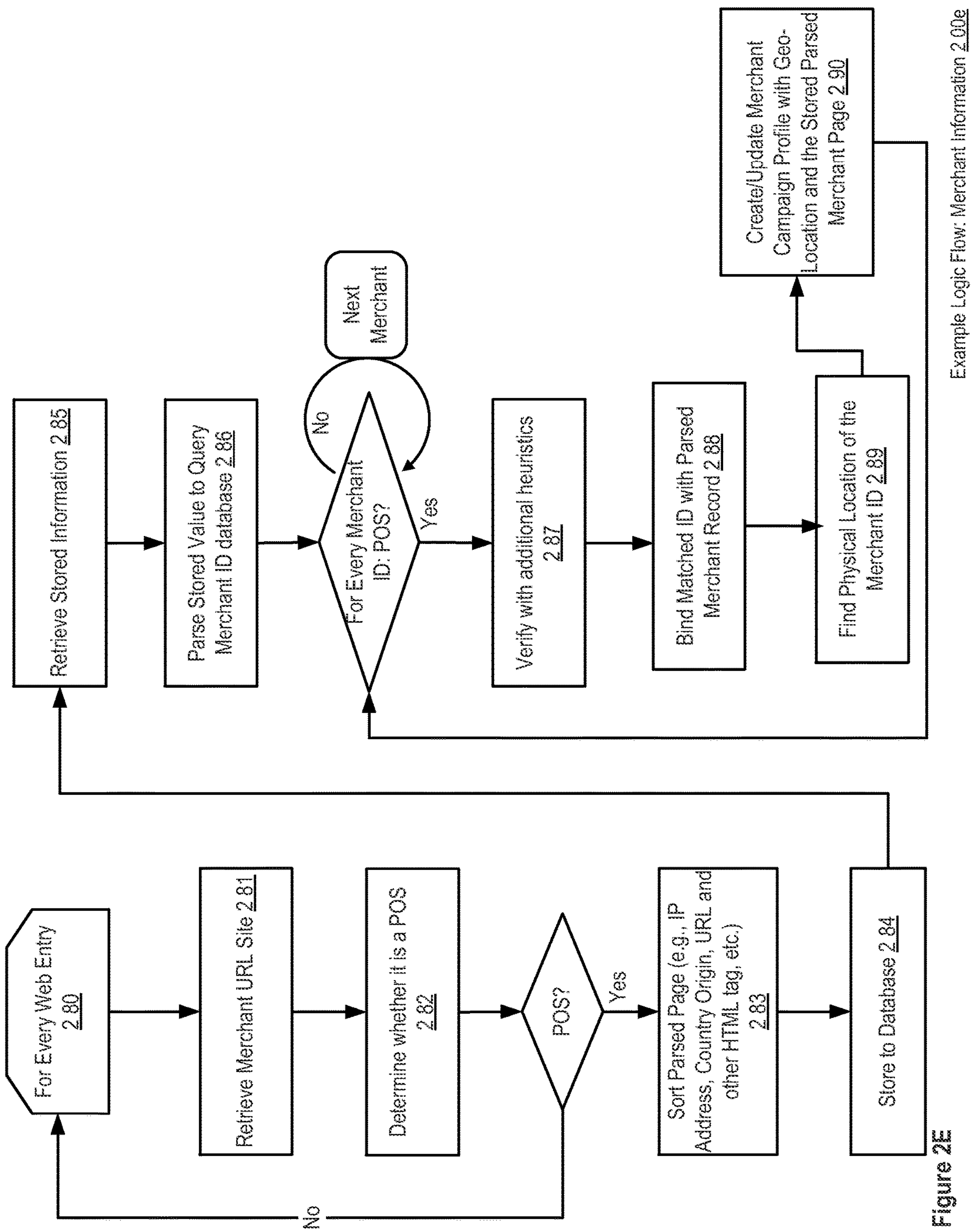

FIG. 2E provides a logic flow 200*e* illustrating alternative embodiments of the MCB-Platform. In one embodiment, the MCB-Platform may visit every merchant site entry 280 stored in the database 280, and retrieve an associated merchant URL site 281. The MCB-Platform may then determine whether there is a MCB-Platform service enabled POS terminal associated with the merchant 282. For example, a merchant entry may be a solely online shopping site without a physical store, which does not have a POS terminal. In that case, the MCB-Platform may proceed with the next merchant entry.

If there is a POS terminal associated with the merchant, the MCB-Platform may parse the merchant URL page and extract information such as, but not limited to IP address, country origin, title, and other HTML tags 283, and store the parsed information into a merchant database 284.

In one implementation, the MCB-Platform may retrieve stored information 285 for merchant offer matching. The MCB-Platform may parse the stored values to query the merchant ID database 286. For example, for a shopping website selling brand shoes, the MCB-Platform may parse information from the webpage such as the brand names, the shoe type names, and/or the like, and form a query to find merchant stores that carry the shoes.

In one implementation, upon obtaining a list of merchant stores from the query, the MCB-Platform may determine whether there is a MCB-Platform service enabled POS associated with each merchant ID. If not, the MCB-Platform may proceed with the next merchant ID. If yes, the merchant may verify additional heuristics 287, such as, but not limited to whether the merchant is a top sponsor of MCB-Platform, whether the merchant is the most relevant, and/or the like.

In one implementation, the MCB-Platform may bind the matched merchant ID with parsed merchant webpage record 288, and retrieve geographic information associated with the merchant ID 289.

In a further implementation, the MCB-Platform may create and/or update a merchant campaign profile with the geo-location of a merchant store and the stored parsed merchant page 290. For example, for a merchant brand "GAP," the MCB-Platform may associate its campaign program profile with the queried geo-locations of merchant stores, such as "GAP" stores, department stores that carries "GAP" products, and/or the like, and the parsed information from "www.gap.com".

In a further implementation, the MCB-Platform may devise merchant campaign programs based on consumer opt-in activities heuristics. For example, the MCB-Platform may send individual in-store coupons to a consumer for the merchant "GAP" at a fixed "GAP" store, if the consumer opt-in activities show a regular purchasing pattern at the fixed "GAP" store location.

FIG. 3A provides a block diagram illustrating consumer merchant checkout stack 300*a* within embodiments of the MCB-Platform. Within implementations, a merchant 310 POS terminal and a consumer 302 may operate a variety of devices (e.g., 310.1-310.4) for payment transactions via different protocols 303.

For example, in one implementation, an employee checkout terminal 310.1 (e.g., with an electronic cash register, etc.) may be installed with the merchant 310, e.g., connected via analog dial or IP. If the merchant 310 is with no NFC reader, it may receive payment information from the consumer 302 by reading a magnetic strip card 302.1. In one implementation, the employee checkout terminal 310.1 may be connected to a payment network via TC40 303*a*.

In another implementation, the merchant 310 may employ a self-checkout terminal 310.2 which may comprise a NFC component to receive payment information from NFC handshake 303*b*, e.g., from a RFID card 302.2, etc. The POS terminal 310.2 may be equipped with radio component, such as NFC-296/896 Antenna Tuning Unit (ATU), and/or the like).

In another implementation, the merchant 310 may employ feature phone checkout terminal 310.4. For example, a store employee may operate a feature phone to checkout consumer's purchases. In one implementation, the consumer may operate a feature phone 302.4 to checkout, which may send and receive SMS via a cellular network from the merchant feature phone 310.4. In further implementations, the feature phone may be equipped with a card reader plug-in 307*a*, and/or a NFC 307*b* component, e.g., the feature phone PANDA N1, etc., so that the consumer's magnetic card 302.1 and RFID card 302.2 may be read by the feature phone terminal 310.4, or the consumer feature phone 302.4. Within implementations, the feature phone checkout may be operated via cellular communication networks, TON, audio phone communication 303*c*, and/or the like.

In another implementation, the merchant 310 may employ a smartphone checkout terminal 310.3. For example, a store employee may operate a smart phone 310.3 to checkout consumer's purchases. For another example, the consumer 302 may operate a smartphone 302.3 which has an electronic wallet application for checkout. For example, to checkout, SMS messages including transaction request and authorization code may be exchanged between merchant and consumer phones via a cellular network. In further implementations, the feature phone may be equipped with a card reader plug-in 307*a* (e.g., Square card reader accessory, etc.), and/or a NFC 307*b* component, etc., so that the consumer's magnetic card 302.1 and RFID card 302.2 may be read by the smartphone terminal 310.*e*, or the consumer's smartphone 302.3. Within implementations, the smartphone checkout may be operated cellular communication networks, TCP/IP, Bluetooth, GPS, audio phone communication, video/image capturing, accelerometer 303*d*, and/or the like. For another example, the consumer 302 may snap a photo of the barcode of the purchased item (and/or a generated QR code generated at the terminal) with the smartphone 302.3, which may transmit an image of the barcode or the QR code to a processing network. In another implementation, instead of operating smartphones 310.3 as barcode readers, the POS terminal may be equipped with barcode readers, such as, but not limited to Unitech All Terminals Ms146i-3ps2g Ms146 Barcode Slot Reader Ps2 Conn Infrared Ip54 Std, Intel IMAGETEAM 3800LR Bar Code Reader, and/or the like.

In one implementation, a merchant may be equipped with a mobile phone as an acceptance device, but may not require two phones to tap or connect via blue tooth, wifi, or NFC in order to connect to each other to allow flexible usage of mobile checkout with different types of mobile phones and smartphones. In one implementation, the consumer device and merchant mobile terminal may be connected via WAP or data connections that would facilitate a connection to the MCB-Platform server via USSD or IP.

Within implementations, a variety of consumer merchant checkout formats discussed at 300*a* may further facilitate data collection such as, but not limited to web claws, merchant statistics, dollar ranges of merchant products, card history, and/or the like. Such data collection is further discussed in FIG. 6A.

FIG. 3B provides a data flow diagram illustrating transaction at merchant POS within implementations of the MCB-Platform. Within implementations, the consumer 302 may initiate a transaction by submitting his wallet information 304 to a merchant terminal. For example, in one implementation, the consumer wallet 303 may comprise any of the consumer payment devices 302.1-302.4 discussed in FIG. 3A, wherein the merchant 110 may comprise a barcode NFC plate beacon 310*a* at the electronic cash register (ECR) 310*b*. For example, the NFC enabled POS 310*a* may receive information from a payment card with a RFID and obtain wallet information 304. In one implementation, the wallet information message 304 may take a form similar to 207 in FIG. 2A.

In one implementation, the NFC enabled POS 310*a* may send a pre-check request 306 to the MCB-Platform server 302, e.g., to check whether the merchant has participated with MCB-Platform services. For example, POS 310*a* may generate a HTTPS POST message to make a merchant eligibility pre-check including the merchant information in the form of data formatted according to the XML. Below is an example HTTP(S) POST message including an XML-formatted pre-check request message 306 for the MCB-Platform server:

```
POST /PreCheckRequst.php HTTP/1.1
Host: 206.205.82.130
Content-Type: Application/XML
Content-Length: 418
<?XML version = "1.0" encoding = "UTF-8"?>
<PreCheckRequest>
<Time> 12:30:30 </Time>
<Date> 10-10-2015 </Date>
<MerchantID> STBUX </MerchantID>
<MerchantName> StarBucks </MerchantName>
<TerminalID> ST0001 </TerminalID>
<Location> 1332 Dream Street </Location>
<Zipcode> 00000 </Zipcode>
<TransactionType> MCB-Platform transaction </TransactionType>
...
</PreCheckRequest>
```

In the above example, the pre-check message 306 include information as to check whether the merchant has registered to participate in a MCB-Platform transaction, e.g., a transaction using MCB-Platform issued wallet, a merchant offer bridging transaction, and/or the like.

In one implementation, the MCB-Platform may query on a merchant database 319 based on a merchant ID to determine whether the requesting merchant has enrolled. If yes, the MCB-Platform may retrieve previously stored merchant information 308 (e.g., see also 260 in FIG. 2A) from the merchant database 319.

Once the pre-check eligibility has been established, a cashier 305 may enter a sale request 309 at the ECR 310*b*, including a payment amount 311. For example, the payment amount may be told by the cashier to the consumer 302. For another example, the payment amount may be sent to the consumer's mobile wallet via SMS, as further discussed in FIG. 4B. For another example, a QR code may be generated at the ECR 310*b*, wherein the consumer may operate his mobile wallet to snap a picture of the QR code to obtain the payment amount 311.

In one implementation, the consumer may confirm the payment amount, and the POS 310*a* may then generate a payment request 312 to the MCB-Platform server 320. For example, POS 310*a* may generate a HTTPS POST message to make a transaction payment request including the purchasing information and consumer account information in the form of data formatted according to the XML. Below is an example HTTP(S) POST message including an XML-formatted payment request message 312 for the MCB-Platform server:

```
POST /PaymentRequst.php HTTP/1.1
Host: 206.205.82.130
Content-Type: Application/XML
```

-continued

```
Content-Length: 418
<?XML version = "1.0" encoding = "UTF-8"?>
<Paymentequest>
<Time> 12:30:30 </Time>
<Date> 10-10-2015 </Date>
<MerchantID> STBUX </MerchantID>
<MerchantName> StarBucks </MerchantName>
<MerchantAddres> 1400 Dream St </MerchantADdress>
<Zipcode> 00000 </Zipcode>
<TerminalID> ST0001 </TerminalID>
<Location> 1332 Dream Street </Location>
<Zipcode> 00000 </Zipcode>
<PurchaseItem>
    <ItemID> 000909090 </ItemID>
    <ItemName> Coffee-001 </ItemName>
    <Price> $4.00 </Price>
    <Tax> $0.20 </Tax>
    <Total> $4.20 </Total>
    ...
</PurchaseItem>
<Payment>
    <CardNumber> 0000 0000 0000 0000 </CardNumber>
    <CVV> 000 </CVV>
    <ExpirationDate> 12-2020 </ExpirationDate>
    <CardType> Visa </CardType>
    <BIN> 000000 </BIN>
    <BankRouting> 0000000000 </BankRouting>
    ...
</Payment>
...
</PaymentRequest>
```

In one implementation, the MCB-Platform server 320 may verify the received payment request information 312 with the retrieved merchant information 308, e.g., to avoid fraudulent transaction requests, etc. If there is any inconsistency, e.g., the merchant address in 312 differs from that in 308 (see also FIG. 1C), the MCB-Platform may generate a confidence inquiry 324 to a scoring component 315 to determine how confident it is that the received transaction request 312 is accurate. For example, the MCB-Platform server 320 may generate a HTTPS POST message to make a confidence inquiry 324 including the received transaction request information and the inconsistent information portion in the form of data formatted according to the XML. Below is an example HTTP(S) POST message including an XML-formatted confidence inquiry message 324 for the MCB-Platform server:

```
POST /confidenceinquiry.php HTTP/1.1
Host: www.MCB-platform.com
Content-Type: Application/XML
Content-Length: 418
<?XML version = "1.0" encoding = "UTF-8"?>
<ConfidenceInquiry>
<Time> 12:31:02 </Time>
<Date> 10-10-2015 </Date>
<Merchant>
    <MerchantID> STBUX </MerchantID>
    <MerchantName> StarBucks </MerchantName>
    <MerchantAddres> 1400 Dream St </MerchantADdress>
    <Zipcode> 00000 </Zipcode>
    <TerminalID> ST0001 </TerminalID>
    <Location> 1332 Dream Street </Location>
    <Zipcode> 00000 </Zipcode>
    ...
</Merchant>
<ActivityType> Transaction Payment </ActivityType>
<InconsisntInfo>
    <DataField> Merchant Addres </DataField>
    <Received> 1332 Dream Street </Received>
    <Stored> 1400 Dream Street </Stored>
    ...
```

-continued

```
    </InconsistentInfo>
    <Consumer>
        <ID> JS 000 </Consumer>
        <Name> John Smith </Name>
        <WalletID> JSW001 </WalletID>
        ...
    </Consumer>
    ...
    </ConfidenceInquiry>
```

In the above example, the confidence inquiry message 324 provide merchant information associated with the request activity, consumer information, and an activity type as "transaction payment." The MCB-Platform scoring component 315 may determine how confident they are with the inconsistent new merchant information based on a variety of information, such as, but not limited to web claws 325 from Internet web 325 (e.g., news articles, merchant websites, etc.), consumer inputs 322 (e.g., consumer social media activities showing interactions of the merchant, purchasing history in the wallet, etc.), merchant updates, and/or the like. For example, one indicator for the confidence determination would be whether similar inconsistent information included in the payment request 312 (e.g., the address change as reflected in the above example) has been shown in additional information inputs such as 322-323.

Further implementations of the scoring component are discussed in FIGS. 6A-6E and 19A-19F. For example, the MCB-platform may provide inputs to the scoring component such as but not limited to account history, account purchasing, TCP/IP address, yak-tech paring, Internet claw, social media activities, accelerometer information (e.g., provided in the protocols in FIG. 3A in the stack). In one implementation, the scoring component may be used to assign the confidence value in updating merchant information in MCB-Platform. For example, the scoring component (or the centralized personal information platform in FIGS. 18-37) may perform analytics of the obtained data, and generate and constantly update a confidence level of a piece of merchant information updates based on the most updated data inputs. Further implementations of the scoring component 315 are provided in FIGS. 6A-6E.

In one implementation, the MCB-Platform scoring component 315 may generate a confidence decision 326 to the MCB-Platform server 320 indicating whether the transaction may be processed in light of the inconsistent merchant information. For example, the MCB-Platform scoring component 315 may generate a HTTPS POST message to inform the confidence decision 326 in the form of data formatted according to the XML. Below is an example HTTP(S) POST message including an XML-formatted confidence decision message 326 for the MCB-Platform server:

```
    POST /confidencedecision.php HTTP/1.1
    Host: www.scoring.com
    Content-Type: Application/XML
    Content-Length: 418
    <?XML version = "1.0" encoding = "UTF-8"?>
    <ConfidenceDecision>
    <Time> 12:31:33 </Time>
    <Date> 10-10-2015 </Date>
    <Merchant>
        <MerchantID> STBUX </MerchantID>
        <MerchantName> StarBucks </MerchantName>
        <MerchantAddres> 1400 Dream St </MerchantADdress>
        <Zipcode> 00000 </Zipcode>
        <TerminalID> ST0001 </TerminalID>
        <Location> 1332 Dream Street </Location>
        <Zipcode> 00000 </Zipcode>
        ...
    </Merchant>
    <InconsisntInfo>
        <DataField> Merchant Addres </DataField>
        <Received> 1332 Dream Street </Received>
        <Stored> 1400 Dream Street </Stored>
        ...
    </InconsistentInfo>
    <ActivityType> Transaction Payment </ActivityType>
    <ActivityThreshold> 0.50 </ActivityThreshold>
    <InfoScore> 0.55 </InfoScore>
    <ActivityStatus> Allowed </ActivityStatus>
    <RequestedAction> DB update </RequestedAction>
    ...
    </ConfidenceDecision>
```

In the above example, the confidence decision indicates the confidence score of the requested payment transaction in 312 has met the threshold requirement. Therefore, the MCB-Platform may approve the transaction and update the merchant database. In one implementation, a processing request 313 may be sent to the financial network 330 (e.g., the payment account's associated bank, etc.) for processing. For example, the MCB-Platform 320 may generate a HTTPS POST message to request financial processing in the form of data formatted according to the XML. Below is an example HTTP(S) POST message including an XML-formatted processing request message 326 for the financial network 330:

```
    POST /processingrequest.php HTTP/1.1
    Host: www.MCB-Platform.com
    Content-Type: Application/XML
    Content-Length: 418
    <?XML version = "1.0" encoding = "UTF-8"?>
    <processingrequest>
    <Time> 12:31:57 </Time>
    <Date> 10-10-2015 </Date>
    <Merchant>
        <MerchantID> STBUX </MerchantID>
        <MerchantName> StarBucks </MerchantName>
        <MerchantAddres> 1400 Dream St </MerchantADdress>
        <Zipcode> 00000 </Zipcode>
        <TerminalID> ST0001 </TerminalID>
        <Location> 1332 Dream Street </Location>
        <Zipcode> 00000 </Zipcode>
        ...
    </Merchant>
    <PurchaseItem>
        <ItemID> 000909090 </ItemID>
        <ItemName> Coffee-001 </ItemName>
        <Price> $4.00 </Price>
        <Tax> $0.20 </Tax>
        <Total> $4.20 </Total>
        ...
    </PurchaseItem>
    <Payment>
        <CardNumber> 0000 0000 0000 0000 </CardNumber>
        <CVV> 000 </CVV>
        <ExpirationDate> 12-2020 </ExpirationDate>
        <CardType> Visa </CardType>
        <BIN> 000000 </BIN>
        <BankRouting> 0000000000 </BankRouting>
        <BankName> Bank of America </BankName>
        ...
    </Payment>
    ...
    </ProcessingRequest>
```

For another example, the processing request message 326 may take a form similar to the Visa Single Message System (SMS) format, Visa Original Credit Transaction (OCT) format, and/or the like.

In one implementation, upon the transaction has been processed at the financial network, an approval message 316*a* may be sent to the merchant 310 through an acquirer 340. For example, the acquirer may facilitate routing the approval message 316*b* to the merchant terminal 310*b*. In another implementation, the approval notice 315 may be sent to the consumer via his electronic wallet 303, e.g., email, instant messages, SMS, and/or the like. For example, the MCB-Platform 320 may generate a HTTPS POST message to notify approval of the transaction in the form of data formatted according to the XML. Below is an example HTTP(S) POST message including an XML-formatted transaction approval message 315 for the consumer (and/or the merchant):

```
POST /approval.php HTTP/1.1
Host: www.MCB-Platform.com
Content-Type: Application/XML
Content-Length: 418
<?XML version = "1.0" encoding = "UTF-8"?>
<approval>
<Time> 12:32:02 </Time>
<Date> 10-10-2015 </Date>
<Consumer>
    <WalletID> JSW001 </WalletID>
    <Name> John Smith </Name>
    <PhoneNumber> 000-000-0000 </PhoneNumber>
    ...
</Consumer>
<Merchant>
    <MerchantID> STBUX </MerchantID>
    <MerchantName> StarBucks </MerchantName>
    <MerchantAddres> 1400 Dream St </MerchantADdress>
    <Zipcode> 00000 </Zipcode>
    <TerminalID> ST0001 </TerminalID>
    <Location> 1332 Dream Street </Location>
    <Zipcode> 00000 </Zipcode>
    ...
</Merchant>
<PurchaseItem>
    <ItemID> 000909090 </ItemID>
    <ItemName> Coffee-001 </ItemName>
    <Price> $4.00 </Price>
    <Tax> $0.20 </Tax>
    <Total> $4.20 </Total>
    ...
</PurchaseItem>
<Payment>
    <CardNumber> ********** 0000 </CardNumber>
    ...
</Payment>
<TransactionStatus> Complete </TransactionStatus>
...
</Approval>
```

FIG. 3C provides a logic flow diagram illustrating transaction at merchant POS within implementations of the MCB-Platform. Within embodiments, the consumer 302 may submit consumer wallet information 335 (e.g., see 304 in FIG. 3B) at a merchant POS terminal 310, which may establish the wallet is at the merchant and submit a pre-check request 338 (e.g., see 306 in FIG. 3B). For example, in one implementation, the consumer may confirm his presence at the merchant store with a cashier. In another implementation, the consumer's electronic wallet (e.g., on a smartphone) may transmit his GPS coordinates to the MCB-Platform to confirm the consumer's location.

In one implementation, the merchant may send the pre-check request to confirm the merchant is an enrolled acceptor via NFC handshake, bar code read or merchant beacon, and/or the like.

Upon receiving the pre-check request, the MCB-Platform may form a query in a merchant database 340. If the merchant 310 is not an eligible participating member 343, the merchant 310 may receive a denial 345 at the terminal, e.g., a notice at the terminal that "wallet not acceptable," etc. Alternatively, if the merchant is eligible, the merchant may initiate the wallet payment at its ECR 346. For example, a cashier may selects a wallet payment button (e.g., a "Visa V" button, a "V.me" button, etc, on a touch screen panel) on ECR/terminal so it is prepared to record the sale.

In one implementation, the cashier may inform the consumer of the amount. In another implementation, the MCB-Platform may provide offers that may be redeemable for the purchase to the consumer via the consumer's wallet, or via the merchant terminal, and/or the like. For example, when the MCB-Platform receives purchase information of an Toshiba product at BestBuy, the MCB-Platform may query its offer database and provide a "5% off Any Toshiba Laptop" offer to the consumer or the POS terminal at BestBuy. The purchase price may then be calculated to reflect redemption of the offer. Further implementations of offer matching are discussed in FIGS. 2C-2D.

In one implementation, the consumer may enter amount in wallet, select payment type and authenticate themselves 348 by entering wallet password (e.g., by login onto his mobile wallet, by entering a password at the POS terminal, etc.).

In one implementation, the MCB-Platform may verify merchant accepts payment type, apply merchant offers, discounts, loyalty calculations, confirm ability to pay (issuer approval) and initiate merchant payment to send an approval code (e.g., see 315 in FIG. 3B) to wallet 350. In another implementation, the MCB-Platform may perform consumer/merchant confidence level verification 352 to determine whether the transaction may be authorized, as discussed at 324 in FIG. 3B.

In one implementation, the MCB-Platform may send the transaction to a financial network 330 for processing 353, e.g., to deduct funds from the consumer's account and credit the funds to the merchant's account. Upon authorizing the transaction, the MCB-Platform may send an approval (e.g., see 316*a/b* in FIG. 3B) to the merchant via acquirer 355, and then the merchant may "close ticket" (e.g., the transaction payment session, etc.) with a final paid amount, with identified discounts on receipt/in system. Such approval may be used to pay the merchant when the wallet account manager created an authorization response for the transaction, e.g., a receipt 365 to the consumer's wallet in the form of SMS, print by merchant, etc.

In alternative embodiments, e.g., at 338, the merchant may establish that the wallet is at the merchant via NFC handshake (e.g., Paveway, etc.), and the consumer wallet may receive a requested purchase amount from ECR. In such scenarios, the merchant ECR/POS may associate the consumer's wallet ID with an "open ticket" (e.g., the wallet information has been reserved for subsequent payment).

Figure 4A:
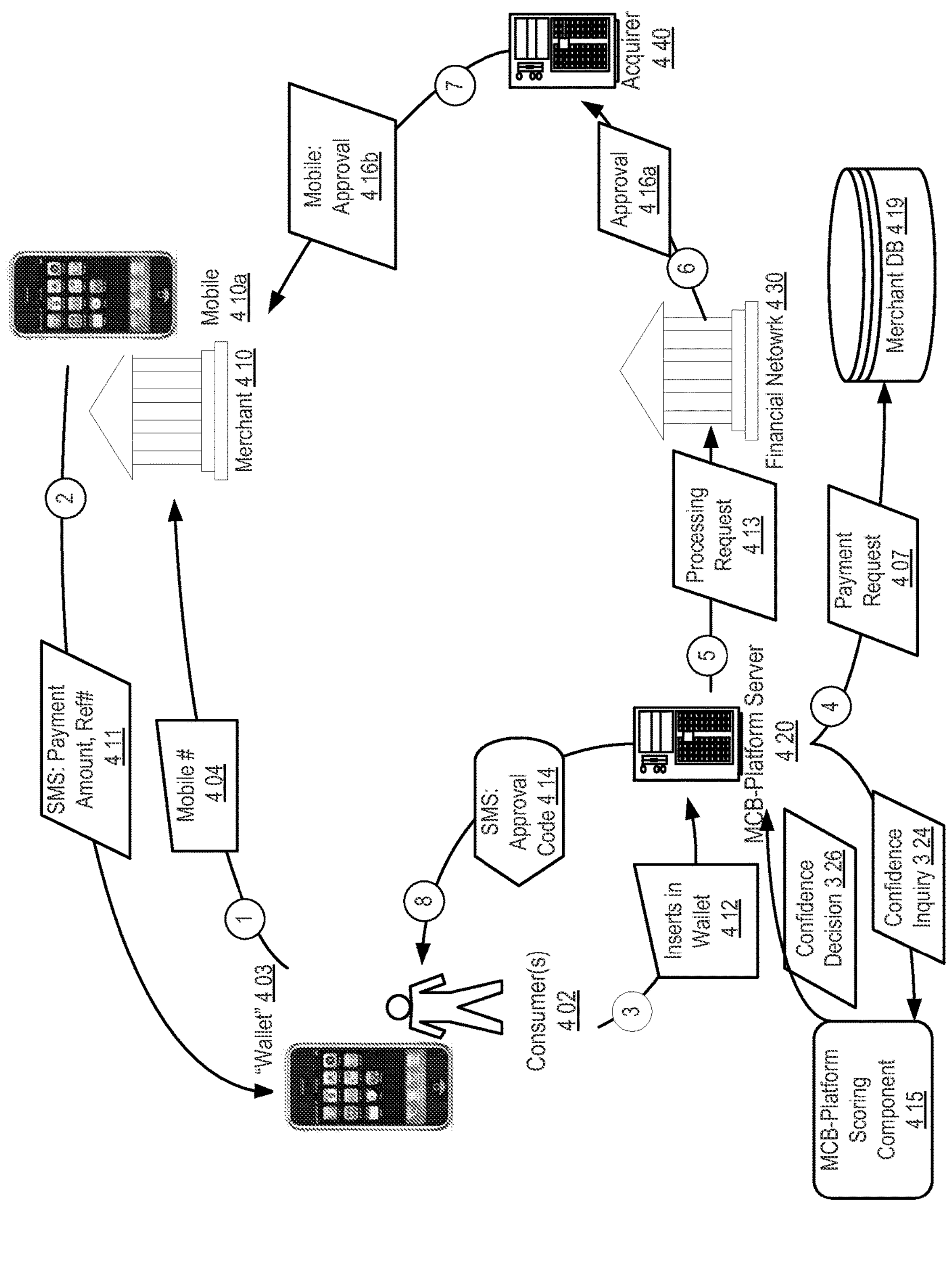
FIGS. 4A-4B provide a data flow and a logic flow diagram illustrating mobile to mobile checkout within implementations of the MCB-Platform.

FIG. 4A provides a data flow diagram illustrating a mobile to mobile POS checkout within implementations of the MCB-Platform. As show in FIG. 3A, the merchant POS terminal may comprise a smartphone terminal 310.3, which may be enabled with SMS for communication with consumer mobile wallets 320.3. For example, the MCB-Platform may connect a consumer wallet phone to the merchant checkout terminal, e.g., with a merchant operating a SQUARE® accessory and/or a mobile acceptance app, and/or the like. In one implementation, the merchant with mobile checkout may type where payment amount is final, which is equivalent of "pairing" two devices, e.g., the merchant smartphone and consumer smartphone. In one implementation, the MCB-Platform may determine the final payment amount if redemptions and rewards are factored in.

In one implementation, the consumer 402 may submit a mobile phone number 404 to the merchant terminal 410 which operates a mobile phone 410*a*. For example, the consumer may tell the mobile number to a cashier. For another example, the consumer may instantiate his wallet application 403 which may capture the consumer's mobile number and send it to the merchant mobile phone 410*a*, e.g., via SMS.

The merchant may then generate a payment request summary message to the consumer via SMS including a payment amount, a reference number and/or the like 411. For example, in one implementation, the SMS 411 may take a form similar to the following:

From: 140
Time: 12:30:23
Date: Sep. 9, 2014
Content: $4.25 $$REF: d09dsffsfsade

The consumer may then inserts the amount and the reference number in the SMS to his mobile wallet 412. For example, the mobile wallet may comprise an entry for extracting payment amount and reference number obtained via SMS. The MCB-Platform may then generate a payment request 407 to the merchant database, and perform confidence authorization to proceed the transaction via the scoring component 415, in a similar manner as discussed at 324 and 326 in FIG. 3B.

In one implementation, the MCB-Platform may generate a processing request 413 to the financial network 430, which may take a form similar to 313 in FIG. 3B. Accordingly, a transaction approval 416*a/b* may be sent to the merchant via the acquirer 440.

In another implementation, the approval 414 may be sent to the consumer via SMS. For example, in one implementation, the SMS 414 may take a form similar to the following:

From: Wallet
Time: 12:30:45
Date: Sep. 9, 2014
Content: Your purchase has been approved! APPROVAL CODE #FDF&FSFDSF094

Figure 4B:
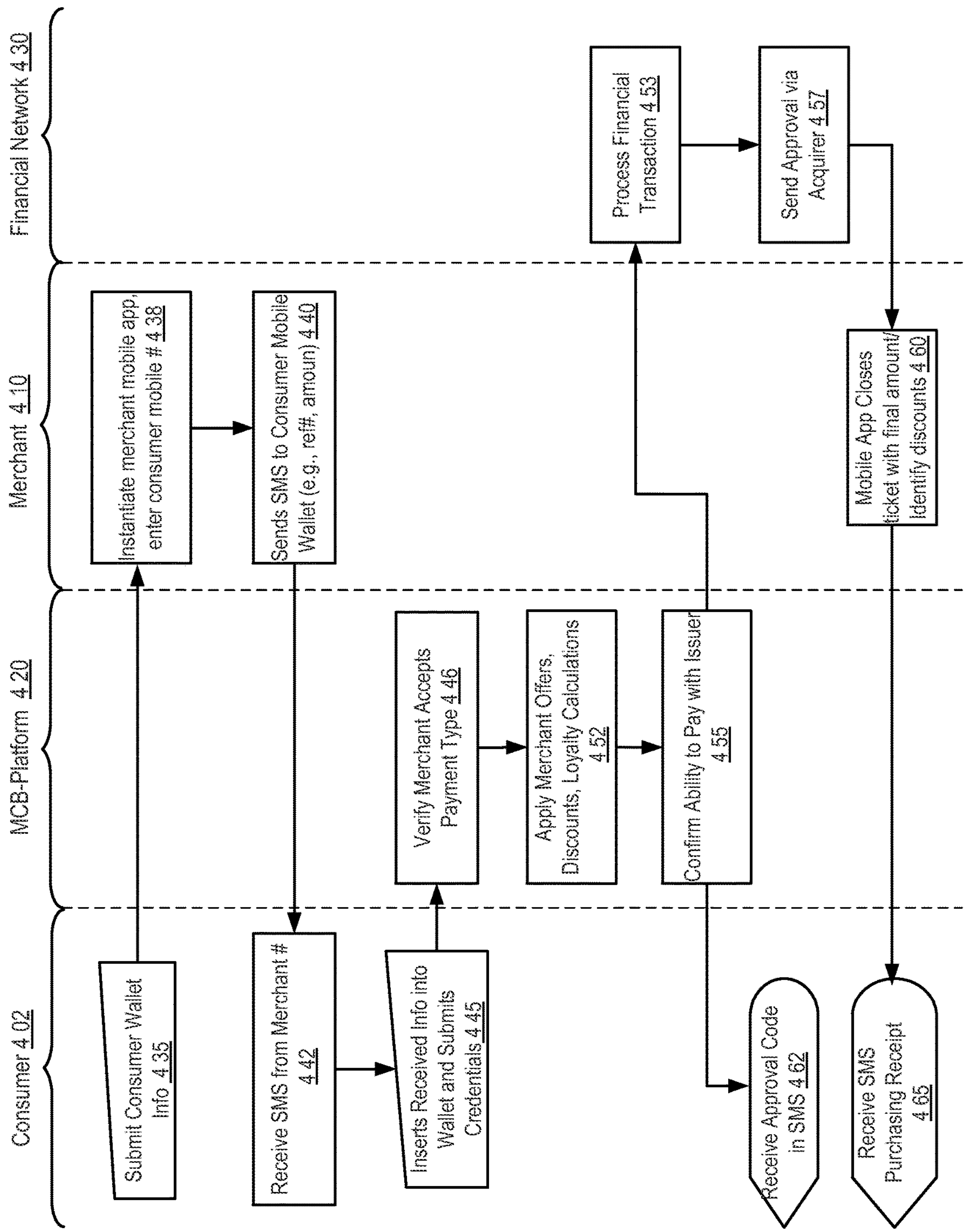

FIG. 4B provides a logic flow diagram illustrating a mobile to mobile POS checkout within implementations of the MCB-Platform. In one implementation, the consumer may submit consumer wallet information 435, e.g., by providing a mobile phone number. The merchant may instantiate the merchant mobile app, which has an open ticket, e.g., a V.me mobile app, etc., and enter the consumers mobile number 438.

In one implementation, the merchant may send a SMS (e.g., 411 in FIG. 4A) to the consumer's mobile wallet via the merchant mobile application on a mobile phone 440. SMS contains merchant app generated reference number and a payment amount. In such manner, there is no NFC needed or proxy "card" to swipe.

Within implementations, consumer may receive the SMS with amount from merchant number (e.g., a proxy for merchant ID), inserts securely to his mobile wallet, and submit consumer authentication credentials 445 to the MCB-Platform.

Within implementations, the MCB-Platform may verify merchant accepts payment type selected 446, and then apply merchant offers, discounts, loyalty calculations 452. The MCB-Platform may then confirm ability to pay (issuer approval on the available funds in the account, e.g., credit limit, funds in a debit account, etc.) 455 and process the financial transaction 453 with the financial network.

In one implementation, the consumer may receive an approval message at his wallet, e.g., via SMS 455 (see 414 in FIG. 4A).

Within implementations, the MCB-Platform may send approval to merchant via acquirer 457, which may require insertion of acquirer merchant ID based on the mobile number proxy. Within implementations, the approval message may be used to pay the merchant when the wallet account manager created the "auth response," e.g., receipt to consumer wallet, SMS, print receipt at the terminal, etc.

Within implementations, merchant mobile checkout app may close ticket (e.g., app authenticates incoming confirmation with reference number sent in SMS and merchant ID), with final amount, identifies discounts 460 on virtual receipt/in system. The consumer may receive a purchase receipt via SMS 465.

In further implementations, interacting with the wallet in real time at the POS may provide real time rewards, redemptions and offers to the consumer 402. The offer matching to the consumer may be performed in a similar manner as discussed in FIGS. 2C-2E.

Figure 5A:
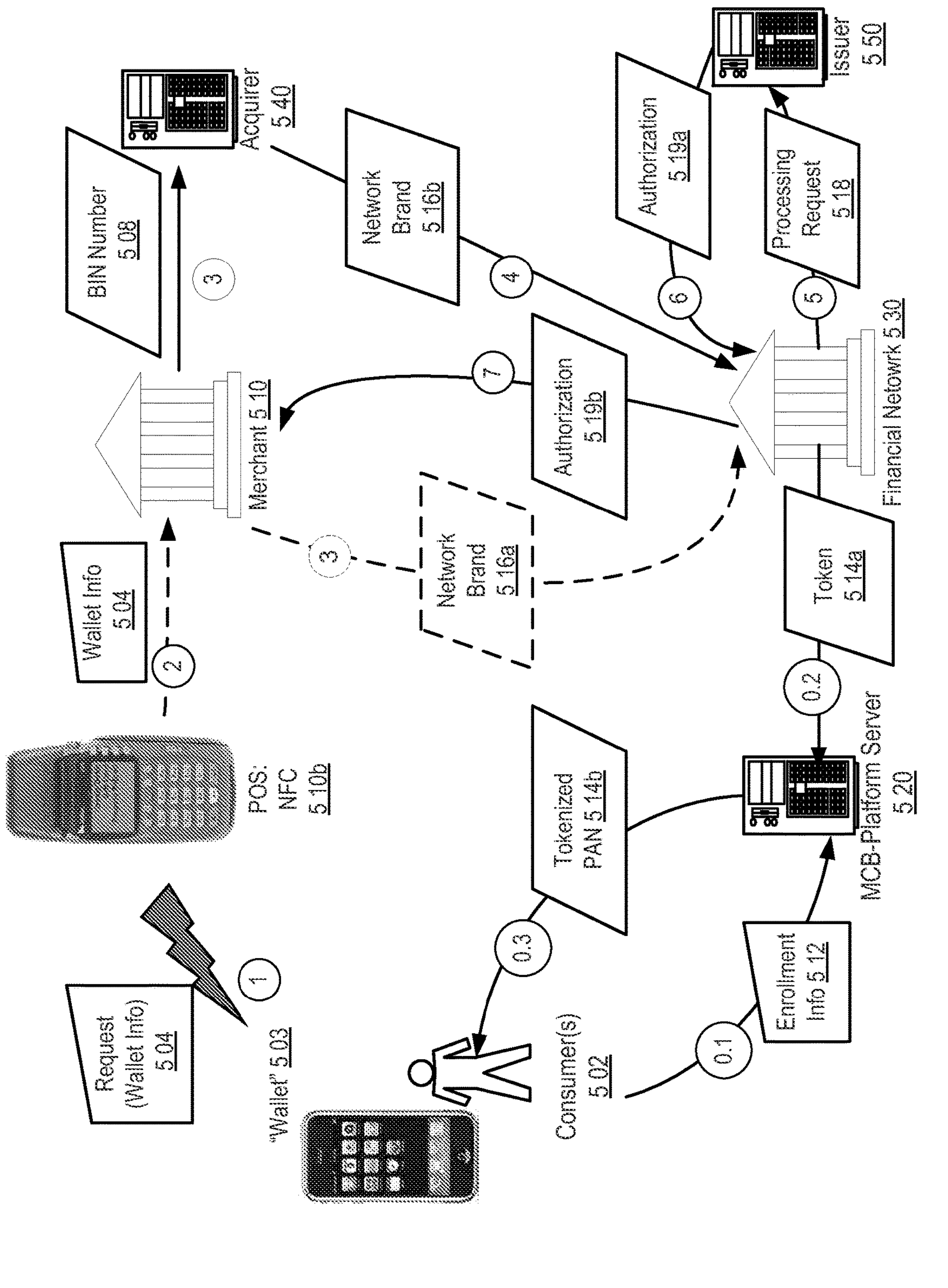
FIGS. 5A-5B provide a data flow and a logic flow diagram illustrating card enrollment tokenization within implementations of the MCB-Platform.

FIG. 5A provides a data flow diagram illustrating wallet enrollment tokenization within implementations of the MCB-Platform. Within implementations, a consumer may desire to add an account to his electronic wallet, e.g., by linking his bank account to his wallet, by adding a payment entry to his mobile wallet, etc. In one implementation, the consumer may submit enrollment information 512 to the MCB-Platform server (e.g., a wallet management unit, etc.). For example, the consumer 502 may call a MCB-Platform representative to add a card to his wallet. In another implementation, the consumer 502 may add an account via a web based UI (e.g., see FIGS. 8A-8B). For example, the consumer wallet 503 application may generate a HTTPS POST message to enroll an account in the form of data formatted according to the XML. Below is an example HTTP(S) POST message including an XML-formatted card enrollment message 512 for the MCB-Platform:

```
POST /CardEnrollment.php HTTP/1.1
Host: 206.205.82.130
Content-Type: Application/XML
Content-Length: 418
<?XML version = "1.0" encoding = "UTF-8"?>
<CardEnrollment>
<Time> 12:32:02 </Time>
<Date> 10-10-2015 </Date>
<Consumer>
    <WalletID> JSW001 </WalletID>
    <Name> John Smith </Name>
    <PhoneNumber> 000-000-0000 </PhoneNumber>
    ...
</Consumer>
<NewCard>
    <CardNumber> ********** 0000 </CardNumber>
    <CardHolderName> John Smith </CardholderName>
    <CardType> Visa </CardType>
    <ExpirationDate> 11/2018 </ExpirationDate>
    <CVV> 000 </CVV>
    <BankID> BOA </BankID>
    <BankName> Bank of America </BankName>
    <BankRouting> 0000000 </Bankrouting>
    <BIN> 00000001 </BIN>
    ...
</NewCard>
...
</CardEnrollment>
```

In one implementation, the MCB-Platform server 520 may require the card to be compliant with regulatory acts, e.g., the Durbin Amendment, etc. In one implementation, the financial network 530 (e.g., the card's issuing bank) may provide a token 514*a*, which may be converted a tokenized PAN number 514*b* for the consumer wallet 503. In one implementation, the card information is replaced with the tokenized PAN 514*b* that preserves the BIN so as not to impede merchant routing choice at the POS terminals. For example, the tokenized PAN 514*b* may comprise an integer value.

In one implementation, the consumer 502 may initiate a transaction by submitting wallet information 504 (e.g., see 304 in FIG. 3B, 404 in FIG. 4A) to a NFC enabled POS terminal 510*b*, which may be forwarded to the merchant 510. In one implementation, the merchant may determine a issuer network 516 and route the transaction request to the financial network 530 based o the issuer network indication 516.

Alternatively, the merchant may determine a BIN number from the wallet info based on the token of a selected account and send the BIN number 508 to an acquirer which may determine the issuer network 516*b* to route the payment transaction message on behalf of the merchant 510. For example, the acquirer may generate a HTTPS POST message to send issuer network brand in the form of data formatted according to the XML. Below is an example HTTP(S) POST message including an XML-formatted issuer network brand message 516*b* for the MCB-Platform:

```
POST /IssuerBrand.php HTTP/1.1
Host: 206.205.82.130
Content-Type: Application/XML
Content-Length: 418
<?XML version = "1.0" encoding = "UTF-8"?>
<IssuerBrand>
<Time> 12:32:32 </Time>
<Date> 10-10-2015 </Date>
<Consumer>
    <WalletID> JSW001 </WalletID>
    <Name> John Smith </Name>
    <PhoneNumber> 000-000-0000 </PhoneNumber>
    ...
</Consumer>
<Token> 000000000sad </Token>
<BIN> 00000001 </BIN>
<IssuerID> BOA </IssuerID>
<RoutingNo> 000001 </RoutingNo>
    ...
</CardEnrollment>
```

The MCB-Platform may then route a processing request 518 (e.g., see 313 in FIG. 3B) to a determined issuer 550 based on the received issuer network message 516*a/b*. The issuer 550 may in turn send back an authorization message 519*a* (e.g., see the approval message 316*a* in FIG. 3B), which may be provided to the merchant terminal, e.g., at 519*b*.

Figure 5B:
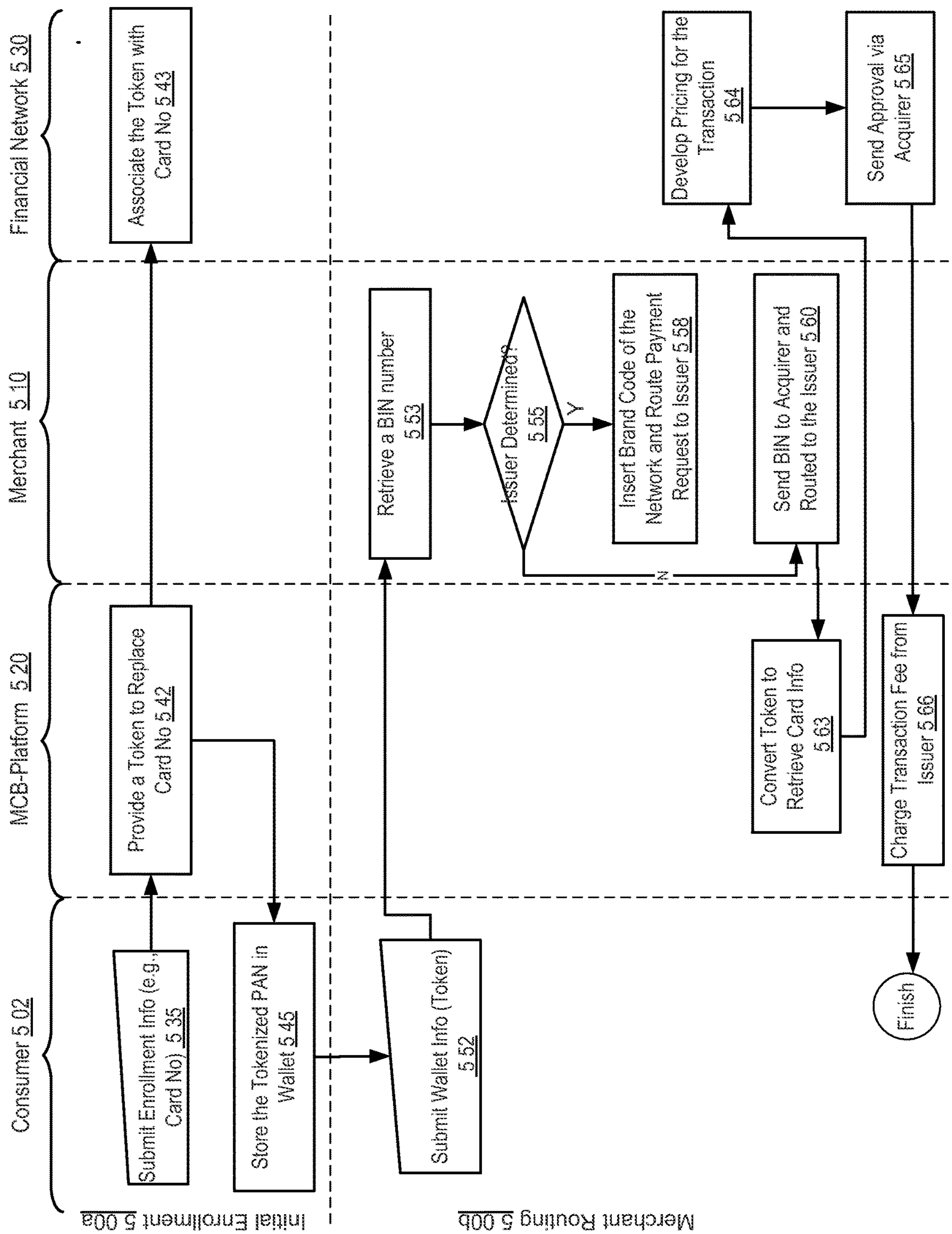

FIG. 5B provides a logic flow diagram illustrating wallet enrollment tokenization within implementations of the MCB-Platform. During an initial enrollment 500*a*, e.g., when a Durbin Compliant card is enrolled initially in a wallet, the card information is replaced with a token that preserves the BIN so as not to impede merchant routing choice at the POS. Within implementations, the consumer 502 may submit enrollment information 535 (e.g., 512 in FIG. 5A) to the MCB-Platform 520, which may provide a token to replace the card information 542. Such token may be issued by an issuer network which may associate the token with the card number 543.

Upon enrollment, the merchant routing 500*b* may be performed based on the token number. Within implementations, upon consumer submitting wallet information including the token number of an enrolled card 552, the merchant 510, who may be a wallet POS acceptor, may retrieve a BIN number 553 from the token number in the wallet. The merchant may then determine whether an issuer network is determined 555. If yes, the merchant may insert the brand code for the network (e.g., an issuer network) they select (e.g., a new field in the auth) based on the BIN number 558. If the merchant POS can not designate the network brand 555, then the merchant may send the BIN number to the acquirer and the acquirer may do so on behalf of the merchant 560.

Within implementations, the transaction may come to MCB-Platform for "token conversion" 563 (acquirers may know this from the fact the POS service is identified as a wallet payment, e.g., "V,me," etc.), which may convert the token to retrieve card information, and routed to the appropriate issuer/network. The financial network 530 may develop pricing 564 for the transactions that do not cause the acquirers to assert that choosing a processing platform other than MCB-Platform may result in a "penalty."

Within implementations, an approval message may be sent to the merchant via the acquirer 565. In further implementations, the MCB-Platform may develop a fee structure that charges any other network 566, and not the merchant for delivering secure wallet transactions from the POS, e.g., a licensing fee or a delivery/transport fee, etc.

Figure 5C:
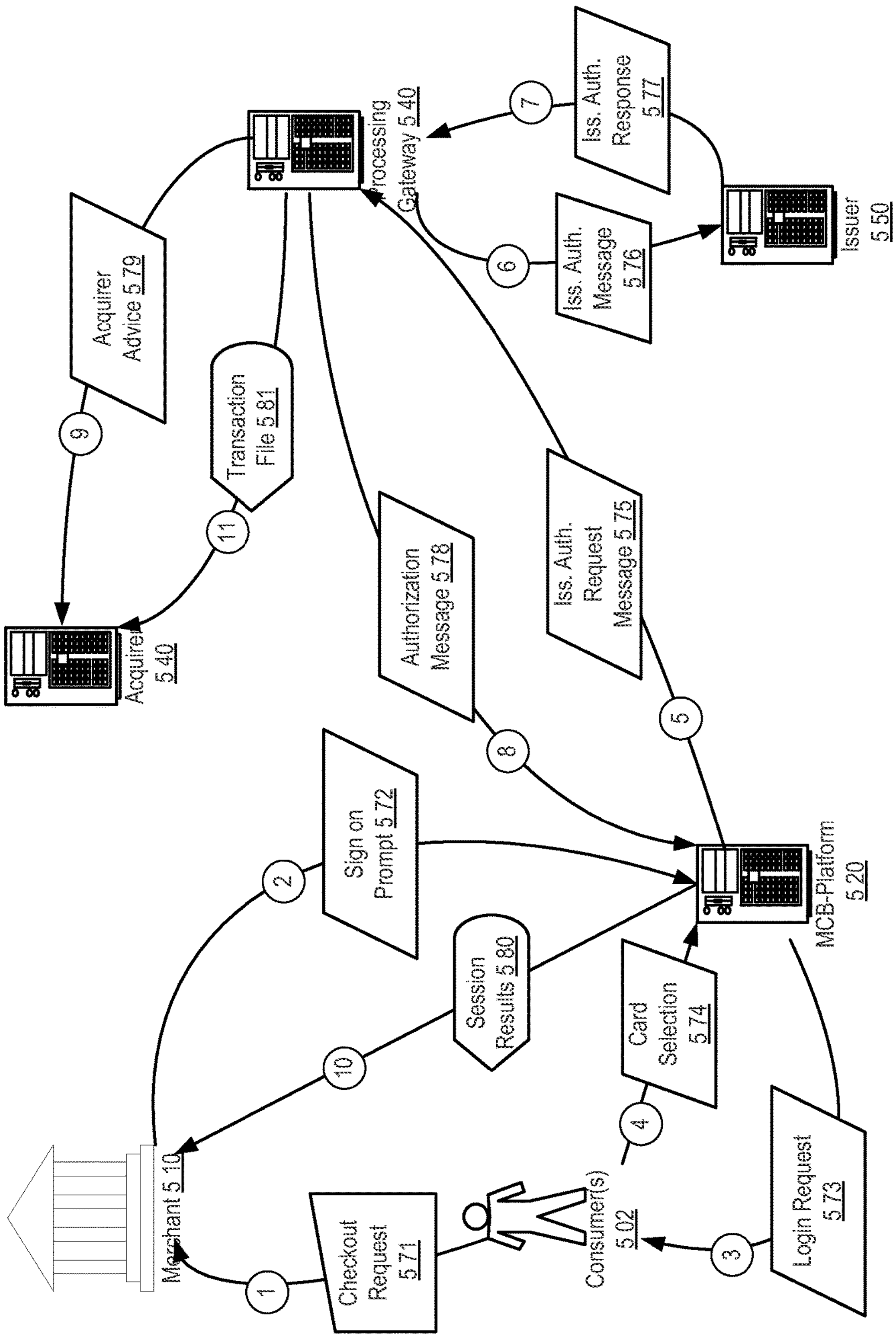
FIGS. 5C-5D provide a data flow and a logic flow diagram illustrating acquirer routing within implementations of the MCB-Platform.
Figure 5D:
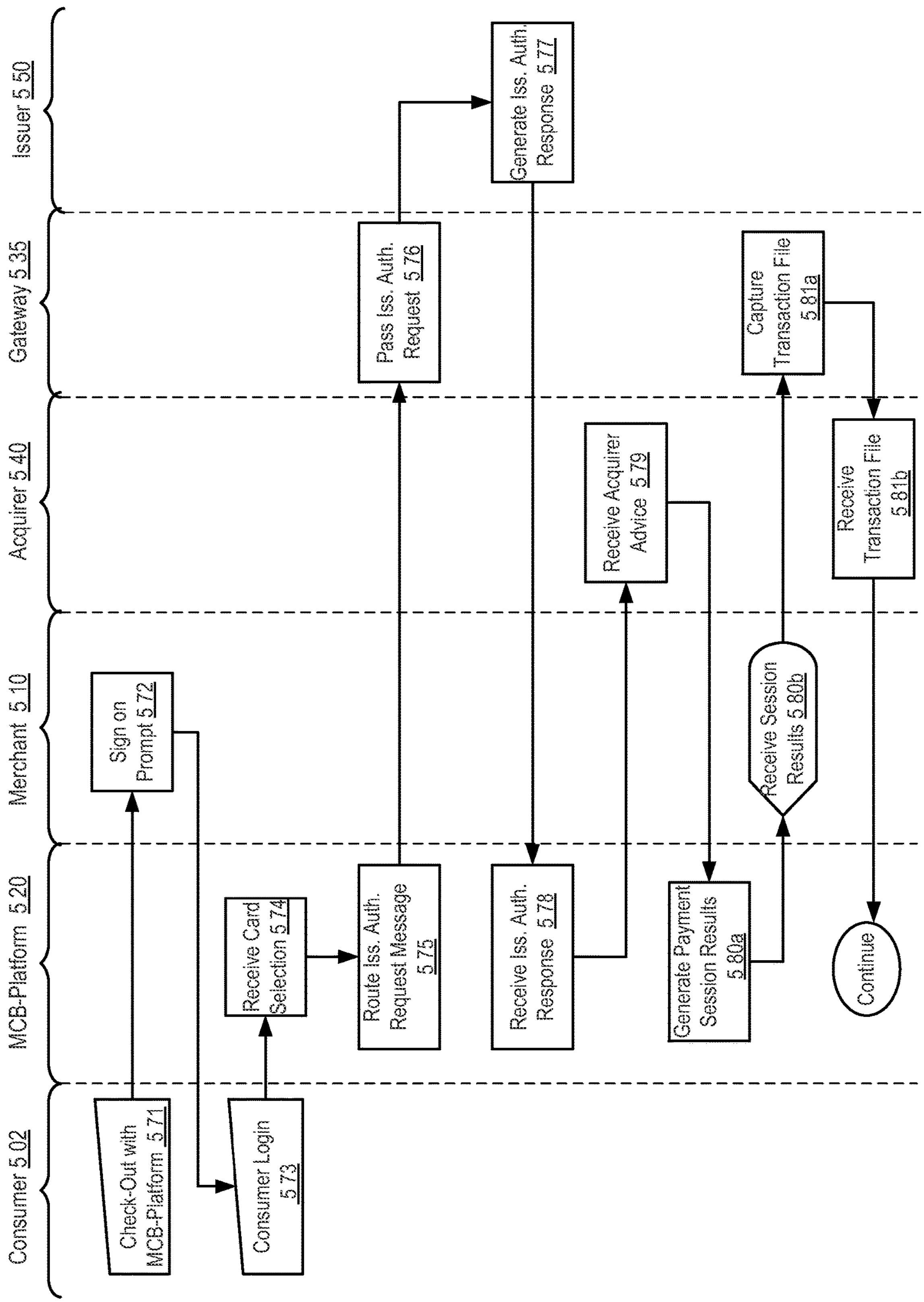

FIG. 5C provides a data flow diagram illustrating acquirer routing 560 within implementations of the MCB-Platform; and FIG. 5D provides a logic flow diagram illustrating acquirer routing 560 within implementations of the MCB-Platform. Within implementations, the consumer 502 may submit s check out request 571 (e.g., 504 in FIG. 5A) to a merchant 510, which may provide a sign on prompt 572 for the merchant to sign in with MCB-Platform wallet checkout service if the merchant has been verified to be a MCB-Platform wallet checkout participant.

In one implementation, the MCB-Platform may provide a user login request 573 to the consumer, e.g., by displaying a login request to the consumer at the consumer's mobile device (e.g., see FIG. 40F), wherein the consumer may in turn enter login credentials, e.g., a username and a password, etc. The consumer may further provide card selection 574 along with credential submissions to the MCB-Platform 520. For example, the consumer wallet may generate a HTTPS POST message to send login credentials and card selection in the form of data formatted according to the XML. Below is an example HTTP(S) POST message including an XML-formatted card selection message 574 for the MCB-Platform:

```
POST /CardSelection.php HTTP/1.1
Host: 206.205.82.130
Content-Type: Application/XML
Content-Length: 418
<?XML version = "1.0" encoding = "UTF-8"?>
<CardSelection>
<Time> 12:32:32 </Time>
<Date> 10-10-2015 </Date>
<Consumer>
    <WalletID> JSW001 </WalletID>
    <Name> John Smith </Name>
    <PhoneNumber> 000-000-0000 </PhoneNumber>
```

-continued

```
        <Password> ******* </Password>
        <PhoneID> JSAppleiOS0001 </PhoneID>
        ...
    </Consumer>
    <SelectCard>
        <CardAlias> MyVisaCard </CardAlias>
        <Token> 000000000sad </Token>
        <BIN> 00000001 </BIN>
        ...
    </SelectCard>
        ...
    </CardSelection>
```

Within implementations, the MCB-Platform may route an issuer authorization request message 575 to a processing gateway 540, e.g., based on the BIN number of the selected payment card 574. For example, the MCB-Platform may generate a HTTPS POST message to request issuer authorization in the form of data formatted according to the XML. Below is an example HTTP(S) POST message including an XML-formatted issuer authorization request message 574 for the processing gateway 540:

```
POST /IssAuthRequest.php HTTP/1.1
Host: 206.205.82.130
Content-Type: Application/XML
Content-Length: 418
<?XML version = "1.0" encoding = "UTF-8"?>
<IssAuthRequest>
<Time> 12:32:32 </Time>
<Date> 10-10-2015 </Date>
<Consumer>
    <WalletID> JSW001 </WalletID>
    <Name> John Smith </Name>
    <PhoneNumber> 000-000-0000 </PhoneNumber>
    <Password> ******* </Password>
    <PhoneID> JSAppleiOS0001 </PhoneID>
    ...
</Consumer>
<BIN> 00000001 </BIN>
<Issuer>
    <IssuerID> BOA </IssuerID>
    <IssuerName> Bank of America </IssuerName>
    <RoutingNo> 00000001 </RoutingNo>
    ...
</Issuer>
<Payment>
    <Amount> $4.20 </Amount>
    <CardNo> 0000 0000 0000 0000 </CardNo>
    <CardHolderName> John Smith </CardholderName>
    ...
</Payment>
<Merchant>
    <MerchantID> STBUX </MerchantID>
    <MerchantName> StarBucks </MerchantName>
    <MerchantAddres> 1400 Dream St </MerchantADdress>
    <Zipcode> 00000 </Zipcode>
    <TerminalID> ST0001 </TerminalID>
    <Location> 1332 Dream Street </Location>
    <Zipcode> 00000 </Zipcode>
    <MerchantAccount> 0000 0000 0000 1111 </MerchantAccount>
    ...
</Merchant>
    ...
</IssAuthRequest>
```

The processing gateway 540 may transmit the issuer authorization message 576 to the issuer 550, which may in turn generate an issuer authorization response 577 (e.g., see also 519*a* in FIG. 5A), and routed to the MCB-Platform.

Within implementations, the MCB-Platform may generate session results 580*a* to the merchant 510, wherein the session results may comprise the status of the transaction, e.g., an approval message. Upon merchant receiving the session results 580*b*, the processing gateway may capture a transaction file 581*a* and send it to the acquirer 581*b*. In one implementation, the processing gateway may provide acquirer advice 579 to the acquirer.

Figure 6A:
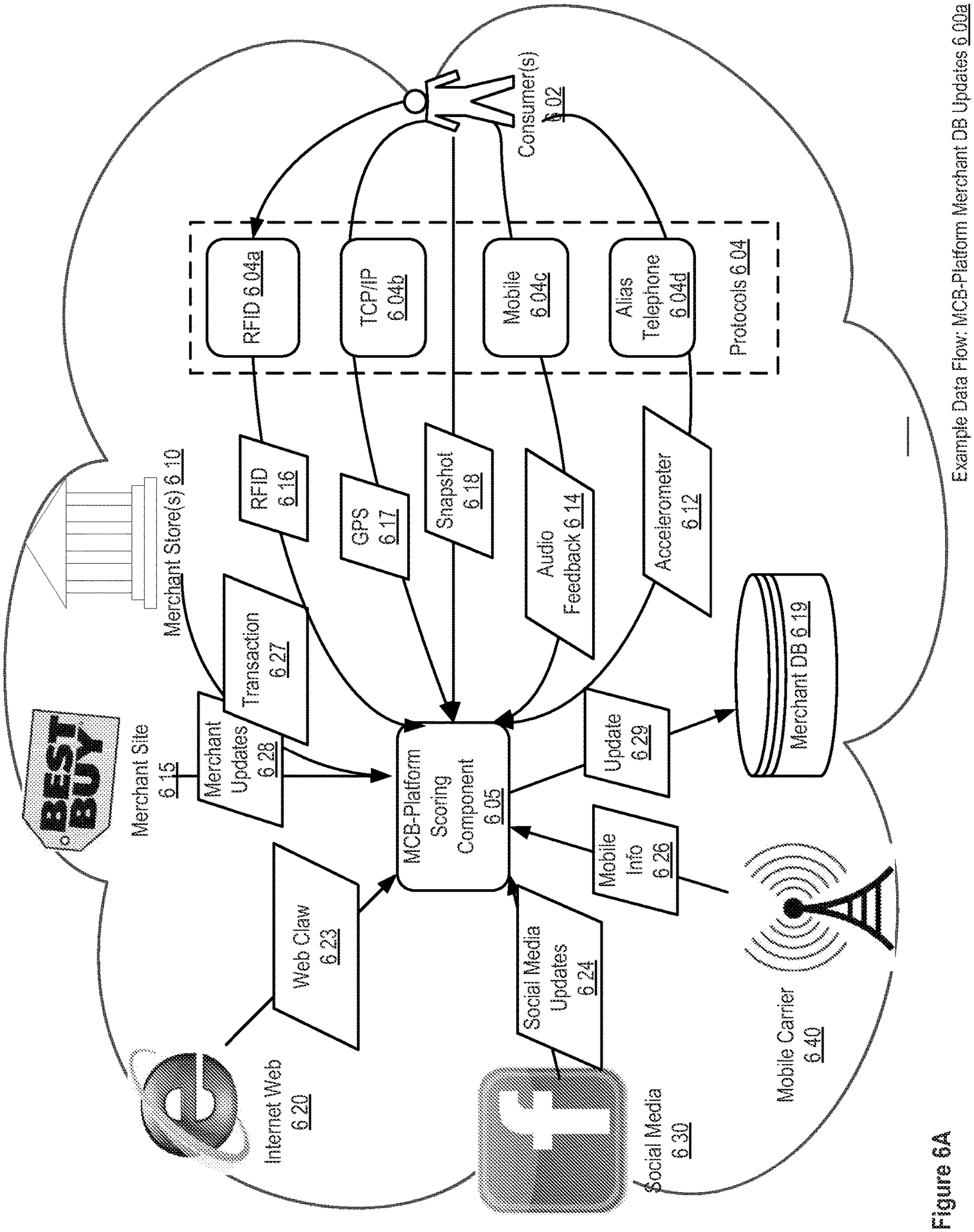
FIG. 6A provides a block diagram illustrating data flows of merchant database updates within various embodiments of the MCB-Platform.

FIG. 6A provides a data flow diagram MCB-Platform merchant database updates 600*a* within implementations of the MCB-Platform.

In one implementation, the MCB-Platform scoring component may obtain various data inputs related to merchant information. For example, the scoring component 605 may obtain web claws 623 from the Internet 620, merchant updates 628 and transaction record 627 from merchant site 615 and merchant stores 610, mobile information 626 from mobile carriers 640, social media activities 624 from social media 630, and/or the like.

For example, in one implementation, the web claws 623 may comprise new articles from a news page that mentions the merchant name, product information, and/or the like. For another example, the merchant updates 628 and/or the transaction record 627 may comprise merchant profile information, inventory information, pricing information, and/or the like. For another example, social media updates 624 may comprise a merchant's Facebook page updates, merchant Twitter updates, consumer comments, "Likes" on a merchant product on Facebook, consumer tweets about the merchant and/or the products, and/or the like. For another example, mobile information 626 may comprise checkout request (e.g., see FIGS. 4A-4B), mobile advertisement, mobile offers, and/or the like.

Within implementations, the MCB-Platform scoring component may extract data fields from the various raw inputs, such as, but not limited to risk indexes, number of items for a defined merchant record, average item price on site, item diversity on site, defined merchant information verses estimated merchant information, average price on site verse average print by merchant information, hosting country, hosting service, average number of hosting services a year, site age, and/or the like.

Figure 6B:
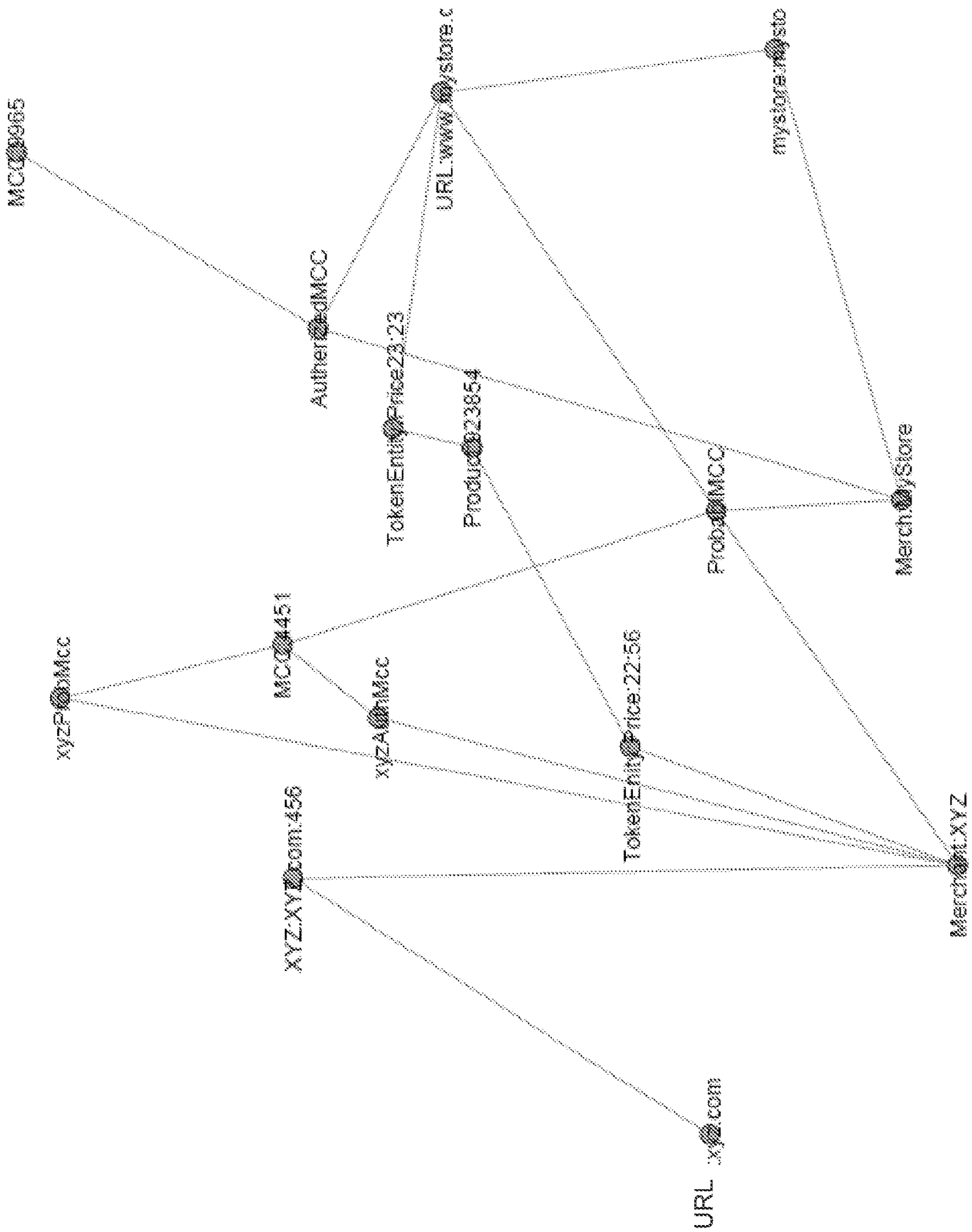
FIGS. 6B-6D provide a block diagram and logic flow diagrams illustrating web claws for merchant information within various embodiments of the MCB-Platform.

In another implementation, the MCB-Platform scoring component may create a look-up table to determine whether a received merchant data field change indication has been verified. For example, such look up table may comprise data fields such as, but not limited to valid email, valid address, valid phone, verified email, verified address, verified phone, known spammer, deny list, allow list, and/or the like. For example, FIG. 6B provides an exemplary data structure of the extracted information and how the information is interrelated within embodiments of the MCB-Platform.

Within implementations, the MCB-Platform may obtain information via a consumer 602 initiating a transaction payment at a merchant terminal via various protocols 604, such as, but not limited RFID 604*a*, TCP/IP 604*b*, mobile 604*c*, alias telephone 604*d*, and/or the like. The scoring component 605 may receive information such as a RFID 616, GPS 617, snapshot 618 (e.g., a picture of the storefront), audio feedbacks 614 (e.g., audio recording of the store atmosphere), accelerometer data 612 (e.g., movement data of a consumer smartphone), and/or the like. Further examples of merchant consumer checkout protocol stacks are discussed in FIG. 3A.

In one implementation, upon verification of a confidence score (e.g., see FIG. 6B), the MCB-Platform may update merchant information 629 at a merchant database. For example, the MCB-Platform may generate a HTTPS PUT message to request database update in the form of data formatted according to the XML. Below is an example HTTP(S) PUT message including an XML-formatted merchant record update message 629 for the merchant database 619:

```
PUT /DBupdate.php HTTP/1.1
Host: www.MCB-Platform.com
Content-Type: Application/XML
Content-Length: 418
<?XML version = "1.0" encoding = "UTF-8"?>
<IssAuthRequest>
<Time> 12:32:56 </Time>
<Date> 10-10-2015 </Date>
<NewMerchantRecord>
    <MerchantID> STBUX </MerchantID>
    <MerchantName> StarBucks </MerchantName>
    <MerchantAddres> 1400 Dream St </MerchantADdress>
    ...
</NewMerchantRecord>
<Confidence> Good </Confidence>
<ActivityType> Transaction </ActivityType>
<Status> Allow </Status>
    ...
</DBupdate>
```

Figure 6C:
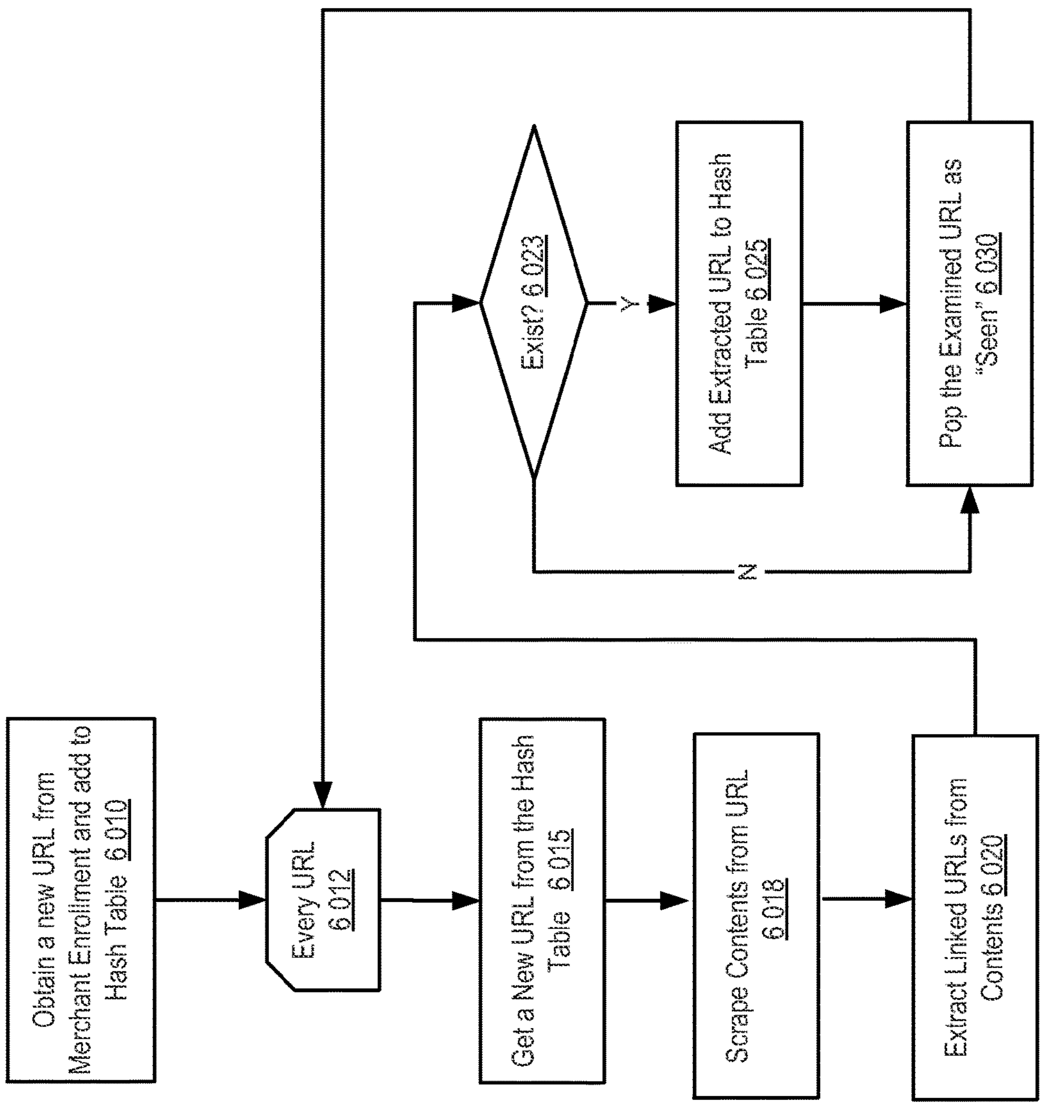
Figure 6D:
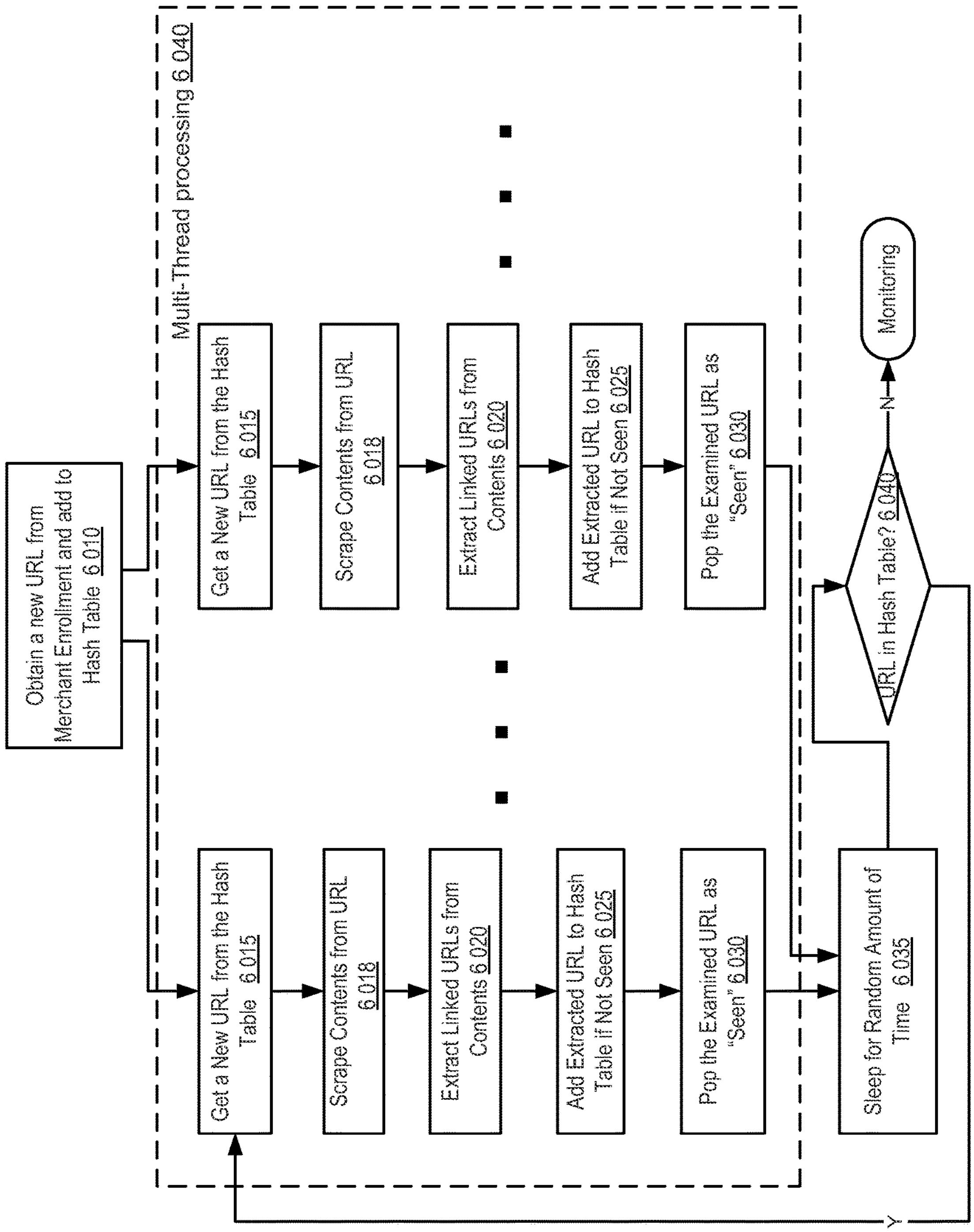

FIGS. 6C-6D provide logic flow diagrams illustrating merchant site monitoring within implementations of the MCB-Platform. For example, the MCB-Platform scoring component may obtain merchant URL either at merchant enrollment or from a wallet request to purchase from the merchant URL. To "spider" the merchant website (e.g., monitoring information updates from URL, etc.), in one implementation, the MCB-Platform may collect all links on the site URL and then loop through the list of URLs to look for information updates until the list is exhausted.

As shown in FIG. 6C, the MCB-Platform may obtain a new URL from merchant enrollment 6010 and add the merchant URL to a hash table. While there is any URL exists in hash table 6012, the MCB-Platform may get a new URL from the hash table 6015, and scrape contents from the URL 6018 and extract linked URLs from contents 6020. In one implementation, the MCB-Platform may add the extracted URLs to the hash table 6025 if not in list 6023. The MCB-Platform may then pop the examined URL from the hash table and add it to a list of seen URLs 6030.

Alternatively, as shown in FIG. 6D, the MCB-Platform may adopt a stealth procedure, which may launch several threads from multiple domains with a shared memory that simulated a scenario of many users navigating the merchant site URL.

Within implementations, the MCB-Platform may add a merchant URL from merchant enrollment to a hash table 6010, and then launch several threads 6040 which would get new URLs from hash table 6015, scrape content of the URL 6018, extract URLs from contents 6020, pop URLs from hash table 6030, add reviewed URL to a list of seen URLs 6025. The MCB-Platform may then sleep for random amount of time 6035, and pick one URL 6040 from extracted URLs to resume at 6015. If no URL exists 6040, the MCB-Platform may continue monitoring.

In one implementation, the MCB-Platform may extract table fields information from "spider" URLs, such as, but not limited to url, date time, metadata, content, images, javascript, css, referring sites, country of origin, hosting service, tcp/ip packets, and/or the like.

Figure 6E:
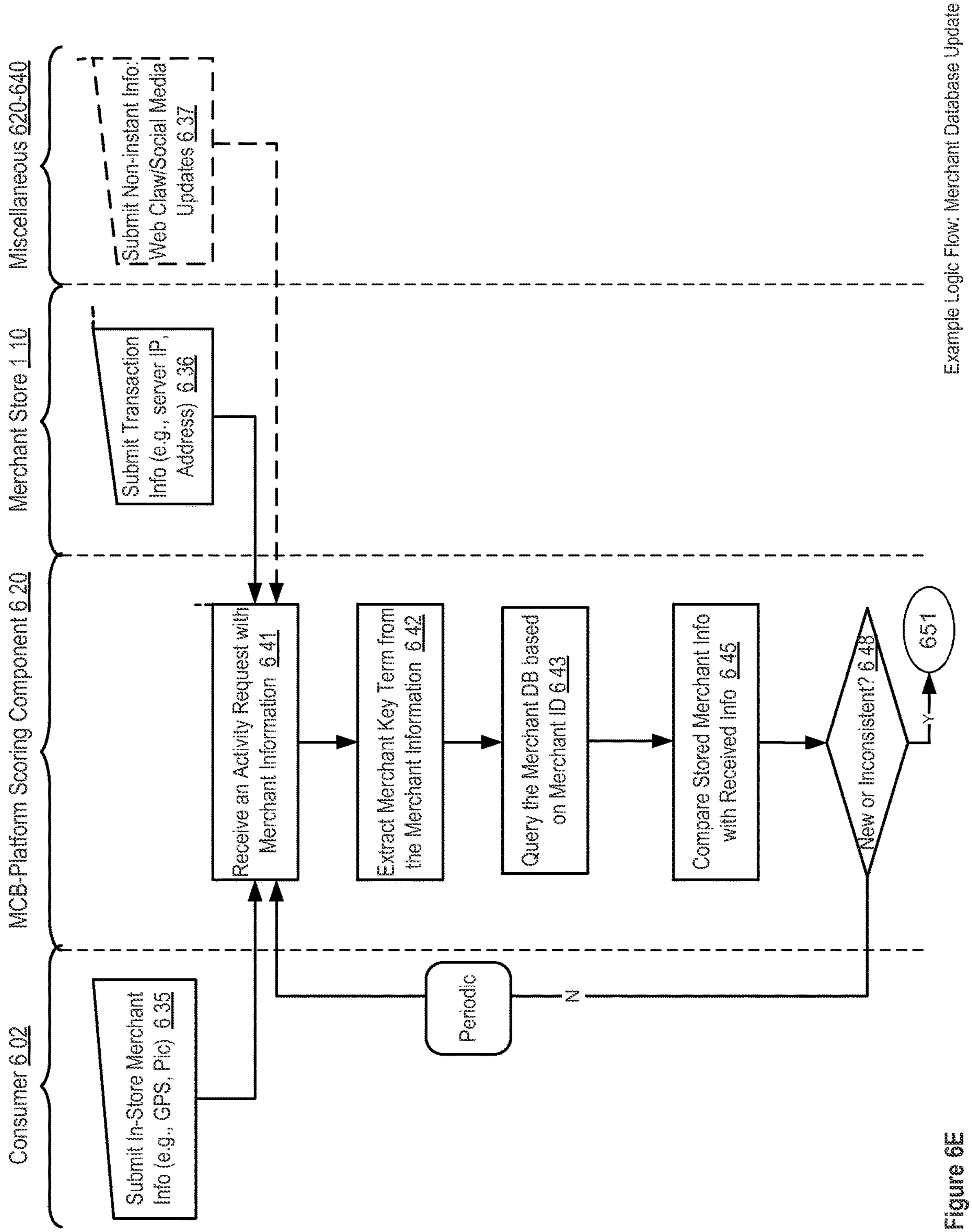
FIGS. 6E-6F provide logic flow diagrams illustrating merchant database updates within various embodiments of the MCB-Platform.
Figure 6F:
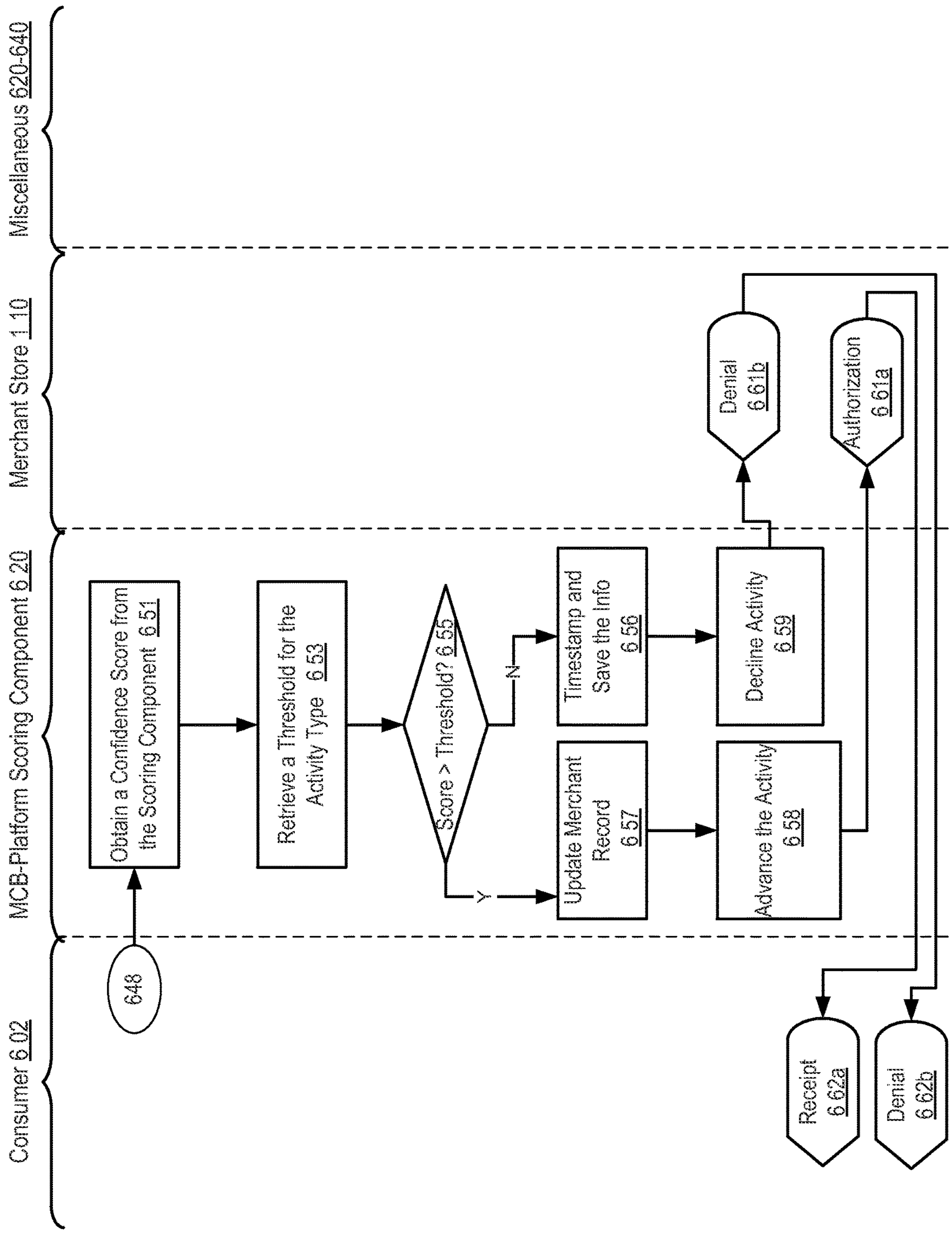

FIGS. 6E-6F provide logic flow diagrams illustrating merchant database update within embodiments of the MCB-Platform. Within implementations, the MCB-Platform may receive an activity request with the merchant information 641, wherein the activity may comprise a transaction request, an offer issuance request, a merchant record update request, and/or the like.

For example, the consumer may submit in-store merchant information (e.g., GPS information, snapshot pictures, audio recording, etc.) 635, e.g., the consumer may submit such information to "check-in" via social media in order to obtain related offers, submit a purchase transaction request, and/or the like.

In another implementation, the MCB-Platform may obtain transaction information submission 636 from the merchant store 110, such as but not limited to a server IP, physical store location, and/or the like. For example, a merchant store POS terminal may submit a transaction request to the MCB-Platform, which includes merchant store information. For another example, the merchant may submit a request to the MCB-Platform to update merchant profile information.

In another implementation, the MCB-Platform may obtain miscellaneous non-instant transaction information, such as web claws, social media updates, 637, and/or the like.

Within implementations, the MCB-Platform may extract merchant key terms from the merchant information 642 embedded in the activity request, e.g., a merchant ID. The MCB-Platform may then query the merchant database based on the merchant ID 643, and retrieve the previously stored merchant record. The MCB-Platform may compare the stored merchant information with the received information 645 from the received activity request 645, to determine whether the received information is new or inconsistent with the previously stored information 648. For example, the MCB-Platform may receive a purchase transaction request which indicates a different physical merchant store address from the previously stored merchant address (e.g., see FIG. 1C.(b)). For another example, the purchase transaction request may comprise a product that is not included in the inventory information from the previously stored merchant information.

When there is no new or inconsistent merchant information at 648, the MCB-Platform may periodic monitor the process, and proceed with 641.

When there is such new or inconsistent merchant information 648, continuing on with FIG. 6F, the MCB-Platform may obtain a confidence score at a scoring component 651 for the received merchant information, wherein such confidence score may be calculated at a data aggregating platform including specific XML modules to the MCB-Platform, as described in FIGS. 19A-19F. For example, all the inputs 635-637 in FIG. 6E may be fed to the centralized personal information platform 1804 in FIG. 18.

In one embodiment, the MCB-Platform scoring component may use the adopt a structure to provide confidence levels for the types of inputs discussed. An exemplary XML-formatted scoring structure may take a form similar to the following:

```
<init>
    summary__Level="0"
    environment__type="RT"
    tumblar__location="../tumblars/merchantRisk.tumblar"
    <output>
        keyname=modelRes
        file="stdout"
    </output>
    <input>
        keyname=inputmerchant
        file=../data/merchantRisk.test.csv
        format=csv
        meta__data="../metaData/merchantRisk.meta"
    </input>
    <constant>
        indexname=__constant__10000000
        value=10000000
        type=float
    </constant>
</init>
<macro="buildfeatrato">
      tumblar-default="100000"
      function-1="dividebyconst"
      fnc-contant="10000000"
      type="float"
</macro>
<vault>
<door=0>
<lock inkey="inputmerchant" inkeyname="url" outkey="normalised" outkeyname="numItems"
macro="buildFeatRato" tumblar="rskldx__numItems"          />
<lock inkey="inputmerchant" inkeyname="url" outkey="normalised" outkeyname="avgItemPrice"
macro="buildFeatRato" tumblar="rskldx__avgItemPrice"          />
<lock inkey="inputmerchant" inkeyname="url" outkey="normalised" outkeyname="itemDiversity"
macro="buildFeatRato" tumblar="rskldx__itemDiversity" />
<lock inkey="inputmerchant" inkeyname="url" outkey="normalised" outkeyname="MCCdifference"
macro="buildFeatRato" tumblar="rskldx__MCCdifference" />
<lock inkey="inputmerchant" inkeyname="url" outkey="normalised" outkeyname="avgPrcOnsite"
macro="buildFeatRato" tumblar="rskldx__avgPrcOnsite"/>
<lock inkey="inputmerchant" inkeyname="url" outkey="normalised" outkeyname="hostingCountry"
macro="buildFeatRato" tumblar="rskldx__hostingCountry" />
<lock inkey="inputmerchant" inkeyname="url" outkey="normalised" outkeyname="hostingService"
macro="buildFeatRato" tumblar="rskldx__hostingService" />
<lock inkey="inputmerchant" inkeyname="url" outkey="normalised" outkeyname="avgNumHostingServices"
macro="buildFeatRato" tumblar="rskldx__avgNumHostingServices" />
<lock inkey="inputmerchant" inkeyname="url" outkey="normalised" outkeyname="SiteAge"
macro="buildFeatRato" tumblar="rskldx__SiteAge" />
<lock inkey="inputmerchant" inkeyname="url"         outkey="normalised" outkeyname="LinksInByOrgin"
macro="buildFeatRato" tumblar="rskldx__LinksInByOrgin"          />
</door>
<door=1>
<lock inkey="validEmail" inkeyname="email"
    outkey="mdlflags" outkeyname="valid__email__list"
    function="instant"
    tumblar="valid__email__list"
    tumblar-default="0"
    type="int"
/>
<lock
    inkey="validAddress" inkeyname="addressid"
    outkey="mdlflags" outkeyname="valid__address__list"
    function="instant"
    tumblar="valid__address__list"
    tumblar-default="0"
    type="int"
/>
<lock
    inkey="verifiedPhone" inkeyname="phone"
    outkey="mdlflags" outkeyname="verified__phone__list"
    function="instant"
    tumblar="verified__phone__list"
    tumblar-default="0"
    type="int"
/>
<lock
    inkey="verifiedEmail" inkeyname="email"
    outkey="mdlflags" outkeyname="verified__email__list"
    function="instant"
    tumblar="verified__email__list"
```

-continued

```
        tumblar-default="0"
        type="int"
/>
<lock
        inkey="verifiedAddress" inkeyname="addressid"
        outkey="mdlflags" outkeyname="verified__address__list"
        function="instant"
        tumblar="verified__address__list"
        tumblar-default="0"
        type="int"
/>
<lock
        inkey="verifiedPhone" inkeyname="phone"
        outkey="mdlflags" outkeyname="verified__phone__list"
        function="instant"
        tumblar="verified__phone__list"
        tumblar-default="0"
        type="int"
/>
<lock groupkeyname="mdlflags" groupkeyjoin=':' outkey="normalised"
outkeyname="phoneaddressemail__risk"     macro="buildFeatRato" tumblar="phoneaddressemail__risk"
/>
</door>
<door=2>
<lock
        inkey="inputmerchant" inkeyname="url"
        outkey="negflags" outkeyname="url__knownspammer"
        function="instant"
        tumblar="card__negative__list"
        tumblar-default="0"
        type="int"
/>
<lock
        inkey="inputmerchant" inkeyname="url"
        outkey="negflags" outkeyname="url__denylist"
        function="instant"
        tumblar="card__negative__list"
        tumblar-default="0"
        type="int"
/>
</door>
<door=3>
<lock
        inkey="inputmerchant" inkeyname="url"
        outkey="posflags" outkeyname="url__allow"
        function="instant"
        tumblar="url__allowe__list"
        tumblar-default="1"
        type="int"
/>
</door>
<door=4>
<lock name="sumprob"
        groupkeyname="normalised"
        outkey="score" outkeyname="sumprob"
        function="sumprob"
        fnc-weights=".7|.8|.6|.3|.9|.1|.6|.6|.7|.2|.9"
        type="float"
/>
<lock
        groupkeyname="score"
        groupkey2name="negflags"
        outkey="finalMdl" outkeyname="finalMdl"
        function="takemax"
        type="float"
/>
</door>
<door=5>
<lock inkey="inputmerchant" inkeyname="url" outkey="modelres" outkeyname="url"     />
<lock
        groupkeyname="finalMdl"
        groupkey2name="posflags"
        outkey="Score" outkeyindex="2"
        function="takemin"
        type="float"
/>
</door>
</vault>
```

Further examples of scoring structures may be illustrated in the centralized personal information platform as discussed in FIGS. 18-37. In a further implementation, the confidence level determination may be performed by an integration of the XML-formatted scoring structure discussed above and the centralized personal information platform.

Continuing on with 653 in FIG. 6F, in some embodiments, the MCB-Platform may retrieve a threshold for the activity type. For example, various activity types may have greater or lower weights for confidence level evaluation. Based on the nature of the requested activity (e.g., a transaction payment request, a merchant information update request, a consumer bridging offer issuance request, etc.), the MCB-Platform may require lower or higher values to accept the transaction and or update the merchant database, allow the bridging event (e.g, prompt an offer). For example, a lower confidence value that the merchant and consumer are related of 0.2 (normalized confidence value) may be acceptable for issuing a merchant offer to a consumer). However, a higher confidence level may be required, e.g., 0.5, to allow a transaction for users that have a good account history. Higher confidence levels, e.g., 0.9, may be required for updating merchant information. In another implementation, the MCB-Platform scoring component may operate in parallel by constantly updating with regard to the received transaction information.

The MCB-Platform may determine whether the obtained confidence score is greater than the retrieved threshold 655. If yes, the MCB-Platform may update the merchant record 657 with the new or updated information (e.g., see 123 in FIG. 1C, etc.), and advance the activity 658, e.g., to bridge an offer for the consumer, or to advance transaction authorization processing, etc. Activity authorization notice may be provided to the merchant 661*a*, and the consumer may obtain a confirmation notice 662*a*, e.g., a purchase receipt, a matched offer, etc.

In another implementation, if the confidence score fails to meet the threshold value at 655, the MCB-Platform may timestamp the received information and activity request 656 for the scoring component (e.g., such received information itself will be integrated into the centralized personal information platform evaluation, as discussed in FIGS. 18-37), and decline the activity request 659. A denial message may be sent to the merchant 661*b* and the consumer 662*b*.

Figure 6G:
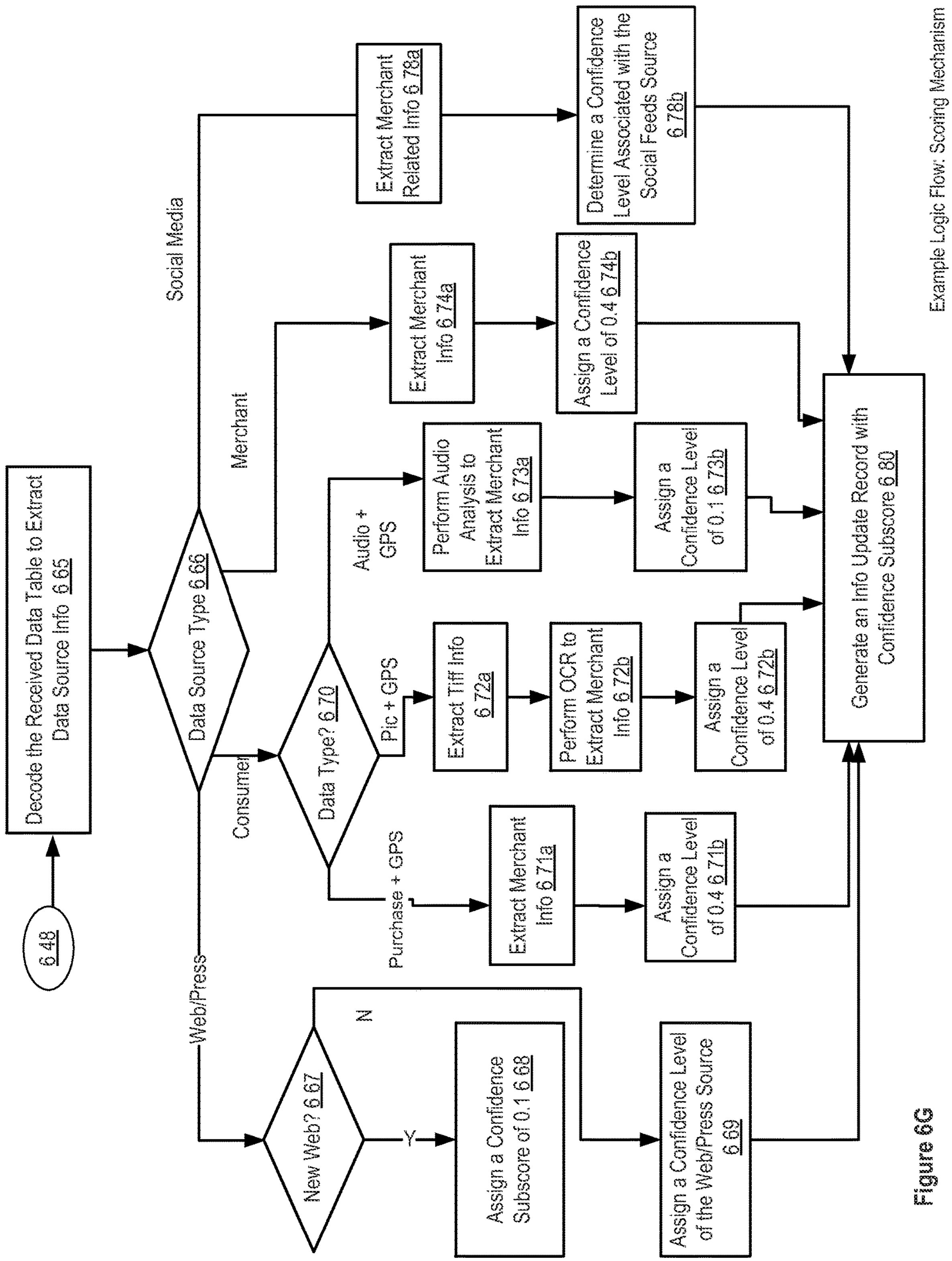
FIGS. 6G-6H provide logic flow diagrams illustrating alternative implementations of scoring mechanism within various embodiments of the MCB-Platform.
Figure 6H:
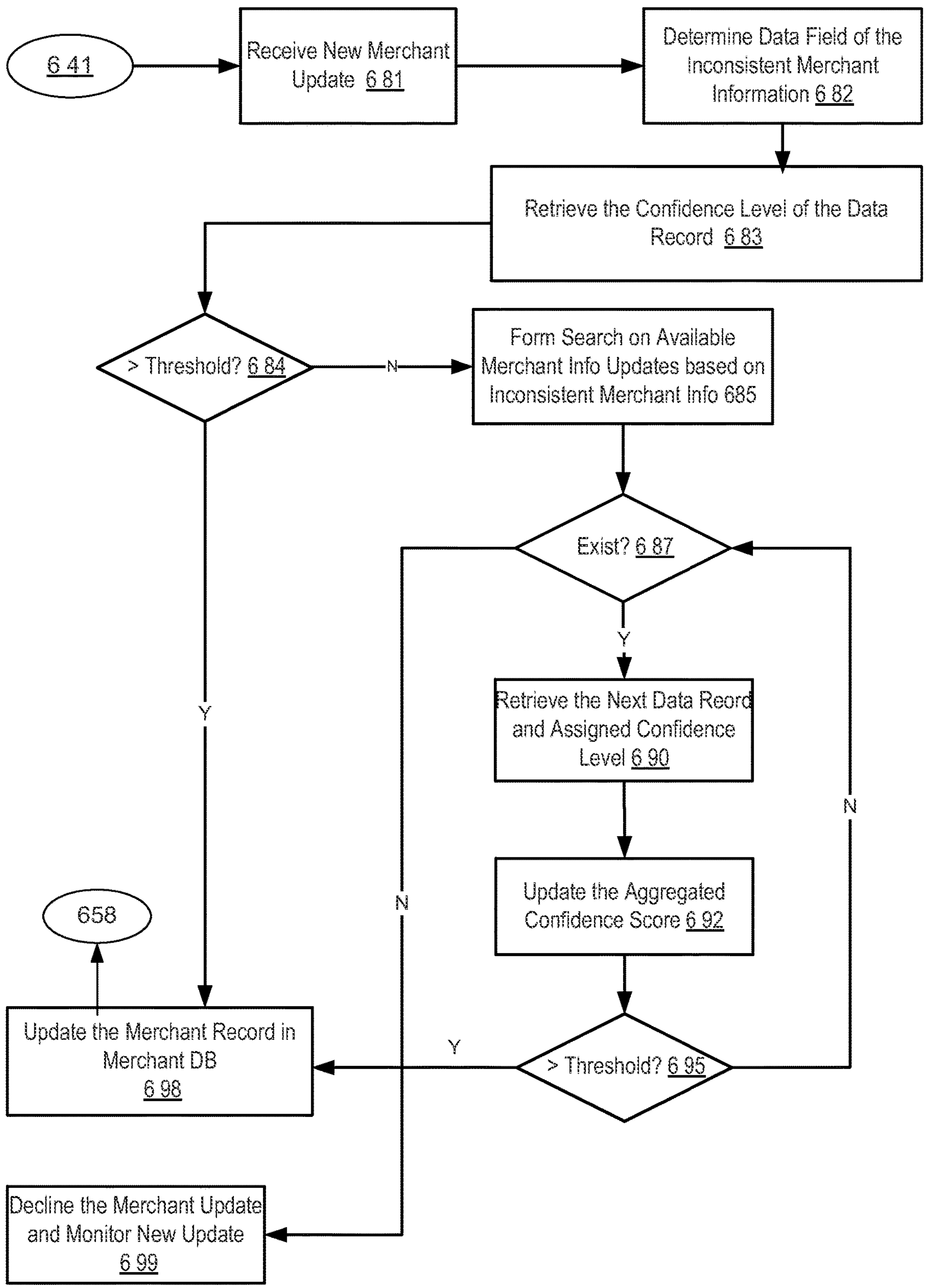

FIGS. 6G-6H provide alternative implementations of scoring mechanism within embodiments of the MCB-Platform. Within implementations, continuing on from 648 in FIG. 6E, the MCB-Platform may decode the received data table to extract data source information 665, and determine data source types 666. For example, the data source may comprise a consumer wallet (e.g., snapshot of a storefront, GPS coordinates, etc.), a merchant store or merchant site (e.g., merchant updates, transaction request from POS terminals, etc.), Internet web, social media, and/or the like.

In one implementation, if the data source comprises web/press news from the Internet web, the MCB-Platform may determine whether it is a new web URL 667. If not, the MCB-Platform may assign a confidence level associated with the known web/press source 669. If yes, the MCB-Platform may assign a new confidence level, e.g., 0.1, to a new web 668.

In another implementation, if the data source comprises consumer submitted data, the MCB-Platform may further determine a data type 670. For example, if it comprises purchase transaction information and the consumer's GPS coordinates, the MCB-Platform may extract merchant information from the transaction information 671*a*, and assign a higher confidence level, e.g., 0.4 671*b*, as the transaction record may indicate better accuracy. If the received data includes a storefront snapshot and GPS coordinates, the MCB-Platform may extract tiff information of the snapshot photo 672*a*, and perform optical character recognition (OCR) to extract merchant information from the photo 672*b*. Such data may be assigned a confidence score of 0.4, 672*b*. In another implementation, if the received data comprises audio recording and the consumer's GPS coordinates, the MCB-Platform may perform audio analysis to extract merchant information from the background recording 673*a*. Such data may be assigned to a lower confidence level, e.g., 0.1 673*b*, as audio background sounds may be less indicative or accurate.

In further implementations, if the data source comprises a merchant, e.g., merchant requested data updates, etc., the MCB-Platform may extract merchant information 674*a*, and assign a higher confidence level of 0.4 674*b*.

In other implementations, if the data source comprises social media, the MCB-Platform may extract merchant information 678*a* from the social media feeds, news, activities, etc., and determine a confidence level based on the social media message source 678*b*. For example, a consumer's post indicating an address change of a merchant on Facebook may have a lower score of 0.1, but news posted on an official merchant social media channel (e.g., a Starbucks page on Facebook, a Starbucks Twitter account, etc.) may have a higher score of 0.3, and/or the like.

FIG. 6H provides a logic flow illustrating aspects of progressive scoring within implementations of the MCB-Platform. Continuing on with 641 in FIG. 6E, in an alternative implementation, the MCB-Platform may receive new merchant update 681, and determine data fields of the inconsistent merchant information 682. The MCB-Platform may then determine a confidence level of the new merchant update 683 (e.g., as discussed in FIG. 6G), and determine whether it meets a threshold associated with the requested activity type 684. If yes, the MCB-Platform may update the merchant record in the merchant database, and proceed with 658.

If not, the MCB-Platform may form a search on available merchant information update based on the inconsistent merchant information 685. For example, if the received merchant updates include a different store address from the record, the MCB-Platform may query on the new store address. If such additional data exist 687, the MCB-Platform may retrieve the data record 690 and its associated confidence level. The MCB-Platform may then update the aggregated confidence score 692 to determine whether it meets the threshold value 695.

For example, if a transaction request requires a threshold of 0.5, a first received transaction request indicates a different terminal address than previously stored in the merchant database, but a singular transaction request is assigned a confidence level of 0.3, and fails to meet the threshold. If a second transaction request indicating the different terminal address, the new confidence score of the different terminal address would be $0.3\times2=0.6$, which satisfy the threshold requirement.

In one implementation, the MCB-Platform may score the received information progressively. If all information has been exhausted but the accumulated confidence score fails to meet the threshold, the MCB-Platform may decline the merchant update 699.

Figure 7A:
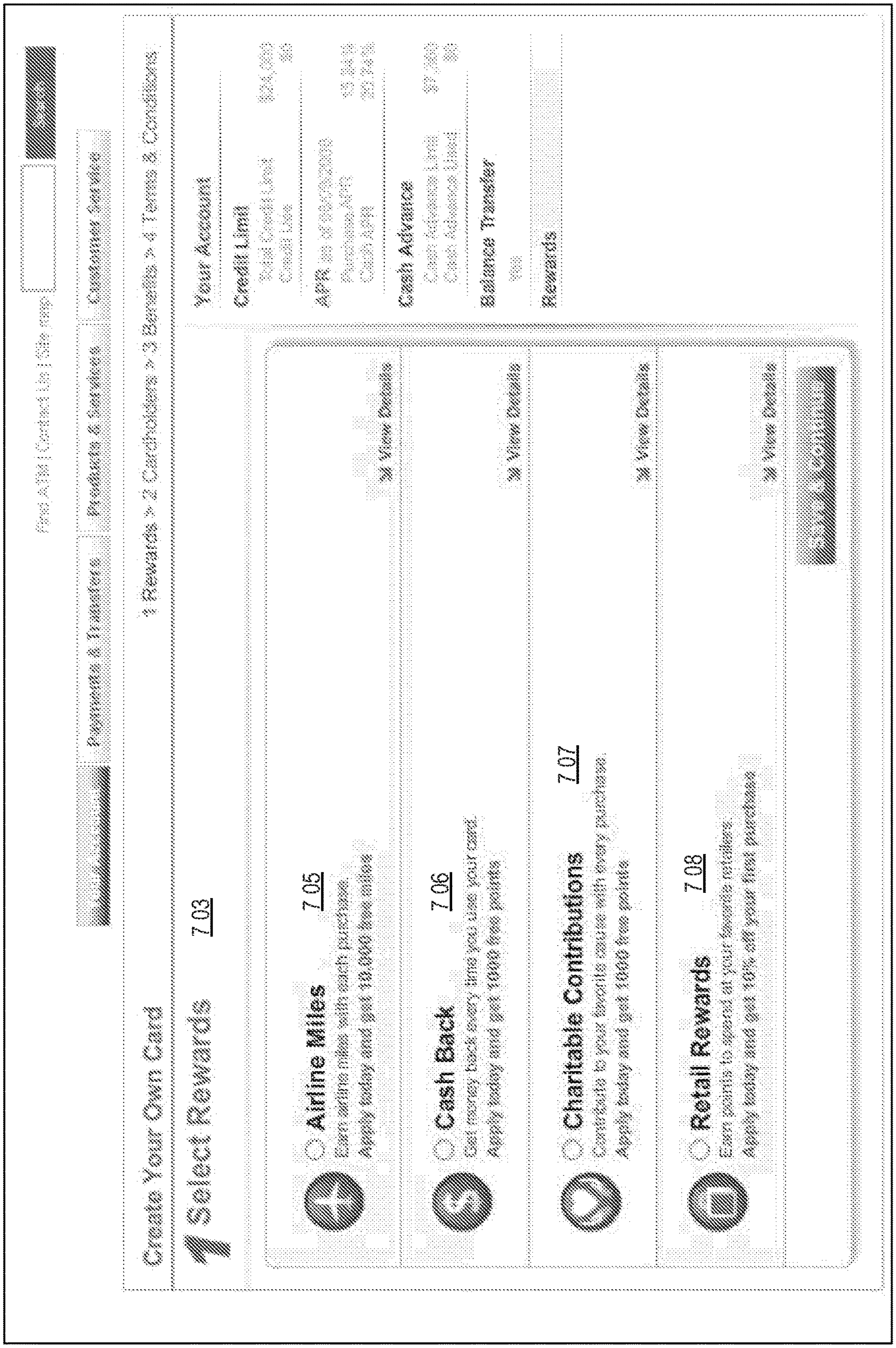
FIGS. 7A-7L provide exemplary UIs illustrating consumer registration within various embodiments of MCB-Platform.

FIGS. 7A-7L provide exemplary UIs illustrating consumer registration within various embodiments of MCB-Platform. FIG. 7A provides an exemplary consumer registration screen 700_a_ within implementations of MCB-Platform. As shown in FIG. 7A, a consumer may create a MCB-Platform card, and select interested rewards type 703, such as but not limited to airline miles 705, cash back 706, charitable contributions 707, retail rewards 708, and/or the like.

Figure 7B:
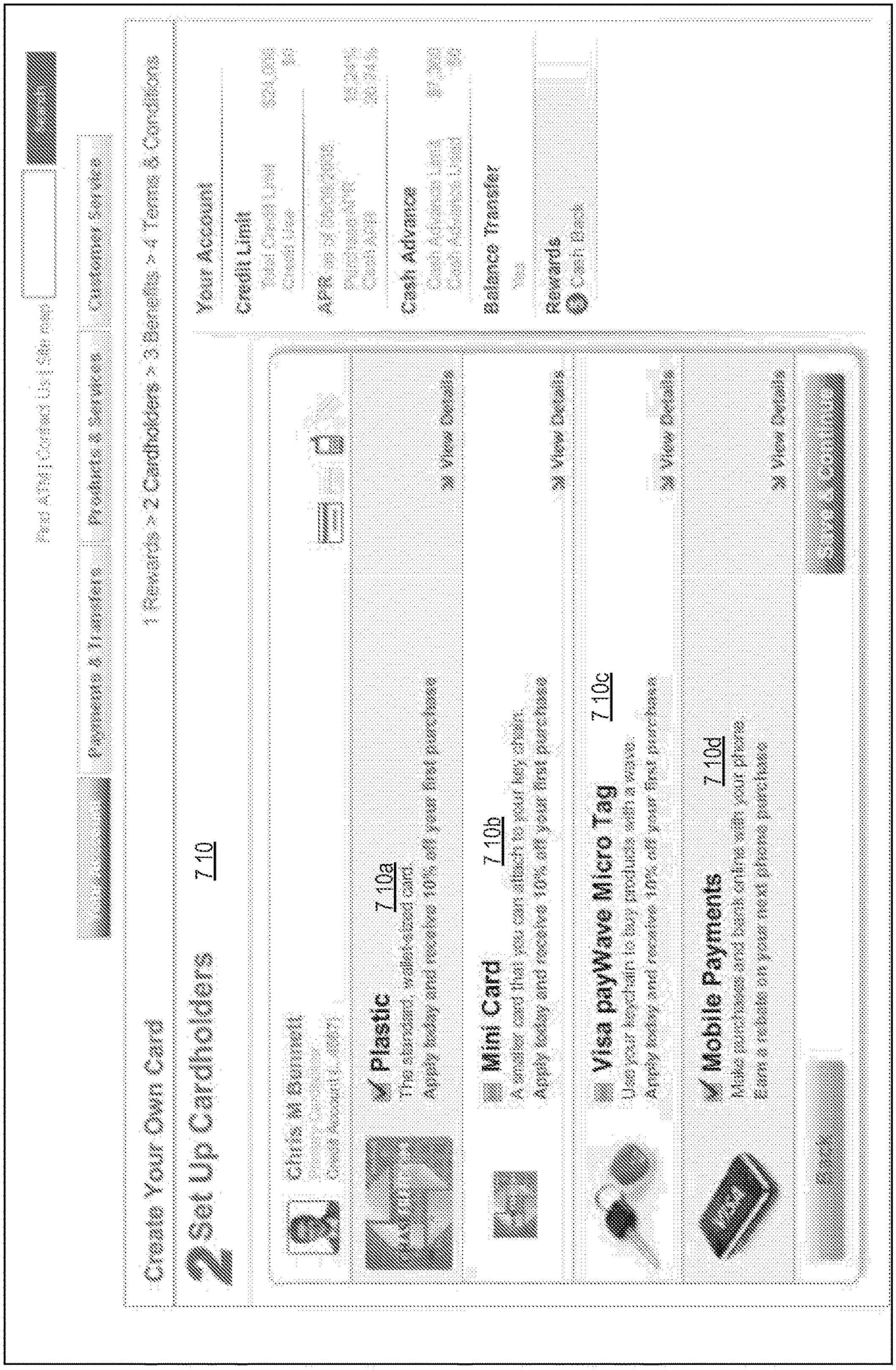

As shown in FIG. 7B, a consumer may set up cardholders 710 at an exemplary UI screen 700_b_. For example, the consumer may select a card device type, such as, but not limited to plastic card 710_a_, mini card 710_b_, Visa payWave Micro tag card 710_c_, mobile payment 710_d_, and/or the like.

Figure 7C:
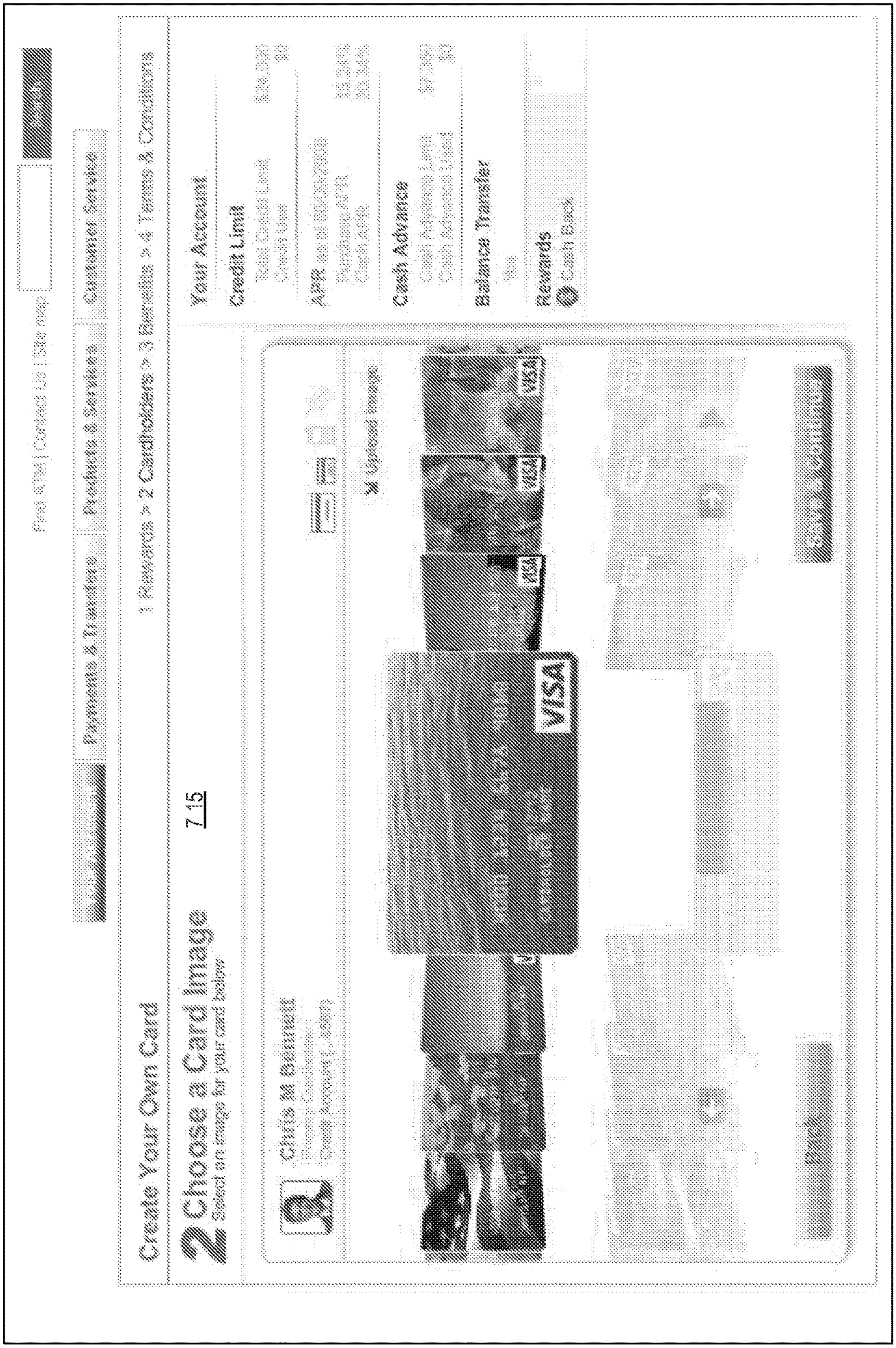

As shown in FIG. 7C, a consumer may choose a card image 715 at an exemplary UI screen 700_c_. For example, the consumer may scroll to view a list of card images and select a desired one. In further implementations, the consumer may elect to upload a picture from his computer, and the MCB-Platform may generate a customized card image based on the consumer uploaded picture.

Figure 7D:
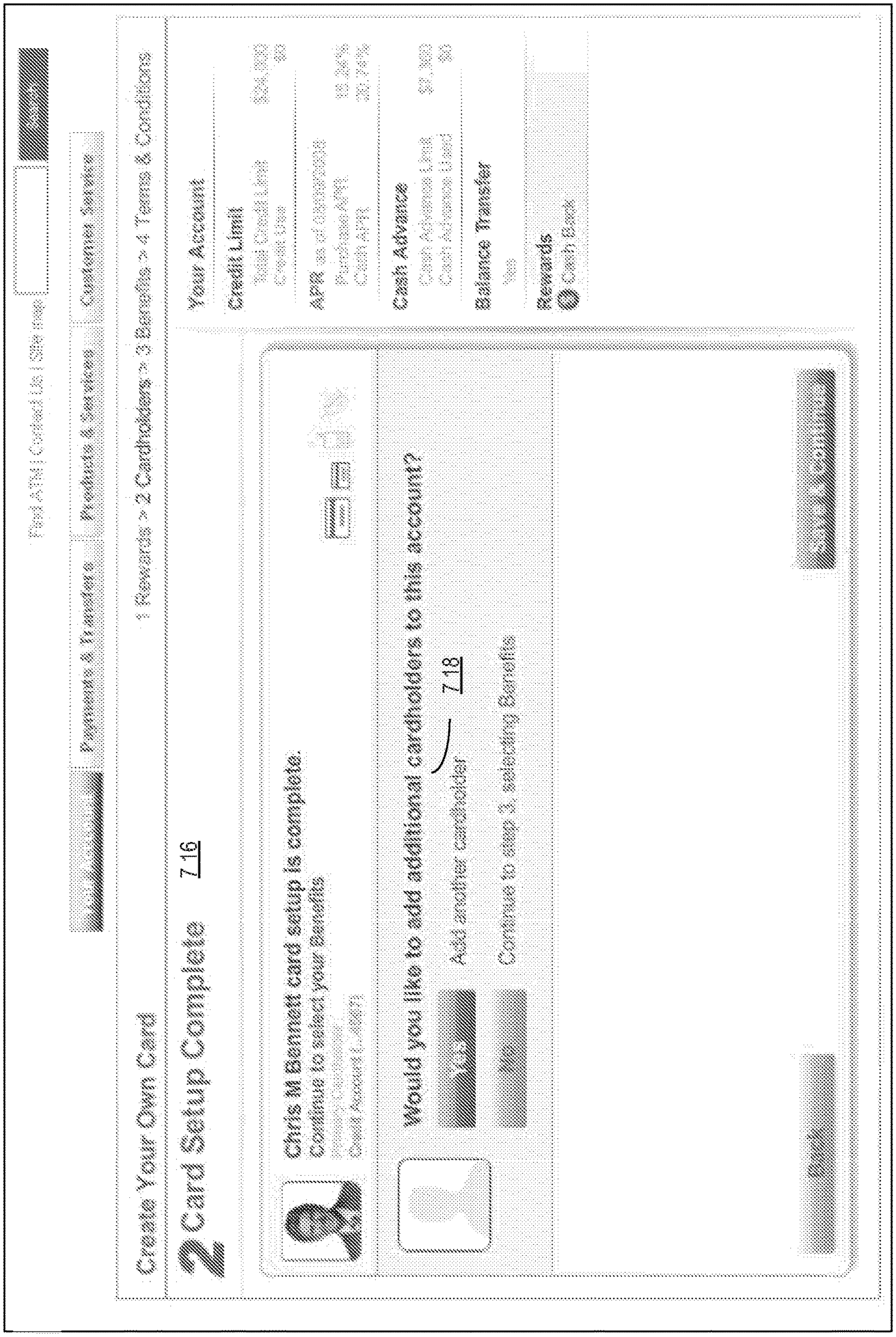

As shown in FIG. 7D, a consumer may complete card setup 716 at an exemplary UI screen 700_d_. For example, the consumer may be allowed to add additional cardholders to the added account 718, e.g., a spouse shared card, a parent credit card, a group account, and/or the like.

Figure 7E:
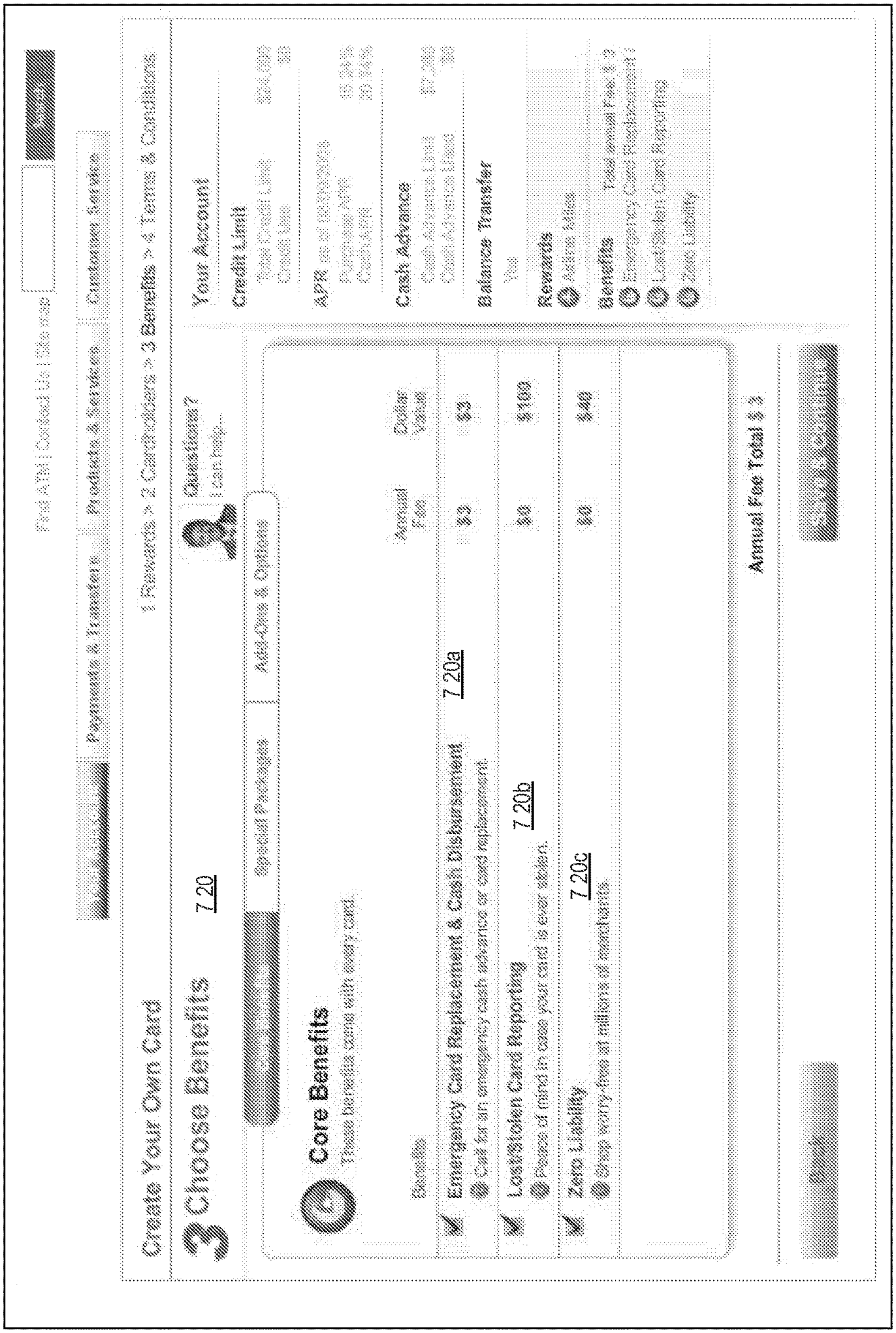

As shown in FIG. 7E, a consumer may select card benefits 720 at an exemplary UI screen 700_e_. For example, the consume may choose from a list of benefits, such as but not limited to emergency card replacement and cash disbursement 720_a_, lost/stolen card reporting 720_b_, zero liability 720_c_, and/or the like.

Figure 7F:
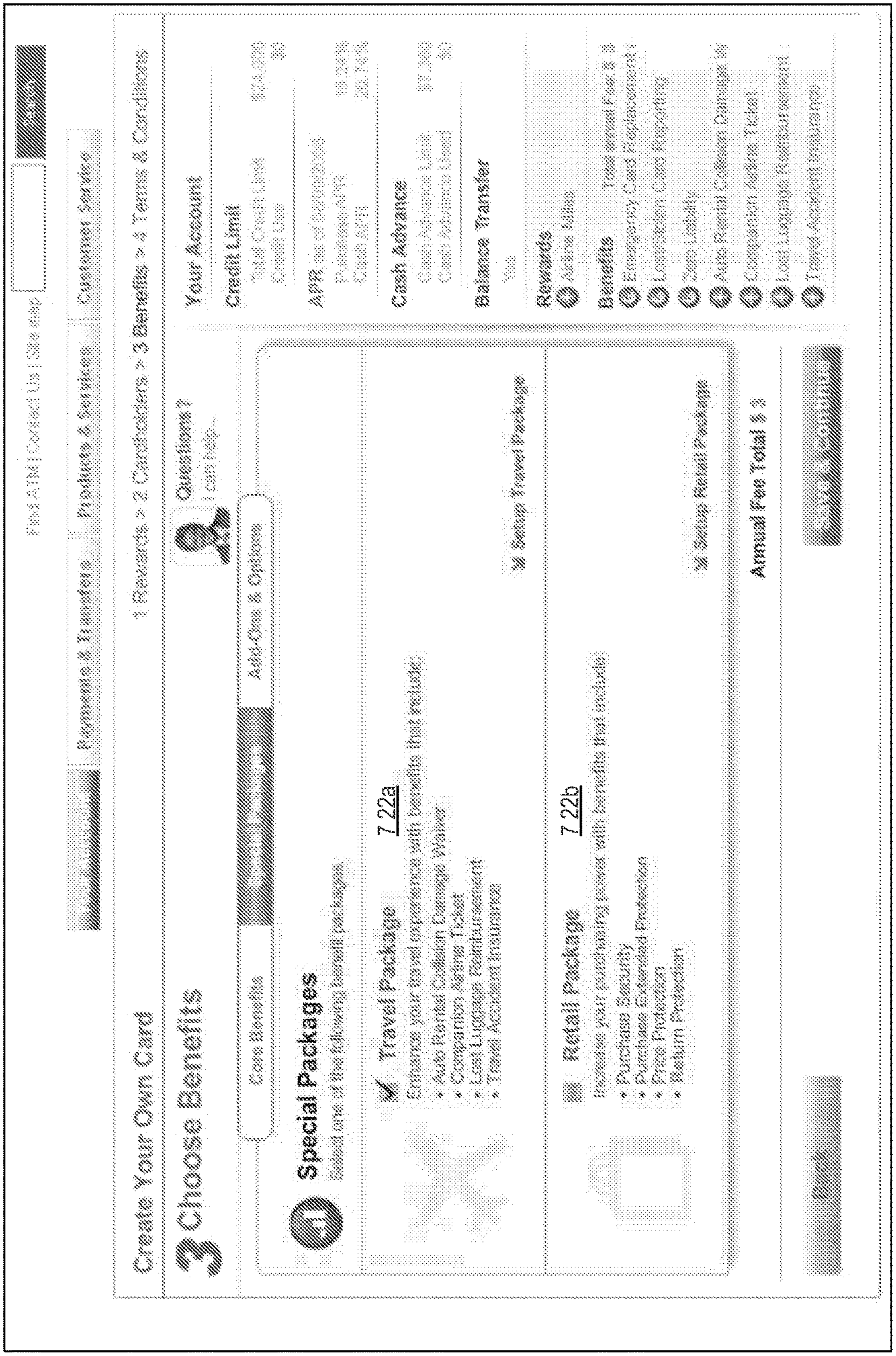
Figure 7G:
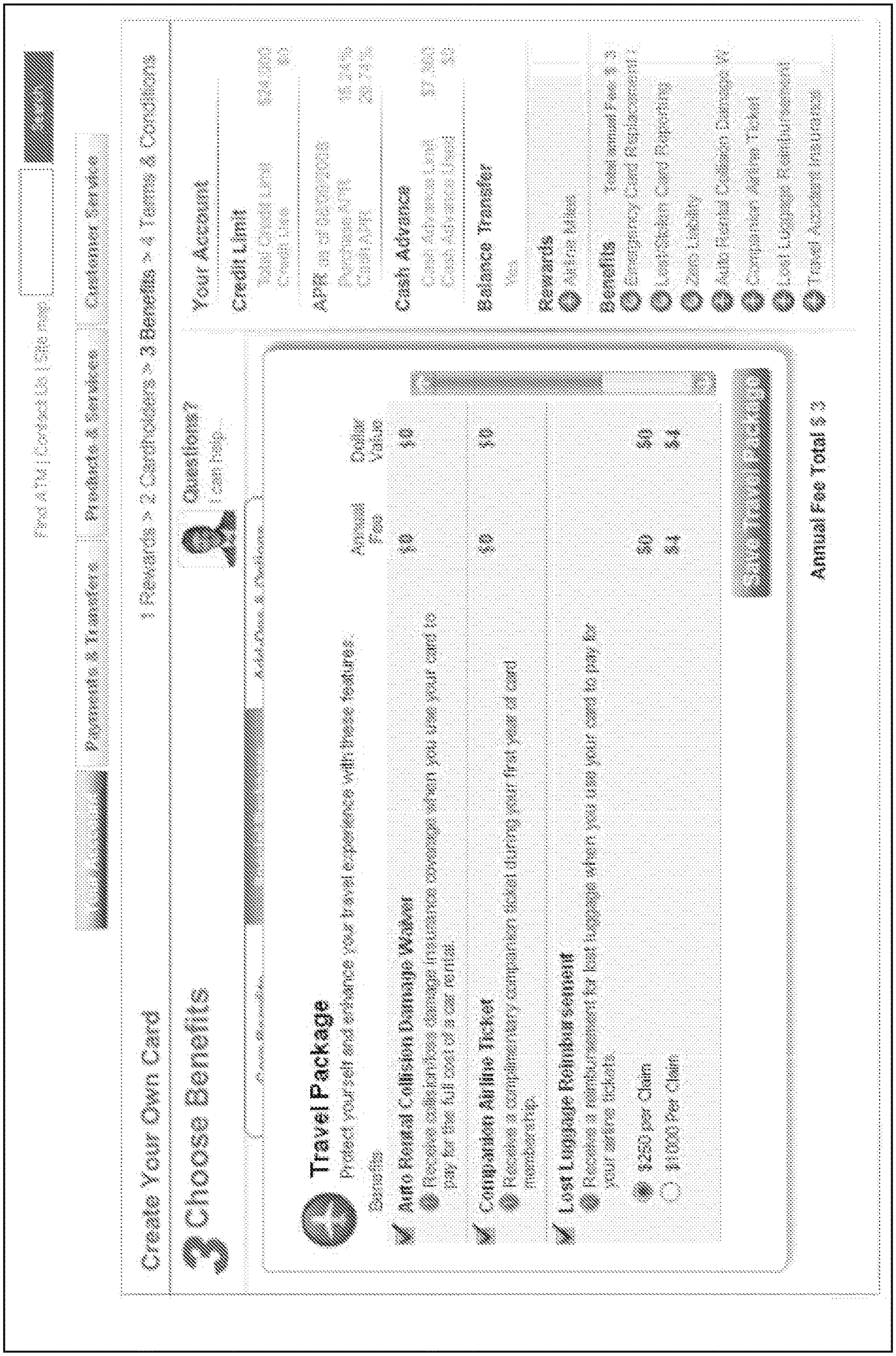
Figure 7H:
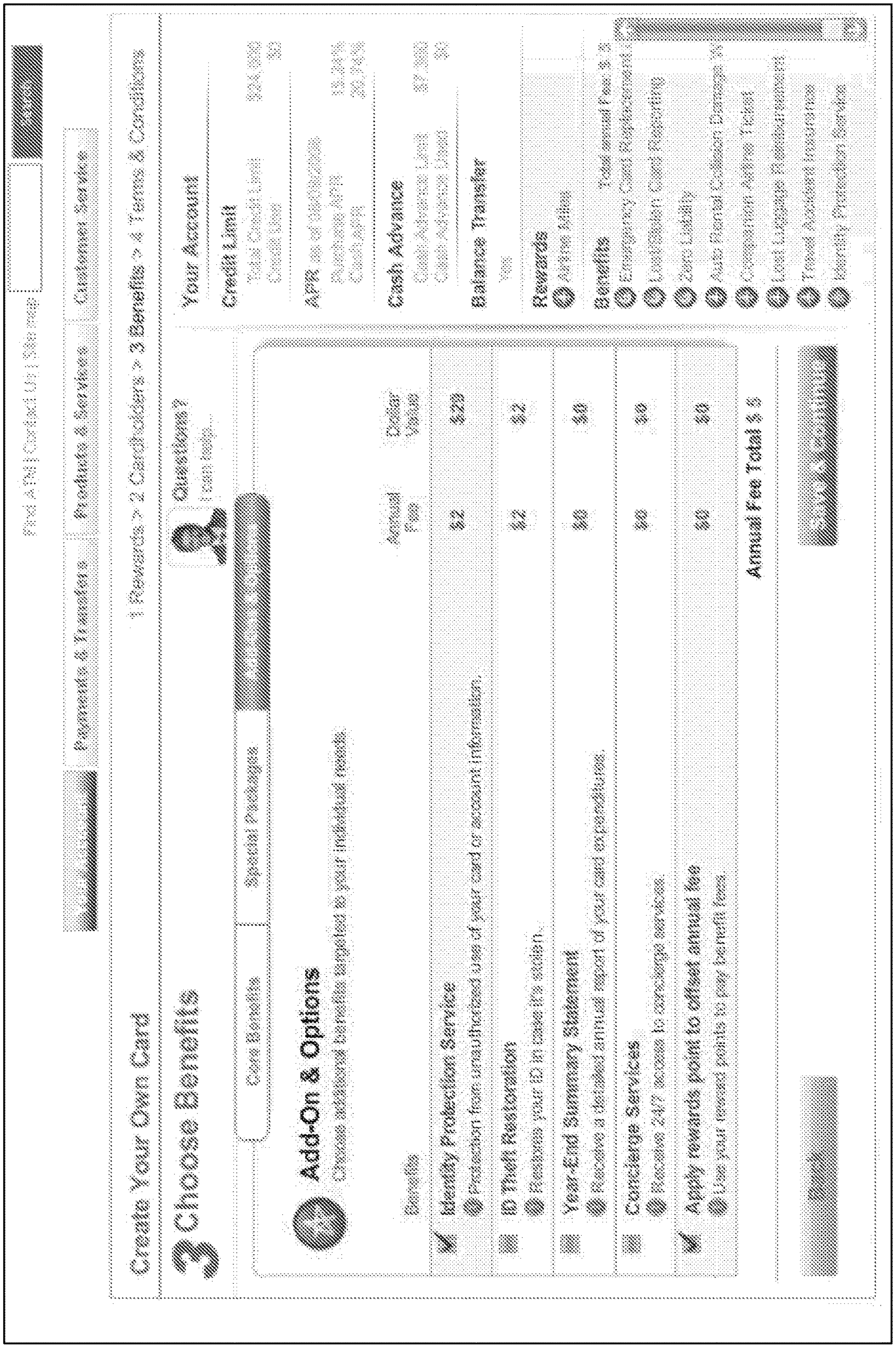

As shown in FIG. 7F, a consumer may select special packages at an exemplary UI screen 700_f_. For example, the consume may choose from a list of special packages, such as but not limited to travel package 722_a_, retail package 722_b_, and/or the like. Further details of the travel package are provided at the exemplary screen 700_g_ in FIG. 7G; and a list of add-on options are provided at the exemplary screen 700_h_ in FIG. 7H.

Figure 7I:
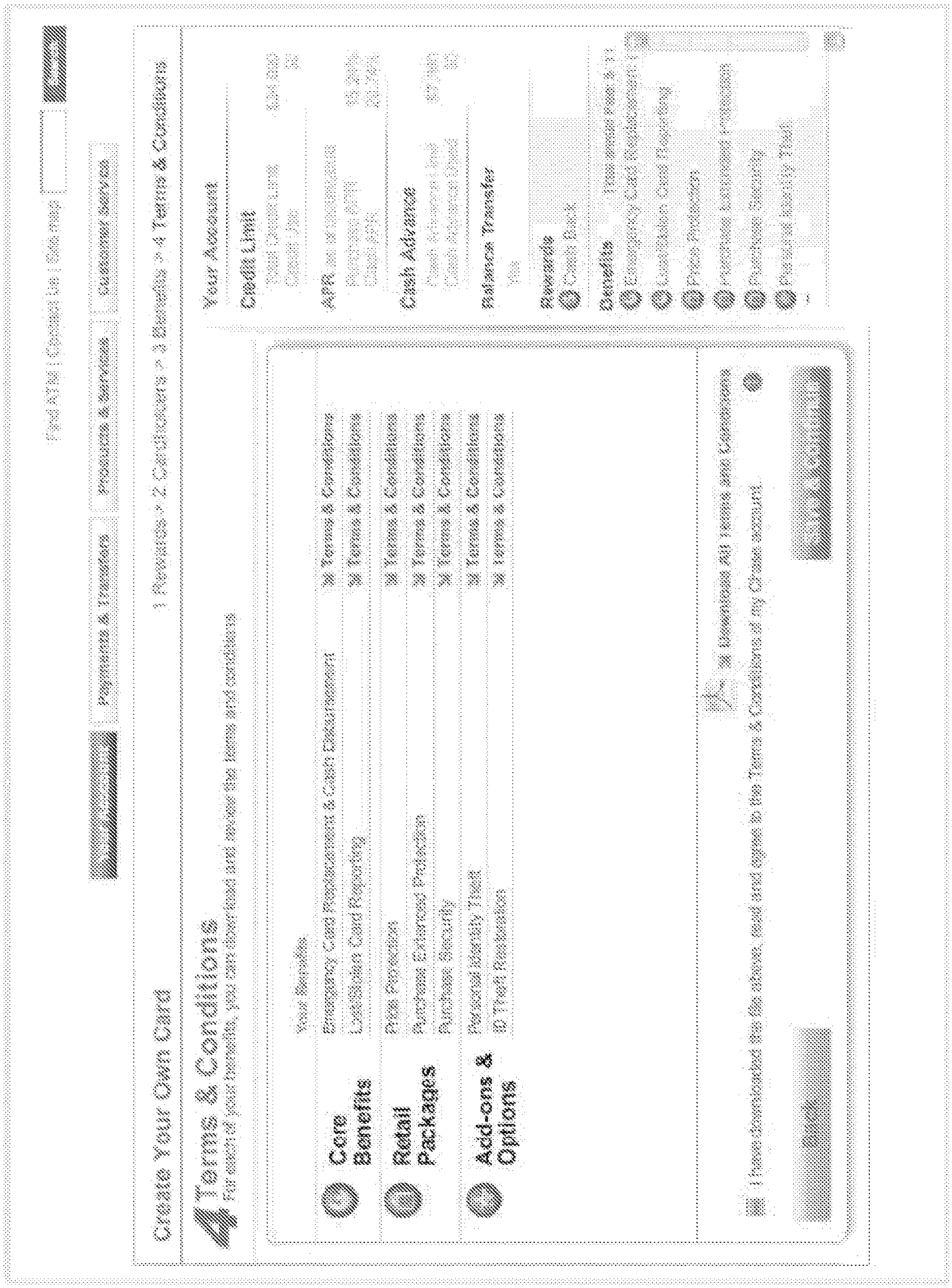
Figure 7J:
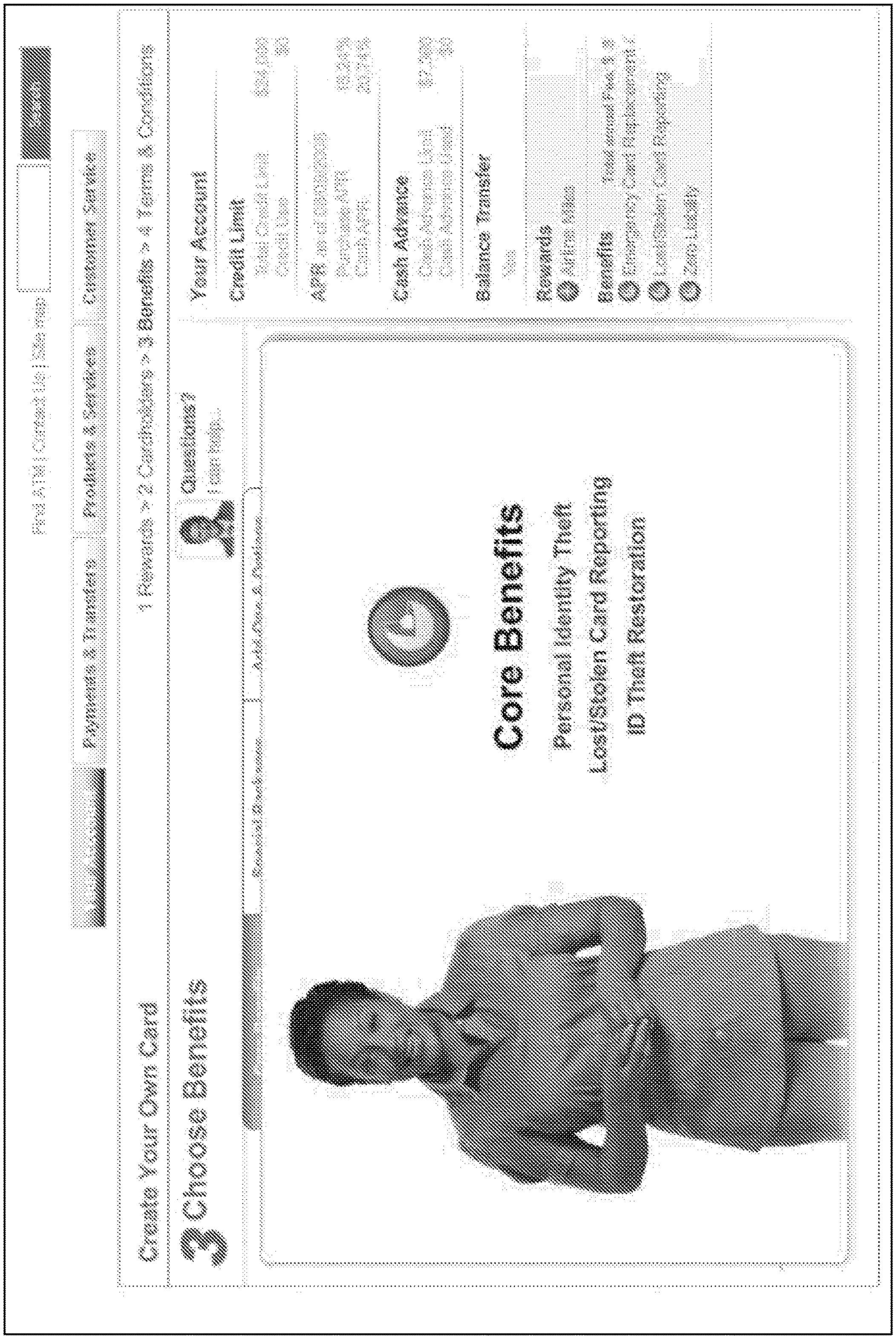
Figure 7K:
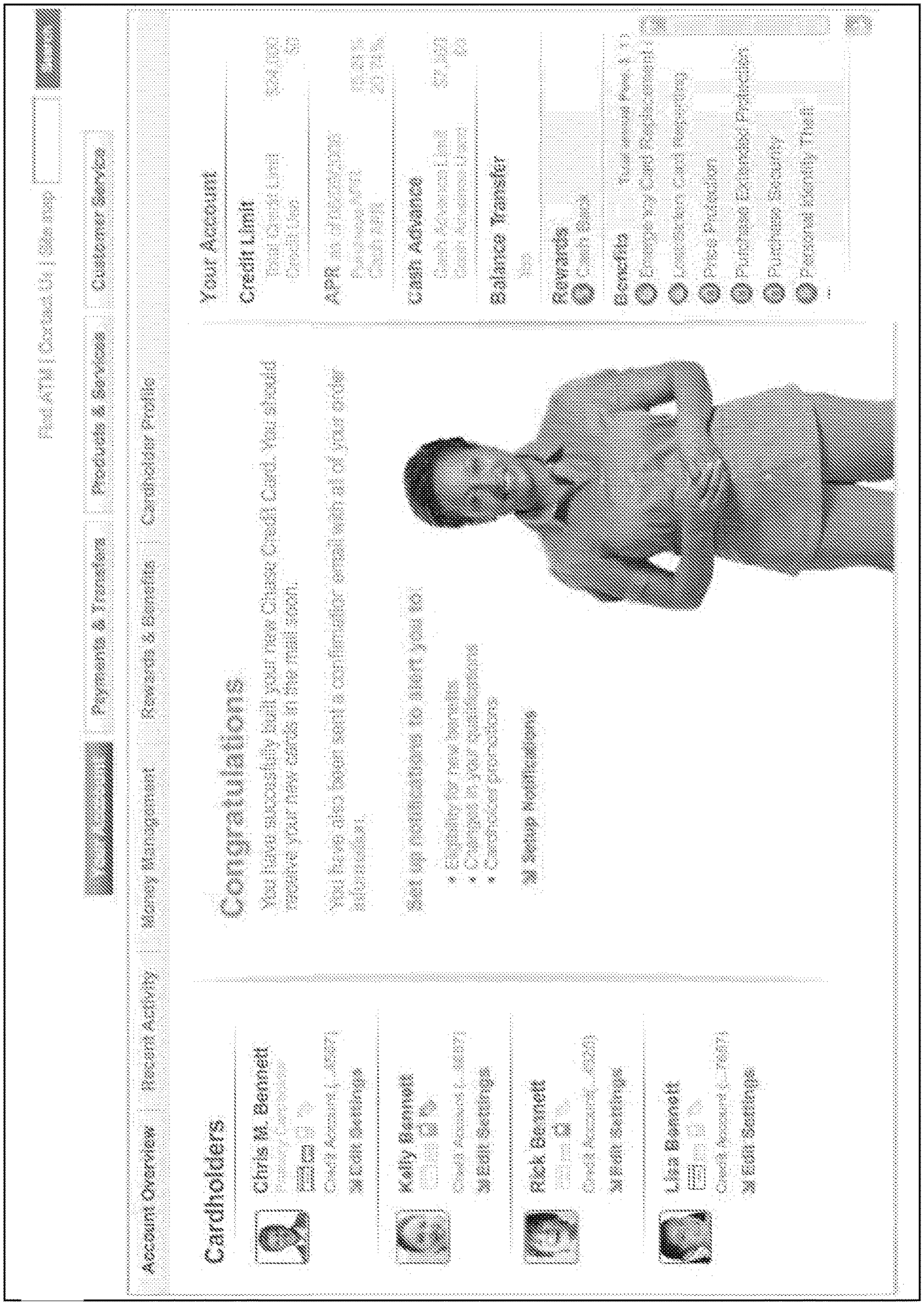

As shown in FIGS. 7I-7K, upon completion of registration, the consumer may view a summary of terms and conditions of the new card 700_i_, summary of the core benefits 700_j_, and a greeting screen including confirmation of the card enrollment 700K.

Figure 7L:
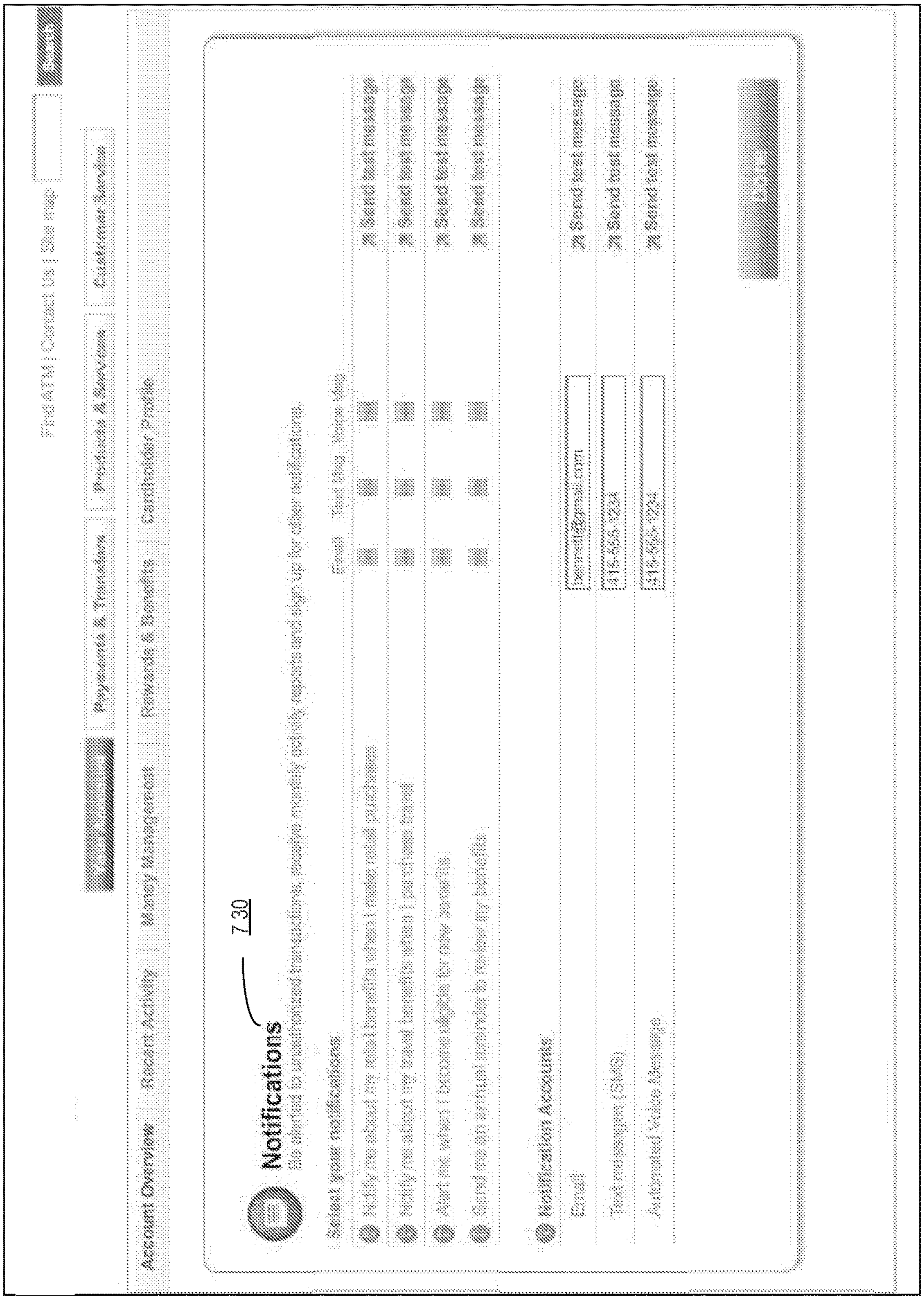

As shown in FIG. 7L, a consumer may configure notification parameters 730 at an exemplary UI screen 700_l_. For example, the consumer may select interested notification contents, notification channels (e.g., email, text messages, automated voice messages, etc.), and/or the like.

Figure 8A:
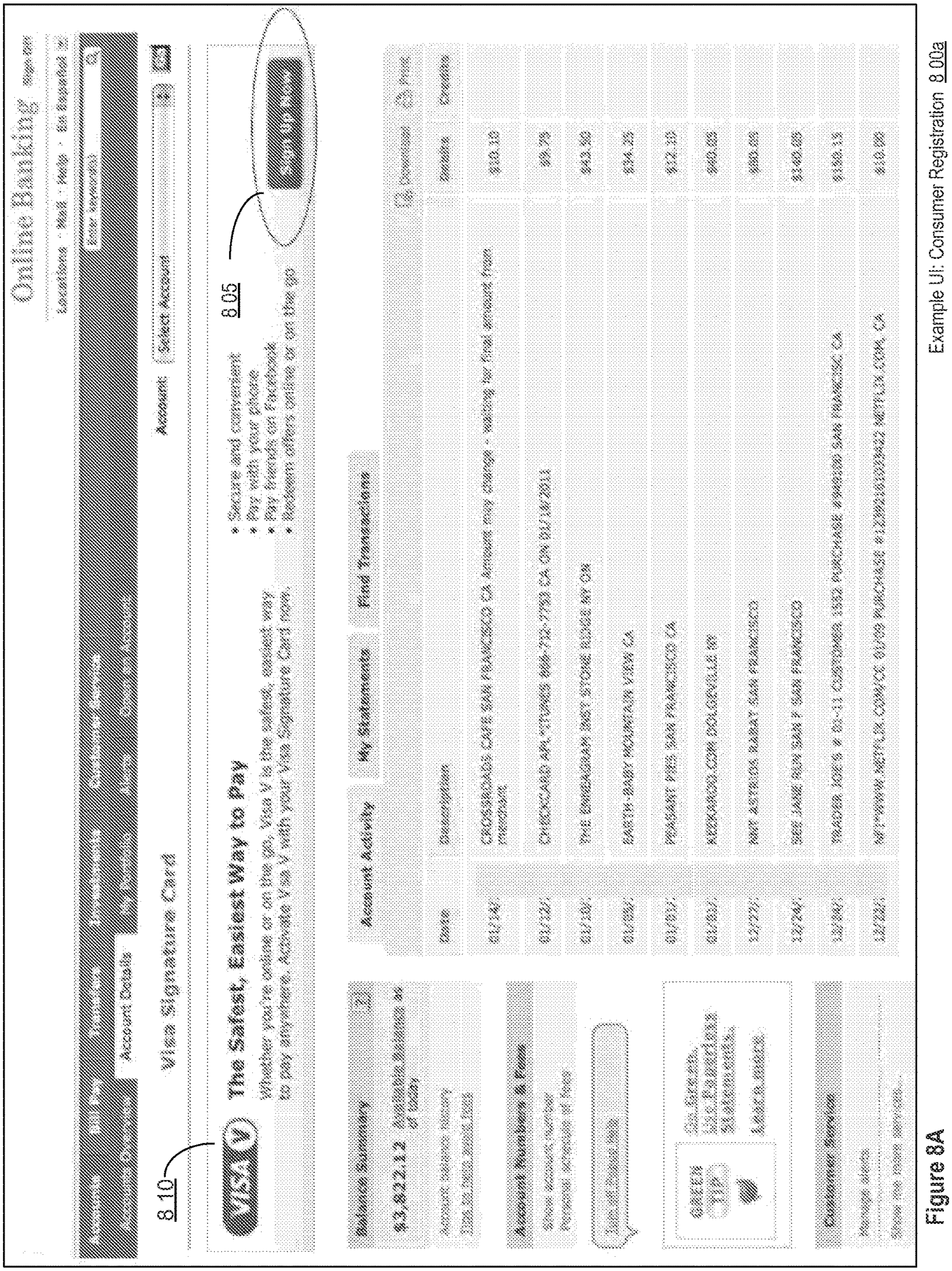
FIGS. 8A-8H provide exemplary UIs illustrating consumer registration and transaction with MCB-Platform within embodiments of the MCB-Platform.

FIGS. 8A-8H provide exemplary UIs illustrating consumer registration and transaction with MCB-Platform within embodiments of the MCB-Platform. As shown in FIG. 8A, a consumer may view a MCB-Platform registration banner, e.g., a "Visa V" logo 810, at a credit card account screen 800_a_. The consumer may select to sign up 805 to add the credit card to the MCB-Platform.

Figure 8B:
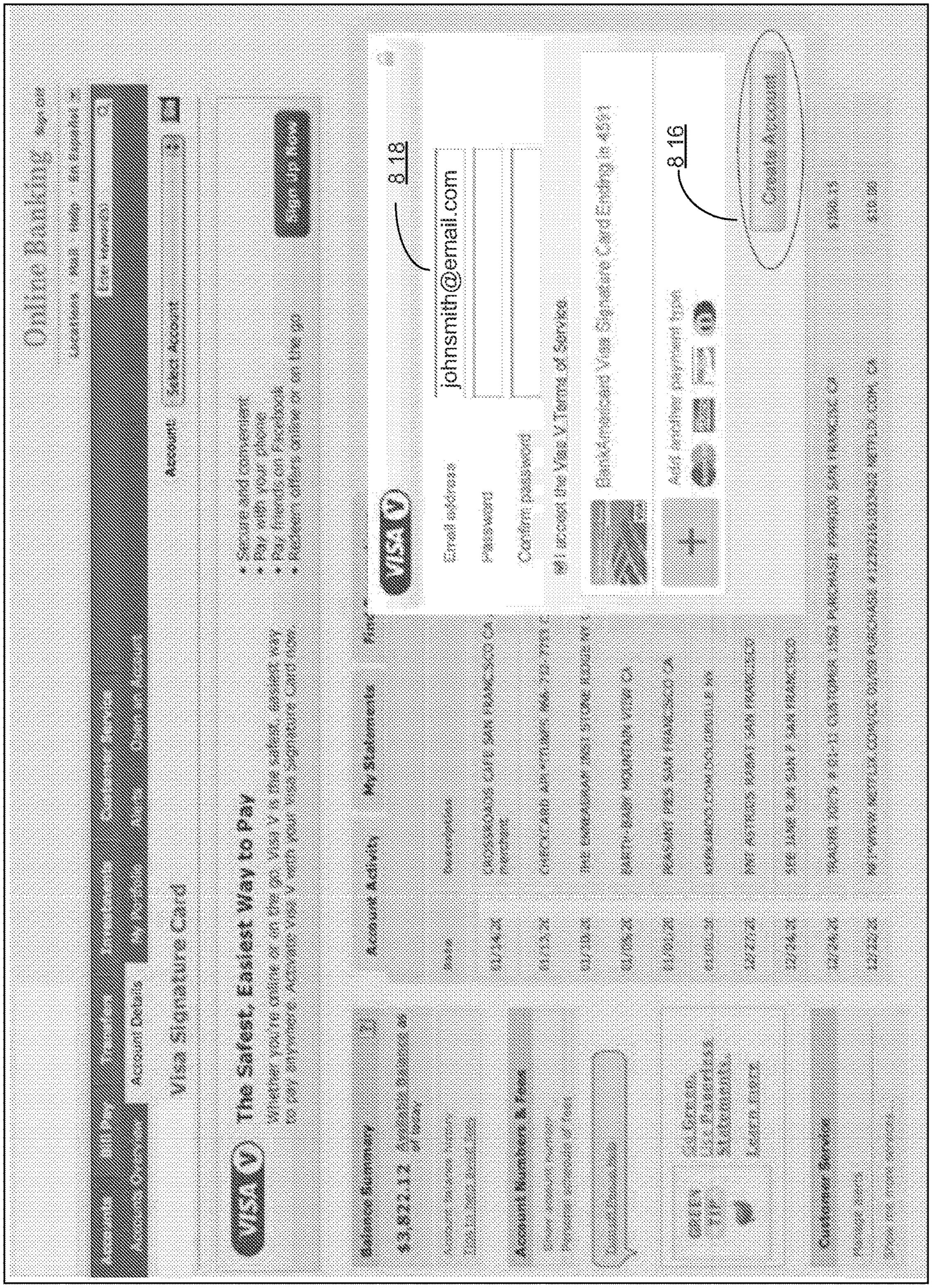

As shown in FIG. 8B, the consumer may proceed to registration 800_b_ with a pop-up window, requesting the consumer to create an account 816, by entering an email address 818, password, etc.

Figure 8C:
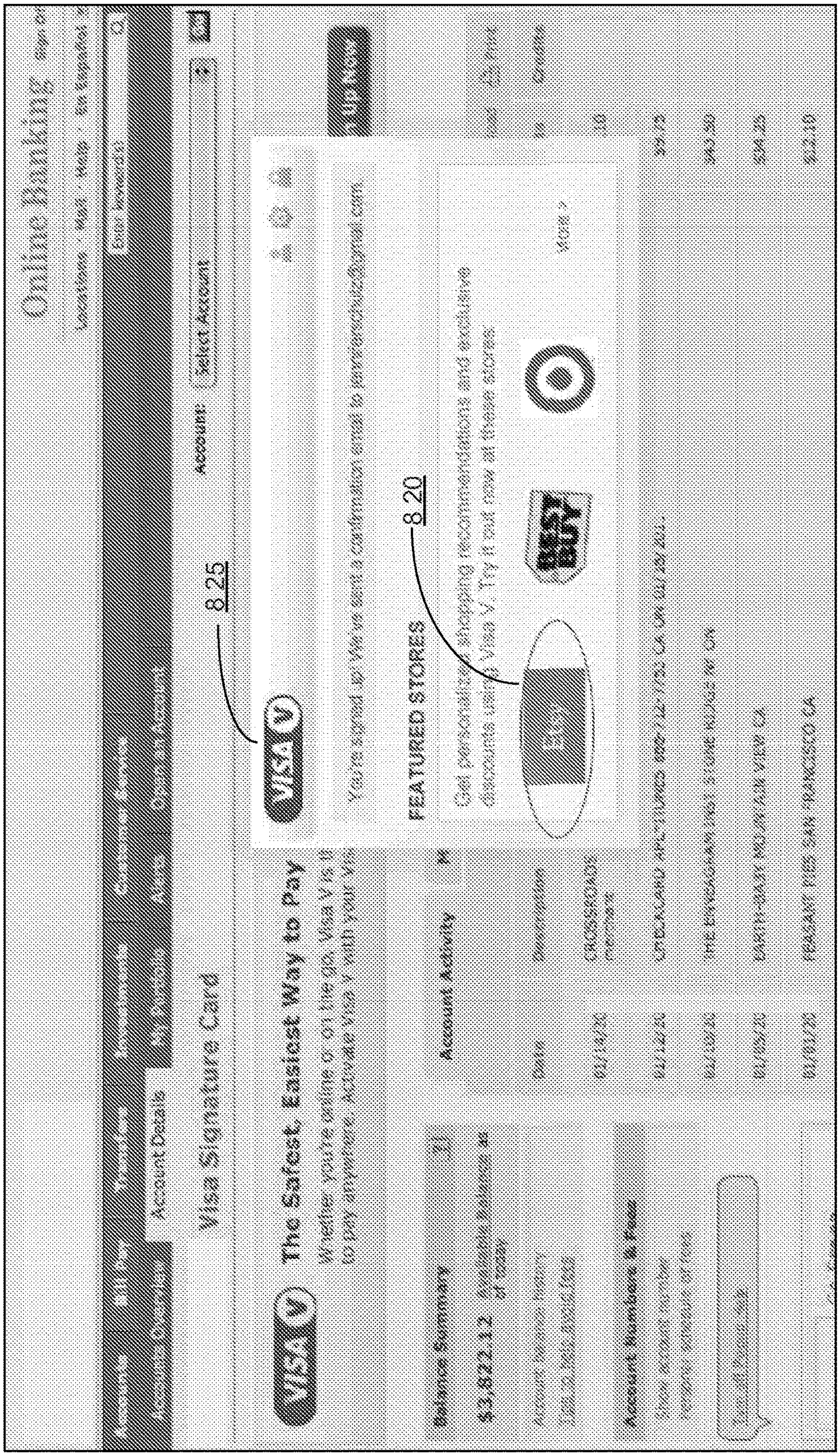

As shown in FIG. 8C, the consumer may view a pop-up window 825 in the exemplary UI 800_c_, which provide a list of feature stores 820 with the MCB-Platform. The featured stores may provide offers and coupons to the consumer via the registered account.

Figure 8D:
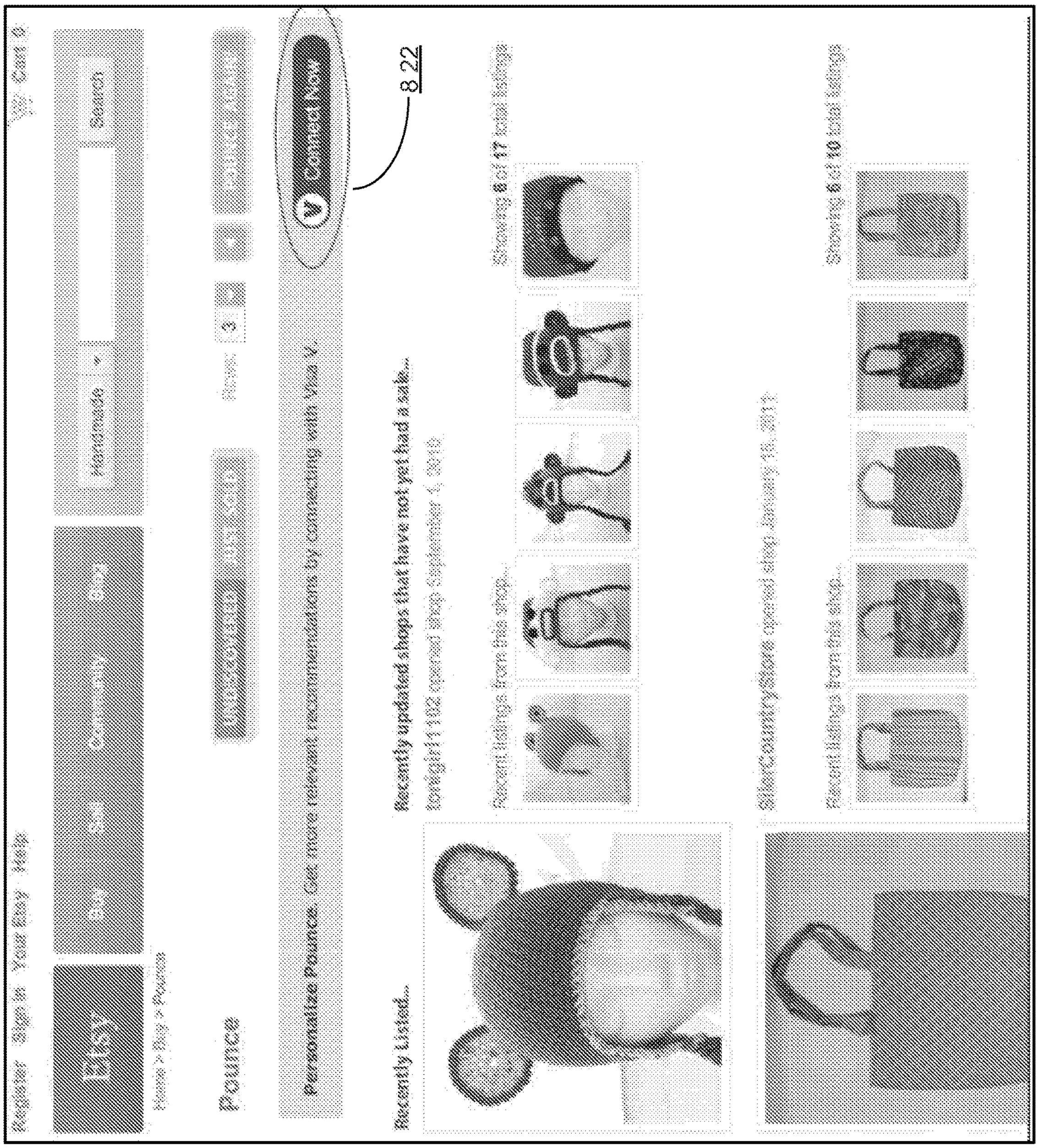

As shown in FIG. 8D, the consumer may visit a featured merchant site, e.g., Esty, etc to receive offers 800_d_. For example, the consumer may view a MCB-Platform logo requesting "connect now" 822 so that the shopping experience at the merchant site may be linked to the consumer's MCB-Platform wallet.

Figure 8E:
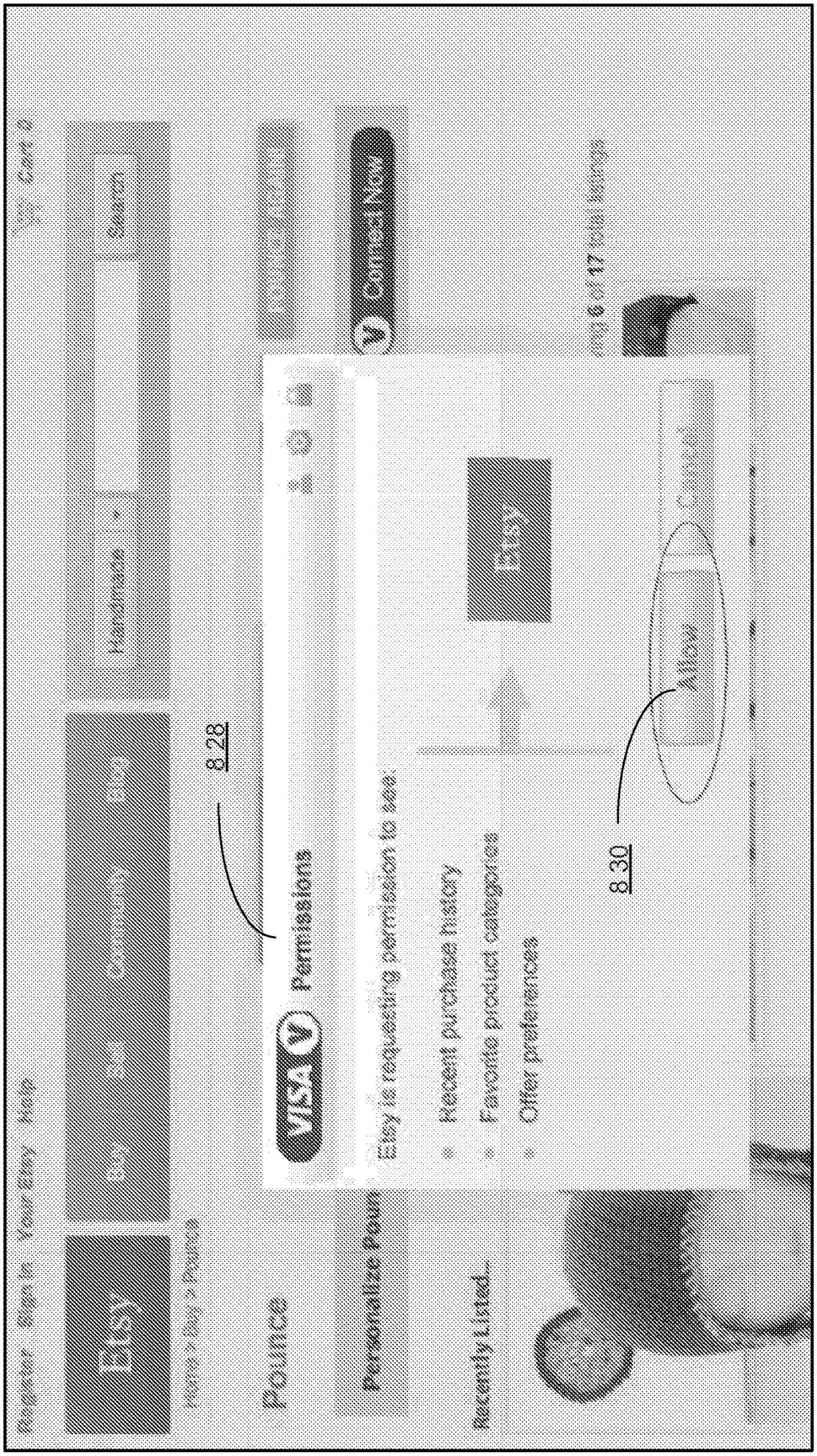

As shown in FIG. 8E, the consumer may visa a MCB-Platform pop-up 828 requesting permission of the user to connect to wallet at an offer bridging screen 800_e_. The consumer may click "allow" to connect to his wallet 830.

Figure 8F:
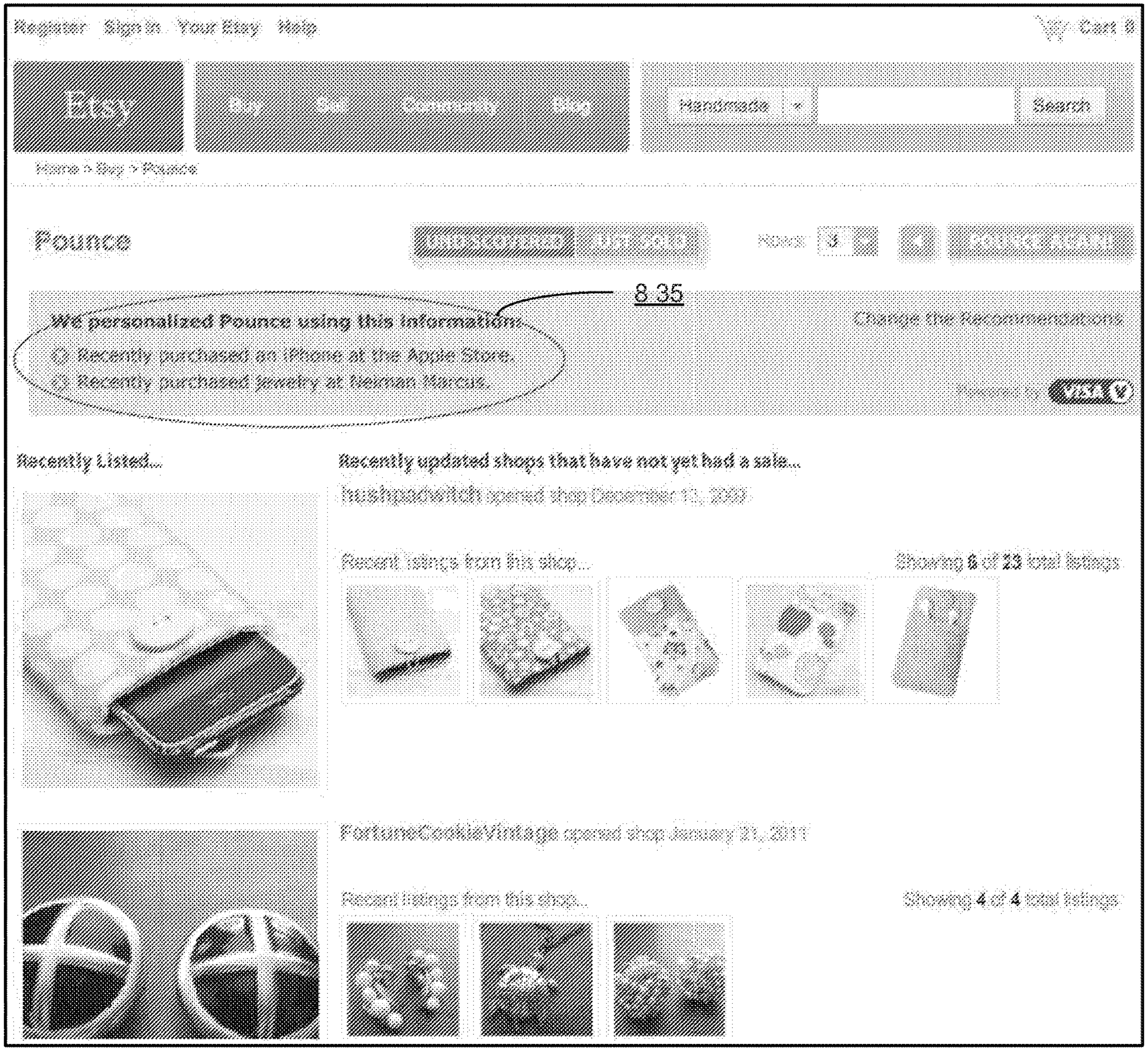

As shown in FIG. 8F, the consumer may view offer bridging information 835 at the offer bridging screen 800_f_. For example, the MCB-Platform may provide offer suggestions based on the consumer's recent purchase history.

Figure 8G:
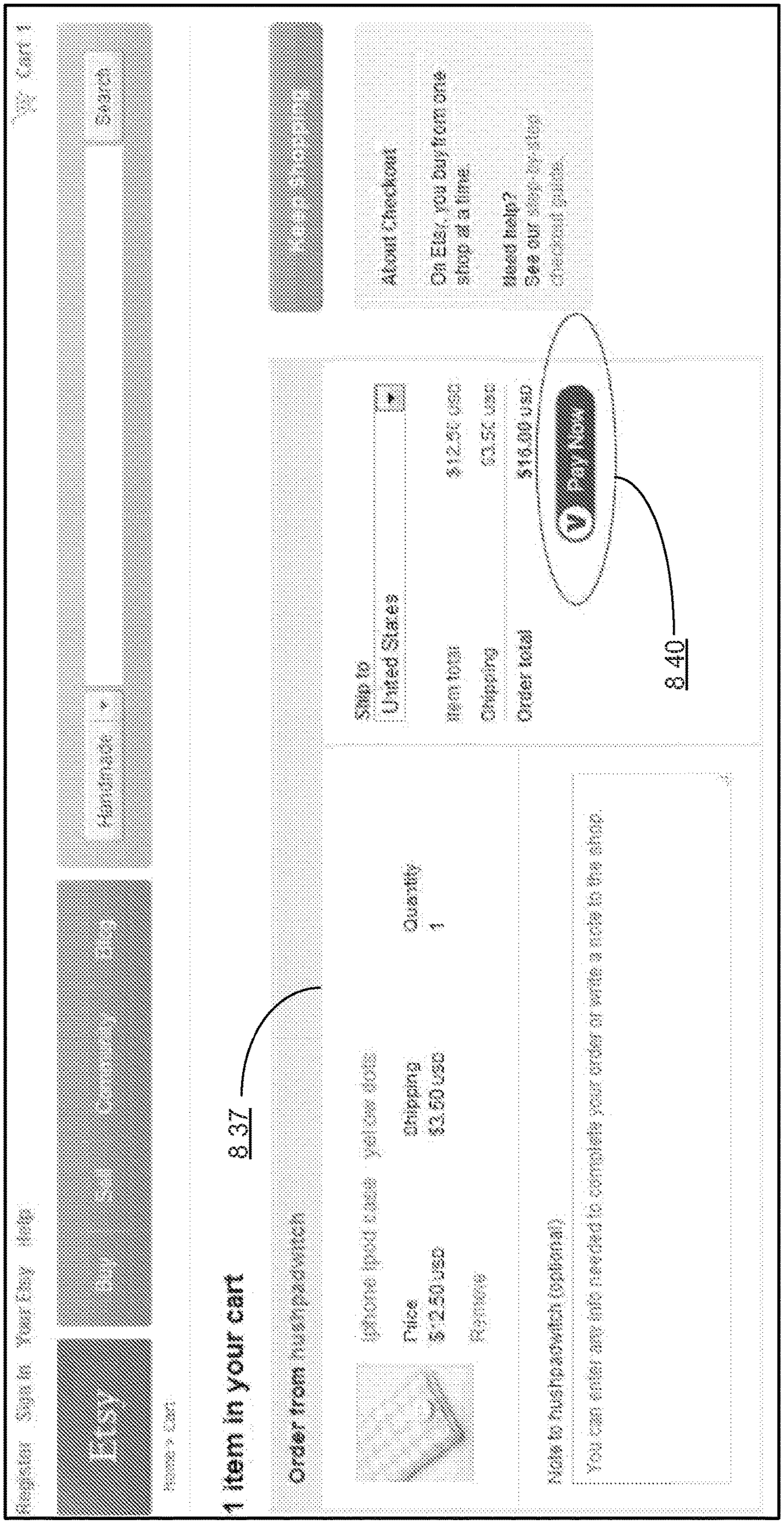

As shown in FIG. 8G, the consumer may proceed to payment at an offer redemption and payment screen 800_g_. For example, the consumer may view an order summary 837, and select to pay with MCB-Platform 840.

Figure 8H:
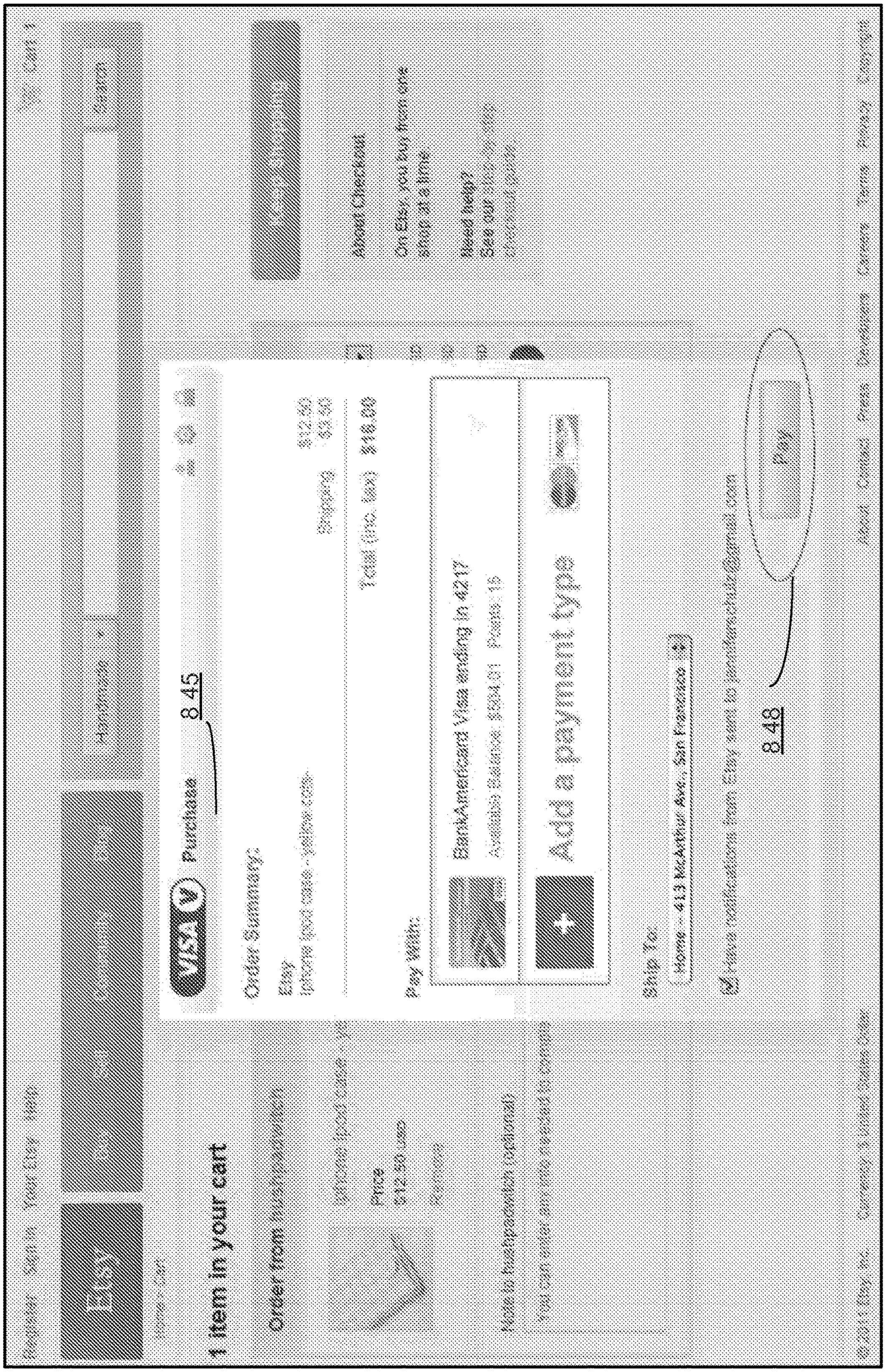

As shown at 800_h_ in FIG. 8H, the consumer may view a pop-up window of the order summary 845, which allows the consumer to select a payment card associated with the wallet, and confirm payment 848.

Figure 9A:
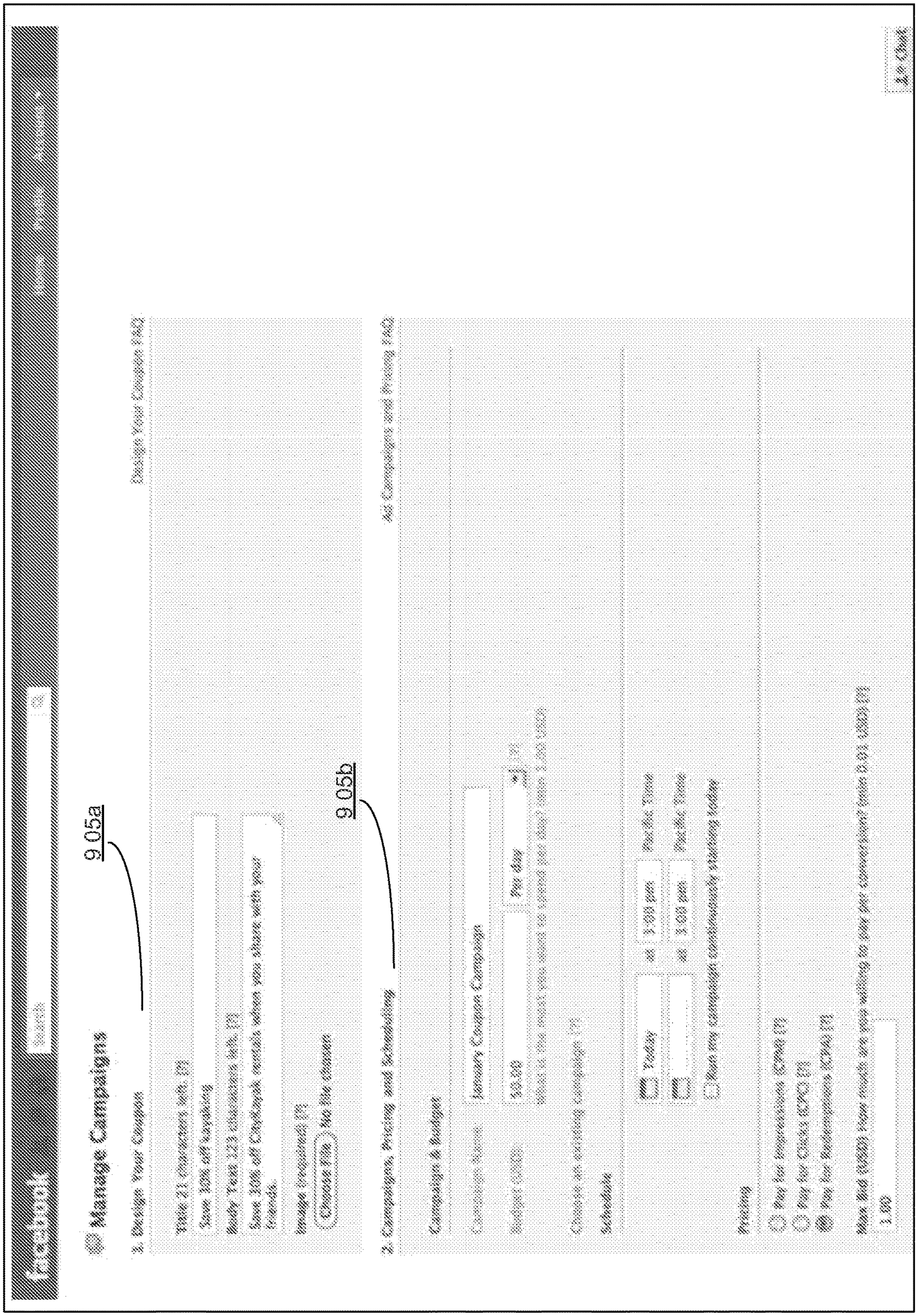
FIGS. 9A-9F provide exemplary UIs illustrating merchant distributing offers over social media with MCB-Platform within embodiments of the MCB-Platform.

FIGS. 9A-9H provide exemplary UIs illustrating merchant distributing offers over social media with MCB-Platform within embodiments of the MCB-Platform. In one implementations, the MCB-Platform may recognize consumers at the point-of-transaction as someone the merchant values and someone who 'Likes' the merchant on social media, e.g., the consumer's wallet becomes a physical "Checkin." In one implementation, the MCB-Platform may issue offers to a consumer via a social media platform, as a "bonus" to the consumer for sharing information with regard to a merchant, e.g., comments, "likes," news feeds, "check-in" at merchant stores, and/or the like. In one implementation, the MCB-Platform may populate offers and communication messages to the social media via API calls, e.g., Facebook API, etc. For example, wallet APIs may be facilitated with Facebook API. An exemplary Javascript API to initiate payment flow UI may take a form similar to:

FB.ui({method:"payment, id: A547B243, onComplete: myCallback});

As shown at the offer bridging screen 900_a_ in FIG. 9A, the merchant may manage campaign 905_a_ on Facebook by designing a coupon. In one implementation, the merchant may specify campaign parameters, such as campaign budget, campaign schedule, campaign pricing details, and/or the like.

Figure 9B:
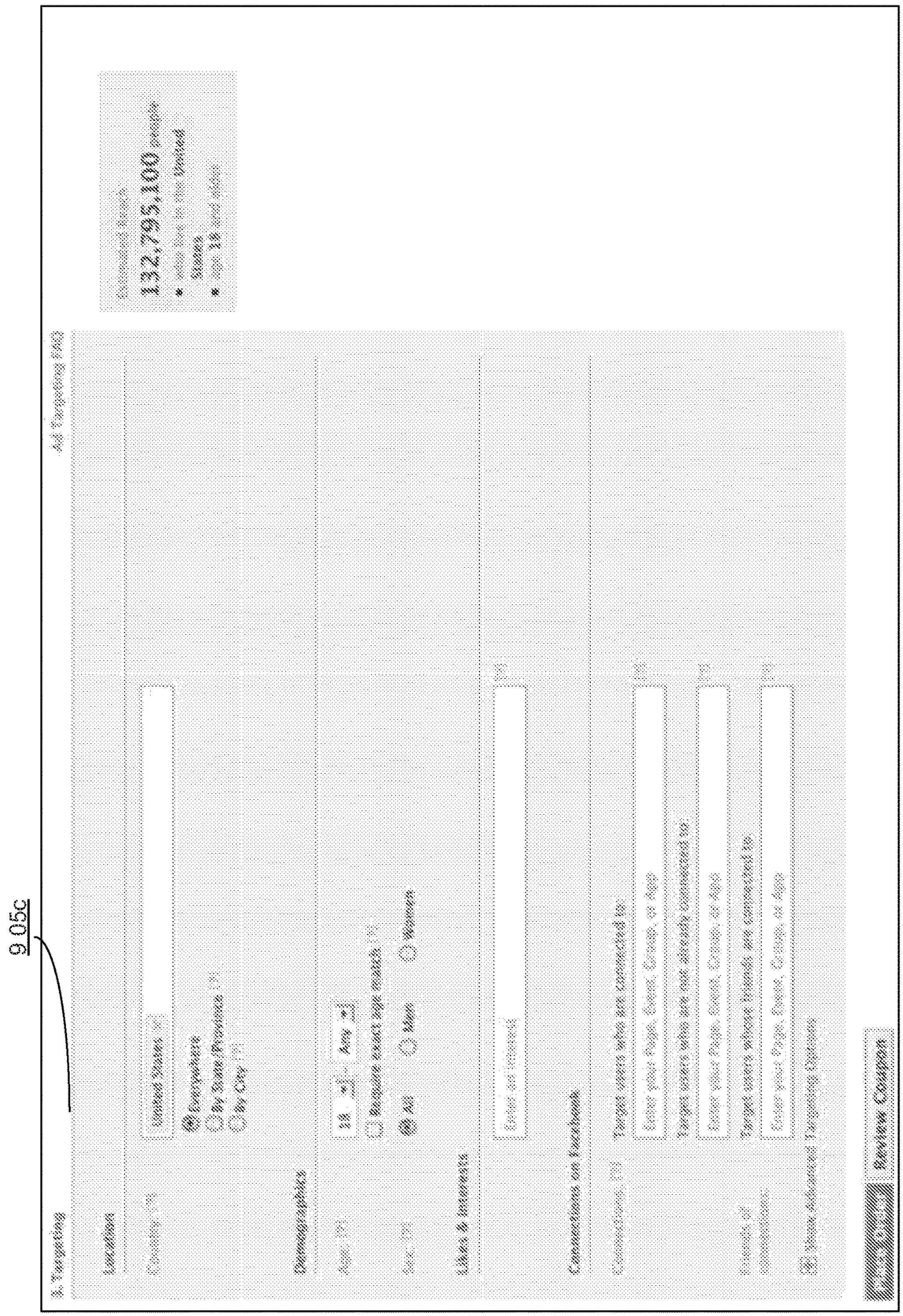

As shown at the UI 900_b_ in FIG. 9B, the merchant may further configure campaign targeting parameters 905_c_, including locations, demographics, likes/interest, connections on Facebook, and/or the like.

Figure 9C:
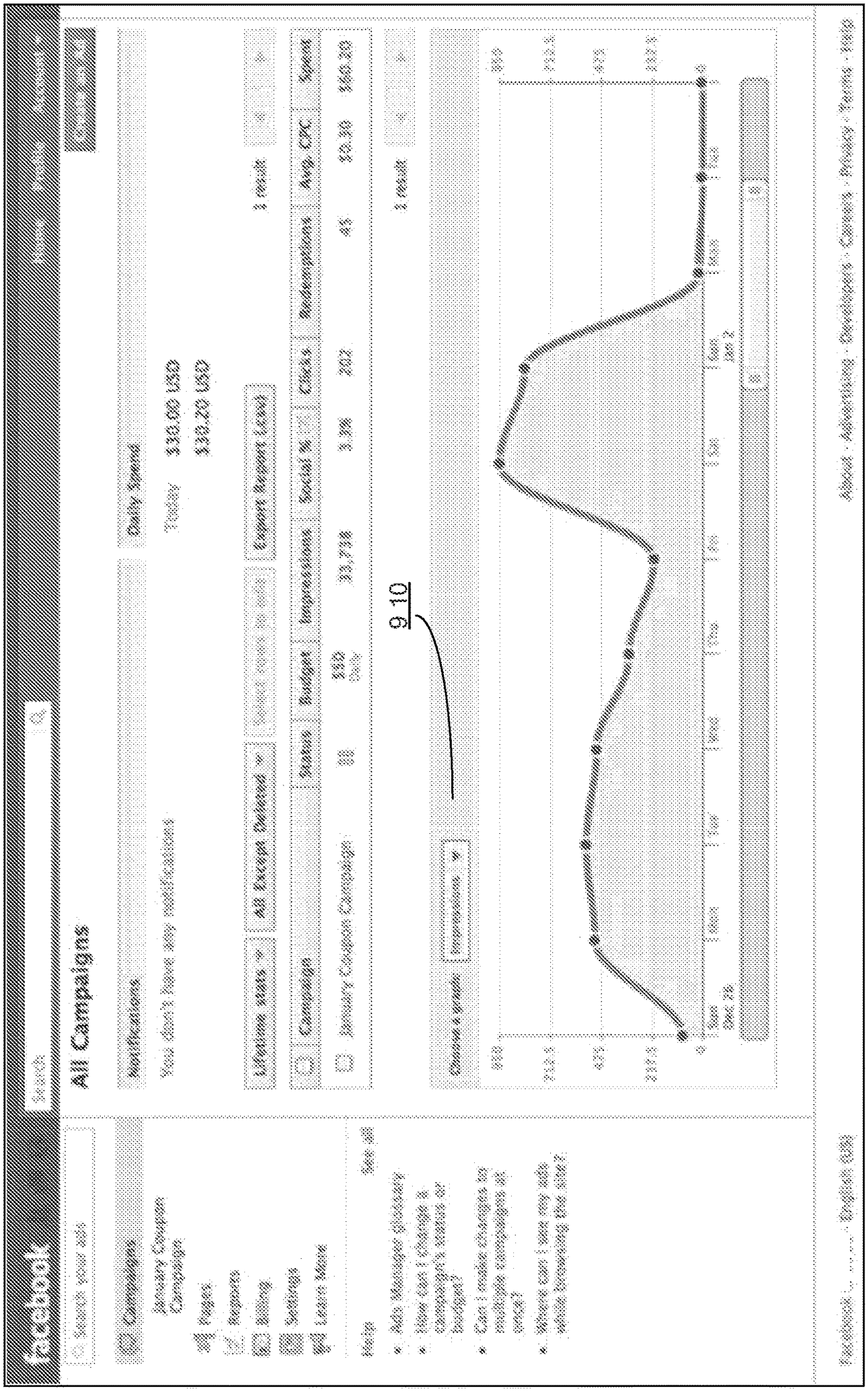
Figure 9D:
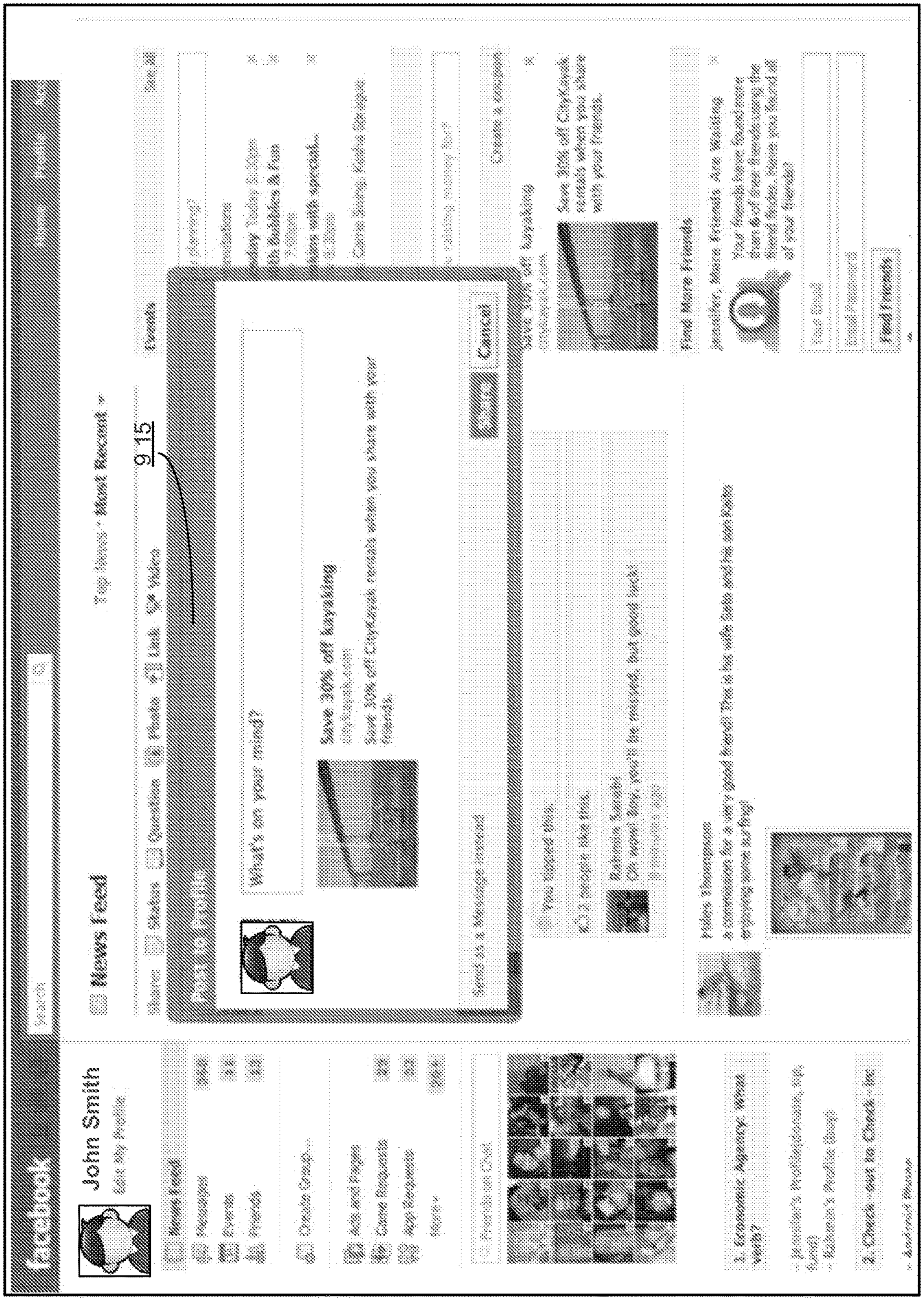
Figure 9E:
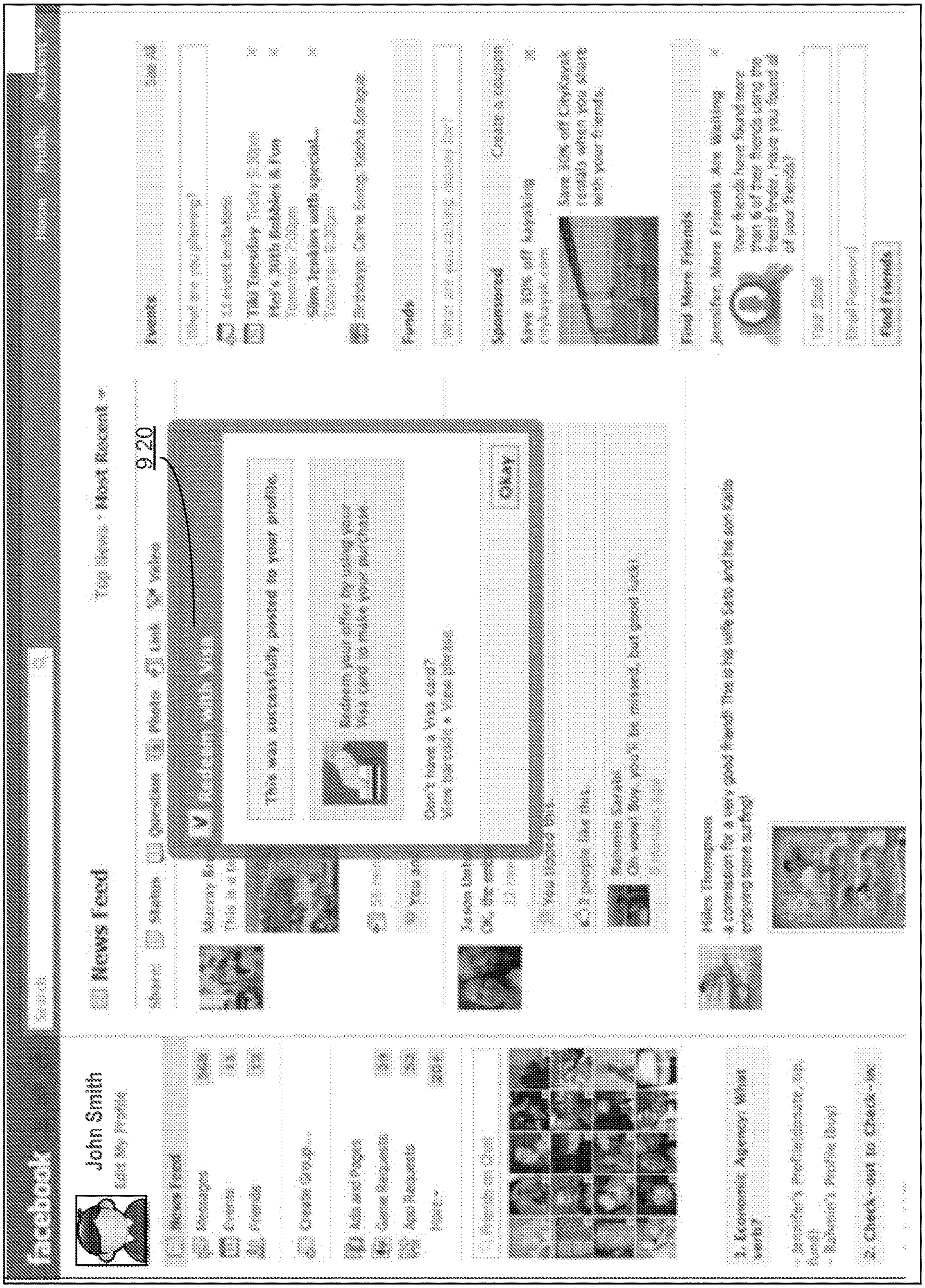
Figure 9F:
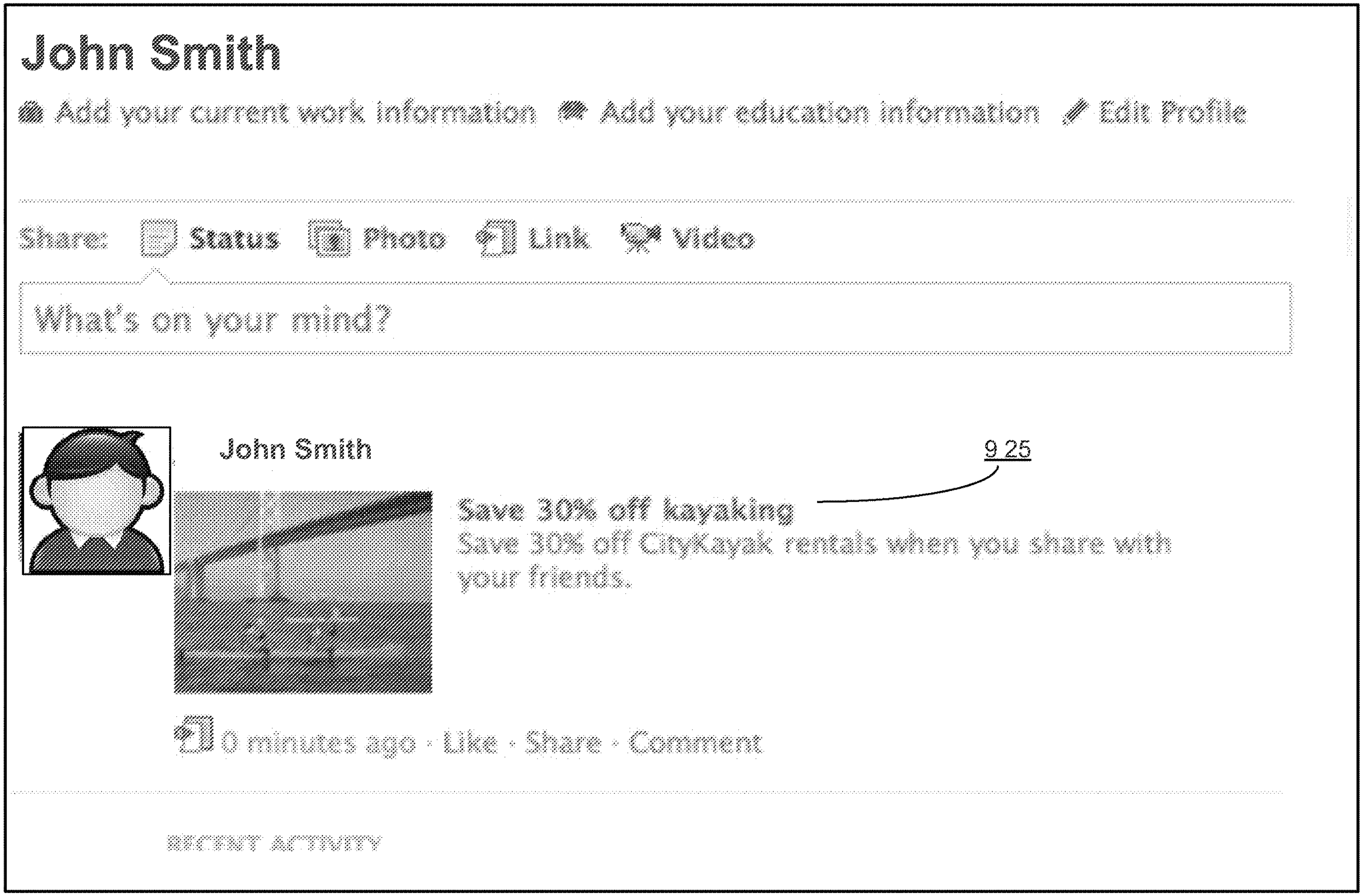

As shown at the UI 900_c_ in FIG. 9C, the merchant may view a graphic presentation 910 of the campaign performance. As shown at the UI 900_d_ in FIG. 9D, a consumer may view a prompt offer via his social media page 915. As shown at the UI 900_e_ in FIG. 9E, the consumer may select to redeem the offer via MCB-Platform 920, wherein the offer has already been associated with the consumer's wallet (e.g., a Visa card). As shown at the UI 900_f_ in FIG. 9F, a social media message of the offer may be automatically posted to the consumer's social media page 925, which may indicates sharing with friends triggers new offers.

Figure 9G:
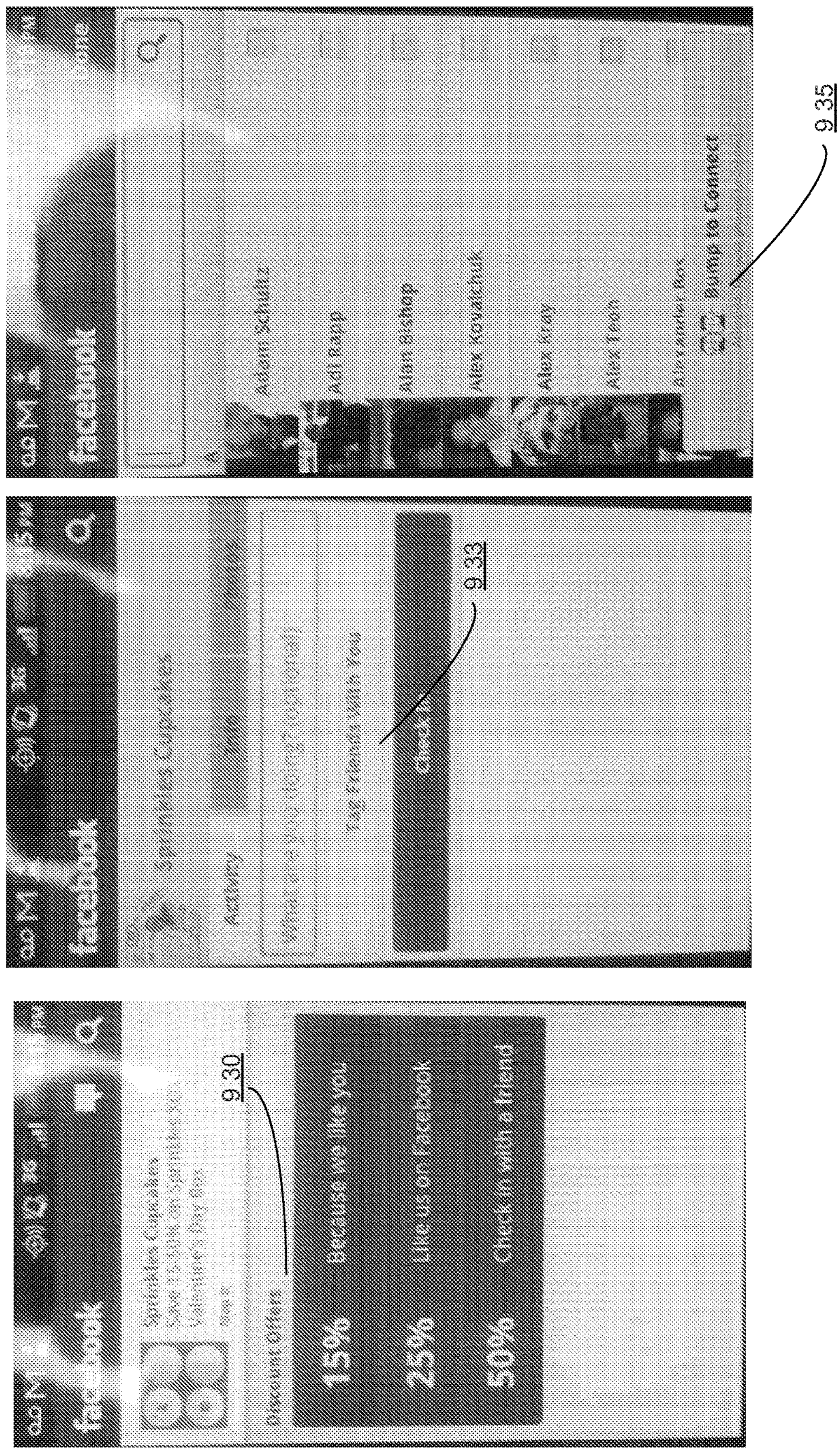
FIGS. 9G-9H provides exemplary mobile screens 900*g*-900*h* of offer bridging via MCB-Platform within implementations of the MCB-Platform.
Figure 9H:
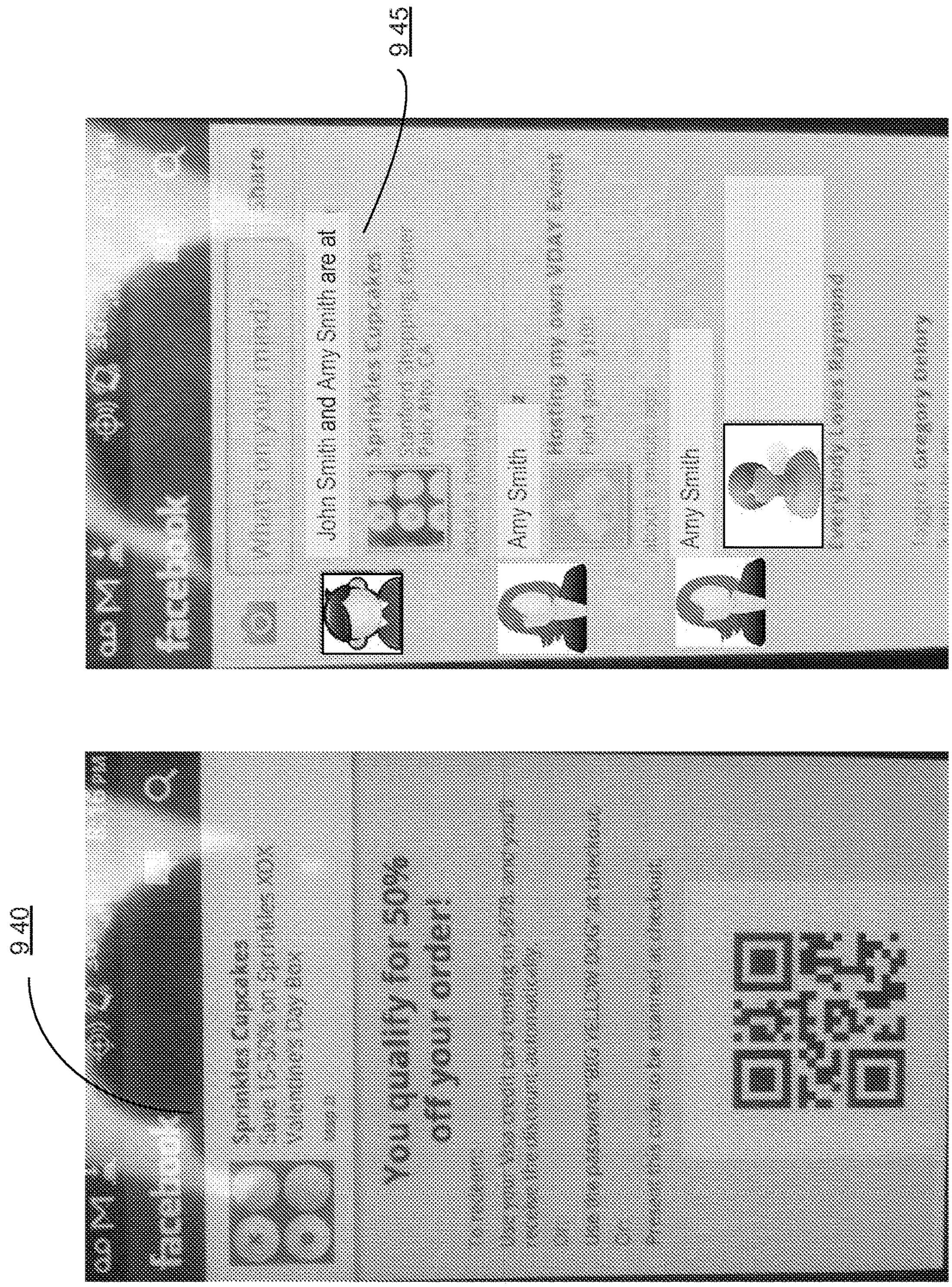

FIGS. 9G-9H provides exemplary mobile screens 900_g_-900_h_ of offer bridging via MCB-Platform within implementations of the MCB-Platform. In one implementation, a consumer may operate a smart phone (e.g., an Apple iPhone) to register with, and receive offers from the MCB-Platform. A consumer may maintain a profile at the MCB-Platform including his name, account number, security code, PIN, address, social security, GPS location, merchant account ID, and/or the like. In another implementation, as shown at 930 in FIG. 9G, and/or 940 in FIG. 9H, the consumer may retrieve reward offer from his mobile electronic wallet account connected to social media. The consumer may "check in" to a place or "tag friends" who is at the transaction merchant store with him 933 via social media, and may select from a friends list 935 to connect with a friend who's at the same transaction merchant store. As shown in FIG. 9H, the MCB-Platform may populate an automatic message on the consumer's social media profile showing their locations at the merchant store 945.

MCB-Platform Universal Value Equivalents (UVE)

Figure 10A:
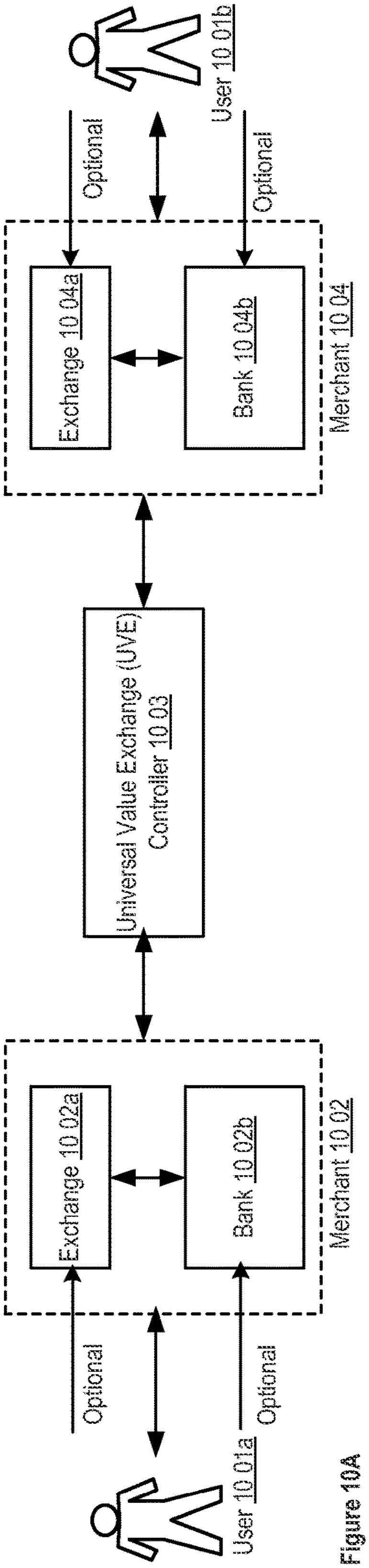
FIGS. 10A-B show block diagrams illustrating various example embodiments of the MCB-Platform.
Figure 10B:
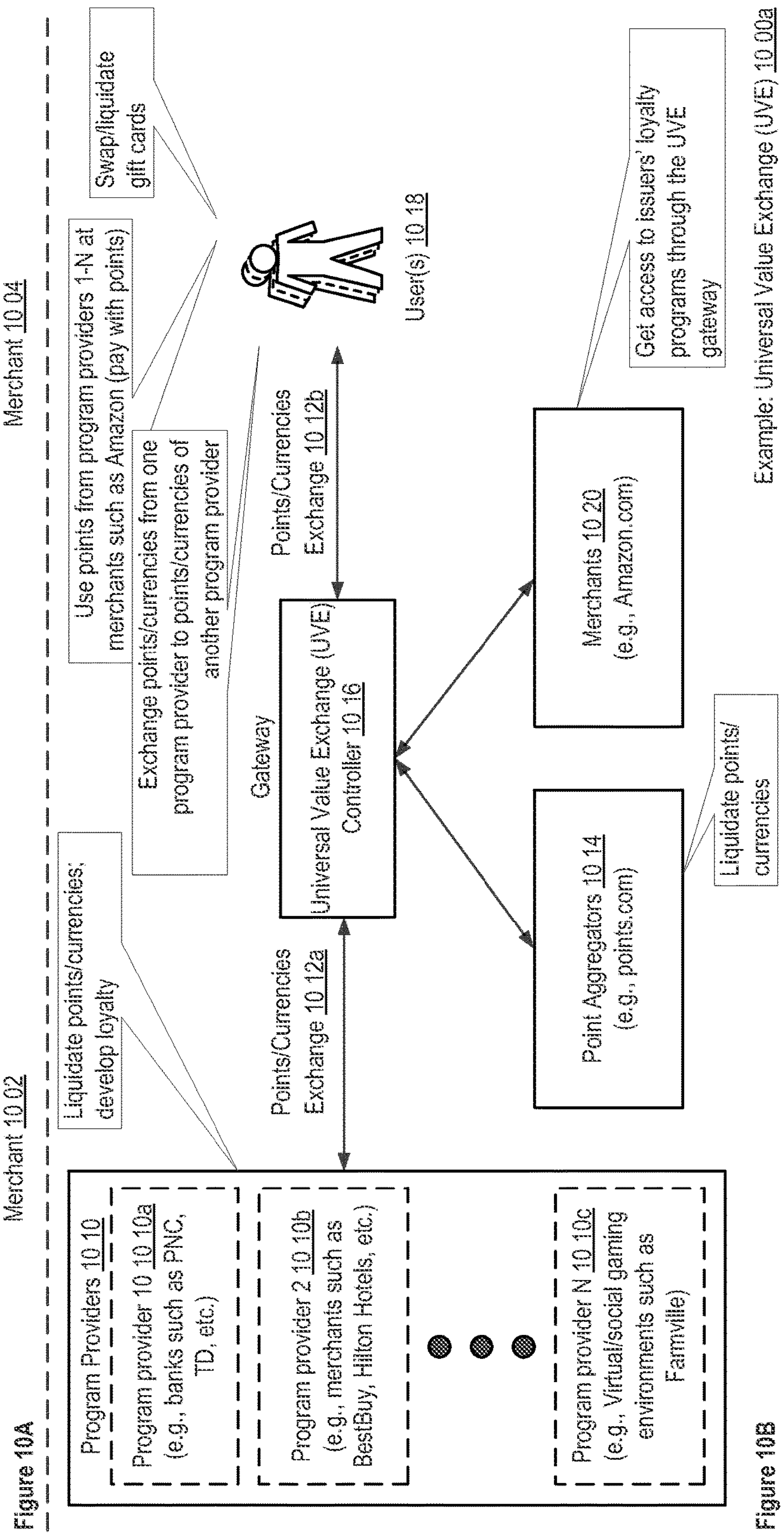

FIGS. 10A and 10B show block diagrams illustrating universal value equivalents within various example embodiments of the MCB-Platform. FIG. 10A shows a block diagram illustrating exemplary aspects of transforming value equivalent exchange instructions in some embodiments of the MCB-Platform. In some implementations, a user may desire to utilize purchasing power available to the user to obtain a desired product. For example, the user may be shopping online, playing a virtual online game (e.g., poker), trading on the stock market electronically, engaging in foreign exchange transactions, and/or other like transactions. In some implementations, the user may retain such purchasing power in various types of currency. In some implementations, the user may have retained purchasing power in various currency types across various ecosystems. For example, the user may have access to currencies such as, but not limited to: a financial account (checking, savings, debit card, credit card, open and closed loop gift cards, prepaid cards, current account, money market, etc.) storing currency of a real-world monetary system (e.g., U.S. dollar, Yen, Euro, etc.), an electronically tradable financial instrument (e.g., derivative financial products, securities, bonds, etc.), virtual currency (e.g., online poker chips, Farmville seeds, etc.), rewards program currency (e.g., rewards points, airline miles, hotel credits, rental car rewards, cruise line rewards, credit card rewards points, cashback rewards, etc.), and/or the like. In some implementations, the user may desire to convert purchasing power available in one currency ecosystem to another currency utilized in a completely different ecosystem. As one example, the user may desire to convert points from traditional rewards programs into cash withdrawn from an ATM-linked account. As another example, the user may desire to convert rewards points from an airline miles program into virtual currency that can be utilized in an online social networking game, e.g., Farmville. As another example, the user may desire to convert virtual currency into currency usable to purchase stock on an electronic trading system. As another example, the user may desire to convert a combination of currencies from financial accounts storing currency of a real-world monetary system, electronically tradable financial instruments, virtual currencies, rewards program points/miles/rewards, and/or the like into a different combination of such currencies.

In some implementations, a user may desire to aggregate purchasing power from a variety of source, and apply the purchasing power towards executing a single transaction. For example, with reference to FIG. 10A, a user 1001*a* may desire to execute a transaction with a user 1001*b*. In some implementations, the user 101*a* may communicate with user 1001*b* to execute the transaction via a universal value exchange controller 1003. In some implementations, the user may optionally communicate with intermediary merchants, exchanges, banks, and/or the like (e.g., 1002, 1004). For example, the user may communicate with an electronic trading system (e.g., 1002*a*, 1004*a*) to execute a transaction. As another example, the user may communicate with a bank (e.g., 1002*b*, 1004*b*) to conduct a transaction. As yet another example, the user may communicate with a merchant system (e.g., 1002, 1004) for purchasing goods and/or services. In some implementations, a user 1001*a* may provide cross-ecosystem currency exchange instructions to the universal value exchange controller 1003. For example, the user 1001*a*, in such instructions, may specify source details (of user 1001*a*) such as, but not limited to: currency source types, currency account numbers, currency access usernames, currency access passwords, and/or the like, as well as destination details (of user 1001*b*) such as, but not limited to: currency destination types, currency account numbers, currency access usernames, currency access passwords, and/or the like. In some implementations, the universal value exchange controller 1003 may obtain the cross-ecosystem currency exchange instructions from user 1001*a*. The universal value exchange controller may determine the sources of currency, and determine the types of currency available at the sources of the currencies. The universal value exchange controller may determine exchange rates for each of the source currencies, for example, relative to a standard currency (e.g., U.S. dollar, Euro, Yen, privately created currency standard, and/or the like). The universal value exchange controller may also determine whether there are any restrictions or conditions at each of the sources of the currencies, as well as the destinations of the currencies. For example, a rewards points program may have a restriction against converting its rewards points into rewards points of another rewards points program; a condition that conversion can only take place if fewer than a threshold amount of rewards points are utilized, and/or the like. Each of the source currencies may have various restrictions and/or conditions on use of the currency type of the source.

In some implementations, the universal value exchange controller may obtain the restrictions and/or conditions of the sources and destinations of the currencies, and may determine a currency exchange flow path based on the restrictions and/or conditions at the currency sources and/or destinations. Upon determining a currency exchange flow path, the universal value exchange controller 1003 may provide request messages to the components in the currency exchange flow path, e.g., exchanges (e.g., 1002*a*, 1004*a*), banks (e.g., 1002*b*, 1004*b*), merchants (e.g., 1002, 1004) and/or the like, requesting the components to provide and/or accept currency value, based on the determined currency exchange flow path. Upon completing the currency withdrawal and/or deposits into each of the currency accounts involved in the cross-ecosystem currency exchange, the universal value exchange controller may provide notifications to the users 1001*a*, 1001*b* notifying them of completion of the requested cross-ecosystem currency transaction. Various currency exchange flow paths of the MCB-Platform embodiments are discussed throughout the specification.

With reference to FIG. 10B, the MCB-Platform controller 1016 may act as a gateway or a single point of access between program providers 1010, point aggregators 1014, merchants 1020 and users 1018. In some implementations, program providers 1010 may enter into an agreement with the MCB-Platform to participate in the points/currency exchange 1012*a* via the MCB-Platform gateway. The program providers may, via program configuration user interface (UI), identify one or more partner program providers with whom the program provider may enter into exchange transactions. For example, the program provider may select non-competing program providers and/or affiliated program providers as partners. For program providers, the facilities of the MCB-Platform platform may be an opportunity to unload the value of their promotions which are carried on their balance sheets as liability. For example, program providers may have customers who are holding on to their points because they do not have enough points to redeem an item, for example, a ticket or a room. However, at the aggregate level, there may be a significant liability for the program providers because of the unredeemed points. In such a situation, allowing the customers to participate in points/currency exchange may be an advantage to the program providers.

In some implementations, the program provider may also set an exchange rate with respect to each of the selected program provider partners. The exchange rate, in some implementations, may be established via bilateral agreement between the program provider and each partner. In such a situation, there may be no need for a base or intermediate currency. For example, United Airlines may enter into a bilateral agreement with Hilton and establish an exchange rate where 5 United Airline miles can be exchanged for 1 Hilton Honors point. In some other implementations, the exchange rate may be established using a base/intermediate currency. The intermediary may be, for example, a MCB-Platform currency (e.g., MCB-Platform point) or a non-denominational currency (e.g., a unit). In such a case, the program provider may need to negotiate with the MCB-Platform to set the exchange rate between the provider currency and the MCB-Platform currency. These bilateral agreements may be carried out electronically. As a part of the program provider enrollment, the program provider may need to expose API(s) to their rewards/loyalty program such that the MCB-Platform may obtain currency balance information and may credit/debit currency after an exchange transaction. Referring to FIG. 10B, the program providers 1010 may include various types of entities or business users 1010*a-c* such as issuers/banks, merchants, acquirers, virtual/social games, and/or the like. In some implementations, the MCB-Platform may also facilitate points/currency exchange between one or more program providers that are not enrolled as a program provider in the MCB-Platform platform.

In some implementations, the MCB-Platform may also act as a gateway to point aggregators 1014. For example, MCB-Platform may transact with point aggregators to sell off or buy points when necessary. In some other implementations, various merchants 1020 such as Amazon, may also utilize the facilities of the MCB-Platform gateway to access the points/currencies from various program providers, and allow customers to use the value of their points/currencies towards payment of purchases made via the merchant. In some implementations, at the back end standard settlement processes may be employed. In some implementations, such redemption may be for online purchases or brick and mortar purchases using an electronic or mobile wallet, a physical payment device or other methods. Further, redemption may occur prior to a transaction or dynamically at the time of transaction.

From the point of view of a user 1018, the MCB-Platform provides a single place where points/currencies from various program providers 1010 can be managed, redeemed, exchanged 1012*b*, or linked to a wallet. Further, via the MCB-Platform, the user may have the flexibility to make a redemption dynamically at the time of purchase or prior to the purchase. The user may also have the option to combine points/currencies during the redemption. In some implementations, the user may also swap and liquidate points/currencies and open and closed loop gift cards.

Figure 10C:
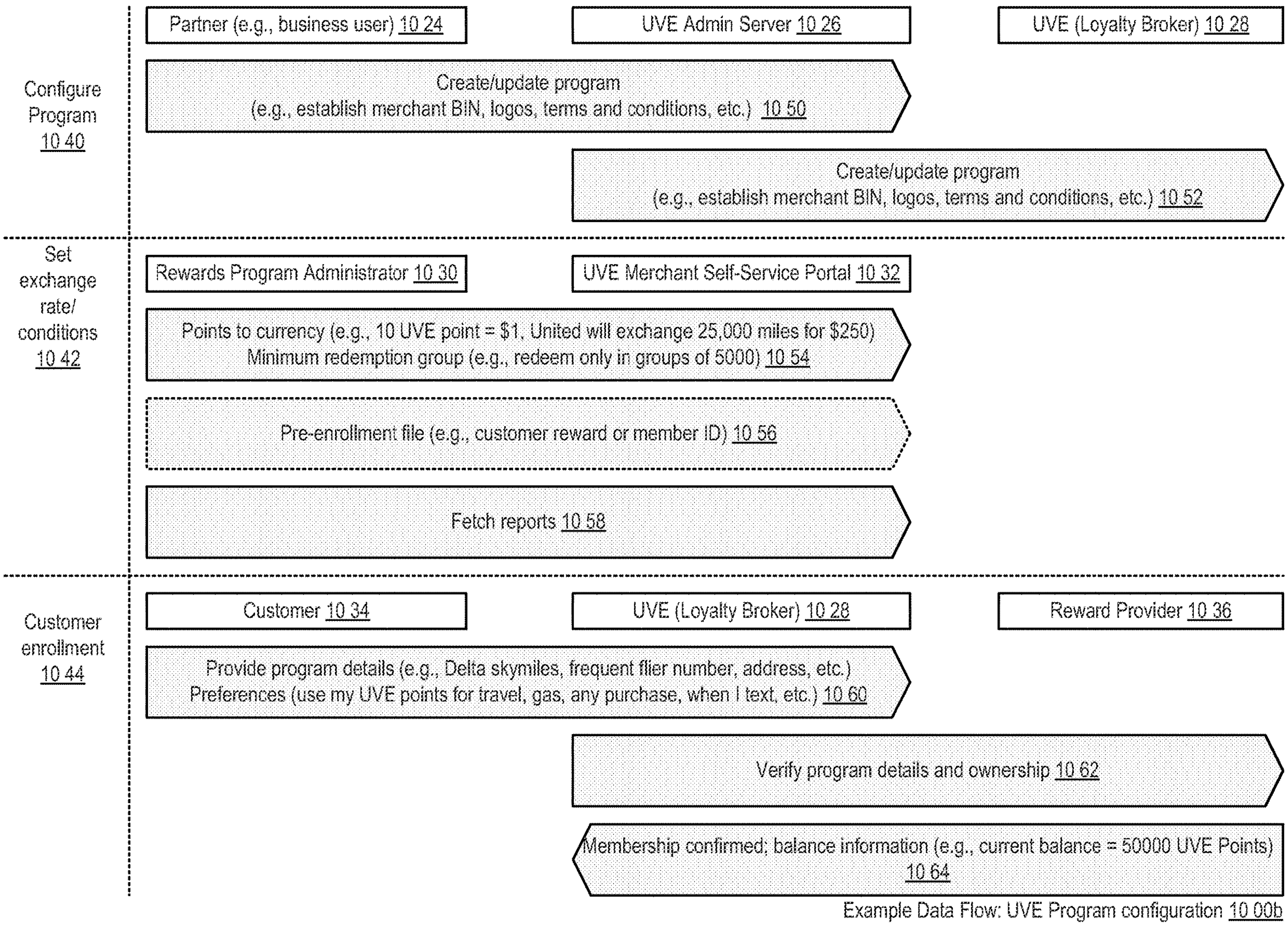
FIGS. 10C-D show data flow diagrams illustrating MCB-Platform program configuration embodiment of the MCB-Platform.
Figure 10D:
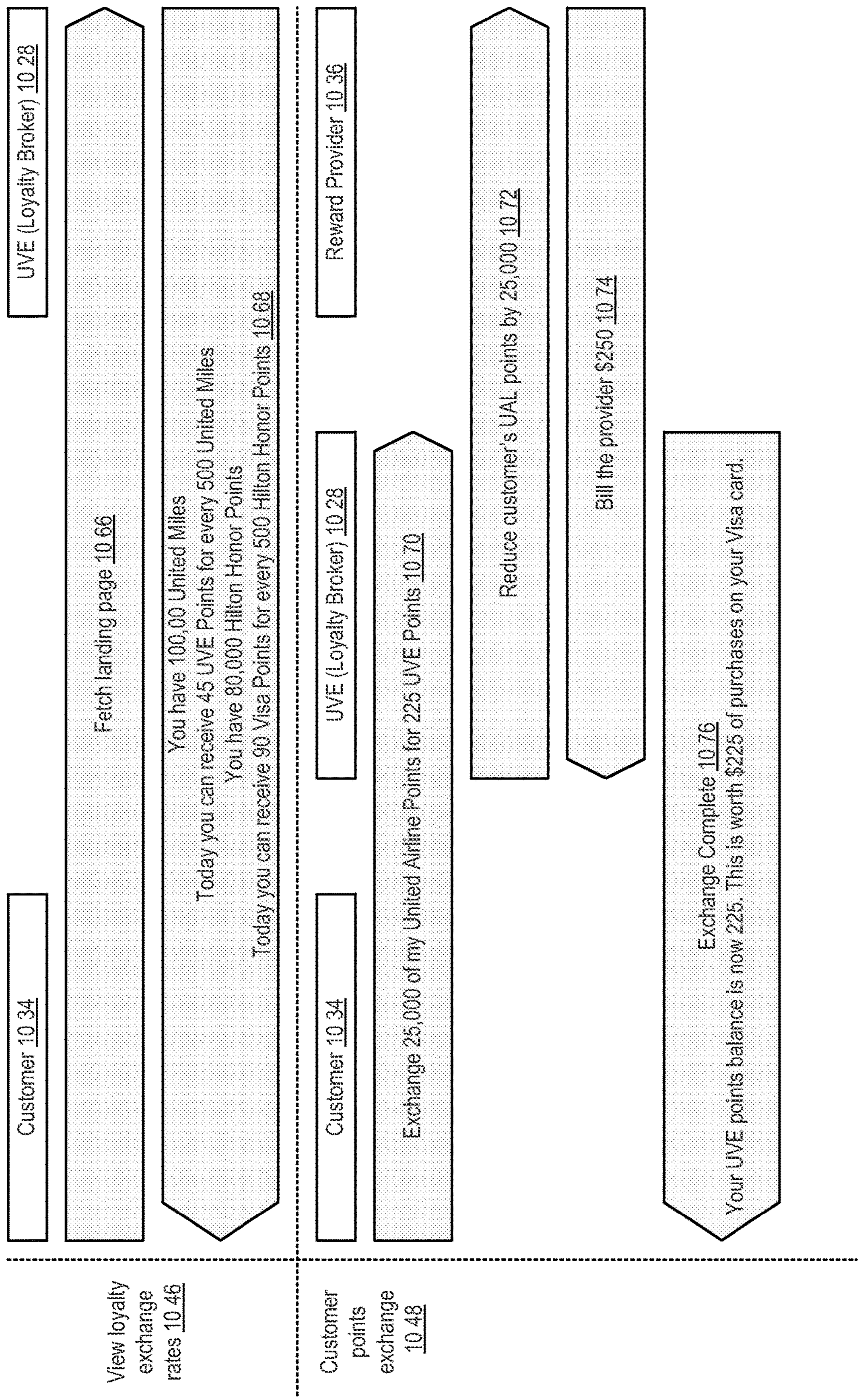

FIGS. 10C and 10D show data flow diagrams illustrating MCB-Platform program configuration embodiment of the MCB-Platform. In one embodiment, the MCB-Platform may behave as a loyalty broker creating a marketplace or an exchange for converting points, rewards and virtual currencies to real world currencies. The loyalty broker embodiment may allow any point provider partner to establish their own price for points/currencies. The loyalty broker may, in some embodiments, allow a consumer to enroll and exchange points/currencies to a proprietary currency (e.g., Visa Points+) or even cash. The proprietary currency may then be used in inline or other purchases.

In one implementation, a partner 1024 may configure an exchange program 1040 with a loyalty broker 1028. At 1050, the partner may provide bank identification number (BIN), logos, accept any terms and conditions of the program, and/or the like to create and/or update the exchange program. If the partner does not have a BIN, one may be created. The BIN creation may be handled by an admin server 1026 or the loyalty broker server. At 1052, the information provided by the provider and/or confirmation of the exchange program creation may be provided to the loyalty broker 1028.

Once the program has been configured, the partner or the partner's rewards program administrator 1030 may set exchange rates and other conditions applicable to the exchange program 1042. In some implementations, the configuration may be performed by the provider accessing a configuration UI in a merchant/provider self-service portal 1032. In some implementations, at 1054*a*, the provider may set the exchange rate for its points/currencies. The exchange rate may specify point/currency to MCB-Platform point ratio. For example, the program provider may set the exchange rate where the 105,000 miles (the provider's currency) is equivalent to 1 MCB-Platform point. In one implementation, the value of the MCB-Platform point may be with respect to a monetary currency such as US dollar, Canadian dollar, Yen, etc. For example, 1 MCB-Platform point may be equivalent to one US dollar. In one implementation the price for points may be changed as frequently as the partner wishes to change it. For example, it could be changed daily, weekly, monthly, yearly, etc. The exchange rate may be associated with a time period for which it is effective in some implementations.

In some implementations, the partners may set exchange rules/rates for various customer segments or even one customer segment. In some other implementations, partners may set up exchange rules at the product (e.g., Stock-Keeping Unit SKU) level. For example, some partners may wish to run a promotional type of exchange rules that may not apply across the partner's business overall, but may be applicable for a short period of time or a small or select group where it may not be applicable or convenient to set up a separate program. In one implementation, for example, a partner may set an exchange rule where customers who fall into Chase segment 82C would get a different exchange rate from customers who fall into other segments. In yet another implementation, for example, a partner may set an exchange rule where customers who enrolled in the partner program in the last 30 days would receive a special exchange rate on purchases of select items (e.g., SKU level data) at another merchant (e.g., Best Buy).

At 1054*b*, the partner may specify rules and restrictions for any exchange of the program provider's points/currencies. In some implementations, the rules and restrictions may be negotiated between the provider and the loyalty broker. In other implementations, the rules and restrictions may be specified via the configuration UI. For example, the provider may set a minimum redemption group of 500 (e.g., redeem in groups of 500 miles). In some implementations, the partner may also provide or upload a pre-enrollment file at the self-service portal at 1056. Such a pre-enrollment file may include information relating to customers of the program provider (e.g., customer reward ID or membership ID, name, address, etc.). The pre-enrollment file may be stored in one or more databases of the loyalty broker and may be used to validate users when they enroll in the loyalty broker. In one implementation, at 1058 the partner may also access the self-service portal to fetch reports. Example of reports available to the partner provider may include report of exchange activities by customer and/or time period, report on customer enrollment, and/or the like.

Once the exchange program is configured and the exchange rate and conditions set up, the loyalty broker may accept customer enrollment 1044. The customer may enroll in the exchange program with the loyalty broker by accessing a customer facing portal, a web or mobile application, a wallet having loyalty broker facilities. At 1060, the customer 1034 provide program details such as membership ID, password, and any other information necessary to verify the customer as the owner of the membership account. At 1060, the customer may also provide usage and other preferences (e.g., use my MCB-Platform points for travel, gas, any purchase, when I send a text, exchange my miles as soon as they exceed 25,000, exchange my miles when the exchange rate is better than or equal to 100:1, etc.). At 1062, the loyalty broker may receive the customer provided program details and may verify the details to confirm the customer ownership of the membership account with the reward provider. Alternatively, the loyalty broker may also utilize information in the pre-enrollment file to confirm some or all of the customer/program details. At 1064, the program provider may confirm the membership of the customer to the loyalty broker. At 1064, the program provider may also provide the customer in question's current points/currency balance information to the loyalty provider.

Referring to FIG. 10D, the customer may access and view loyalty exchange rates 1046. At 1066, the customer 1034 may fetch a landing age or launch an application to view the program balance information and exchange rates. The loyalty broker, in response to the customer's request, may obtain from the loyalty provider the current exchange rates as well as points/currency balances and display the information to the customer at 1068. In one implementation, the customer may initiate a points/currency exchange transaction 1048. For example, at 1070, the customer 1034 may instruct the loyalty broker to exchange an amount of program points/currency (e.g., 25,000 miles) for an equivalent value (e.g., 225 MCB-Platform points) 1070. At 1072, the loyalty broker may process the instruction by requesting the program provider 1036 to reduce the customer's program points/currency by the specified amount (e.g., reduce by 25,000 miles). The program provider may reduce the customer's points/currency and make payment of the agreed upon amount (e.g., $250) at 1074. In one implementation, as a part of the agreement between the program provider and the loyalty broker, the loyalty broker may assess a transaction processing fee. In some implementations, the fee may be a percentage of the total amount the program provider has approved for billing. For example, when the program provider agrees to exchange 25,000 miles for $250, the loyalty broker may assess a 20% processing fee which is equivalent to $50. In some implementations, the loyalty broker may advertise the exchange rate using the adjusted amount that is actually payable to the customer. For example, the loyalty broker advertises to exchange 25,000 miles for $225. In some implementation, instead of assessing a processing fee on a per transaction basis, subscription type fees may be assessed to partners and/or users of the MCB-Platform. For example, the subscription fee amount may be tiered based on volume of MCB-Platform transactions. In some other implementations, there may be revenue share between the MCB-Platform and partners. In yet other implementations, MCB-Platform may add and/or retain a certain number of basis points to the exchange rate, assess subscription or per-use fees to the consumer or levy a percentage of the exchange value as fees to the consumer/partner in exchange for the services provided.

When the bill is paid, the customer portion is credited to the MCB-Platform points BIN or a Debit Processing Service (DPS) type BIN for each card. In some implementations, the customer may be issued a prepaid card having the value of the total MCB-Platform points obtained from the exchange. At 1076, the exchange is complete. The customer's MCB-Platform points balance is incremented by the total MCB-Platform points gained (e.g., +225), his/her miles balance is decremented by the number of miles used in the exchange (e.g., 25,000 miles). The examples discussed herein assume that a unit MCB-Platform point is equivalent to $1. Other equivalency between the MCB-Platform point and currency are contemplated in some implementations of the loyalty broker.

Some embodiments of the MCB-Platform facilitate gift card exchanges and conversions. The facilities of the MCB-Platform may support open loop, closed loop and hybrid gift cards. Open loop gift cards can be redeemed in a variety of businesses, while closed loop gift cards can be redeemed at a specific business (e.g., Apple Store card, Best Buy card) or select businesses (e.g., Westfield mall gift card). For example, a user A may have a gift card for the Apple Store, but the user never shops in the Apple Store, and would instead prefer to exchange the Apple gift card for a Best Buy gift card. Similarly, another user B may have a Best Buy gift card, but would like to exchange for an Apple Store gift card. In such a situation, the MCB-Platform may facilitate the exchange of the Apple and Best Buy gift cards such that both users A and B can have their preferred gift cards. As another example, a user may have various gift cards in his or her hands or in the wallet. The user may prefer to combine the value of all the gift cards in one gift card or prepaid card, a bank account or obtain cash. In such as situation, the MCB-Platform may provide facilities to consolidate the gift card values and automatically apply them in a purchase transaction.

Figure 11A:
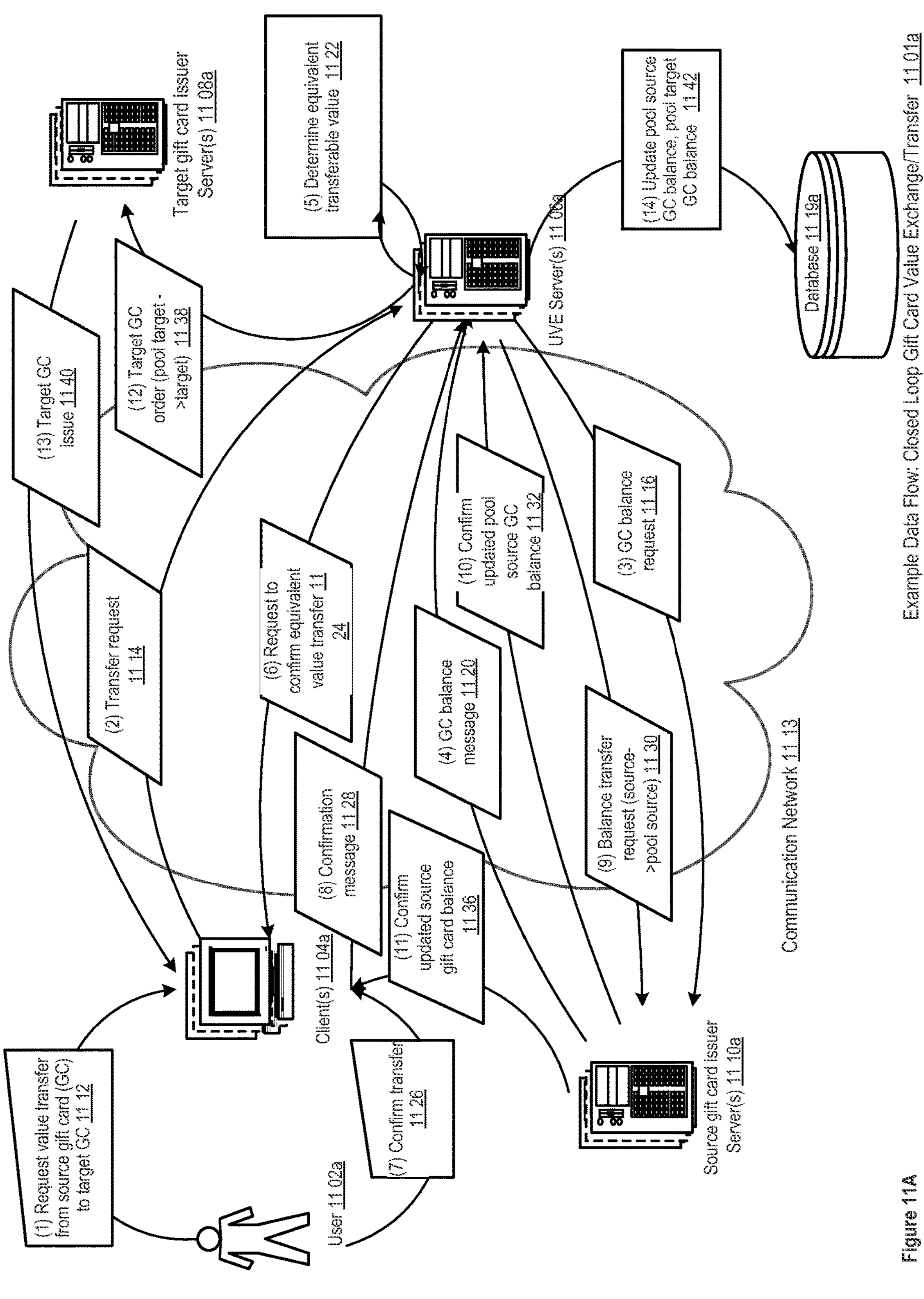
FIGS. 11A-C show data flow diagram illustrating closed/open loop gift card value exchange embodiments of the MCB-Platform.

FIG. 11A shows a data flow diagram illustrating closed loop gift card value exchange embodiment of the MCB-Platform. The data flow diagram shows flow of data between a user **1102*a*, a client 1104*a*, a MCB-Platform server(s) 1106*a* and gift card issuer servers 1108*a*/210*a*, and target gift card issuer server(s) 1107*a* over a communication network 1113*a*. As shown in the figure, the user 1102*a* may access the MCB-Platform web page or application using the client 1104*a* to communicate with the MCB-Platform server. In some implementations, the user may wish to transfer the value from one gift card to another. The user may then input or select a source gift card and a target gift card and request value transfer from the source gift card to the target gift card at 1112. In some implementations, the client may include, but is not limited to: a personal computer, mobile device, television, point-of-sale terminal, kiosk, ATM, and/or the like (e.g., 1104***a*). In various implementations, the user input may include, but not be limited to: a single tap (e.g., a one-tap mobile app purchasing embodiment) of a touch-screen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like.

In some implementations, using the user's input, the client may generate a transfer request, e.g., 1114 and provide the transfer request to the MCB-Platform server. For example, the client may provide a (Secure) Hypertext Transfer Protocol ("HTTP(S)") POST message including data formatted according to the eXtensible Markup Language ("XML"). An example transfer request 1114, substantially in the form of a HTTP(S) POST message including XML-formatted data, is provided below:

```
POST /transferrequest.php HTTP/1.1
Host: www.visa.com/uve
Content-Type: Application/XML
Content-Length: 484
<?XML version = "1.0" encoding = "UTF-8"?>
<transfer_request>
        <request_ID>45DSKFSWFG5</request_ID>
        <timestamp>yyyy-mm-dd hh:mm:ss</timestamp>
        <user_ID>JDoe@gmail.com</user_ID>
    <source_details>
        <giftcard_ID>4444566897978766</giftcard_ID>
        <issuer_ID>apple</issuer_ID>
        <card_value>100</card_value>
        <currency>usd</currency>
    </source_details>
    <destination_details>
        <giftcard_ID>5555566823457899</giftcard_ID>
        <issuer_ID>bestbuy</issuer_ID>
    </destination_details>
    <client_details>
        <client_IP>192.168.23.122</client_IP>
        <client_type>smartphone</client_type>
        <client_model>HTC Hero</client_model>
        <OS>Android 2.2</OS>
        <app_installed_flag>true</app_installed_flag>
    </client_details>
</transfer_request>
```

The MCB-Platform server may receive the transfer request 1114 and may extract the details of the transfer request (e.g., XML data). In one implementation, the MCB-Platform server may identify the issuer of the source gift card 1110*a* and may send a balance request 1116 to the issuer of the source gift card 1110*a*. In one implementation, the request 1116 may be in the form of a web service/API call. The gift card issuer server may return the balance information message 1120 to the MCB-Platform server. At 1122, the MCB-Platform server may determine equivalent value that the user may obtain after the exchange. Determination of the equivalent value may be based on risk exposure, the details of which are discussed with respect to FIGS. 12A-B.

In one implementation, the MCB-Platform server may send to the client a request 1124 that the user confirm acceptance of the equivalent value. For example, the MCB-Platform server may provide an HTML page to the client. The client may display, for example, a summary of the transfer request identifying the source and destination gift cards, the equivalent value of the destination gift card, terms and conditions, buttons to accept or cancel the exchange, and/or the like. At 1126 the user may confirm acceptance of the equivalent value, which may then be passed on as the confirmation message 1128 by the client to the MCB-Platform server.

In one implementation, the MCB-Platform may have a number of gift card accounts associated with a number of merchants. For example, the MCB-Platform may have a gift card account for Apple, Best Buy, Macys, Barneys, and/or the like. These gift card accounts may be referred to as pool gift card accounts. In one implementation, the MCB-Platform server may send a balance transfer request 1130 to the source gift card issuer server 1110*a*. The balance transfer request 1130 may include information such as source gift card ID, pool source gift card ID, transfer amount, and/or the like. In one implementation, the pool source gift card ID may correspond to a gift card issued by the source gift card issuer and owned and maintained by the MCB-Platform (e.g., MCB-Platform's apple gift card). In one implementation, the source gift card issuer server may transfer the balance from the source gift card (e.g., the user's Apple gift card) to the pool source gift card (e.g., MCB-Platform's Apple gift card) and may send a confirmation message 1132 including the updated pool source gift card balance to the MCB-Platform server. In one implementation, the source gift card issuer server may send the client the updated source gift card balance 1136 confirming the transfer of the source gift card value. In one implementation, the MCB-Platform server may send a target gift card order 1138 to the target gift card issuer. The target gift card order may include a request to transfer the determined equivalent value from the pool target gift card to a target gift card. An example target gift card order 1138, substantially in the form of a HTTP(S) POST message including XML-formatted data, is provided below:

```
POST /targetorder.php HTTP/1.1
Host: www.merchant.com/order
Content-Type: Application/XML
Content-Length: 484
<?XML version = "1.0" encoding = "UTF-8"?>
<giftcard_order>
    <source_card_ID>23456787456745 89</source_card_ID>
    <target_card_ID>3486549865445678</target_card_ID>
    <timestamp>yyyy-mm-dd hh:mm:ss</timestamp>
    <user_ID>uve_order@visa.uve.com</user_ID>
    <target_card_value>100</target_card_value>
    <password>uvegiftcardpasssword</password>
    <delivery_email>jdoe@gmail.com</delivery_email>
    <delivery_message>standard</delivery_message>
</giftcard_order>
```

The target gift card issuer server may then issue a target gift card having the equivalent value to the user. The target gift card issuer server may send the client the target gift card issue message 1140. In one implementation, the target gift card issue message 1140 may include the target gift card ID which the user may obtain electronically and utilize for purchase with the merchant associated with the target gift card. An example target gift card issue message 1140 formatted in XML is provided below:

```
<target_gift_card>
    <target_card_ID>3486549865</target_card_ID>
    <timestamp>yyyy-mm-dd hh:mm:ss</timestamp>
    <target_card_value>100</target_card_value>
    <activation_status>activated</activation_status>
    <delivery_email>jdoe@gmail.com</delivery_email>
    <delivery_message>Thank you for ... </delivery_message>
</target_gift_card>
```

At 1142, the MCB-Platform server may store updated pool source gift card balance (e.g., previous balance incremented by the value of the source gift card) and the updated pool target gift card balance (e.g., previous value decremented by the equivalent amount). In some embodiments of the MCB-Platform, when the balance in any one of the pool gift cards exceeds a threshold, the MCB-Platform may initiate a sell off. In one implementation, the sell off may involve issuing gift cards and selling them at a discount. For example, the MCB-Platform may accumulate over time an excess balance of $10000 in one or more merchant gift card accounts. The MCB-Platform may then issue (e.g., via the gift card issuer) 100 gift cards each worth $100. The MCB-Platform may then sell each gift card at a discount to users to collect some revenue. The MCB-Platform may aggregate such excess balances over time by apportioning value from records in the MCB-Platform database, e.g., value card 11219*u*. For example, when source and destination field values in the value card table record reach $0 and yet there is residual value left on the card, that residual value may be used to generate such excess balances for the MCB-Platform. In one example, the MCB-Platform may observe consumers making purchases with merchants accepting such value; e.g., the MCB-Platform may be made part of a payment network which may parse PAN/account identifiers and compare such account identifiers embedded in transaction request/authentication with records in the MCB-Platform database, e.g., users 11219*a*, accounts 11219*g*, etc., tables. In those instances, the MCB-Platform may take a credit and use its points/value equivalence to pay for the consumer's purchase and take direct charge from the consumer's payment source for that value. In one embodiment the user would not be aware that the purchase was made using the pool points equivalence. In an alternative embodiment, the MCB-Platform would show up on the consumer's bills as the merchant taking the charge for the value of the item. In yet another embodiment, the user may be offered a discount on the item (e.g., the consumer would be charged 10% less from their payment source while the merchant would receive full value in point equivalence supplied by the MCB-Platform), thereby providing a liquidation method for the MCB-Platform to obtain currency exchange for its pool points/currency.

Figure 12A:
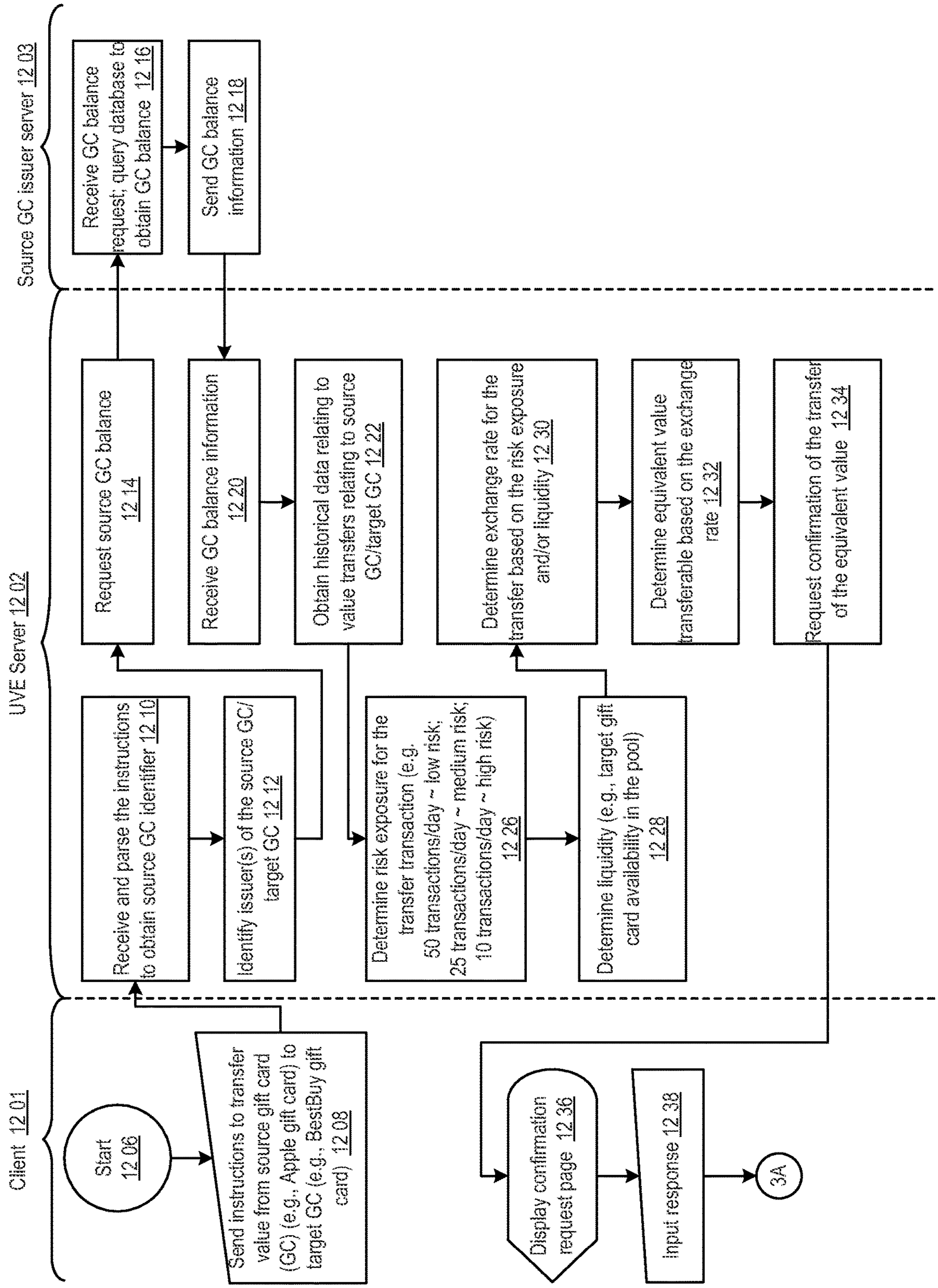
FIGS. 12A-D show logic flow diagrams illustrating closed/open loop gift card value exchange embodiments of the MCB-Platform.
Figure 12B:
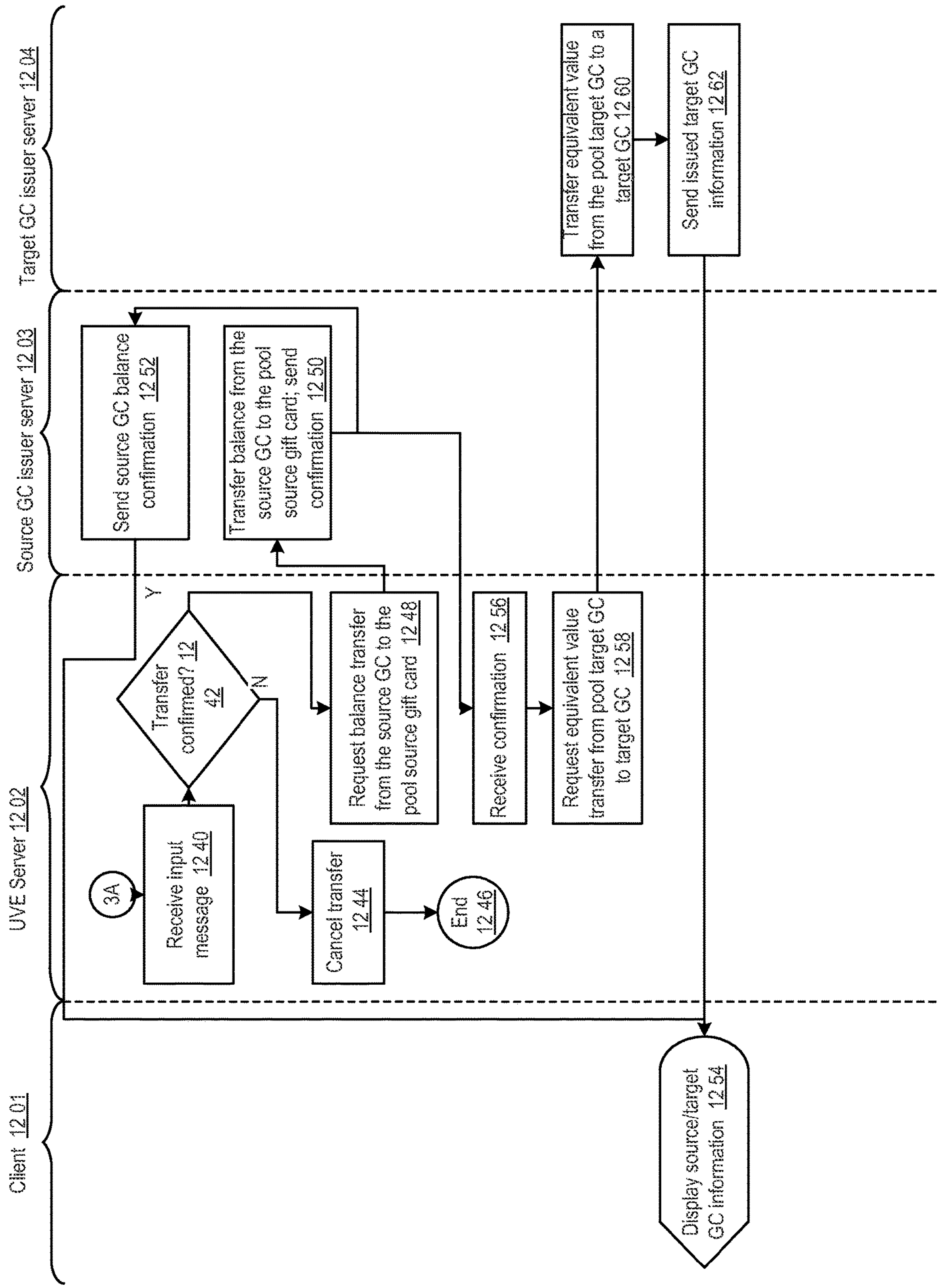

FIGS. 12A-B show logic flow diagrams illustrating closed loop gift card value exchange embodiments of the MCB-Platform. The closed loop gift card value exchange may begin at 1206. At 1208, client 1201 may send instructions to transfer value from source gift card to a target gift card. The instructions may identify the source gift card and the target gift card. For example, the source/target gift card number may be included in the instructions. The instructions may be received by MCB-Platform server 1202. The MCB-Platform server may parse the instructions to obtain identifiers of the gift cards at 1210. The MCB-Platform server may further identify the issuers of the gift cards at 1212. At 1214, the MCB-Platform server may request the source gift card issuer server 1203 to provide the balance in the source gift card. At 1216, the source gift card server may receive the request and may query one or more tables and/or databases to obtain the source gift card balance. The source gift card issuer server may provide the requested balance summary to the MCB-Platform server at 1218. The MCB-Platform server may receive the balance information at 1220 and may obtain historical data relating to the source/target gift card value transfer at 1222. In one implementation, the historical data may be obtained by querying one or more tables and/or databases using the source gift card ID and/or target gift card ID. At 1226, the MCB-Platform server may use the historical data to determine risk exposure for the exchange transaction in question. In one implementation, for example, the risk exposure determination may be based on rate of source/target gift card transactions and predefined risk thresholds. Table 1 below shows example risk thresholds, risk exposure and risk exposure weights for gift card exchange transactions.

TABLE 1

| Thresholds [Transactions/Day] | Risk Exposure | Risk Exposure Weight |
|---|---|---|
| 100 | Minimal risk | 0.9 |
| 50 | Low risk | 0.8 |
| 25 | Medium risk | 0.6 |
| 10 | High risk | 0.3 |
| 5 | Unacceptable risk | 0 |

In some implementations, at 1228, the MCB-Platform server may determine liquidity of the source/target gift cards. For example, the MCB-Platform may query one or more databases and/or tables to determine the balance in the pool target gift card, and the approximate number of target gift cards the balance may support. In one implementation, the MCB-Platform may use the source/target transaction rate and the number of target gift cards in the MCB-Platform pool to calculate a liquidity ratio. In a further implementation, a liquidity ratio greater than 1 may be indicative of high liquidity, while a ratio less than 1 may indicate low liquidity. At 1230, based on the risk exposure and/or the liquidity, the MCB-Platform may determine an exchange rate for the source/target gift card exchange. For example, when the liquidity ratio is greater than or equal to 1, the risk exposure weight may be equivalent to the exchange rate. When the liquidity ratio is less than 1, a product of the risk exposure weight and liquidity ratio may determine the exchange rate. In some implementations, the calculation of the liquidity ratio may be optional such that the risk exposure weight alone may determine the exchange rate.

$$\text{Exchange-Rate}=\text{Weight}_{RISK\text{-}EXPOSURE} \text{ when liquidity} \geq 1 \quad (1)$$

$$\text{Exchange-Rate}=\text{Weight}_{RISK\text{-}EXPOSURE} \times \text{liquidity when liquidity} < 1 \quad (2)$$

Upon determining the exchange rate, the MCB-Platform may determine the equivalent value that client would receive in the form of a target gift card at 1232. For example, with a source gift card valued at $100, and an exchange rate at 0.8, the target gift card may have an equivalent value of $80. At 1234, the MCB-Platform server may send a request to the client to confirm the transfer of the source gift card value to the equivalent value of a target gift card. At 1236, the client may receive and display the confirmation request. At 1238, the client may receive an input from the user, and may send the input message to the MCB-Platform server. Referring to FIG. 12B, the MCB-Platform server may receive the input message from the client at 1240, and parse the message to obtain the details. In one implementation, at 1242, the MCB-Platform server may determine if the transfer is confirmed by the user. If the transfer is not confirmed by the user, the transfer is canceled at 1244, concluding the process at 1246. However, if the transfer is confirmed at 1242, the MCB-Platform server may request the source gift card issuer to transfer balance of the source gift card to the pool source gift card at 1248. The source gift card issuer server may receive the transfer request and may transfer the balance as requested at 1250. In one embodiment, a web services request that initiates the transfer from one specified card account number to a destination account number may be issued. A web request that may otherwise have been initiated when a user wishes to move value from one account to another may be captured, but instead of using the same user card account as a parameter in the web services call, instead, a MCB-Platform value card (e.g., value equivalence held in a MCB-Platform pool) may be used as either a destination or a source account parameter in the web services call, e.g., to effect a transfer balance request 1250 or a transfer request 1260, respectively. Such web services may vary depending on the service/program.

In one implementation, the source gift card issuer server may also send a confirmation once the balance transfer has occurred. At 1256, the MCB-Platform server may receive the confirmation of the balance transfer. At 1258, the MCB-Platform server may request the target gift card issuer to transfer the equivalent value determined from the pool target gift card to a target gift card. The target gift card issuer may receive the transfer request at 1260, and may execute the requested transfer. In one implementation, at 1262, upon executing the transfer, the target gift card issuer server may send the issued target gift card having the equivalent value to the client. The client may receive and display the target gift card at 1254. In one implementation, the target gift card issuer server may send an email or text message to notify and/or provide the user an electronic target gift card. In another implementation, the issued target gift card may be mailed to the user's physical address. In yet another implementation, the target gift card may pop up in the user's electronic wallet. In one implementation, the source gift card issuer server may also send a source gift card balance confirmation (e.g., $0 balance) to the client at 1252.

In one implementation, in the instance where funds cannot be reassigned from a source gift card to a pool gift card, a deallocation of the source gift card in the user's wallet may be effected such that the user may no longer see it or use it or exchange it. The source gift card may be reallocated later to another user wanting a similar exchange as further described with respect to FIGS. 11B, 12A-B. In some embodiments, there may be instances of fraud where although the card is deallocated in the user's wallet, the user may still effect a purchase with the physical card. In one embodiment such fraud may be adjudicated upon discovery of that card no longer being available for a subsequent exchange by another user. In one implementation, a charge can be taken from the user's wallet (e.g., any of the funding accounts) and/or the user may be given warnings or prevented from participating in such exchange programs in future.

Figure 11B:
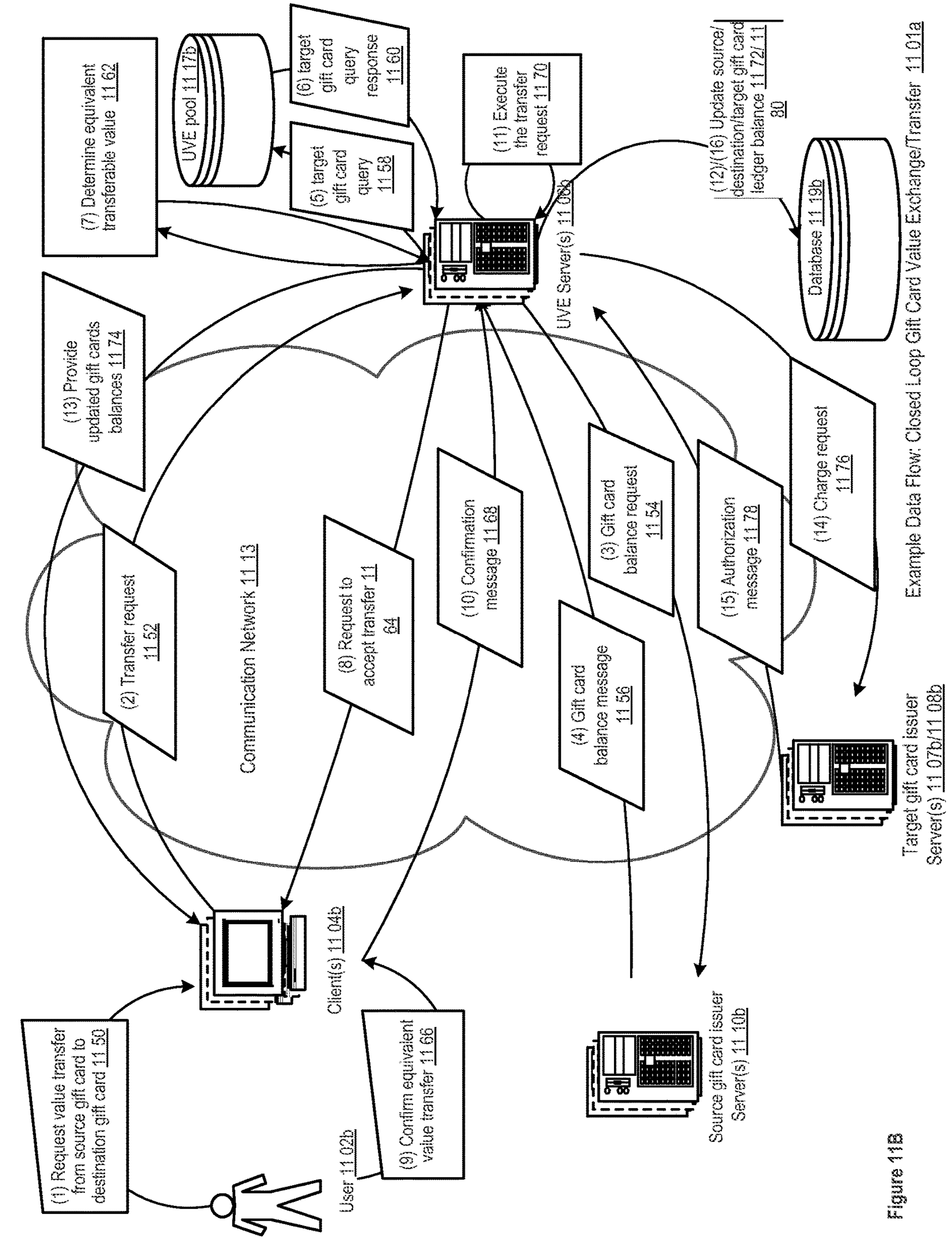

FIG. 11B shows a data flow diagram illustrating a second closed loop gift card value exchange embodiment of the MCB-Platform. Some of the gift cards that users may want to exchange may be of an open loop type. In one implementation, at 1150, a user 1102*b* may request value transfer from a source gift card to a destination gift card. The client 1104*b* may receive the user input and may generate a transfer request 1152. The transfer request 1152 may have similar data structure to that of the transfer request 1114 of FIG. 11B. The transfer request 1152 may be sent to the MCB-Platform server 1106*b*. The MCB-Platform server may receive and parse the request to obtain source gift card issuer ID and source gift card ID. The MCB-Platform server may send a source gift card balance request 1154 to the source gift card issuer server 1110*b*. The source gift card issuer server may look up the balance and may provide the information in a gift card balance message 1156 to the MCB-Platform server. In one implementation, the MCB-Platform server may send a target gift card query 1158 to the MCB-Platform pool database 1117*b*. In one implementation, the query may return a target gift card response 1160. At 1162, the MCB-Platform may determine equivalent transferable value 1162. In one implementation, the equivalent value may be the value that is ultimately made available to the user in a target gift card. The MCB-Platform server may send a request to accept transfer 1164 to the client. The client may obtain the request and may render the contents of the request on the client display. The user may provide a response 1166 confirming the acceptance. The client may take the user input and generate a confirmation message 1168 for transfer to the MCB-Platform server. Upon receiving the confirmation message 1168, the user may execute the transfer request at 1170. In one implementation, at 1172 the MCB-Platform server may update database 1119*b* with updated balances of the source gift card, the target gift card and destination gift card. In one implementation, the MCB-Platform server may provide updated gift card balances 1174 to the client such that the user may view the changes in the source and destination gift card balances after the transfer.

In one implementation, when the user 1102*b* makes a purchase using the destination gift card, the MCB-Platform server may route the charge request 1176 to the target gift card issuer server 1107*b*. In addition to other example charge requests and authorizations provided throughout, the following is an example. An example charge request 1176, substantially in the form of a HTTP(S) POST message including XML-formatted data, is provided below:

```
POST /chargerequest.php HTTP/1.1
Host: www.targetissuer.com/charge
Content-Type: Application/XML
Content-Length: 484
<?XML version = "1.0" encoding = "UTF-8"?>
<charge_request>
    <gift_card_ID>2345678745674589</gift_card_ID>
    <user_ID>theoriginalowner@gmail.com</user_ID>
  <checkout_request>
    <checkout_ID>4NFU4RG94</checkout_ID>
    <timestamp>2011-02-22 15:22:43</timestamp>
    <purchase_detail>
        <purchase_amount>100</purchase_amount>
        <num_products>5</num_products>
        <product_ID>AE95049324</product_ID>
        <product_ID>MD09808755</product_ID>
        <product_ID>OC12345764</product_ID>
        <product_ID>KE76549043</product_ID>
        <product_ID>SP27674509</product_ID>
    </purchase_detail>
    <PoS_client_detail>
        <client_IP>192.168.23.126</client_IP>
        <client_type>smartphone</client_type>
        <client_model>HTC Hero</client_model>
        <OS>Android 11.2</OS>
        <app_installed_flag>true</app_installed_flag>
    </PoS_client_detail>
  </checkout_request>
</charge_request>
```

The target gift card issuer 1110*b* may receive the charge request and send a charge authorization message 1178 to the MCB-Platform server. In addition to other example charge requests and authorizations provided throughout, the following is an example. An example authorization message 1178, substantially in the form of a HTTP(S) POST message including XML-formatted data, is provided below:

```
POST /chargeauthorize.php HTTP/1.1
Host: www.visa.com/uve/auth
Content-Type: Application/XML
Content-Length: 484
<?XML version = "1.0" encoding = "UTF-8"?>
<auth>
    <gift_card_ID>2345678745674589</gift_card_ID>
    <user_ID>theoriginalowner@gmail.com</user_ID>
    <status>approved</status>
    <balance>0</balance>
    <checkout_ID>4NFU4RG94</checkout_ID>
    <timestamp>2011-02-22 15:22:43</timestamp>
</auth>
```

The MCB-Platform server may then update the destination gift card balance at 1180.

Figure 11C:
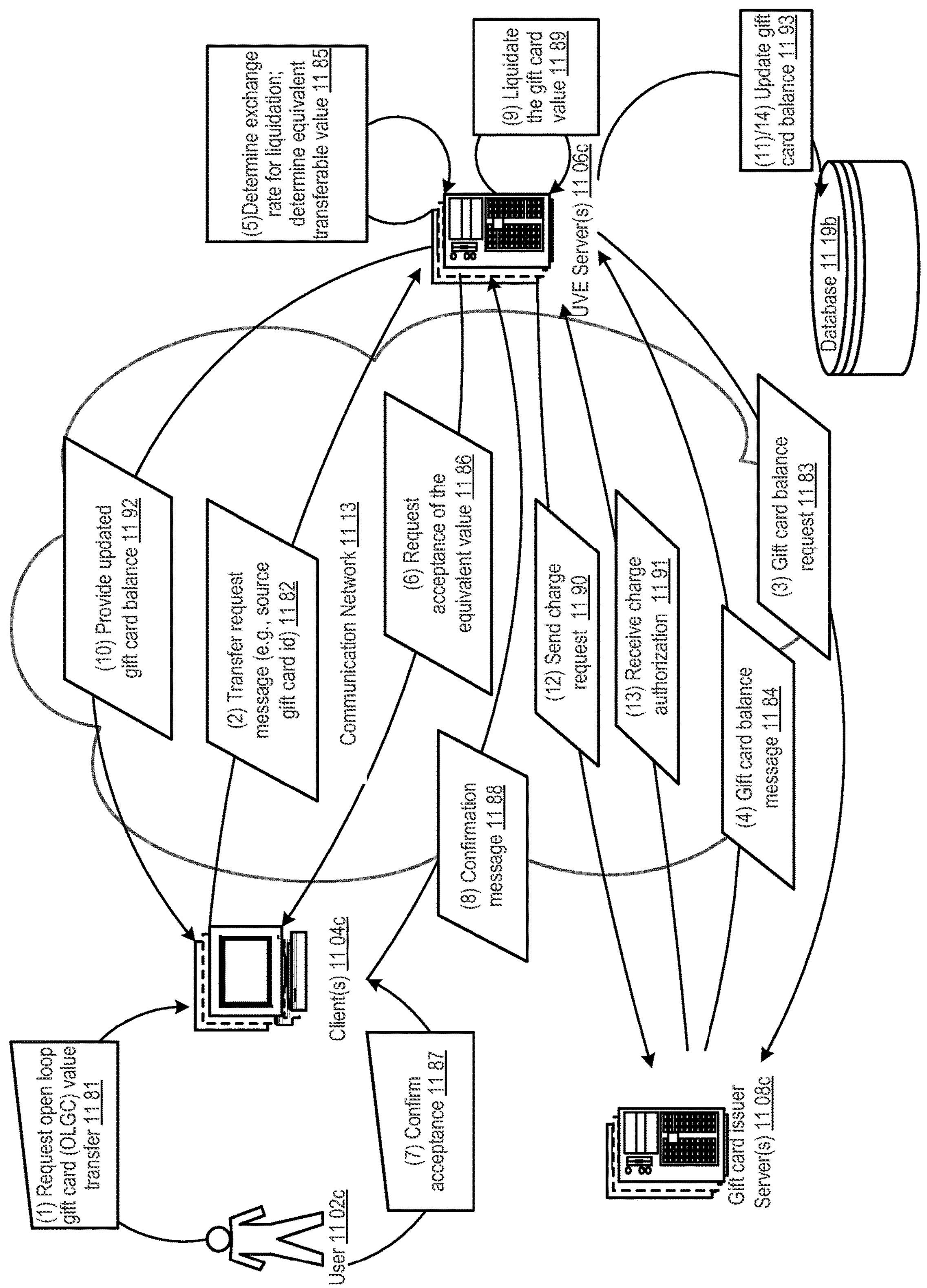

FIG. 11C shows a data flow diagram illustrating an open loop gift card value exchange embodiment of the MCB-Platform. In one implementation, a user 1102*c* may request open loop gift card value transfer at 1181. The client 1104*c* may receive the input and may generate a transfer request 1182 to the server 1106*c*. An example transfer request 1182, substantially in the form of a HTTP(S) POST message including XML-formatted data, is provided below:

```
POST /transferrequest.php HTTP/1.1
Host: www.visa.com/uve
Content-Type: Application/XML
Content-Length: 484
<?XML version = "1.0" encoding = "UTF-8"?>
<transfer_request>
  <account_access_details>
    <user_details1>
        <user_ID>jdoe@gmail.com</user_ID>
        <password>password</password>
        <user_current_stake>100</user_current_stake>
    </user_details1>
    <user_details2>
        <user_ID>jdoe@gmail.com</user_ID>
        <password>password</password>
        <user_current_stake>50</user_current_stake>
    </uve_details>
        <user_ID>uve@uve.com</user_ID>
        <user_current_stake>50</user_current_stake>
    </uve_details>
  </account_access_details>
    <gift_card_ID>2345678745674589</gift_card_ID>
    <card_issuer>xyz</card_issuer>
    <balance>200</balance>
    <transfer_amount>200</transfer_amount>
    <destination_currency>uve points</destination_currency>
    <timestamp>2011-02-22 15:22:43</timestamp>
  <client_details>
    <client_IP>192.168.23.122</client_IP>
    <client_type>smartphone</client_type>
    <client_model>HTC Hero</client_model>
    <OS>Android 2.2</OS>
    <app_installed_flag>true</app_installed_flag>
  </client_details>
</transfer_request>
```

The MCB-Platform server may then send a gift card balance request 1183 to the gift card issuer server 1108*c* to obtain the current gift card balance. The gift card issuer server may look up the gift card balance information using gift card ID in the request 1183. The gift card issuer server may then provide the gift card balance message 1184 to the MCB-Platform server. At 1185, the MCB-Platform server may determine the equivalent transferable value (e.g., using process outlined in FIG. 3D). The MCB-Platform server may send a request 1186 to the client to request acceptance of the equivalent value determined at 1185. The client may receive and display the request to the user. At 1187, the user may confirm acceptance of the equivalent value. The client may then generate a confirmation message 1188 and send the message to the MCB-Platform server. At 1189, the MCB-Platform server may liquidate the gift card to an equivalent value (e.g., cash, MCB-Platform points, etc.). In one implementation, the user may designate the currency into which the gift card may be converted. In another implementation, the MCB-Platform may allow conversion into only certain currencies (e.g. MCB-Platform points). In one implementation, the equivalent amount may be deposited in an account designated by the user, and may be used by the user when making purchases. In one implementation, the MCB-Platform server may update a value card table record (e.g., 5119*u*) to deallocate the user 1102*c* from the gift card once it has been liquidated and an equivalent value has been provided. In one implementation, upon liquidation at 1189, the user may be sent the updated gift card balance message 1192 notifying that the gift card has been liquidated with no balance remaining in the gift card. In a further implementation, the user may also be notified of the deposit of the equivalent amount in a user designated account, statement credit, cash, and/or the like.

In one implementation, the liquidated gift card may be allocated to another user. In such a situation, the MCB-Platform server may send a charge request 1190, corresponding to the user 1102*c*'s (liquidated) gift card on behalf of the new user (and not user 1102*c*) to the gift card issuer 1108*c*.

```
POST /chargerequest.php HTTP/1.1
Host: www.giftcardissuer.com/charge
Content-Type: Application/XML
Content-Length: 484
<?XML version = "1.0" encoding = "UTF-8"?>
<charge_request>
    <gift_card_ID>675678987654</gift_card_ID>
    <user_ID>theoriginalowner@gmail.com</user_ID>
  <checkout_request>
    <checkout_ID>4NFU4RG94</checkout_ID>
    <timestamp>2011-02-22 15:22:43</timestamp>
    <purchase_detail>
        <purchase_amount>100</purchase_amount>
        <num_products>5</num_products>
        <product_ID>AE95049324</product_ID>
        <product_ID>MD09808755</product_ID>
        <product_ID>OC12345764</product_ID>
        <product_ID>KE76549043</product_ID>
        <product_ID>SP27674509</product_ID>
    </purchase_detail>
    <PoS_client_detail>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </PoS_client_detail>
  </checkout_request>
</charge_request>
```

The gift card issuer may receive the charge request. In one implementation, the gift card issuer may look up the balance in the gift card to ensure that the balance in the gift card covers the purchase amount. In a further implementation, the issuer may confirm that the user ID associated with the gift card number matches the user ID to whom the gift card was initially authorized. Upon making payment request validation, the gift card issuer may authorize the charge request and send an authorization message 1191 to the MCB-Platform server. An example authorization message 1191, substantially in the form of a HTTP(S) POST message including XML-formatted data, is provided below:

```
POST /chargeauthorize.php HTTP/1.1
Host: www.visa.com/uve/auth
Content-Type: Application/XML
Content-Length: 484
<?XML version = "1.0" encoding = "UTF-8"?>
<auth>
    <gift_card_ID>675678987654</gift_card_ID>
    <user_ID>theoriginalowner@gmail.com</user_ID>
    <status>approved</status>
    <balance>0</balance>
    <checkout_ID>4NFU4RG94</checkout_ID>
    <timestamp>2011-02-22 15:22:43</timestamp>
</auth>
```

Once the purchase is authorized, the gift card balance may be exhausted or decremented. In one implementation, the MCB-Platform server may update the gift card balance at 1193 (e.g., update value card table record 5119*u*) to indicate the new balance.

Figure 12C:
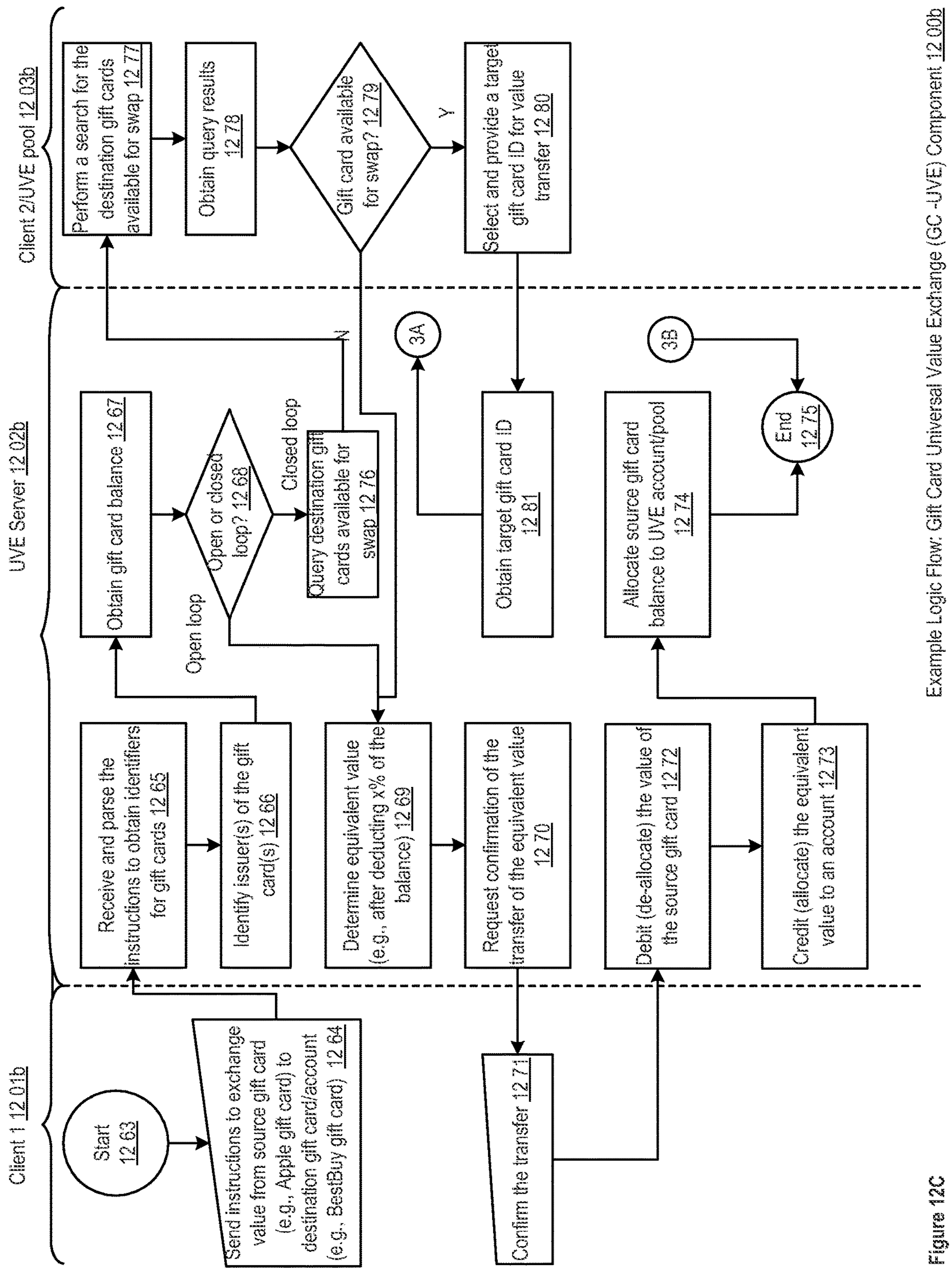
Figure 12D:
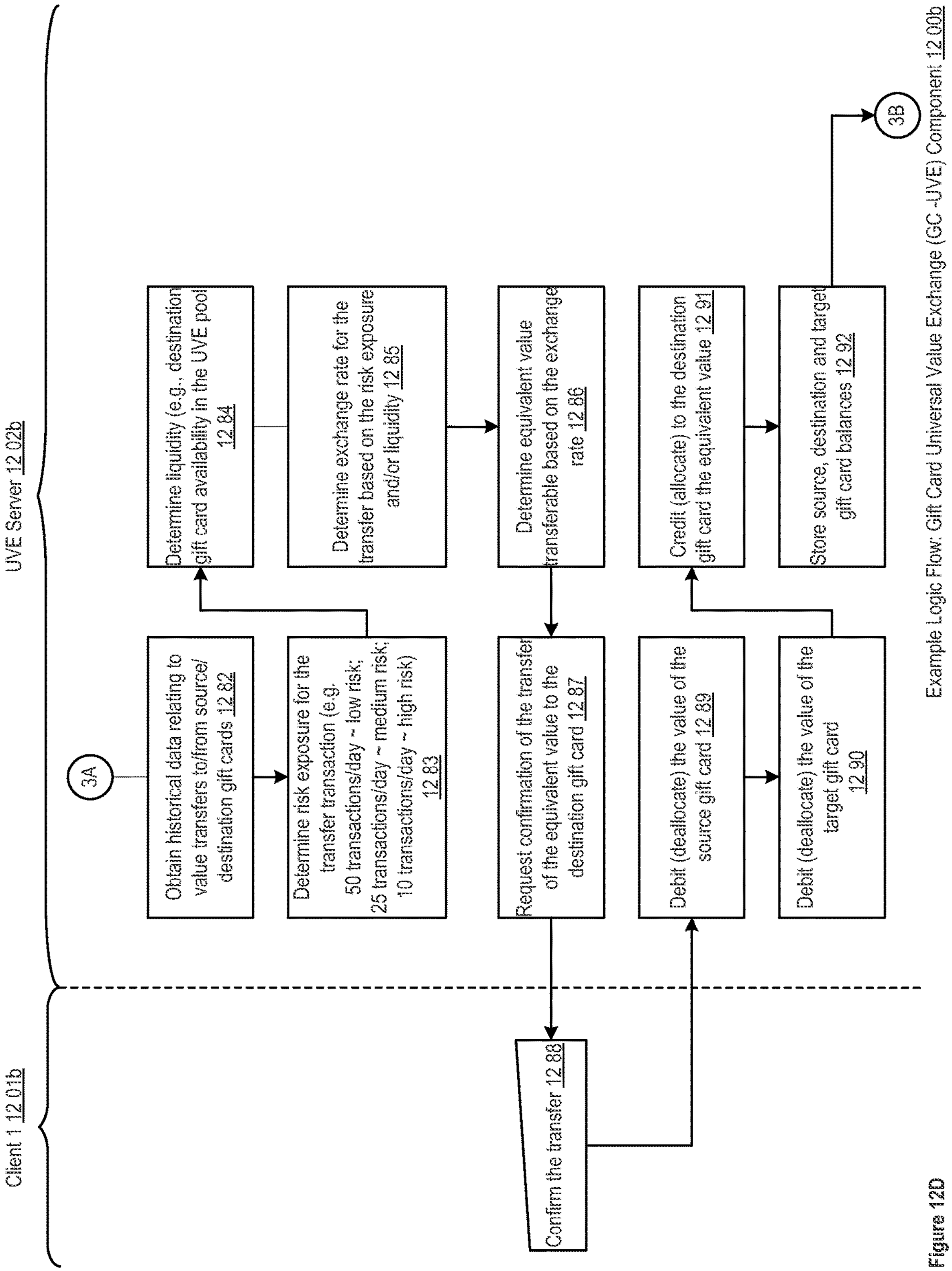

FIGS. 12C-D show logic flow diagrams illustrating closed loop gift card value exchange second embodiment of the MCB-Platform. The open/closed loop gift card value exchange may begin at 1263. At 1264, client 1 1201*b* may send instructions to transfer value from source gift card to a destination gift card. The instructions may identify the source gift card and the destination gift card. The instructions may be received by MCB-Platform server 1265. The MCB-Platform server may parse the instructions to obtain identifiers for the gift cards at 1265. The MCB-Platform server may further identify the issuers of the gift cards at 1266, and obtain balance in the source gift card account at 1267. At 1268, the MCB-Platform server may determine whether the source gift card is an open or a closed loop gift card. If the source gift card is a closed loop gift card, the MCB-Platform server may, at 1276, query one or more databases and/or tables to look up a target gift card exchange request (e.g., from client 2 1203*b*) or a target gift card that available in the MCB-Platform pool 1203*b* for exchange. If a target gift card is determined to be available at 1279 based on query results obtained at 1278, the MCB-Platform server may, in one implementation, request confirmation from client 2/pool that the target gift card may be used for exchange. In another implementation, the exchange may be preapproved. In one implementation, at 1280, the client 2/pool may select and/or provide a target gift card (e.g., gift card number) to the MCB-Platform server. The MCB-Platform server may obtain the target gift card information at 1281 and may determine the exchange rate and equivalent value (e.g., 1282-386) in a manner similar to that described with respect to FIGS. 12A-B. At 1287, the MCB-Platform server may send a request to client 1 asking to confirm that the equivalent value and/or exchange rate is acceptable. At 1288, client 1 may confirm the exchange. At 1289, upon receiving the confirmation, the MCB-Platform may deallocate (or debit) the value of the source gift card such that the balance of the source gift card is not available to the user. In one embodiment, the original value of the gift card will be set to an allocated value card that is associated with the original card. In essence this will be the value used by MCB-Platform participants. If a card is to have a value deallocated, this value card will have the appropriate amount deducted from it based on value exchange calculations, while the amount on the original card is as of yet unaffected. For example, the transfer request data structure 282 shows the underlying card value of 200 points is unaffected while participating user 1 will see only 100 points of that value and participating user 2 will see 50 points and the MCB-Platform in this example has allocated 50 points to itself for various transaction fees. As such, the MCB-Platform may generate a new value card record in value card table 5119*u* having the original identifier of the card, the original owner ID of the card, the target owner ID, the tracking equivalent amount that deducts the appropriate value equivalent off of the original amount and the transferred amount. This tracking equivalent amount is what will be visible to the original owner. The target user will see the transferred value field associated with the gift card. Similarly, credit/allocate may affect the field values of the value card record appropriately.

At 1290, the MCB-Platform server may deallocate the value of the target gift card such that the value of the target gift card is not available for the target gift card for anyone else. At 1291, the destination gift card is allocated the equivalent value. In one implementation, the destination gift card is linked to the target gift card. When the user makes a purchase using his or her destination gift card, a charge request is sent to the issuer of the target gift card to charge the value of the purchase (up to the equivalent amount) to the target gift card. As such, the allocation and deallocation are ledger entries made to track the exchange of the gift cards between users without actually moving funds from one account to another. In some implementations, the payment gateway may assist in the routing of the charge requests to the appropriate issuer or issuer bank. At 1292, the MCB-Platform server may update the ledger entry balances for the source, destination and target gift card, concluding the process at 1275.

Referring to FIG. 12C, when there is no target gift card available for a swap at 1279, or when the source gift card is determined to be an open loop card at 1268, the MCB-Platform server may determine the equivalent value of the source gift card at 1269. In one implementation, the equivalent value may be 50% of the source gift card value. In another implementation, the equivalent value may be determined using similar method outlined in 1282-386 (FIG. 12D). At 1270, the MCB-Platform server may provide the equivalent value to client 1 and request acceptance of the transfer. At 1271, the user may input acceptance of the transfer and the client may provide the acceptance message to the MCB-Platform server. In response, the MCB-Platform server may deallocate the value of the source gift card at 1272, and may allocate the equivalent value to an account at 1273. In one implementation, the user may select an account where the equivalent value may be deposited. In an alternate implementation, the equivalent amount be converted into MCB-Platform currency and the user's MCB-Platform currency balance may be updated. At 1274, the value of the source gift card account may be allocated to a MCB-Platform account or a MCB-Platform pool, concluding the gift card exchange process. Examples on how to allocate and deallocate are discussed with respect to processes e.g., 1289, 1291.

Figure 13:
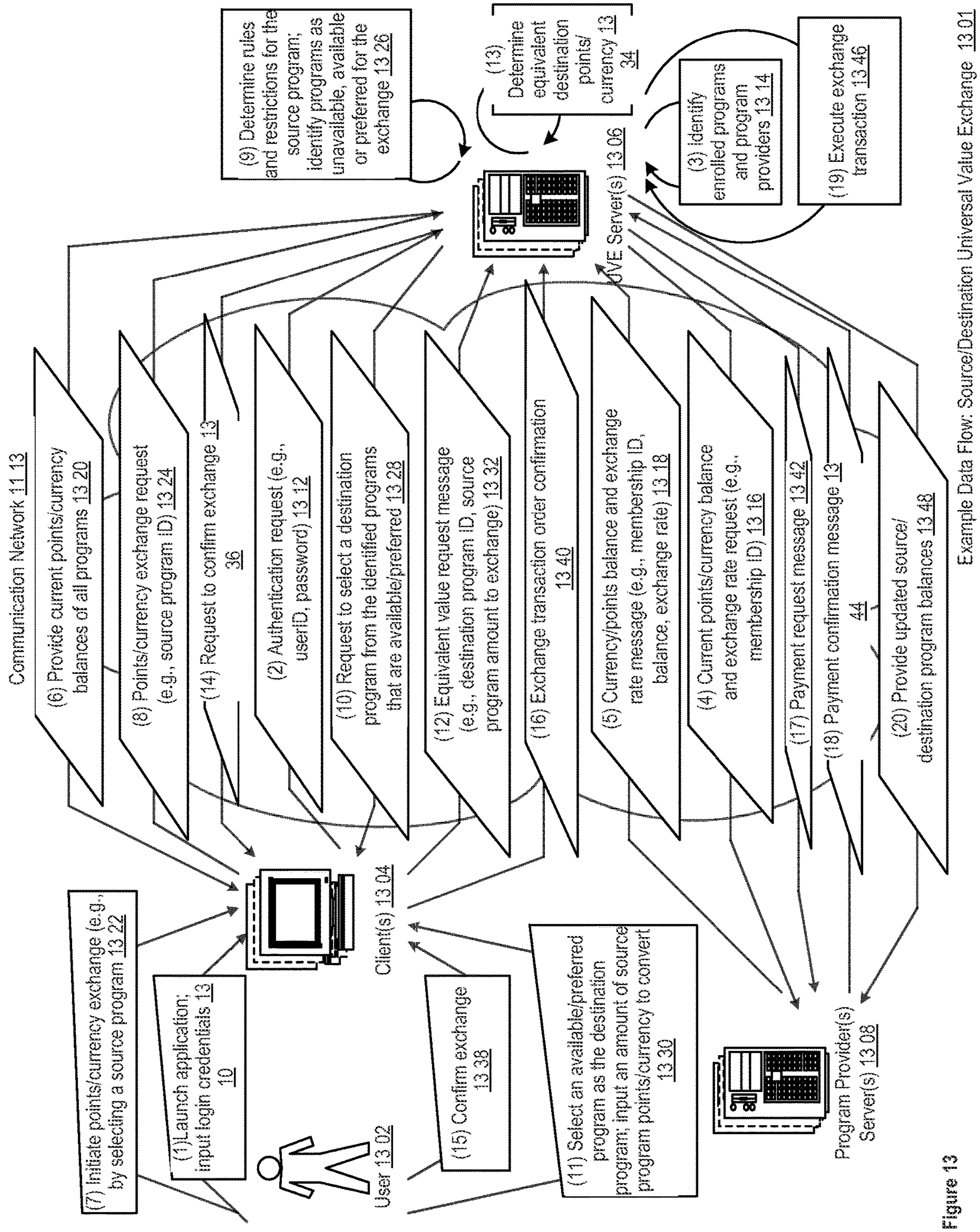
FIG. 13 shows a data flow diagram illustrating source/destination value exchange embodiment of the MCB-Platform.

FIG. 13 shows a data flow diagram illustrating source/destination value exchange embodiment of the MCB-Platform. A user 1302 may launch a MCB-Platform application or access a MCB-Platform web page and input login credentials into a client 1304 at 1310. The client may generate and send an authentication request 1312 to the MCB-Platform server 1306. An example authentication request 1312, substantially in the form of a HTTP(S) POST message including XML-formatted data, is provided below:

```
POST /authreqyest.php HTTP/1.1
Host: www.visa.com/uve
```

-continued

```
Content-Type: Application/XML
Content-Length: 1384
<?XML version = "1.0" encoding = "UTF-8"?>
<auth_request>
    <request_ID>45DSKFSWGG9</request_ID>
    <timestamp>yyyy-mm-dd hh:mm:ss</timestamp>
    <user_ID>JDoe@gmail.com</user_ID>
    <password>kingoftheworls1982</password>
    <wallet_account_ID>6785456789763434</wallet_account_ID>
  <client_details>
    <client_IP>192.168.23.122</client_IP>
    <client_type>smartphone</client_type>
    <client_model>HTC Hero</client_model>
    <OS>Android 2.2</OS>
    <app_installed_flag>true</app_installed_flag>
  </client_details>
</auth_request>
```

The MCB-Platform server may extract details from the authentication request 1312 (e.g., XML data) to validate the authentication request. If the authentication request cannot be verified, the user may be asked to re-enter login credentials. The MCB-Platform server may identify all the loyalty programs that the user is currently enrolled in at 1314. The MCB-Platform server may also identify the program providers of the enrolled programs. In one implementation, the MCB-Platform may query its user database to obtain a list of the user's enrolled programs. For example, the MCB-Platform server may issue PHP/SQL commands to query a database table for enrolled program data associated with the user. An example query, substantially in the form of PHP/SQL commands, is provided below:

```
<?PHP
header('Content-Type: text/plain');
mysql_connect("254.93.179.112",$DBserver,$password); // access
database server
mysql_select_db("MCB-Platform_DB.SQL"); // select database table
to search
//create query
$query = "SELECT enrolled_program_list program_issuer FROM
UserTable WHERE user LIKE '%'
$user_id";
$result = mysql_query($query); // perform the search query
mysql_close("MCB-Platform_DB.SQL"); // close database access
?>
```

In one implementation, the MCB-Platform server may query an issuer database to obtain issuer balance/exchange rate request template to process the exchange. The issuer template may include instructions, data, login URL, login API call template, rules and restrictions file, exchange rate file and/or the like for facilitating data exchange between the MCB-Platform server and the program issuer server. An example PHP/SQL command listing, illustrating substantive aspects of querying the database, is provided below:

```
<?PHP
header('Content-Type: text/plain');
mysql_connect("254.93.179.112",$DBserver,$password); // access
database server
mysql_select_db("MCB-Platform.SQL"); // select database table to
search
//create query
$query = "SELECT template FROM ProgramTable WHERE issuer LIKE
'%' $program_issuer";
```

-continued

```
$result = mysql_query($query); // perform the search query
mysql_close("MCB-Platform.SQL"); // close database access
?>
```

In one implementation, the MCB-Platform may create and send a current points/currency balance and exchange rate request 1316 to the identified program provider servers 1308. The request 1316 may be in the form of an API/web service call in some implementations. The program provider servers may respond to the MCB-Platform server's request with the requested points/currency balance. For example, the program provider server may provide an HTTP(S) POST message, e.g., 1318, similar to the example below:

```
POST /balanceinfo.php HTTP/1.1
Host: www.uve.com
Content-Type: Application/XML
Content-Length: 1306
<?XML version = "1.0" encoding = "UTF-8"?>
<balance_notification>
    <request_ID>4NFU5GG94</request_ID>
    <timestamp>20xx-02-22 15:22:43</timestamp>
    <member_ID>5645789643452367</member_ID>
    <balance>100</balance>
    <rate>10</rate>
    <base_currency>dollars</base_currency>
</balance_notification>
```

The MCB-Platform server may then provide program points/currency balance message 1320 to the user's client 1304. In one implementation, the client may display the contents of the message 1320 to the user. The user may initiate a points/currency exchange transaction at 1322. In one implementation, the user may select a source program to initiate an exchange transaction. The client may generate and send a points/currency exchange request 1324 to the MCB-Platform server. In one implementation, the request 1324 may include user ID, source program ID, and/or the like. An example exchange request 1312, substantially in the form of a HTTP(S) POST request including XML-formatted data, is provided below:

```
POST /exchangerequest.php HTTP/1.1
Host: www.visa.com/uve
Content-Type: Application/XML
Content-Length: 1384
<?XML version = "1.0" encoding = "UTF-8"?>
<exchange_request>
    <request_ID>45DSKFTGGG9</request_ID>
    <timestamp>yyyy-mm-dd hh:mm:ss</timestamp>
    <user_ID>JDoe@gmail.com</user_ID>
  <source_details>
    <member_ID>4444566897978766</member_ID>
    <program_ID>MER675656</program_ID>
    <issuer_ID>apple</issuer_ID>
    <card_value>100</card_value>
    <currency>usd</currency>
  </source_details>
  <client_details>
    <client_IP>192.168.23.122</client_IP>
    <client_type>smartphone</client_type>
    <client_model>HTC Hero</client_model>
    <OS>Android 2.2</OS>
    <app_installed_flag>true</app_installed_flag>
  </client_details>
</exchange_request>
```

The MCB-Platform server may receive the exchange request and parse the request to obtain details (e.g., XML data). For example, the MCB-Platform server may identify the source program, and using the user ID, identify destination programs to which the source program points/currencies could be transferred. At 1326, the MCB-Platform server may query one or more databases and/or tables to determine rules and restrictions for the source program. Further, in some implementations, the MCB-Platform server may examine the rules and restrictions to determine potential destinations programs that are available for exchange, unavailable for exchange and preferred for exchange. FIGS. 5A-B provide additional detail on these determinations. Upon identifying the potential destination programs, the MCB-Platform server may send the client a request 1328 to select a destination program. The request 1328 may include the list of the potential destination programs and indications of whether they are unavailable, available or preferred destination program. For example, the request 1328 may include XML formatted data similar to the example below:

```
<selectdestination_request>
    <request_ID>45DSJKTGGG9</request_ID>
    <timestamp>yyyy-mm-dd hh:mm:ss</timestamp>
  <source_details>
    <member_ID>4444566897978766</member_ID>
    <program_ID>MER675656</program_ID>
    <issuer_ID>apple</issuer_ID>
    <card_value>100</card_value>
    <currency>usd</currency>
  </source_details>
  <destination_details>
    <destination1>
        <program_ID>MER567855</program_ID>
        <issuer_ID>Hilton</issuer_ID>
        <designation>available</designation>
    </destination1>
    <destination2>
        <program_ID>MER598755</program_ID>
        <issuer_ID>BestBuy</issuer_ID>
        <designation>available</designation>
    </destination2>
    <destination3>
        <program_ID>MER232855</program_ID>
        <issuer_ID>Microsoft</issuer_ID>
        <designation>unavailable</designation>
    </destination3>
    <destination4>
        <program_ID>MER765555</program_ID>
        <issuer_ID>Macworld</issuer_ID>
        <designation>preferred</designation>
    </destination4>
    .
    .
    .
</selectdestination_request>
```

The potential destination programs and their corresponding indications may be displayed by the client. The client may specifically grey out unavailable destination programs to indicate that the unavailable program cannot be selected by the user for the exchange transaction. Further the client may highlight the preferred options to draw the user's attention to the most optimal option for the exchange transaction. In one implementations, potential destination programs that are neither unavailable nor preferred may be displayed normally and may be available to the user for selection even though the option may not be the most optimal.

At 1330 the user may select an available or preferred destination program. Upon selection of the source program, the client may display an option for the user to select or input an amount of the source program points/currency to exchange. In some implementations, a default amount (e.g., available balance) may be pre-populated. The client may package the user's input of the selected destination program and the amount of the source program points/currency into an equivalent value request 1332 and send the request to the MCB-Platform server. In one implementation, the equivalent value request 1332 may include user ID, destination program ID, source program ID, source program amount, and/or the like. The MCB-Platform server may receive the request 1332 and parse the request to identify the source program, destination program as well as the amount to be exchanged. The MCB-Platform server may query one or more databases and/or tables to determine the exchange rate between source program and the destination program. The MCB-Platform server may then utilize the exchange rate to calculate the equivalent value in destination points/currency at 1334. The MCB-Platform server may send a request 1336 to the client to confirm exchange for the equivalent destination points/currency. In one implementation, the request 1336 may include user ID, source program ID, destination program ID, equivalent value, exchange rate, validity time period, and/or the like. The user may view the equivalent value and exchange rate and may agree to proceed with the exchange transaction at 1338. The confirmation message 1340 may then be generated by the client and sent to the MCB-Platform server. Upon receiving confirmation from the user, the MCB-Platform server may send a payment request 1342 to the program provider to request payment for the exchange transaction. In one implementation, the payment request 1342 may include provider ID, source program ID, destination program ID, user ID, exchange rate, equivalent value, points/currency amount for exchange, bill amount and/or the like. An example payment request 1342, substantially in the form of a HTTP(S) POST request including XML-formatted data, is provided below:

```
POST /paymentrequest.php HTTP/1.1
Host: www.programprovider.com/miles
Content-Type: Application/XML
Content-Length: 1384
<?XML version = "1.0" encoding = "UTF-8"?>
<payment_request>
    <request_ID>45KGKFTGGG9</request_ID>
    <timestamp>yyyy-mm-dd hh:mm:ss</timestamp>
    <member_ID>4444566897978766</member_ID>
    <program_ID>MER675656</program_ID>
    <exchange_rate>10</exchange_rate>
    <exchange_rate_startdate>yyyy-mm-dd</exchange_rate_startdate>
    <exchange_rate_enddate>yyyy-mm-dd</exchange_rate_enddate>
    <destination_program>BestBuy</destination_program>
    <currency_amt>10000</currency_amt>
    <currency>miles</currency>
    <equivalent_amt>225</equivalent_amt>
    <bill_owed>250</bill_owed>
</payment_request>
```

The program provider may authorize payment and may send a payment confirmation message 1344 to the MCB-Platform server. The payment confirmation message may include provider ID, source program ID, destination program ID, user ID, exchange rate, equivalent value, points/currency amount for exchange, payment ID, bill amount and/or the like. In one implementation, both the source and destination program providers may be billed for the services provided. Upon receiving the payment confirmation message 1344, the MCB-Platform server may execute the exchange transaction at 1346. In one implementation, executing the exchange transaction may include decrementing the user's source program points/currency and incrementing the destination program points/currency. Upon execution of the exchange transaction, the source/destination gift card balances may be updated and the updated balance information may be provided to the program providers via a balance message 1348.

Figure 14B:
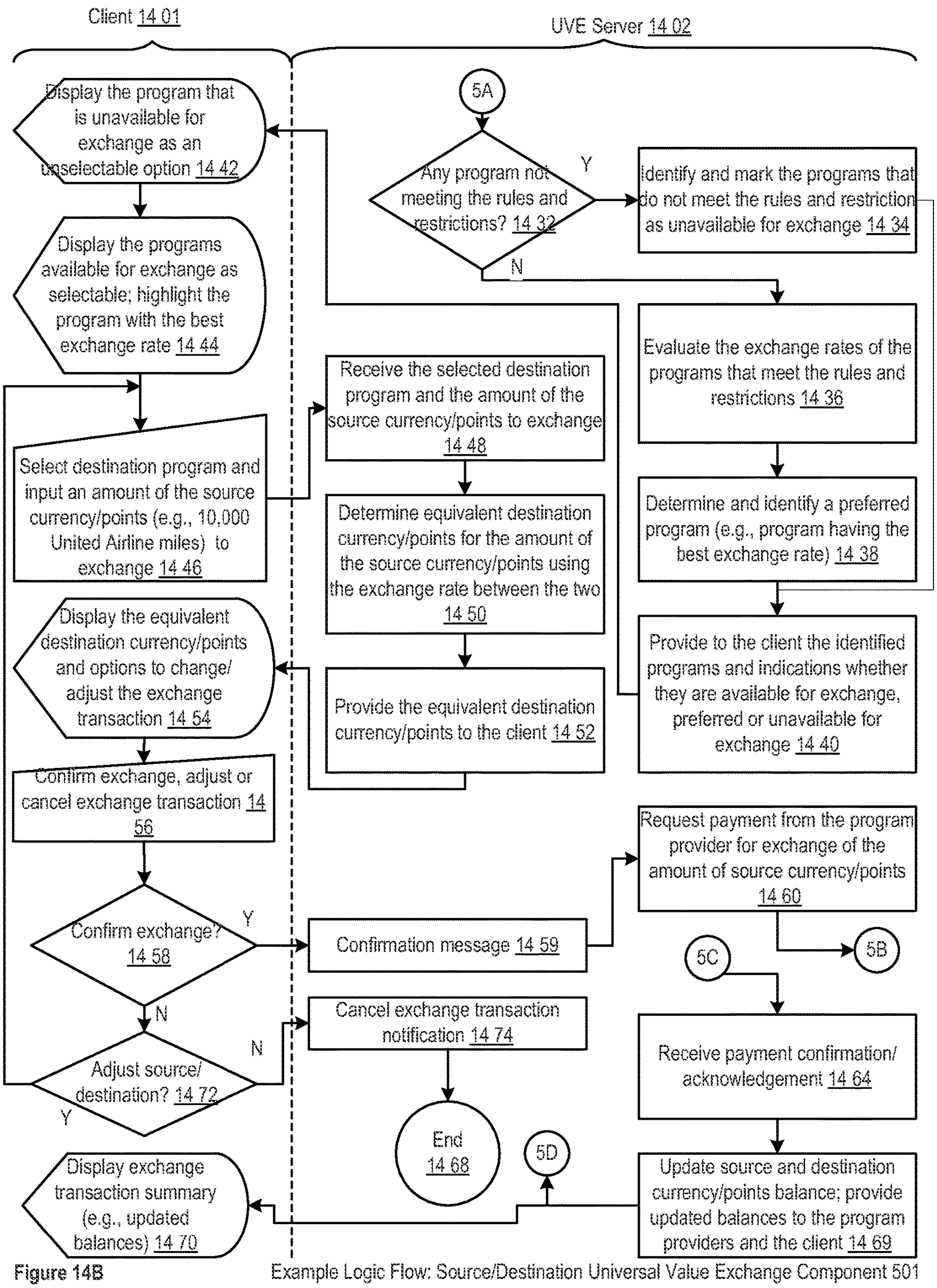

FIGS. 14A and 14B show logic flow diagrams illustrating source/destination value exchange component embodiment of the MCB-Platform. Starting at 1406, a user may launch a MCB-Platform application on a client 1401 and may provide login credentials at 1408. The login credentials are sent by the client to the MCB-Platform server 1402. The MCB-Platform server may receive the login credentials at 1410 and may authenticate the user. Once the user is authenticated, at 1412 the MCB-Platform server may query one or more user databases and/or tables using for example the user ID to identify loyalty programs in which the user is currently enrolled. At 1414, the MCB-Platform server may communicate with the enrolled programs to ascertain current points/balance and any exchange rate that they may have established. In one implementation, the MCB-Platform server may communicate with the program service provider servers 1403 using API/web service calls. The program provider servers may receive the request from the MCB-Platform server, and at 1414, may validate that the request is authentic. For example, the program provider may check the MCB-Platform server credentials, user ID and/or the like to validate the request. At 1417, the program service provider server may use the user ID in the received request to query their databases and/or tables to determine the user's current points/currency balance. In a further implementation, the program service provider may also look up the exchange rate for the source program points/currency. At 1418, the program service providers may return the obtained balance and exchange rate information to the MCB-Platform server. At 1420, the MCB-Platform server may obtain the balance and exchange rate information from each enrolled program. The MCB-Platform may also provide the balance information, and in some implementations, the exchange rate for each of the enrolled program to the client. In some implementations, the balance information may be directly communicated to the client by the program service provider. Upon receiving the points/currency balance, the client may display the balance at 1422 and inquire if the user wishes to select a source program for an exchange transaction.

At 1424, the user may select a source currency/point program to initiate an exchange transaction. The client may communicate the selected source program to the MCB-Platform server which may receive the selection at 1426. At 1428, the MCB-Platform server may parse the message received and may query the rules and restrictions database to determine any rules and restrictions associated with the source program.

In some implementations, each program may have rules and restrictions associated therewith that allow certain exchanges to proceed while forbidding others. Example rules and restrictions include: a minimum redemption group (e.g., redeem in groups of 1400 miles), minimum redemption amount (e.g., users with 10,000 miles or more can redeem), non-refundable exchange, exchange amount limit, number of transactions per period limit, and/or the like.

At 1430, the MCB-Platform server may obtain the associated rules and restrictions file and may evaluate each of the other enrolled programs against the source program rules and restrictions. Referring to FIG. 14B, at 1432, any program not meeting the rules and restrictions may be identified. At 1434, one or more programs that do not meet the source program rules and restrictions may be identified and marked as unavailable for exchange, and the processing moves to 1440. If at 1432, all programs are found to meet source program rules and restrictions, the processing moves to 1436. At 1436, the MCB-Platform server may evaluate the exchange rates of the programs that meet the rules and restrictions, and at 1438, based on the evaluation, the MCB-Platform may determine and identify a preferred program for the exchange transaction. In one implementation, for example, a preferred program may be a program that has the most favorable exchange rate with the source program. With regard to identifying, highlighting, marking, etc., value exchange program at e.g., 1434, 1436, 1438, 1440, the MCB-Platform may make entries as being preferred, not allowed or restricted, allowed, etc., by updating a programs record 5119*k* appropriately. For example, program record entry for, e.g., Delta Skymiles 850*b* of FIG. 8L may appear as follows:

```
<program1>
    <program_name>Mileage Plus United</program_name>
    <status>restricted</status>
    <exchange_rate>NA</exchange_rate>
</program1>
<program2>
    <program_name>Hilton HHnoros Point</program_name>
    <status>Preferred</status>
    <exchange_rate>2:1</exchange_rate>
</program2>
<program3>
    <program_name>BestBuy Rewards</program_name>
    <status>allowed</status>
    <exchange_rate>10:1</exchange_rate>
</program3>
.
.
.
```

In other implementations, the preferred program may have additional rewards/points that may be obtained after the completion of the exchange. In yet other implementations, preferred programs may be selected based upon other factors such as acceptance, transaction history, and/or the like. Exchange rate evaluation and preferred program determination are discussed in detail with respect to FIGS. 6A-B.

At 1440, the MCB-Platform server may provide to the client the identified programs and indications whether each program is unavailable, available or preferred for exchange with the source program. The client may receive the identified program information and may display the unavailable program as an unselectable option at 1442. In one implementation, the unavailable program may be grayed out to clearly identify that the source program rules and restrictions forbid conversion of the source program to the unavailable program. At 1444, the client may display the available programs as options that can be selected. In a further implementation, the client may highlight the preferred program so as to clearly identify that the highlighted program is the preferred program to which the source program points/currency should be converted to.

The user may select a destination program from the available list of programs and may input an amount of the source/currency points at 1446. The client receives the input and sends the information to the MCB-Platform server which receives the selected destination program and the amount of the source program points/currency for exchange at 1448. At 1450, the MCB-Platform may determine equivalent amount of destination currency/points for the selected amount of source program currency points. In one implementation, the equivalent amount may be calculated based on the exchange rate between the source and destination program points/currency. In some implementations, the exchange rate of each program may be with respect to a base currency/unit such as the MCB-Platform point, from which the exchange rate between the two program points/currency may be determined. At 1452, the MCB-Platform may provide the equivalent destination currency/points to the client which may display the information at 1454. The client may also display controls for the user to adjust or change the transaction. For example, the user may go back and change the destination program or may adjust the source program points/currency amount. At 1456, the user may confirm the exchange, adjust or cancel the exchange transaction. At 1458, if the user does not confirm the transaction, the client may inquire if the user may want to adjust the transaction. At 1472, if the user wants to adjust the transaction, the process may move to 1446, where the user is provided an option to select another destination program or adjust the amount for conversion. If at 1472, the user does not wish to adjust the transaction, the client may notify the MCB-Platform server to cancel the exchange transaction at 1474. The exchange transaction may then come to its conclusion at 1468. On the other hand, if the user confirms the exchange at 1458, the client sends a confirmation message 1459 to the MCB-Platform server. At 1460, the MCB-Platform server may request payment from the program provider for exchange of the amount of source points/currency. Referring to FIG. 14A, the request may be received by the program service providers at 1462. At 1463, the program service providers may confirm payment or acknowledge the exchange transaction. Referring To FIG. 14B, the payment confirmation/acknowledgement may be received by the MCB-Platform server at 1464. The MCB-Platform server may then update the source/destination points/currency balance in one or more databases and/or tables. At 1469, the MCB-Platform server may provide the updated points/currency balances and/or confirmation of the exchange transaction to the client and the program providers. The client may receive the updated balances and confirmation and may display a transaction summary at 1470. Referring to FIG. 14A, the program providers may receive the updated balance information and confirmation of the transaction and may update their own records at 1466. The transaction processing may then conclude at 1468.

Figure 15A:
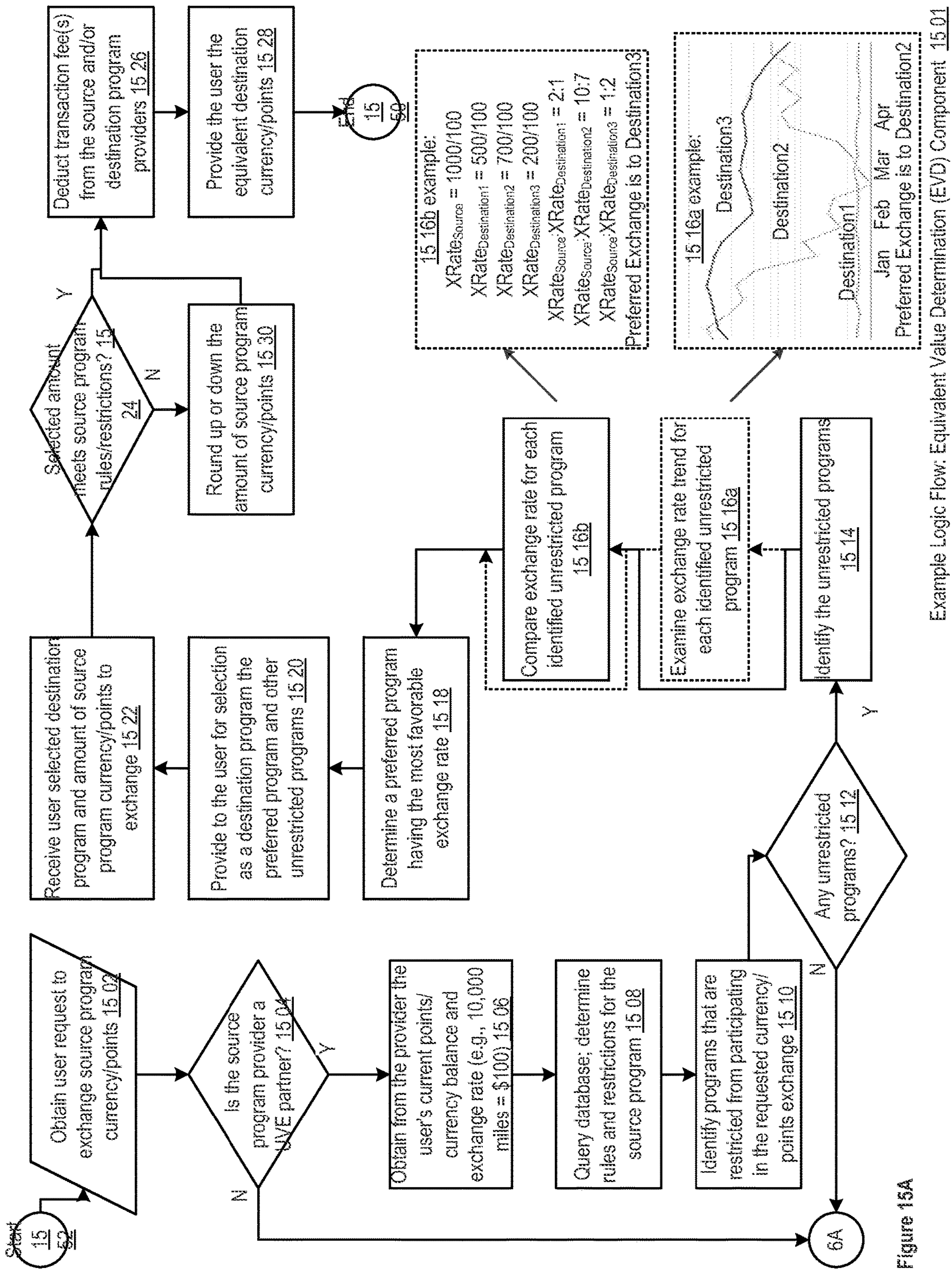
FIGS. 15A-B show logic flow diagrams illustrating equivalent value determination component embodiment of the MCB-Platform.
Figure 15B:
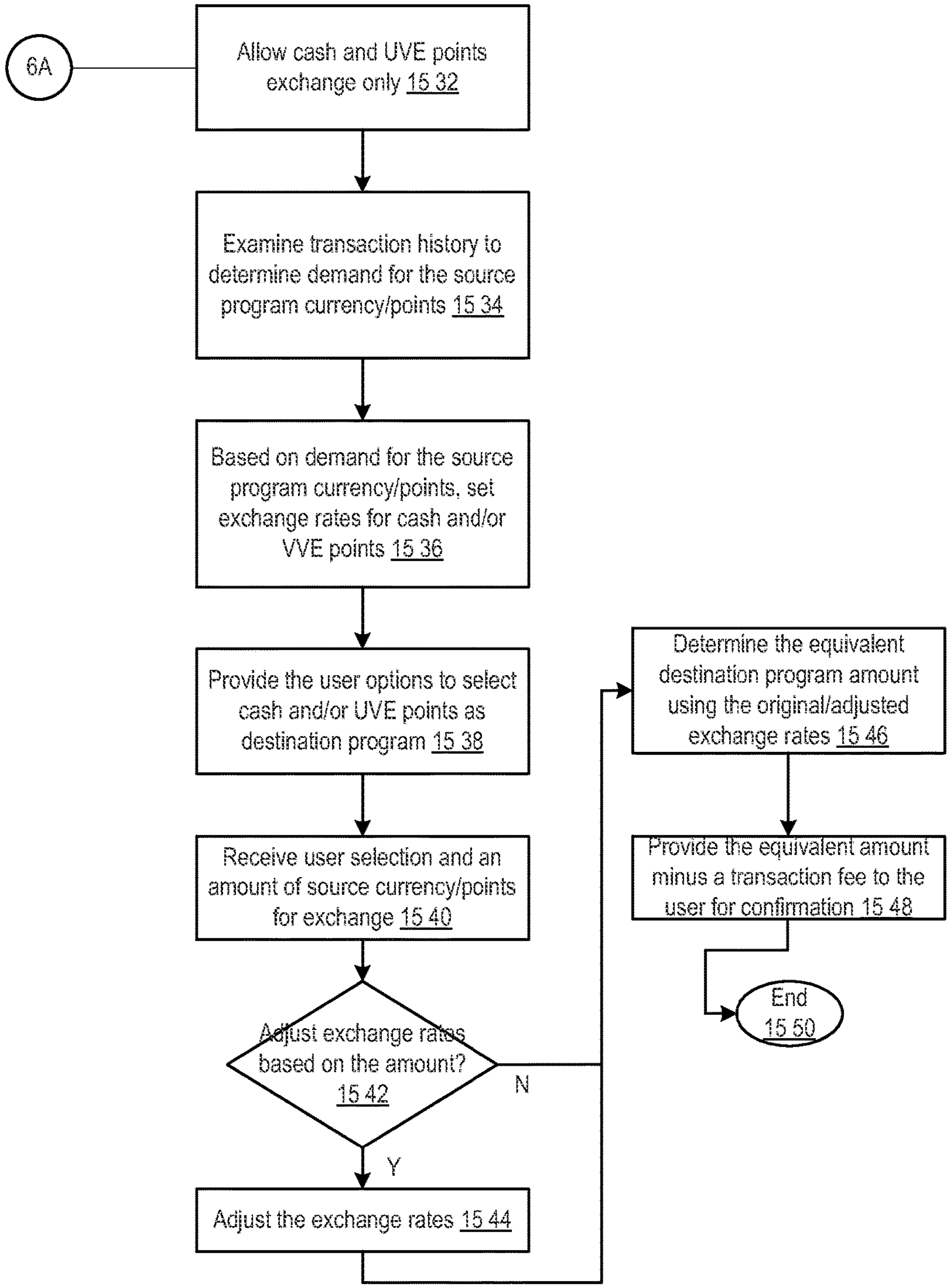

FIGS. 15A and 15B show logic flow diagrams illustrating equivalent value determination component embodiment of the MCB-Platform. Starting at 1552, the component 1501 may receive as input a user request to exchange a source program points/currency at 1502. At 1504, a determination may be made as to whether the source program provider is a MCB-Platform partner. In one implementation, a MCB-Platform partner is a program provider having an agreement with and enrolled in the MCB-Platform. If the source program provider is a MCB-Platform partner, the user's current program points/currency and exchange rate may be obtained from the provider at 1506. At 1508, rules and restrictions tables and/or databases may be queries using the provider's program ID to obtain rules and restrictions for the source program. At 1510, programs that are restricted from participating in the requested currency/points exchange are identified. A determination may be made at 1512 whether there are any unrestricted programs. If there are any unrestricted programs, such programs are identified at 1514. In one implementation, the exchange rates for each of the identified unrestricted programs points/currency are obtained and compared at 1516*b*. For example, as shown in 1516*b*, the exchange rate (e.g., points/dollars) of source, destination 1, destination 2 and destination 3 are obtained. Using the same common denominator (e.g., dollars), the exchange rate of the source with respect to each of the destination programs may be calculated. By comparing the calculated exchange rate ratios, the most favorable ratio may be selected. In the example shown, destination 3 has the most favorable ratio, and as such destination 3 may be selected as the preferred program at 1518. In another implementation, the component 1501 may obtain exchange rate data relating to the source/destination programs for at least the last three consecutive time periods. As shown in 1516*a* example, the exchange rate trend for each of the destination programs may be evaluated and a preferred exchange rate determined based on the trend analysis. In the example shown, destination 2 may be determined to be a preferred program for exchange. Upon determining a preferred program at 1518, the user may be requested to select a destination program from the list of preferred and other unrestricted programs at 1520. In one implementation, the restricted programs may also be displayed along with the preferred and/or unrestricted destination programs. In a further implementation, the restricted programs may be de-highlighted or grayed out to indicate that these programs may not be selected as destination programs. In one implementation, the preferred program(s) may be highlighted to clearly distinguish it from other options. In some implementations, the highlighting and de-highlighting may be mandated by exchange rate analyses (e.g., 1516*a*, 1516*b*). In a further implementation, one or more destination programs may be given preferential treatment based on user preferences. For example, the user may specify a ranking of his or her rewards programs. In such a case, the MCB-Platform server may present as preferred a destination program that the user prefers provided that the destination program is not restricted by the rules and conditions. In yet another implementation, bilateral relationship or affiliation between the source and a destination program may be taken into account while determining a preferred destination program.

The user selection of a destination program and an amount of the points/currency may be obtained at 1522. In one implementation, a determination may be made whether the user selected amount meets the source program rules/restrictions at 1524. For example, the source program rules and restrictions may require the source amount to be selected in groups of 500. As another example, a user may have to have select a minimum amount of points/currency or may not select more than a maximum amount of points/currency. If the user selected amount does not meet the rules and restrictions, the amount may be automatically adjusted at 530 by rounding up or down. If the user selected amount meets the rules and restrictions, or once the user selected amount has been adjusted to meet the rules and restrictions, transaction fees and/or payment for the points/currency may be billed to (or deducted from) the source/destination program providers at 1526. At 1528, the user may be provided the equivalent destination points/currency, completing the transaction at 1550.

In one implementation, when the source program provider is not a MCB-Platform partner (as determined at 1504) or when there are no unrestricted programs (as determined at 1512), referring to FIG. 15B, the exchange may be limited to MCB-Platform points/currency and/or cash at 1532. At 1534, the component may examine transaction history to assess the demand for the source program points/currency. In one implementation, a method similar to the risk exposure thresholds and weights shown in Table 1 may be utilized to determine demand or risk exposure. At 1536, the exchange rate may be set based on the weighted demand/risk exposure. At 1538, the user may be provided an option to select cash and/or MCB-Platform points as a destination program. At 1540, the component may obtain the user selected destination program and an amount of source points/currency for conversion. At 1542, a determination may be made whether to adjust the exchange rates based on the amount. For example, the amount selected by the user may be too high, increasing the risk exposure and therefore may require adjustment of the exchange rate. If an adjustment is required, at 1544, the exchange rate may be adjusted and the process moves on to 1546. At 1546, equivalent destination program amount may be determined using the original or adjusted exchange rates. At 1548, the equivalent amount may be provided to the user for confirmation. In some implementations a transaction fee may be levied for the exchange transaction. The process may conclude at 1550.

Figure 16:
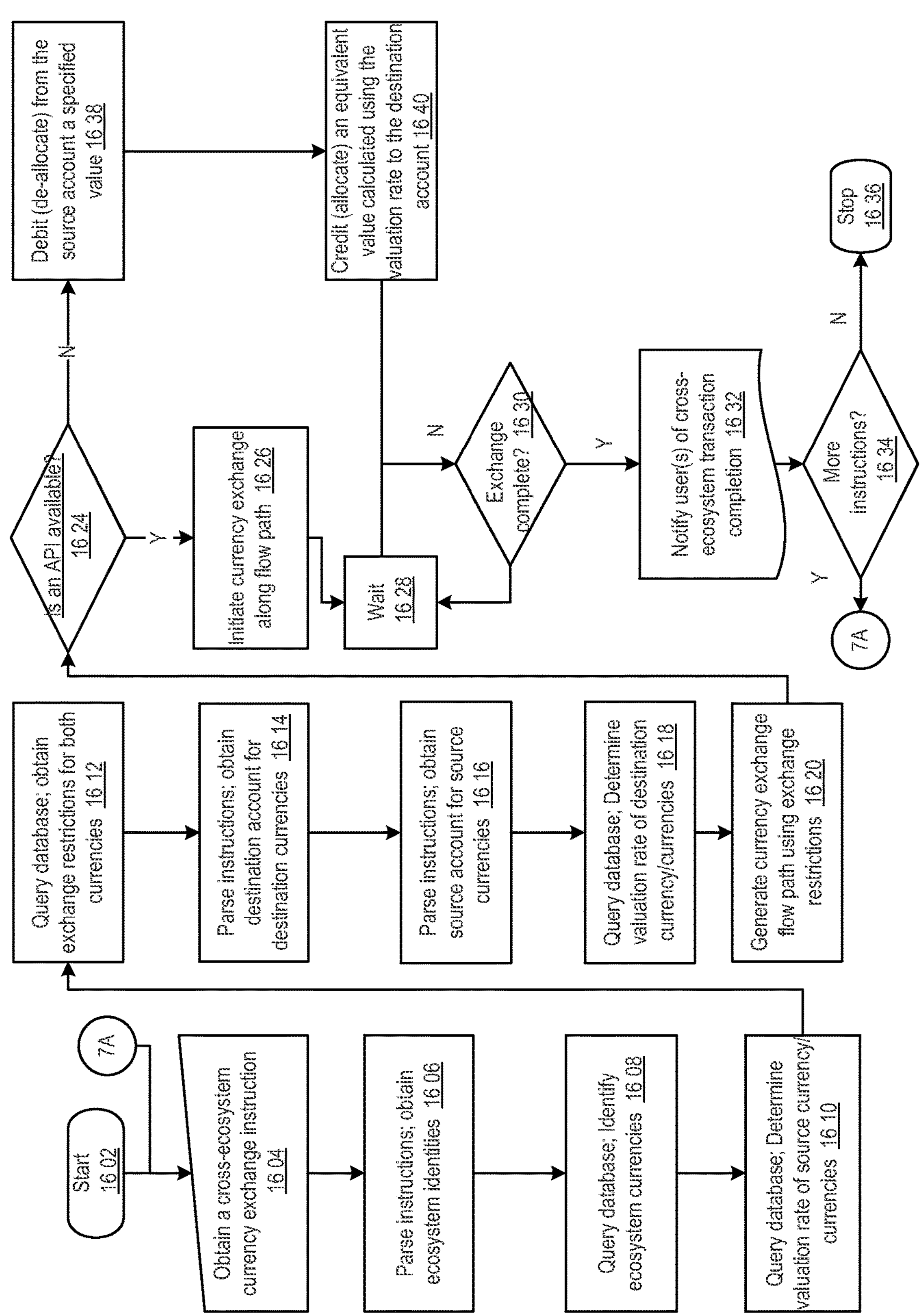
FIG. 16 shows a logic flow diagram illustrating cross-ecosystem exchange component embodiment of the MCB-Platform.

FIG. 16 shows a logic flow diagram illustrating cross-ecosystem exchange component embodiment of the MCB-Platform. Exemplary aspects of transforming value equivalent exchange instructions into cross-ecosystem currency exchanges in some embodiments of the MCB-Platform are discussed. In some implementations, a universal value exchange controller may obtain one or more cross-ecosystem currency exchange instructions, e.g., 1604. For example, such instructions may specify currency source details and currency destination details such as those discussed above. The universal value exchange controller may parse the obtained instructions, and determine the identities of the ecosystems acting as sources and destinations of the currencies, e.g., 1606. The universal value exchange controller may utilize the identities of the source and destination ecosystems to determine the currency types associated with each of the source and destination currency ecosystems, e.g., 1608. Using the currency types, the universal value exchange controller may determine an exchange rate of each of the source and destination currencies relative to a standard currency, e.g., 1610. For example, the universal value exchange controller may look up the currency exchange rates of the currency types of the currency sources in a relational database using a hypertext preprocessor (PHP) script utilizing Structured Query Language (SQL) commands. In some implementations, the universal value exchange controller may similarly determine the currency exchange rates of the currency types of the currency destinations, e.g., 1618. In some implementations, the universal value exchange controller may parse the cross-ecosystem currency exchange instructions, and obtain account information (e.g., account name, account number, routing number, password, security codes, CVV number, etc.) for the source currencies, e.g., 1616. For example, the universal value exchange controller may utilize such information to obtain access to the purchasing power retained in the currency sources. In some implementations, the universal value exchange controller may parse the cross-ecosystem currency exchange instructions, and obtain account information for the destination currencies, e.g., 1614. For example, the universal value exchange controller may utilize such information to obtain access to the currency destinations for depositing purchasing power into the currency destinations.

In some implementations, the universal value exchange controller may also determine whether there are any restrictions and/or conditions at each of the sources of the currencies, as well as the destinations of the currencies. For example, the universal value exchange controller may query a database to obtain the restrictions and/or conditions for the sources and/or destinations. In some implementations, the universal value exchange controller may generate, e.g., 1620, a currency exchange flow path based on the restrictions and/or conditions at the currency sources and/or destinations. Upon generating the currency exchange flow path, the universal value exchange controller may, n some implementations, if an API is available, e.g., 1624, initiate currency exchange along the generated currency exchange flow path, for example, by providing request messages to the components in the currency exchange flow path to provide and/or accept currency value, based on the generated currency exchange flow path. The universal value exchange controller may monitor the currency exchange flow among the components in the currency exchange flow path until the currency exchange is complete, e.g., 1628-1630. Alternatively if an API is not available, e.g., 1624, the MCB-Platform controller may deallocate a specified value from the source account e.g., 1638 and allocate an equivalent value calculated using the valuation rate to the destination account, e.g., 1640. Upon completing the currency withdrawal and/or deposits into each of the currency accounts involved in the cross-ecosystem currency exchange, the universal value exchange controller may provide notifications, e.g., 1632, for the users of the universal value exchange controller notifying them of completion of the requested cross-ecosystem currency transaction. In some implementations, the universal value exchange controller may determine whether there are more cross-ecosystem currency exchange instructions remaining to be processed (e.g., 1634, option "Y"), and perform the cross-ecosystem currency exchanges until all the cross-ecosystem currency exchange instructions have been processed (e.g., 1634, option "N").

Figure 17A:
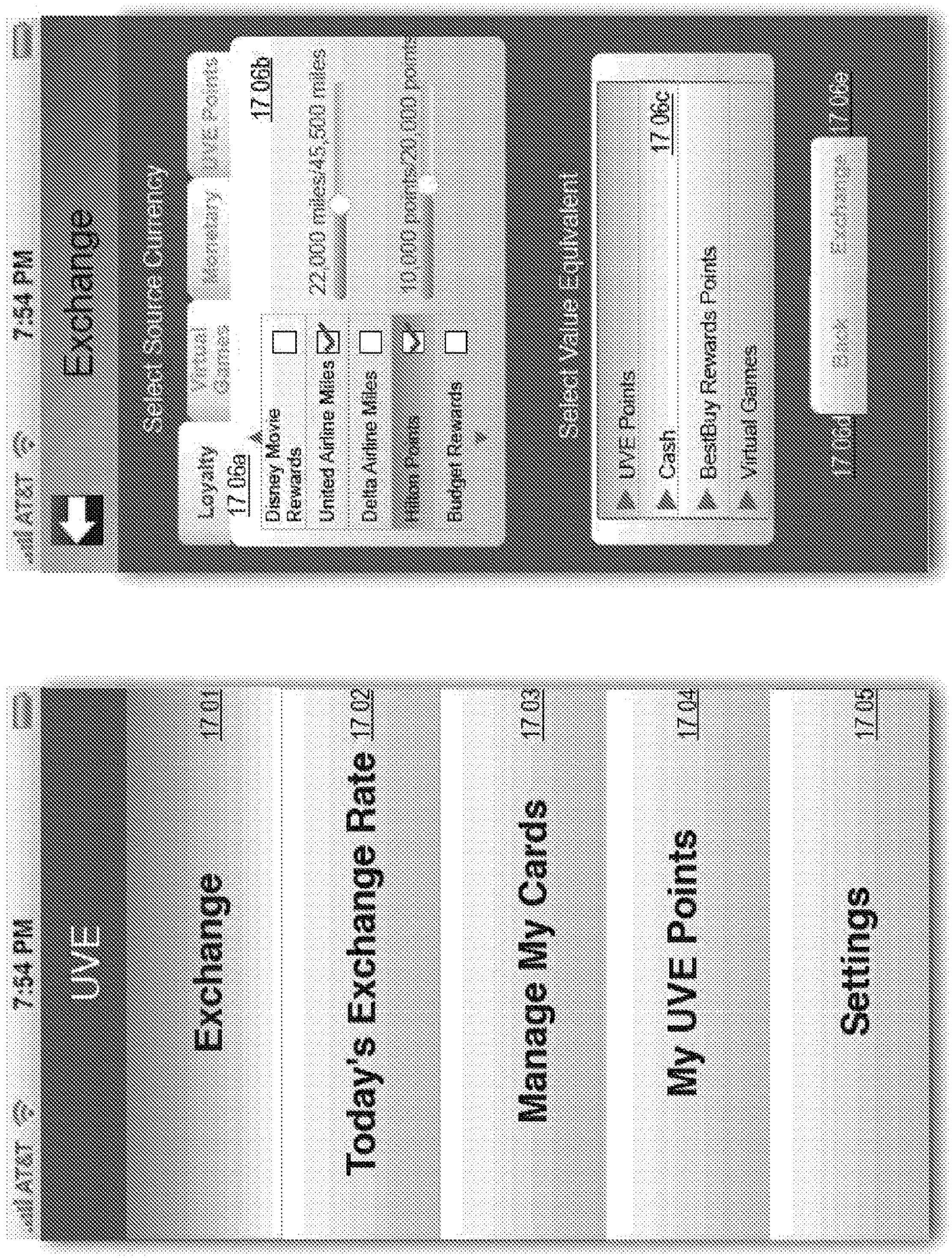
FIGS. 17A-D show screenshot diagrams illustrating exchange mode embodiments of the MCB-Platform.

FIGS. 17A-D show screenshot diagrams illustrating exchange mode embodiments of the MCB-Platform. In some implementations, the exchange mode UIs may include various options for user selections. Referring to FIG. 17A for example, the left UI shows exchange 1701, today's exchange rate 1702, manage my cards 1703, my MCB-Platform points 1704 and settings 1705 for user selection. Each of the options are discussed in further detail below.

When the exchange option 1701 is selected from the left UI, the exchange UI (right) may be displayed. The exchange UI may display various options for selecting a source currency. For example, a user may select the loyalty tab **1706*a* as a source currency. When the loyalty tab is selected a loyalty panel 1706*b* may be displayed. As shown, the loyalty panel may include a listing of loyalty cards or accounts. The user may select one or more of these loyalty accounts as a source currency. Further for each selected account, the user may view the total available points/currency as well as select the amount of currency the user would like to exchange. Also shown in the right UI is a value equivalent selection panel 1706*c*. The user may select any of the options as the destination into which the loyalty currencies may be converted to. The back button 1706*d* allows the user to go back to the left UI, while the exchange button 1706*e*** allows the user to initiate the exchange.

Figure 17B:
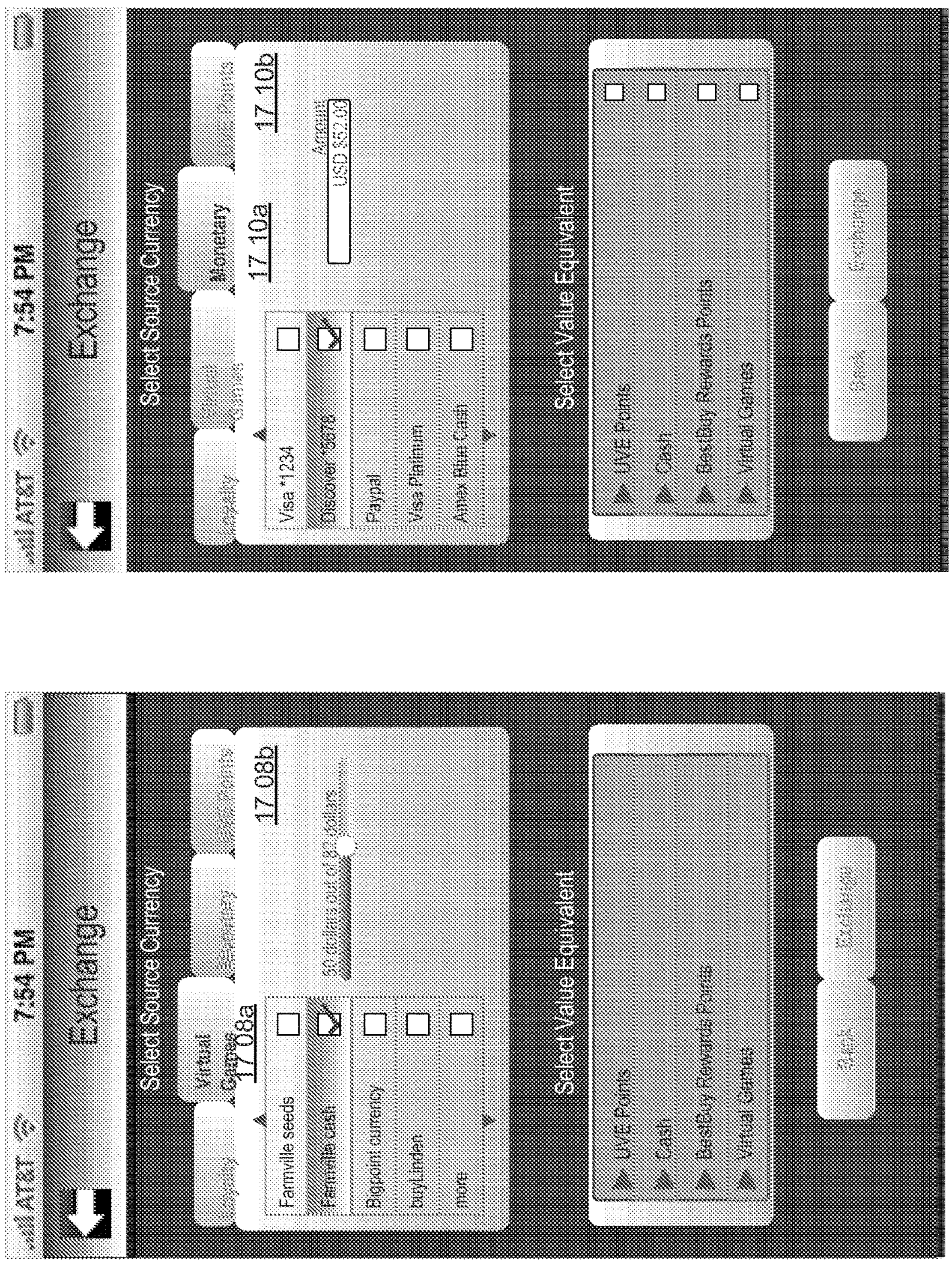
Figure 17C:
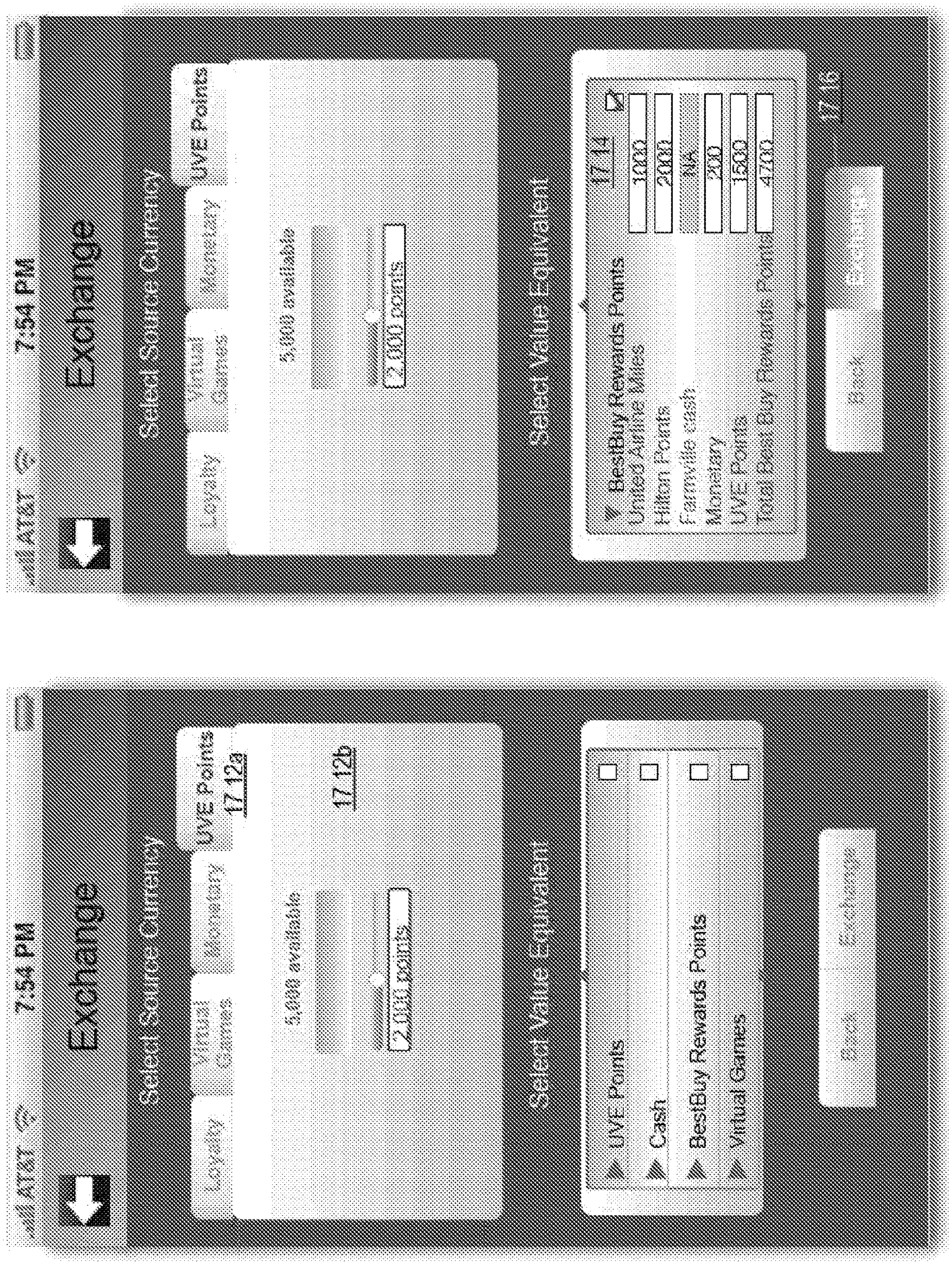
Figure 17D:
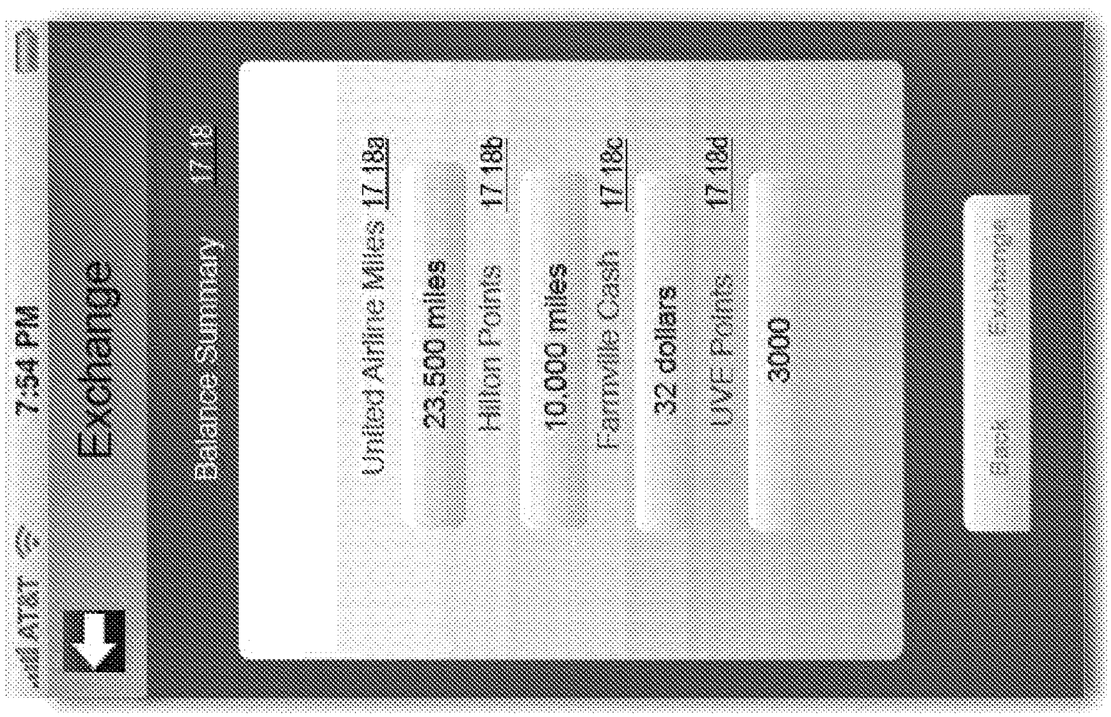

Referring to FIG. 17B, when the virtual games tab **1708*a* is selected, the virtual games panel 1708*b* is displayed. As shown, a list of the user's virtual currencies are populated. The user may select one or more of these virtual currencies as source currencies and may specify for each currency the amount to be converted. Referring to the right UI, the monetary tab 1710*a* is selected. The UI shows the monetary panel 1710*b* and a list of monetary accounts. These accounts may be imported from the user's electronic wallet. Alternately, these monetary accounts may be added by the user to the MCB-Platform application/account. As shown, one or more of these monetary accounts may be selected, and the user may specify for each selected account, the amount to be converted (e.g., $52). Referring to FIG. 17C, when the MCB-Platform points tab 1712***a* is selected, the MCB-Platform points panel 1712*b* may be displayed. As shown, the UI may display the amount of points available (e.g., 5000) and allow the user to select the amount of points to be converted (e.g., 2000 points). As shown in the right UI, any of the options in the value equivalent panel may be selected. As shown the BestBuy rewards points option is selected. The panel 1714 displays the user selected source currencies (e.g., United Airline Miles and Hilton points selected at panel 1706*b*, Farmville cash selected at 1708*b*, Discover *5678 account selected at 1710*b* and MCB-Platform points selected at 1712*b*), as well as equivalent of the selected source currencies in BestBuy rewards points. In one implementation, when a source currency cannot be converted into a selected currency, the conversion of that currency is skipped, and the rest of the currencies are converted. As shown in the right UI, the user may view the value equivalents, and if it is acceptable to the user, the user may confirm exchange by selecting the exchange button 1716. Referring to FIG. 17D, once the exchange is performed, a summary 1718 of the remaining points/currency balance in the programs may be displayed. For example, as shown, the UI may display the currencies that were converted 1718*a-d* along with the remaining balance. In some other implementations, the display 1718 may show the amount of currencies converted and the effective exchange rate.

Figure 17E:
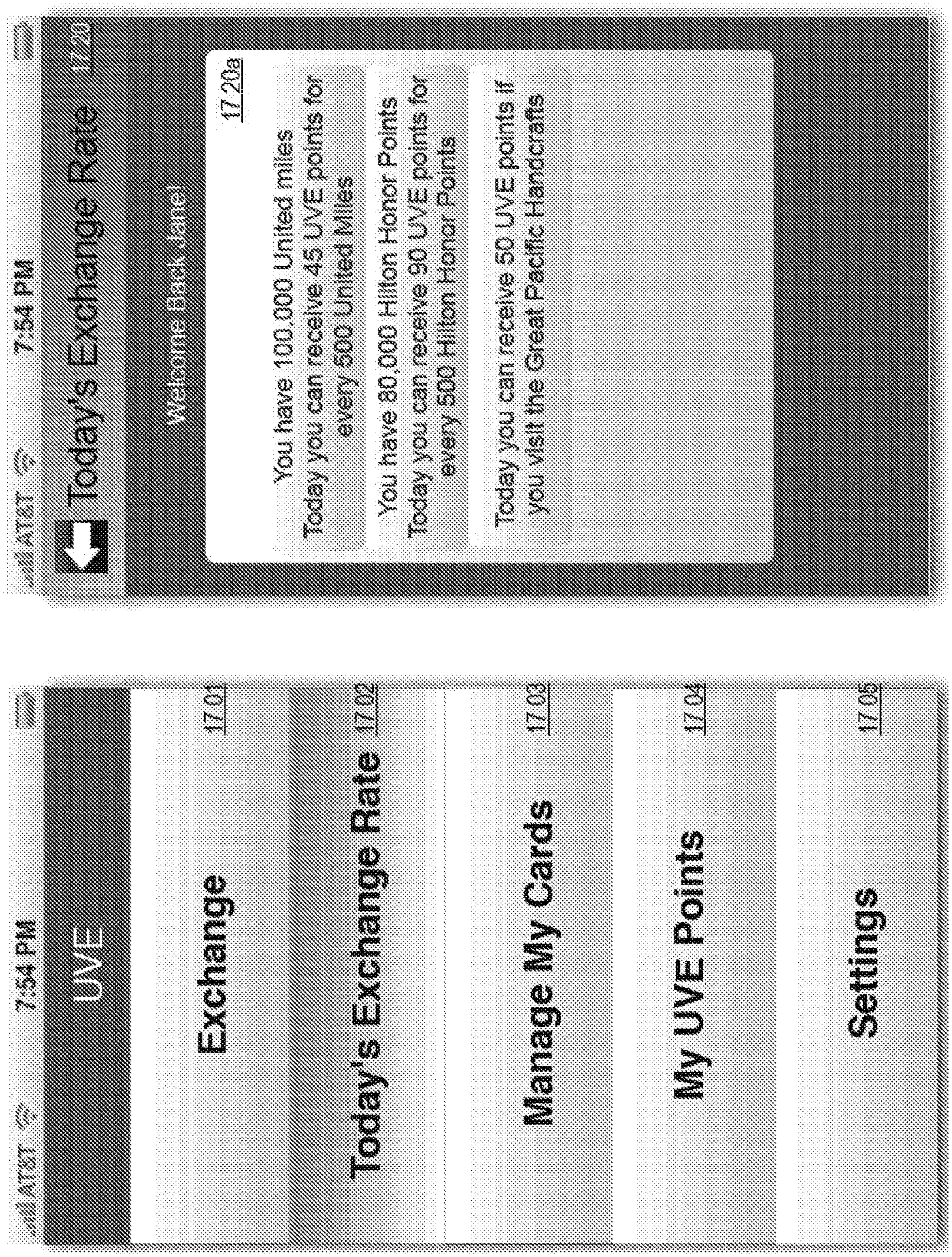
FIG. 17E shows screenshot diagrams illustrating exchange rate mode embodiment of the MCB-Platform.
Figure 17F:
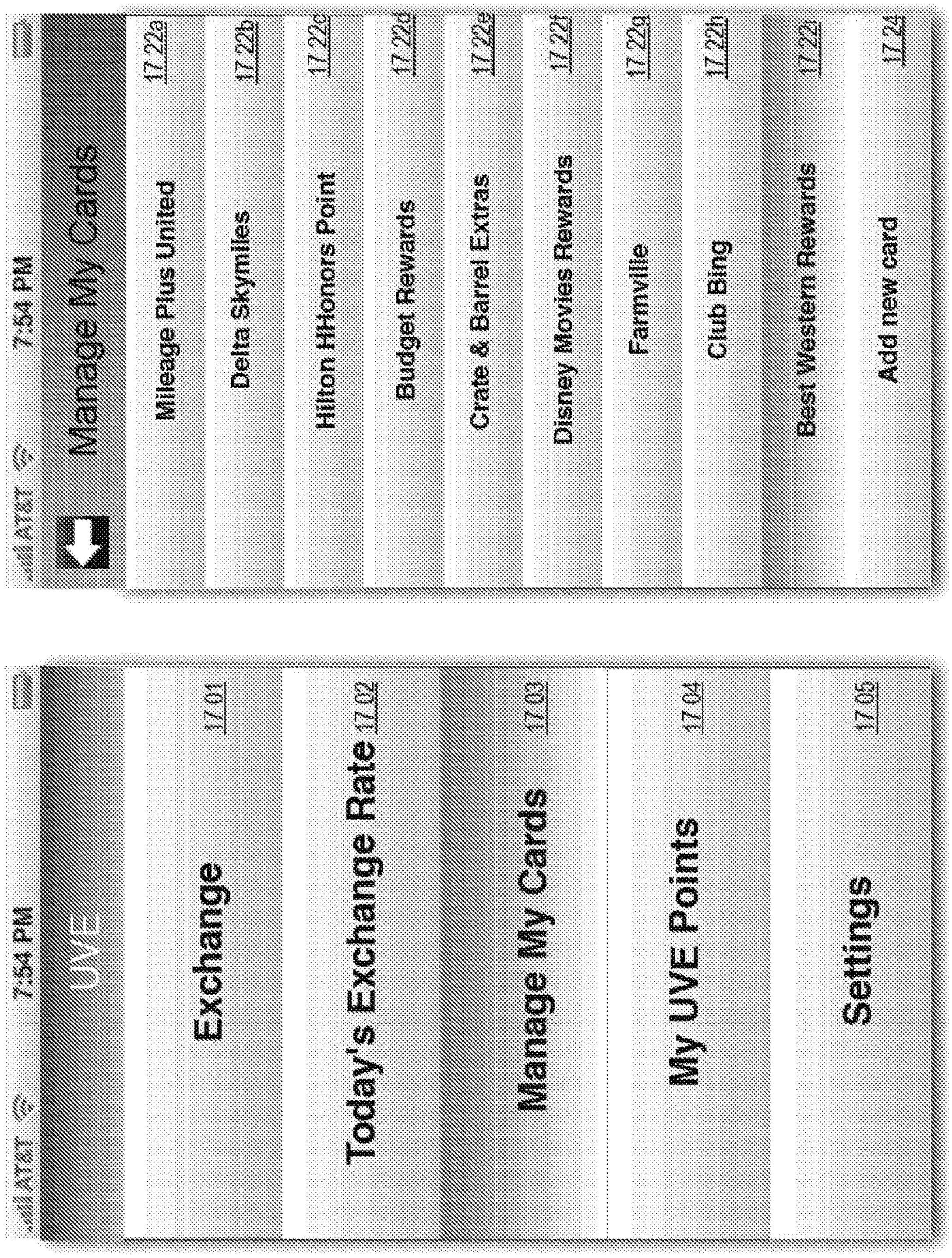
FIGS. 17F-I show screenshot diagrams illustrating management mode embodiment of the MCB-Platform.

FIG. 17E shows screenshot diagrams illustrating exchange rate mode embodiment of the MCB-Platform. As shown in the left UI, the user may select view today's exchange rate 1702. The right UI 1720 as shown displays a summary of the deals or exchanges available in the display panel 1720*a*. In one implementation, these exchange messages may be provided by the program providers to encourage points/currency redemption. In other implementations, the messages may be provided as an offer to gain points/currency by performing an online or offline activity.

Figure 17G:
Figure 17H:
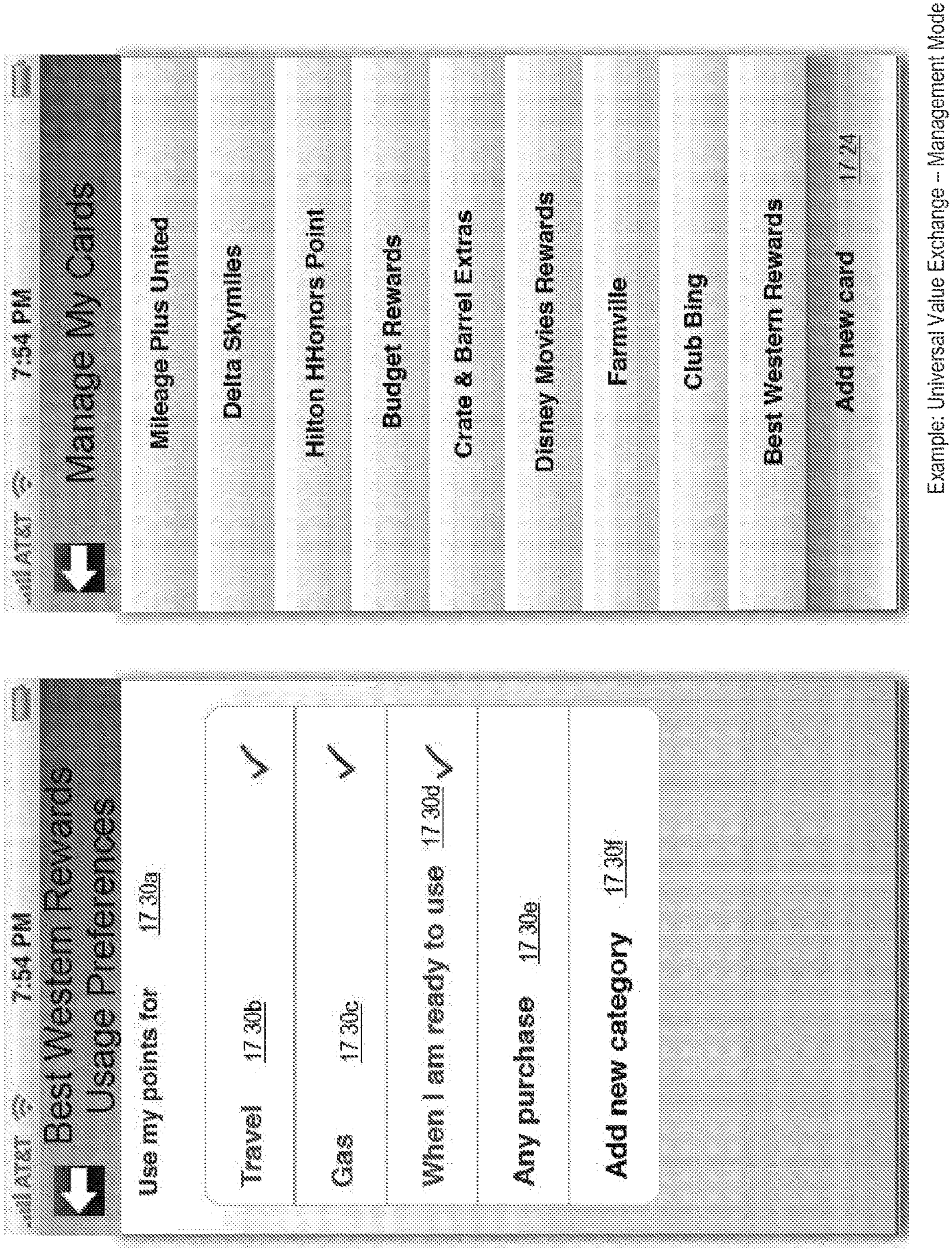
Figure 17I:
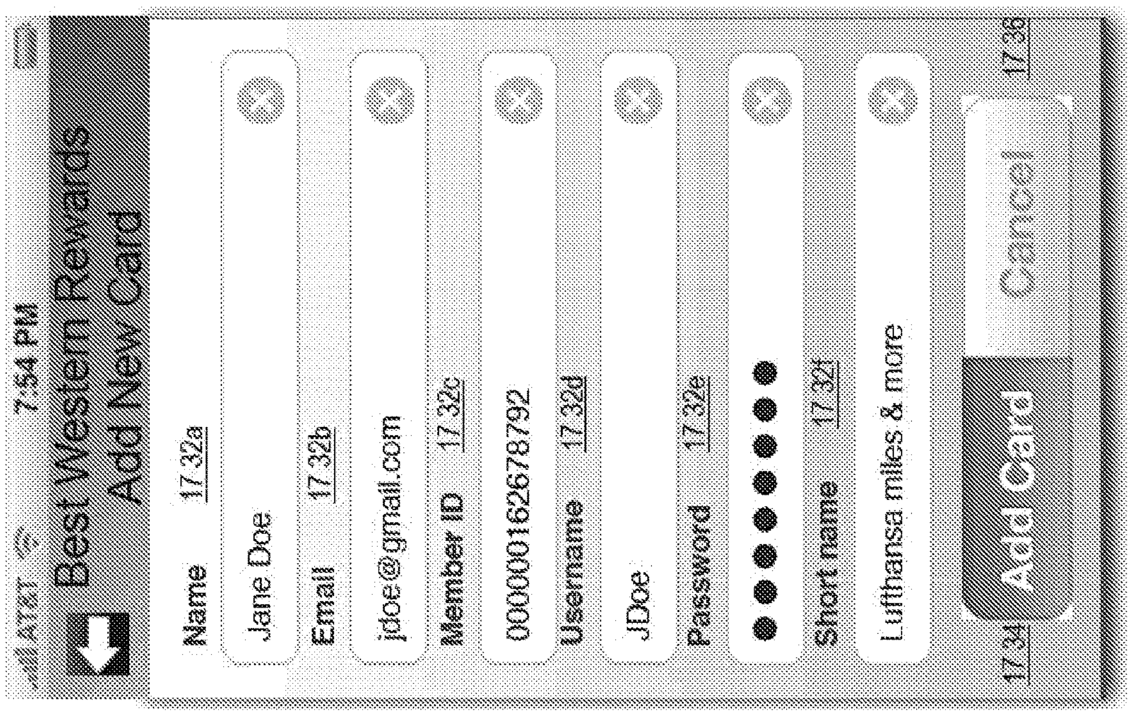

FIGS. 17F-I show screenshot diagrams illustrating management mode embodiment of the MCB-Platform. In one implementation, the selection of the option manage my cards 1703 from the left UI may display the right UI. As shown, the right UI displays various cards or accounts 1722*a-i* added to the MCB-Platform application or account. In one implementation, the user may select one of the card accounts, e.g., 1722*i*. Referring to FIG. 17G, the left UI may be displayed to the user in response to his or her selection of a card account 1722*i*. The user may have a number of options e.g., 1726, 1728 and 1730 for selection. The about option 1726 may provide a brief description about the program provider or card account. Selection of the enrollment option 1728 may lead to the right UI which may display enrollment status 1728*a* and enrollment information such as name 1728*b*, email address 1728*c*, member ID 1728*d*, notification setting 1728*e*, and/or the like. The enrollment information may be provided at the time the card is added to the MCB-Platform account. As shown, the user may uncheck or unselect the enrolled option 1728*a* to unenroll from the selected program 1722*i*. When the usage preferences option 1730 is selected from the left UI, the left UI 1730*a* of FIG. 17H may be displayed. In this UI, the user may specify how the program points/currency may be used. As shown, the user may select options 1730*b-e*. The user may also add his or her own category for usage 630*f*. In some implementations, the user may also specify priority or order of usage. Referring to the right UI of FIG. 17H, the user may select option 1724 to add a new card or program account. As shown in FIG. 17I, the user may enter information such as name 1732*a*, email 1732*b*, member ID 1732*c*, username 1732*d*, password 1732*e*, short name 1732*f*, and/or the like to add a program account to the MCB-Platform. The user may select the add card button 1734 to add the program to the MCB-Platform or the cancel button 1736 to cancel.

Figure 17J:
FIGS. 17J-K show screenshot diagrams illustrating MCB-Platform point mode embodiment of the MCB-Platform.
Figure 17K:
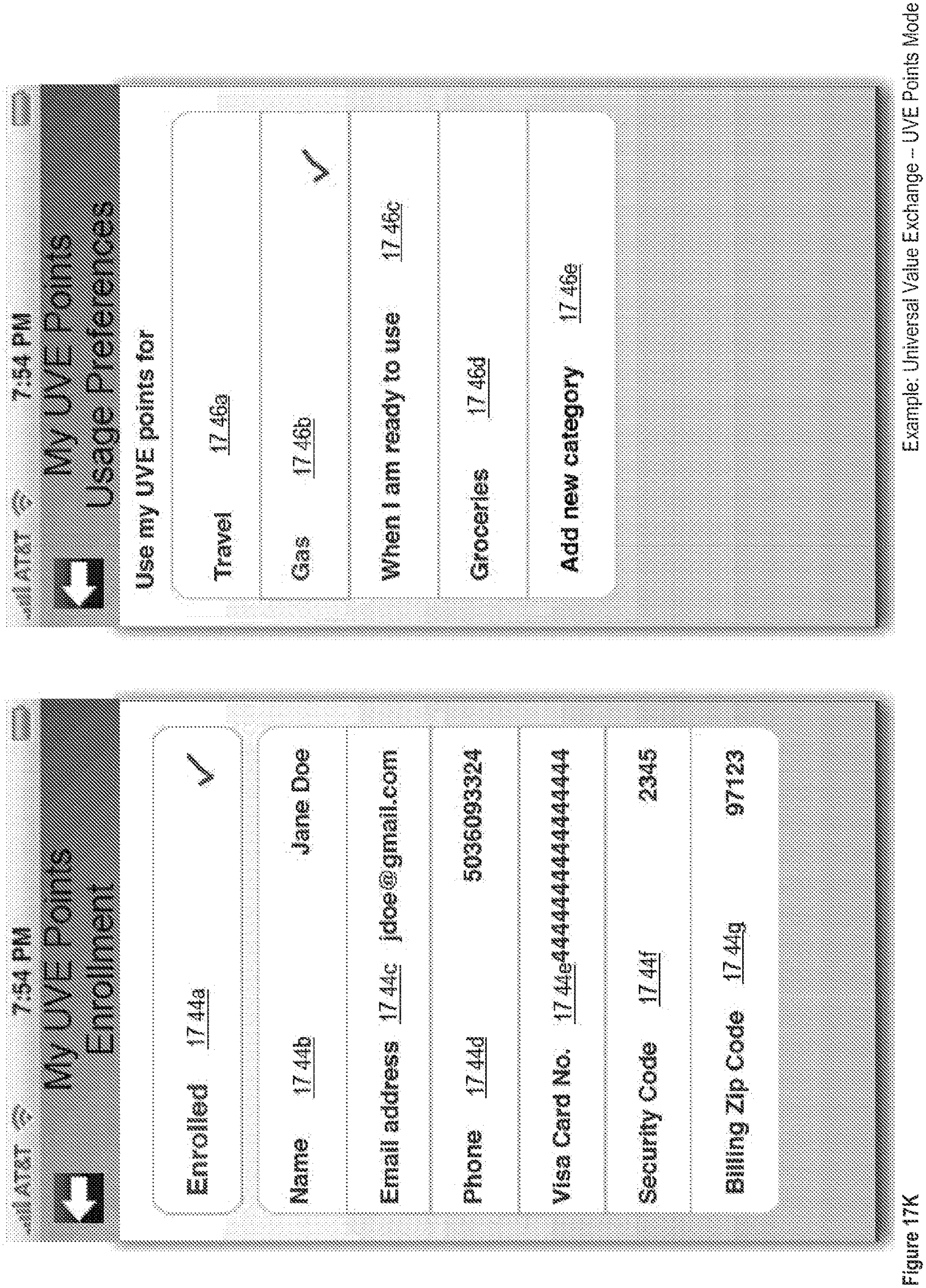

FIGS. 17J-K show screenshot diagrams illustrating MCB-Platform point mode embodiment of the MCB-Platform. When the user selects my MCB-Platform points option 1704 from the left UI, the right UI may be displayed. As shown, various options e.g., 1738, 1744, 1745, 1746, etc., may be available. The user may select the about option 1738 to read information about the MCB-Platform points. The enrollment option 1744 may be selected to view the left UI as shown in FIG. 17K. The enrollment UI shows the enrolled status 1744*a*, along with identifying information such as name 1744*b*, email address 1744*c*, phone 1744*d*, payment device number, 1744*e*, security code 1744*f*, billing zip code 1744*g*, and/or the like. The user may unenroll from the MCB-Platform points program by unchecking the enrolled option 1744*a*. Referring back to FIG. 17J, when the user selects the statement option 1745, a statement UI may be displayed. The statement UI (not shown) may allow the user to select a time period and obtain a statement summary of exchanges, MCB-Platform points balance, and/or the like. The usage preferences option 1746 may be selected to view the right UI shown in FIG. 17K. As shown, the user may select usage preferences for specific purchases 1746*a-d* for the MCB-Platform points. The user may also add his or her own category 646*e*.

Figure 17L:
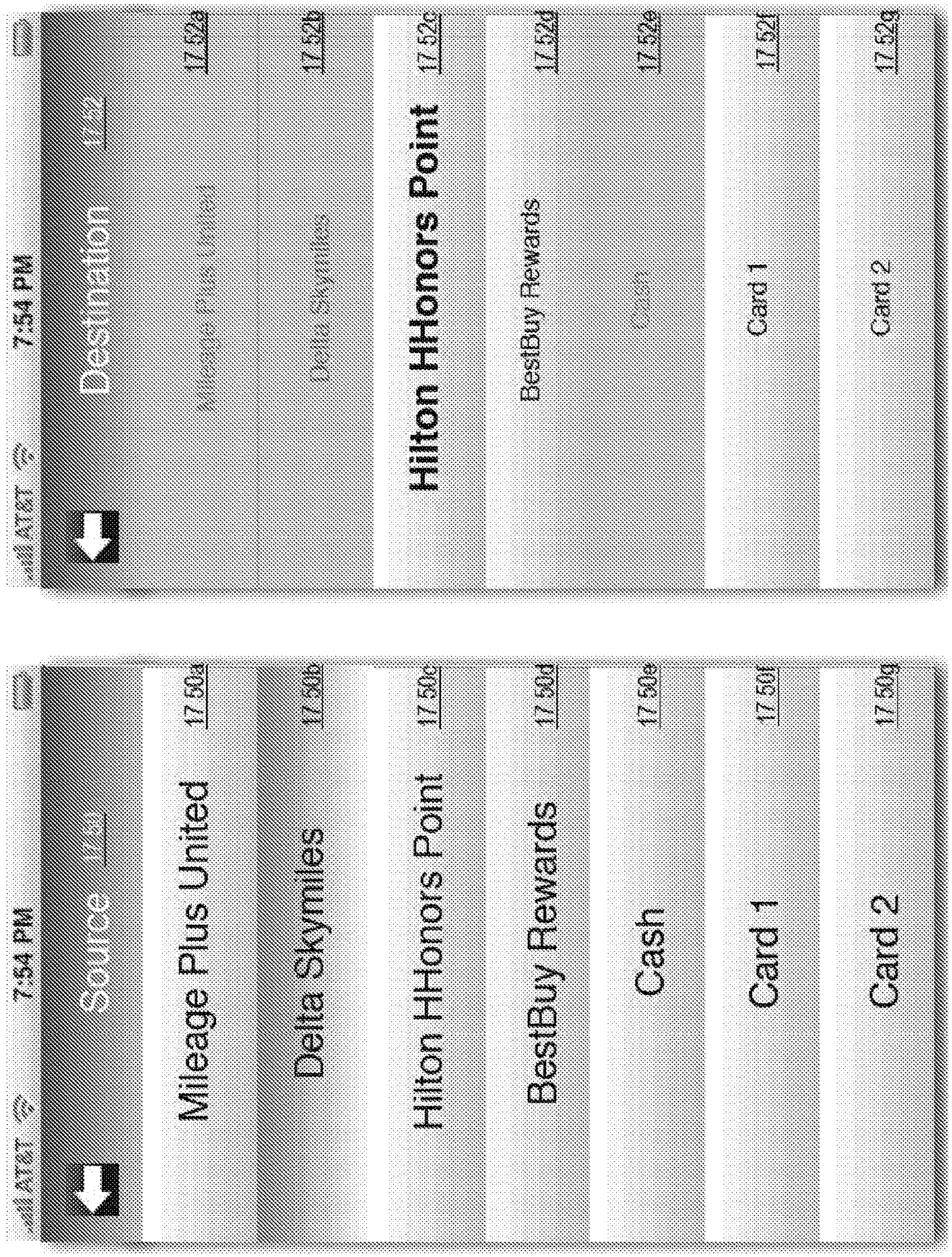
FIGS. 17L-N show screenshot diagrams illustrating source/destination exchange mode embodiment of the MCB-Platform.
Figure 17M:
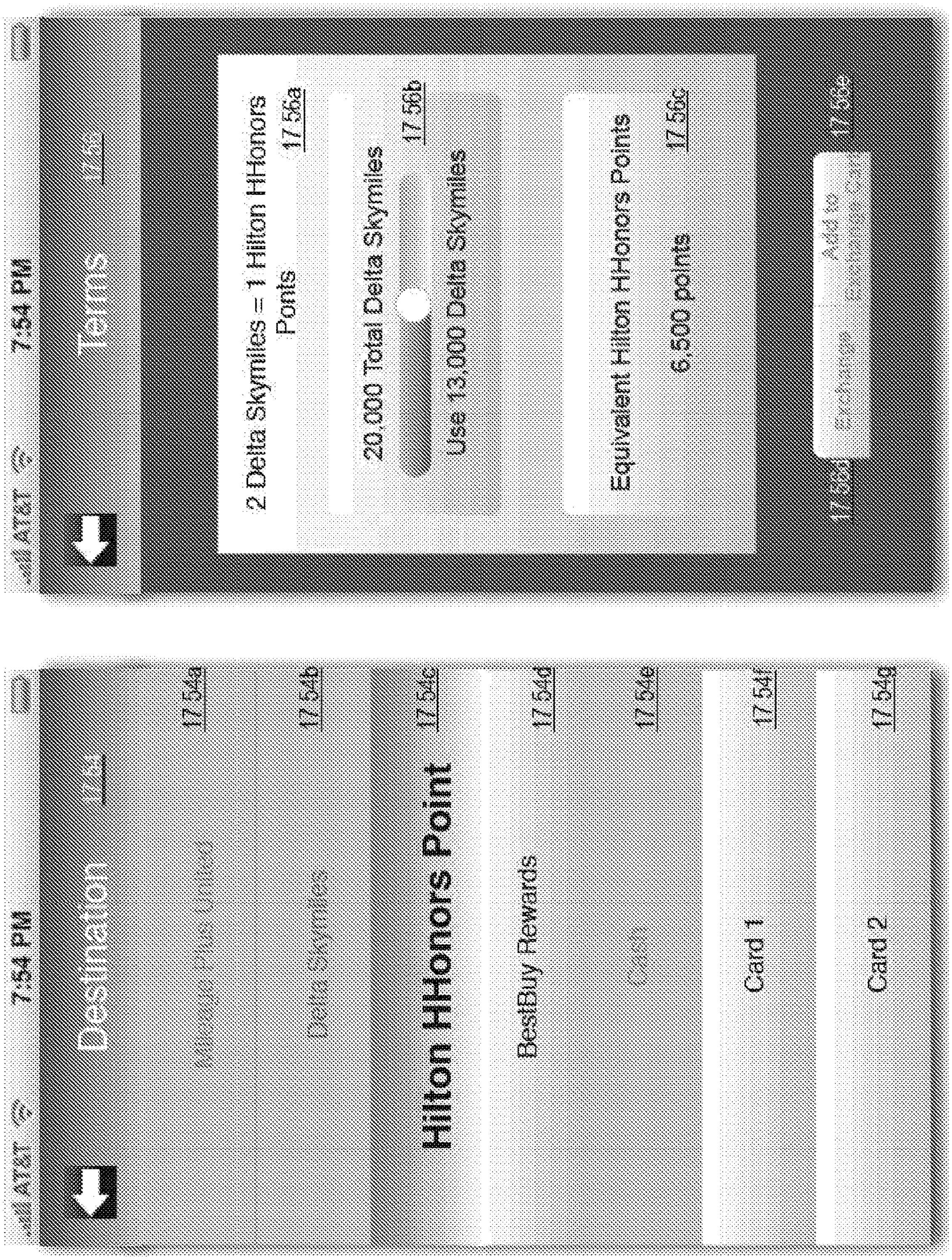
Figure 17N:
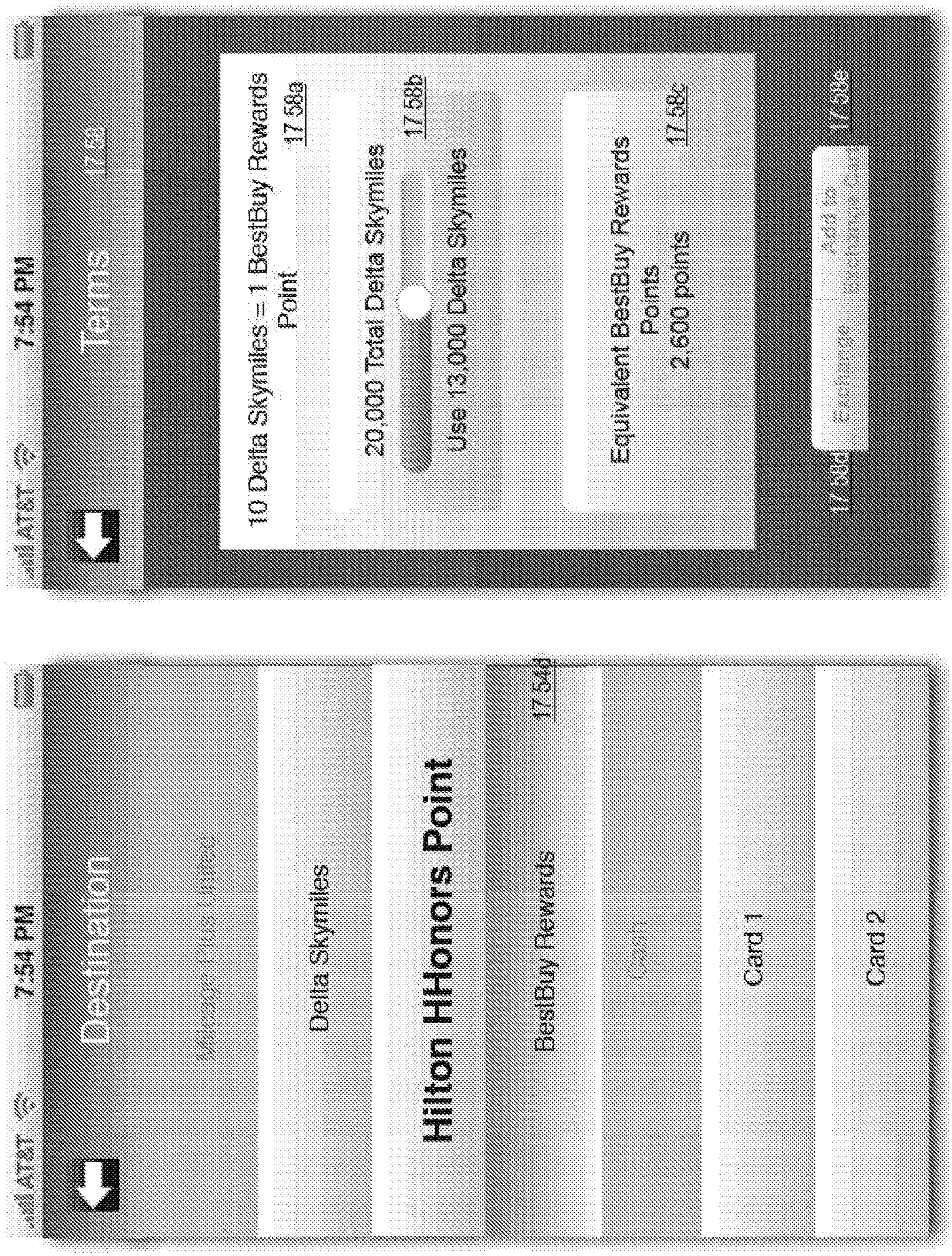

FIGS. 17L-N show screenshot diagrams illustrating source/destination exchange mode embodiment of the MCB-Platform. In one embodiment of the MCB-Platform, a source UI 1750 may display a list of selectable options 1750*a-g* as possible sources for an exchange. When the source 1750*b* (e.g., Delta Skymiles) is selected, the destination UI 1752 may be displayed. The destination UI may display a list of possible destination currencies 1752*a*-852*g* into which the source currency 1750*b* may be converted. The destination UI may also highlight or de-highlight certain options to indicate preference or restriction, For example, the destination UI shows "Mileage Plus United" 1752*a* and "Cash" 1752*e* as grayed out indicating that these two options cannot be selected as destination currencies. As a further example, "Hilton HHonors Point" 1752*c* option is highlighted (e.g., bold, large font) to indicate that the exchange of the Delta Skymiles 1750*b* for Hilton HHonors Point is the most favorable or optimal exchange. Other options 1752*d-g* that are selectable as destination programs may also be shown, but without any emphasis, to indicate that these options are neither preferred nor restricted.

Referring to FIG. 17M, the user may select the preferred destination program 1754*c*. The terms UI 1756(right) may then be displayed showing the details of the exchange to be conducted. For example, the terms UI shows the exchange rate 1756*a* that indicates that 2 Delta Skymiles is equivalent to 1 Hilton HHonors Points. The UI may also display a slide control 1756*b* to allow the user to select the amount of Delta Skymiles that the user wishes to convert. In a further implementation, the UI may also display the equivalent Hilton HHonors Point 1756*c* that the selected amount of Delta Skymiles would be converted to. Upon viewing the terms of the exchange, the user may select the transfer button 1756*d* to initiate the exchange. In some implementations, the user may also select the add to exchange cart button 1756*e* to add the exchange transaction to cart and execute at a later time. The user may also set up other exchanges and add those to the cart to simultaneously execute multiple exchanges.

Referring to FIG. 17N, the user may select a destination program 1754*d* (e.g., BestBuy Rewards) that is not preferred, but is available for exchange. When such an option is selected, the terms UI 1758 may display the terms of the exchange as shown. In contrast to the preferred exchange shown in FIG. 17M where the exchange rate ratio was 2:1, in this case the exchange rate ratio 1758*a* may be worse (e.g., 10:1). The user may specify the amount of the source program points to use via the slider 1758*b*. The equivalent value destination program points may be displayed at 1758*c*. The user may execute the transfer by selecting the button 1758*d* or may postpone it till later by selecting add to exchange cart button 1758*e*.

MCB-Platform Centralized Personal Information Platform

Figure 18:
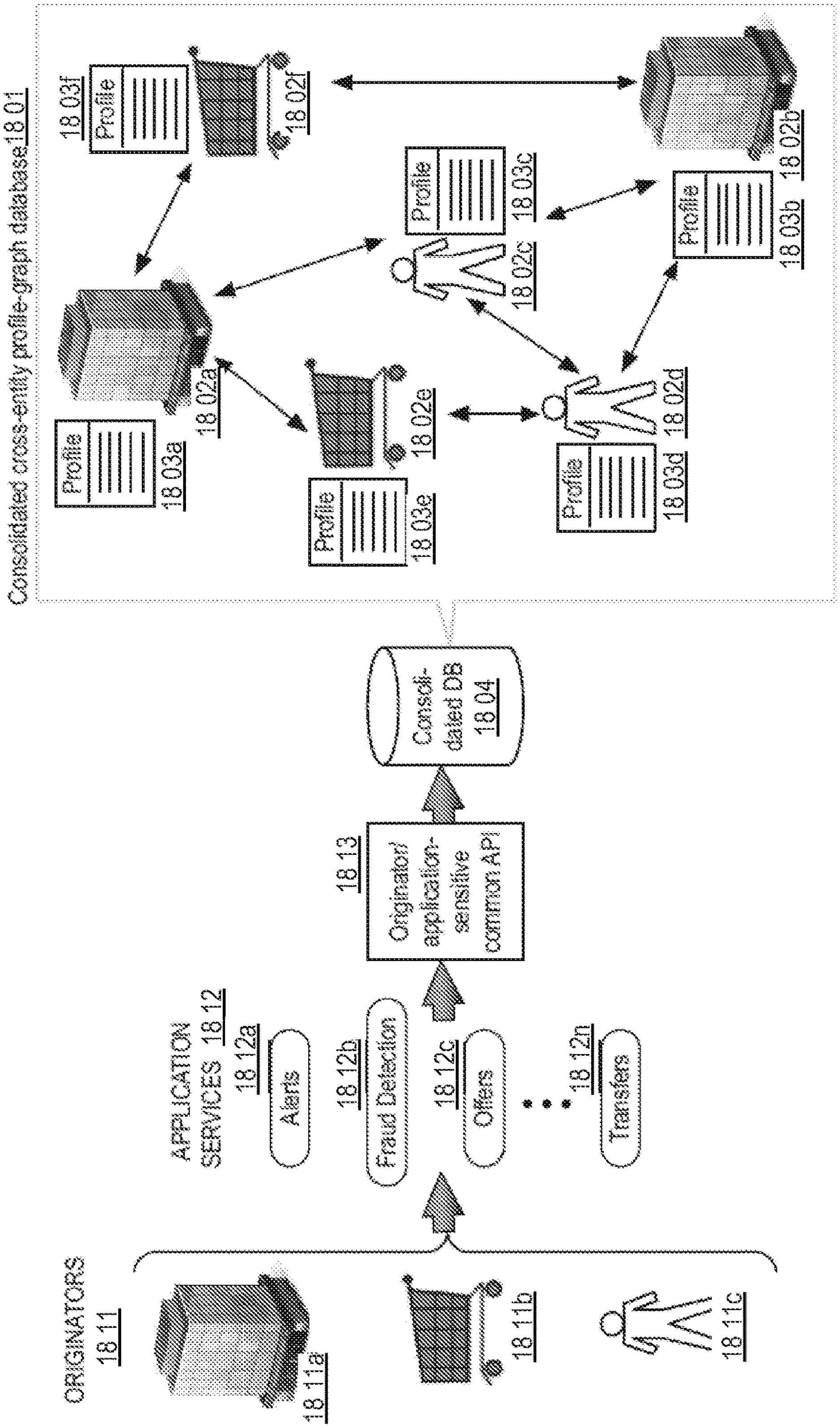
FIG. 18 shows a block diagram illustrating example aspects of a centralized personal information platform in some embodiments of the MCB-Platform.
Figure 19A:
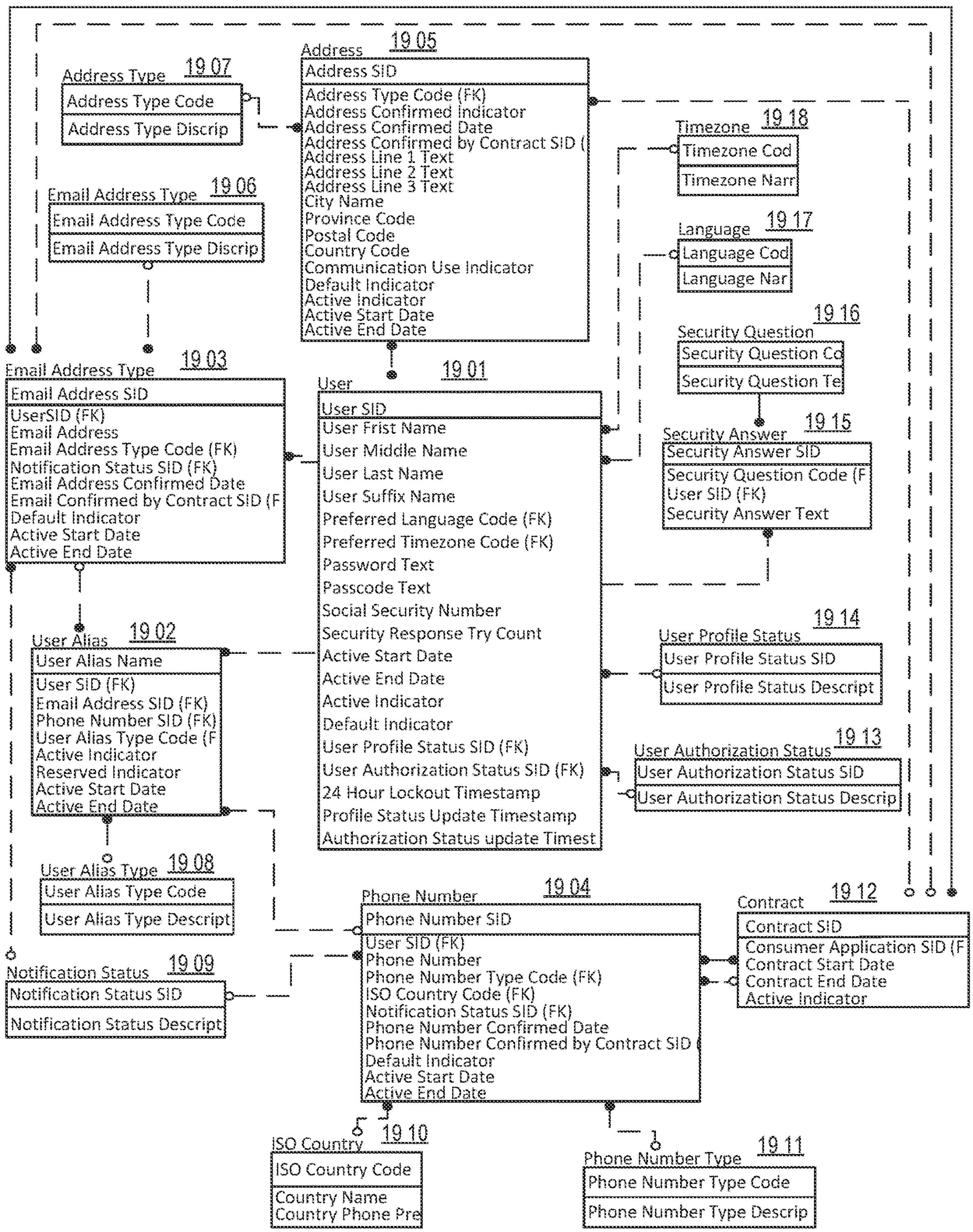
Figure 19C:
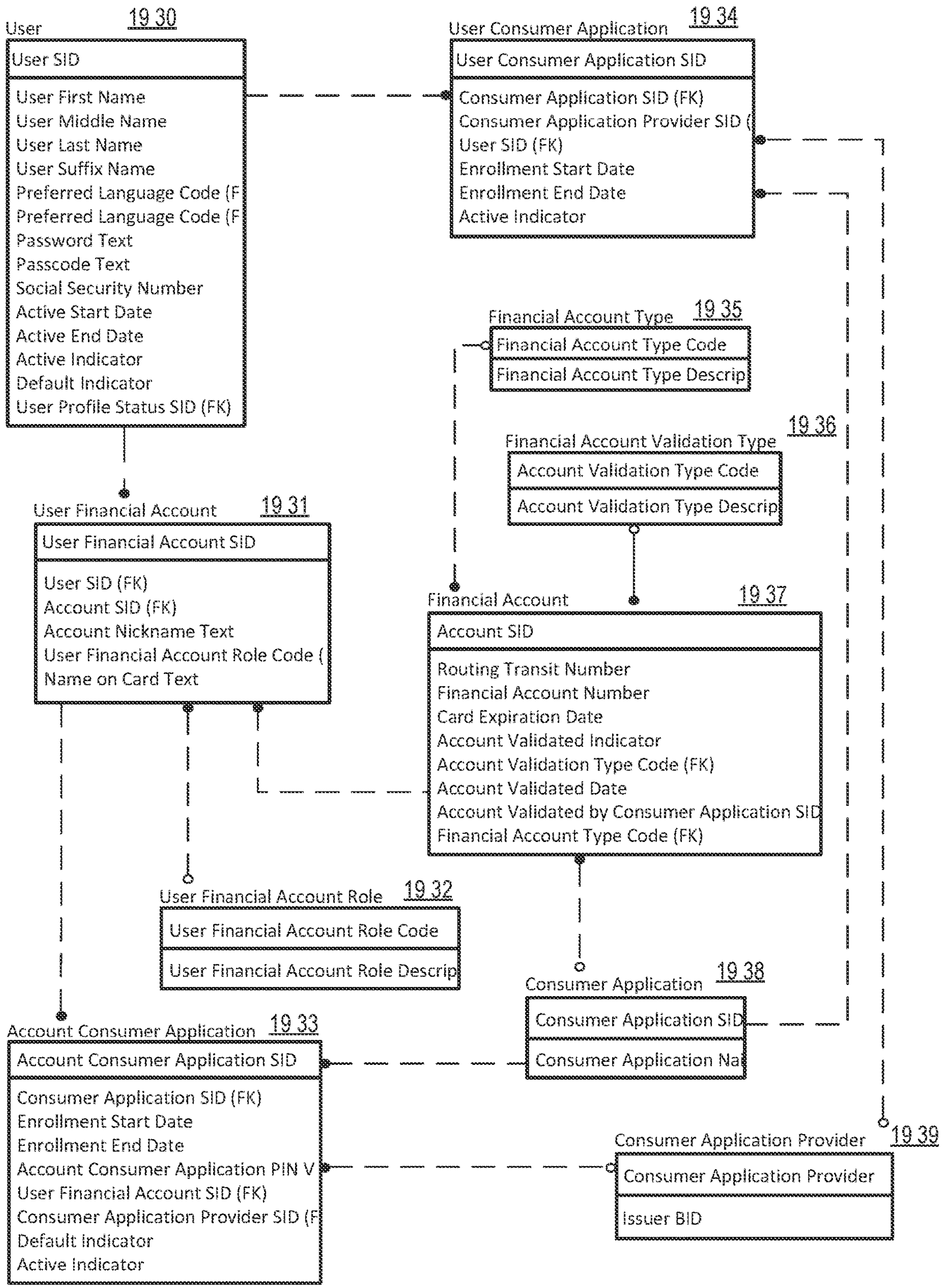
Figure 19D:
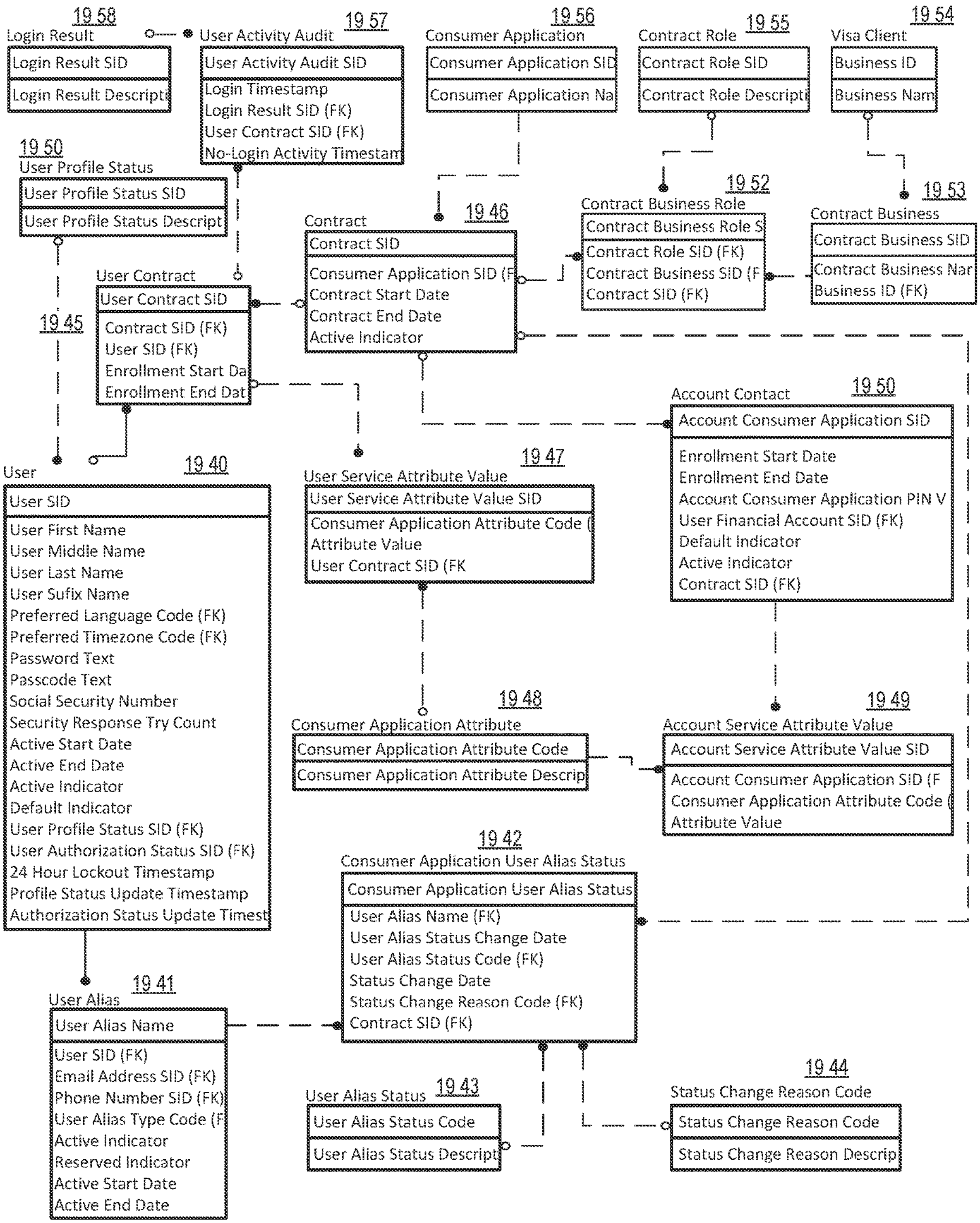
Figure 19E:
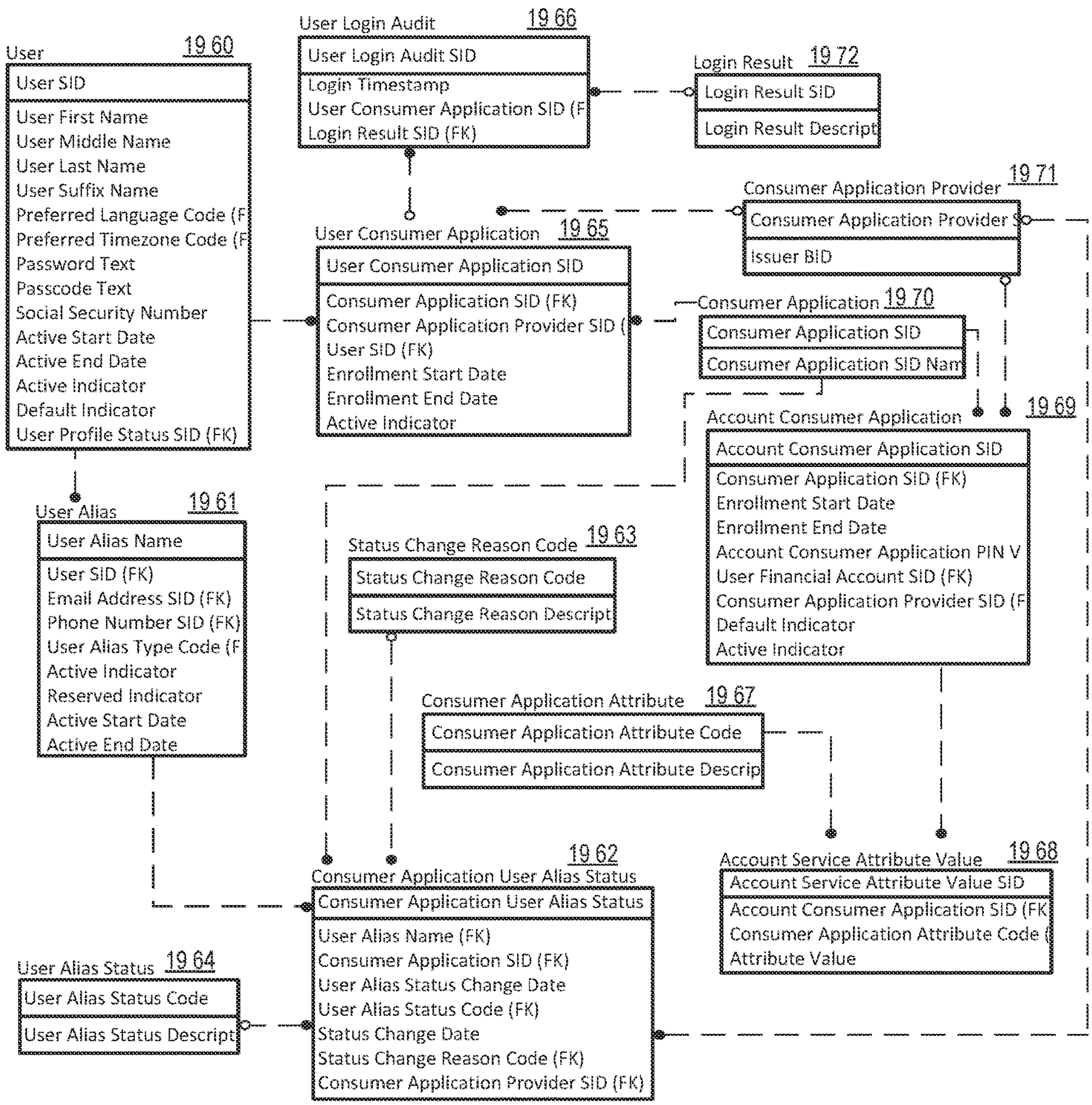
Figure 19F:
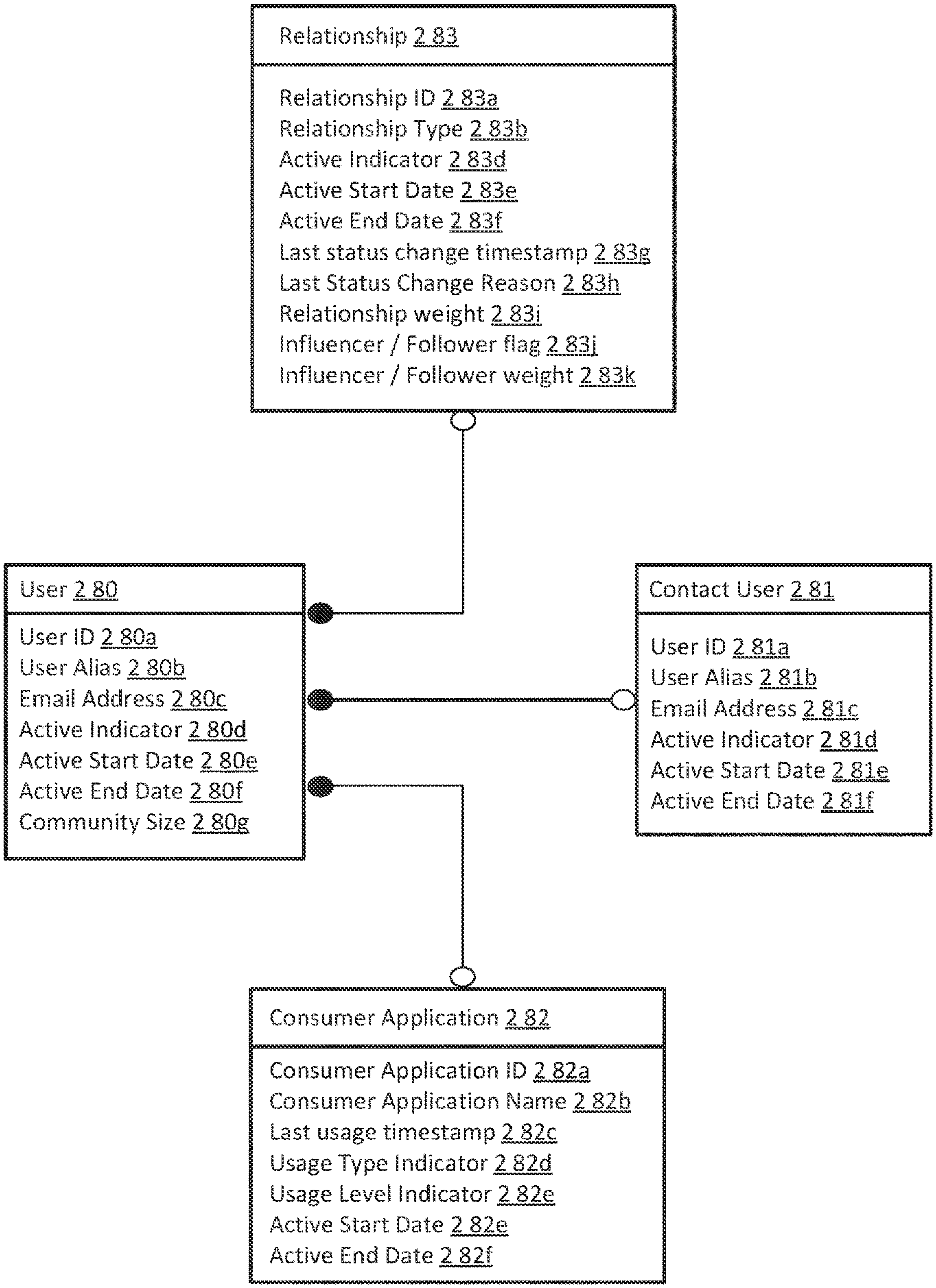

FIG. 18 shows a block diagram illustrating example aspects of a centralized personal information platform in some embodiments of the MCB-Platform. In various scenarios, originators 1811 such as merchants 1811*b*, consumers 1811*c*, account issuers, acquirers 1811*a*, and/or the like, desire to utilize information from payment network systems for enabling various features for consumers. Such features may include application services 1812 such as alerts 1812*a*, offers 1812*c*, money transfers 1812*n*, fraud detection 1812*b*, and/or the like. In some embodiments of the MCB-Platform, such originators may request data to enable application services from a common, secure, centralized information platform including a consolidated, cross-entity profile-graph database 1801. For example, the originators may submit complex queries to the MCB-Platform in a structure format, such as the example below. In this example, the query includes a query to determine a location (e.g., of a user), determine the weather associated with the location, perform analyses on the weather data, and provide an exploded graphical view of the results of the analysis:

```
<int
    Model_id ="1"
    environment_type="RT"
    meta_data="./fModels/robotExample.meta"
    tumblar_location="./fModels/robotExample.tumblar.location"
    input_format="JSON"
    pmmls="AUTONOMOUS_AGENTS.PMML"
    Model_type ="AUTONOMOUS_AGENTS"
>
```

-continued

```
<vault >
<door:LOCATION>
        <lock name="DETERMINE LOCATION"
            inkey="INPUT" inkeyname="lat"
            inkey2="INPUT" inkeyname2="long"
            function="ROUND"
            fnct1-prec="-2"
            function-1="JOIN"
            fnct2-delim=":"
            tumblar='LAT_LONG.key'
            outkey="TEMP" outkeyname="location"
            type="STRING"
        />
        <lock name="DETERMINE WEATHER"
            inkey="TEMP" inkeyname="location"
            mesh='MESHRT.RECENTWEATHER'
            mesh-query='HASH'
            outkey="TEMP" outkeyname="WEATHERDATA"
            type="ARRAY"
        />
        <lock name="EXPLODE DATA"
            inkey="TEMP" inkeyname="WEATHERDATA"
            function="EXPLODE"
            fnct-delim=":"
            outkey="MODELDATA" outkeystartindex=1
        />
        <lock name="USER SETTINGS"
            inkey="INPUT" inkeyname="USERID"
            mesh='MESHRT.AUTONOMOUSAGENT.SETTINGS'
            mesh-query='HASH'
            outkey="TEMP" outkeyname="USERSETTINGS"
            type="ARRAY"
        />
        <lock name="EXPLODE USER"
            inkey="TEMP" inkeyname="USERSETTINGS"
            function="EXPLODE"
            fnct-delim=":"
            outkey="USERDATA" outkeystartindex=1
        />
        <lock name="RUN MODELE"
            inkey="MODELDATA"
            inkey1="USERDATA"
            function="TREE"
            fnc-pmml="AUTONOMOUS_AGENTS.PMML"
            outkey="OUTPUT" outkeyname="WEATHER"
            type="NUMERIC"
        />
</door>
</vault>
```

A non-limiting, example listing of data that the MCB-Platform may return based on a query is provided below. In this example, a user may log into a website via a computing device. The computing device may provide a IP address, and a timestamp to the MCB-Platform. In response, the MCB-Platform may identify a profile of the user from its database, and based on the profile, return potential merchants for offers or coupons:

```
--------------------------------------------------
------------------ Use Case 3 -------------------
-- User log into a website
-- Only IP address, GMT and day of week is passed to Mesh
-- Mesh matches profile based on Affinity Group
-- Mesh returns potential Merchants for offers or coupons based on tempory model using suppression rules
--------------------------------------------------
-- Test case 1 IP:24:227:206 Hour:9 Day:3
-- Test case 2 IP:148:181:75 Hour:4 Day:5
--------------------------------------------------
------- AffinityGroup Lookup ------------------
--------------------------------------------------
Look up test case 1
[OrderedDict([('ISACTIVE', 'True'), ('ENTITYKEY', '24:227:206:3:1'), ('XML', None),
('AFFINITYGROUPNAME', '24:227:206:3:1'), ('DESCRIPTION', None), ('TYPEOF', None), ('UUID',
'5f8df970b9ff11e09ab9270cf67eca90')]), OrderedDict([('ISACTIVE', 'True'), ('BASEUUID',
```

-continued

‘4fbea327b9ff11e094f433b5d7c45677’), (‘TOKENENTITYKEY’,
‘4fbea327b9ff11e094f433b5d7c45677:TOKEN:349:F’), (‘BASETYPE’, ‘MODEL_002_001_00’), (‘STATUS’,
‘ACTIVE’), (‘ISSUEDDATE’, None), (‘WEIGHT’, ‘349’), (‘CATEGORY’, ‘F’), (‘DOUBLELINKED’, None),
(‘UUID’, ‘6b6aab39b9ff11e08d850dc270e3ea06’)]), OrderedDict([(‘ISACTIVE’, ‘True’), (‘BASEUUID’,
‘4fbea328b9ff11e0a5f833b5d7c45677’), (‘TOKENENTITYKEY’,
‘4fbea328b9ff11e0a5f833b5d7c45677:TOKEN:761:1’), (‘BASETYPE’, ‘MODEL_003_001_00’), (‘STATUS’,
‘ACTIVE’), (‘ISSUEDDATE’, None), (‘WEIGHT’, ‘761’), (‘CATEGORY’, ‘1’), (‘DOUBLELINKED’, None),
(‘UUID’, ‘68aaca40b9ff11e0ac799fd4e415d9de’)]), OrderedDict([(‘ISACTIVE’, ‘True’), (‘BASEUUID’,
‘4fbea328b9ff11e0a5f833b5d7c45677’), (‘TOKENENTITYKEY’,
‘4fbea328b9ff11e0a5f833b5d7c45677:TOKEN:637:2’), (‘BASETYPE’, ‘MODEL_003_001_00’), (‘STATUS’,
‘ACTIVE’), (‘ISSUEDDATE’, None), (‘WEIGHT’, ‘637’), (‘CATEGORY’, ‘2’), (‘DOUBLELINKED’, None),
(‘UUID’, ‘6b6d1c38b9ff11e08ce10dc270e3ea06’)]), OrderedDict([(‘ISACTIVE’, ‘True’), (‘BASEUUID’,
‘4fbea328b9ff11e0a5f833b5d7c45677’), (‘TOKENENTITYKEY’,
‘4fbea328b9ff11e0a5f833b5d7c45677:TOKEN:444:3’), (‘BASETYPE’, ‘MODEL_003_001_00’), (‘STATUS’,
‘ACTIVE’), (‘ISSUEDDATE’, None), (‘WEIGHT’, ‘444’), (‘CATEGORY’, ‘3’), (‘DOUBLELINKED’, None),
(‘UUID’, ‘6342aa53b9ff11e0bcdb9fd4e415d9de’)]), OrderedDict([(‘ISACTIVE’, ‘True’), (‘BASEUUID’,
‘4fbea328b9ff11e0a5f833b5d7c45677’), (‘TOKENENTITYKEY’,
‘4fbea328b9ff11e0a5f833b5d7c45677:TOKEN:333:4’), (‘BASETYPE’, ‘MODEL_003_001_00’), (‘STATUS’,
‘ACTIVE’), (‘ISSUEDDATE’, None), (‘WEIGHT’, ‘333’), (‘CATEGORY’, ‘4’), (‘DOUBLELINKED’, None),
(‘UUID’, ‘62bd26a2b9ff11e0bc239fd4e415d9de’)]), OrderedDict([(‘ISACTIVE’, ‘True’), (‘BASEUUID’,
‘4fbea328b9ff11e0a5f833b5d7c45677’), (‘TOKENENTITYKEY’,
‘4fbea328b9ff11e0a5f833b5d7c45677:TOKEN:307:5’), (‘BASETYPE’, ‘MODEL_003_001_00’), (‘STATUS’,
‘ACTIVE’), (‘ISSUEDDATE’, None), (‘WEIGHT’, ‘307’), (‘CATEGORY’, ‘5’), (‘DOUBLELINKED’, None),
(‘UUID’, ‘6b6d1c39b9ff11e0986c0dc270e3ea06’)]), OrderedDict([(‘ISACTIVE’, ‘True’), (‘BASEUUID’,
‘4fbea32db9ff11e09f3e33b5d7c45677’), (‘TOKENENTITYKEY’,
‘4fbea32db9ff11e09f3e33b5d7c45677:TOKEN:801:Spend’), (‘BASETYPE’, ‘MODEL_008_001_00’),
(‘STATUS’, ‘ACTIVE’), (‘ISSUEDDATE’, None), (‘WEIGHT’, ‘801’), (‘CATEGORY’, ‘Spend’),
(‘DOUBLELINKED’, None), (‘UUID’, ‘6b6d1c3ab9ff11e0a4ec0dc270e3ea06’)]), OrderedDict([(‘ISACTIVE’,
‘True’), (‘BASEUUID’, ‘4fbea32eb9ff11e0b55133b5d7c45677’), (‘TOKENENTITYKEY’,
‘4fbea32eb9ff11e0b55133b5d7c45677:TOKEN:1:Volume’), (‘BASETYPE’, ‘MODEL_009_001_00’),
(‘STATUS’, ‘ACTIVE’), (‘ISSUEDDATE’, None), (‘WEIGHT’, ‘1’), (‘CATEGORY’, ‘Volume’),
(‘DOUBLELINKED’, None), (‘UUID’, ‘62a09df3b9ff11e090d79fd4e415d9de’)])]
Found a direct match
148:181:75:1:2
-- Failed to find a direct match
-- Try again with only IP address and hour
[OrderedDict([(‘ISACTIVE’, ‘True’), (‘ENTITYKEY’, ‘148:181:75:1:1’), (‘XML’, None),
(‘AFFINITYGROUPNAME’, ‘148:181:75:1:1’), (‘DESCRIPTION’, None), (‘TYPEOF’, None)])]
-- Found match for case 2
----------------------------------------------------------
----------------- Temporary model rules-------------------
---------------------------------------------------------
{1: {‘LOWER’: 10, ‘BASETYPE’: [‘MODEL_002_001_00’, ‘MODEL_003_001_00’], ‘attribute’: ‘WEIGHT’, ‘rule’:
‘NEAR’, ‘OP’: ‘PROX’, ‘type’: ‘TOKENENTITY’, ‘HIGHER’: 10}, 2: {‘type’: [‘MERCHANT’], ‘rule’: ‘FOLLOW’}, 3:
{‘rule’: ‘RESTRICTSUBTYPE’, ‘BASETYPE’: [‘MODEL_002_001_00’, ‘MODEL_003_001_00’]}}
----------------------------------------------------------
----------------- Temporary Model Output-----------------
------------------- For Use Case 1    --------------------
----------------------------------------------------------
-- Number of Nodes:102
_—_—_—LIVRARIASICILIAN
_—_—_—_—_—_—_—GDPCOLTD
_—_—GOODWILLINDUSTRIES
_—_—_—_—_—_—DISCOUNTDE
_—_—_—_—_—_—BARELANCHOE
_—_—_—_—_—BLOOMINGDALES
_—_—_—_—PARCWORLDTENNIS
_—_—_—STRIDERITEOUTLET
_—_—_—_—_—_—PARCCEANOR
_—_—_—_—_—_—_—PONTOFRIO
_—_—_—_—_—FNACPAULISTA
_—_—_—_—_—_—FINISHLINE
_—_—_—_—WALMARTCENTRAL
_—_—_—BESNIINTERLARGOS
_—_—_—PARCLOJASCOLOMBO
_—_—_—_—_—SHOPTIMEINTER
_—_—_—_—_—BEDBATHBEYOND
_—_—_—_—_—_—_—MACYSWEST
_—_—PARCRIACHUELOFILIAL
_—_—_—_—JCPENNEYCORPINC
_—_—_—PARCLOJASRENNERFL
_—_—PARCPAQUETAESPORTES
_—_—_—_—_—_—_—MARISALJ
_—_—PARCLEADERMAGAZINE
_—_—_—_—_—_—INTERFLORA
_—_—_—_—_—_—_—DECATHLON
_—_—_—_—PERNAMBUCANASFL
_—_—_—_—_—_—KARSTADTDE
_—_—_—_—_—_—PARCCEAMCO -continued _—_—_—_—_—_—_—_—CHAMPS
_—_—_—_—_—_—ACCESSORIZE
_—_—_—BLOOMINGDALESDVRS
_—_—PARCLIVRARIACULTURA
_—_—_—_—_—_—PARCCEALOJA
_—_—_—_—_—ARQUIBANCADA
_—_—_—_—_—_—_—_—KITBAG
_—_—_—FREDERICKSOFHLWD
_—_—_—_—_—_—_—_—WALMART
_—_—PARCLOJASINSINUANTE
_—_—_—_—WALMARTCONTAGEM
_—_—_—_—_—_—FOOTLOCKER
_—_—_—_—PARCSANTALOLLA
_—_—_—_—_—RICARDOELETRO
_—_—_—_—_—PARCPONTOFRIO
_—_—_—_—DOTPAYPLPOLSKA
_—_—_—_—_—_—_—CAMICADO
_—_—_—_—_—_—_—KARSTADT
_—_—_—_—_—_—PARCRAMSONS
_—_—_—_—_—_—PARCGREGORY
_—_—_—_—_—_—GREMIOFBPA
_—_—_—_—_—_—WALMARTSJC
_—_—PRODIRECTSOCCERLTD
_—_—_—_—_—_—LAVIEENROSE
_—_—_—_—_—PARCMARISALJ
_—_—_—_—_—_—_—_—ORDERS
_—_—_—PARCNSNNATALNORTE
_—_—_—_—LOJASINSINUANTE
_—_—_—_—_—_—_—_—_—_—_—B
_—_—_—_—_—_—CITYCOUNTY
_—_—_—_—WALMARTPACAEMBU
_—_—_—_—_—_—_—_—_—SOHO
_—_—_—_—_—WALMARTOSASCO
_—_—_—FOSSILSTORESIINC
_—_—_—_—_—_—MENARDSCLIO
_—_—_—_—_—PARCPEQUENTE
_—_—_—_—_—_—_—_—BEALLS
_—_—_—_—_—THEHOMEDEPOT
_—_—_—_—_—_—_—_—VIAMIA
_—_—PARCLOJASRIACHUELO
_—_—_—_—PARCLOJASMILANO
_—_—_—_—_—_—_—NORDSTROM
_—_—WAILANACOFFEEHOUSE
_—_—_—_—_—LANCHOEBELLA
_—_—_—_—_—_—_—_—_—PUKET
_—_—_—WALMARTSTORESINC
_—_—PARCPERNAMBUCANASFL
_—_—_—_—_—SMARTSHOPPER
_—_—PARCMAGAZINELUIZASP
_—COLUMBIASPORTSWEARCO
_—_—_—_—BARELANCESTADA
_—_—_—_—_—_—DONATEEBAY
_—_—_—PARCRICARDOELETRO
_—_—_—_—PARCDISANTINNI
_—_—_—_—_—_—_—SCHUHCOUK
_—_—_—_—_—_—_—_—CEANOR
_—_—_—_—_—PARCCAMICADO
_—_—_—_—PARCCENTAUROCE
_—_—_—_PARCMARLUIJOIAS
_—_—_—_—_—_—_—_—ALBADAH
_—_—_—_—_—_—_—MARTINEZ
_—_—_—_MONEYBOOKERSLTD
_—_—_—_—_—_—_—_—_—MACYS
_—_—_—_—_—PARCRIOCENTER
_—_—_—_—PARCCASASBAHIA
_—_—_—PARCSUBMARINOLOJA
_—_—_—_—_—_—_—_—_—_—INC
_—_—_—_—_—SUBMARINOLOJA
_—_—_—_—_—LOJASRENNERFL
_—_—_—_—RIACHUELOFILIAL
_—_—_—_—PARCSONHODOSPES
_—_—_—_—_—_—_—PINKBIJU
_—_—_—_—_—_—PARCCEAMRB
------------------------------------------------------------
----------------- Temporary model Output -----------------
------------------ For Use Case 2 --------------------
------------------------------------------------------------

-continued

```
-- Number of Nodes:3
_—_—_—_—_—_—_—_—KITBAG
_—COLUMBIASPORTSWEARCO
_—_—_—_—_—_—GREMIOFBPA
--------------------------------------------------------------
--------          End of Example Use Case          ---
--------------------------------------------------------------
```

In some embodiments, the MCB-Platform may provide access to information on a need-to-know basis to ensure the security of data of entities on which the MCB-Platform stores information. Thus, in some embodiments, access to information from the centralized platform may be restricted based on the originator as well as application services for which the data is requested. In some embodiments, the MCB-Platform may thus allow a variety of flexible application services to be built on a common database infrastructure, while preserving the integrity, security, and accuracy of entity data. In some implementations, the MCB-Platform may generate, update, maintain, store and/or provide profile information on entities, as well as a social graph that maintains and updates interrelationships between each of the entities stored within the MCB-Platform. For example, the MCB-Platform may store profile information on an issuer bank 1802*a* (see profile 1803*a*), a acquirer bank 1802*b* (see profile 1803*b*), a consumer 1802*c* (see profile 1803*c*), a user 1802*d* (see profile 1803*d*), a merchant 1802*e* (see profile 1803*e*), a second merchant 1802*f* (see profile 1803*f*). The MCB-Platform may also store relationships between such entities. For example, the MCB-Platform may store information on a relationship of the issuer bank 1802*a* to the consumer 1802*c* shopping at merchant 1802*e*, who in turn may be related to user 1802*d*, who might bank at the back 1802*b* that serves as acquirer for merchant 1802*f*.

FIGS. 19A-F show block diagrams illustrating example aspects of data models within a centralized personal information platform in some embodiments of the MCB-Platform. In various embodiments, the MCB-Platform may store a variety of attributes of entities according to various data models. A few non-limiting example data models are provided below. In some embodiments, the MCB-Platform may store user profile attributes. For example, a user profile model may store user identifying information 1901, user aliases 1902, email addresses 1903, phone numbers 1904, addresses 1905, email address types 1906, address types 1907, user alias types 1908, notification statuses 1909, ISO country 1910, phone number types 1911, contract information with the MCB-Platform 1912, user authorization status 1913, user profile status 1914, security answer 1915, security questions 1916, language 1917, time zone 1918, and/or the like, each of the above field types including one or more fields and field values. As another example, a user financial attributes model may store user identifying information 1920, user financial account information 1921, account contract information 1922, user financial account role 1923, financial account type 1924, financial account identifying information 1925, contract information 1926, financial account validation 1927, financial account validation type 1928, and/or the like. As another example, a user payment card attributes data model may include field types such s, but not limited to: user identifying information 1930, user financial account information 1931, user financial account role 1932, account consumer applications 1933, user consumer application 1934, financial account type 1935, financial account validation type 1936, financial account information 1937, consumer application information 1938, consumer application provider information 1939, and/or the like. As another example, a user services attributes data model may include field types such as, but not limited to: user identifying information 1940, user alias 1941, consumer application user alias status 1942, user alias status 1943, status change reason code 1944, user contract 1945, contract information 1946, user service attribute value 1947, consumer application attributes 1948, account service attribute value, account contract 1950, user profile status 1961, contract business role 1952, contract business 1953, client information 1954, contract role 1955, consumer application 1956, user activity audit 1957, login results 1958, and/or the like. As another example, a user services usage attributes data model may include field types such as, but not limited to: user identifying information 1960, user alias 1961, consumer application user alias status 1962, status change reason code 1963, user alias status 1964, user consumer application 1965, user login audit 1966, login result 1967, account service attribute value 1968, account consumer application 1969, consumer application 1970, consumer application provider 1971, login result 1972, and/or the like. As another example, a user graph attributes data model may include field types such as, but not limited to: user identifying information 1980, user contact 1981, consumer application user alias status 1982, relationship 1983, and/or the like. In some embodiments, the MCB-Platform may store each object (e.g., user, merchant, issuer, acquirer, IP address, household, etc.) as a node in graph database, and store data with respect to each node in a format such as the example format provided below:

```
<Nodes Data>
ID,Nodes,Label
2fdc7e3fbd1c11e0be645528b00e8d0e,2fdc7e3fbd1c11e0be645528b00e8d0e,AFFINITYGROUPNAME:49:
95:0:3:1
32b1d53ebd1c11e094172557fb829fdf,32b1d53ebd1c11e094172557fb829fdf,TOKENENTITYKEY:2b8494f0
bd1c11e09c856d888c43f7c2:TOKEN:0:F
2e6381e4bd1c11e0b9ffc929a54bb0fd,2e6381e4bd1c11e0b9ffc929a54bb0fd,MERCHANTNAME:_—_—
_—_—MERCHANT_ABC
2fdc7e3dbd1c11e0a22d5528b00e8d0e,2fdc7e3dbd1c11e0a22d5528b00e8d0e,AFFINITYGROUPNAME:49
:95:0:1:1
2e6381e7bd1c11e091b7c929a54bb0fd,2e6381e7bd1c11e091b7c929a54bb0fd,MERCHANTNAME:_—_—
_—_—MERCHANT_XYZ
```

-continued

2cf8cbabbd1c11e0894a5de4f9281135,2cf8cbabbd1c11e0894a5de4f9281135,USERNAME:000060FF6557
F103
2e6381debd1c11e0b336c929a54bb0fd,2e6381debd1c11e0b336c929a54bb0fd,MERCHANTNAME:_—_—
_—_—MERCHANT_123
2e6381e0bd1c11e0b4e8c929a54bb0fd,2e6381e0bd1c11e0b4e8c929a54bb0fd,MERCHANTNAME:_—_—
_—_—MERCHANT_FGH
2cf681c1bd1c11e0b8815de4f9281135,2cf681c1bd1c11e0b8815de4f9281135,USERNAME:000030C57080
FFE8
2b8494f1bd1c11e0acbd6d888c43f7c2,2b8494f1bd1c11e0acbd6d888c43f7c2,MODELNAME:MODEL_003_
001_00
32b44638bd1c11e0b01c2557fb829fdf,32b44638bd1c11e0b01c2557fb829fdf,TOKENENTITYKEY:2b8494f1
bd1c11e0acbd6d888c43f7c2:TOKEN:1000:1
2fdc7e40bd1c11e094675528b00e8d0e,2fdc7e40bd1c11e094675528b00e8d0e,AFFINITYGROUPNAME:49
:95:0:4:1
2b8494f0bd1c11e09c856d888c43f7c2,2b8494f0bd1c11e09c856d888c43f7c2,MODELNAME:MODEL_002_
001_00
32b44639bd1c11e0b15b2557fb829fdf,32b44639bd1c11e0b15b2557fb829fdf,TOKENENTITYKEY:2b8494f1
bd1c11e0acbd6d888c43f7c2:TOKEN:0:2
32ce84febd1c11e0b0112557fb829fdf,32ce84febd1c11e0b0112557fb829fdf,TOKENENTITYKEY:2b8494f1b
d1c11e0acbd6d888c43f7c2:TOKEN:1000:4
2e6381e3bd1c11e095b1c929a54bb0fd,2e6381e3bd1c11e095b1c929a54bb0fd,MERCHANTNAME:_—_—
_—_—MERCHANT_789
34582a87bd1c11e080820167449bc60f,34582a87bd1c11e080820167449bc60f,TOKENENTITYKEY:2b8494
f1bd1c11e0acbd6d888c43f7c2:TOKEN:778:5
2e6381e5bd1c11e0b62cc929a54bb0fd,2e6381e5bd1c11e0b62cc929a54bb0fd,MERCHANTNAME:_—_—
_—_—MERCHANT_456
2fdc7e3ebd1c11e088b55528b00e8d0e,2fdc7e3ebd1c11e088b55528b00e8d0e,AFFINITYGROUPNAME:49
:95:0:2:1
32c4e80dbd1c11e09e442557fb829fdf,32c4e80dbd1c11e09e442557fb829fdf,TOKENENTITYKEY:2b8494f1
bd1c11e0acbd6d888c43f7c2:TOKEN:774:5
2e6381e1bd1c11e0bf28c929a54bb0fd,2e6381e1bd1c11e0bf28c929a54bb0fd,MERCHANTNAME:_—_—
_—_—MERCHANT_WER
2cf681b8bd1c11e08be85de4f9281135,2cf681b8bd1c11e08be85de4f9281135,USERNAME:00002552FC93
0FF8
2cf8cba8bd1c11e09fbc5de4f9281135,2cf8cba8bd1c11e09fbc5de4f9281135,USERNAME:0000570FF1B46
A24
32b4463abd1c11e0bdaa2557fb829fdf,32b4463abd1c11e0bdaa2557fb829fdf,TOKENENTITYKEY:2b8494f1
bd1c11e0acbd6d888c43f7c2:TOKEN:0:3
2cf8cbaebd1c11e0b6515de4f9281135,2cf8cbaebd1c11e0b6515de4f9281135,USERNAME:000064A20FF9
62D4
2e6381e6bd1c11e08087c929a54bb0fd,2e6381e6bd1c11e08087c929a54bb0fd,MERCHANTNAME:_—_—
_—_—MERCHANT_496
2e6381e2bd1c11e0941dc929a54bb0fd,2e6381e2bd1c11e0941dc929a54bb0fd,MERCHANTNAME:_—_—
_—_—MERCHANT_SDF
<Edge Data>Source,Target,Type,label, Weight
32ce84febd1c11e0b0112557fb829fdf,2e6381e6bd1c11e08087c929a54bb0fd,MODEL_003_001_00,2b8494
f1bd1c11e0acbd6d888c43f7c2:TOKEN:1000:4,1000
2fdc7e3ebd1c11e088b55528b00e8d0e,32ce84febd1c11e0b0112557fb829fdf,MODEL_003_001_00,2b8494
f1bd1c11e0acbd6d888c43f7c2:TOKEN:1000:4,1000
2e6381e2bd1c11e0941dc929a54bb0fd,34582a87bd1c11e080820167449bc60f,MODEL_003_001_00,2b84
94f1bd1c11e0acbd6d888c43f7c2:TOKEN:778:5,778
2b8494f1bd1c11e0acbd6d888c43f7c2,34582a87bd1c11e080820167449bc60f,MODEL_003_001_00,2b849
4f1bd1c11e0acbd6d888c43f7c2:TOKEN:778:5,778
2e6381e1bd1c11e0bf28c929a54bb0fd,32b44639bd1c11e0b15b2557fb829fdf,MODEL_003_001_00,2b8494
f1bd1c11e0acbd6d888c43f7c2:TOKEN:0:2,0
2e6381e0bd1c11e0b4e8c929a54bb0fd,32ce84febd1c11e0b0112557fb829fdf,MODEL_003_001_00,2b8494
f1bd1c11e0acbd6d888c43f7c2:TOKEN:1000:4,1000
32b44639bd1c11e0b15b2557fb829fdf,2e6381e6bd1c11e08087c929a54bb0fd,MODEL_003_001_00,2b849
4f1bd1c11e0acbd6d888c43f7c2:TOKEN:0:2,0
2e6381e1bd1c11e0bf28c929a54bb0fd,32ce84febd1c11e0b0112557fb829fdf,MODEL_003_001_00,2b8494f
1bd1c11e0acbd6d888c43f7c2:TOKEN:1000:4,1000
2e6381debd1c11e0b336c929a54bb0fd,32ce84febd1c11e0b0112557fb829fdf,MODEL_003_001_00,2b8494
f1bd1c11e0acbd6d888c43f7c2:TOKEN:1000:4,1000
2e6381e3bd1c11e095b1c929a54bb0fd,34582a87bd1c11e080820167449bc60f,MODEL_003_001_00,2b84
94f1bd1c11e0acbd6d888c43f7c2:TOKEN:778:5,778
2fdc7e40bd1c11e094675528b00e8d0e,32b44639bd1c11e0b15b2557fb829fdf,MODEL_003_001_00,2b849
4f1bd1c11e0acbd6d888c43f7c2:TOKEN:0:2,0
2b8494f1bd1c11e0acbd6d888c43f7c2,32b4463abd1c11e0bdaa2557fb829fdf,MODEL_003_001_00,2b8494
f1bd1c11e0acbd6d888c43f7c2:TOKEN:0:3,0
2e6381e3bd1c11e095b1c929a54bb0fd,32b4463abd1c11e0bdaa2557fb829fdf,MODEL_003_001_00,2b849
4f1bd1c11e0acbd6d888c43f7c2:TOKEN:0:3,0
2e6381e3bd1c11e095b1c929a54bb0fd,32b1d53ebd1c11e094172557fb829fdf,MODEL_002_001_00,2b849
4f0bd1c11e09c856d888c43f7c2:TOKEN:0:F,0
2e6381e5bd1c11e0b62cc929a54bb0fd,34582a87bd1c11e080820167449bc60f,MODEL_003_001_00,2b84
94f1bd1c11e0acbd6d888c43f7c2:TOKEN:778:5,778
2cf8cbabbd1c11e0894a5de4f9281135,32b44638bd1c11e0b01c2557fb829fdf,MODEL_003_001_00,2b8494
f1bd1c11e0acbd6d888c43f7c2:TOKEN:1000:1,1000
2cf681b8bd1c11e08be85de4f9281135,32b1d53ebd1c11e094172557fb829fdf,MODEL_002_001_00,2b8494
f0bd1c11e09c856d888c43f7c2:TOKEN:0:F,0

-continued

32b4463abd1c11e0bdaa2557fb829fdf,2e6381e6bd1c11e08087c929a54bb0fd,MODEL_003_001_00,2b849
4f1bd1c11e0acbd6d888c43f7c2:TOKEN:0:3,0
2e6381debd1c11e0b336c929a54bb0fd,32b44639bd1c11e0b15b2557fb829fdf,MODEL_003_001_00,2b849
4f1bd1c11e0acbd6d888c43f7c2:TOKEN:0:2,0
2e6381e1bd1c11e0bf28c929a54bb0fd,32b44638bd1c11e0b01c2557fb829fdf,MODEL_003_001_00,2b8494
f1bd1c11e0acbd6d888c43f7c2:TOKEN:1000:1,1000
2e6381e5bd1c11e0b62cc929a54bb0fd,32ce84febd1c11e0b0112557fb829fdf,MODEL_003_001_00,2b8494
f1bd1c11e0acbd6d888c43f7c2:TOKEN:1000:4,1000
2e6381e1bd1c11e0bf28c929a54bb0fd,32b4463abd1c11e0bdaa2557fb829fdf,MODEL_003_001_00,2b8494
f1bd1c11e0acbd6d888c43f7c2:TOKEN:0:3,0
2e6381e2bd1c11e0941dc929a54bb0fd,32b44639bd1c11e0b15b2557fb829fdf,MODEL_003_001_00,2b849
4f1bd1c11e0acbd6d888c43f7c2:TOKEN:0:2,0
2b8494f1bd1c11e0acbd6d888c43f7c2,32c4e80dbd1c11e09e442557fb829fdf,MODEL_003_001_00,2b8494f
1bd1c11e0acbd6d888c43f7c2:TOKEN:774:5,774
2e6381e2bd1c11e0941dc929a54bb0fd,32b1d53ebd1c11e094172557fb829fdf,MODEL_002_001_00,2b849
4f0bd1c11e09c856d888c43f7c2:TOKEN:0:F,0
2e6381e4bd1c11e0b9ffc929a54bb0fd,32b4463abd1c11e0bdaa2557fb829fdf,MODEL_003_001_00,2b8494f
1bd1c11e0acbd6d888c43f7c2:TOKEN:0:3,0
2fdc7e3fbd1c11e0be645528b00e8d0e,32b4463abd1c11e0bdaa2557fb829fdf,MODEL_003_001_00,2b8494
f1bd1c11e0acbd6d888c43f7c2:TOKEN:0:3,0
2e6381e1bd1c11e0bf28c929a54bb0fd,32b1d53ebd1c11e094172557fb829fdf,MODEL_002_001_00,2b8494
f0bd1c11e09c856d888c43f7c2:TOKEN:0:F,0
2fdc7e40bd1c11e094675528b00e8d0e,32ce84febd1c11e0b0112557fb829fdf,MODEL_003_001_00,2b8494
f1bd1c11e0acbd6d888c43f7c2:TOKEN:1000:4,1000
2cf8cba8bd1c11e09fbc5de4f9281135,32c4e80dbd1c11e09e442557fb829fdf,MODEL_003_001_00,2b8494f
1bd1c11e0acbd6d888c43f7c2:TOKEN:774:5,774
2e6381e2bd1c11e0941dc929a54bb0fd,32b44638bd1c11e0b01c2557fb829fdf,MODEL_003_001_00,2b849
4f1bd1c11e0acbd6d888c43f7c2:TOKEN:1000:1,1000
2e6381e4bd1c11e0b9ffc929a54bb0fd,32b1d53ebd1c11e094172557fb829fdf,MODEL_002_001_00,2b8494f
0bd1c11e09c856d888c43f7c2:TOKEN:0:F,0
2e6381e5bd1c11e0b62cc929a54bb0fd,32b44639bd1c11e0b15b2557fb829fdf,MODEL_003_001_00,2b849
4f1bd1c11e0acbd6d888c43f7c2:TOKEN:0:2,0
32b1d53ebd1c11e094172557fb829fdf,2e6381e6bd1c11e08087c929a54bb0fd,MODEL_002_001_00,2b849
4f0bd1c11e09c856d888c43f7c2:TOKEN:0:F,0
2b8494f1bd1c11e0acbd6d888c43f7c2,32b44639bd1c11e0b15b2557fb829fdf,MODEL_003_001_00,2b8494
f1bd1c11e0acbd6d888c43f7c2:TOKEN:0:2,0
2e6381e3bd1c11e095b1c929a54bb0fd,32b44638bd1c11e0b01c2557fb829fdf,MODEL_003_001_00,2b849
4f1bd1c11e0acbd6d888c43f7c2:TOKEN:1000:1,1000
2fdc7e3dbd1c11e0a22d5528b00e8d0e,32ce84febd1c11e0b0112557fb829fdf,MODEL_003_001_00,2b8494
f1bd1c11e0acbd6d888c43f7c2:TOKEN:1000:4,1000
2cf681c1bd1c11e0b8815de4f9281135,32b44638bd1c11e0b01c2557fb829fdf,MODEL_003_001_00,2b8494
f1bd1c11e0acbd6d888c43f7c2:TOKEN:1000:1,1000
2cf681c1bd1c11e0b8815de4f9281135,32b1d53ebd1c11e094172557fb829fdf,MODEL_002_001_00,2b8494
f0bd1c11e09c856d888c43f7c2:TOKEN:0:F,0
2e6381e3bd1c11e095b1c929a54bb0fd,32b44639bd1c11e0b15b2557fb829fdf,MODEL_003_001_00,2b849
4f1bd1c11e0acbd6d888c43f7c2:TOKEN:0:2,0
2fdc7e3fbd1c11e0be645528b00e8d0e,32b1d53ebd1c11e094172557fb829fdf,MODEL_002_001_00,2b8494
f0bd1c11e09c856d888c43f7c2:TOKEN:0:F,0
32b44638bd1c11e0b01c2557fb829fdf,2e6381e6bd1c11e08087c929a54bb0fd,MODEL_003_001_00,2b849
4f1bd1c11e0acbd6d888c43f7c2:TOKEN:1000:1,1000
2cf8cbaebd1c11e0b6515de4f9281135,32ce84febd1c11e0b0112557fb829fdf,MODEL_003_001_00,2b8494f
1bd1c11e0acbd6d888c43f7c2:TOKEN:1000:4,1000
2e6381e6bd1c11e08087c929a54bb0fd,32b1d53ebd1c11e094172557fb829fdf,MODEL_002_001_00,2b849
4f0bd1c11e09c856d888c43f7c2:TOKEN:0:F,0
2e6381e7bd1c11e091b7c929a54bb0fd,34582a87bd1c11e080820167449bc60f,MODEL_003_001_00,2b84
94f1bd1c11e0acbd6d888c43f7c2:TOKEN:778:5,778
2e6381e1bd1c11e0bf28c929a54bb0fd,34582a87bd1c11e080820167449bc60f,MODEL_003_001_00,2b849
4f1bd1c11e0acbd6d888c43f7c2:TOKEN:778:5,778
2e6381e5bd1c11e0b62cc929a54bb0fd,32b1d53ebd1c11e094172557fb829fdf,MODEL_002_001_00,2b849
4f0bd1c11e09c856d888c43f7c2:TOKEN:0:F,0
2b8494f0bd1c11e09c856d888c43f7c2,32b1d53ebd1c11e094172557fb829fdf,MODEL_002_001_00,2b8494
f0bd1c11e09c856d888c43f7c2:TOKEN:0:F,0
2b8494f1bd1c11e0acbd6d888c43f7c2,32b44638bd1c11e0b01c2557fb829fdf,MODEL_003_001_00,2b8494f
1bd1c11e0acbd6d888c43f7c2:TOKEN:1000:1,1000
2e6381e6bd1c11e08087c929a54bb0fd,32b4463abd1c11e0bdaa2557fb829fdf,MODEL_003_001_00,2b849
4f1bd1c11e0acbd6d888c43f7c2:TOKEN:0:3,0
2b8494f1bd1c11e0acbd6d888c43f7c2,32ce84febd1c11e0b0112557fb829fdf,MODEL_003_001_00,2b8494f
1bd1c11e0acbd6d888c43f7c2:TOKEN:1000:4,1000
2cf681c1bd1c11e0b8815de4f9281135,32b44639bd1c11e0b15b2557fb829fdf,MODEL_003_001_00,2b8494
f1bd1c11e0acbd6d888c43f7c2:TOKEN:0:2,0
2cf681c1bd1c11e0b8815de4f9281135,32b4463abd1c11e0bdaa2557fb829fdf,MODEL_003_001_00,2b8494
f1bd1c11e0acbd6d888c43f7c2:TOKEN:0:3,0
2e6381e2bd1c11e0941dc929a54bb0fd,32b4463abd1c11e0bdaa2557fb829fdf,MODEL_003_001_00,2b849
4f1bd1c11e0acbd6d888c43f7c2:TOKEN:0:3,0
2e6381e3bd1c11e095b1c929a54bb0fd,32ce84febd1c11e0b0112557fb829fdf,MODEL_003_001_00,2b8494
f1bd1c11e0acbd6d888c43f7c2:TOKEN:1000:4,1000
2e6381e6bd1c11e08087c929a54bb0fd,32ce84febd1c11e0b0112557fb829fdf,MODEL_003_001_00,2b8494
f1bd1c11e0acbd6d888c43f7c2:TOKEN:1000:4,1000

-continued

2e6381e6bd1c11e08087c929a54bb0fd,34582a87bd1c11e080820167449bc60f,MODEL_003_001_00,2b84
94f1bd1c11e0acbd6d888c43f7c2:TOKEN:778:5,778
2e6381e6bd1c11e08087c929a54bb0fd,32b44638bd1c11e0b01c2557fb829fdf,MODEL_003_001_00,2b849
4f1bd1c11e0acbd6d888c43f7c2:TOKEN:1000:1,1000
2fdc7e3ebd1c11e088b55528b00e8d0e,32b44639bd1c11e0b15b2557fb829fdf,MODEL_003_001_00,2b849
4f1bd1c11e0acbd6d888c43f7c2:TOKEN:0:2,0
2e6381e5bd1c11e0b62cc929a54bb0fd,32b4463abd1c11e0bdaa2557fb829fdf,MODEL_003_001_00,2b849
4f1bd1c11e0acbd6d888c43f7c2:TOKEN:0:3,0
2e6381e4bd1c11e0b9ffc929a54bb0fd,34582a87bd1c11e080820167449bc60f,MODEL_003_001_00,2b849
4f1bd1c11e0acbd6d888c43f7c2:TOKEN:778:5,778
2e6381e4bd1c11e0b9ffc929a54bb0fd,32b44638bd1c11e0b01c2557fb829fdf,MODEL_003_001_00,2b8494f
1bd1c11e0acbd6d888c43f7c2:TOKEN:1000:1,1000
34582a87bd1c11e080820167449bc60f,2e6381e6bd1c11e08087c929a54bb0fd,MODEL_003_001_00,2b84
94f1bd1c11e0acbd6d888c43f7c2:TOKEN:778:5,778
2e6381e6bd1c11e08087c929a54bb0fd,32b44639bd1c11e0b15b2557fb829fdf,MODEL_003_001_00,2b849
4f1bd1c11e0acbd6d888c43f7c2:TOKEN:0:2,0
2e6381e5bd1c11e0b62cc929a54bb0fd,32b44638bd1c11e0b01c2557fb829fdf,MODEL_003_001_00,2b849
4f1bd1c11e0acbd6d888c43f7c2:TOKEN:1000:1,1000
2fdc7e3fbd1c11e0be645528b00e8d0e,32b44638bd1c11e0b01c2557fb829fdf,MODEL_003_001_00,2b8494
f1bd1c11e0acbd6d888c43f7c2:TOKEN:1000:1,1000
2cf681b8bd1c11e08be85de4f9281135,32b44639bd1c11e0b15b2557fb829fdf,MODEL_003_001_00,2b8494
f1bd1c11e0acbd6d888c43f7c2:TOKEN:0:2,0
2e6381e4bd1c11e0b9ffc929a54bb0fd,32b44639bd1c11e0b15b2557fb829fdf,MODEL_003_001_00,2b8494f
1bd1c11e0acbd6d888c43f7c2:TOKEN:0:2,0
2cf681b8bd1c11e08be85de4f9281135,32b4463abd1c11e0bdaa2557fb829fdf,MODEL_003_001_00,2b8494
f1bd1c11e0acbd6d888c43f7c2:TOKEN:0:3,0
2e6381e4bd1c11e0b9ffc929a54bb0fd,32ce84febd1c11e0b0112557fb829fdf,MODEL_003_001_00,2b8494f
1bd1c11e0acbd6d888c43f7c2:TOKEN:1000:4,1000
2e6381e2bd1c11e0941dc929a54bb0fd,32ce84febd1c11e0b0112557fb829fdf,MODEL_003_001_00,2b8494
f1bd1c11e0acbd6d888c43f7c2:TOKEN:1000:4,1000
2fdc7e3dbd1c11e0a22d5528b00e8d0e,32b44639bd1c11e0b15b2557fb829fdf,MODEL_003_001_00,2b849
4f1bd1c11e0acbd6d888c43f7c2:TOKEN:0:2,0
2cf681b8bd1c11e08be85de4f9281135,32b44638bd1c11e0b01c2557fb829fdf,MODEL_003_001_00,2b8494
f1bd1c11e0acbd6d888c43f7c2:TOKEN:1000:1,1000

In alternate examples, the MCB-Platform may store data in a JavaScript Object Notation ("JSON") format. The stored information may include data regarding the object, such as, but not limited to: commands, attributes, group information, payment information, account information, etc., such as in the example below:

{'MERCHANT': {'TYPEOFTYPES': ['MERCHANTS', 'SYNTHETICNETWORKS'], 'FUNCTIONS':
{'ENTITYCREATION': 'putNetwork'}
, 'UNIQUEATTIBUTES': ['MERCHANTNAME'], 'TOKENENTITIESRELATIONSHIPS': [ ], 'ATTRIBUTES':
{'MERCHANT': (2, 'STRING', 0, 'VALUE'), 'MERCH_ZIP_CD': (7, 'STRING', 0, 'VALUE'), 'MERCH_NAME':
(8, 'STRING', 0, 'VALUE'), 'MERCHANTNAME': (3, 'STRING', 0, 'VALUE'), 'ACQ_CTRY_NUM': (4,
'STRING', 0, 'VALUE'), 'ACQ_PCR': (6, 'STRING', 0, 'VALUE'), 'ACQ_REGION_NUM': (5, 'STRING', 0,
'VALUE'), 'ISACTIVE': (0, 'BOOL', 1, 'VALUE'), 'ENTITYKEY': (1, 'STRING', 0, 'VALUE')}
}
, 'AFFINITYGROUP': {'TYPEOFTYPES': ['AFFINITYGROUPS'], 'FUNCTIONS': {'ENTITYCREATION':
'putNetwork'}
, 'UNIQUEATTIBUTES': ['AFFINITYGROUPNAME'], 'TOKENENTITIESRELATIONSHIPS': [ ],
'ATTRIBUTES': {'XML': (2, 'STRING', 0, 'VALUE'), 'DESCRIPTION': (4, 'STRING', 0, ''VALUE'),
'ENTITYKEY': (1, 'STRING', 0, 'VALUE'), 'TYPEOF': (5, 'STRING', 0, 'VALUE'), 'AFFINITYGROUPNAME':
(3, 'STRING', 0, 'VALUE'), 'ISACTIVE': (0, 'BOOL', 1, 'VALUE')}
}
, 'CASCADINGPAYMENT': {'TYPEOFTYPES': ['CASCADINGPAYMENT'], 'FUNCTIONS':
{'ENTITYCREATION': 'putNetwork'}
, 'UNIQUEATTIBUTES': ['CASCADINGPAYMENTNAME'], 'TOKENENTITIESRELATIONSHIPS': ['GROUP'],
'ATTRIBUTES': {'STATUS': (2, 'STRING', 0, 'VALUE'), 'EXPDT': (6, 'DATETIME', 0, 'VALUE'), 'GROUP': (3,
'STRING', 0, 'VALUE'), 'RESTRICTIONS': (7, 'DICT', 0, 'VALUE'), 'CASCADINGPAYMENTNAME': (4,
'STRING', 0, 'VALUE'), 'STARTDT': (5, 'DATETIME', 0, 'VALUE'), 'ISACTIVE': (0, 'BOOL', 1, 'VALUE'),
'ENTITYKEY': (1, 'STRING', 0, 'VALUE')}
}
, 'GROUP': {'TYPEOFTYPES': [ ], 'FUNCTIONS': {'ENTITYCREATION': 'putNetwork'}
, 'UNIQUEATTIBUTES': ['GROUPNAME'], 'TOKENENTITIESRELATIONSHIPS': { }
, 'ATTRIBUTES': {'GROUPNAME': (2, 'STRING', 0, 'VALUE'), 'DESCRIPTION': (2, 'STRING', 0, 'VALUE'),
'ISACTIVE': (0, 'BOOL', 1, 'VALUE'), 'ENTITYKEY': (1, 'STRING', 0, 'VALUE')}
}
, 'USERS': {'TYPEOFTYPES': [ ], 'FUNCTIONS': {'ENTITYCREATION': 'putNetwork'}
, 'UNIQUEATTIBUTES': ['USERSID'], 'TOKENENTITIESRELATIONSHIPS': { }
, 'ATTRIBUTES': {'USERSID': (2, 'STRING', 0, 'VALUE'), 'ISACTIVE': (0, 'BOOL', 1, 'VALUE'), 'ENTITYKEY':
(1, 'STRING', 0, 'VALUE')}
}
, 'TWITTERUSER': {'TYPEOFTYPES': ['TOKENENTITY'], 'FUNCTIONS': {'ENTITYCREATION':
'putWGTNetwork'}
, 'UNIQUEATTIBUTES': ['USERNAME'], 'TOKENENTITIESRELATIONSHIPS': ['USER'], 'ATTRIBUTES':
{'USERNAME': (2, 'STRING', 0, 'VALUE'), 'CITY': (5, 'STRING', 0, 'VALUE'), 'ENTITYKEY': (1, 'STRING', 0, -continued ‘VALUE’), ‘USERLINK’: (6, ‘STRING’, 0, ‘VALUE’), ‘FULLNAME’: (4, ‘STRING’, 0, ‘VALUE’), ‘USERTAG’: (3, ‘STRING’, 0, ‘VALUE’), ‘ISACTIVE’: (0, ‘BOOL’, 1, ‘VALUE’)}
}
, ‘COUPON’: {‘TYPEOFTYPES’: [‘COUPON’], ‘FUNCTIONS’: {‘ENTITYCREATION’: ‘putNetwork’}
, ‘UNIQUEATTIBUTES’: [‘COUPONNAME’], ‘TOKENENTITIESRELATIONSHIPS’: [‘MERCHANT’], ‘ATTRIBUTES’: {‘STATUS’: (2, ‘STRING’, 0, ‘VALUE’), ‘MERCHANT’: (3, ‘STRING’, 0, ‘VALUE’), ‘TITLE’: (5, ‘STRING’, 0, ‘VALUE’), ‘NOTES’: (7, ‘STRING’, 0, ‘VALUE’), ‘UPDATEDBY’: (11, ‘STRING’, 0, ‘VALUE’), ‘ENTITYKEY’: (1, ‘STRING’, 0, ‘VALUE’), ‘DECRIPTION’: (6, ‘STRING’, 0, ‘VALUE’), ‘CREATEDBY’: (10, ‘STRING’, 0, ‘VALUE’), ‘LASTUPDATEDT’: (9, ‘DATETIME’, 0, ‘VALUE’), ‘EXPDT’: (13, ‘DATETIME’, 0, ‘VALUE’), ‘RESTRICTIONS’: (14, ‘DICT’, 0, ‘VALUE’), ‘COUPONNAME’: (4, ‘STRING’, 0, ‘VALUE’), ‘CREATIONDT’: (8, ‘DATETIME’, 0, ‘VALUE’), ‘STARTDT’: (12, ‘DATETIME’, 0, ‘VALUE’), ‘ISACTIVE’: (0, ‘BOOL’, 1, ‘VALUE’)}
}
, ‘MEMBERSHIP’: {‘TYPEOFTYPES’: [‘MEMBERSHIPS’], ‘FUNCTIONS’: {‘ENTITYCREATION’: ‘putNetwork’}
, ‘UNIQUEATTIBUTES’: [‘MEMBERSHIPNAME’], ‘TOKENENTITIESRELATIONSHIPS’: [‘MERCHANT’], ‘ATTRIBUTES’: {‘STATUS’: (2, ‘STRING’, 0, ‘VALUE’), ‘MERCHANT’: (3, ‘STRING’, 0, ‘VALUE’), ‘RESTRICTIONS’: (7, ‘DICT’, 0, ‘VALUE’), ‘MEMBERSHIPNAME’: (4, ‘STRING’, 0, ‘VALUE’), ‘STARTDT’: (5, ‘DATETIME’, 0, ‘VALUE’), ‘EXPDT’: (6, ‘DATETIME’, 0, ‘VALUE’), ‘ISACTIVE’: (0, ‘BOOL’, 1, ‘VALUE’), ‘ENTITYKEY’: (1, ‘STRING’, 0, ‘VALUE’)}
}
, ‘USERSECURITY’: {‘TYPEOFTYPES’: [‘SECURITY’], ‘FUNCTIONS’: {‘ENTITYCREATION’: ‘putNetwork’}
, ‘UNIQUEATTIBUTES’: [‘USERSECURITYNAME’], ‘TOKENENTITIESRELATIONSHIPS’: [‘USER’], ‘ATTRIBUTES’: {‘STATUS’: (2, ‘STRING’, 0, ‘VALUE’), ‘EXPDT’: (6, ‘DATETIME’, 0, ‘VALUE’), ‘USERSECURITYNAME’: (4, ‘STRING’, 0, ‘VALUE’), ‘USER’: (3, ‘STRING’, 0, ‘VALUE’), ‘RESTRICTIONS’: (7, ‘DICT’, 0, ‘VALUE’), ‘STARTDT’: (5, ‘DATETIME’, 0, ‘VALUE’), ‘ISACTIVE’: (0, ‘BOOL’, 1, ‘VALUE’), ‘ENTITYKEY’: (1, ‘STRING’, 0, ‘VALUE’)}
}
, ‘MCC’: {‘TYPEOFTYPES’: [‘MCC’], ‘FUNCTIONS’: {‘ENTITYCREATION’: ‘putWGTNetwork’}
, ‘UNIQUEATTIBUTES’: [‘MCCNAME’, ‘MCC’], ‘TOKENENTITIESRELATIONSHIPS’: [‘MCCSEG’], ‘ATTRIBUTES’: {‘MCCSEG’: (4, ‘STRING’, 0, ‘VALUE’), ‘MCC’: (2, ‘STRING’, 0, ‘VALUE’), ‘MCCNAME’: (3, ‘STRING’, 0, ‘VALUE’), ‘ISACTIVE’: (0, ‘BOOL’, 1, ‘VALUE’), ‘ENTITYKEY’: (1, ‘STRING’, 0, ‘VALUE’)}
}
, ‘ZIPCODE’: {‘TYPEOFTYPES’: [‘LOCATION’], ‘FUNCTIONS’: {‘ENTITYCREATION’: ‘putNetwork’}
, ‘UNIQUEATTIBUTES’: [‘ZIPCODE’], ‘TOKENENTITIESRELATIONSHIPS’: [ ], ‘ATTRIBUTES’: {‘STATE’: (4, ‘STRING’, 0, ‘VALUE’), ‘POPULATION’: (3, ‘STRING’, 0, ‘VALUE’), ‘ZIPCODE’: (2, ‘STRING’, 0, ‘VALUE’), ‘ISACTIVE’: (0, ‘BOOL’, 1, ‘VALUE’), ‘ENTITYKEY’: (1, ‘STRING’, 0, ‘VALUE’)}
}
, ‘PAYMENTCARD’: {‘TYPEOFTYPES’: [‘PAYMENTCARDS’], ‘FUNCTIONS’: {‘ENTITYCREATION’: ‘putNetwork’}
, ‘UNIQUEATTIBUTES’: [‘CARDNUMBER’], ‘TOKENENTITIESRELATIONSHIPS’: [‘USER’], ‘ATTRIBUTES’: {‘EXPDATE’: (5, ‘DATETIME’, 0, ‘VALUE’), ‘ENTITYKEY’: (1, ‘STRING’, 0, ‘VALUE’), ‘CARDTYPE’: (4, ‘STRING’, 0, ‘VALUE’), ‘CARDNUMBER’: (2, ‘STRING’, 0, ‘VALUE’), ‘USER’: (3, ‘STRING’, 0, ‘VALUE’), ‘ISACTIVE’: (0, ‘BOOL’, 1, ‘VALUE’)}
}
, ‘GENERICTOKEN’: {‘TYPEOFTYPES’: [‘COUPON’], ‘FUNCTIONS’: {‘ENTITYCREATION’: ‘putNetwork’}
, ‘UNIQUEATTIBUTES’: [‘GENERICTOKENNAME’], ‘TOKENENTITIESRELATIONSHIPS’: [‘MERCHANT’], ‘ATTRIBUTES’: {‘STATUS’: (2, ‘STRING’, 0, ‘VALUE’), ‘MERCHANT’: (3, ‘STRING’, 0, ‘VALUE’), ‘TITLE’: (5, ‘STRING’, 0, ‘VALUE’), ‘NOTES’: (7, ‘STRING’, 0, ‘VALUE’), ‘UPDATEDBY’: (11, ‘STRING’, 0, ‘VALUE’), ‘ENTITYKEY’: (1, ‘STRING’, 0, ‘VALUE’), ‘DECRIPTION’: (6, ‘STRING’, 0, ‘VALUE’), ‘CREATEDBY’: (10, ‘STRING’, 0, ‘VALUE’), ‘LASTUPDATEDT’: (9, ‘DATETIME’, 0, ‘VALUE’), ‘EXPDT’: (13, ‘DATETIME’, 0, ‘VALUE’), ‘RESTRICTIONS’: (14, ‘DICT’, 0, ‘VALUE’), ‘STARTDT’: (12, ‘DATETIME’, 0, ‘VALUE’), ‘CREATIONDT’: (8, ‘DATETIME’, 0, ‘VALUE’), ‘GENERICTOKENNAME’: (4, ‘STRING’, 0, ‘VALUE’), ‘ISACTIVE’: (0, ‘BOOL’, 1, ‘VALUE’)}
}
, ‘USER’: {‘TYPEOFTYPES’: [‘USERS’, ‘SYNTHETICNETWORKS’], ‘FUNCTIONS’: {‘ENTITYCREATION’: ‘putNetwork’}
, ‘UNIQUEATTIBUTES’: [‘USERNAME’], ‘TOKENENTITIESRELATIONSHIPS’: [‘USERS’], ‘ATTRIBUTES’: {‘USERNAME’: (5, ‘STRING’, 0, ‘VALUE’), ‘USERS’: (2, ‘STRING’, 0, ‘VALUE’), ‘FIRSTNAME’: (3, ‘STRING’, 0, ‘VALUE’), ‘LASTNAME’: (4, ‘STRING’, 0, ‘VALUE’), ‘ENTITYKEY’: (1, ‘STRING’, 0, ‘VALUE’), ‘ISACTIVE’: (0, ‘BOOL’, 1, ‘VALUE’)}
}
, ‘TWEETS’: {‘TYPEOFTYPES’: [‘TOKENENTITY’], ‘FUNCTIONS’: {‘ENTITYCREATION’: ‘putWGTNetwork’}
, ‘UNIQUEATTIBUTES’: [‘TWEETID’], ‘TOKENENTITIESRELATIONSHIPS’: [‘TWITTERUSER’], ‘ATTRIBUTES’: {‘Title’: (4, ‘STRING’, 0, ‘VALUE’), ‘RawTweet’: (5, ‘STRING’, 0, ‘VALUE’), ‘DATETIME’: (3, ‘STRING’, 0, ‘VALUE’), ‘CLEANEDTWEET’: (6, ‘STRING’, 0, ‘VALUE’), ‘ENTITYKEY’: (1, ‘STRING’, 0, ‘VALUE’), ‘TWEETID’: (2, ‘STRING’, 0, ‘VALUE’), ‘ISACTIVE’: (0, ‘BOOL’, 1, ‘VALUE’)}
}
, ‘MODEL’: {‘TYPEOFTYPES’: [‘MODELS’], ‘FUNCTIONS’: {‘ENTITYCREATION’: ‘putNetwork’}
, ‘UNIQUEATTIBUTES’: [‘MODELNAME’], ‘TOKENENTITIESRELATIONSHIPS’: [‘USER’, ‘MERCHANT’, ‘PAYMENTCARD’], ‘ATTRIBUTES’: {‘XML’: (2, ‘STRING’, 0, ‘VALUE’), ‘MODELNAME’: (3, ‘STRING’, 0, ‘VALUE’), ‘DESCRIPTION’: (4, ‘STRING’, 0, ‘VALUE’), ‘ENTITYKEY’: (1, ‘STRING’, 0, ‘VALUE’), ‘TYPEOF’: (5, ‘STRING’, 0, ‘VALUE’), ‘ISACTIVE’: (0, ‘BOOL’, 1, ‘VALUE’)}
}
, ‘MCCSEG’: {‘TYPEOFTYPES’: [‘MCCSEG’], ‘FUNCTIONS’: {‘ENTITYCREATION’: ‘putWGTNetwork’}
, ‘UNIQUEATTIBUTES’: [‘MCCSEGID’], ‘TOKENENTITIESRELATIONSHIPS’: { }
, ‘ATTRIBUTES’: {‘MCCSEGID’: (2, ‘STRING’, 0, ‘VALUE’), ‘MCCSEGNAME’: (3, ‘STRING’, 0, ‘VALUE’), ‘ISACTIVE’: (0, ‘BOOL’, 1, ‘VALUE’), ‘ENTITYKEY’: (1, ‘STRING’, 0, ‘VALUE’)}
}

-continued

, 'TOKENENTITY': {'TYPEOFTYPES': ['TOKENENTITY'], 'FUNCTIONS': {'ENTITYCREATION': 'putWGTNetwork'}
, 'UNIQUEATTIBUTES': ['TOKENENTITYKEY'], 'TOKENENTITIESRELATIONSHIPS': { }
, 'ATTRIBUTES': {'STATUS': (4, 'STRING', 0, 'VALUE'), 'ISSUEDDATE': (5, 'STRING', 0, 'VALUE'), 'DOUBLELINKED': (8, 'BOOL', 1, 'VALUE'), 'BASEUUID': (1, 'STRING', 0, 'VALUE'), 'WEIGHT': (6, 'STRING', 0, 'VALUE'), 'BASETYPE': (3, 'STRING', 0, 'VALUE'), 'CATEGORY': (7, 'STRING', 0, 'VALUE'), 'ISACTIVE': (0, 'BOOL', 1, 'VALUE'), 'TOKENENTITYKEY': (2, 'STRING', 0, 'VALUE')}
}
}

Figure 20:
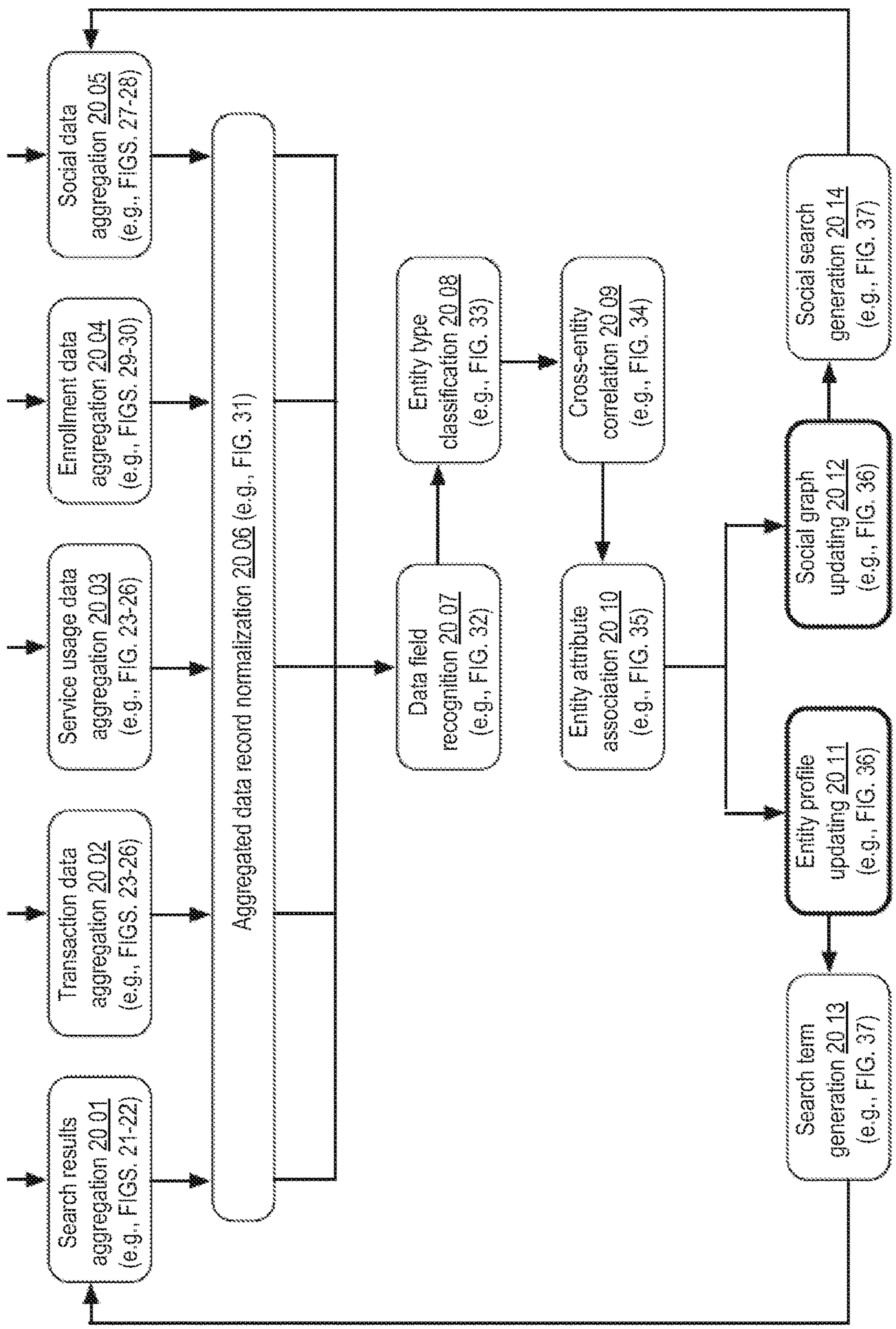
FIG. 20 shows a block diagram illustrating example MCB-Platform component configurations in some embodiments of the MCB-Platform.

FIG. 20 shows a block diagram illustrating example MCB-Platform component configurations in some embodiments of the MCB-Platform. In some embodiments, the MCB-Platform may aggregate data from a variety of sources to generate centralized personal information. The may also aggregate various types of data in order to generate the centralized personal information. For example, the MCB-Platform may utilize search results aggregation component(s) 2001 (e.g., such as described in FIGS. 21-22) to aggregate search results from across a wide range of computer networked systems, e.g., the Internet. As another example, the MCB-Platform may utilize transaction data aggregation component(s) 2002 (e.g., such as described in FIGS. 23-26) to aggregate transaction data, e.g., from transaction processing procedure by a payment network. As another example, the MCB-Platform may utilize service usage data aggregation component(s) 2003 (e.g., such as described in FIGS. 23-26) to aggregate data on user's usage of various services associated with the MCB-Platform. As another example, the MCB-Platform may utilize enrollment data component(s) 2004 (e.g., such as described in FIGS. 23-26) to aggregate data on user's enrollment into various services associated with the MCB-Platform. As another example, the MCB-Platform may utilize social data aggregation component(s) 2003 (e.g., such as described in FIGS. 27-28) to aggregate data on user's usage of various social networking services accessible by the MCB-Platform.

In some embodiments, the MCB-Platform may acquire the aggregated data, and normalize the data into formats that are suitable for uniform storage, indexing, maintenance, and/or further processing via data record normalization component(s) 2006 (e.g., such as described in FIG. 31). The MCB-Platform may extract data from the normalized data records, and recognize data fields, e.g., the MCB-Platform may identify the attributes of each field of data included in the normalized data records via data field recognition component(s) 2007 (e.g., such as described in FIG. 32). For example, the MCB-Platform may identify names, user ID(s), addresses, network addresses, comments and/or specific words within the comments, images, blog posts, video, content within the video, and/or the like from the aggregated data. In some embodiments, for each field of data, the MCB-Platform may classify entity types associated with the field of data, as well as entity identifiers associated with the field of data, e.g., via component(s) 2008 (e.g., such as described in FIG. 33). For example, the MCB-Platform may identify an Internet Protocol (IP) address data field to be associated with a user ID john.q.public (consumer entity type), a user John Q. Public (consumer entity type), a household (the Public household—a multi-consumer entity type/household entity type), a merchant entity type with identifier Acme Merchant Store, Inc. from which purchases are made from the IP address, an Issuer Bank type with identifier First National Bank associated with the purchases made from the IP address, and/or the like. In some embodiments, the MCB-Platform may utilize the entity types and entity identifiers to correlate entities across each other, e.g., via cross-entity correlation component(s) 2009 (e.g., such as described in FIG. 34). For example, the MCB-Platform may identify, from the aggregated data, that a household entity with identifier H123 may include a user entity with identifier John Q. Public and social identifier john.q.public@facebook.com, a second user entity with identifier Jane P. Doe with social identifier jpdoe@twitter.com, a computer entity with identifier IP address 192.168.4.5, a card account entity with identifier **1234, a bank issuer entity with identifier AB23145, a merchant entity with identifier Acme Stores, Inc. where the household sub-entities make purchases, and/or the like. In some embodiments, the MCB-Platform may utilize the entity identifiers, data associated with each entity and/or correlated entities to identify associations to other entities, e.g., via entity attribute association component(s) 2010 (e.g., such as described in FIG. 35). For example, the MCB-Platform may identify specific purchases made via purchase transactions by members of the household, and thereby identify attributes of members of the household on the basis of the purchases in the purchase transactions made by members of the household. Based on such correlations and associations, the MCB-Platform may update a profile for each entity identified from the aggregated data, as well as a social graph interrelating the entities identified in the aggregated data, e.g., via entity profile-graph updating component(s) 2011 (e.g., such as described in FIG. 36). In some embodiments, the updating of profile and/or social graphs for an entity may trigger a search for additional data that may be relevant to the newly identified correlations and associations for each entity, e.g., via search term generation component(s) 2013-2014 (e.g., such as described in FIG. 37**). For example, the updating of a profile and/or social graph may trigger searches across the Internet, social networking websites, transaction data from payment networks, services enrolled into and/or utilized by the entities, and/or the like. In some embodiments, such updating of entity profiles and/or social graphs may be performed continuously, periodically, on-demand, and/or the like.

Figure 21:
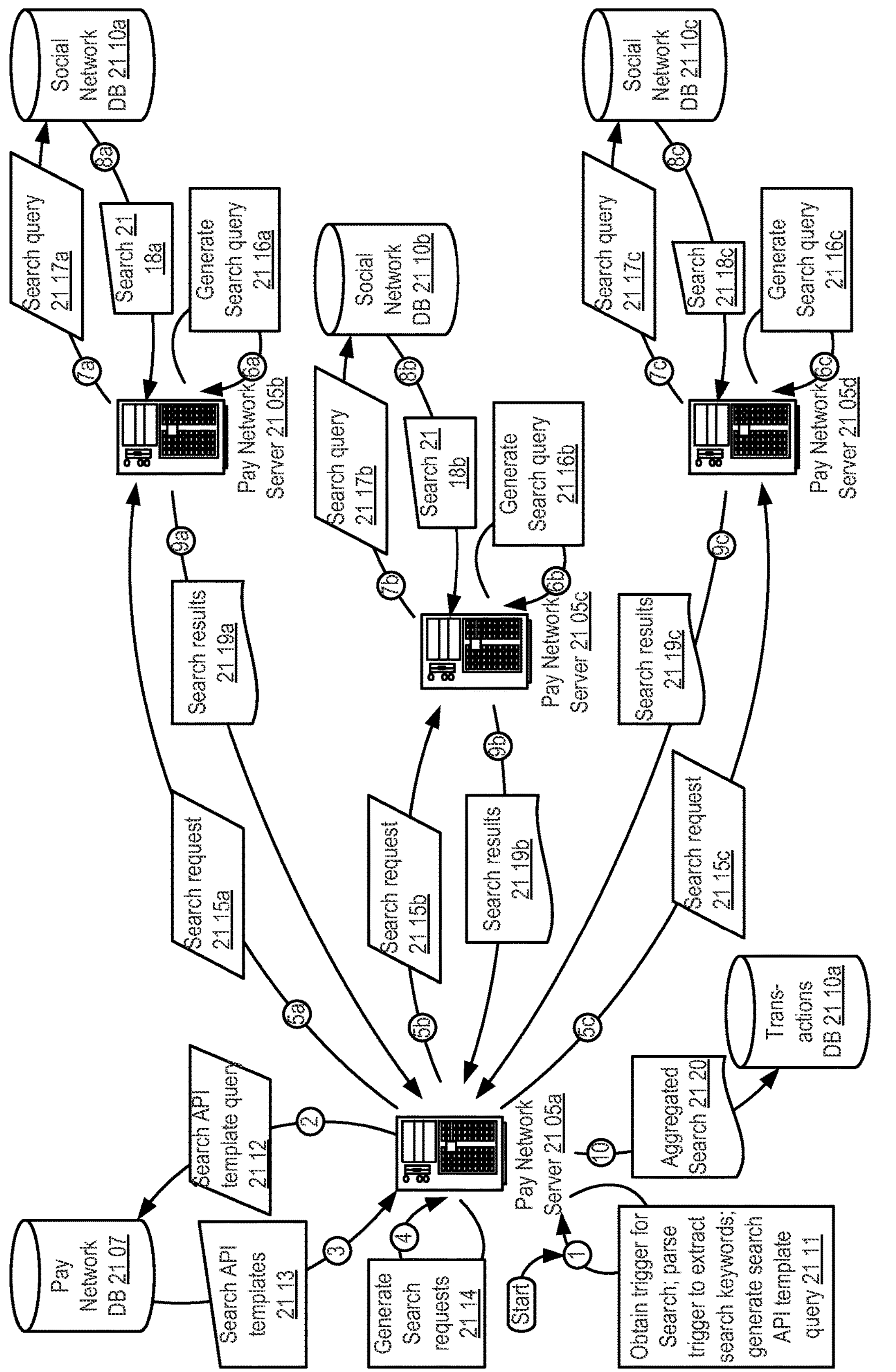
FIG. 21 shows a data flow diagram illustrating an example search result aggregation procedure in some embodiments of the MCB-Platform.

FIG. 21 shows a data flow diagram illustrating an example search result aggregation procedure in some embodiments of the MCB-Platform. In some implementations, the pay network server may obtain a trigger to perform a search. For example, the pay network server may periodically perform a search update of its aggregated search database, e.g., 2110, with new information available from a variety of sources, such as the Internet. As another example, a request for on-demand search update may be obtained as a result of a user wishing to enroll in a service, for which the pay network server may facilitate data entry by providing an automated web form filling system using information about the user obtained from the search update. In some implementations, the pay network server may parse the trigger to extract keywords using which to perform an aggregated search. The pay network server may generate a query for application programming interface (API) templates for various search engines (e.g., Google™, Bing®, AskJeeves, market data search engines, etc.) from which to collect data for aggregation. The pay network server may query, e.g., 2112, a pay network database, e.g., 2107, for search API templates for the search engines. For example, the pay network server may utilize PHP/SQL commands similar to the examples provided above. The database may provide, e.g., 2113, a list of API templates in response. Based on the list of API templates, the pay network server may generate search requests, e.g., 2114. The pay network server may issue the generated search requests, e.g., 2115*a-c*, to the search engine servers, e.g., 2101*a-c*. For example, the pay network server may issue PHP commands to request the search engine for search results. An example listing of commands to issue search requests 2115*a-c*, substantially in the form of PHP commands, is provided below:

```
<?PHP
// API URL with access key
$url = ["https://ajax.googleapis.com/ajax/services/search/web?v=1.0&"
      . “q=” $keywords
      “&key=1234567890987654&userip=datagraph.cpip.com"];
```

-continued

```
// Send Search Request
$ch = curl_init( );
curl_setopt($ch, CURLOPT_URL, $url);
curl_setopt($ch, CURLOPT_RETURNTRANSFER, 1);
curl_setopt($ch, CURLOPT_REFERER, “datagraph.cpip.com”);
$body = curl_exec($ch);
curl_close($ch);
// Obtain, parse search results
$json = json_decode($body);
?>
```

In some embodiments, the search engine servers may query, e.g., 2117*a-c*, their search databases, e.g., 2102*a-c*, for search results falling within the scope of the search keywords. In response to the search queries, the search databases may provide search results, e.g., 2118*a-c*, to the search engine servers. The search engine servers may return the search results obtained from the search databases, e.g., 2119*a-c*, to the pay network server making the search requests. An example listing of search results 2119*a-c*, substantially in the form of JavaScript Object Notation (JSON)-formatted data, is provided below:

```
{“responseData”: {
    “results”: [
        {
            “GsearchResultClass”: “GwebSearch”,
            “unescapedUrl”: “http://en.wikipedia.org/wiki/John_Q_Public”,
            “url”: “http://en.wikipedia.org/wiki/John_Q_Public”,
            “visibleUrl”: “en.wikipedia.org”,
            “cacheUrl”: “http://www.google.com/search?q\u003dcache:TwrPfhd22hYJ:en.wikipedia.org”,
            “title”: “\u003cb\u003eJohn Q. Public\u003c/b\u003e - Wikipedia, the free encyclopedia”,
            “titleNoFormatting”: “John Q. Public - Wikipedia, the free encyclopedia”,
            “content”: “\[1\] In 2006, he served as Chief Technology Officer...”
        },
        {
            “GsearchResultClass”: “GwebSearch”,
            “unescapedUrl”: “http://www.imdb.com/name/nm0385296/”,
            “url”: “http://www.imdb.com/name/nm0385296/”,
            “visibleUrl”: “www.imdb.com”,
            “cacheUrl”: “http://www.google.com/search?q\u003dcache:1i34KkqnsooJ:www.imdb.com”,
            “title”: “\u003cb\u003eJohn Q. Public\u003c/b\u003e”,
            “titleNoFormatting”: “John Q. Public”,
            “content”: “Self: Zoolander. Socialite \u003cb\u003eJohn Q. Public\u003c/b\u003e...”
        },
        ...
    ],
    “cursor”: {
        “pages”: [
          { “start”: “0”, “label”: 1 },
          { “start”: “4”, “label”: 2 },
          { “start”: “8”, “label”: 3 },
          { “start”: “12”,“label”: 4 }
        ],
        “estimatedResultCount”: “59600000”,
        “currentPageIndex”: 0,
        “moreResultsUrl”: “http://www.google.com/search?oe\u003dutf8\u0026ie\u003dutf8...”
    }
}
, “responseDetails”: null, “responseStatus”: 200}
```

In some embodiments, the pay network server may store the aggregated search results, e.g., 2120, in an aggregated search database, e.g., 2110.

Figure 22:
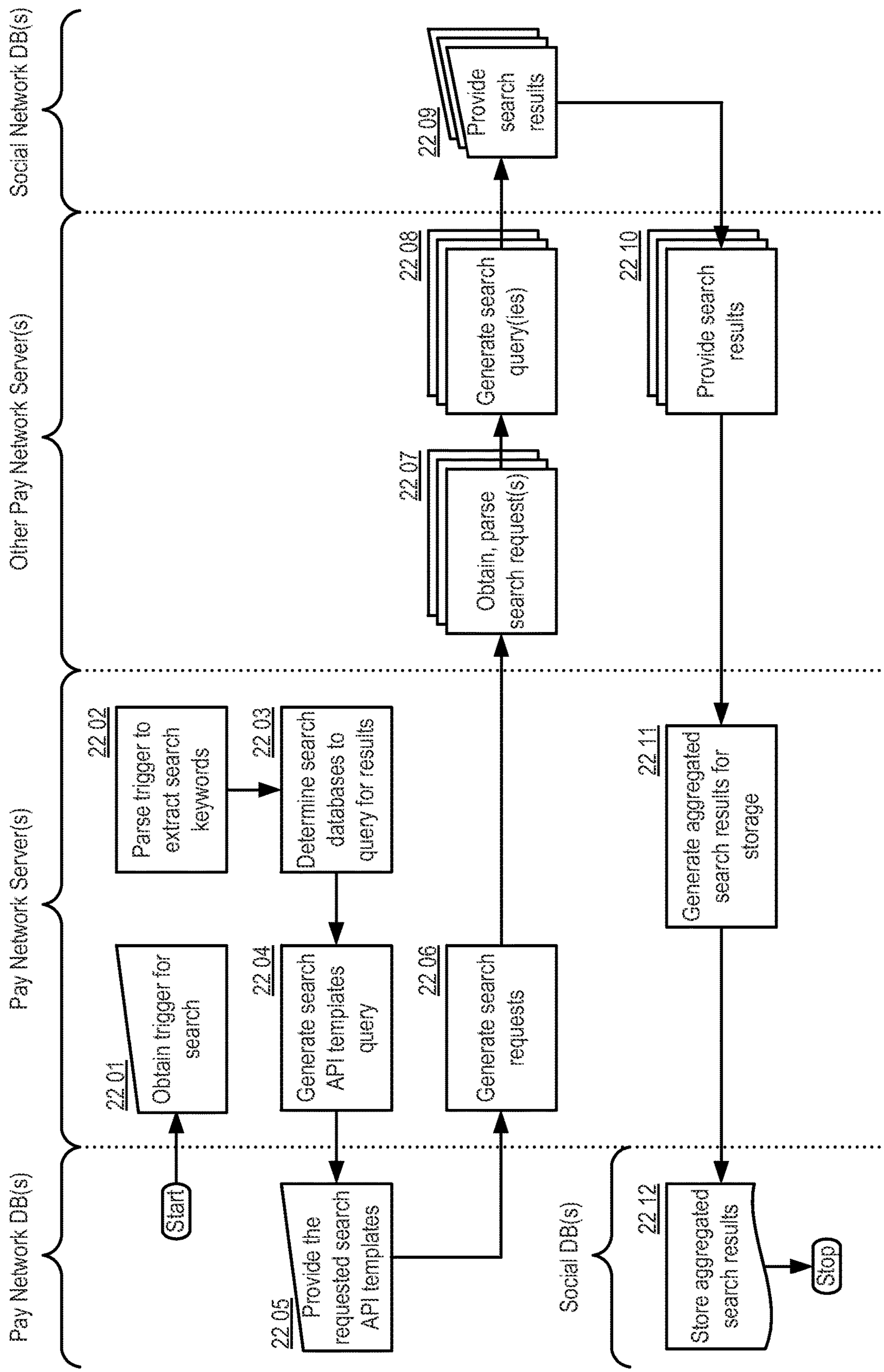
FIG. 22 shows a logic flow diagram illustrating example aspects of aggregating search results in some embodiments of the MCB-Platform, e.g., a Search Results Aggregation ("SRA") component 500.

FIG. 22 shows a logic flow diagram illustrating example aspects of aggregating search results in some embodiments of the MCB-Platform, e.g., a Search Results Aggregation ("SRA") component 2200. In some implementations, the pay network server may obtain a trigger to perform a search, e.g., 2201. For example, the pay network server may periodically perform a search update of its aggregated search database with new information available from a variety of sources, such as the Internet. As another example, a request for on-demand search update may be obtained as a result of a user wishing to enroll in a service, for which the pay network server may facilitate data entry by providing an automated web form filling system using information about the user obtained from the search update. In some implementations, the pay network server may parse the trigger, e.g., 2202, to extract keywords using which to perform an aggregated search. The pay network server may determine the search engines to search, e.g., 2203, using the extracted keywords. Then, the pay network server may generate a query for application programming interface (API) templates for the various search engines (e.g., Google™, Bing®, AskJeeves, market data search engines, etc.) from which to collect data for aggregation, e.g., 2204. The pay network server may query, e.g., 2205, a pay network database for search API templates for the search engines. For example, the pay network server may utilize PHP/SQL commands similar to the examples provided above. The database may provide, e.g., 2205, a list of API templates in response. Based on the list of API templates, the pay network server may generate search requests, e.g., 2206. The pay network server may issue the generated search requests to the search engine servers. The search engine servers may parse the obtained search results(s), e.g., 2207, and query, e.g., 2208, their search databases for search results falling within the scope of the search keywords. In response to the search queries, the search databases may provide search results, e.g., 2209, to the search engine servers. The search engine servers may return the search results obtained from the search databases, e.g., 2210, to the pay network server making the search requests. The pay network server may generate, e.g., 2211, and store the aggregated search results, e.g., 2212, in an aggregated search database.

FIGS. 23A-D show data flow diagrams illustrating an example card-based transaction execution procedure in some embodiments of the MCB-Platform. In some implementations, a user, e.g., 2301, may desire to purchase a product, service, offering, and/or the like ("product"), from a merchant. The user may communicate with a merchant server, e.g., 2303, via a client such as, but not limited to: a personal computer, mobile device, television, point-of-sale terminal, kiosk, ATM, and/or the like (e.g., 2302). For example, the user may provide user input, e.g., purchase input 2311, into the client indicating the user's desire to purchase the product. In various implementations, the user input may include, but not be limited to: keyboard entry, card swipe, activating a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the merchant, and may select a product from the website via clicking on a hyperlink presented to the user via the website. As another example, the client may obtain track 1 data from the user's card (e.g., credit card, debit card, prepaid card, charge card, etc.), such as the example track 1 data provided below:

%B123456789012345^PUBLIC/J.Q.^99011200000000000000901 ****?*

(wherein '123456789012345' is the card number of 'J.Q. Public' and has a CVV number of 901. '990112' is a service code, and *** represents decimal digits which change randomly each time the card is used.)

In some implementations, the client may generate a purchase order message, e.g., 2312, and provide, e.g., 2313, the generated purchase order message to the merchant server. For example, a browser application executing on the client may provide, on behalf of the user, a (Secure) Hypertext Transfer Protocol ("HTTP(S)") GET message including the product order details for the merchant server in the form of data formatted according to the eXtensible Markup Language ("XML"). Below is an example HTTP(S) GET message including an XML-formatted purchase order message for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <account_params>
        <account_name>John Q. Public</account_name>
        <account_type>credit</account_type>
        <account_num>123456789012345</account_num>
        <billing_address>123 Green St., Norman, OK
        98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
```

-continued

```
        <ship_carrier>FedEx</ship_carrier>
        <ship_account>123-45-678</ship_account>
        <tracking_flag>true</tracking_flag>
        <sign_flag>false</sign_flag>
    </shipping_info>
</purchase_order>
```

In some implementations, the merchant server may obtain the purchase order message from the client, and may parse the purchase order message to extract details of the purchase order from the user. The merchant server may generate a card query request, e.g., 2314 to determine whether the transaction can be processed. For example, the merchant server may attempt to determine whether the user has sufficient funds to pay for the purchase in a card account provided with the purchase order. The merchant server may provide the generated card query request, e.g., 2315, to an acquirer server, e.g., 2304. For example, the acquirer server may be a server of an acquirer financial institution ("acquirer") maintaining an account of the merchant. For example, the proceeds of transactions processed by the merchant may be deposited into an account maintained by the acquirer. In some implementations, the card query request may include details such as, but not limited to: the costs to the user involved in the transaction, card account details of the user, user billing and/or shipping information, and/or the like. For example, the merchant server may provide a HTTP(S) POST message including an XML-formatted card query request similar to the example listing provided below:

```
POST /cardquery.php HTTP/1.1
Host: www.acquirer.com
Content-Type: Application/XML
Content-Length: 624
<?XML version = "1.0" encoding = "UTF-8"?>
<card_query_request>
    <query_ID>VNEI39FK</query_ID>
    <timestamp>2011-02-22 15:22:44</timestamp>
    <purchase_summary>
        <num_products>1</num_products>
        <product>
            <product_summary>Book - XML for dummies</product_summary>
            <product_quantity>1</product_quantity?
        </product>
    </purchase_summary>
    <transaction_cost>$34.78</transaction_cost>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
</card_query_request>
```

In some implementations, the acquirer server may generate a card authorization request, e.g., 2316, using the obtained card query request, and provide the card authorization request, e.g., 2317, to a pay network server, e.g., 2305. For example, the acquirer server may redirect the HTTP(S) POST message in the example above from the merchant server to the pay network server.

In some implementations, the pay network server may determine whether the user has enrolled in value-added user services. For example, the pay network server may query 2318 a database, e.g., pay network database 2307, for user service enrollment data. For example, the server may utilize PHP/SQL commands similar to the example provided above to query the pay network database. In some implementations, the database may provide the user service enrollment data, e.g., 2319. The user enrollment data may include a flag indicating whether the user is enrolled or not, as well as instructions, data, login URL, login API call template and/or the like for facilitating access of the user-enrolled services. For example, in some implementations, the pay network server may redirect the client to a value-add server (e.g., such as a social network server where the value-add service is related to social networking) by providing a HTTP(S) REDIRECT 300 message, similar to the example below:

```
HTTP/1.1 300 Multiple Choices
Location: https://www.facebook.com/dialog/oauth?client_id=snpa_app_ID&redirect_uri=
www.paynetwork.com/purchase.php
<html>
    <head><title>300 Multiple Choices</title></head>
    <body><h1>Multiple Choices</h1></body>
</html>
```

In some implementations, the pay network server may provide payment information extracted from the card authorization request to the value-add server as part of a value add service request, e.g., 2320. For example, the pay network server may provide a HTTP(S) POST message to the value-add server, similar to the example below:

```
POST /valueservices.php HTTP/1.1
Host: www.valueadd.com
Content-Type: Application/XML
Content-Length: 1306
<?XML version = "1.0" encoding = "UTF-8"?>
<service_request>
    <request_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <!--optional-->
    <merchant>
        <merchant_id>CQN3Y42N</merchant_id>
        <merchant_name>Acme Tech, Inc.</merchant_name>
        <user_name>john.q.public</user_name>
        <cardlist> www.acme.com/user/john.q.public/cclist.xml<cardlist>
        <user_account_preference>1 3 2 4 7 6 5<user_account_preference>
    </merchant>
</service_request>
```

In some implementations, the value-add server may provide a service input request, e.g., 2321, to the client. For example, the value-add server may provide a HTML input/login form to the client. The client may display, e.g., 2322, the login form for the user. In some implementations, the user may provide login input into the client, e.g., 2323, and the client may generate a service input response, e.g., 2324, for the value-add server. In some implementations, the value-add server may provide value-add services according to user value-add service enrollment data, user profile, etc., stored on the value-add server, and based on the user service input. Based on the provision of value-add services, the value-add server may generate a value-add service response, e.g., 2326, and provide the response to the pay network server. For example, the value-add server may provide a HTTP(S) POST message similar to the example below:

```
POST /serviceresponse.php HTTP/1.1
Host: www.paynet.com
```

-continued

```
Content-Type: Application/XML
Content-Length: 1306
<?XML version = "1.0" encoding = "UTF-8"?>
```

-continued

```
<service_response>
    <request_ID>4NFU4RG94</order_ID>
    <timestamp>2011-02-22 15:22:43</timestamp>
    <result>serviced</result>
    <servcode>943528976302-45569-003829-04</servcode>
</service_response>
```

In some implementations, upon receiving the value-add service response from the value-add server, the pay network server may extract the enrollment service data from the response for addition to a transaction data record. In some implementations, the pay network server may forward the card authorization request to an appropriate pay network server, e.g., 2328, which may parse the card authorization request to extract details of the request. Using the extracted fields and field values, the pay network server may generate a query, e.g., 2329, for an issuer server corresponding to the user's card account. For example, the user's card account, the details of which the user may have provided via the client-generated purchase order message, may be linked to an issuer financial institution ("issuer"), such as a banking institution, which issued the card account for the user. An issuer server, e.g., 2308*a-n*, of the issuer may maintain details of the user's card account. In some implementations, a database, e.g., pay network database 2307, may store details of the issuer servers and card account numbers associated with the issuer servers. For example, the database may be a relational database responsive to Structured Query Language ("SQL") commands. The pay network server may execute a hypertext preprocessor ("PHP") script including SQL commands to query the database for details of the issuer server. An example PHP/SQL command listing, illustrating substantive aspects of querying the database, is provided below:

```
<?PHP
header('Content-Type: text/plain');
mysql_connect("254.93.179.112",$DBserver,$password); // access database server
mysql_select_db("ISSUERS.SQL"); // select database table to search
//create query for issuer server data
$query = "SELECT issuer_name issuer_address issuer_id ip_address mac_address auth_key port_num
security_settings_list FROM IssuerTable WHERE account_num LIKE '%' $accountnum";
$result = mysql_query($query); // perform the search query
mysql_close("ISSUERS.SQL"); // close database access
?>
```

In response to obtaining the issuer server query, e.g., 2329, the pay network database may provide, e.g., 2330, the requested issuer server data to the pay network server. In some implementations, the pay network server may utilize the issuer server data to generate a forwarding card authorization request, e.g., 2331, to redirect the card authorization request from the acquirer server to the issuer server. The pay network server may provide the card authorization request, e.g., 2332*a-n*, to the issuer server. In some implementations, the issuer server, e.g., 2308*a-n*, may parse the card authorization request, and based on the request details may query 2333*a-n* database, e.g., user profile database 2309*a-n*, for data of the user's card account. For example, the issuer server may issue PHP/SQL commands similar to the example provided below:

```
<?PHP
header('Content-Type: text/plain');
mysql_connect("254.93.179.112",$DBserver,$password); // access database server
mysql_select_db("USERS.SQL"); // select database table to search
//create query for user data
$query = "SELECT user_id user_name user_balance account_type FROM UserTable WHERE
account_num LIKE '%' $accountnum";
$result = mysql_query($query); // perform the search query
mysql_close("USERS.SQL"); // close database access
?>
```

In some implementations, on obtaining the user data, e.g., 2334*a-n*, the issuer server may determine whether the user can pay for the transaction using funds available in the account, e.g., 2335*a-n*. For example, the issuer server may determine whether the user has a sufficient balance remaining in the account, sufficient credit associated with the account, and/or the like. If the issuer server determines that the user can pay for the transaction using the funds available in the account, the server may provide an authorization message, e.g., 2336*a-n*, to the pay network server. For example, the server may provide a HTTP(S) POST message similar to the examples above.

In some implementations, the pay network server may obtain the authorization message, and parse the message to extract authorization details. Upon determining that the user possesses sufficient funds for the transaction, the pay network server may generate a transaction data record from the card authorization request it received, and store, e.g., 2339, the details of the transaction and authorization relating to the transaction in a database, e.g., pay network database 2307. For example, the pay network server may issue PHP/SQL commands similar to the example listing below to store the transaction data in a database:

```
<?PHP
header('Content-Type: text/plain');
mysql_connect("254.92.185.103",$DBserver,$password); // access database server
mysql_select("TRANSACTIONS.SQL"); // select database to append
mysql_query("INSERT INTO PurchasesTable (timestamp, purchase_summary_list, num_products,
product_summary, product_quantity, transaction_cost, account_params_list, account_name, account_type,
account_num, billing_addres, zipcode, phone, sign, merchant_params_list, merchant_id, merchant_name,
merchant_auth_key)
VALUES (time( ), $purchase_summary_list, $num_products, $product_summary, $product_quantity,
$transaction_cost, $account_params_list, $account_name, $account_type, $account_num, $billing_addres,
$zipcode, $phone, $sign, $merchant_params_list, $merchant_id, $merchant_name, $merchant_auth_key)");
// add data to table in database
mysql_close("TRANSACTIONS.SQL"); // close connection to database
?>
```

In some implementations, the pay network server may forward the authorization message, e.g., 2340, to the acquirer server, which may in turn forward the authorization message, e.g., 2340, to the merchant server. The merchant may obtain the authorization message, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 2341, and store the XML data file, e.g., 2342, in a database, e.g., merchant database 2304. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365</merchant_auth_key>
    <account_number>123456789</account_number>
</merchant_data>
<transaction_data>
    <transaction 1>
        ...
    </transaction 1>
    <transaction 2>
        ...
    </transaction 2>
        .
        .
        .
    <transaction n>
        ...
    </transaction n>
</transaction_data>
```

In some implementations, the server may also generate a purchase receipt, e.g., 2343, and provide the purchase receipt to the client. The client may render and display, e.g., 2344, the purchase receipt for the user. For example, the client may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 23A:
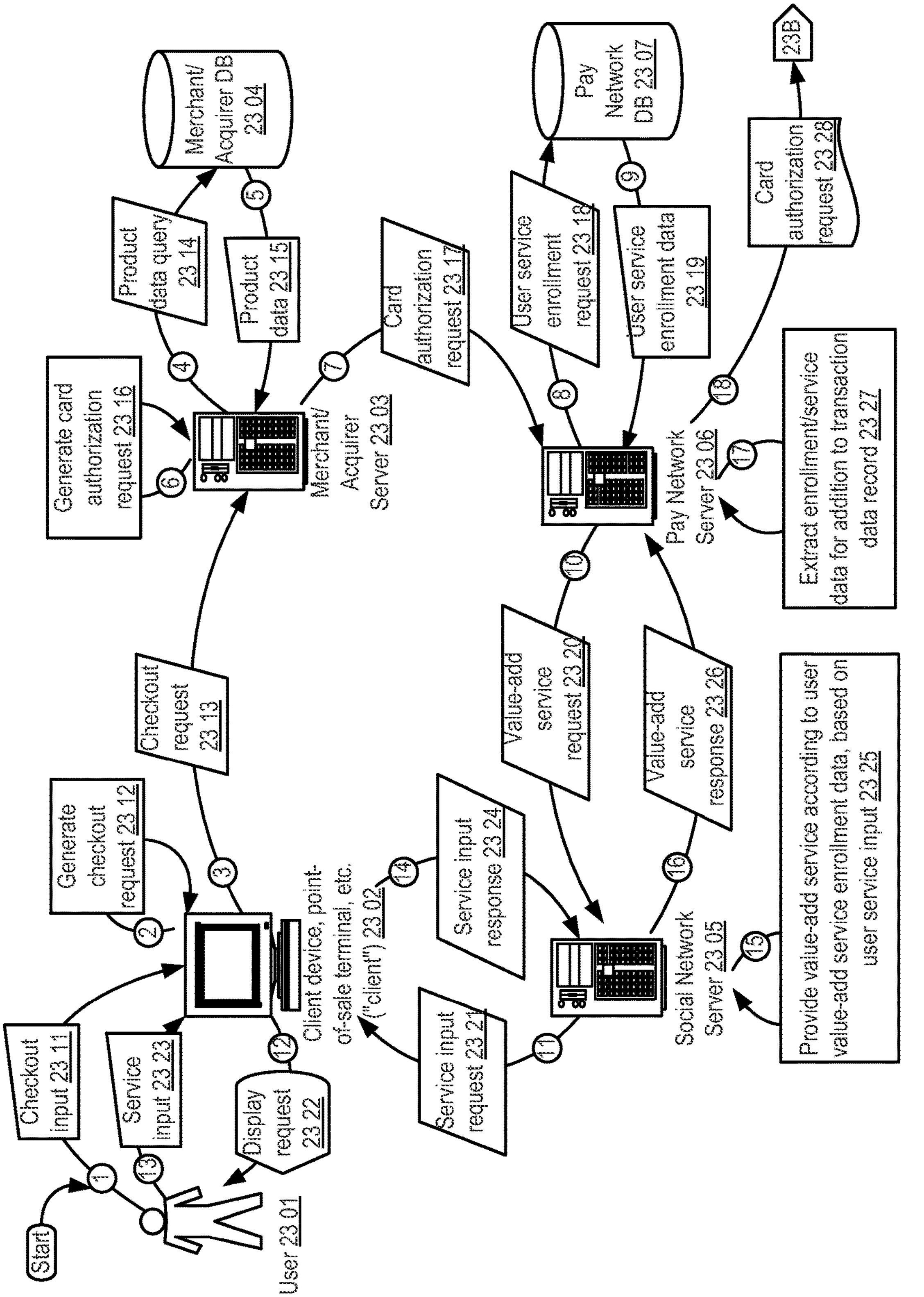
FIGS. 23A-D show data flow diagrams illustrating an example card-based transaction execution procedure in some embodiments of the MCB-Platform.
Figure 23B:
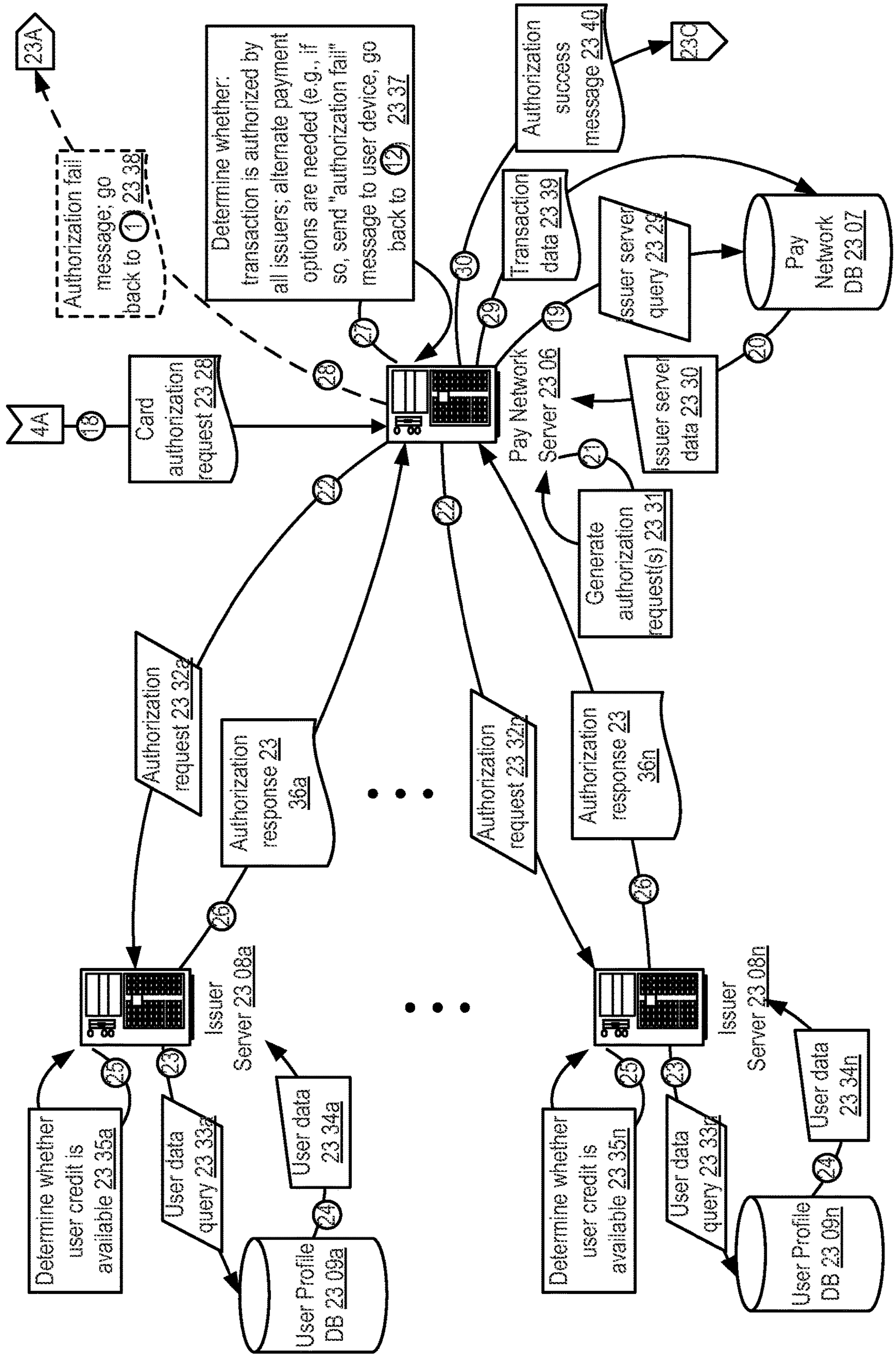
Figure 23C:
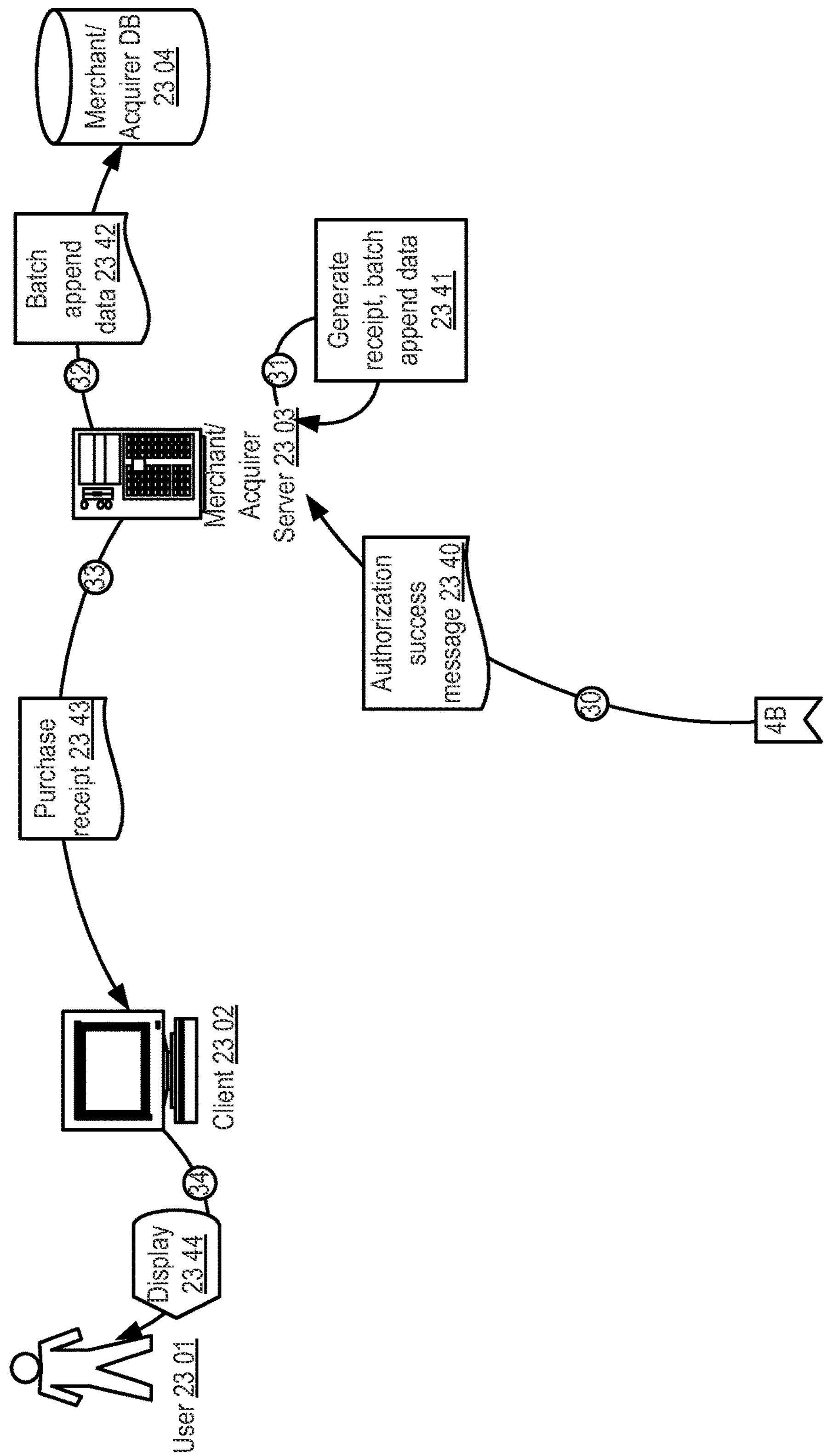
Figure 23D:
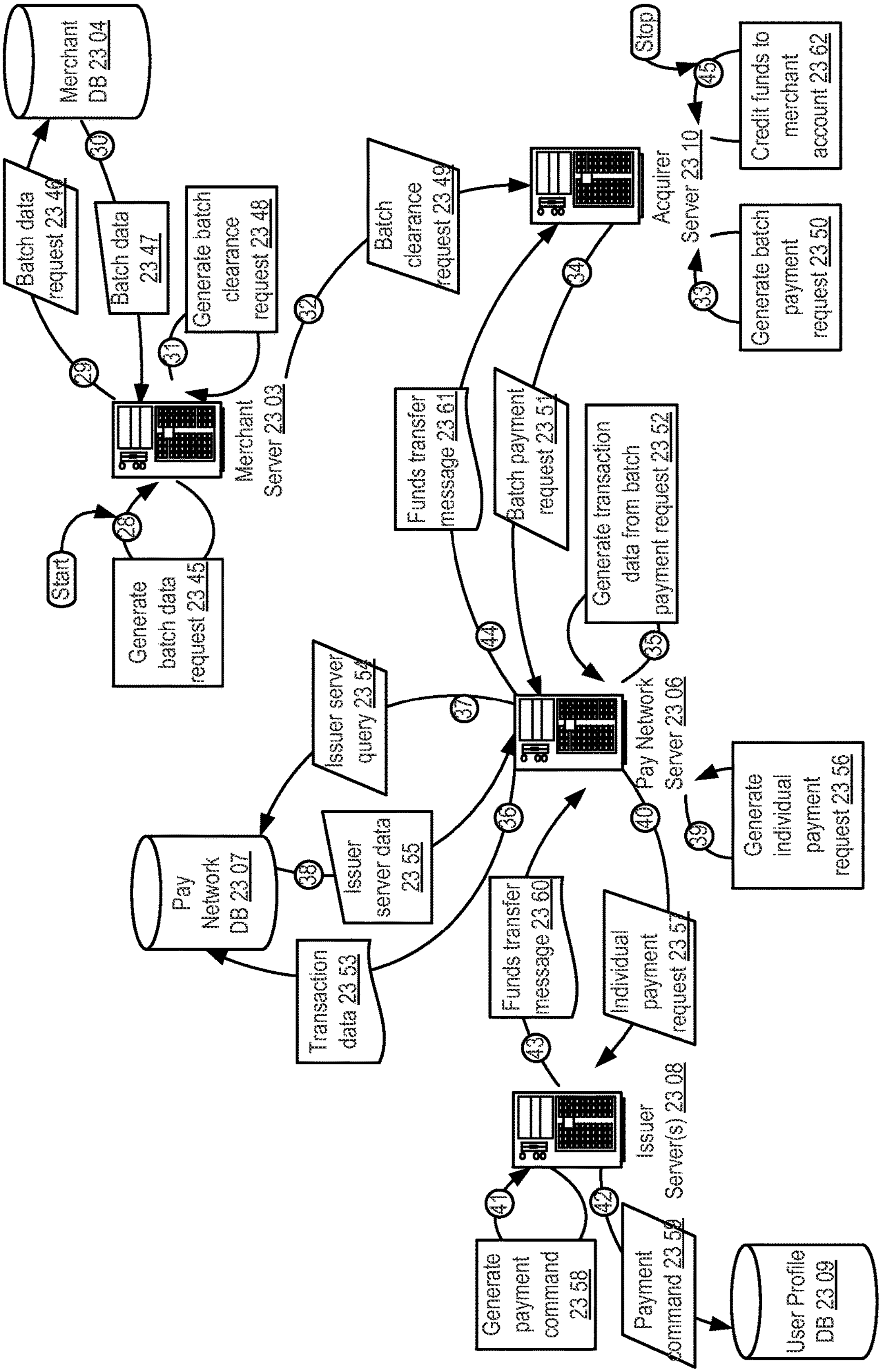

With reference to FIG. 23C, in some implementations, the merchant server may initiate clearance of a batch of authorized transactions. For example, the merchant server may generate a batch data request, e.g., 2345, and provide the request, e.g., 2346, to a database, e.g., merchant database 2304. For example, the merchant server may utilize PHP/SQL commands similar to the examples provided above to query a relational database. In response to the batch data request, the database may provide the requested batch data, e.g., 2347. The server may generate a batch clearance request, e.g., 2348, using the batch data obtained from the database, and provide, e.g., 2341, the batch clearance request to an acquirer server, e.g., 2310. For example, the merchant server may provide a HTTP(S) POST message including XML-formatted batch data in the message body for the acquirer server. The acquirer server may generate, e.g., 2350, a batch payment request using the obtained batch clearance request, and provide the batch payment request to the pay network server, e.g., 2351. The pay network server may parse the batch payment request, and extract the transaction data for each transaction stored in the batch payment request, e.g., 2352. The pay network server may store the transaction data, e.g., 2353, for each transaction in a database, e.g., pay network database 2307. For each extracted transaction, the pay network server may query, e.g., 2354-2355, a database, e.g., pay network database 2307, for an address of an issuer server. For example, the pay network server may utilize PHP/SQL commands similar to the examples provided above. The pay network server may generate an individual payment request, e.g., 2356, for each transaction for which it has extracted transaction data, and provide the individual payment request, e.g., 2357, to the issuer server, e.g., 2308. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
    <purchase_summary>
        <num_products>1</num_products>
        <product>
            <product_summary>Book - XML for dummies</product_summary>
            <product_quantity>1</product_quantity?
        </product>
    </purchase_summary>
</pay_request>
```

In some implementations, the issuer server may generate a payment command, e.g., 2358. For example, the issuer server may issue a command to deduct funds from the user's account (or add a charge to the user's credit card account). The issuer server may issue a payment command, e.g., 2359, to a database storing the user's account information, e.g., user profile database 2308. The issuer server may provide a funds transfer message, e.g., 2360, to the pay network server, which may forward, e.g., 2361, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 2362.

FIGS. 24A-E show logic flow diagrams illustrating example aspects of card-based transaction execution, resulting in generation of card-based transaction data and service usage data, in some embodiments of the MCB-Platform, e.g., a Card-Based Transaction Execution ("CTE") component 2400. In some implementations, a user may provide user input, e.g., 2401, into a client indicating the user's desire to purchase a product from a merchant. The client may generate a purchase order message, e.g., 2402, and provide the generated purchase order message to the merchant server. In some implementations, the merchant server may obtain, e.g., 2403, the purchase order message from the client, and may parse the purchase order message to extract details of the purchase order from the user. Example parsers that the merchant client may utilize are discussed further below with reference to FIG. 51. The merchant may generate a product data query, e.g., 2404, for a merchant database, which may in response provide the requested product data, e.g., 2405. The merchant server may generate a card query request using the product data, e.g., 2404, to determine whether the transaction can be processed. For example, the merchant server may process the transaction only if the user has sufficient funds to pay for the purchase in a card account provided with the purchase order. The merchant server may optionally provide the generated card query request to an acquirer server. The acquirer server may generate a card authorization request using the obtained card query request, and provide the card authorization request to a pay network server.

In some implementations, the pay network server may determine whether the user has enrolled in value-added user services. For example, the pay network server may query a database, e.g., 2407, for user service enrollment data. For example, the server may utilize PHP/SQL commands similar to the example provided above to query the pay network database. In some implementations, the database may provide the user service enrollment data, e.g., 2408. The user enrollment data may include a flag indicating whether the user is enrolled or not, as well as instructions, data, login URL, login API call template and/or the like for facilitating access of the user-enrolled services. For example, in some implementations, the pay network server may redirect the client to a value-add server (e.g., such as a social network server where the value-add service is related to social networking) by providing a HTTP(S) REDIRECT 300 message. In some implementations, the pay network server may provide payment information extracted from the card authorization request to the value-add server as part of a value add service request, e.g., 2410.

In some implementations, the value-add server may provide a service input request, e.g., 2411, to the client. The client may display, e.g., 2412, the input request for the user. In some implementations, the user may provide input into the client, e.g., 2413, and the client may generate a service input response for the value-add server. In some implementations, the value-add server may provide value-add services according to user value-add service enrollment data, user profile, etc., stored on the value-add server, and based on the user service input. Based on the provision of value-add services, the value-add server may generate a value-add service response, e.g., 2417, and provide the response to the pay network server. In some implementations, upon receiving the value-add service response from the value-add server, the pay network server may extract the enrollment service data from the response for addition to a transaction data record, e.g., 2419-2420.

Figure 24A:
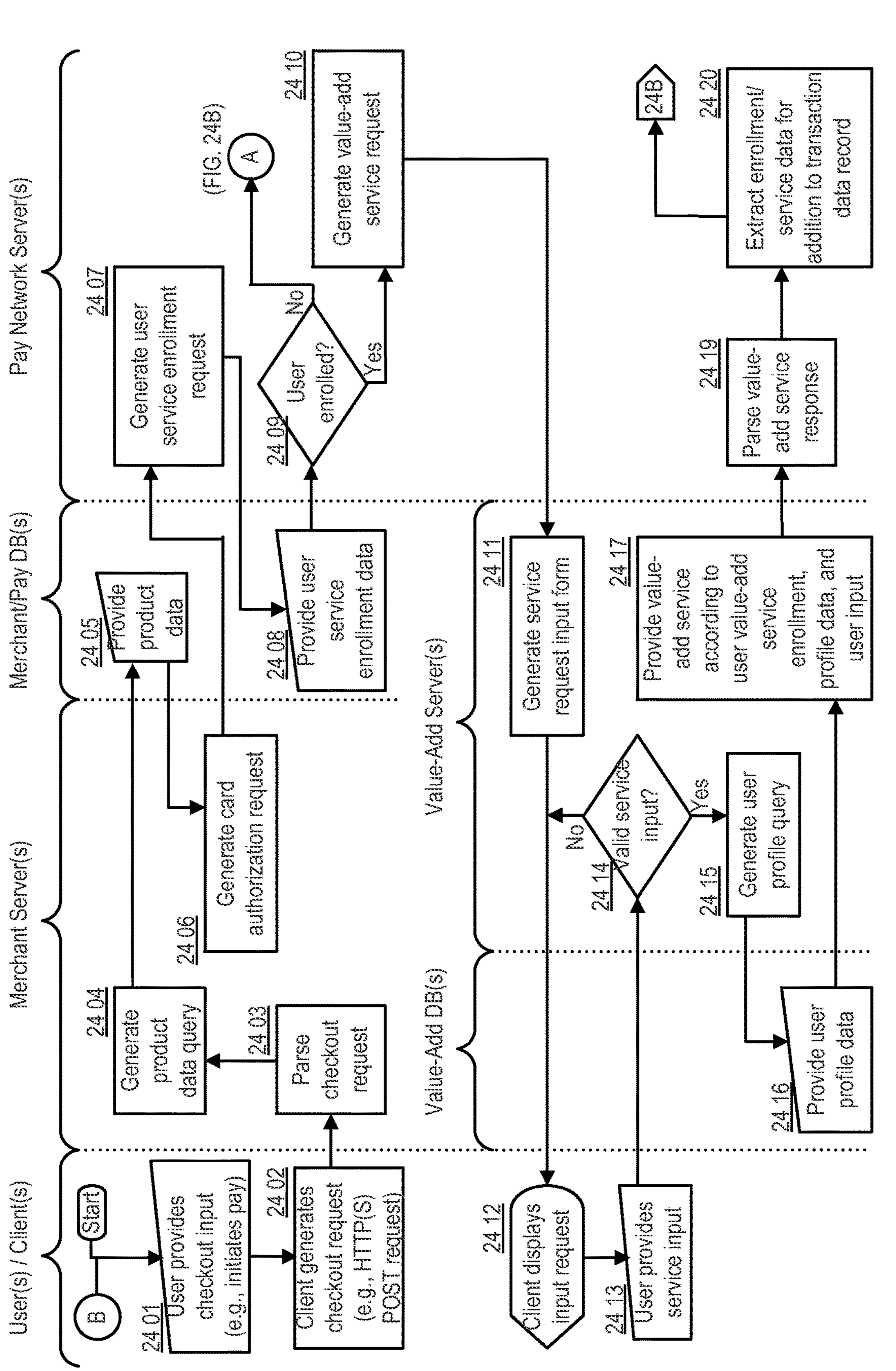
FIGS. 24A-E show logic flow diagrams illustrating example aspects of card-based transaction execution, resulting in generation of card-based transaction data and service usage data, in some embodiments of the MCB-Platform, e.g., a Card-Based Transaction Execution ("CTE") component 700.
Figure 24B:
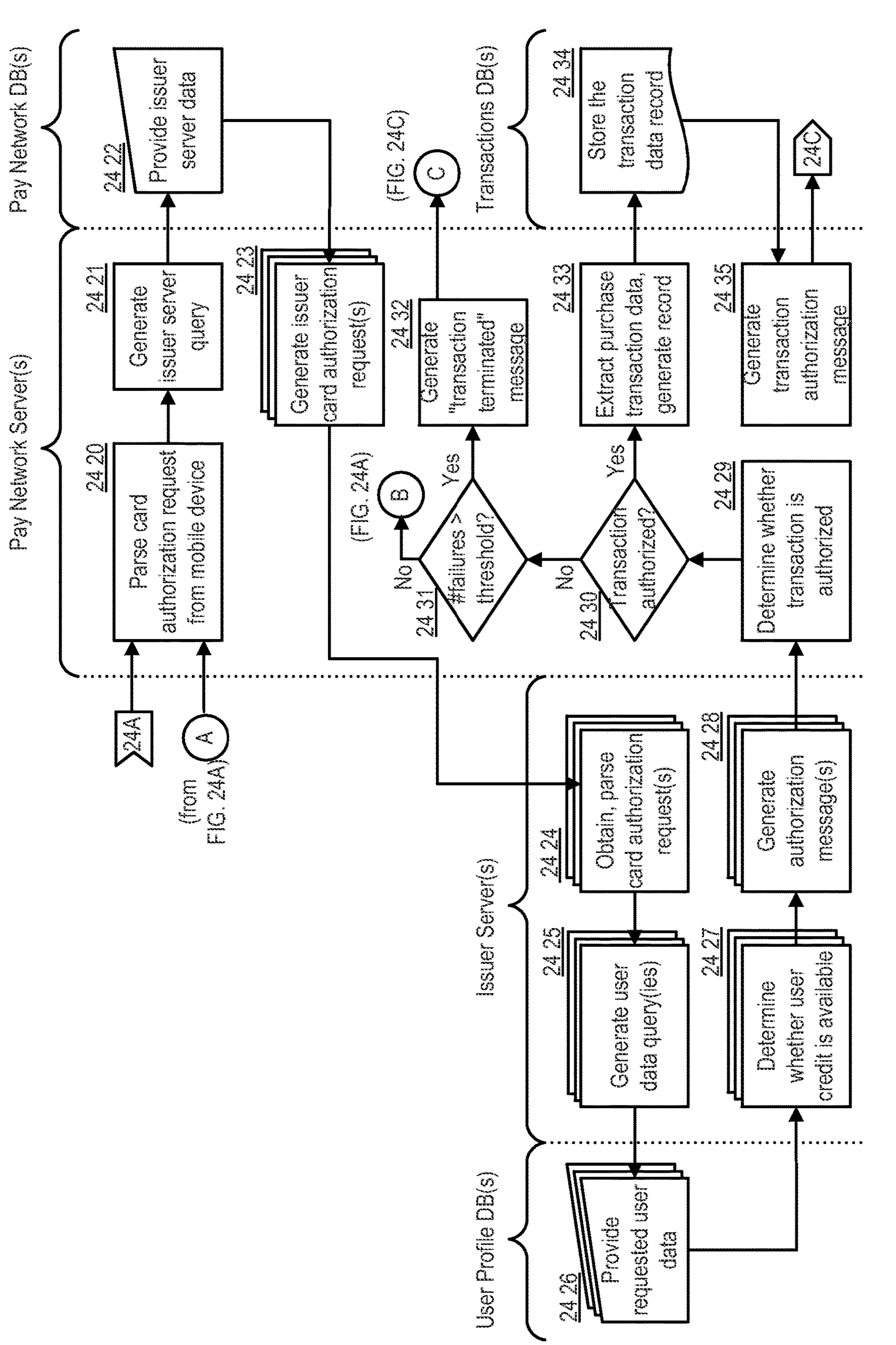
Figure 24C:
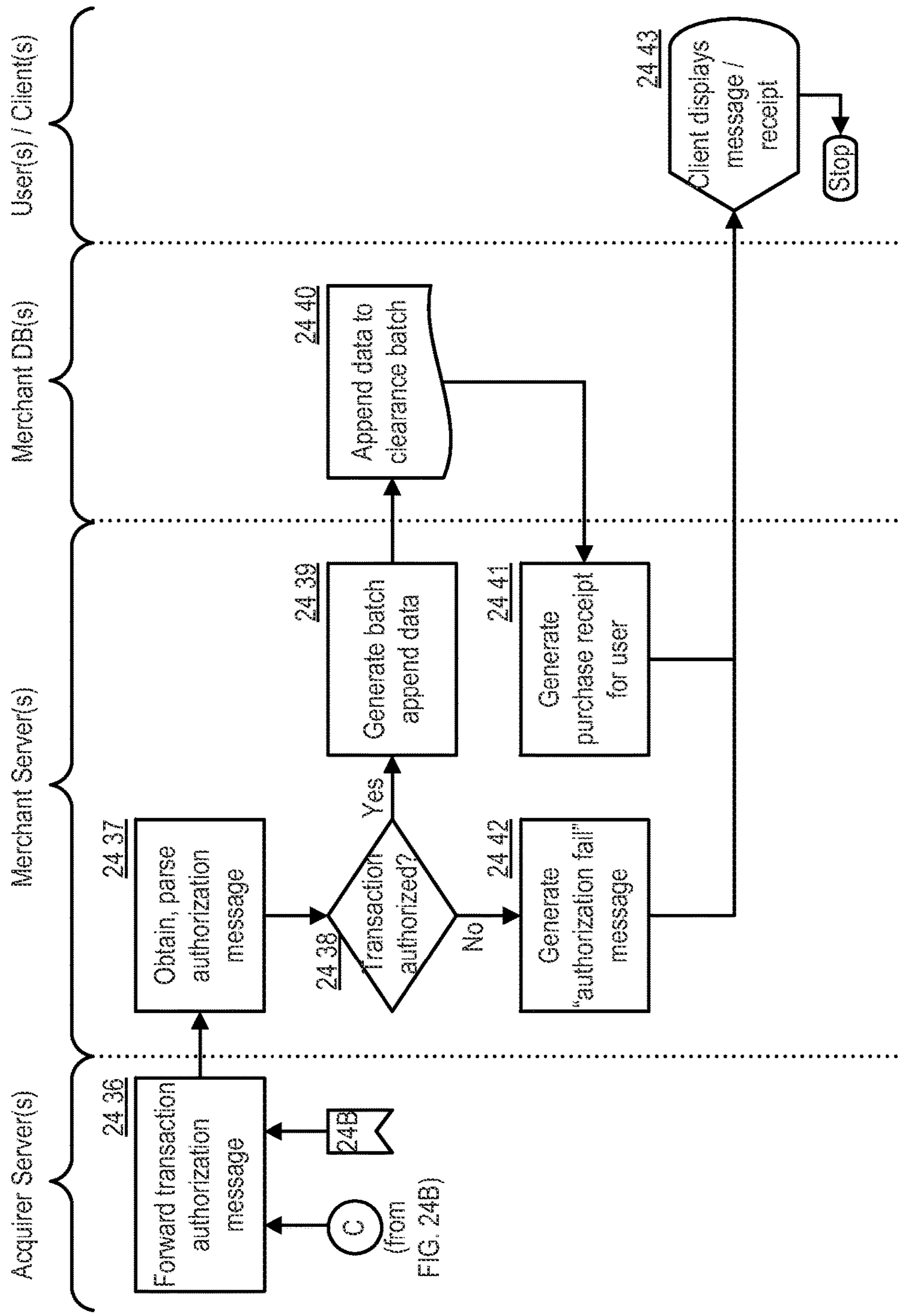
Figure 24D:
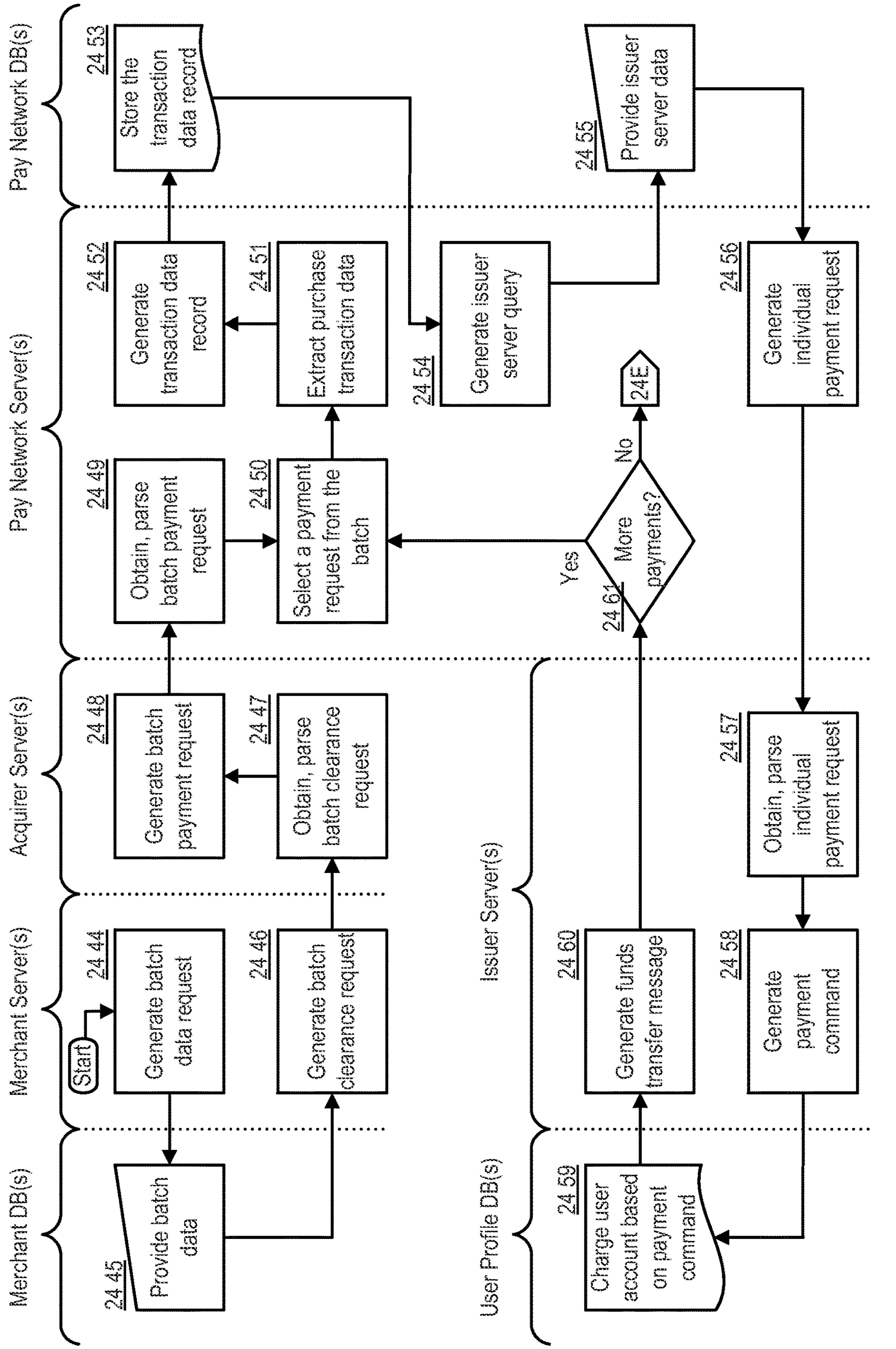
Figure 24E:
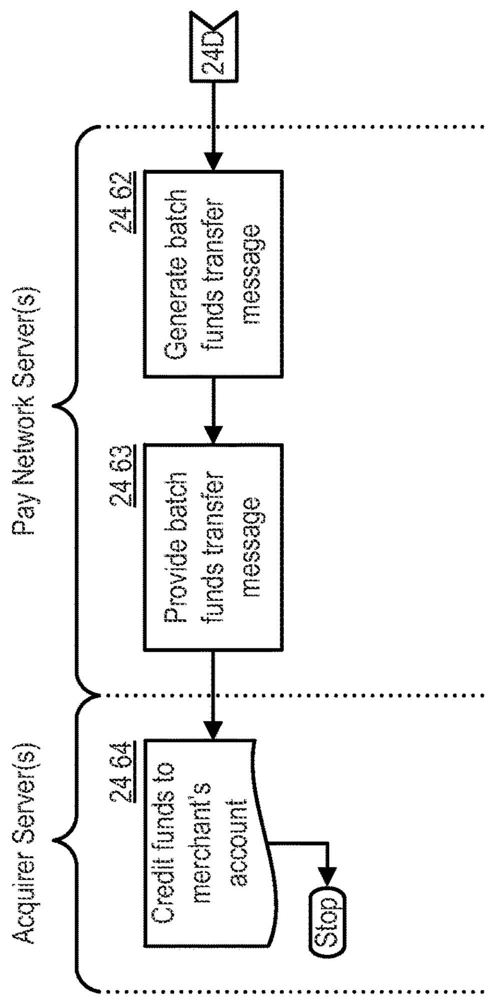

With reference to FIG. 24B, in some implementations, the pay network server may obtain the card authorization request from the acquirer server, and may parse the card authorization request to extract details of the request, e.g., 2420. Using the extracted fields and field values, the pay network server may generate a query, e.g., 2421-2422, for an issuer server corresponding to the user's card account. In response to obtaining the issuer server query the pay network database may provide, e.g., 2422, the requested issuer server data to the pay network server. In some implementations, the pay network server may utilize the issuer server data to generate a forwarding card authorization request, e.g., 2423, to redirect the card authorization request from the acquirer server to the issuer server. The pay network server may provide the card authorization request to the issuer server. In some implementations, the issuer server may parse, e.g., 2424, the card authorization request, and based on the request details may query a database, e.g., 2425, for data of the user's card account. In response, the database may provide the requested user data. On obtaining the user data, the issuer server may determine whether the user can pay for the transaction using funds available in the account, e.g., 2426. For example, the issuer server may determine whether the user has a sufficient balance remaining in the account, sufficient credit associated with the account, and/or the like, but comparing the data from the database with the transaction cost obtained from the card authorization request. If the issuer server determines that the user can pay for the transaction using the funds available in the account, the server may provide an authorization message, e.g., 2427, to the pay network server.

In some implementations, the pay network server may obtain the authorization message, and parse the message to extract authorization details. Upon determining that the user possesses sufficient funds for the transaction (e.g., 2430, option "Yes"), the pay network server may extract the transaction card from the authorization message and/or card authorization request, e.g., 2433, and generate a transaction data record using the card transaction details. The pay network server may provide the transaction data record for storage, e.g., 2434, to a database. In some implementations, the pay network server may forward the authorization message, e.g., 2435, to the acquirer server, which may in turn forward the authorization message, e.g., 2436, to the merchant server. The merchant may obtain the authorization message, and parse the authorization message o extract its contents, e.g., 2437. The merchant server may determine whether the user possesses sufficient funds in the card account to conduct the transaction. If the merchant server determines that the user possess sufficient funds, e.g., 2438, option "Yes," the merchant server may add the record of the transaction for the user to a batch of transaction data relating to authorized transactions, e.g., 2439-2440. The merchant server may also generate a purchase receipt, e.g., 2441, for the user. If the merchant server determines that the user does not possess sufficient funds, e.g., 2438, option "No," the merchant server may generate an "authorization fail" message, e.g., 2442. The merchant server may provide the purchase receipt or the "authorization fail" message to the client. The client may render and display, e.g., 2443, the purchase receipt for the user.

In some implementations, the merchant server may initiate clearance of a batch of authorized transactions by generating a batch data request, e.g., 2444, and providing the request to a database. In response to the batch data request, the database may provide the requested batch data, e.g., 2445, to the merchant server. The server may generate a batch clearance request, e.g., 2446, using the batch data obtained from the database, and provide the batch clearance request to an acquirer server. The acquirer server may generate, e.g., 2448, a batch payment request using the obtained batch clearance request, and provide the batch payment request to a pay network server. The pay network server may parse, e.g., 2449, the batch payment request, select a transaction stored within the batch data, e.g., 2450, and extract the transaction data for the transaction stored in the batch payment request, e.g., 2451. The pay network server may generate a transaction data record, e.g., 2452, and store the transaction data, e.g., 2453, the transaction in a database. For the extracted transaction, the pay network server may generate an issuer server query, e.g., 2454, for an address of an issuer server maintaining the account of the user requesting the transaction. The pay network server may provide the query to a database. In response, the database may provide the issuer server data requested by the pay network server, e.g., 2455. The pay network server may generate an individual payment request, e.g., 2456, for the transaction for which it has extracted transaction data, and provide the individual payment request to the issuer server using the issuer server data from the database.

In some implementations, the issuer server may obtain the individual payment request, and parse, e.g., 2457, the individual payment request to extract details of the request. Based on the extracted data, the issuer server may generate a payment command, e.g., 2458. For example, the issuer server may issue a command to deduct funds from the user's account (or add a charge to the user's credit card account). The issuer server may issue a payment command, e.g., 2459, to a database storing the user's account information. In response, the database may update a data record corresponding to the user's account to reflect the debit/charge made to the user's account. The issuer server may provide a funds transfer message, e.g., 2460, to the pay network server after the payment command has been executed by the database.

In some implementations, the pay network server may check whether there are additional transactions in the batch that need to be cleared and funded. If there are additional transactions, e.g., 2461, option "Yes," the pay network server may process each transaction according to the procedure described above. The pay network server may generate, e.g., 2462, an aggregated funds transfer message reflecting transfer of all transactions in the batch, and provide, e.g., 2463, the funds transfer message to the acquirer server. The acquirer server may, in response, transfer the funds specified in the funds transfer message to an account of the merchant, e.g., 2464.

Figure 25:
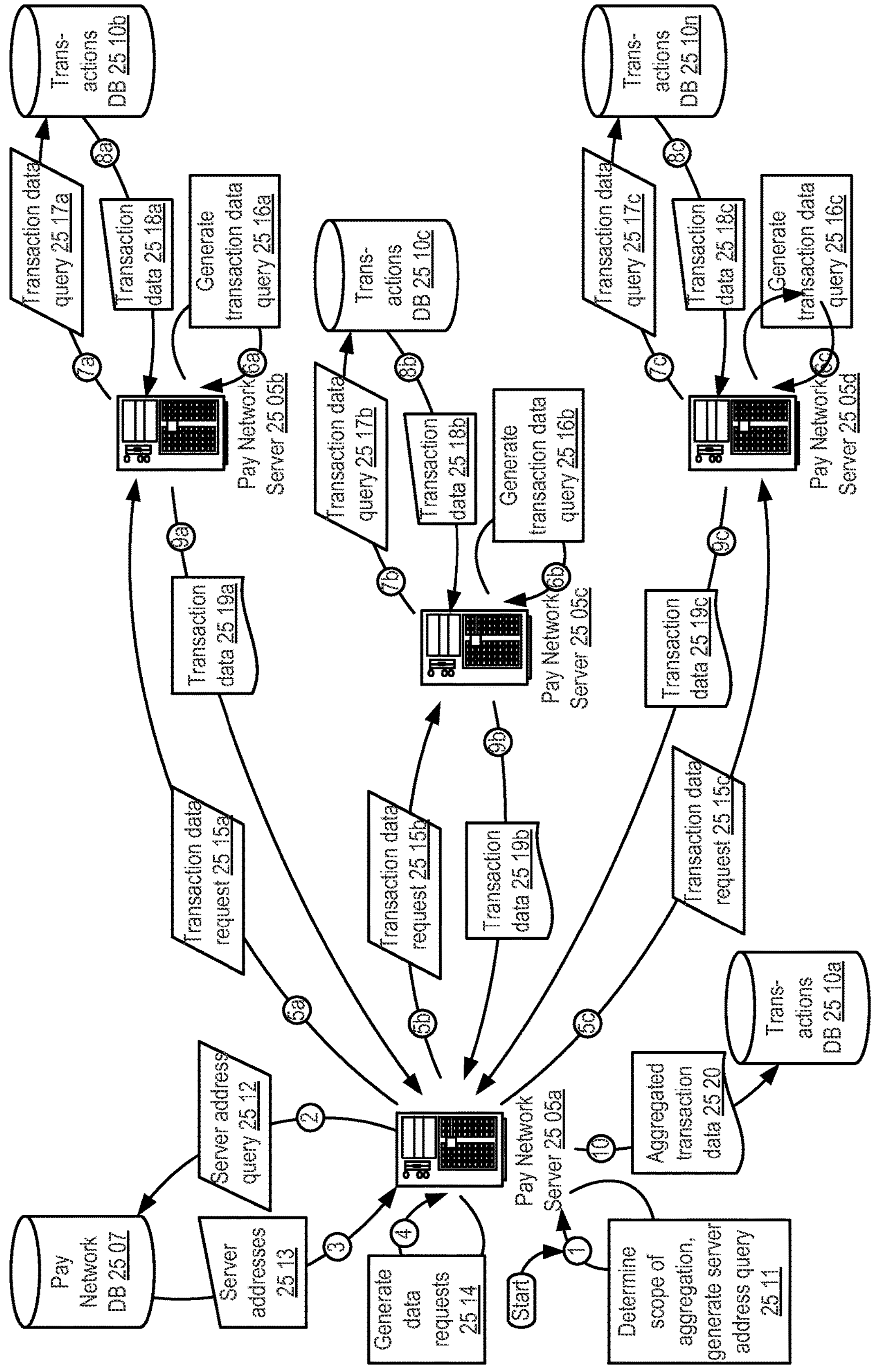
FIG. 25 shows a data flow diagram illustrating an example procedure to aggregate card-based transaction data in some embodiments of the MCB-Platform.

FIG. 25 shows a data flow diagram illustrating an example procedure to aggregate card-based transaction data in some embodiments of the MCB-Platform. In some implementations, the pay network server may determine a scope of data aggregation required to perform the analysis, e.g., 2511. The pay network server may initiate data aggregation based on the determined scope. The pay network server may generate a query for addresses of server storing transaction data within the determined scope. The pay network server may query, e.g., 2512, a pay network database, e.g., 2507*a*, for addresses of pay network servers that may have stored transaction data within the determined scope of the data aggregation. For example, the pay network server may utilize PHP/SQL commands similar to the examples provided above. The database may provide, e.g., 2513, a list of server addresses in response to the pay network server's query. Based on the list of server addresses, the pay network server may generate transaction data requests, e.g., 2514. The pay network server may issue the generated transaction data requests, e.g., 2515*a-c*, to the other pay network servers, e.g., 2505*b-d*. The other pay network servers may query, e.g., 2517*a-c*, their pay network database, e.g., 2507*a-d*, for transaction data falling within the scope of the transaction data requests. In response to the transaction data queries, the pay network databases may provide transaction data, e.g., 2518*a-c*, to the other pay network servers. The other pay network servers may return the transaction data obtained from the pay network databases, e.g., 2519*a-c*, to the pay network server making the transaction data requests, e.g., 2505*a*. The pay network server, e.g., 2505*a*, may store the aggregated transaction data, e.g., 2520, in an aggregated transactions database, e.g., 2510*a*.

Figure 26:
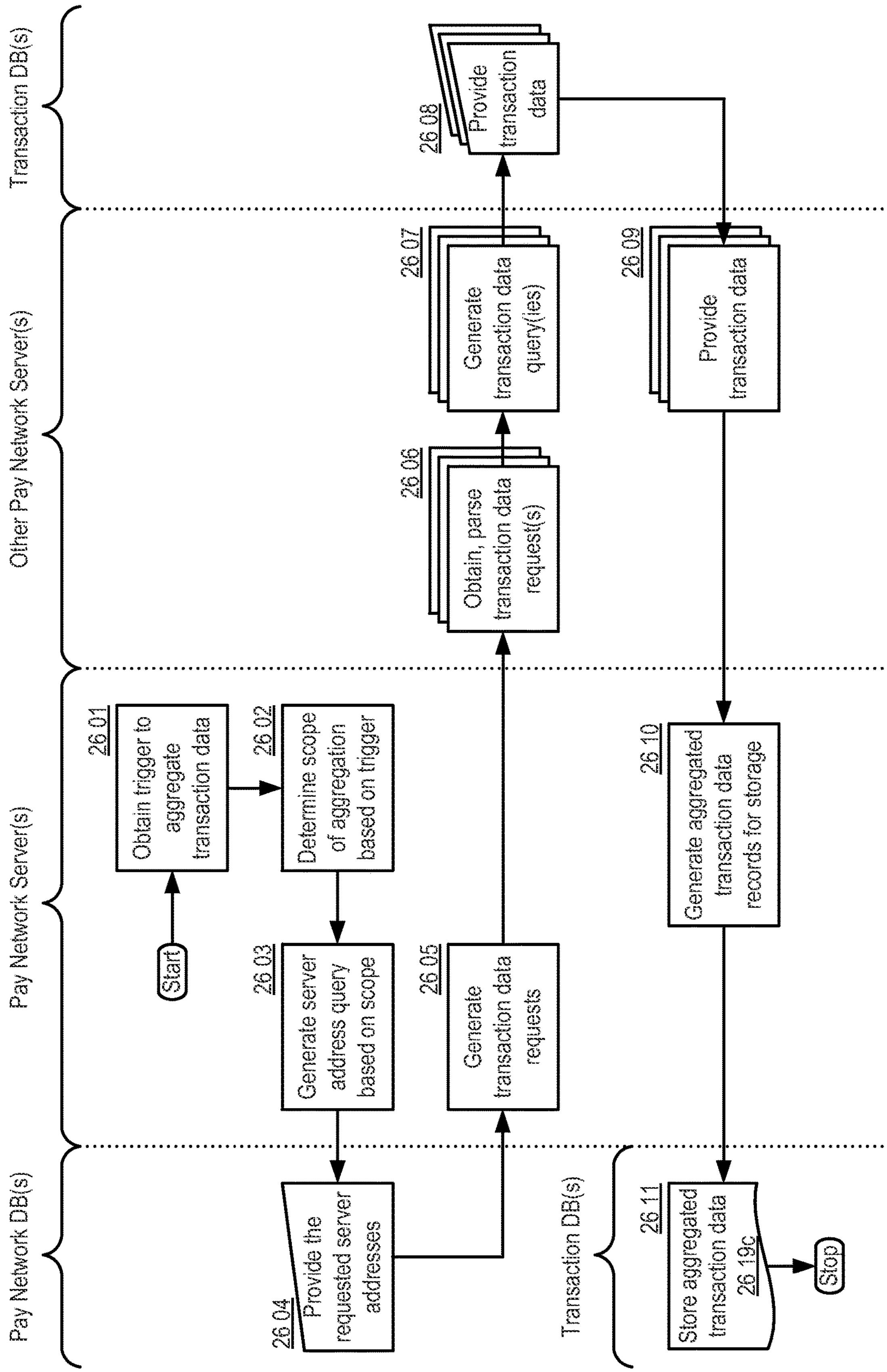
FIG. 26 shows a logic flow diagram illustrating example aspects of aggregating card-based transaction data in some embodiments of the MCB-Platform, e.g., a Transaction Data Aggregation ("TDA") component 900.

FIG. 26 shows a logic flow diagram illustrating example aspects of aggregating card-based transaction data in some embodiments of the MCB-Platform, e.g., a Transaction Data Aggregation ("TDA") component 2600. In some implementations, a pay network server may obtain a trigger to aggregate transaction data, e.g., 2601. For example, the server may be configured to initiate transaction data aggregation on a regular, periodic, basis (e.g., hourly, daily, weekly, monthly, quarterly, semi-annually, annually, etc.). As another example, the server may be configured to initiate transaction data aggregation on obtaining information that the U.S. Government (e.g., Department of Commerce, Office of Management and Budget, etc) has released new statistical data related to the U.S. business economy. As another example, the server may be configured to initiate transaction data aggregation on-demand, upon obtaining a user investment strategy analysis request for processing. The pay network server may determine a scope of data aggregation required to perform the analysis, e.g., 2602. For example, the scope of data aggregation may be pre-determined. As another example, the scope of data aggregation may be determined based on a received user investment strategy analysis request. The pay network server may initiate data aggregation based on the determined scope. The pay network server may generate a query for addresses of server storing transaction data within the determined scope, e.g., 2603. The pay network server may query a database for addresses of pay network servers that may have stored transaction data within the determined scope of the data aggregation. The database may provide, e.g., 2604, a list of server addresses in response to the pay network server's query. Based on the list of server addresses, the pay network server may generate transaction data requests, e.g., 2605. The pay network server may issue the generated transaction data requests to the other pay network servers. The other pay network servers may obtain and parse the transaction data requests, e.g., 2606. Based on parsing the data requests, the other pay network servers may generate transaction data queries, e.g., 2607, and provide the transaction data queries to their pay network databases. In response to the transaction data queries, the pay network databases may provide transaction data, e.g., 2608, to the other pay network servers. The other pay network servers may return, e.g., 2609, the transaction data obtained from the pay network databases to the pay network server making the transaction data requests. The pay network server may generate aggregated transaction data records from the transaction data received from the other pay network servers, e.g., 2610, and store the aggregated transaction data in a database, e.g., 2611.

Figure 27:
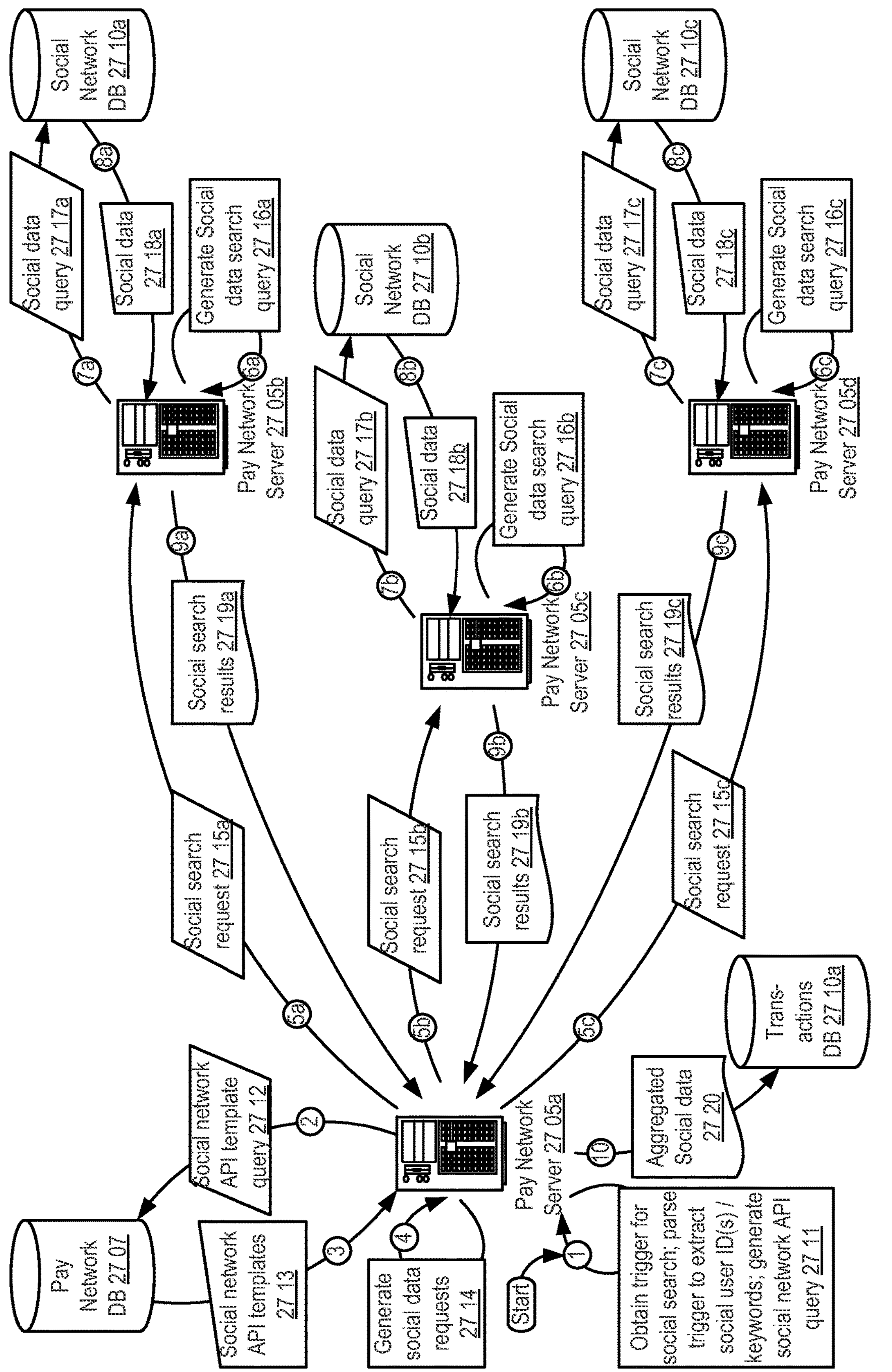
FIG. 27 shows a data flow diagram illustrating an example social data aggregation procedure in some embodiments of the MCB-Platform.

FIG. 27 shows a data flow diagram illustrating an example social data aggregation procedure in some embodiments of the MCB-Platform. In some implementations, the pay network server may obtain a trigger to perform a social data search. For example, the pay network server may periodically perform an update of its aggregated social database, e.g., 2710, with new information available from a variety of sources, such as the social networking services operating on the Internet. As another example, a request for on-demand social data update may be obtained as a result of a user wishing to enroll in a service, for which the pay network server may facilitate data entry by providing an automated web form filling system using information about the user obtained from the social data update. In some implementations, the pay network server may parse the trigger to extract keywords using which to perform an aggregated social data update. The pay network server may generate a query for application programming interface (API) templates for various social networking services (e.g., Facebook®, Twitter™, etc.) from which to collect social data for aggregation. The pay network server may query, e.g., 2712, a pay network database, e.g., 2707, for social network API templates for the social networking services. For example, the pay network server may utilize PHP/SQL commands similar to the examples provided above. The database may provide, e.g., 2713, a list of API templates in response. Based on the list of API templates, the pay network server may generate social data requests, e.g., 2714. The pay network server may issue the generated social data requests, e.g., 2715*a-c*, to the social network servers, e.g., 2701*a-c*. For example, the pay network server may issue PHP commands to request the social network servers for social data. An example listing of commands to issue social data requests 2715*a-c*, substantially in the form of PHP commands, is provided below:

```
<?PHP
header('Content-Type: text/plain');
// Obtain user ID(s) of friends of the logged-in user
$friends = json_decode(file_get_contents('https://graph.facebook.com/me/friends?access
token='$cookie['oauth_access_token']), true);
$friend_ids = array_keys($friends);
// Obtain message feed associated with the profile of the logged-in user
$feed =
json_decode(file_get_contents('https:llgraph.facebook.com/me/feed?access_token='$cookie['oauth_access
_token']), true);
```

-continued

```
// Obtain messages by the user's friends
$result = mysql_query('SELECT * FROM content WHERE uid IN (' .implode($friend_ids, ',') . ')');
$friend_content = array( );
while ($row = mysql_fetch_assoc($result))
$friend_content [ ] $row;
?>
```

In some embodiments, the social network servers may query, e.g., 2717*a-c*, their databases, e.g., 2702*a-c*, for social data results falling within the scope of the social keywords. In response to the queries, the databases may provide social data, e.g., 2718*a-c*, to the search engine servers. The social network servers may return the social data obtained from the databases, e.g., 2719*a-c*, to the pay network server making the social data requests. An example listing of social data 2719*a-c*, substantially in the form of JavaScript Object Notation (JSON)-formatted data, is provided below:

```
[ "data":  [
        {        "name": "Tabatha Orloff",
                 "id": "483722"},
        {        "name": "Darren Kinnaman",
                 "id": "86S743"},
        {        "name": "Sharron Jutras",
                 "id": "O91274"}
]}
```

In some embodiments, the pay network server may store the aggregated search results, e.g., 2720, in an aggregated search database, e.g., 2710.

Figure 28:
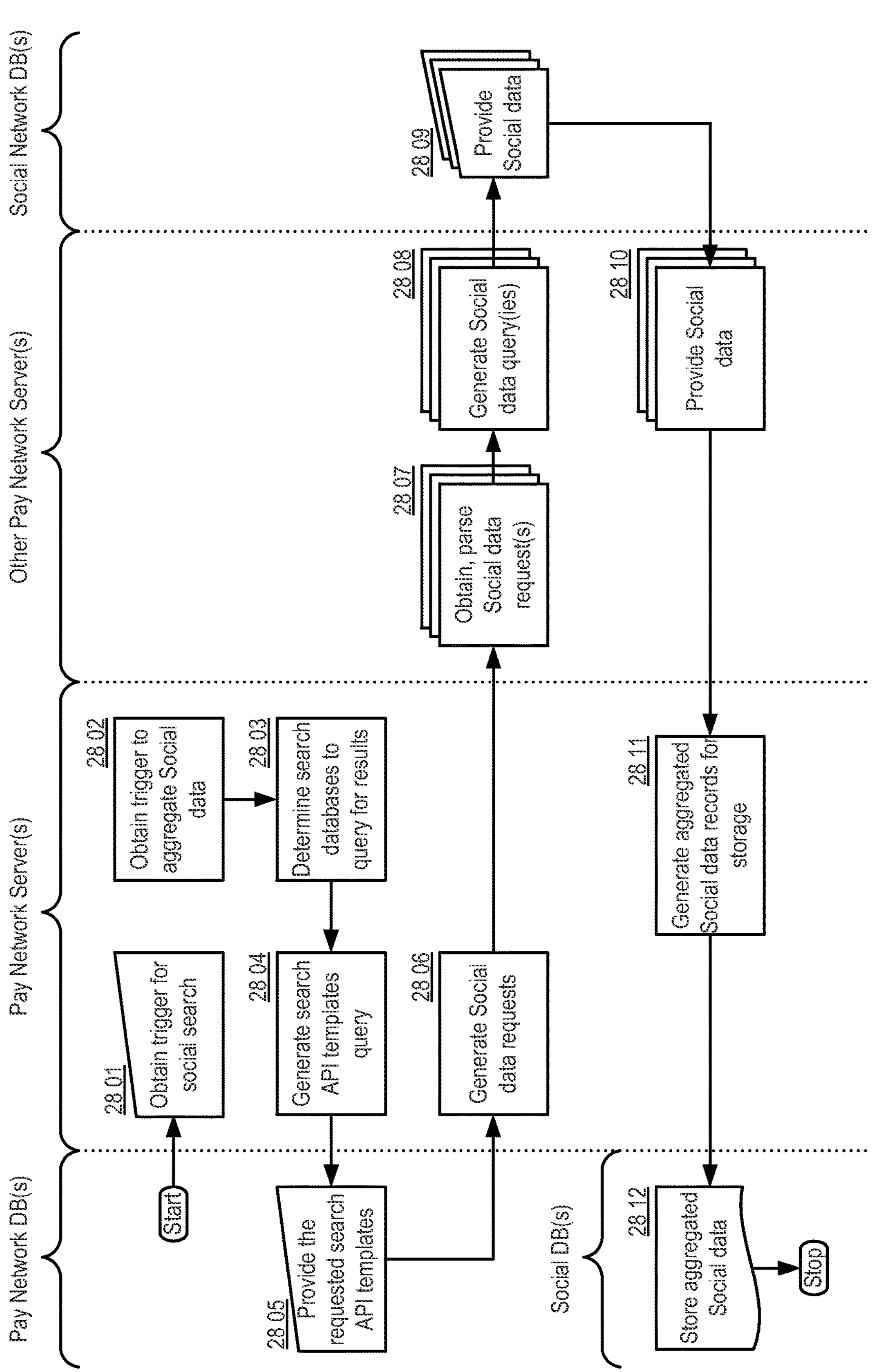
FIG. 28 shows a logic flow diagram illustrating example aspects of aggregating social data in some embodiments of the MCB-Platform, e.g., a Social Data Aggregation ("SDA") component 1100.

FIG. 28 shows a logic flow diagram illustrating example aspects of aggregating social data in some embodiments of the MCB-Platform, e.g., a Social Data Aggregation ("SDA") component 2800. In some implementations, the pay network server may obtain a trigger to perform a social search, e.g., 2801. For example, the pay network server may periodically perform an update of its aggregated social database with new information available from a variety of sources, such as the Internet. As another example, a request for on-demand social data update may be obtained as a result of a user wishing to enroll in a service, for which the pay network server may facilitate data entry by providing an automated web form filling system using information about the user obtained from the social data update. In some implementations, the pay network server may parse the trigger, e.g., 2802, to extract keywords and/or user ID(s) using which to perform an aggregated search for social data. The pay network server may determine the social networking services to search, e.g., 2803, using the extracted keywords and/or user ID(s). Then, the pay network server may generate a query for application programming interface (API) templates for the various social networking services (e.g., Facebook®, Twitter™, etc.) from which to collect social data for aggregation, e.g., 2804. The pay network server may query, e.g., 2805, a pay network database for search API templates for the social networking services. For example, the pay network server may utilize PHP/SQL commands similar to the examples provided above. The database may provide, e.g., 2805, a list of API templates in response. Based on the list of API templates, the pay network server may generate social data requests, e.g., 2806. The pay network server may issue the generated social data requests to the social networking services. The social network servers may parse the obtained search results(s), e.g., 2807, and query, e.g., 2808, their databases for social data falling within the scope of the search keywords. In response to the social data queries, the databases may provide social data, e.g., 2809, to the social networking servers. The social networking servers may return the social data obtained from the databases, e.g., 2810, to the pay network server making the social data requests. The pay network server may generate, e.g., 2811, and store the aggregated social data, e.g., 2812, in an aggregated social database.

Figure 29:
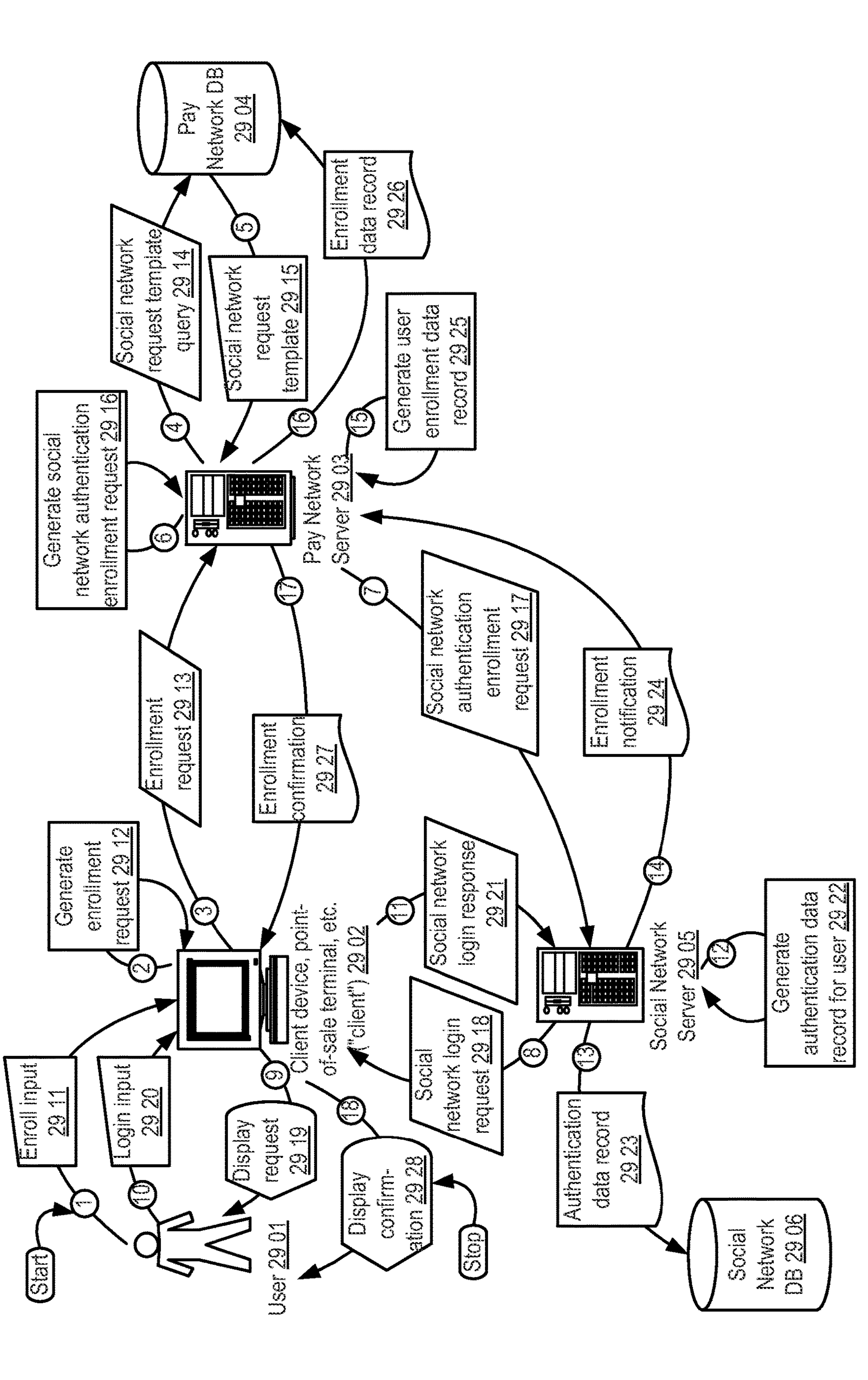
FIG. 29 shows a data flow diagram illustrating an example procedure for enrollment in value-add services in some embodiments of the MCB-Platform.

FIG. 29 shows a data flow diagram illustrating an example procedure for enrollment in value-add services in some embodiments of the MCB-Platform. In some implementations, a user, e.g., 2901, may desire to enroll in a value-added service. Let us consider an example wherein the user desires to enroll in social network authenticated purchase payment as a value-added service. It is to be understood that any other value-added service may take the place of the below-described value-added service. The user may communicate with a pay network server, e.g., 2903, via a client such as, but not limited to: a personal computer, mobile device, television, point-of-sale terminal, kiosk, ATM, and/or the like (e.g., 2902). For example, the user may provide user input, e.g., enroll input 2911, into the client indicating the user's desire to enroll in social network authenticated purchase payment. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. For example, the user may swipe a payment card at the client 2902. In some implementations, the client may obtain track 1 data from the user's card as enroll input 2911 (e.g., credit card, debit card, prepaid card, charge card, etc.), such as the example track 1 data provided below:

```
%B123456789012345^PUBLIC/J.Q.^99011200000000000000**901******?*
```

(wherein '123456789012345' is the card number of 'J.Q. Public' and has a CVV number of 901. '990112' is a service code, and *** represents decimal digits which change randomly each time the card is used.)

In some implementations, using the user's input, the client may generate an enrollment request, e.g., 2912, and provide the enrollment request, e.g., 2913, to the pay network server. For example, the client may provide a (Secure) Hypertext Transfer Protocol ("HTTP(S)") POST message including data formatted according to the eXtensible Markup Language ("XML"). Below is an example HTTP(S) POST message including an XML-formatted enrollment request for the pay network server:

```
POST /enroll.php HTTP/1.1
Host: www.merchant.com
Content-Type: Application/XML
Content-Length: 718
<?XML version = "1.0" encoding = "UTF-8"?>
<enrollment_request>
    <cart_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <!--account_params> <optional>
        <account_name>John Q. Public</account_name>
        <account_type>credit</account_type>
        <account_num>123456789012345</account_num>
        <billing_address>123 Green St., Norman, OK
        98765</billing_address>
        <phone>123-456-7809</phone>
        <sign>/jqp/</sign>
        <confirm_type>email</confirm_type>
        <contact_info>john.q.public@gmail.com</contact_info>
    </account_params-->
```

-continued

```
    <checkout_purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </checkout_purchase_details>
</enrollment_request>
```

In some implementations, the pay network server may obtain the enrollment request from the client, and extract the user's payment detail (e.g., XML data) from the enrollment request. For example, the pay network server may utilize a parser such as the example parsers described below in the discussion with reference to FIG. 51. In some implementations, the pay network server may query, e.g., 2914, a pay network database, e.g., 2904, to obtain a social network request template, e.g., 2915, to process the enrollment request. The social network request template may include instructions, data, login URL, login API call template and/or the like for facilitating social network authentication. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, e.g., 2914-2915, is provided below:

```
<?PHP
header('Content-Type: text/plain');
mysql_connect("254.93.179.112",$DBserver,$password); // access
database server
mysql_select_db("SOCIALAUTH.SQL"); // select database table to
search
//create query
$query = "SELECT template FROM EnrollTable WHERE network LIKE
'%' $socialnet";
$result = mysql_query($query); // perform the search query
mysql_close("SOCIALAUTH.SQL"); // close database access
?>
```

In some implementations, the pay network server may redirect the client to a social network server by providing a HTTP(S) REDIRECT 300 message, similar to the example below:

```
HTTP/1.1 300 Multiple Choices
Location: https://www.facebook.com/dialog/oauth?client_id=snpa_app_ID&redirect_uri=
www.paynetwork.com/enroll.php
<html>
    <head><title>300 Multiple Choices</title></head>
    <body><h1>Multiple Choices</h1></body>
</html>
```

In some implementations, the pay network server may provide payment information extracted from the card authorization request to the social network server as part of a social network authentication enrollment request, e.g., 2917. For example, the pay network server may provide a HTTP(S) POST message to the social network server, similar to the example below:

```
POST /authenticate_enroll.php HTTP/1.1
Host: www.socialnet.com
Content-Type: Application/XML
Content-Length: 1306
<?XML version = "1.0" encoding = "UTF-8"?>
<authenticate_enrollment_request>
    <request_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <account_params>
        <account_name>John Q. Public</account_name>
        <account_type>credit</account_type>
        <account_num>123456789012345</account_num>
        <billing_address>123 Green St., Norman, OK
        98765</billing_address>
        <phone>123-456-7809</phone>
        <sign>/jqp/</sign>
        <confirm_type>email</confirm_type>
```

-continued

```
        <contact_info>john.q.public@gmail.com</contact_info>
    </account_params>
</authenticate_enrollment_request>
```

In some implementations, the social network server may provide a social network login request, e.g., 2918, to the client. For example, the social network server may provide a HTML input form to the client. The client may display, e.g., 2919, the login form for the user. In some implementations, the user may provide login input into the client, e.g., 2920, and the client may generate a social network login response, e.g., 2921, for the social network server. In some implementations, the social network server may authenticate the login credentials of the user, and access payment account information of the user stored within the social network, e.g., in a social network database. Upon authentication, the social network server may generate an authentication data record for the user, e.g., 2922, and provide an enrollment notification, e.g., 2924, to the pay network server. For example, the social network server may provide a HTTP(S) POST message similar to the example below:

```
POST /enrollnotification.php HTTP/1.1
Host: www.paynet.com
Content-Type: Application/XML
Content-Length: 1306
<?XML version = "1.0" encoding = "UTF-8"?>
<enroll_notification>
    <request_ID>4NFU4RG94</order_ID>
    <timestamp>2011-02-22 15:22:43</timestamp>
    <result>enrolled</result>
</enroll_notification>
```

Upon receiving notification of enrollment from the social network server, the pay network server may generate, e.g., 2925, a user enrollment data record, and store the enrollment data record in a pay network database, e.g., 2926, to complete enrollment. In some implementations, the enrollment data record may include the information from the enrollment notification 2924.

Figure 30:
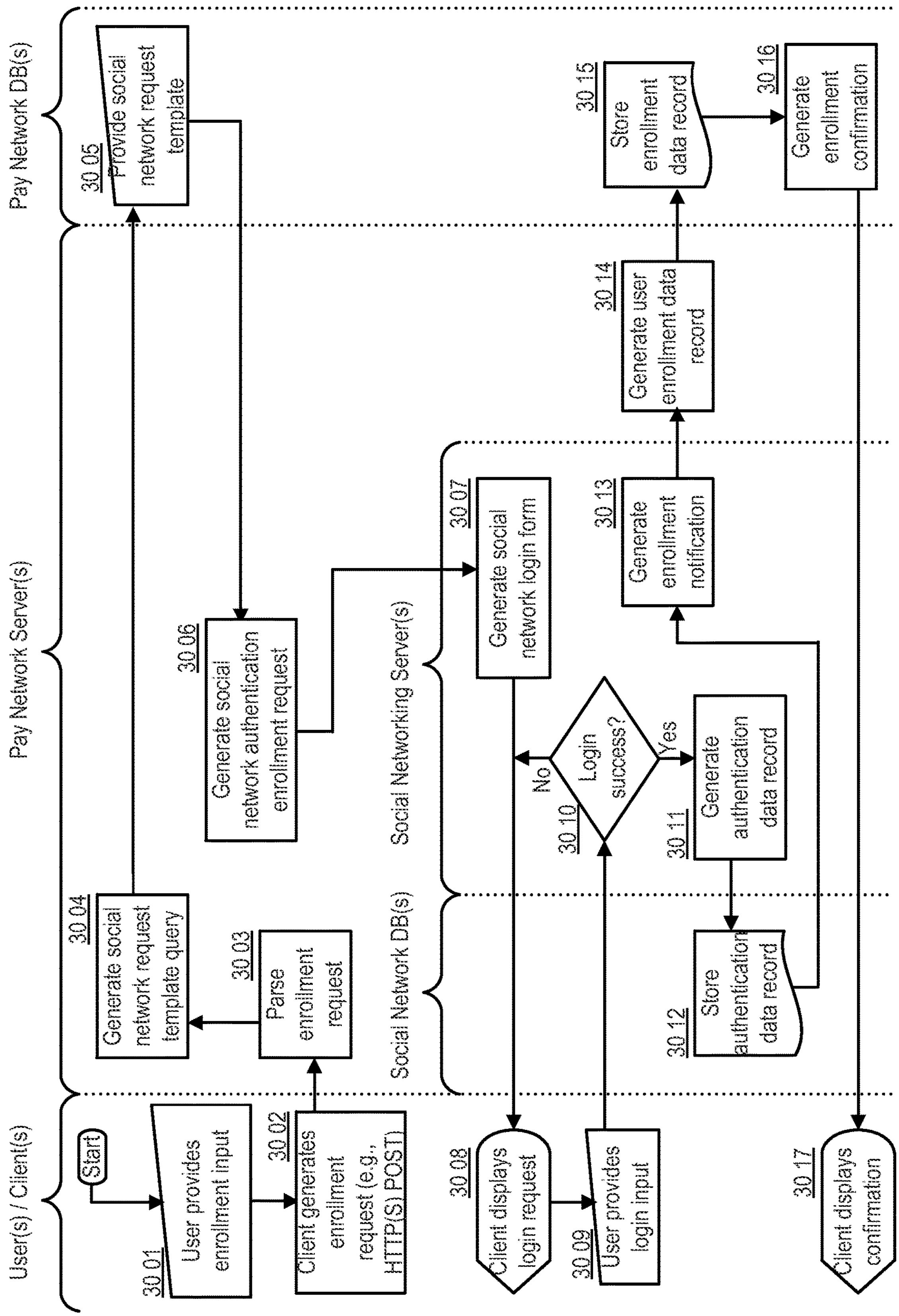
FIG. 30 shows a logic flow diagram illustrating example aspects of social network payment authentication enrollment in some embodiments of the MCB-Platform, e.g., a Value-Add Service Enrollment ("VASE") component 1300.

FIG. 30 shows a logic flow diagram illustrating example aspects of enrollment in a value-added service in some embodiments of the MCB-Platform, e.g., a Value-Add Service Enrollment ("VASE") component 3000. In some implementations, a user, e.g., 2901, may desire to enroll in a value-added service. Let us consider an example wherein the user desires to enroll in social network authenticated purchase payment as a value-added service. It is to be understood that any other value-added service may take the place of the below-described value-added service. The user may communicate with a pay network server via a client. For example, the user may provide user input, e.g., 3001, into the client indicating the user's desire to enroll in social network authenticated purchase payment. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some implementations, using the user's input, the client may generate an enrollment request, e.g., 3002, and provide the enrollment request to the pay network server. In some implementations, the SNPA may provide an enrollment button that may take the user to an enrollment webpage where account info may be entered into web form fields. In some implementations, the pay network server may obtain the enrollment request from the client, and extract the user's payment detail from the enrollment request. For example, the pay network server may utilize a parser such as the example parsers described below in the discussion with reference to FIG. 51. In some implementations, the pay network server may query, e.g., 3004, a pay network database to obtain a social network request template, e.g., 3005, to process the enrollment request. The social network request template may include instructions, data, login URL, login API call template and/or the like for facilitating social network authentication. In some implementations, the pay network server may provide payment information extracted from the card authorization request to the social network server as part of a social network authentication enrollment request, e.g., 3006. In some implementations, the social network server may provide a social network login request, e.g., 3007, to the client. For example, the social network server may provide a HTML input form to the client. The client may display, e.g., 3008, the login form for the user. In some implementations, the user may provide login input into the client, e.g., 3009, and the client may generate a social network login response for the social network server. In some implementations, the social network server may authenticate the login credentials of the user, and access payment account information of the user stored within the social network, e.g., in a social network database. Upon authentication, the social network server may generate an authentication data record for the user, e.g., 3011, and provide an enrollment notification to the pay network server, e.g., 3013. Upon receiving notification of enrollment from the social network server, the pay network server may generate, e.g., 3014, a user enrollment data record, and store the enrollment data record in a pay network database, e.g., 3015, to complete enrollment. The pay network server may provide an enrollment confirmation, and provide the enrollment confirmation to the client, which may display, e.g., 3017, the confirmation for the user.

Figure 31A:
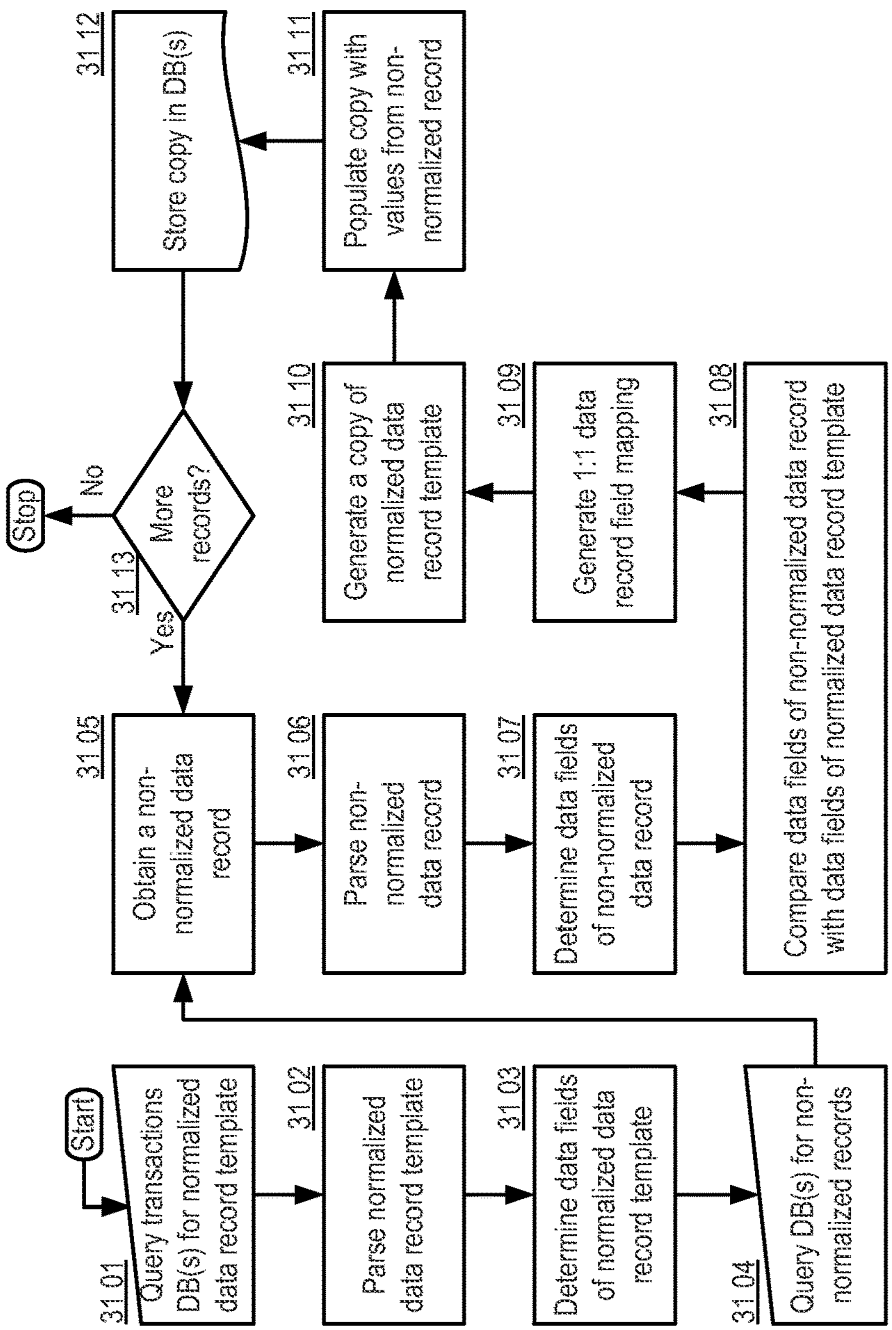
FIGS. 31A-B show flow diagrams illustrating example aspects of normalizing aggregated search, enrolled, service usage, transaction and/or other aggregated data into a standardized data format in some embodiments of the MCB-Platform, e.g., a Aggregated Data Record Normalization ("ADRN") component 1400.
Figure 31B:
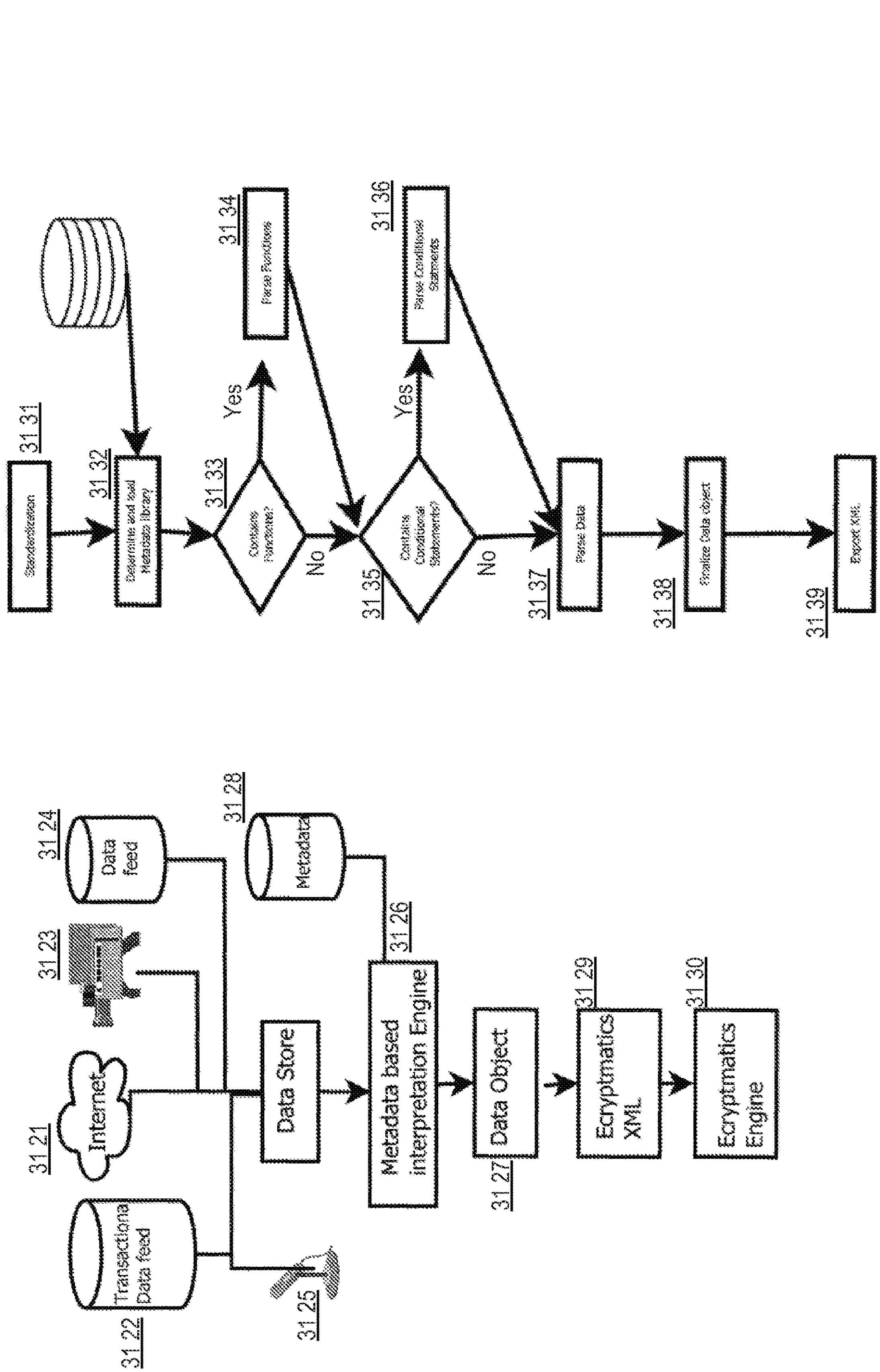

FIGS. 31A-B show flow diagrams illustrating example aspects of normalizing aggregated search, enrolled, service usage, transaction and/or other aggregated data into a standardized data format in some embodiments of the MCB-Platform, e.g., a Aggregated Data Record Normalization ("ADRN") component 3100. With reference to FIG. 31A, in some implementations, a pay network server ("server") may attempt to convert any aggregated data records stored in an aggregated records database it has access to in a normalized data format. For example, the database may have a transaction data record template with predetermined, standard fields that may store data in pre-defined formats (e.g., long integer/double float/4 digits of precision, etc.) in a predetermined data structure. A sample XML transaction data record template is provided below:

```
<?XML version = "1.0" encoding = "UTF-8"?>
<transaction_record>
    <record_ID>00000000</record_ID>
    <norm_flag>false</norm_flag>
    <timestamp>yyyy-mm-dd hh:mm:ss</timestamp>
```

-continued

```
    <transaction_cost>$0,000,000,00</transaction_cost>
      <merchant_params>
          <merchant_id>00000000</merchant_id>
          <merchant_name>TBD</merchant_name>
          <merchant_auth_key>0000000000000000</merchant_auth_key>
      </merchant_params>
      <merchant_products>
          <num_products>000</num_products>
          <product>
              <product_type>TBD</product_type>
              <product_name>TBD</product_name>
              <class_labels_list>TBD<class_labels_list>
              <product_quantity>000</product_quantity>
              <unit_value>$0,000,000.00</unit_value>
              <sub_total>$0,000,000.00</sub_total>
              <comment>normalized transaction data record
              template</comment>
          </product>
      </merchant_products>
      <user_account_params>
          <account_name>JTBD</account_name>
          <account_type>TBD</account_type>
          <account_num>0000000000000000</account_num>
          <billing_line1>TBD</billing_line1>
          <billing_line2>TBD</billing_line2>
          <zipcode>TBD</zipcode>
          <state>TBD</state>
          <country>TBD</country>
          <phone>00-00-000-000-0000</phone>
          <sign>TBD</sign>
      </user_account_params>
</transaction_record>
```

In some implementations, the server may query a database for a normalized data record template, e.g., 3101. The server may parse the normalized data record template, e.g., 3102. Based on parsing the normalized data record template, the server may determine the data fields included in the normalized data record template, and the format of the data stored in the fields of the data record template, e.g., 3103. The server may obtain transaction data records for normalization. The server may query a database, e.g., 3104, for non-normalized records. For example, the server may issue PHP/SQL commands to retrieve records that do not have the 'norm_flag' field from the example template above, or those where the value of the 'norm_flag' field is 'false'. Upon obtaining the non-normalized transaction data records, the server may select one of the non-normalized transaction data records, e.g., 3105. The server may parse the non-normalized transaction data record, e.g., 3106, and determine the fields present in the non-normalized transaction data record, e.g., 3107. For example, the server may utilize a procedure similar to one described below with reference to FIG. 32. The server may compare the fields from the non-normalized transaction data record with the fields extracted from the normalized transaction data record template. For example, the server may determine whether the field identifiers of fields in the non-normalized transaction data record match those of the normalized transaction data record template, (e.g., via a dictionary, thesaurus, etc.), are identical, are synonymous, are related, and/or the like. Based on the comparison, the server may generate a 1:1 mapping between fields of the non-normalized transaction data record match those of the normalized transaction data record template, e.g., 3109. The server may generate a copy of the normalized transaction data record template, e.g., 3110, and populate the fields of the template using values from the non-normalized transaction data record, e.g., 3111. The server may also change the value of the 'norm_flag' field to 'true' in the example above. The server may store the populated record in a database (for example, replacing the original version), e.g., 3112. The server may repeat the above procedure for each non-normalized transaction data record (see e.g., 3113), until all the non-normalized transaction data records have been normalized.

With reference to FIG. 31B, in some embodiments, the server may utilize metadata (e.g., easily configurable data) to drive an analytics and rule engine that may convert any structured data into a standardized XML format ("encryptmatics" XML). The encryptmatics XML may then be processed by an encryptmatics engine that is capable of parsing, transforming and analyzing data to generate decisions based on the results of the analysis. Accordingly, in some embodiments, the server may implement a metadata-based interpretation engine that parses structured data, including, but not limited to: web content (see e.g., 3121), graph databases (see e.g., 3122), micro blogs, images or software code (see e.g., 3124), and converts the structured data into commands in the encryptmatics XML file format. For example, the structured data may include, without limitation, software code, images, free text, relational database queries, graph queries, sensory inputs (see e.g., 3123, 3125), and/or the like. A metadata based interpretation engine engine, e.g., 3126, may populate a data/command object, e.g., 3127, based on a given record using configurable metadata, e.g., 3128. The configurable metadata may define an action for a given glyph or keyword contained within a data record. The engine may then process the object to export its data structure as a collection of encryptmatics vaults in a standard encryptmatics XML file format, e.g., 3129. The encryptmatics XML file may then be processed to provide various features by an encryptmatics engine, e.g., 3130.

In some embodiments, the server may obtain the structured data, and perform a standardization routine using the structured data as input (e.g., including script commands, for illustration). For example, the server may remove extra line breaks, spaces, tab spaces, etc. from the structured data, e.g.

3131. The server may determine and load a metadata library, e.g., 3132, using which the server may parse subroutines or functions within the script, based on the metadata, e.g., 3133-3134. In some embodiments, the server may pre-parse conditional statements based on the metadata, e.g., 3135-3136. The server may also parse data 3137 to populate a data/command object based on the metadata and prior parsing, e.g., 3138. Upon finalizing the data/command object, the server may export 3139 the data/command object as XML in standardized encryptmatics format.

Figure 32:
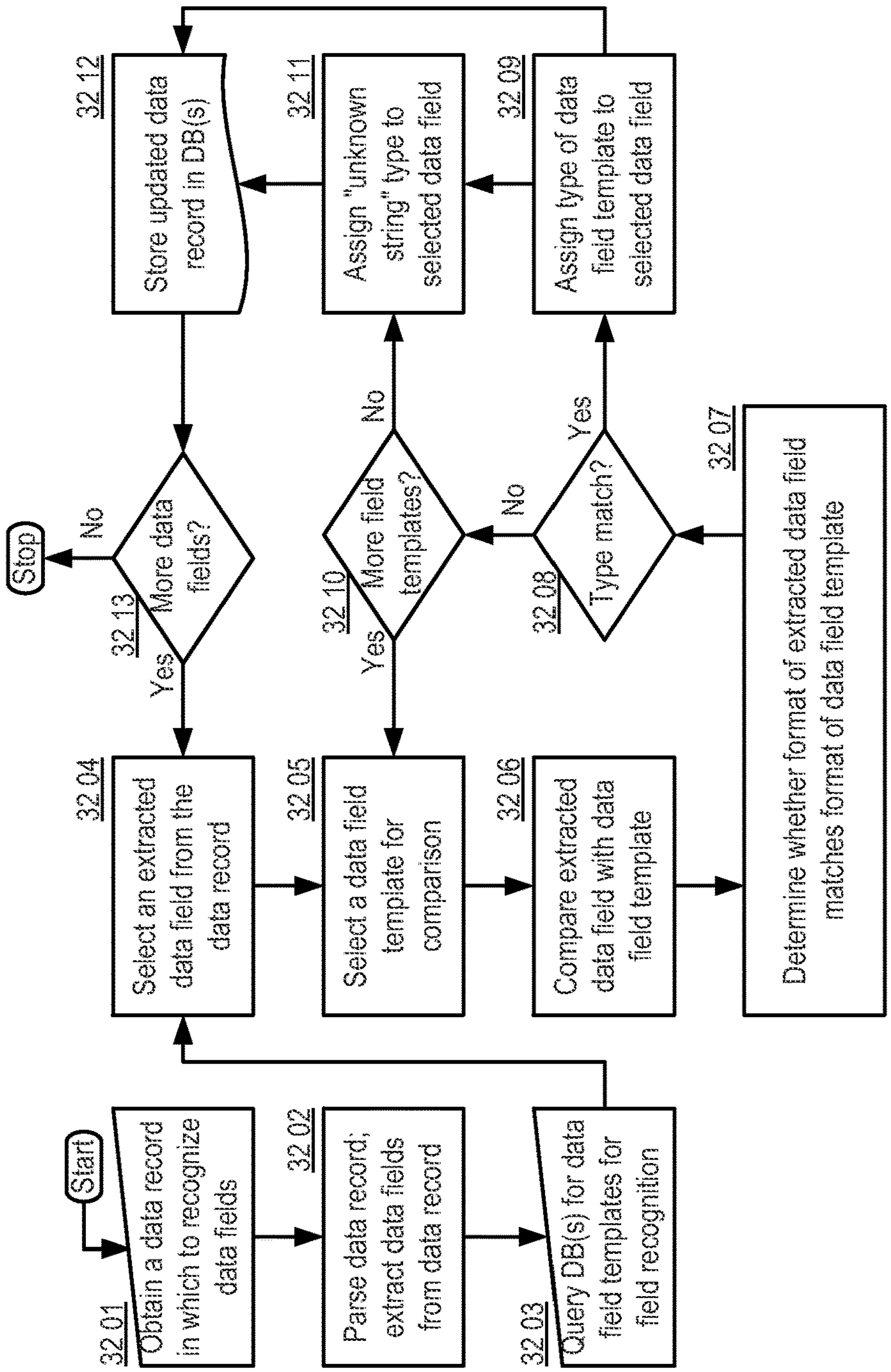
FIG. 32 shows a logic flow diagram illustrating example aspects of recognizing data fields in normalized aggregated data records in some embodiments of the MCB-Platform, e.g., a Data Field Recognition ("DFR") component 1500.

FIG. 32 shows a logic flow diagram illustrating example aspects of recognizing data fields in normalized aggregated data records in some embodiments of the MCB-Platform, e.g., a Data Field Recognition ("DFR") component 3200. In some implementations, a server may recognize the type of data fields included in a data record, e.g, date, address, zipcode, name, user ID, email address, payment account number (PAN), CVV2 numbers, and/or the like. The server may select an unprocessed data record for processing, e.g., 3201. The server may parse the data record rule, and extract data fields from the data record, e.g., 3202. The server may query a database for data field templates, e.g., 3203. For example, the server may compare the format of the fields from the data record to the data record templates to identify a match between one of the data field templates and each field within the data record, thus identifying the type of each field within the data record. The server may thus select an extracted data field from the data record, e.g., 3204. The server may select a data field template for comparison with the selected data field, e.g., 3205, and compare the data field template with the selected data field, e.g., 3206, to determine whether format of extracted data field matches format of data field template, e.g., 3207. If the format of the selected extracted data field matches the format of the data field template, e.g., 3208, option "Yes," the server may assign the type of data field template to the selected data field, e.g., 3209. If the format of the extracted data field does not match the format of the data field template, e.g., 3208, option "No," the server may try another data field template until no more data field templates are available for comparison, see e.g., 3210. If no match is found, the server may assign "unknown" string as the type of the data field, e.g., 3211. The server may store the updated data record in the database, e.g., 3212. The server may perform such data field recognition for each data field in the data record (and also for each data record in the database), see e.g., 3213.

Figure 33:
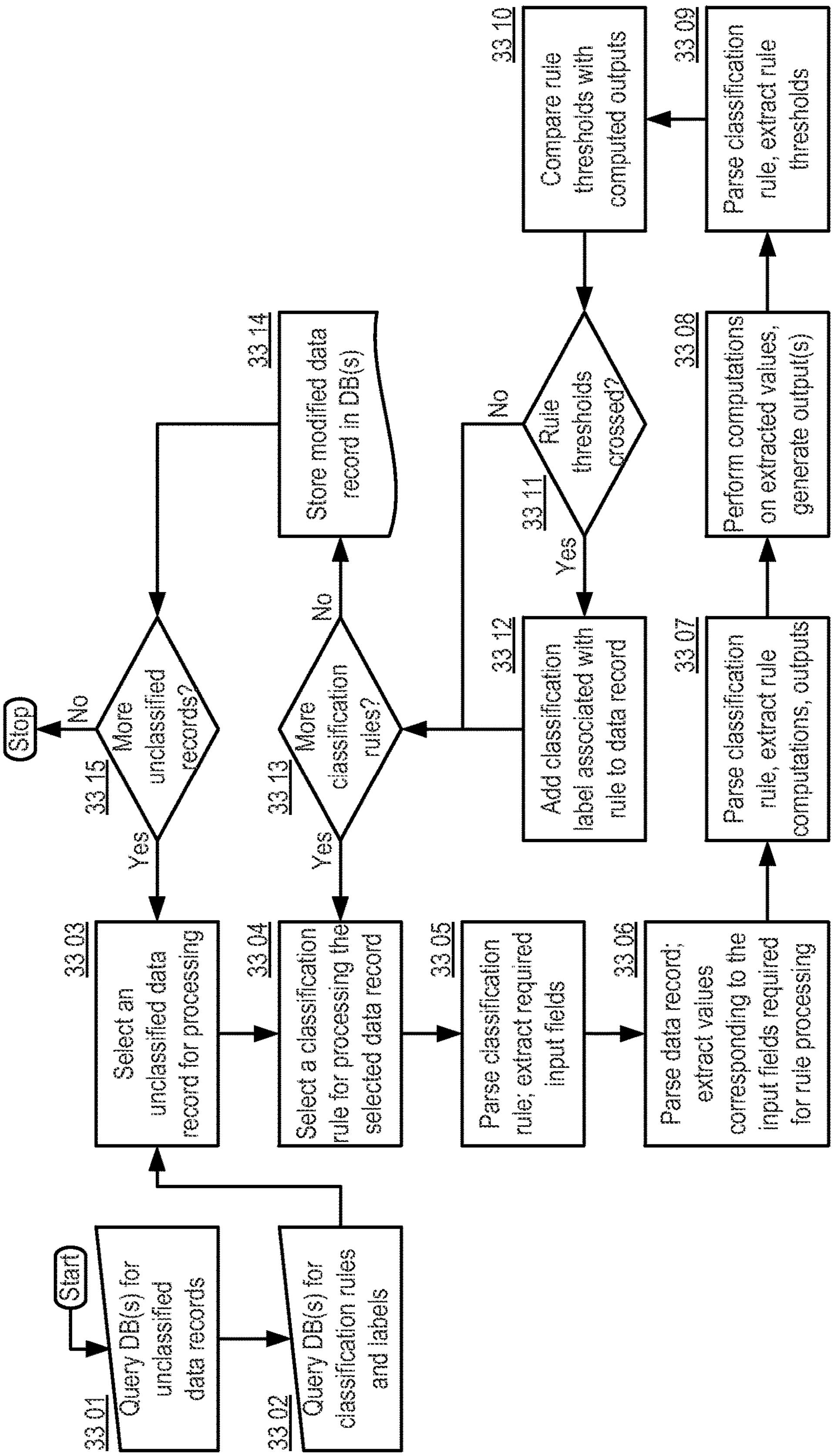
FIG. 33 shows a logic flow diagram illustrating example aspects of classifying entity types in some embodiments of the MCB-Platform, e.g., an Entity Type Classification ("ETC") component 1600.

FIG. 33 shows a logic flow diagram illustrating example aspects of classifying entity types in some embodiments of the MCB-Platform, e.g., an Entity Type Classification ("ETC") component 3300. In some implementations, a server may apply one or more classification labels to each of the data records. For example, the server may classify the data records according to entity type, according to criteria such as, but not limited to: geo-political area, number of items purchased, and/or the like. The server may obtain transactions from a database that are unclassified, e.g., 3301, and obtain rules and labels for classifying the records, e.g., 3302. For example, the database may store classification rules, such as the exemplary illustrative XML-encoded classification rule provided below:

```
<rule>
    <id>PURCHASE_44_45</id>
    <name>Number of purchasers</name>
    <inputs>num_purchasers</inputs>
```

-continued

```
    <operations>
        <1>label = 'null'</1>
        <2>IF (num_purchasers > 1) label = 'household'</2>
    </operations>
    <outputs>label</outputs>
</rule>
```

The server may select an unclassified data record for processing, e.g., 3303. The server may also select a classification rule for processing the unclassified data record, e.g., 3304. The server may parse the classification rule, and determine the inputs required for the rule, e.g., 3305. Based on parsing the classification rule, the server may parse the normalized data record template, e.g., 3306, and extract the values for the fields required to be provided as inputs to the classification rule. The server may parse the classification rule, and extract the operations to be performed on the inputs provided for the rule processing, e.g., 3307. Upon determining the operations to be performed, the server may perform the rule-specified operations on the inputs provided for the classification rule, e.g., 3308. In some implementations, the rule may provide threshold values. For example, the rule may specify that if the number of products in the transaction, total value of the transaction, average luxury rating of the products sold in the transaction, etc. may need to cross a threshold in order for the label(s) associated with the rule to be applied to the transaction data record. The server may parse the classification rule to extract any threshold values required for the rule to apply, e.g., 3309. The server may compare the computed values with the rule thresholds, e.g., 3310. If the rule threshold(s) is crossed, e.g., 3311, option "Yes," the server may apply one or more labels to the transaction data record as specified by the classification rule, e.g., 3312. For example, the server may apply a classification rule to an individual product within the transaction, and/or to the transaction as a whole. In some implementations, the server may process the transaction data record using each rule (see, e.g., 3313). Once all classification rules have been processed for the transaction record, e.g., 3313, option "No," the server may store the transaction data record in a database, e.g., 3314. The server may perform such processing for each transaction data record until all transaction data records have been classified (see, e.g., 3315).

Figure 34:
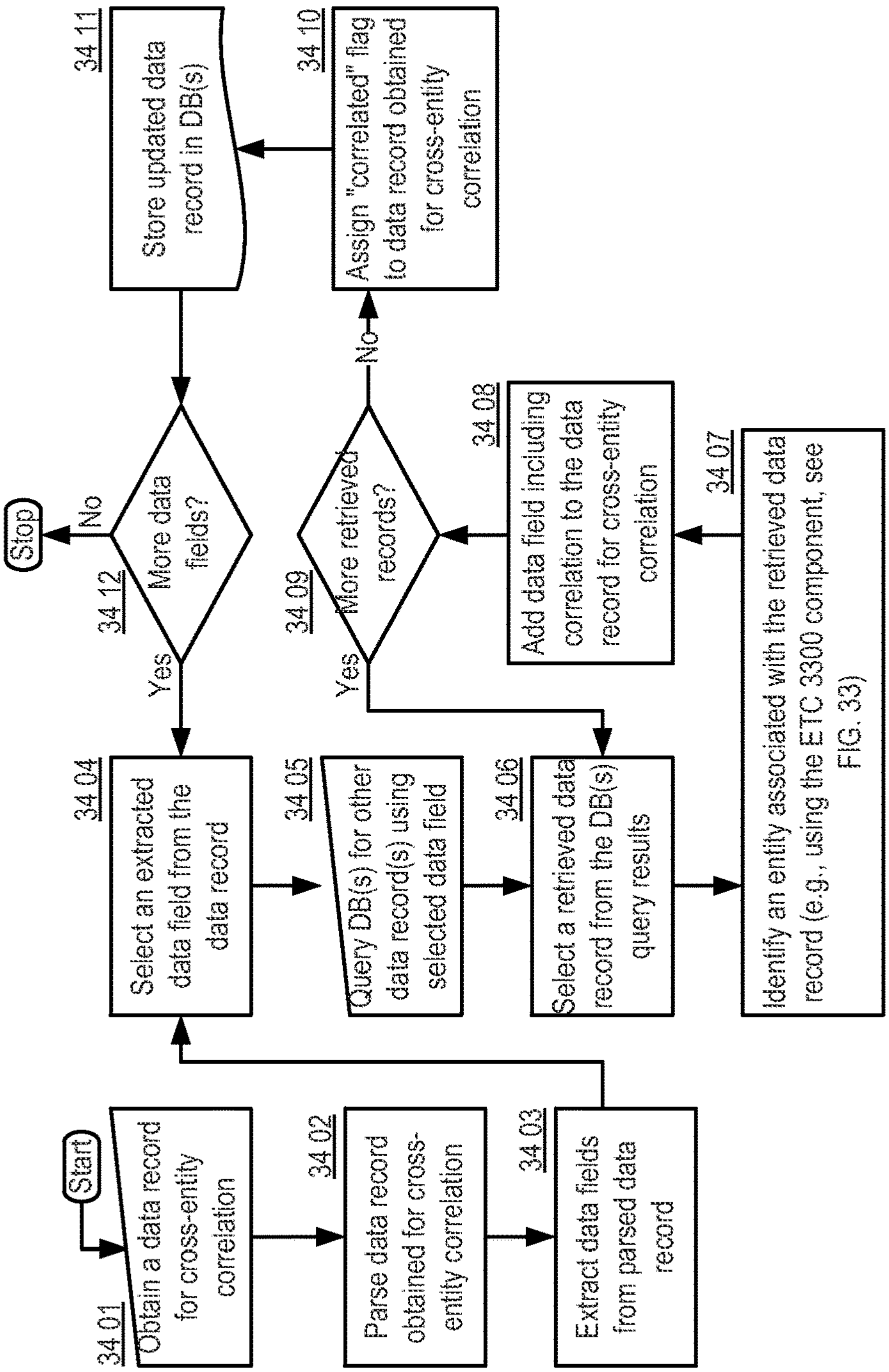
FIG. 34 shows a logic flow diagram illustrating example aspects of identifying cross-entity correlation in some embodiments of the MCB-Platform, e.g., a Cross-Entity Correlation ("CEC") component 1700.

FIG. 34 shows a logic flow diagram illustrating example aspects of identifying cross-entity correlation in some embodiments of the MCB-Platform, e.g., a Cross-Entity Correlation ("CEC") component 3400. In some implementations, a server may recognize that two entites in the the MCB-Platform share common or related data fields, e.g, date, address, zipcode, name, user ID, email address, payment account number (PAN), CVV2 numbers, and/or the like, and thus identify the entities as being correlated. The server may select a data record for cross-entity correlation, e.g., 3401. The server may parse the data record rule, and extract data fields from the data record, e.g., 3402-3403. The server may select an extracted data field from the data record, e.g., 3404, and query a database for other data records having the same data field as the extracted data field, e.g., 3405. From the list of retrieved data records from the database query, the server may select a record for further analysis. The server may identify, e.g., 3407, an entity associated with the retrieved data record, e.g., using the ETC 3300 component discussed above in the description with reference to FIG. 33. The server may add a data field to the data record obtained for cross-entity correlation specifying the correlation to the retrieved selected data record, e.g., 3408. In some embodiments, the server may utilize each data field in the data record obtained for cross-entity correlation to identify correlated entities, see e.g., 3409. The server may add, once complete, a "correlated" flag to the data record obtained for cross-entity correlation, e.g., 3410, e.g., along with as timestamp specifying the time at which the cross-entity correlation was performed. For example, such a timestamp may be used to determine at a later time whether the data record should be processed again for cross-entity correlation. The server may store the updated data record in a database.

Figure 35:
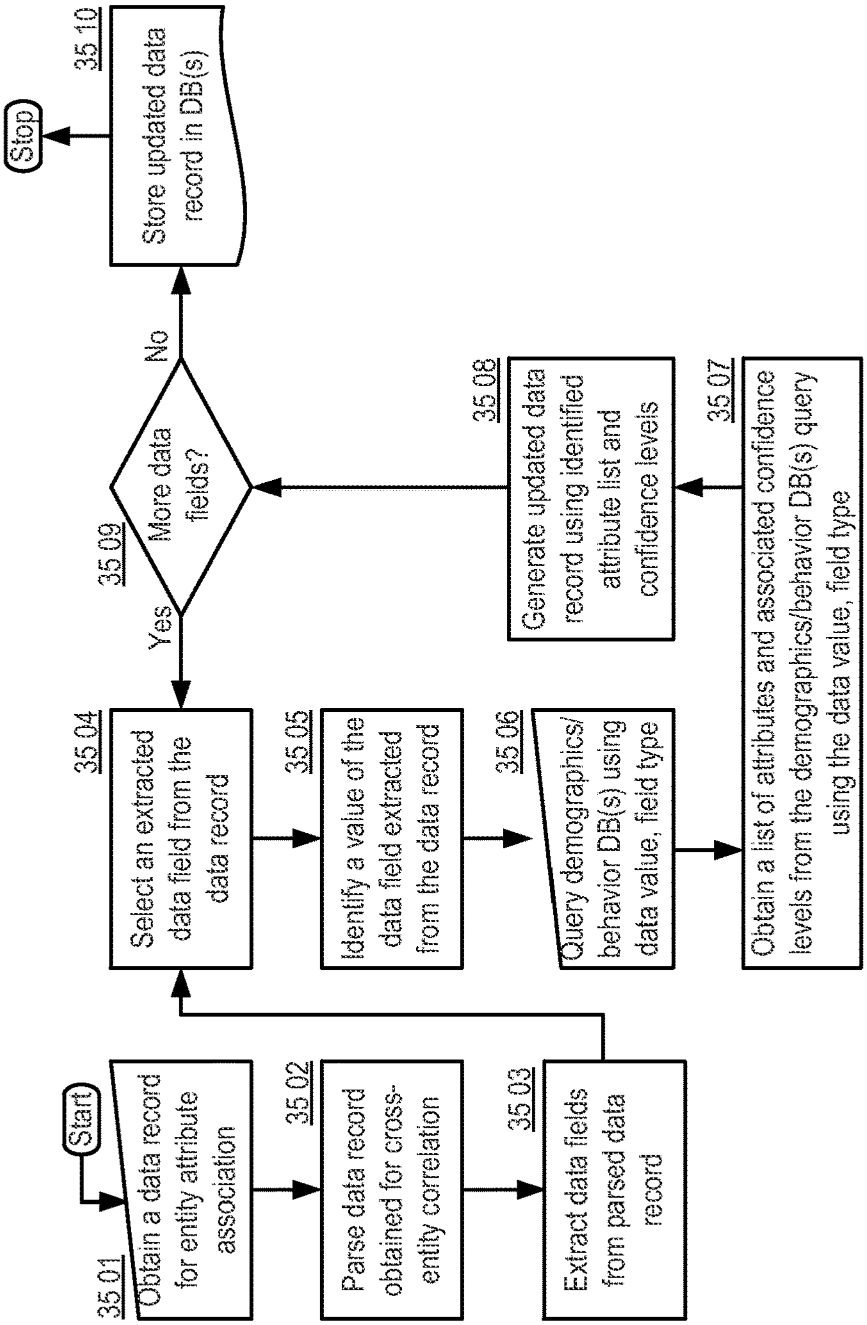
FIG. 35 shows a logic flow diagram illustrating example aspects of associating attributes to entities in some embodiments of the MCB-Platform, e.g., an Entity Attribute Association ("EAA") component 1800.

FIG. 35 shows a logic flow diagram illustrating example aspects of associating attributes to entities in some embodiments of the MCB-Platform, e.g., an Entity Attribute Association ("EAA") component 3500. In some implementations, a server may associate attributes to an entity, e.g., if the entity id a person, the server may identify a demographic (e.g., male/female), a spend character, a purchase preferences list, a merchants preference list, and/or the like, based on field values of data fields in data records that are related to the entity. In some implementations, a server may obtain a data record for entity attribute association, e.g., 3501. The server may parse the data record rule, and extract data fields from the data record, e.g., 3502-3503. The server may select an extracted data field from the data record, e.g., 3504, and identify a field value for the selected extracted data field from the data record, e.g., 3505. The server may query a database for demographic data, behavioral data, and/or the like, e.g., 3506, using the field value and field type. In response, the database may provide a list of potential attributes, as well as a confidence level in those attribute associations to the entity, see e.g., 3507. The server may add data fields to the data record obtained for entity attribute association specifying the potentially associated attributes and their associated confidence levels, e.g., 3508. In some embodiments, the server may utilize each data field in the data record obtained for cross-entity correlation to identify correlated entities, see e.g., 3509. The server may store the updated data record in a database, e.g., 3510.

Figure 36:
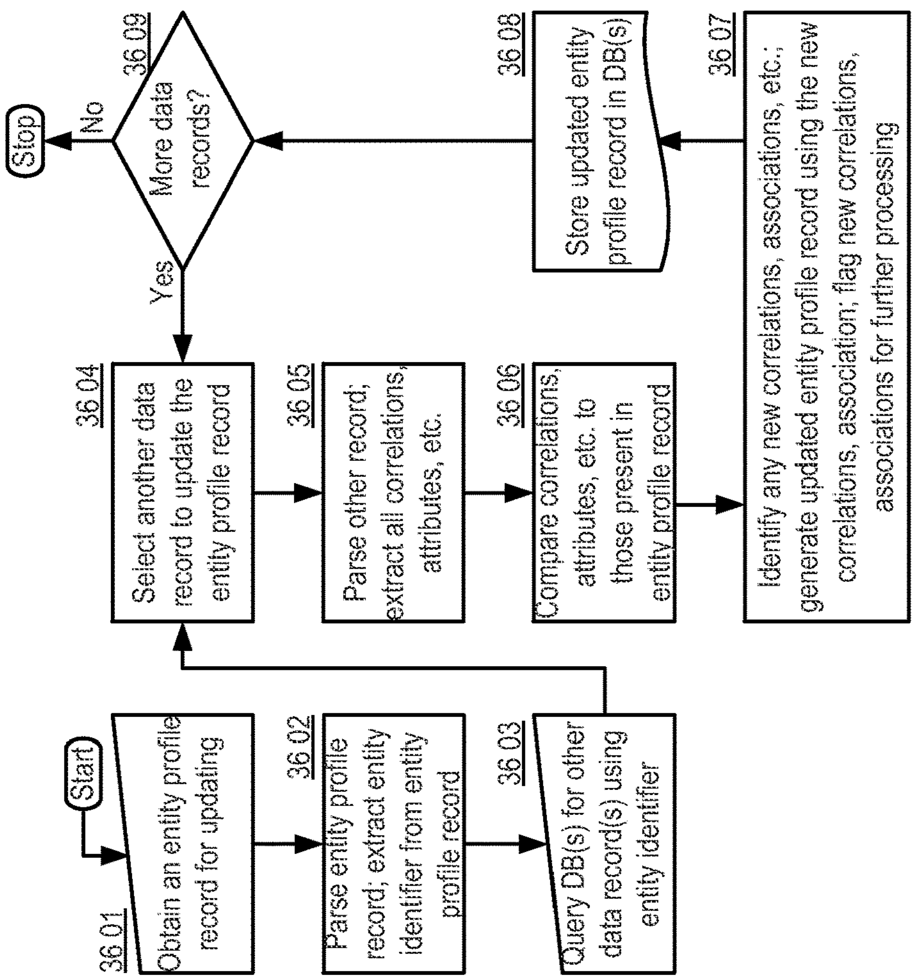
FIG. 36 shows a logic flow diagram illustrating example aspects of updating entity profile-graphs in some embodiments of the MCB-Platform, e.g., an Entity Profile-Graph Updating ("EPGU") component 1900.

FIG. 36 shows a logic flow diagram illustrating example aspects of updating entity profile-graphs in some embodiments of the MCB-Platform, e.g., an Entity Profile-Graph Updating ("EPGU") component 3600. In some implementations, a server may generate/update a profile for an entity whose data is stored within the MCB-Platform. The server may obtain an entity profile record for updating, e.g., 3601. The server may parse the entity profile record, and extract an entity identifier data field from the data record, e.g., 3602. The server may query a database for other data records that are related to the same entity, e.g., 3603, using the value for the entity identifier data field. In response, the database may provide a list of other data records for further processing. The server may select one of the other data records to update the entity profile record, e.g., 3604. The server may parse the data record, and extract all correlations, associations, and new data from the other record, e.g., 3605. The server may compare the correlations, attributes, associations, etc., from the other data record with the correlations, associations and attributes from the entity profile. Based on this comparison, the server may identify any new correlations, associations, etc., and generate an updated entity profile record using the new correlations, associations; flag new correlations, associations for further processing, e.g., 3607. In some embodiments, the server may utilize each data record obtained for updating the entity profile record as well as its social graph (e.g., as given by the correlations and associations for the entity), see e.g., 3609. The server may store the updated entity profile record in a database, e.g., 3608.

Figure 37:
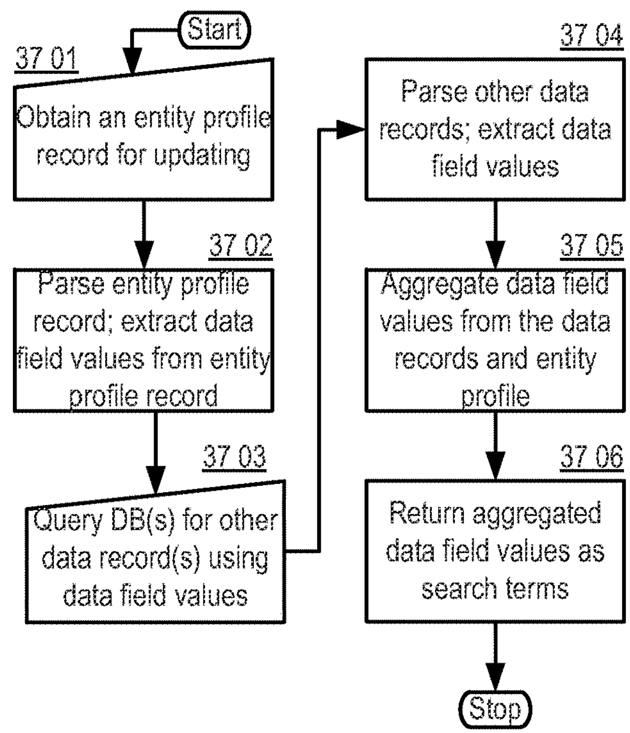
FIG. 37 shows a logic flow diagram illustrating example aspects of generating search terms for profile-graph updating in some embodiments of the MCB-Platform, e.g., a Search Term Generation ("STG") component 2000.

FIG. 37 shows a logic flow diagram illustrating example aspects of generating search terms for profile-graph updating in some embodiments of the MCB-Platform, e.g., a Search Term Generation ("STG") component 3700. In some implementations, a server may generate/update a profile for an entity whose data is stored within the MCB-Platform, by performing search for new data, e.g., across the Internet and social networking services. The server may obtain an entity profile record for updating, e.g., 3701. The server may parse the entity profile record, and extract data field types and field values from the entity profile record, e.g., 3702. The server may query a database for other data records that are related to the same entity, e.g., 3703, using the values for the extracted data fields. In response, the database may provide a list of other data records for further processing. The server may parse the data records, and extract all correlations, associations, and data from the data records, e.g., 3704. The server may aggregate all the data values from all the records and the entity profile record, e.g., 3705. Based on this, the server may return the aggregated data values as search terms to trigger search processes (see e.g., FIG. 20, 2001-2005), e.g., 3706.

MCB-Platform Wallet UIs

Figure 38:
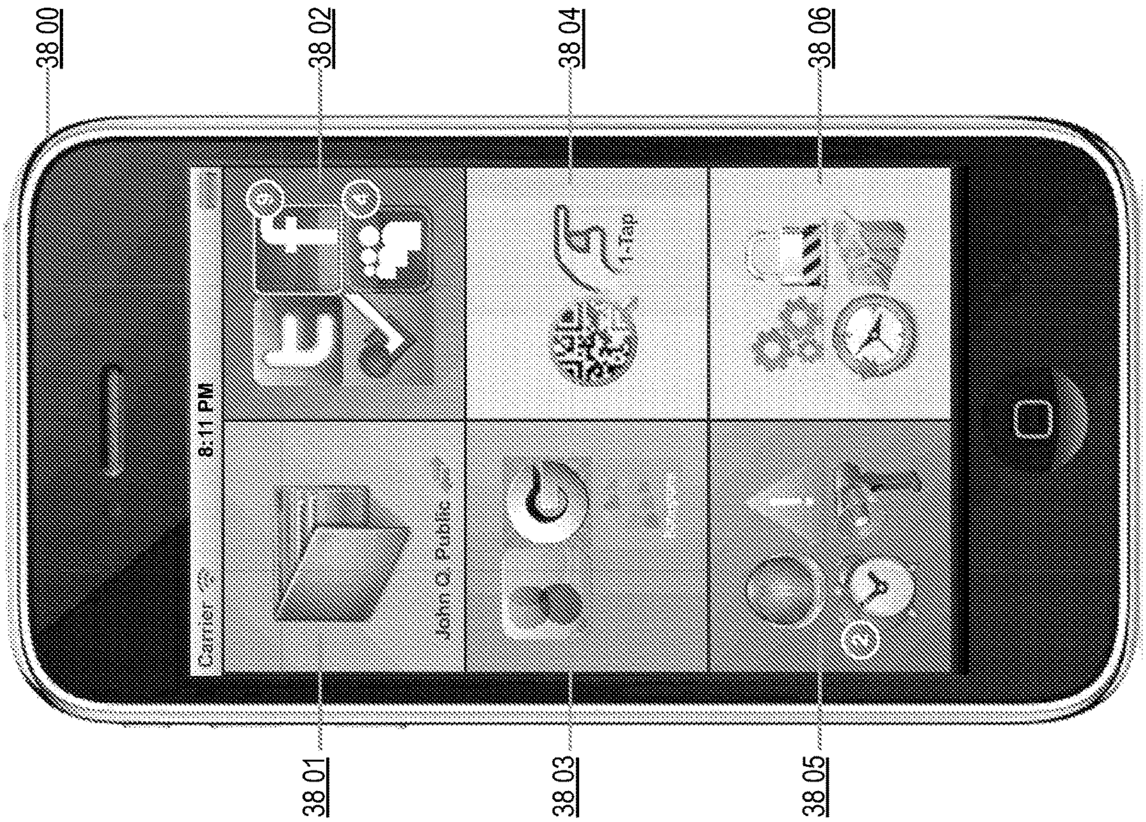
FIG. 38 shows a user interface diagram illustrating an overview of example features of virtual wallet applications in some embodiments of the MCB-Platform.

FIG. 38 shows a user interface diagram illustrating an overview of example features of virtual wallet applications in some embodiments of the MCB-Platform. FIG. 38 shows an illustration of various exemplary features of a virtual wallet mobile application 3800. Some of the features displayed include a wallet 3801, social integration via TWITTER, FACEBOOK, etc., offers and loyalty 3803, snap mobile purchase 3804, alerts 3805 and security, setting and analytics 3896. These features are explored in further detail below.

Figure 39A:
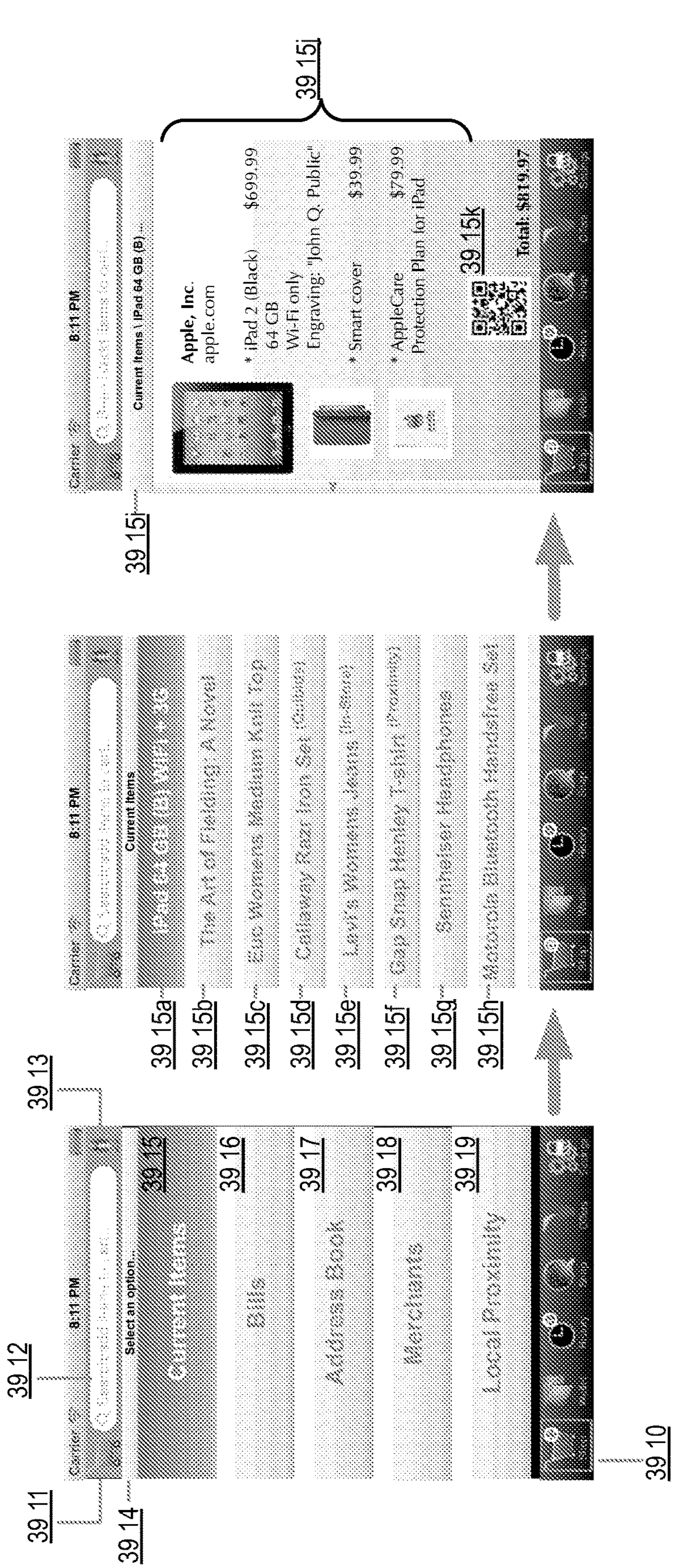
FIGS. 39A-G show user interface diagrams illustrating example features of virtual wallet applications in a shopping mode, in some embodiments of the MCB-Platform.

FIGS. 39A-G show user interface diagrams illustrating example features of virtual wallet applications in a shopping mode, in some embodiments of the MCB-Platform. With reference to FIG. 39A, some embodiments of the virtual wallet mobile app facilitate and greatly enhance the shopping experience of consumers. A variety of shopping modes, as shown in FIG. 39A, may be available for a consumer to peruse. In one implementation, for example, a user may launch the shopping mode by selecting the shop icon 3910 at the bottom of the user interface. A user may type in an item in the search field 3912 to search and/or add an item to a cart 3911. A user may also use a voice activated shopping mode by saying the name or description of an item to be searched and/or added to the cart into a microphone 3913. In a further implementation, a user may also select other shopping options 3914 such as current items 3915, bills 3916, address book 3917, merchants 3918 and local proximity 3919.

In one embodiment, for example, a user may select the option current items 3915, as shown in the left most user interface of FIG. 39A. When the current items 3915 option is selected, the middle user interface may be displayed. As shown, the middle user interface may provide a current list of items 3915*a-h* in a user's shopping cart 3911. A user may select an item, for example item 3915*a*, to view product description 3915*j* of the selected item and/or other items from the same merchant. The price and total payable information may also be displayed, along with a QR code 3915*k* that captures the information necessary to effect a snap mobile purchase transaction.

Figure 39B:
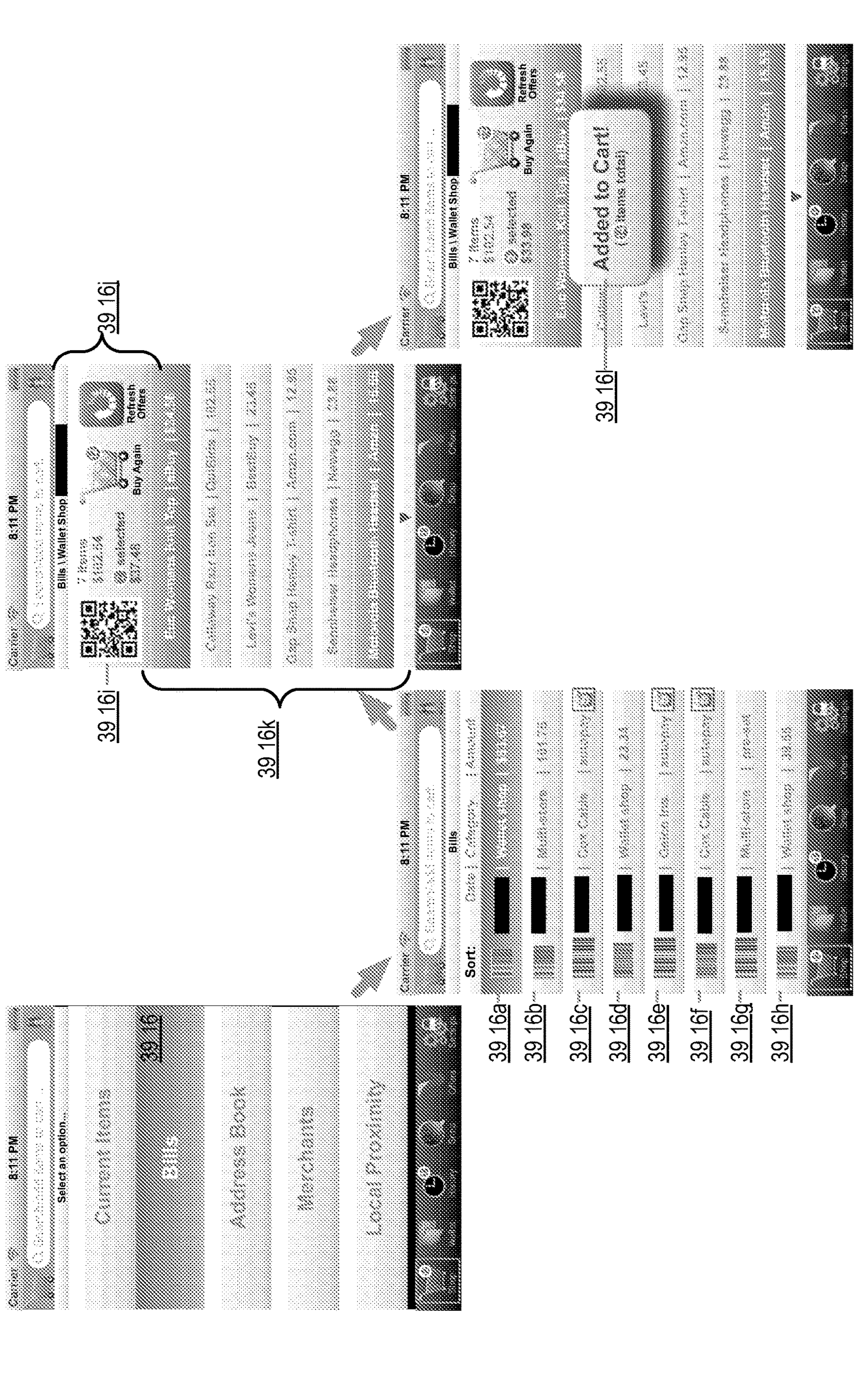

With reference to FIG. 39B, in another embodiment, a user may select the bills 3916 option. Upon selecting the bills 3916 option, the user interface may display a list of bills and/or receipts 3916*a-h* from one or more merchants. Next to each of the bills, additional information such as date of visit, whether items from multiple stores are present, last bill payment date, auto-payment, number of items, and/or the like may be displayed. In one example, the wallet shop bill 3916*a* dated Jan. 20, 2011 may be selected. The wallet shop bill selection may display a user interface that provides a variety of information regarding the selected bill. For example, the user interface may display a list of items 3916*k* purchased, <<3916*i*>>, a total number of items and the corresponding value. For example, 7 items worth $102.54 were in the selected wallet shop bill. A user may now select any of the items and select buy again to add purchase the items. The user may also refresh offers 3916*j* to clear any invalid offers from last time and/or search for new offers that may be applicable for the current purchase. As shown in FIG. 39B, a user may select two items for repeat purchase. Upon addition, a message 3916I may be displayed to confirm the addition of the two items, which makes the total number of items in the cart 14.

Figure 39C:
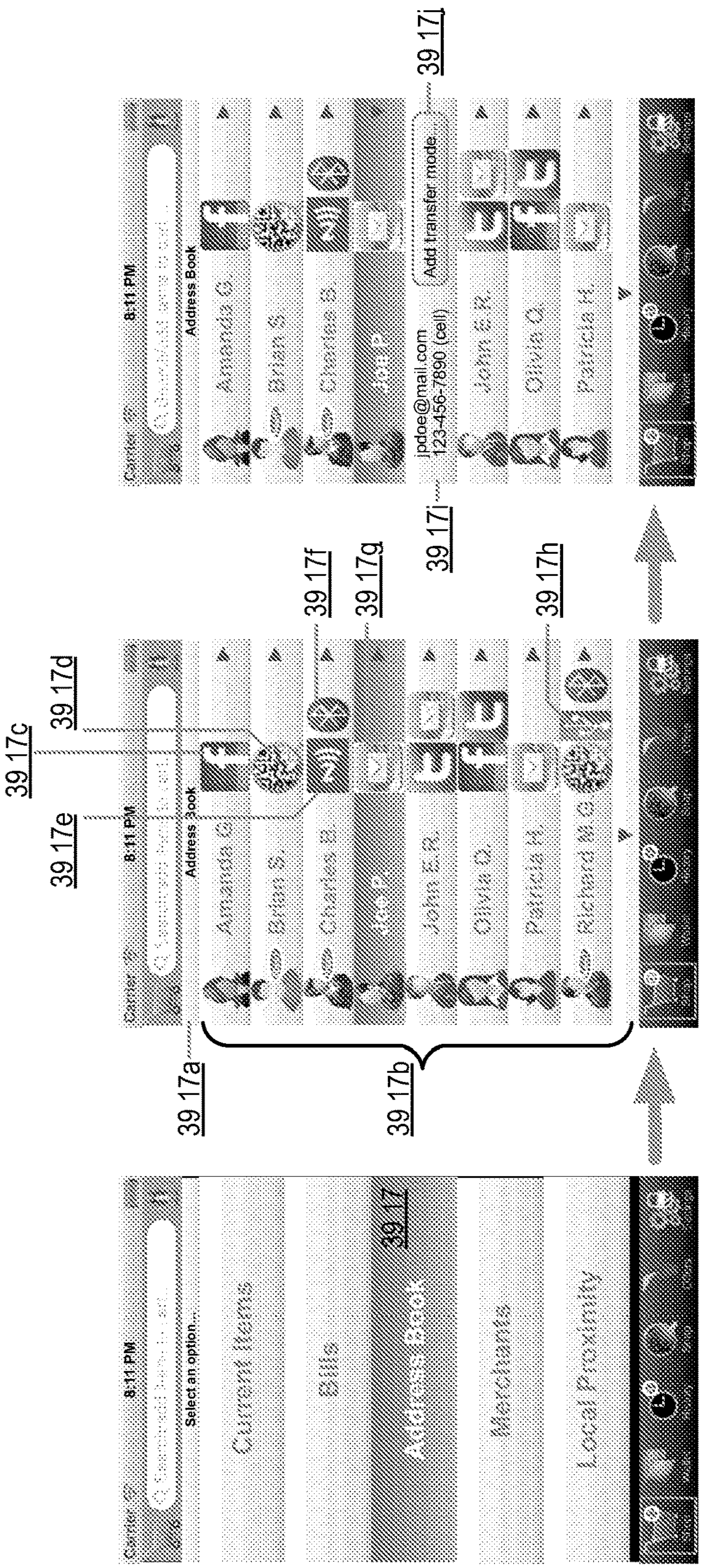

With reference to FIG. 39C, in yet another embodiment, a user may select the address book option 3917 to view the address book 3917*a* which includes a list of contacts 3917*b* and make any money transfers or payments. In one embodiment, the address book may identify each contact using their names and available and/or preferred modes of payment. For example, a contact Amanda G. may be paid via social pay (e.g., via FACEBOOK) as indicated by the icon 3917*c*. In another example, money may be transferred to Brian S. via QR code as indicated by the QR code icon 3917*d*. In yet another example, Charles B. may accept payment via near field communication 3917*e*, Bluetooth 3917*f* and email 3917*g*. Payment may also be made via USB 3917*h* (e.g., by physically connecting two mobile devices) as well as other social channels such as TWITTER.

Figure 39D:
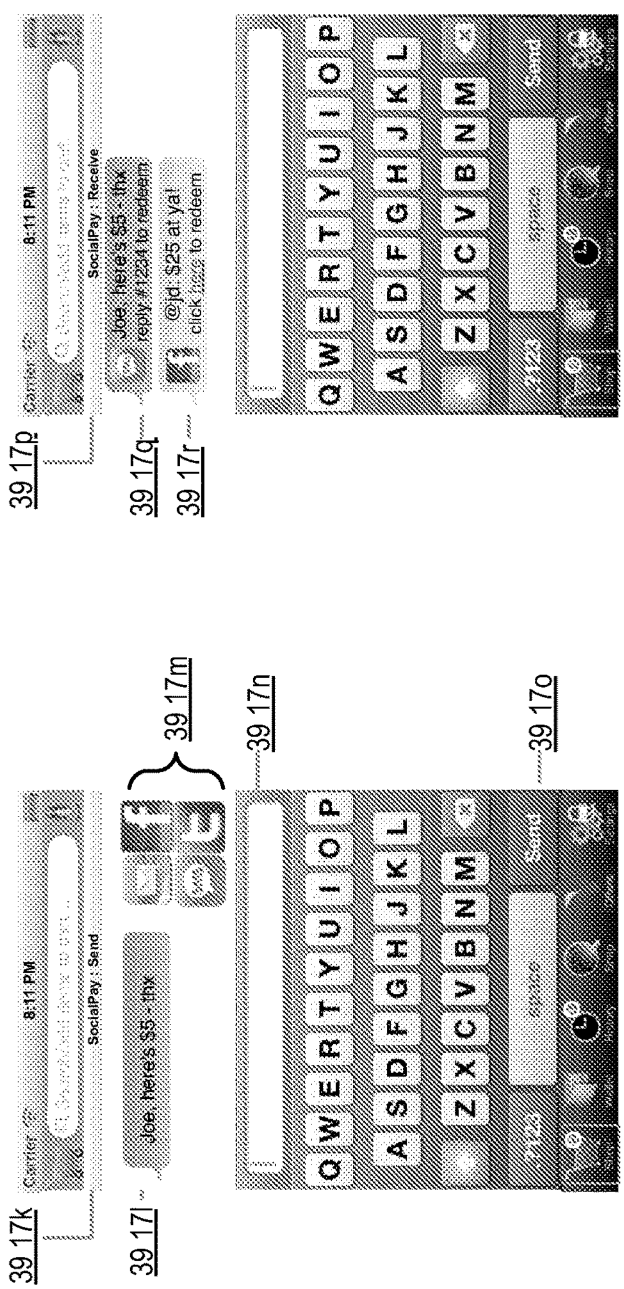

In one implementation, a user may select Joe P. for payment. Joe P., as shown in the user interface, has an email icon 3917*g* next to his name indicating that Joe P. accepts payment via email. When his name is selected, the user interface may display his contact information such as email, phone, etc. If a user wishes to make a payment to Joe P. by a method other than email, the user may add another transfer mode 3917*j* to his contact information and make a payment transfer. With reference to FIG. 39D, the user may be provided with a screen 3917*k* where the user can enter an amount to send Joe, as well as add other text to provide Joe with context for the payment transaction 39171. The user can choose modes (e.g., SMS, email, social networking) via which Joe may be contacted via graphical user interface elements, 3917*m*. As the user types, the text entered may be provided for review within a GUI element 3917*n*. When the user has completed entering in the necessary information, the user can press the send button 3917*o* to send the social message to Joe. If Joe also has a virtual wallet application, Joe may be able to review 3917*p* social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 39D, the SMS 3917*q* Joe received indicates that Joe can redeem the $5 obtained via SMS by replying to the SMS and entering the hash tag value '#1234'. In the same illustration, Joe has also received a message 3917*r* via Facebook®, which includes a URL link that Joe can activate to initiate redemption of the $25 payment.

Figure 39E:

With reference to FIG. 39E, in some other embodiments, a user may select merchants 3918 from the list of options in the shopping mode to view a select list of merchants 3918*a-e*. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 3918*a* for example. The user may then navigate through the merchant's listings to find items of interest such as 3918*f-j*. Directly through the wallet and without visiting the merchant site from a separate page, the user may make a selection of an item 3918*j* from the catalog of Amazon 3918*a*. As shown in the right most user interface of FIG. 39D, the selected item may then be added to cart. The message 3918*k* indicates that the selected item has been added to the cart, and updated number of items in the cart is now 13.

Figure 39F:

With reference to FIG. 39F, in one embodiment, there may be a local proximity option 3919 which may be selected by a user to view a list of merchants that are geographically in close proximity to the user. For example, the list of merchants 3919*a-e* may be the merchants that are located close to the user. In one implementation, the mobile application may further identify when the user in a store based on the user's location. For example, position icon 3919*d* may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 3919*f-j* available on aisle 5 of Walgreens. In one implementation, the user may select corn 3919*i* from his or her mobile application to add to cart 3919*k*.

Figure 39G:
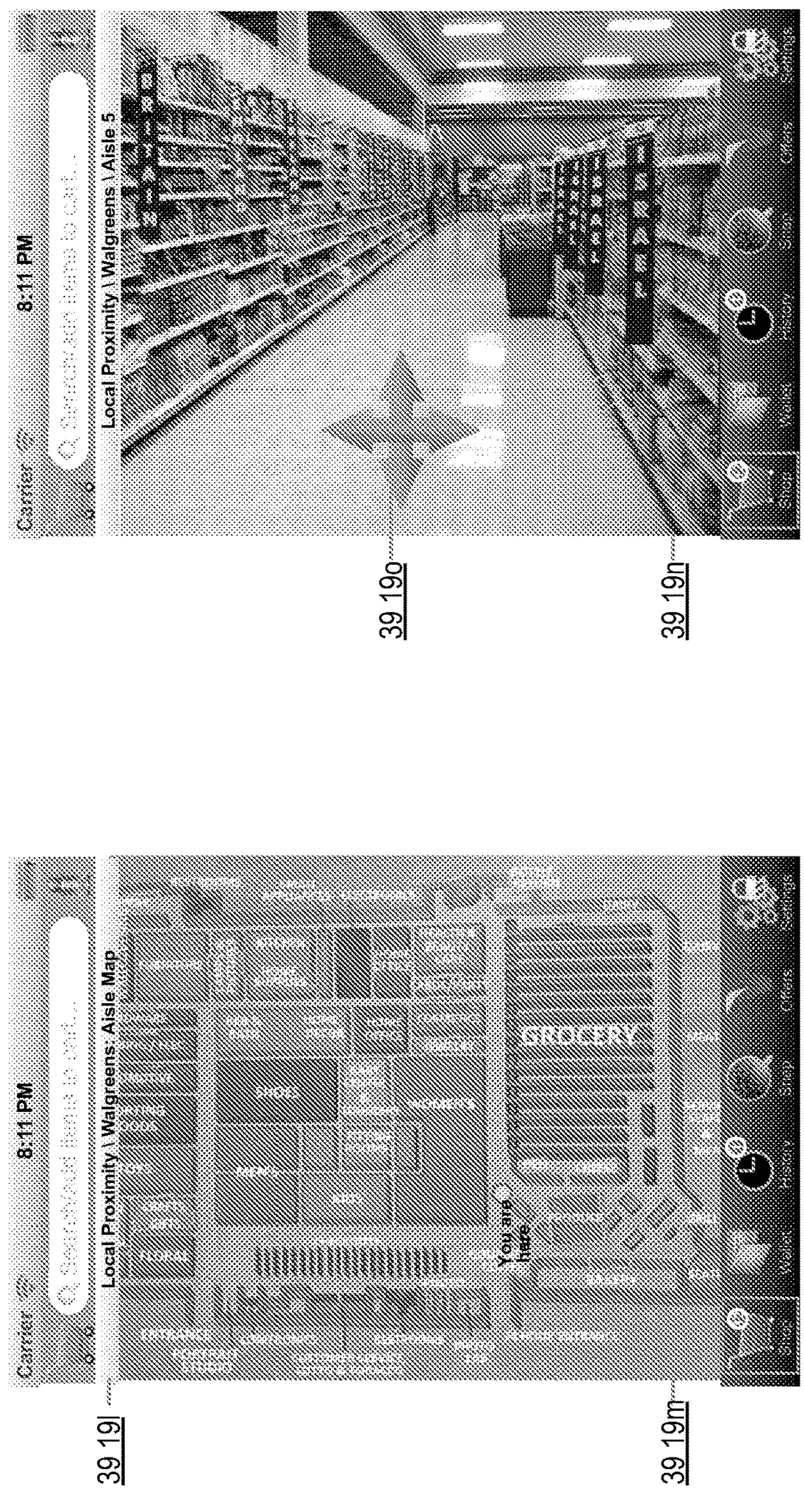
Figure 40A:
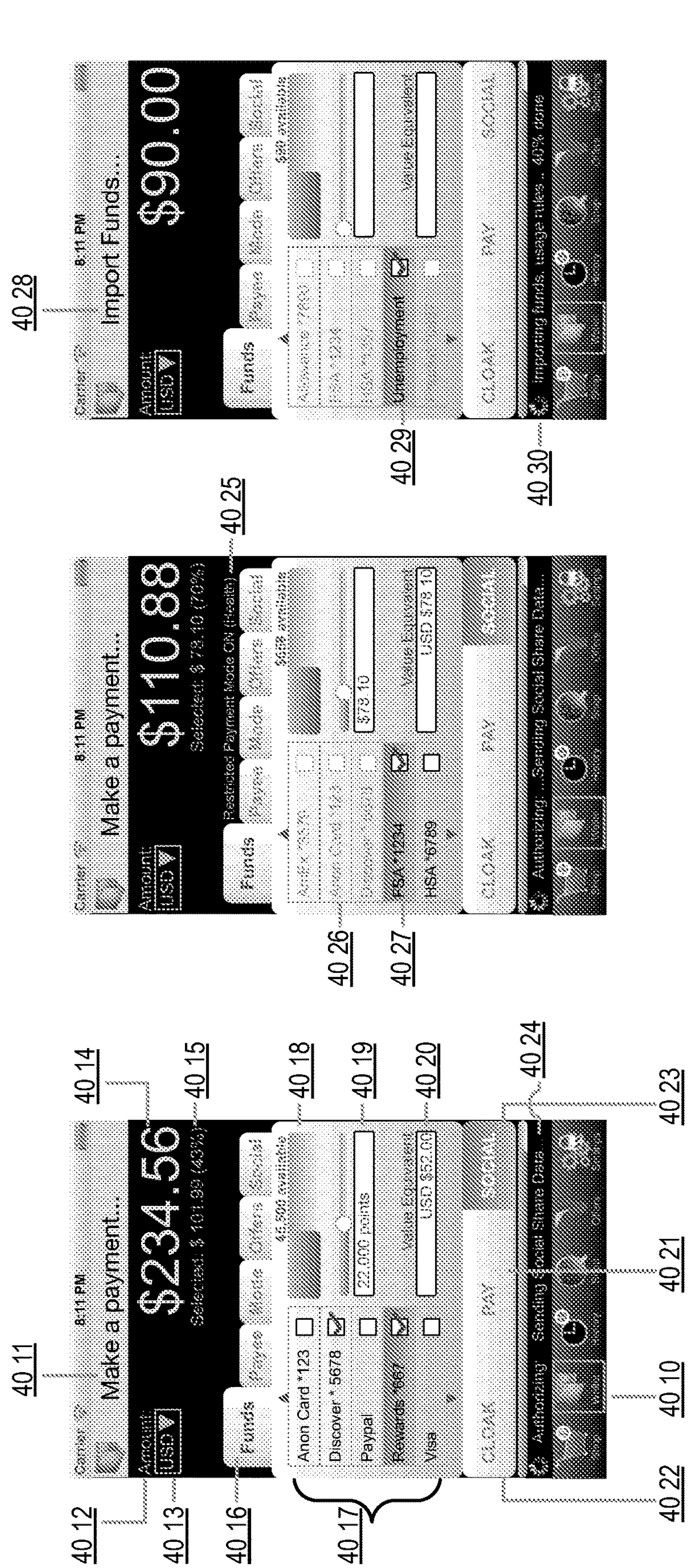
FIGS. 40A-F show user interface diagrams illustrating example features of virtual wallet applications in a payment mode, in some embodiments of the MCB-Platform.

With reference to FIG. 39G, in another embodiment, the local proximity option 3919 may include a store map and a real time map features among others. For example, upon selecting the Walgreens store, the user may launch an aisle map 39191 which displays a map 3919*m* showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 3919*n* may display images/video of the user's surrounding. For example, if the user is about to enter aisle 5, the store view map may show the view of aisle 5. Further the user may manipulate the orientation of the map using the navigation tool 39190 to move the store view forwards, backwards, right, left as well clockwise and counterclockwise rotation FIGS. 40A-F show user interface diagrams illustrating example features of virtual wallet applications in a payment mode, in some embodiments of the MCB-Platform. With reference to FIG. 40A, in one embodiment, the wallet mobile application may provide a user with a number of options for paying for a transaction via the wallet mode 4010. In one implementation, an example user interface 4011 for making a payment is shown. The user interface may clearly identify the amount 4012 and the currency 4013 for the transaction. The amount may be the amount payable and the currency may include real currencies such as dollars and euros, as well as virtual currencies such as reward points. The amount of the transaction 4014 may also be prominently displayed on the user interface. The user may select the funds tab 4016 to select one or more forms of payment 4017, which may include various credit, debit, gift, rewards and/or prepaid cards. The user may also have the option of paying, wholly or in part, with reward points. For example, the graphical indicator 4018 on the user interface shows the number of points available, the graphical indicator 4019 shows the number of points to be used towards the amount due 234.56 and the equivalent 4020 of the number of points in a selected currency (USD, for example).

In one implementation, the user may combine funds from multiple sources to pay for the transaction. The amount 4015 displayed on the user interface may provide an indication of the amount of total funds covered so far by the selected forms of payment (e.g., Discover card and rewards points). The user may choose another form of payment or adjust the amount to be debited from one or more forms of payment until the amount 4015 matches the amount payable 4014. Once the amounts to be debited from one or more forms of payment are finalized by the user, payment authorization may begin.

In one implementation, the user may select a secure authorization of the transaction by selecting the cloak button 4022 to effectively cloak or anonymize some (e.g., pre-configured) or all identifying information such that when the user selects pay button 4021, the transaction authorization is conducted in a secure and anonymous manner. In another implementation, the user may select the pay button 4021 which may use standard authorization techniques for transaction processing. In yet another implementation, when the user selects the social button 4023, a message regarding the transaction may be communicated to one of more social networks (set up by the user) which may post or announce the purchase transaction in a social forum such as a wall post or a tweet. In one implementation, the user may select a social payment processing option 4023. The indicator 4024 may show the authorizing and sending social share data in progress.

In another implementation, a restricted payment mode 4025 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 4026 under the funds tab to select specialized accounts such as a flexible spending account (FSA) 4027, health savings account (HAS), and/or the like and amounts to be debited to the selected accounts. In one implementation, such restricted payment mode 1925 processing may disable social sharing of purchase information.

In one embodiment, the wallet mobile application may facilitate importing of funds via the import funds user interface 4028. For example, a user who is unemployed may obtain unemployment benefit fund 4029 via the wallet mobile application. In one implementation, the entity providing the funds may also configure rules for using the fund as shown by the processing indicator message 4030. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 40B:
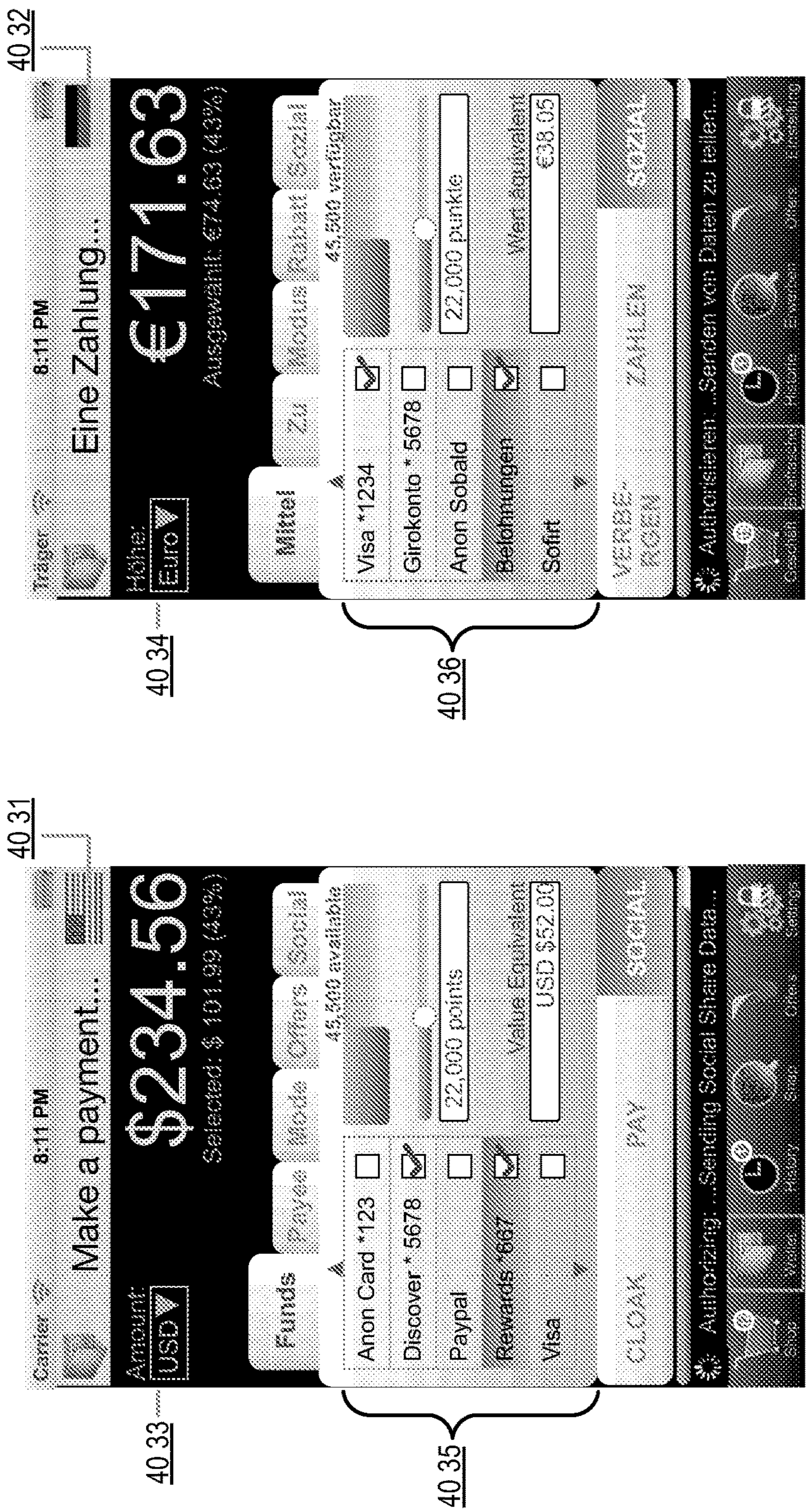

With reference to FIG. 40B, in one embodiment, the wallet mobile application may facilitate dynamic payment optimization based on factors such as user location, preferences and currency value preferences among others. For example, when a user is in the United States, the country indicator 4031 may display a flag of the United States and may set the currency 4033 to the United States. In a further implementation, the wallet mobile application may automatically rearrange the order in which the forms of payments 4035 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 4032 and the currency 4034. In a further implementation, the wallet application may rearrange the order in which different forms of payment 4036 are listed based on their acceptance level in that country. Of course, the order of these forms of payments may be modified by the user to suit his or her own preferences.

Figure 40C:
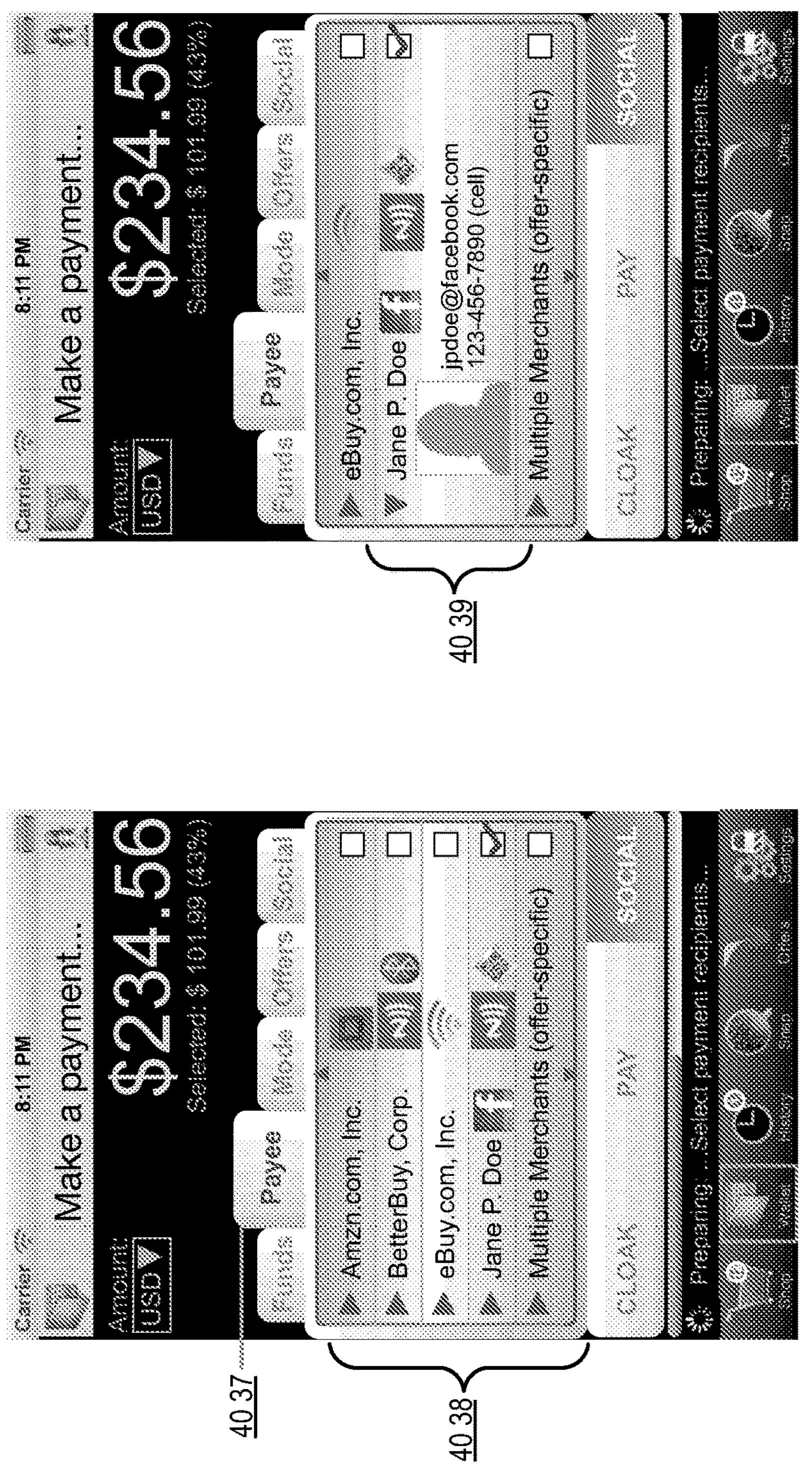

With reference to FIG. 40C, in one embodiment, the payee tab 4037 in the wallet mobile application user interface may facilitate user selection of one or more payees receiving the funds selected in the funds tab. In one implementation, the user interface may show a list of all payees 4038 with whom the user has previously transacted or available to transact. The user may then select one or more payees. The payees 4038 may include larger merchants such as Amazon.com Inc., and individuals such as Jane P. Doe. Next to each payee name, a list of accepted payment modes for the payee may be displayed. In one implementation, the user may select the payee Jane P. Doe 4039 for receiving payment. Upon selection, the user interface may display additional identifying information relating to the payee.

Figure 40D:

With reference to FIG. 40D, in one embodiment, the mode tab 1940 may facilitate selection of a payment mode accepted by the payee. A number of payment modes may be available for selection. Example modes include, blue tooth 4041, wireless 4042, snap mobile by user-obtained QR code 4043, secure chip 4044, TWITTER 4045, near-field communication (NFC) 4046, cellular 4047, snap mobile by user-provided QR code 4048, USB 4049 and FACEBOOK 4050, among others. In one implementation, only the payment modes that are accepted by the payee may be selectable by the user. Other non-accepted payment modes may be disabled.

Figure 40E:
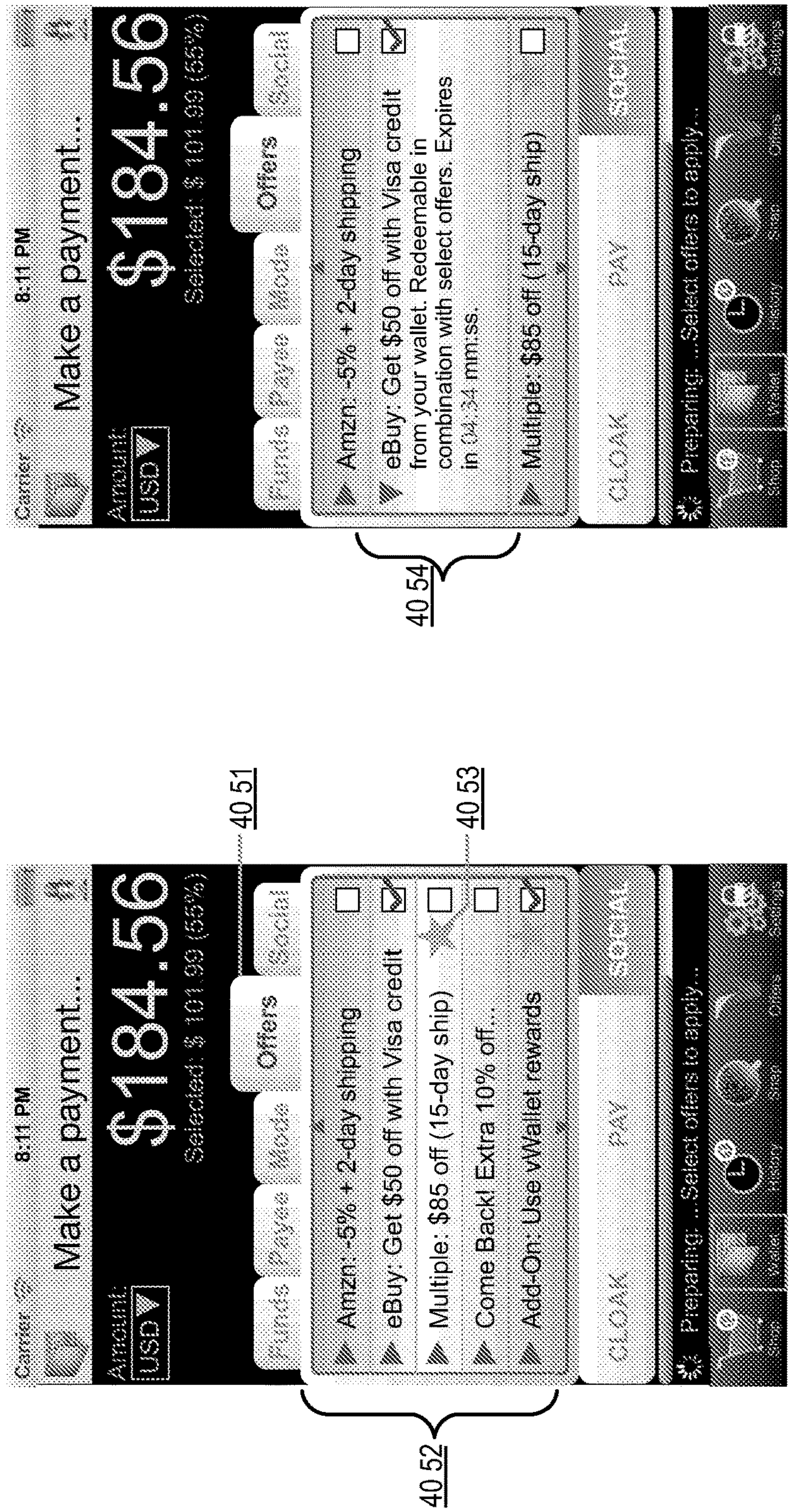

With reference to FIG. 40E, in one embodiment, the offers tab 4051 may provide real-time offers that are relevant to items in a user's cart for selection by the user. The user may select one or more offers from the list of applicable offers 4052 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 4053. In a further implementation, the user may read the details of the offer by expanding the offer row as shown by 4054 in the user interface.

Figure 40F:
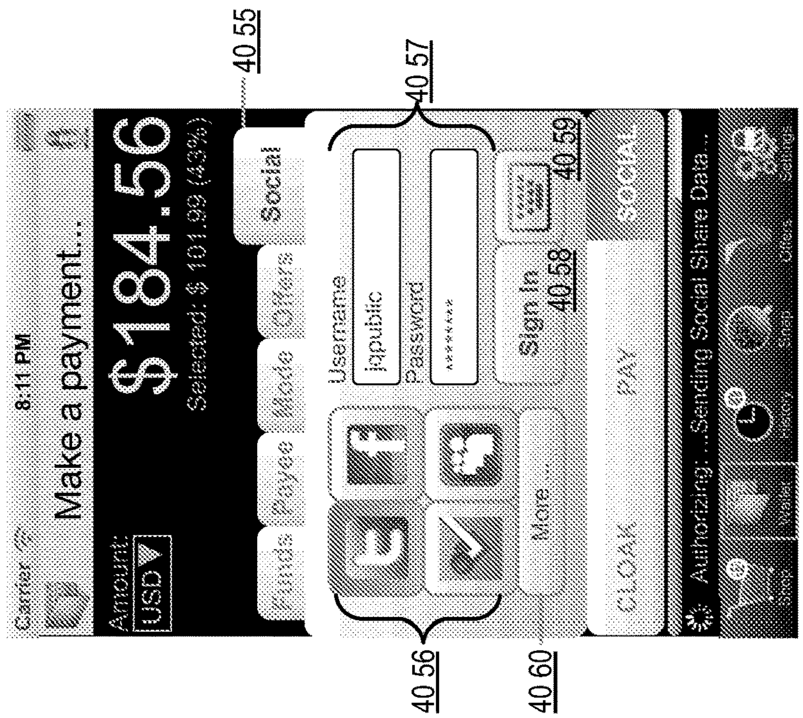

With reference to FIG. 40F, in one embodiment, the social tab 4055 may facilitate integration of the wallet application with social channels 4056. In one implementation, a user may select one or more social channels 4056 and may sign in to the selected social channel from the wallet application by providing to the wallet application the social channel user name and password 4057 and signing in 4058. The user may then use the social button 4059 to send or receive money through the integrated social channels. In a further implementation, the user may send social share data such as purchase information or links through integrated social channels. In another embodiment, the user supplied login credentials may allow MCB-Platform to engage in interception parsing.

Figure 41:
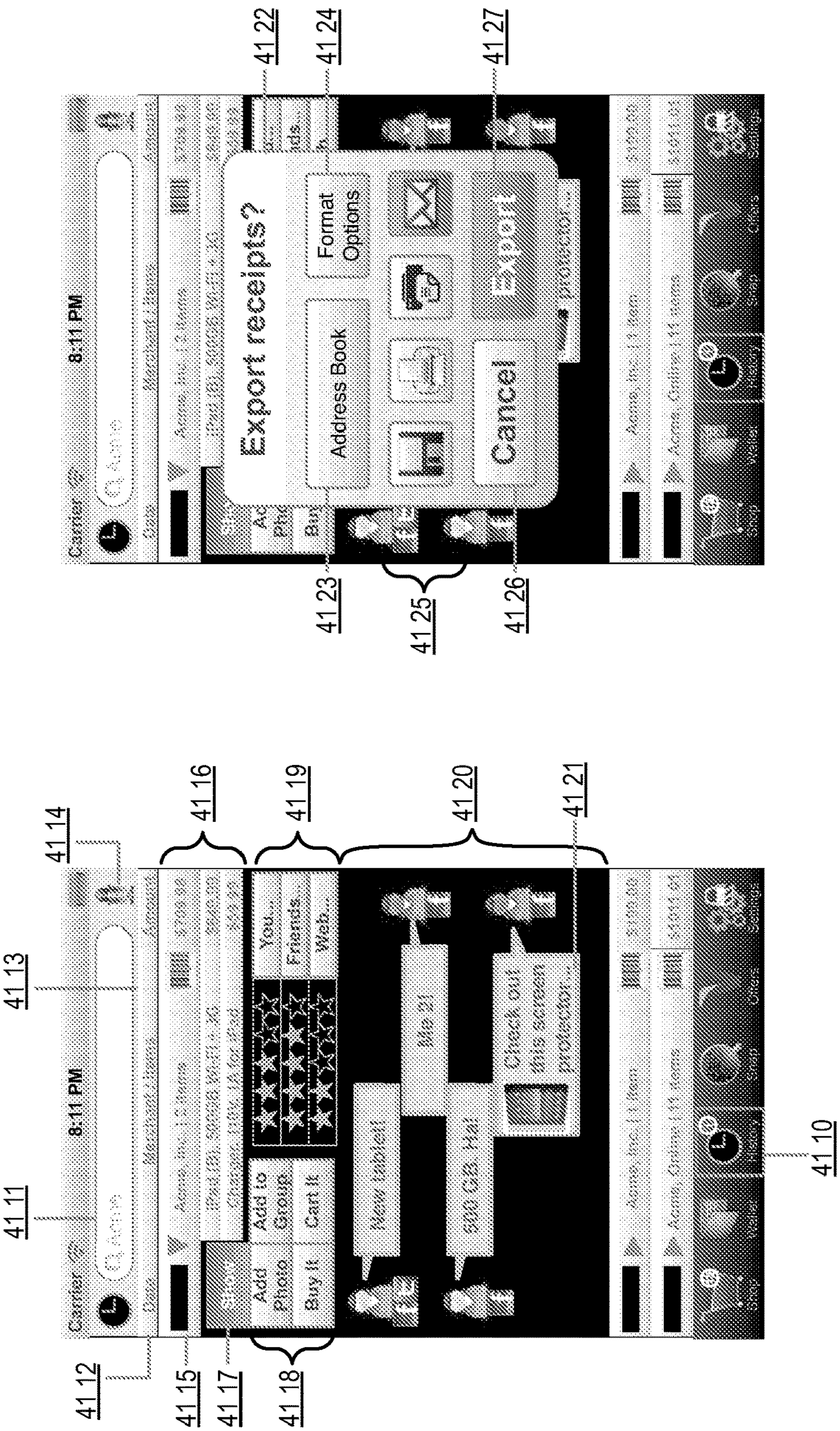
FIG. 41 shows a user interface diagram illustrating example features of virtual wallet applications, in a history mode, in some embodiments of the MCB-Platform.

FIG. 41 shows a user interface diagram illustrating example features of virtual wallet applications, in a history mode, in some embodiments of the MCB-Platform. In one embodiment, a user may select the history mode 4110 to view a history of prior purchases and perform various actions on those prior purchases. For example, a user may enter a merchant identifying information such as name, product, MCC, and/or the like in the search bar 4111. In another implementation, the user may use voice activated search feature by clicking on the microphone icon 4114. The wallet application may query the storage areas in the mobile device or elsewhere (e.g., one or more databases and/or tables remote from the mobile device) for transactions matching the search keywords. The user interface may then display the results of the query such as transaction 4115. The user interface may also identify the date 4112 of the transaction, the merchants and items 4113 relating to the transaction, a barcode of the receipt confirming that a transaction was made, the amount of the transaction and any other relevant information.

In one implementation, the user may select a transaction, for example transaction 4115, to view the details of the transaction. For example, the user may view the details of the items associated with the transaction and the amounts 4116 of each item. In a further implementation, the user may select the show option 4117 to view actions 4118 that the user may take in regards to the transaction or the items in the transaction. For example, the user may add a photo to the transaction (e.g., a picture of the user and the iPad the user bought). In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 4119 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 4120 shows FACEBOOK message exchanges between two users. In one implementation, a user may share a link via a message 4121. Selection of such a message having embedded link to a product may allow the user to view a description of the product and/or purchase the product directly from the history mode.

In one embodiment, the history mode may also include facilities for exporting receipts. The export receipts pop up 4122 may provide a number of options for exporting the receipts of transactions in the history. For example, a user may use one or more of the options 4125, which include save (to local mobile memory, to server, to a cloud account, and/or the like), print to a printer, fax, email, and/or the like. The user may utilize his or her address book 4123 to look up email or fax number for exporting. The user may also specify format options 4124 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 4127 to initiate export of receipts.

Figure 42A:
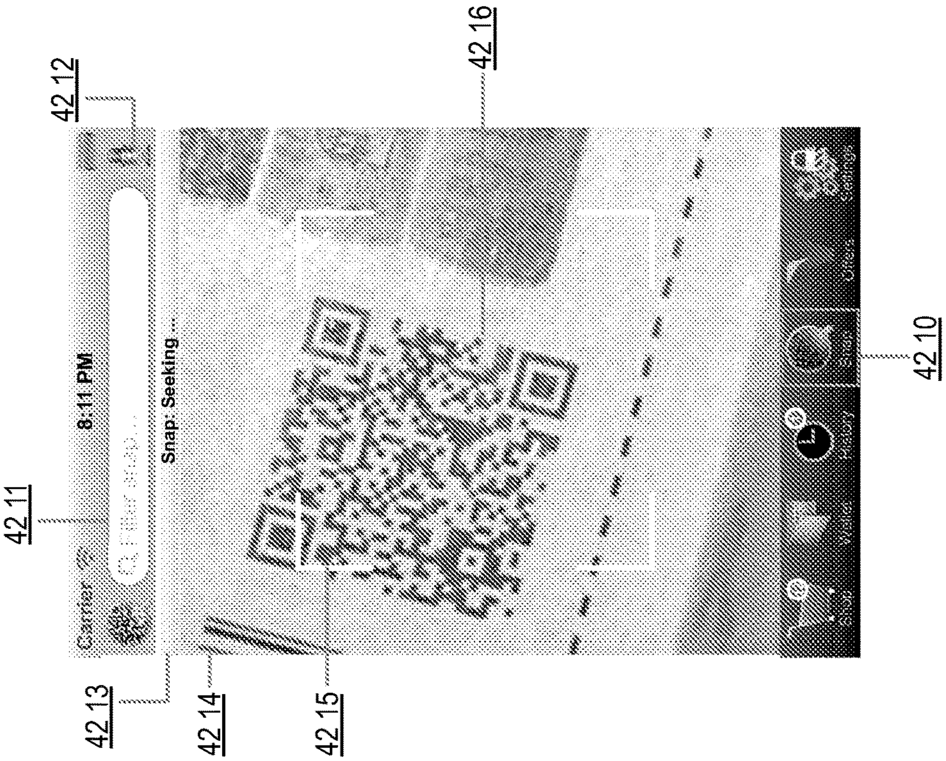
FIGS. 42A-E show user interface diagrams illustrating example features of virtual wallet applications in a snap mode, in some embodiments of the MCB-Platform.

FIGS. 42A-E show user interface diagrams illustrating example features of virtual wallet applications in a snap mode, in some embodiments of the MCB-Platform. With reference to FIG. 42A, in one embodiment, a user may select the snap mode 2110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 42A. A user may use his or her mobile phone to take a picture of a QR code 4215 and/or a barcode 4214. In one implementation, the bar 4213 and snap frame 4215 may assist the user in snapping codes properly. For example, the snap frame 4215, as shown, does not capture the entirety of the code 4216. As such, the code captured in this view may not be resolvable as information in the code may be incomplete. This is indicated by the message on the bar 4213 that indicates that the snap mode is still seeking the code. When the code 4216 is completely framed by the snap frame 4215, the bar message may be updated to, for example, "snap found." Upon finding the code, in one implementation, the user may initiate code capture using the mobile device camera. In another implementation, the snap mode may automatically snap the code using the mobile device camera.

Figure 42B:

With reference to FIG. 42B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 4222 the receipt 4223 the user wants to reallocate. Alternatively, the user may directly snap a picture of a barcode on a receipt, and the snap mode may generate and display a receipt 4223 using information from the barcode. The user may now reallocate 4225. In some implementations, the user may also dispute the transaction 4224 or archive the receipt 4226.

In one implementation, when the reallocate button 4225 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 4227 may be generated after the completion of the reallocation process. As discussed, the receipt shows that some charges have been moved from the Visa account to the FSA.

Figure 42C:
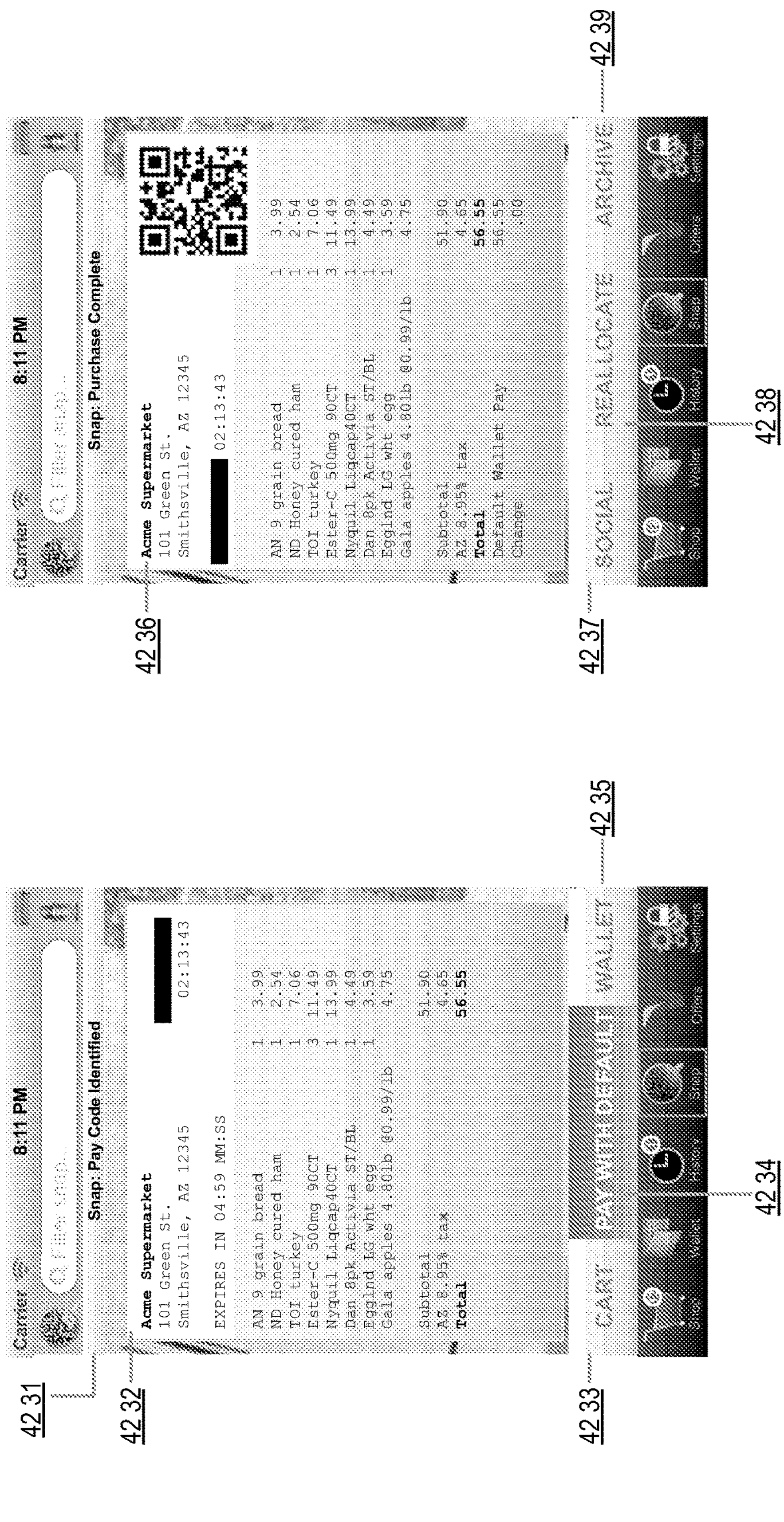

With reference to FIG. 42C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 4232. Once the QR code is identified, the navigation bar 4231 may indicate that the pay code is identified. The user may now have an option to add to cart 4233, pay with a default payment account 4234 or pay with wallet 4235.

In one implementation, the user may decide to pay with default 4234. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 4237 to share purchase information with others, reallocate 4238 as discussed with regard to FIG. 42B, and archive 4239 to store the receipt.

Figure 42D:

With reference to FIG. 42D, in one embodiment, the snap mode may also facilitate offer identification, application and storage for future use. For example, in one implementation, a user may snap an offer code 4241 (e.g., a bar code, a QR code, and/or the like). The wallet application may then generate an offer text 4242 from the information encoded in the offer code. The user may perform a number of actions on the offer code. For example, the user use the find button 4243 to find all merchants who accept the offer code, merchants in the proximity who accept the offer code, products from merchants that qualify for the offer code, and/or the like. The user may also apply the offer code to items that are currently in the cart using the add to cart button 4244. Furthermore, the user may also save the offer for future use by selecting the save button 4245.

In one implementation, after the offer or coupon 4246 is applied, the user may have the option to find qualifying merchants and/or products using find, the user may go to the wallet using 4248, and the user may also save the offer or coupon 4246 for later use.

Figure 42E:
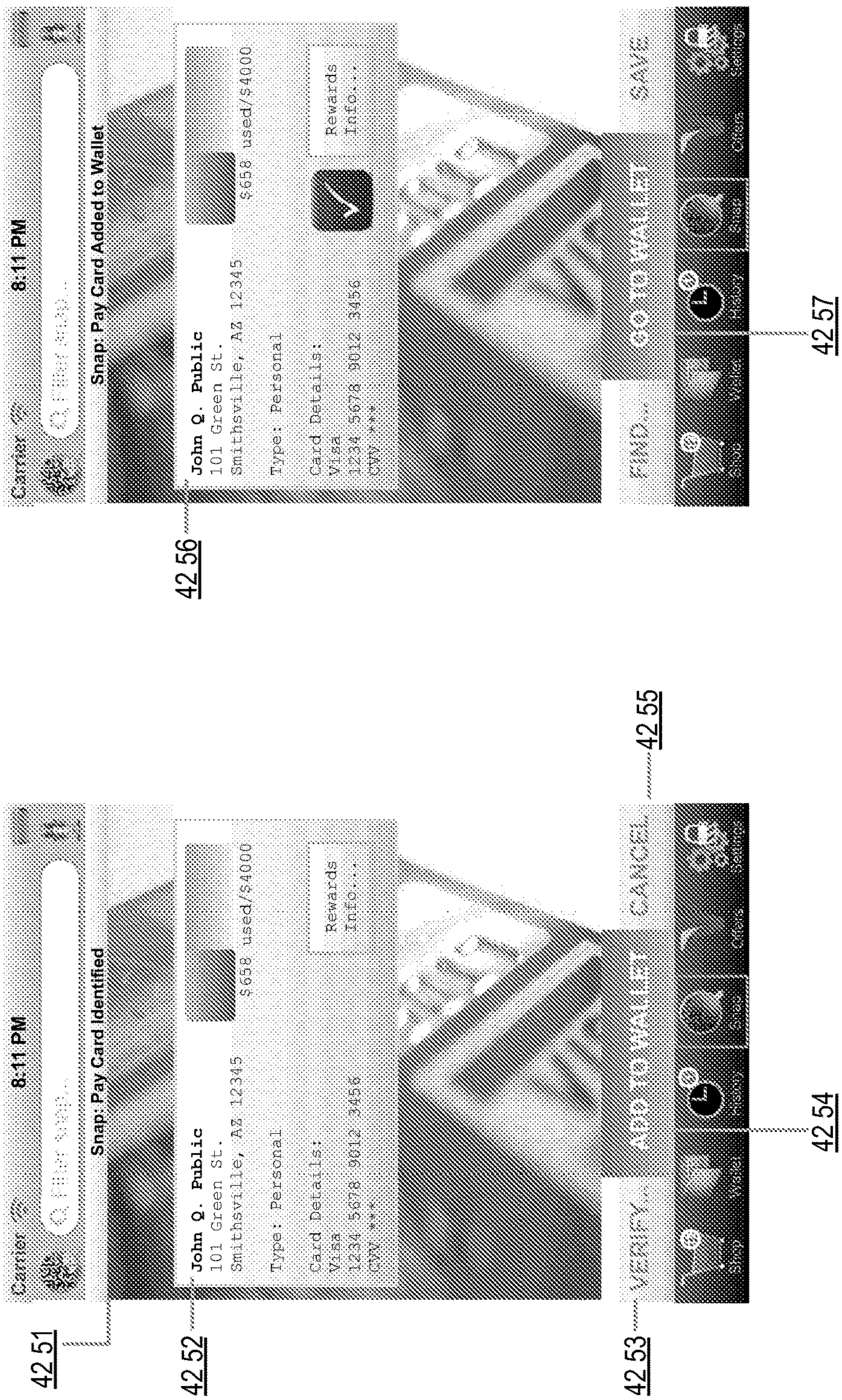

With reference to FIG. 42E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 4251 and may display the textual information 4252 encoded in the pay card. The user may then perform verification of the information 4252 by selecting the verify button 4253. In one implementation, the verification may include contacting the issuer of the pay card for confirmation of the decoded information 4252 and any other relevant information. In one implementation, the user may add the pay card to the wallet by selecting the 'add to wallet' button 4254. The instruction to add the pay card to the wallet may cause the pay card to appear as one of the forms of payment under the funds tab 4016 discussed in FIG. 40A. The user may also cancel importing of the pay card as a funding source by selecting the cancel button 4255. When the pay card has been added to the wallet, the user interface may be updated to indicate that the importing is complete via the notification display 4256. The user may then access the wallet 4257 to begin using the added pay card as a funding source.

Figure 43:
FIG. 43 shows a user interface diagram illustrating example features of virtual wallet applications, in an offers mode, in some embodiments of the MCB-Platform.

FIG. 43 shows a user interface diagram illustrating example features of virtual wallet applications, in an offers mode, in some embodiments of the MCB-Platform. In some implementations, the MCB-Platform may allow a user to search for offers for products and/or services from within the virtual wallet mobile application. For example, the user may enter text into a graphical user interface ("GUI") element 4311, or issue voice commands by activating GUI element 4312 and speaking commands into the device. In some implementations, the MCB-Platform may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 4313. For example, the offer may provide a discount, and may include an expiry time. In some implementations, other users may provide gifts (e.g., 4314) to the user, which the user may redeem. In some implementations, the offers section may include alerts as to payment of funds outstanding to other users (e.g., 4315). In some implementations, the offers section may include alerts as to requesting receipt of funds from other users (e.g., 4316). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the MCB-Platform, e.g., 4317-4319, 4320. These offers may sometimes be assembled using a combination of participating merchants, e.g., 4317. In some implementations, the MCB-Platform itself may provide offers for users contingent on the user utilizing particular payment forms from within the virtual wallet application, e.g., 4320.

Figure 44A:
FIGS. 44A-B show user interface diagrams illustrating example features of virtual wallet applications, in a security and privacy mode, in some embodiments of the MCB-Platform.
Figure 44B:
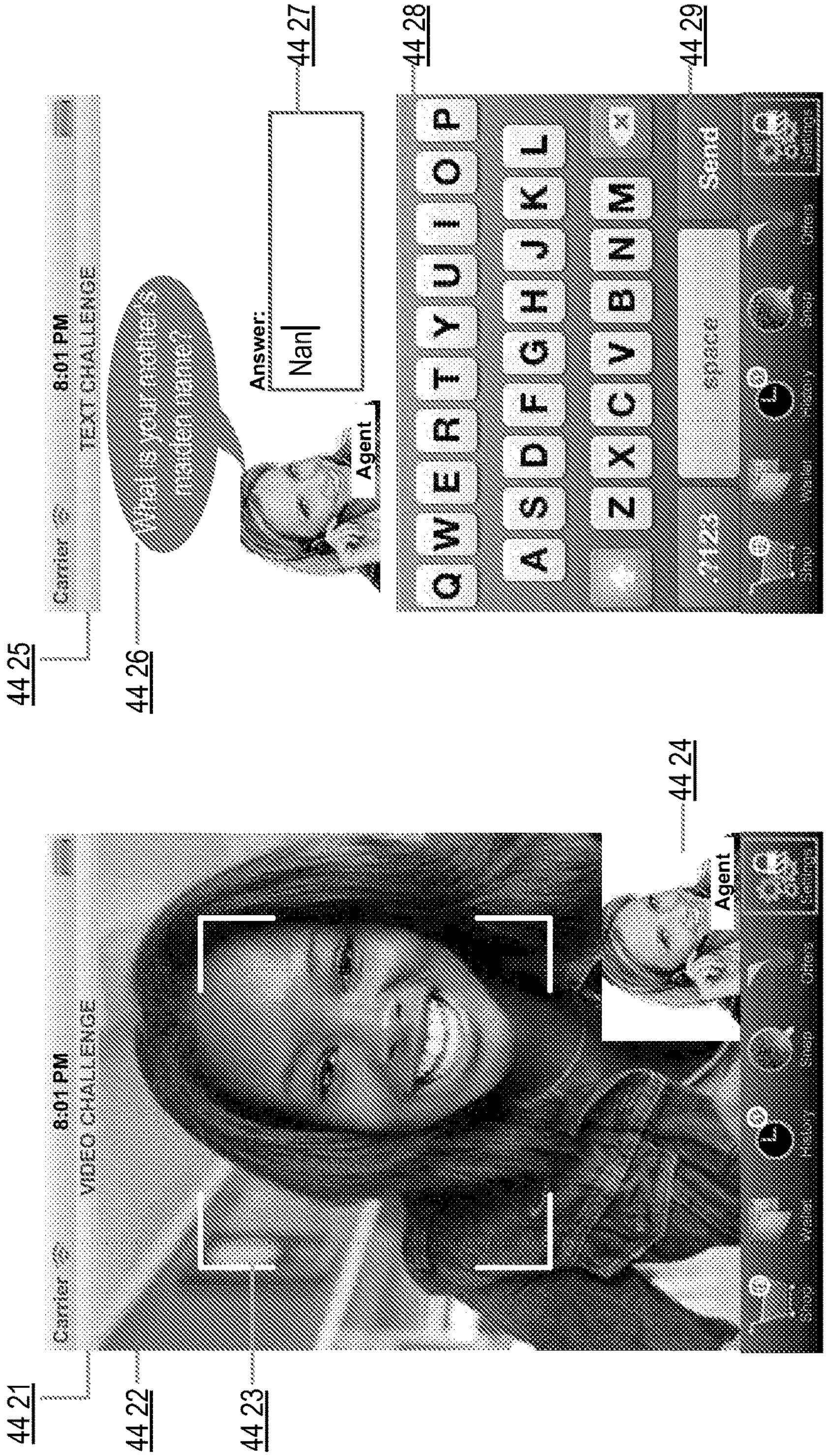

FIGS. 44A-B show user interface diagrams illustrating example features of virtual wallet applications, in a security and privacy mode, in some embodiments of the MCB-Platform. With reference to FIG. 44A, in some implementations, the user may be able to view and/or modify the user profile and/or settings of the user, e.g., by activating a user interface element. For example, the user may be able to view/modify a user name (e.g., 4411*a*-*b*), account number (e.g., 4412*a*-*b*), user security access code (e.g., 4413-*b*), user pin (e.g., 4414-*b*), user address (e.g., 4415-*b*), social security number associated with the user (e.g., 4416-*b*), current device GPS location (e.g., 4417-*b*), user account of the merchant in whose store the user currently is (e.g., 4418-*b*), the user's rewards accounts (e.g., 4419-*b*), and/or the like. In some implementations, the user may be able to select which of the data fields and their associated values should be transmitted to facilitate the purchase transaction, thus providing enhanced data security for the user. For example, in the example illustration in FIG. 44A, the user has selected the name 4411*a*, account number 4412*a*, security code 4413*a*, merchant account ID 4418*a* and rewards account ID 4419*a* as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the MCB-Platform with the GPS location of the user. Based on the GPS location of the user, the MCB-Platform may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 44B, in some implementations, the app executing on the user's device may provide a "VerifyChat" feature for fraud prevention. For example, the MCB-Platform may detect an unusual and/or suspicious transaction. The MCB-Platform may utilize the VerifyChat feature to communicate with the user, and verify the authenticity of the originator of the purchase transaction. In various implementations, the MCB-Platform may send electronic mail message, text (SMS) messages, Facebook® messages, Twitter™ tweets, text chat, voice chat, video chat (e.g., Apple FaceTime), and/or the like to communicate with the user. For example, the MCB-Platform may initiate a video challenge for the user, e.g., 4421. For example, the user may need to present him/her-self via a video chat, e.g., 4422. In some implementations, a customer service representative, e.g., agent 4424, may manually determine the authenticity of the user using the video of the user. In some implementations, the MCB-Platform may utilize face, biometric and/or like recognition (e.g., using pattern classification techniques) to determine the identity of the user. In some implementations, the app may provide reference marker (e.g., cross-hairs, target box, etc.), e.g., 4423, so that the user may the video to facilitate the MCB-Platform's automated recognition of the user. In some implementations, the user may not have initiated the transaction, e.g., the transaction is fraudulent. In such implementations, the user may cancel the challenge. The MCB-Platform may then cancel the transaction, and/or initiate fraud investigation procedures on behalf of the user.

In some implementations, the MCB-Platform may utilize a text challenge procedure to verify the authenticity of the user, e.g., 4425. For example, the MCB-Platform may communicate with the user via text chat, SMS messages, electronic mail, Facebook® messages, Twitter™ tweets, and/or the like. The MCB-Platform may pose a challenge question, e.g., 4426, for the user. The app may provide a user input interface element(s) (e.g., virtual keyboard 4428) to answer the challenge question posed by the MCB-Platform. In some implementations, the challenge question may be randomly selected by the MCB-Platform automatically; in some implementations, a customer service representative may manually communicate with the user. In some implementations, the user may not have initiated the transaction, e.g., the transaction is fraudulent. In such implementations, the user may cancel the text challenge. The MCB-Platform may cancel the transaction, and/or initiate fraud investigation on behalf of the user.

MCB-Platform Card Based Transactions

Figure 45:
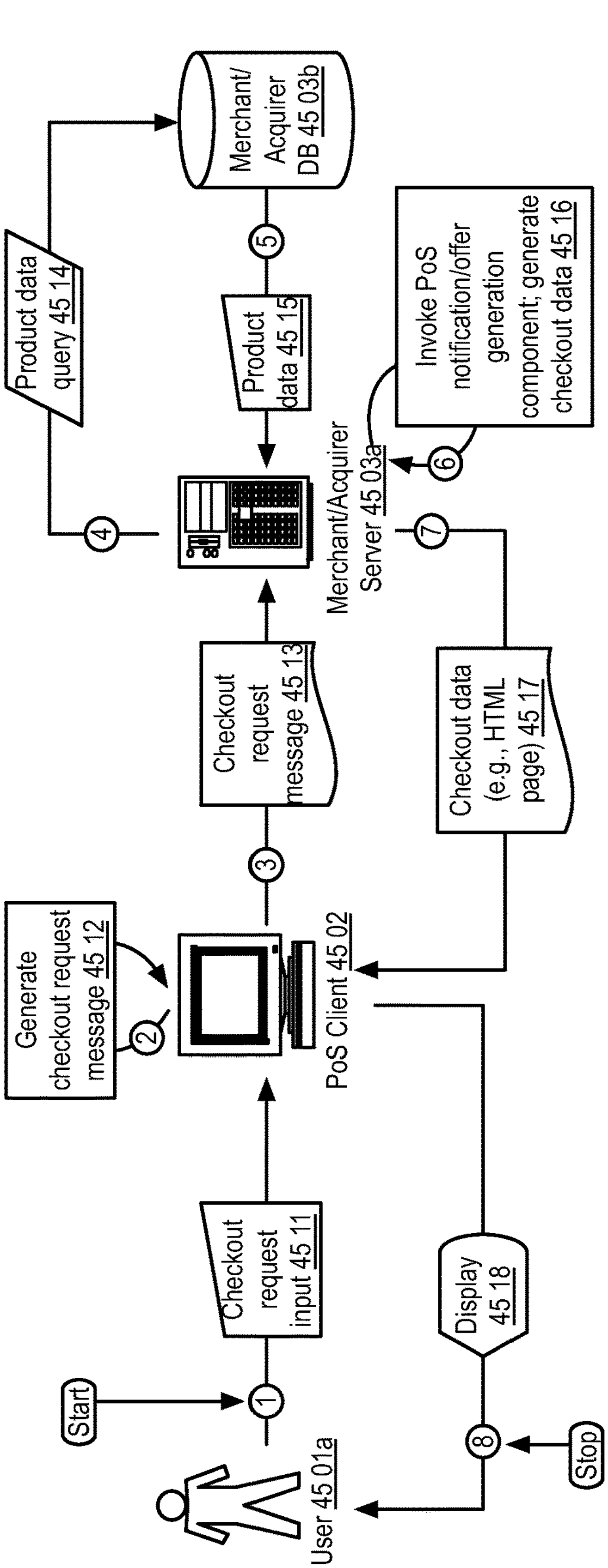
FIG. 45 shows a data flow diagram illustrating an example user purchase checkout procedure in some embodiments of the MCB-Platform.

FIG. 45 shows a data flow diagram illustrating an example user purchase checkout procedure in some embodiments of the MCB-Platform. In some embodiments, a user, e.g., 4501*a*, may desire to purchase a product, service, offering, and/or the like ("product"), from a merchant via a merchant online site or in the merchant's store. The user may communicate with a merchant/acquirer ("merchant") server, e.g., 4503*a*, via a client such as, but not limited to: a personal computer, mobile device, television, point-of-sale terminal, kiosk, ATM, and/or the like (e.g., 4502). For example, the user may provide user input, e.g., checkout input 4511, into the client indicating the user's desire to purchase the product. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. As an example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. For example, the user may activate a user interface element provided by the client to indicate the user's desire to complete the user purchase checkout. The client may generate a checkout request, e.g., 4512, and provide the checkout request, e.g., 4513, to the merchant server. For example, the client may provide a (Secure) Hypertext Transfer Protocol ("HTTP(S)") POST message including the product details for the merchant server in the form of data formatted according to the eXtensible Markup Language ("XML"). An example listing of a checkout request 4512, substantially in the form of a HTTP(S) POST message including XML-formatted data, is provided below:

```
POST /checkoutrequest.php HTTP/1.1
Host: www.merchant.com
Content-Type: Application/XML
Content-Length: 667
<?XML version = "1.0" encoding = "UTF-8"?>
<checkout_request>
    <checkout_ID>4NFU4RG94</checkout_ID>
    <timestamp>2011-02-22 15:22:43</timestamp>
    <purchase_detail>
        <num_products>5</num_products>
        <product_ID>AE95049324</product_ID>
        <product_ID>MD09808755</product_ID>
        <product_ID>OC12345764</product_ID>
        <product_ID>KE76549043</product_ID>
        <product_ID>SP27674509</product_ID>
    </purchase_detail>
<!--optional parameters-->
    <user_ID>john.q.public@gmail.com</user_ID>
    <PoS_client_detail>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </PoS_client_detail>
</checkout_request>
```

In some embodiments, the merchant server may obtain the checkout request from the client, and extract the checkout detail (e.g., XML data) from the checkout request. For example, the merchant server may utilize a parser such as the example parsers described below in the discussion with reference to FIG. 51. Based on parsing the checkout request 4512, the merchant server may extract product data (e.g., product identifiers), as well as available PoS client data, from the checkout request. In some embodiments, using the product data, the merchant server may query, e.g., 4514, a merchant/acquirer ("merchant") database, e.g., 4503*b*, to obtain product data, e.g., 4515, such as product information, product pricing, sales tax, offers, discounts, rewards, and/or other information to process the purchase transaction and/or provide value-added services for the user. For example, the merchant database may be a relational database responsive to Structured Query Language ("SQL") commands. The merchant server may execute a hypertext preprocessor ("PHP") script including SQL commands to query a database table (such as FIG. 51, Products 5119*r*) for product data. An example product data query 4514, substantially in the form of PHP/SQL commands, is provided below:

```
<?PHP
header('Content-Type: text/plain');
mysql_connect("254.93.179.112",$DBserver,$password); // access
database server
mysql_select_db("MCB-Platform_DB.SQL"); // select database table to
search
//create query
$query = "SELECT product_title product_attributes_list product_price
tax_info_list related_products_list
offers_list discounts_list rewards_list merchants_list
merchant_availability_list FROM ProductsTable
WHERE product_ID LIKE '%' $prodID";
$result = mysql_query($query); // perform the search query
mysql_close("MCB-Platform_DB.SQL"); // close database access
?>
```

In some embodiments, in response to obtaining the product data, the merchant server may generate, e.g., 4516, checkout data to provide for the PoS client. In some embodiments, such checkout data, e.g., 4517, may be embodied, in part, in a HyperText Markup Language ("HTML") page including data for display, such as product detail, product pricing, total pricing, tax information, shipping information, offers, discounts, rewards, value-added service information, etc., and input fields to provide payment information to process the purchase transaction, such as account holder name, account number, billing address, shipping address, tip amount, etc. In some embodiments, the checkout data may be embodied, in part, in a Quick Response ("QR") code image that the PoS client can display, so that the user may capture the QR code using a user's device to obtain merchant and/or product data for generating a purchase transaction processing request. In some embodiments, a user alert mechanism may be built into the checkout data. For example, the merchant server may embed a URL specific to the transaction into the checkout data. In some embodiments, the alerts URL may further be embedded into optional level 3 data in card authorization requests, such as those discussed further below with reference to FIGS. 47-48. The URL may point to a webpage, data file, executable script, etc., stored on the merchant's server dedicated to the transaction that is the subject of the card authorization request. For example, the object pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network. In some embodiments, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like. An example listing of a checkout data 4517, substantially in the form of XML-formatted data, is provided below:

```
<?XML version = "1.0" encoding = "UTF-8"?>
<checkout_data>
    <session_ID>4NFU4RG94</session_ID>
    <timestamp>2011-02-22 15:22:43</timestamp>
```

-continued

```
    <expiry_lapse>00:00:30</expiry_lapse>
    <transaction_cost>$34.78</transaction_cost>
    <alerts_URL>www.merchant.com/shopcarts.php?sessionID=4NFU4RG94</alerts_URL>
    <!--optional data-->
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <offers_details>
        <num_offers>1</num_offers>
        <product>
            <product_type>book</product_type>
            <product_params>
                <product_title>Here's more XML</product_title>
                <ISBN>922-7-14-165720-1</ISBN>
                <edition>1nd ed.</edition>
                <cover>hardbound</cover>
                <seller>digibooks</seller>
            </product_params>
            <quantity>1</quantity>
        </product>
    </offers_details>
    <secure_element>www.merchant.com/securedyn/0394733/123.png</secure_element>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
<checkout_data>
```

In alternate embodiments, the merchant server may invoke a component to generate checkout data, such as the example PoS terminal checkout discussed above with reference to FIG. 3A. Upon obtaining the checkout data, e.g., 4517, the PoS client may render and display, e.g., 4518, the checkout data for the user.

Figure 46:
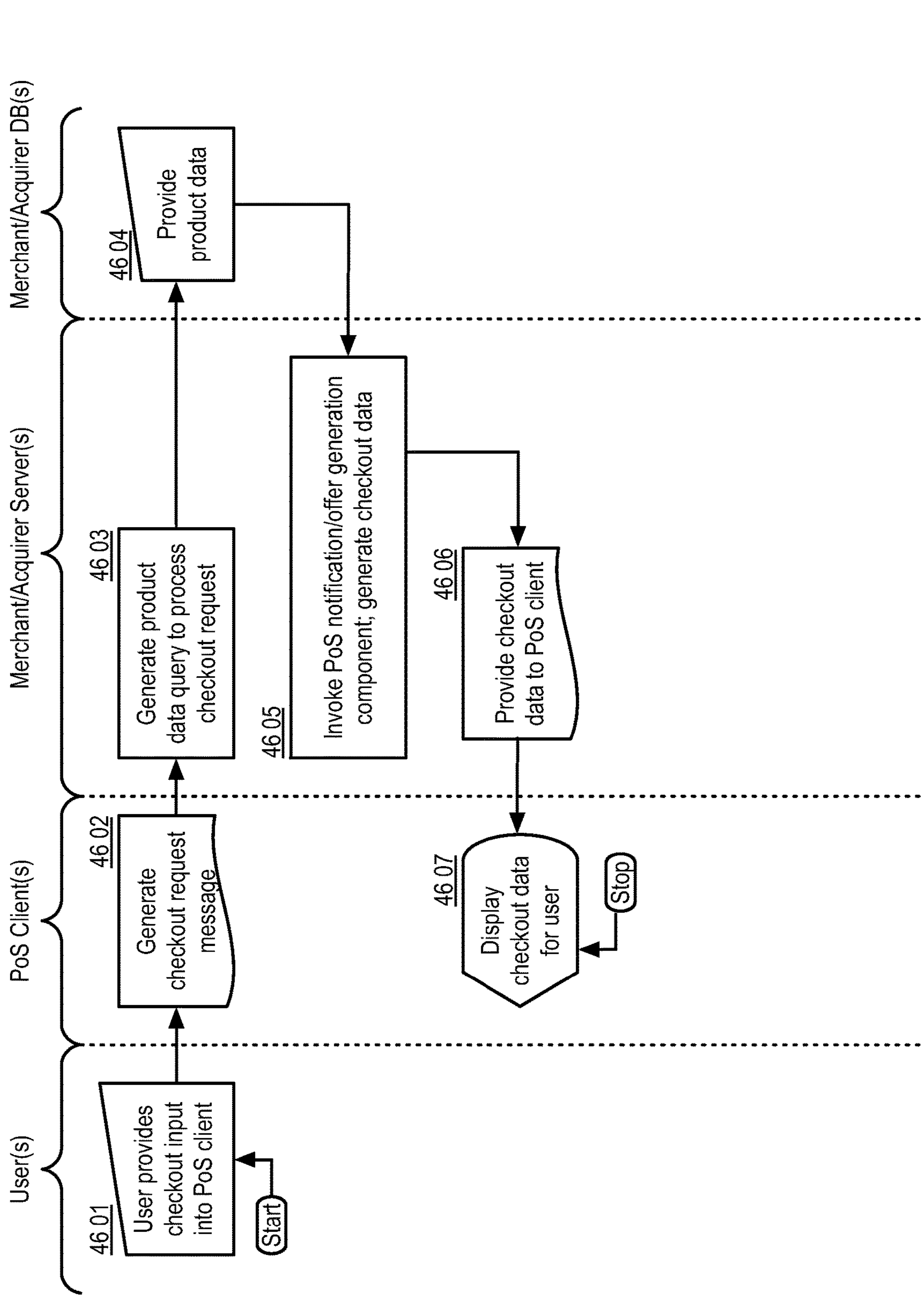
FIG. 46 shows a logic flow diagram illustrating example aspects of a user purchase checkout in some embodiments of the MCB-Platform, e.g., a User Purchase Checkout ("UPC") component 4600.

FIG. 46 shows a logic flow diagram illustrating example aspects of a user purchase checkout in some embodiments of the MCB-Platform, e.g., a User Purchase Checkout ("UPC") component 4600. In some embodiments, a user may desire to purchase a product, service, offering, and/or the like ("product"), from a merchant via a merchant online site or in the merchant's store. The user may communicate with a merchant/acquirer ("merchant") server via a PoS client. For example, the user may provide user input, e.g., 4601, into the client indicating the user's desire to purchase the product. The client may generate a checkout request, e.g., 4602, and provide the checkout request to the merchant server. In some embodiments, the merchant server may obtain the checkout request from the client, and extract the checkout detail (e.g., XML data) from the checkout request. For example, the merchant server may utilize a parser such as the example parsers described below in the discussion with reference to FIG. 51. Based on parsing the checkout request, the merchant server may extract product data (e.g., product identifiers), as well as available PoS client data, from the checkout request. In some embodiments, using the product data, the merchant server may query, e.g., 4603, a merchant/acquirer ("merchant") database to obtain product data, e.g., 4604, such as product information, product pricing, sales tax, offers, discounts, rewards, and/or other information to process the purchase transaction and/or provide value-added services for the user. In some embodiments, in response to obtaining the product data, the merchant server may generate, e.g., 4605, checkout data to provide, e.g., 4606, for the PoS client. In some embodiments, the merchant server may invoke a component to generate checkout data, such as the example POS terminals discussed above with reference to FIG. 3A. Upon obtaining the checkout data, the PoS client may render and display, e.g., 4607, the checkout data for the user.

Figure 47A:
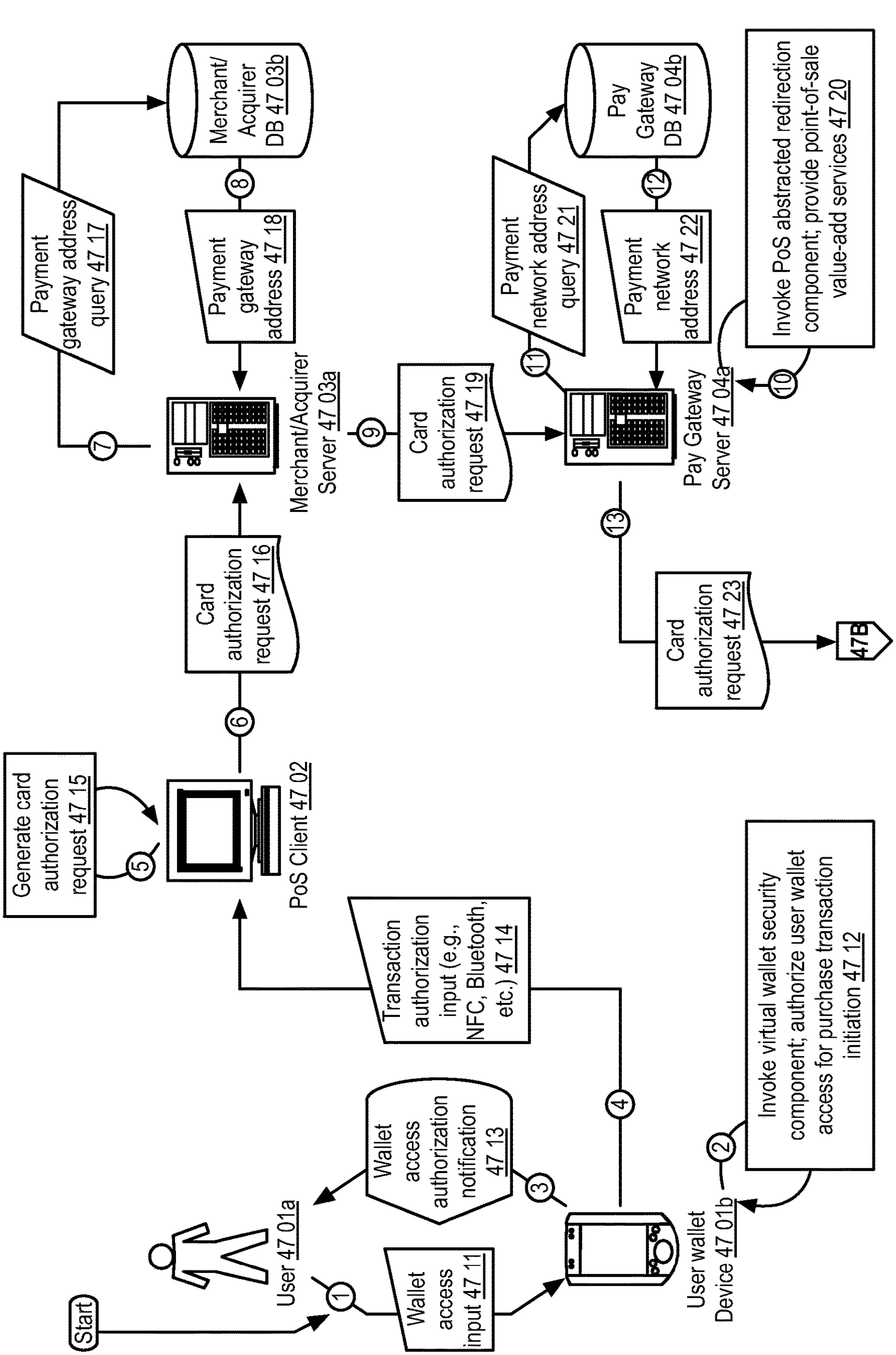
FIGS. 47A-B show data flow diagrams illustrating an example purchase transaction authorization procedure in some embodiments of the MCB-Platform.
Figure 47B:
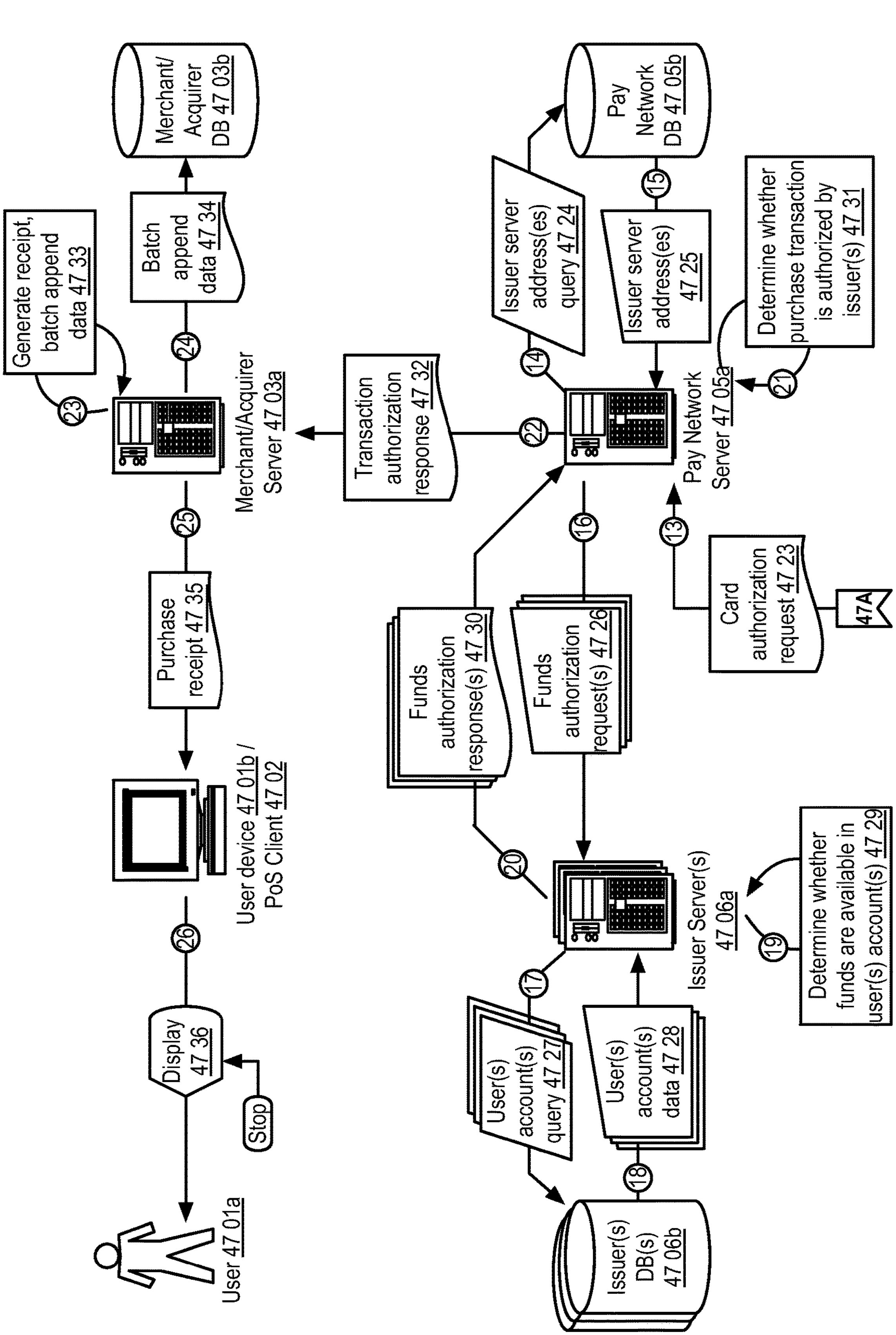

FIGS. 47A-B show data flow diagrams illustrating an example purchase transaction authorization procedure in some embodiments of the MCB-Platform. With reference to FIG. 47A, in some embodiments, a user, e.g., 4701*a*, may wish to utilize a virtual wallet account to purchase a product, service, offering, and/or the like ("product"), from a merchant via a merchant online site or in the merchant's store. The user may utilize a physical card, or a user wallet device, e.g., 4701*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 4711 into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user. In some embodiments, the user wallet device may invoke a component to ensure the security of the user's wallet, such as the consumer wallet credentials discussed above with reference to FIGS. 3C and 4B.

In some embodiments, upon authenticating the user for access to virtual wallet features, the user wallet device may provide a transaction authorization input, e.g., 4714, to a point-of-sale ("PoS") client, e.g., 4702. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 4714, track 1 data from the user's plastic card (e.g., credit card, debit card, prepaid card, charge card, etc.), such as the example track 1 data provided below:

%B123456789012345^PUBLIC/J.Q.^99011200000000000000901****?*

(wherein '123456789012345' is the card number of 'J.Q. Public' and has a CVV number of 901. '990112' is a service code, and *** represents decimal digits which change randomly each time the card is used.)

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 4714, substantially in the form of XML-formatted data, is provided below:

```
<?XML version = "1.0" encoding = "UTF-8"?>
transaction__authorization__input>
    <payment__data>
        <account>
            <charge__priority>1</charge__priority>
            <charge__ratio>40%</charge__ratio>
            <account__number>123456789012345</account__number>
            <account__name>John Q. Public</account__name>
            <bill__add>987 Green St #456, Chicago, IL
            94652</bill__add>
            <ship__add>987 Green St #456, Chicago, IL
            94652</ship__add>
            <CVV>123</CVV>
        </account>
        <account>
            <charge__priority>1</charge__priority>
            <charge__ratio>60%</charge__ratio>
            <account__number>234567890123456</account__number>
            <account__name>John Q. Public</account__name>
            <bill__add>987 Green St #456, Chicago, IL
            94652</bill__add>
            <ship__add>987 Green St #456, Chicago, IL
            94652</ship__add>
            <CVV>173</CVV>
        </account>
        <account>
            <charge__priority>2</charge__priority>
            <charge__ratio>100%</charge__ratio>
            <account__number>345678901234567</account__number>
            <account__name>John Q. Public</account__name>
            <bill__add>987 Green St #456, Chicago, IL
            94652</bill__add>
            <ship__add>987 Green St #456, Chicago, IL
            94652</ship__add>
            <CVV>695</CVV>
        </account>
    </payment__data>
    <!--optional data-->
    <timestamp>2011-02-22 15:22:43</timestamp>
    <expiry__lapse>00:00:30</expiry__lapse>
    <secure__key>0445329070598623487956543322</secure__key>
    <alerts__track__flag>TRUE</alerts__track__flag>
    <wallet__device__details>
        <device__IP>192.168.23.126</client__IP>
        <device__type>smartphone</client__type>
        <device__model>HTC Hero</client__model>
        <OS>Android 2.2</OS>
        <wallet__app__installed__flag>true</wallet__app__installed__flag>
    </wallet__device__details>
</transaction__authorization__input>
```

In some embodiments, the PoS client may generate a card authorization request, e.g., 4715, using the obtained transaction authorization input from the user wallet device, and/or product/checkout data (see, e.g., FIG. 45, 4515-4517). An example listing of a card authorization request 4715, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8"?>
<card_authorization_request>
    <session_ID>4NFU4RG94</order_ID>
    <timestamp>2011-02-22 15:22:43</timestamp>
    <expiry>00:00:30</expiry>
    <alerts_URL>www.merchant.com/shopcarts.php?sessionID=AEBB4356</alerts_URL>
    <!--optional data-->
    <user_ID>john.q.public@gmail.com</user_ID>
    <PoS_details>
        <PoS_IP>192.168.23.126</client_IP>
        <PoS_type>smartphone</client_type>
        <PoS_model>HTC Hero</client_model>
        <OS>Android 2.2</OS>
        <app_installed_flag>true</app_installed_flag>
    </PoS_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</card_authorization_request>
```

In some embodiments, the card authorization request generated by the user device may include a minimum of information required to process the purchase transaction. For example, this may improve the efficiency of communicating the purchase transaction request, and may also advantageously improve the privacy protections provided to the user and/or merchant. For example, in some embodiments, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server, e.g., 4716. The merchant server may forward the card authorization request to a pay gateway server, e.g., 4704*a*, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 4703*b*, for a network address of the payment gateway server, for example by using a portion of a user payment card number, or a user ID (such as an email address) as a keyword for the database query. For example, the merchant server may issue PHP/SQL commands to query a database table (such as FIG. 51, Pay Gateways 5119*n*) for a URL of the pay gateway server. An example payment gateway address query 4717, substantially in the form of PHP/SQL commands, is provided below:

```
<?PHP
header('Content-Type: text/plain');
mysql_connect("254.93.179.112",$DBserver,$password); // access
database server
mysql_select_db("MCB-Platform_DB.SQL"); // select database table to
search
//create query
$query = "SELECT paygate_id paygate_address paygate_URL
paygate_name FROM PayGatewayTable
WHERE card_num LIKE '%' $cardnum";
$result = mysql_query($query); // perform the search query
mysql_close("MCB-Platform_DB.SQL"); // close database access
?>
```

In response, the merchant/acquirer database may provide the requested payment gateway address, e.g., 4718. The merchant server may forward the card authorization request to the pay gateway server using the provided address, e.g., 4719. In some embodiments, upon receiving the card authorization request from the merchant server, the pay gateway server may invoke a component to provide one or more services associated with purchase transaction authorization. For example, the pay gateway server may invoke components for fraud prevention, loyalty and/or rewards, and/or other services for which the user-merchant combination is authorized. In some embodiments, the pay gateway server may invoke a component to provide point-of-sale value-add services. The pay gateway server may forward the card authorization request to a pay network server, e.g., 4705*a*, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 4704*b*, for a network address of the payment network server, for example by using a portion of a user payment card number, or a user ID (such as an email address) as a keyword for the database query. For example, the pay gateway server may issue PHP/SQL commands to query a database table (such as FIG. 51, Pay Gateways 5119*n*) for a URL of the pay network server. An example payment network address query 4721, substantially in the form of PHP/SQL commands, is provided below:

```
<?PHP
header('Content-Type: text/plain');
mysql_connect("254.93.179.112",$DBserver,$password); // access
database server
mysql_select_db("MCB-Platform_DB.SQL"); // select database table to
search
//create query
$query = "SELECT payNET_id payNET_address payNET_URL
payNET_name FROM PayGatewayTable
WHERE card_num LIKE '%' $cardnum";
$result = mysql_query($query); // perform the search query
mysql_close("MCB-Platform_DB.SQL"); // close database access
?>
```

In response, the payment gateway database may provide the requested payment network address, e.g., 4722. The pay gateway server may forward the card authorization request to the pay network server using the provided address, e.g., 4723.

With reference to FIG. 47B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

Figure 51:
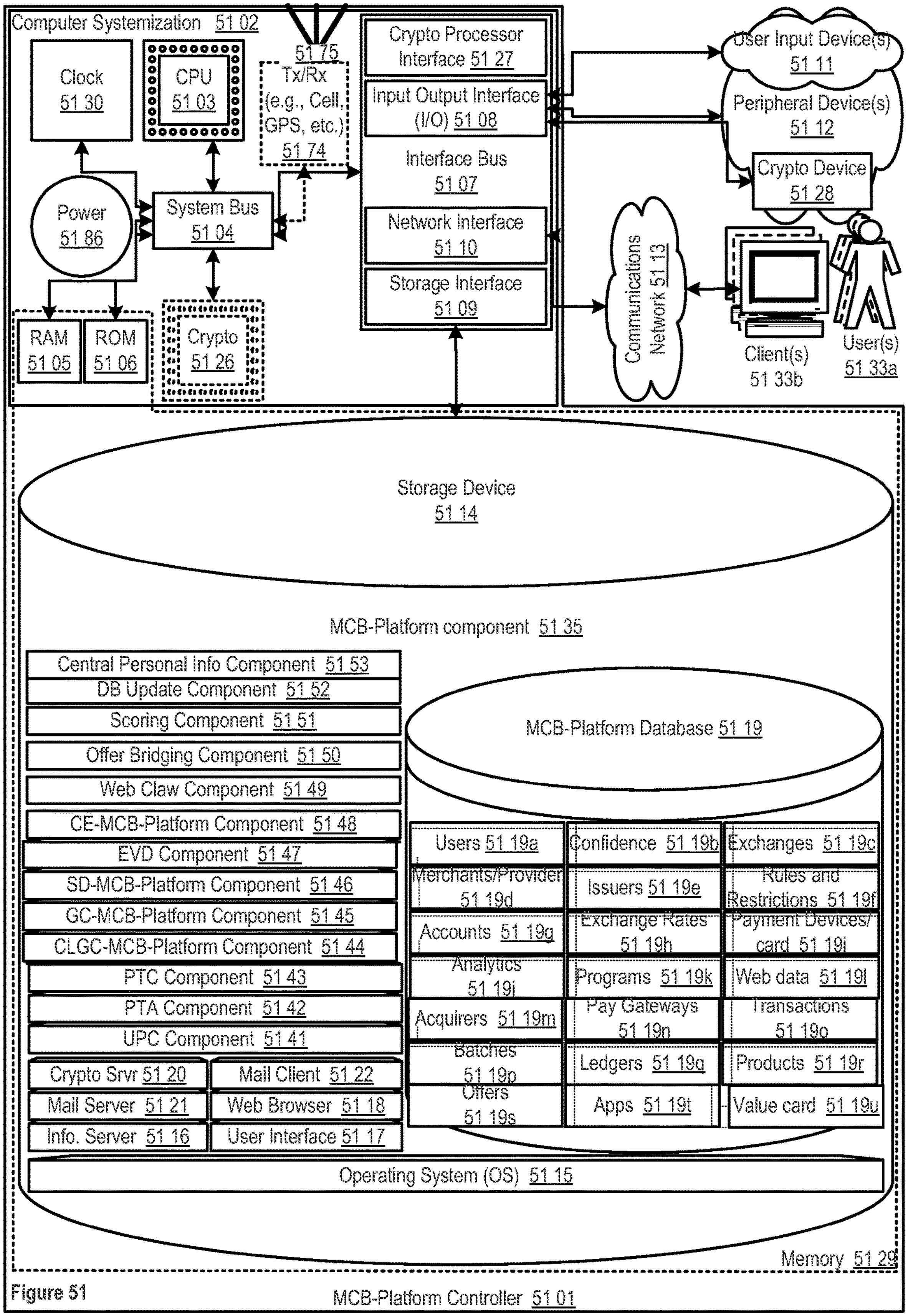
FIG. 51 shows a block diagram illustrating embodiments of a MCB-Platform controller.

In some embodiments, the pay network server may generate a query, e.g., 4724, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 4706*a*, of the issuer(s) may maintain details of the user's account(s). In some embodiments, a database, e.g., pay network database 4705*b*, may store details of the issuer server(s) associated with the issuer(s). In some embodiments, the pay network server may query a database, e.g., pay network database 4705*b*, for a network address of the issuer(s) server(s), for example by using a portion of a user payment card number, or a user ID (such as an email address) as a keyword for the database query. For example, the merchant server may issue PHP/SQL commands to query a database table (such as FIG. 51, Issuers 5119*e*) for network address(es) of the issuer(s) server(s). An example issuer server address(es) query 4724, substantially in the form of PHP/SQL commands, is provided below:

```
<?PHP
header('Content-Type: text/plain');
mysql_connect("254.93.179.112",$DBserver,$password); // access
database server
mysql_select_db("MCB-Platform_DB.SQL"); // select database table to
search
//create query
$query = "SELECT issuer_id issuer_address issuer_URL issuer_name
FROM IssuersTable WHERE
card_num LIKE '%' $cardnum";
$result = mysql_query($query); // perform the search query
mysql_close("MCB-Platform_DB.SQL"); // close database access
?>
```

In response to obtaining the issuer server query, e.g., 4724, the pay network database may provide, e.g., 4725, the requested issuer server data to the pay network server. In some embodiments, the pay network server may utilize the issuer server data to generate funds authorization request(s), e.g., 4726, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 4726, substantially in the form of a HTTP(S) POST message including XML-formatted data, is provided below:

```
POST /fundsauthorizationrequest.php HTTP/1.1
Host: www.issuer.com
Content-Type: Application/XML
Content-Length: 624
<?XML version = "1.0" encoding = "UTF-8"?>
<funds_authorization_request>
    <query_ID>VNEI39FK</query_ID>
    <timestamp>2011-02-22 15:22:44</timestamp>
    <transaction_cost>$22.61</transaction_cost>
    <account_params>
        <account_type>checking</account_type>
        <account_num>1234567890123456</account_num>
    </account_params>
    <!--optional parameters-->
    <purchase_summary>
        <num_products>1</num_products>
        <product>
            <product_summary>Book - XML for dummies</product_summary>
            <product_quantity>1</product_quantity?
        </product>
    </purchase_summary>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
</funds_authorization_request>
```

In some embodiments, an issuer server may parse the authorization request(s), and based on the request details may query a database, e.g., user profile database 4706*b*, for data associated with an account linked to the user. For example, the merchant server may issue PHP/SQL commands to query a database table (such as FIG. 51, Accounts 5119*g*) for user account(s) data. An example user account(s) query 4727, substantially in the form of PHP/SQL commands, is provided below:

```
<?PHP
header('Content-Type: text/plain');
mysql_connect("254.93.179.112",$DBserver,$password); // access
database server
mysql_select_db("MCB-Platform_DB.SQL"); // select database table to
search
//create query
$query = "SELECT issuer user_id user_name user_balance
account_type FROM AccountsTable WHERE
account_num LIKE '%' $accountnum";
$result = mysql_query($query); // perform the search query
mysql_close("MCB-Platform DB.SQL"); // close database access
?>
```

In some embodiments, on obtaining the user account(s) data, e.g., 4728, the issuer server may determine whether the user can pay for the transaction using funds available in the account, 4729. For example, the issuer server may determine whether the user has a sufficient balance remaining in the account, sufficient credit associated with the account, and/or the like. Based on the determination, the issuer server(s) may provide a funds authorization response, e.g., 4730, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 4731, the pay network server may invoke a component to provide value-add services for the user. In some embodiments, the pay gateway server may invoke a component to provide point-of-sale value-add services. In various embodiments, such value-add services may be provided at any point in the purchase transaction process, including before the pay gateway server(s) and/or pay network server(s) obtain verification from the issuer server(s) that the user has funds sufficient for the transaction to be processed, or prior to obtaining such verification.

In some embodiments, the pay network server may generate a transaction data record from the authorization request and/or authorization response, and store the details of the transaction and authorization relating to the transaction in a transactions database. For example, the pay network server may issue PHP/SQL commands to store the data to a database table (such as FIG. 51, Transactions 5119*o*). An example transaction store command, substantially in the form of PHP/SQL commands, is provided below:

```
<?PHP
header('Content-Type: text/plain');
mysql_connect("254.92.185.103",$DBserver,$password); // access
database server
mysql_select("MCB-Platform_DB.SQL"); // select database to append
mysql_query("INSERT INTO TransactionsTable (PurchasesTable
(timestamp, purchase_summary_list,
num_products, product_summary, product_quantity, transaction_cost,
account_params_list, account_name,
account_type, account_num, billing_addres, zipcode, phone, sign,
merchant_params_list, merchant_id,
merchant_name, merchant_auth_key)
VALUES (time( ), $purchase_summary_list, $num_products,
$product_summary, $product_quantity,
$transaction_cost, $account_params_list, $account_name,
```

-continued

```
$account_type, $account_num, $billing_addres,
$zipcode, $phone, $sign, $merchant_params_list, $merchant_id,
$merchant_name, $merchant_auth_key)");
// add data to table in database
mysql_close("MCB-Platform_DB.SQL"); // close connection to database
?>
```

In some embodiments, the pay network server may forward a transaction authorization response, e.g., 4732, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 4733, and store the XML data file, e.g., 4734, in a database, e.g., merchant database 404. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365</merchant_auth_key>
    <account_number>123456789</account_number>
</merchant_data>
<transaction_data>
    <transaction 1>
        ...
    </transaction 1 >
    <transaction 2>
        ...
    </transaction 2>
        .
        .
        .
    <transaction n>
        ...
    </transaction n>
</transaction_data>
```

In some embodiments, the server may also generate a purchase receipt, e.g., 4733, and provide the purchase receipt to the client, e.g., 4735. The client may render and display, e.g., 4736, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 48A:
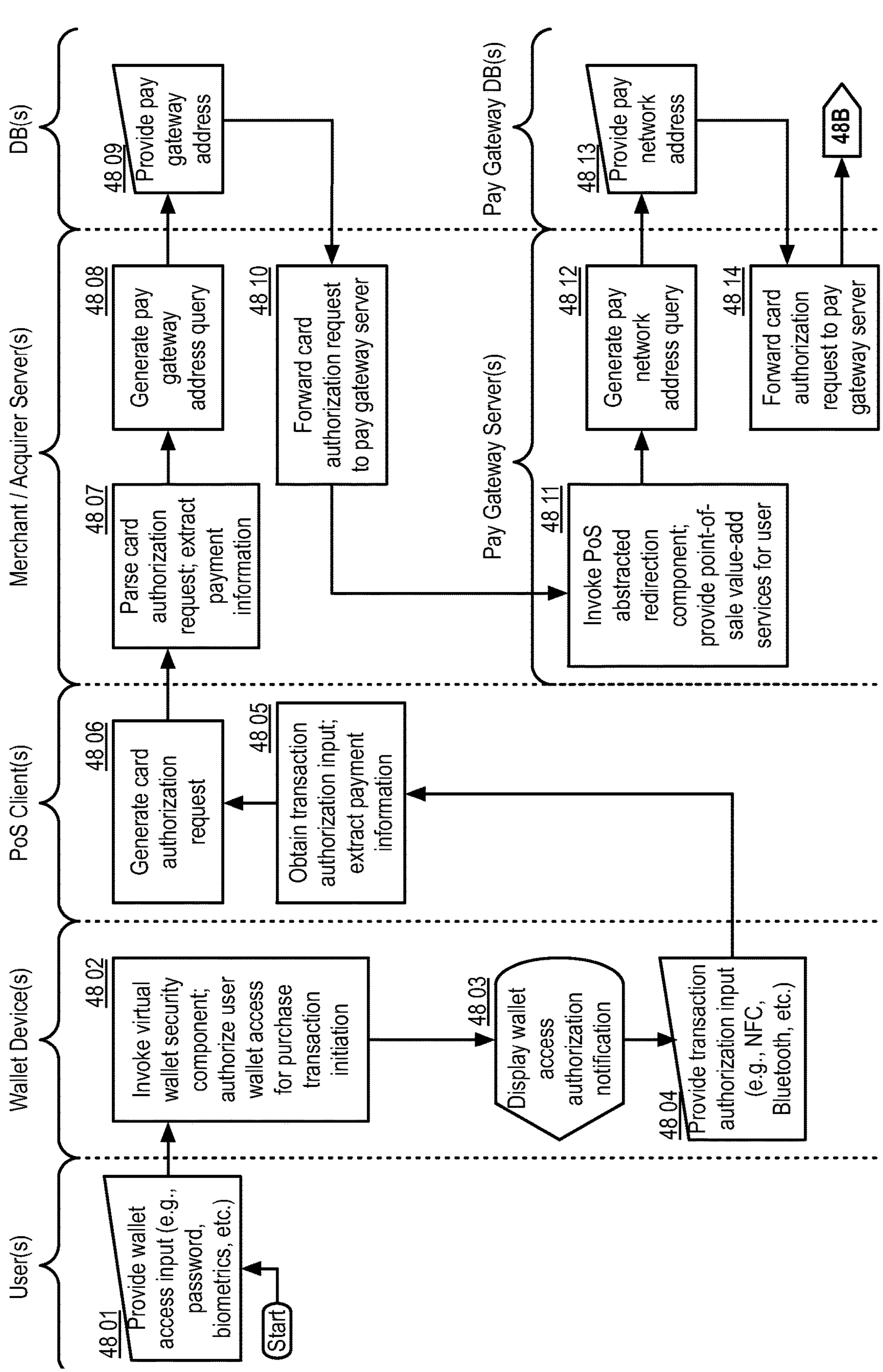
FIGS. 48A-B show logic flow diagrams illustrating example aspects of purchase transaction authorization in some embodiments of the MCB-Platform, e.g., a Purchase Transaction Authorization ("PTA") component 4800.
Figure 48B:
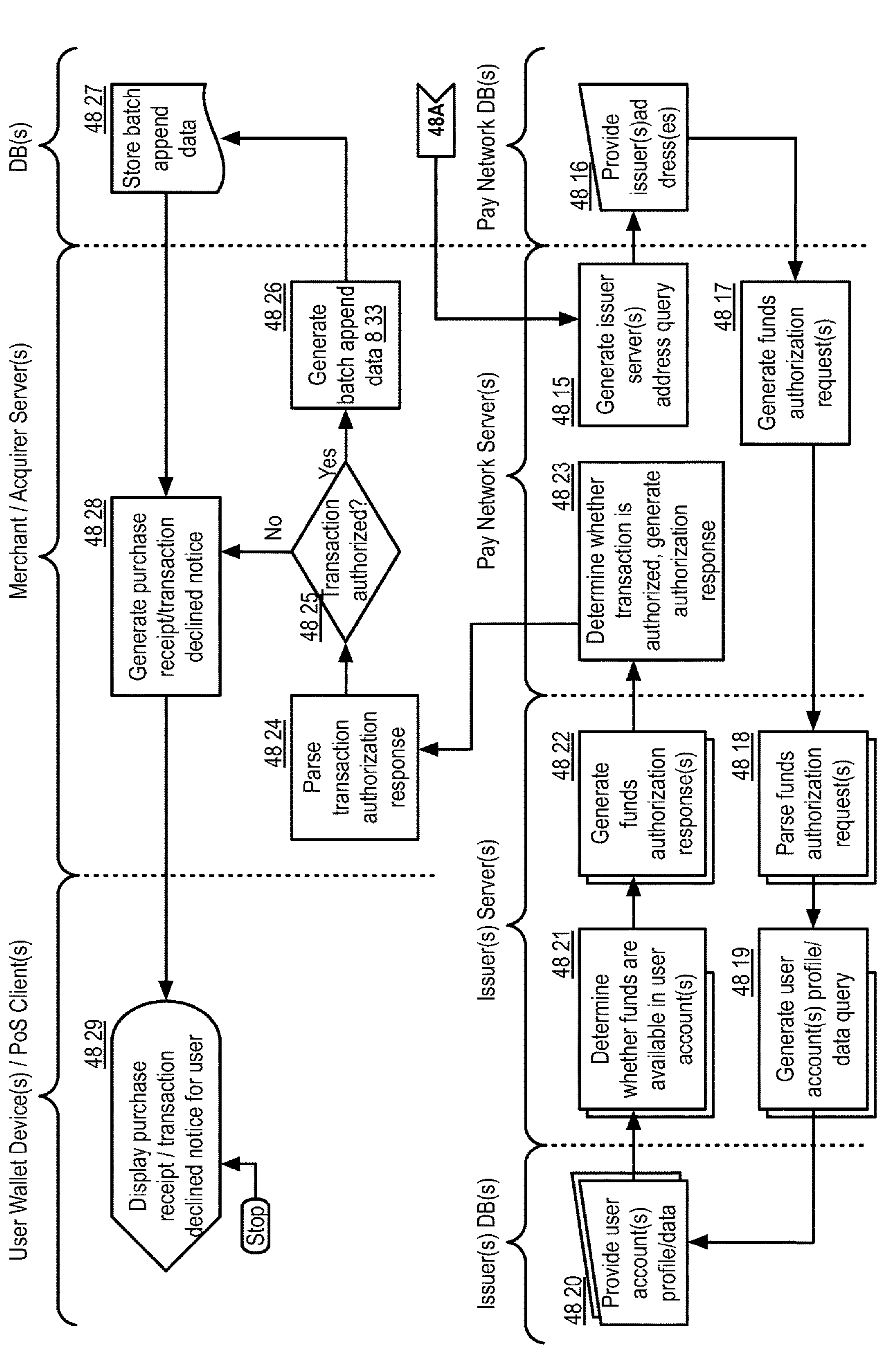

FIGS. 48A-B show logic flow diagrams illustrating example aspects of purchase transaction authorization in some embodiments of the MCB-Platform, e.g., a Purchase Transaction Authorization ("PTA") component 4800. With reference to FIG. 48A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 4801, into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 4802-4803. In some embodiments, the user wallet device may invoke a component to ensure the security of the user's wallet, such as the consumer wallet credentials discussed above with reference to FIGS. 3B and 4C.

In some embodiments, upon authenticating the user for access to virtual wallet features, the user wallet device may provide a transaction authorization input, e.g., 4804, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 4805. For example, the PoS client may utilize a parser, such as the example parsers provided below in the discussion with reference to FIG. 51. The PoS client may generate a card authorization request, e.g., 4806, using the obtained transaction authorization input from the user wallet device, and/or product/checkout data (see, e.g., FIG. 45, 4515-4517).

In some embodiments, the PoS client may provide the generated card authorization request to the merchant server. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 4808, for a network address of the payment gateway server, for example by using a portion of a user payment card number, or a user ID (such as an email address) as a keyword for the database query. In response, the merchant/acquirer database may provide the requested payment gateway address, e.g., 4810. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 4811. For example, the pay gateway server may invoke components for fraud prevention (see e.g., VerifyChat, FIG. 3E), loyalty and/or rewards, and/or other services for which the user-merchant combination is authorized.

The pay gateway server may forward the card authorization request to a pay network server for payment processing, e.g., 4814. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., 4812, for a network address of the payment network server, for example by using a portion of a user payment card number, or a user ID (such as an email address) as a keyword for the database query. In response, the payment gateway database may provide the requested payment network address, e.g., 4813. The pay gateway server may forward the card authorization request to the pay network server using the provided address, e.g., 4814.

With reference to FIG. 48B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the pay network server may generate a query, e.g., 4815, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 4815, for a network address of the issuer(s) server(s), for example by using a portion of a user payment card number, or a user ID (such as an email address) as a keyword for the database query.

In response to obtaining the issuer server query, the pay network database may provide, e.g., 4816, the requested issuer server data to the pay network server. In some embodiments, the pay network server may utilize the issuer server data to generate funds authorization request(s), e.g., 4817, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 4818, and based on the request details may query a database, e.g., 4819, for data associated with an account linked to the user.

In some embodiments, on obtaining the user account(s) data, e.g., 4820, the issuer server may determine whether the user can pay for the transaction using funds available in the account, e.g., 4821. For example, the issuer server may determine whether the user has a sufficient balance remaining in the account, sufficient credit associated with the account, and/or the like. Based on the determination, the issuer server(s) may provide a funds authorization response, e.g., 4822, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 4823, the pay network server may invoke a component to provide value-add services for the user, e.g., 4823.

In some embodiments, the pay network server may forward a transaction authorization response to the user wallet device, PoS client, and/or merchant server. The merchant may parse, e.g., 4824, the transaction authorization response, and determine from it that the user possesses sufficient funds in the card account to conduct the transaction, e.g., 4825, option"Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 4826, and store the XML data file, e.g., 4827, in a database. In some embodiments, the server may also generate a purchase receipt, e.g., 4828, and provide the purchase receipt to the client. The client may render and display, e.g., 4829, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 49A:
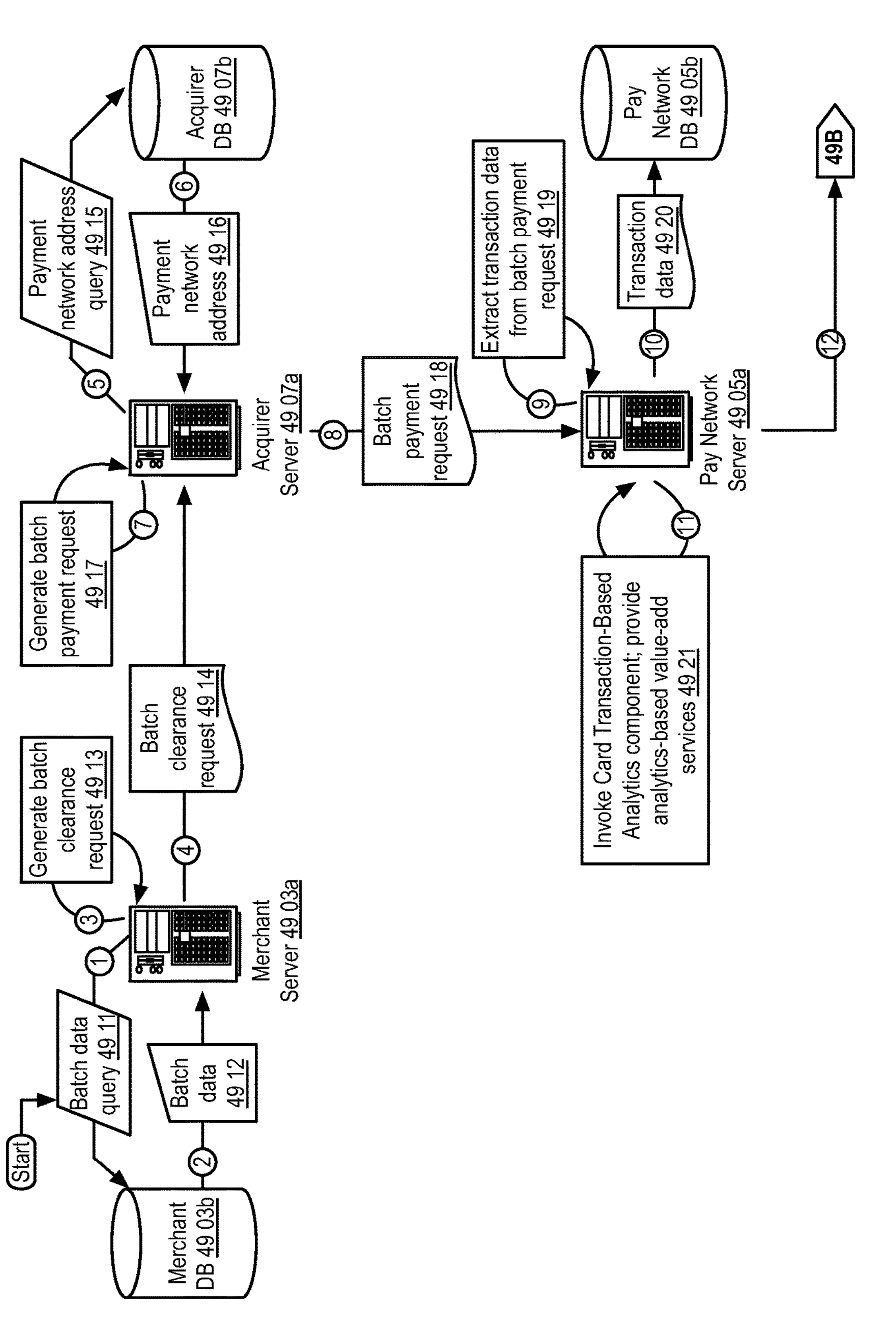
FIGS. 49A-B show data flow diagrams illustrating an example purchase transaction clearance procedure in some embodiments of the MCB-Platform.
Figure 49B:
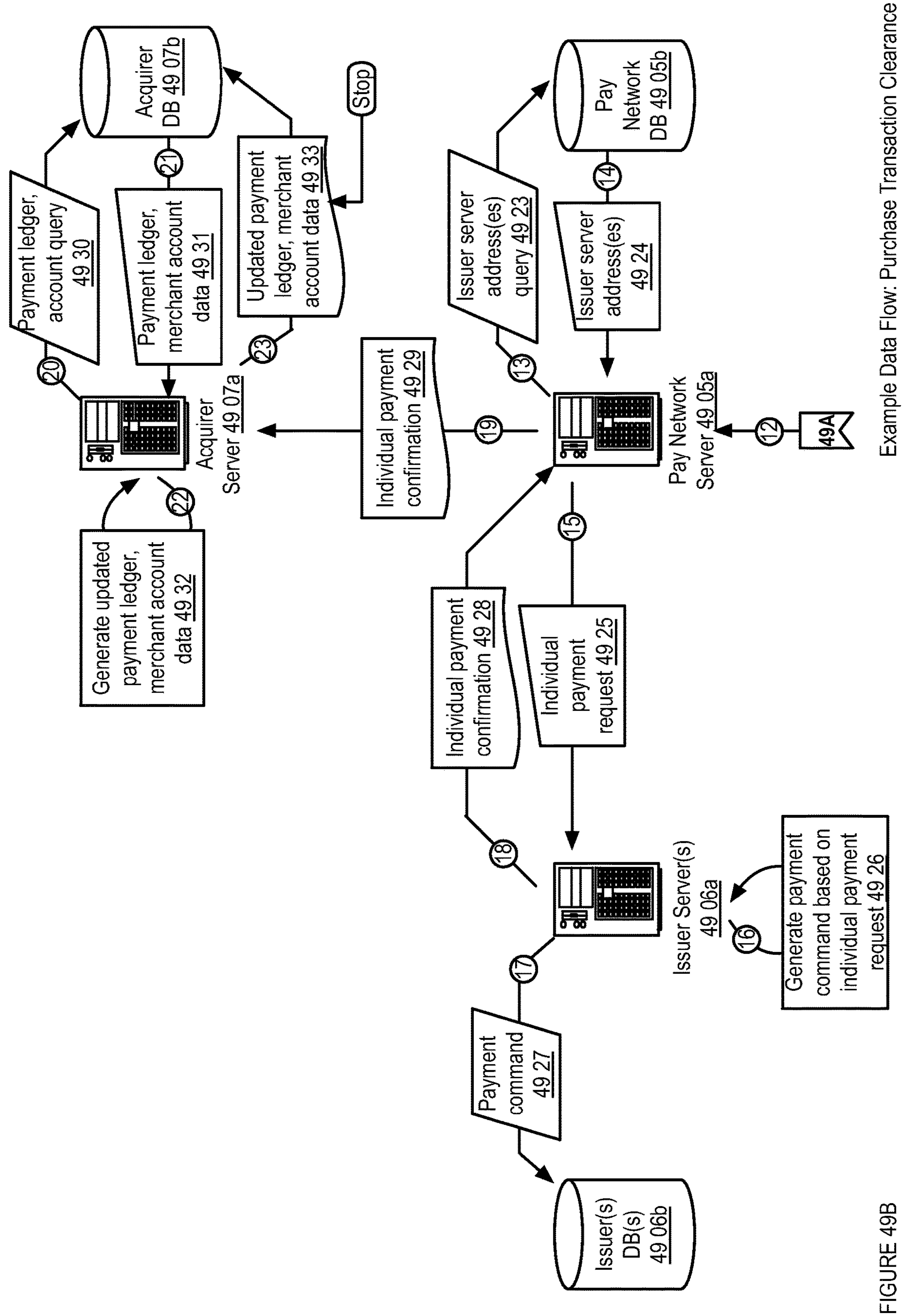

FIGS. 49A-B show data flow diagrams illustrating an example purchase transaction clearance procedure in some embodiments of the MCB-Platform. With reference to FIG. 49A, in some embodiments, a merchant server, e.g., 4903*a*, may initiate clearance of a batch of authorized transactions. For example, the merchant server may generate a batch data request, e.g., 4911, and provide the request, to a merchant database, e.g., 4903*b*. For example, the merchant server may utilize PHP/SQL commands similar to the examples provided above to query a relational database. In response to the batch data request, the database may provide the requested batch data, e.g., 4912. The server may generate a batch clearance request, e.g., 4913, using the batch data obtained from the database, and provide, e.g., 4914, the batch clearance request to an acquirer server, e.g., 4907*a*. For example, the merchant server may provide a HTTP(S) POST message including XML-formatted batch data in the message body for the acquirer server. The acquirer server may generate, e.g., 4915, a batch payment request using the obtained batch clearance request, and provide, e.g., 4918, the batch payment request to the pay network server, e.g., 4905*a*. The pay network server may parse the batch payment request, and extract the transaction data for each transaction stored in the batch payment request, e.g., 4919. The pay network server may store the transaction data, e.g., 4920, for each transaction in a database, e.g., pay network database 4905*b*. In some embodiments, the pay network server may invoke a component to provide value-add analytics services based on analysis of the transactions of the merchant for whom the MCB-Platform is clearing purchase transactions. For example, the pay network server may invoke a component such as the example card transaction-based analytics component discussed above with reference to FIGS. 27-28. Thus, in some embodiments, the pay network server may provide analytics-based value-added services for the merchant and/or the merchant's users.

With reference to FIG. 49B, in some embodiments, for each extracted transaction, the pay network server may query, e.g., 4923, a database, e.g., pay network database 4905*b*, for an address of an issuer server. For example, the pay network server may utilize PHP/SQL commands similar to the examples provided above. The pay network server may generate an individual payment request, e.g., 4925, for each transaction for which it has extracted transaction data, and provide the individual payment request, e.g., 4925, to the issuer server, e.g., 4906*a*. For example, the pay network server may provide an individual payment request to the issuer server(s) as a HTTP(S) POST message including XML-formatted data. An example listing of an individual payment request 4925, substantially in the form of a HTTP(S) POST message including XML-formatted data, is provided below:

```
POST /paymentrequest.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
    <purchase_summary>
        <num_products>1</num_products>
        <product>
            <product_summary>Book - XML for dummies</product_summary>
            <product_quantity>1</product_quantity?
        </product>
    </purchase_summary>
</pay_request>
```

In some embodiments, the issuer server may generate a payment command, e.g., 4927. For example, the issuer server may issue a command to deduct funds from the user's account (or add a charge to the user's credit card account). The issuer server may issue a payment command, e.g., 4927, to a database storing the user's account information, e.g., user profile database 4906*b*. The issuer server may provide an individual payment confirmation, e.g., 4928, to the pay network server, which may forward, e.g., 4929, the funds transfer message to the acquirer server. An example listing of an individual payment confirmation 4928, substantially in the form of a HTTP(S) POST message including XML-formatted data, is provided below:

```
POST /clearance.php HTTP/1.1
Host: www.acquirer.com
Content-Type: Application/XML
```

-continued

```
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 4930, an acquirer database 4907*b* for payment ledger and/or merchant account data, e.g., 4931. The acquirer server may utilize payment ledger and/or merchant account data from the acquirer database, along with the individual payment confirmation, to generate updated payment ledger and/or merchant account data, e.g., 4932. The acquirer server may then store, e.g., 4933, the updated payment ledger and/or merchant account data to the acquire database.

Figure 50A:
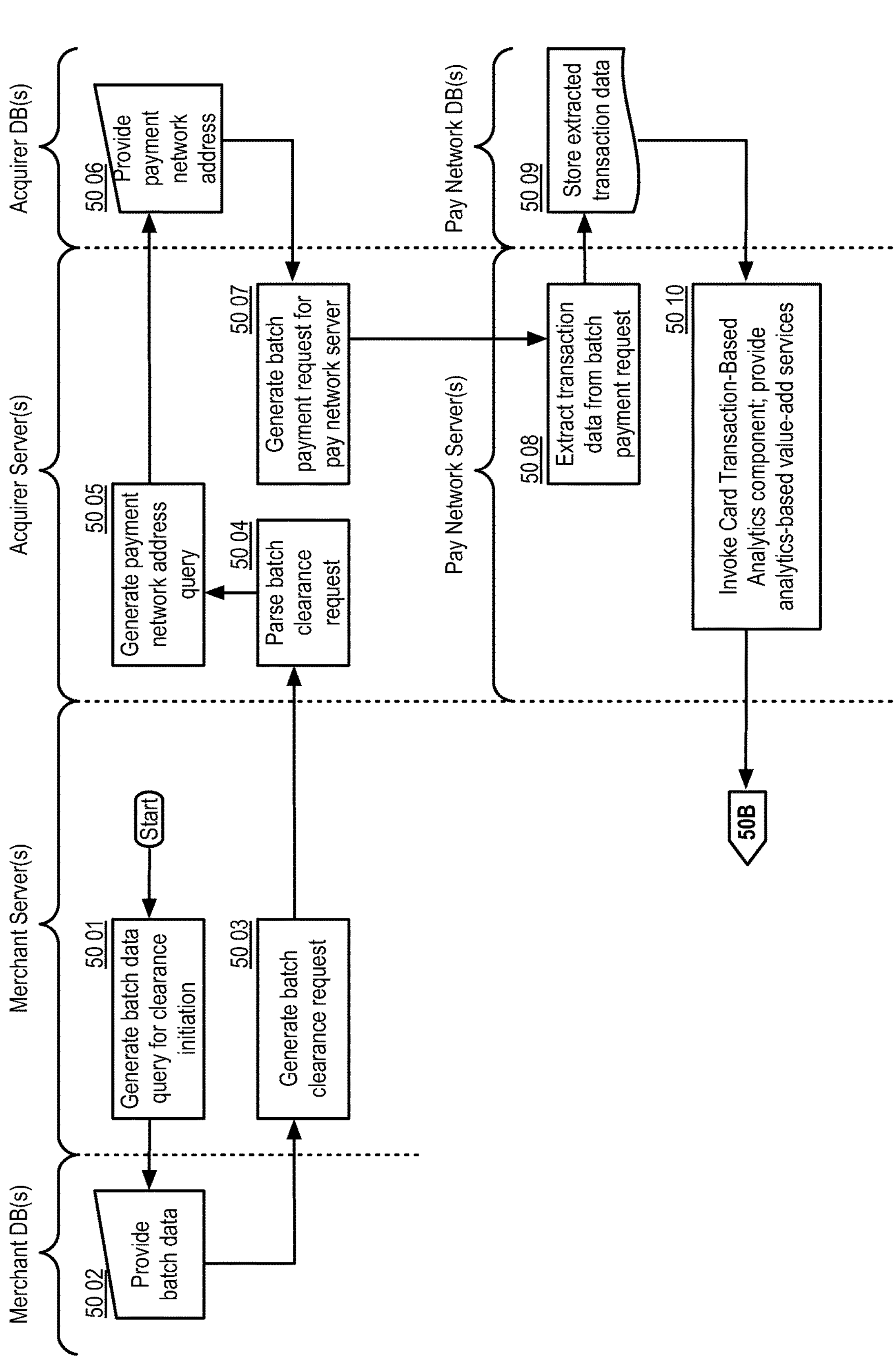
FIGS. 50A-B show logic flow diagrams illustrating example aspects of purchase transaction clearance in some embodiments of the MCB-Platform, e.g., a Purchase Transaction Clearance ("PTC") component 5000.
Figure 50B:
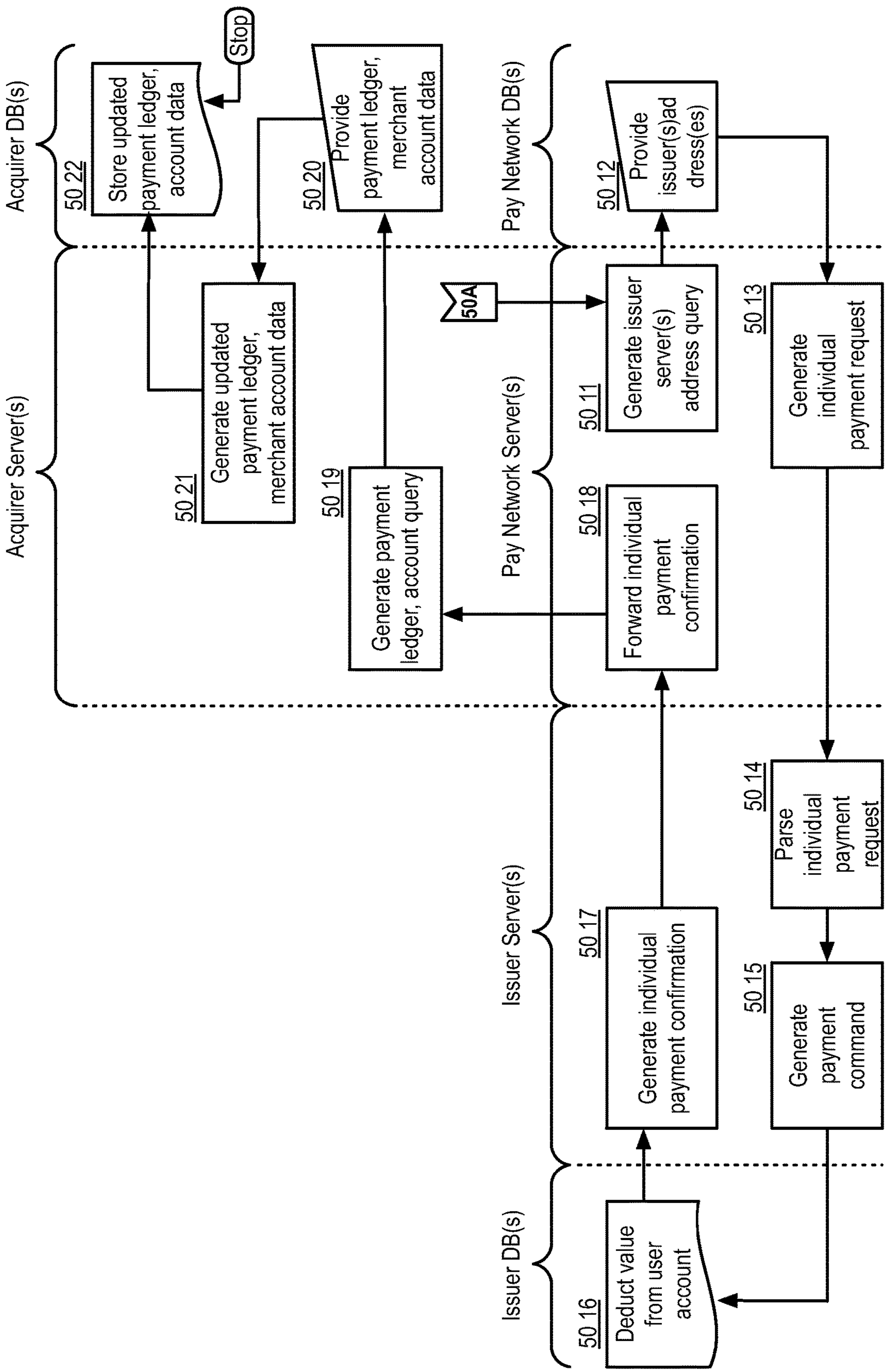

FIGS. 50A-B show logic flow diagrams illustrating example aspects of purchase transaction clearance in some embodiments of the MCB-Platform, e.g., a Purchase Transaction Clearance ("PTC") component 5000. With reference to FIG. 50A, in some embodiments, a merchant server may initiate clearance of a batch of authorized transactions. For example, the merchant server may generate a batch data request, e.g., 5001, and provide the request to a merchant database. In response to the batch data request, the database may provide the requested batch data, e.g., 5002. The server may generate a batch clearance request, e.g., 5003, using the batch data obtained from the database, and provide the batch clearance request to an acquirer server. The acquirer server may parse, e.g., 5004, the obtained batch clearance request, and generate, e.g., 5007, a batch payment request using the obtained batch clearance request to provide, the batch payment request to a pay network server. For example, the acquirer server may query, e.g., 5005, an acquirer database for an address of a payment network server, and utilize the obtained address, e.g., 5006, to forward the generated batch payment request to the pay network server.

The pay network server may parse the batch payment request obtained from the acquirer server, and extract the transaction data for each transaction stored in the batch payment request, e.g., 5008. The pay network server may store the transaction data, e.g., 5009, for each transaction in a pay network database. In some embodiments, the pay network server may invoke a component, e.g., 5010, to provide analytics based on the transactions of the merchant for whom purchase transaction are being cleared. For example, the pay network server may invoke a component such as the example card transaction-based social data aggregation component discussed above with reference to FIGS. 27-28.

With reference to FIG. 50B, in some embodiments, for each extracted transaction, the pay network server may query, e.g., 5011, a pay network database for an address of an issuer server. The pay network server may generate an individual payment request, e.g., 5013, for each transaction for which it has extracted transaction data, and provide the individual payment request to the issuer server. In some embodiments, the issuer server may parse the individual payment request, e.g., 5014, and generate a payment command, e.g., 5015, based on the parsed individual payment request. For example, the issuer server may issue a command to deduct funds from the user's account (or add a charge to the user's credit card account). The issuer server may issue a payment command, e.g., 5015, to a database storing the user's account information, e.g., a user profile database. The issuer server may provide an individual payment confirmation, e.g., 5017, to the pay network server, which may forward, e.g., 5018, the individual payment confirmation to the acquirer server.

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 5019, an acquirer database for payment ledger and/or merchant account data, e.g., 5020. The acquirer server may utilize payment ledger and/or merchant account data from the acquirer database, along with the individual payment confirmation, to generate updated payment ledger and/or merchant account data, e.g., 5021. The acquirer server may then store, e.g., 5022, the updated payment ledger and/or merchant account data to the acquire database.

MCB-Platform Controller

FIG. 51 shows a block diagram illustrating embodiments of a MCB-Platform controller. In this embodiment, the MCB-Platform controller 5101 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 5103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 5129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MCB-Platform controller 5101 may be connected to and/or communicate with entities such as, but not limited to: one or more users from user input devices 5111; peripheral devices 5112; an optional cryptographic processor device 5128; and/or a communications network 5113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MCB-Platform controller 5101 may be based on computer systems that may comprise, but are not limited to, components such as: a computer systemization 5102 connected to memory 5129.

Computer Systemization

A computer systemization 5102 may comprise a clock 5130, central processing unit ("CPU(s)" and/or "processor(s)" (these terms are used interchangeable throughout the disclosure unless noted to the contrary)) 5103, a memory 5129 (e.g., a read only memory (ROM) 5106, a random access memory (RAM) 5105, etc.), and/or an interface bus 5107, and most frequently, although not necessarily, are all interconnected and/or communicating through a system bus 5104 on one or more (mother)board(s) 5102 having conductive and/or otherwise transportive circuit pathways through which instructions (e.g., binary encoded signals) may travel to effectuate communications, operations, storage, etc. The computer systemization may be connected to a power source 5186; e.g., optionally the power source may be internal. Optionally, a cryptographic processor 5126 and/or transceivers (e.g., ICs) 5174 may be connected to the system bus. In another embodiment, the cryptographic processor and/or transceivers may be connected as either internal and/or external peripheral devices 5112 via the interface bus I/O. In turn, the transceivers may be connected to antenna(s) 5175, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing MCB-Platform controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 5129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MCB-Platform controller and beyond through various interfaces. Should processing requirements dictate a greater amount speed and/or capacity, distributed processors (e.g., Distributed MCB-Platform), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the MCB-Platform may be achieved by implementing a microcontroller such as CAST's R8051XC2 microcontroller; Intel's MCS 51 (i.e., 8051 microcontroller); and/or the like. Also, to implement certain features of the MCB-Platform, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MCB-Platform component collection (distributed or otherwise) and/or features may be implemented via the microprocessor and/or via embedded components; e.g., via ASIC, coprocessor, DSP, FPGA, and/or the like. Alternately, some implementations of the MCB-Platform may be implemented with embedded components that are configured and used to achieve a variety of features or signal processing.

Depending on the particular implementation, the embedded components may include software solutions, hardware solutions, and/or some combination of both hardware/software solutions. For example, MCB-Platform features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MCB-Platform features. A hierarchy of programmable interconnects allow logic blocks to be interconnected as needed by the MCB-Platform system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MCB-Platform may be developed on regular FPGAs and then migrated into a fixed version that more resembles ASIC implementations. Alternate or coordinating implementations may migrate MCB-Platform controller features to a final ASIC instead of or in addition to FPGAs. Depending on the implementation all of the aforementioned embedded components and microprocessors may be considered the "CPU" and/or "processor" for the MCB-Platform.

Power Source

The power source 5186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 5186 is connected to at least one of the interconnected subsequent components of the MCB-Platform thereby providing an electric current to all subsequent components. In one example, the power source 5186 is connected to the system bus component 5104. In an alternative embodiment, an outside power source 5186 is provided through a connection across the I/O 5108 interface. For example, a USB and/or IEEE 1394 connection carries both data and power across the connection and is therefore a suitable source of power.

Interface Adapters

Interface bus(ses) 5107 may accept, connect, and/or communicate to a number of interface adapters, conventionally although not necessarily in the form of adapter cards, such as but not limited to: input output interfaces (I/O) 5108, storage interfaces 5109, network interfaces 5110, and/or the like. Optionally, cryptographic processor interfaces 5127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 5109 may accept, communicate, and/or connect to a number of storage devices such as, but not limited to: storage devices 5114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 5110 may accept, communicate, and/or connect to a communications network 5113. Through a communications network 5113, the MCB-Platform controller is accessible through remote clients 5133*b* (e.g., computers with web browsers) by users 5133*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed MCB-Platform), architectures may similarly be employed to pool, load balance, and/or otherwise increase the communicative bandwidth required by the MCB-Platform controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 5110 may be used to engage with various communications network types 5113. For example, multiple network interfaces may be employed to allow for the communication over broadcast, multicast, and/or unicast networks.

Input Output interfaces (I/O) 5108 may accept, communicate, and/or connect to user input devices 5111, peripheral devices 5112, cryptographic processor devices 5128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 5111 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 5112 may be connected and/or communicate to I/O and/or other facilities of the like such as network interfaces, storage interfaces, directly to the interface bus, system bus, the CPU, and/or the like. Peripheral devices may be external, internal and/or part of the MCB-Platform controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the MCB-Platform controller may be embodied as an embedded, dedicated, and/or monitor-less (i.e., headless) device, wherein access would be provided over a network interface connection.

Cryptographic units such as, but not limited to, microcontrollers, processors 5126, interfaces 5127, and/or devices 5128 may be attached, and/or communicate with the MCB-Platform controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 5129. However, memory is a fungible technology and resource, thus, any number of memory embodiments may be employed in lieu of or in concert with one another. It is to be understood that the MCB-Platform controller and/or a computer systemization may employ various forms of memory 5129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 5129 will include ROM 5106, RAM 5105, and a storage device 5114. A storage device 5114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 5129 may contain a collection of program and/or database components and/or data such as, but not limited to: operating system component(s) 5115 (operating system); information server component(s) 5116 (information server); user interface component(s) 5117 (user interface); Web browser component(s) 5118 (Web browser); database(s) 5119; mail server component(s) 5121; mail client component(s) 5122; cryptographic server component(s) 5120 (cryptographic server); the MCB-Platform component(s) 5135; and/or the like (i.e., collectively a component collection). These components may be stored and accessed from the storage devices and/or from storage devices accessible through an interface bus. Although nonconventional program components such as those in the component collection, typically, are stored in a local storage device 5114, they may also be loaded and/or stored in memory such as: peripheral devices, RAM, remote storage facilities through a communications network, ROM, various forms of memory, and/or the like.

Operating System

The operating system component 5115 is an executable program component facilitating the operation of the MCB-Platform controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MCB-Platform controller to communicate with other entities through a communications network 5113. Various communication protocols may be used by the MCB-Platform controller as a subcarrier transport mechanism for interaction, such as, but not limited to: multicast, TCP/IP, UDP, unicast, and/or the like.

Information Server

An information server component 5116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MCB-Platform controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MCB-Platform database 5119, operating systems, other program components, user interfaces, Web browsers, and/or the like.

Access to the MCB-Platform database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MCB-Platform. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MCB-Platform as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 5117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 5118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MCB-Platform enabled nodes. The combined application may be nugatory on systems employing standard Web browsers.

Mail Server

A mail server component 5121 is a stored program component that is executed by a CPU 5103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MCB-Platform.

Access to the MCB-Platform mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 5122 is a stored program component that is executed by a CPU 5103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 5120 is a stored program component that is executed by a CPU 5103, cryptographic processor 5126, cryptographic processor interface 5127, cryptographic processor device 5128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the MCB-Platform may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MCB-Platform component to engage in secure transactions if so desired. The cryptographic component facilitates the secure accessing of resources on the MCB-Platform and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MCB-Platform Database

The MCB-Platform database component 5119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the MCB-Platform database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MCB-Platform database is implemented as a data-structure, the use of the MCB-Platform database 5119 may be integrated into another component such as the MCB-Platform component 5135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 5119 includes several tables 5119*a-u*. A Users table 5119*a* may include fields such as, but not limited to: user_id, ssn, dob, first_name, last_name, address, age, state, address_firstline, address_secondline, zipcode, application_id, application_type, exchange_preferences_list, exchange_preferences_values, devices_list, user_accounts_list, user_passwords_list, security_level, and/or the like. The Users table may support and/or track multiple entity accounts on a MCB-Platform. A confidence score table 5119*b* includes fields such as, but not limited to: merchant_id, data_source, source_ip, merchant_info, confidence_score, score_timestamp, score_status, activity_status, and/or the like. An Exchanges table 5119*c* may include fields such as, but not limited to: user_id, currency_type, currency_id, currency_name, currency_float_flag, currency_exchange_restrictions, unit_currency_value, exchange_rate, exchange_refresh_rate, baseline_rate, market_symbol, market_name, exchange_rate_startdate, exchange_rate_enddate, base_currency, and/or the like. A Merchants/provider table 5119*d* may include fields such as, but not limited to: provider_id, program_name, address_firstline, address_secondline, zipcode, application_id, application_type, exchange_preferences_list, exchange_preferences_values, devices_list, registered_users_list, currency_type and/or the like. A Banks/issuer table 5119*e* includes fields such as, but not limited to: bank_id, bank_bame, aba_number, routing_number, micr, branch_name, branch_code, address_first_line, address_secondline, zipcode, issuer_address, ip_address, mac_address, auth_key, port_num, security_settings_list, and/or the like. A rules and restrictions table 5119*f* includes fields such as, but not limited to: rules_ID, rulesrestriction_list, and/or the like. An accounts table 5119*g* includes fields such as, but not limited to: user_ID, program_ID, enrolled_status, points_balance, last_update_date, account_number, account_security_code, account_name, issuer_acquirer_flag, issuer_name, acquirer_name, account_address, routing_number, access_API_call, linked_wallets_list, and/or the like. An exchange rates table 5119*h* includes fields such as, but not limited to: program_ID, base_currency, exchangerate, date, and/or the like. A payment devices/cards table 5119*i* includes fields such as, but not limited to: user_ID, payment_device_type, payment_device_identifier, payment_device_securitycode, billing_address, bank_account_number, and/or the like. An analytics table 5119*j* includes fields such as, but not limited to: program_ID, user_ID, transaction_volume, time_period, and/or the like. A programs table 5119*k* includes fields such as, but not limited to program_ID, rules_ID, notallowedprogram_IDs, preferred_program_IDs, normal_exchnage_rate, preferred_exchange_rate, and/or the like. A Web Data table 5119*i* includes fields such as, but not limited to: web_data_feed_ID, web_data_source, web_URL, web_image, web_content, web_content_URL, web_viewing_status, and/or the like. An Acquirers table 5119*m* may include fields such as, but not limited to: merchant_ID, account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 5119*n* may include fields such as, but not limited to: gateway_ID, gateway_IP, gateway_MAC, gateway_secure_key, gateway_access_list, gateway_API_call_list, gateway_services_list, and/or the like. A Transactions table 5119*o* may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 5119*p* may include fields such as, but not limited to: batch_id, transaction_id_list, timestamp_list, cleared_flag_list, clearance_trigger_settings, and/or the like. A Ledgers table 5119*q* may include fields such as, but not limited to: request_id, timestamp, deposit_amount, batch_id, transaction_id, clear_flag, deposit_account, transaction_summary, payor_name, payor_account, and/or the like. A Products table 5119*r* may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 5119*s* may include fields such as, but not limited to: offer_ID, offer_title, offer_attributes_list, offer_price, offer_expiry, related_products_list, discounts_list, rewards_list, merchants_list, merchant_availability_list, and/or the like. An Apps table 5119*t* may include fields such as, but not limited to: app_ID, app_name, app_type, app_dependencies, and/or the like. A value card table 5119*u* may include fields such as, but not limited to: value_card_ID, value_amount, tracking_equivalent_amount, source_user_ID, destination_user_ID, current_user_ID, and/or the like.

In one embodiment, the MCB-Platform database may interact with other database systems. For example, employing a distributed database system, queries and data access by search MCB-Platform component may treat the combination of the MCB-Platform database, an integrated data security layer database as a single database entity.

In one embodiment, user programs may contain various user interface primitives, which may serve to update the MCB-Platform. Also, various accounts may require custom database tables depending upon the environments and the types of clients the MCB-Platform may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 5119*a-u*. The MCB-Platform may be configured to keep track of various settings, inputs, and parameters via database controllers.

The MCB-Platform database may communicate to and/or with other components in a component collection, including itself, and/or facilities of the like. Most frequently, the MCB-Platform database communicates with the MCB-Platform component, other program components, and/or the like. The database may contain, retain, and provide information regarding other nodes and data.

The MCB-Platforms

The MCB-Platform component 5135 is a stored program component that is executed by a CPU. In one embodiment, the MCB-Platform component incorporates any and/or all combinations of the aspects of the MCB-Platform that was discussed in the previous figures. As such, the MCB-Platform affects accessing, obtaining and the provision of information, services, transactions, and/or the like across various communications networks.

The MCB-Platform transforms various activity requests (e.g., transaction request, merchant information update request, offer issuance request, etc.) via MCB-Platform components, such as but not limited to web claw component 5149, offer bridging component 5150, scoring component 5151, DB update component 5152 and centralized personal information platform component 5153 into transaction records and merchant database updates outputs. In other embodiments, the MCB-Platform transforms value exchange requests via CLGC-MCB-Platform 5144, GC-MCB-Platform 5145, SD-MCB-Platform 5146, EVD 5147, CE-MCB-Platform 5148 into currency exchanges outputs. In one embodiment, the MCB-Platform component 5135 takes inputs (e.g., checkout request 4511; product data 4515; wallet access input 4711; transaction authorization input 4714; payment gateway address 4718; payment network address 4722; issuer server address(es) 4725; funds authorization request(s) 4726; user(s) account(s) data 4728; batch data 4912; payment network address 4916; issuer server address(es) 4924; individual payment request 4925; payment ledger, merchant account data 4931; and/or the like) etc., and transforms the inputs via various components (e.g., UPC 5141; PTA 5142; PTC 5143; and/or the like), into outputs (e.g., checkout request message 4513; checkout data 4517; card authorization request 4716, 4723; funds authorization response(s) 4730; transaction authorization response 4732; batch append data 4734; purchase receipt 4735; batch clearance request 4914; batch payment request 4918; transaction data 4920; individual payment confirmation 4928, 4929; updated payment ledger, merchant account data 4933; and/or the like).

The MCB-Platform component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MCB-Platform server employs a cryptographic server to encrypt and decrypt communications. The MCB-Platform component may communicate to and/or with other components in a component collection, including itself, and/or facilities of the like. Most frequently, the MCB-Platform component communicates with the MCB-Platform database, operating systems, other program components, and/or the like. The MCB-Platform may contain, communicate, generate, obtain, and/or provide program component, system, user, and/or data communications, requests, and/or responses.

Distributed MCB-Platforms

The structure and/or operation of any of the MCB-Platform node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MCB-Platform controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because “http://” is part of the grammar syntax, and what follows is considered part of the post value. Similarly, with such a grammar, a variable “Value1” may be inserted into an “http://” post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MCB-Platform controller may be executing a PHP script implementing a Secure Sockets Layer (“SSL”) socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language (“SQL”). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = ‘192.168.0.100’;
$port = 255;
// create a server-side SSL socket, listen for/accept incoming
communication
$sock = socket_create(AF_INET, SOCK_STREAM, 0);
socket_bind($sock, $address, $port) or die(‘Could not bind to address’);
socket_listen($sock);
$client = socket_accept($sock);
// read input data from client device in 1024 byte blocks until end of
message
do {
    $input = “”;
    $input = socket_read($client, 1024);
    $data .= $input;
} while($input != “”);
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query(“INSERT INTO UserTable (transmission)
VALUES ($data)”); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments of MCB-Platform universal value equivalents may further include:

1. A universal value exchange processor-implemented method embodiment to transform value equivalent exchange instructions into cross-ecosystem currency exchanges, comprising:

obtaining a cross-ecosystem currency exchange instruction;

determining one or more sources based on parsing the cross-ecosystem currency exchange instruction;

identifying currency types associated with the sources;

determining exchange rates of the currency types relative to a standard currency;

obtaining currency exchange restrictions and conditions associated with the sources;

generating, based on the currency exchange restrictions and conditions, currency exchange flow paths for currency transfer from the sources to destinations;

issuing currency transfer requests to the sources and one of the destinations;

determining that the cross-ecosystem currency exchange has been completed; and providing a notification of completion of the cross-ecosystem currency exchange.

2. The embodiment of claim 1, wherein the currency exchange flow paths are generated based on the currency exchange restrictions and conditions associated with the sources.

3. The embodiment of claim 1, further comprising automatically selecting a currency exchange flow path from the generated currency exchange flow paths based on exchange rates between the sources and the destinations.

4. The embodiment of claim 3, wherein said one of the destinations corresponds to the selected currency exchange flow path.

5. The embodiment of claim 1, further comprising selecting a currency exchange flow path from the generated currency exchange flow paths based on user preference.

6. The embodiment of claim 1, further comprising selecting a currency exchange flow path from the generated currency exchange flow paths based on affiliate relationship between the sources and the destinations.

7. The embodiment of claim 1, wherein determining the exchange rates of the currency types includes determining liquidity of the currency types.

8. The embodiment of claim 1, wherein the cross-ecosystem currency exchange instruction further comprises source currency amounts in accounts of the one or more sources.

9. The embodiment of claim 8, wherein the issued currency transfer requests to the sources include a request to deallocate the source currency amounts from the accounts of the one or more sources.

10. The embodiment of claim 8, wherein the issued currency transfer requests include a request to allocate an equivalent amount to an account corresponding to said one of the destinations.

11. The embodiment of claim 10, wherein the equivalent amount is determined by the exchange rates.

12. A universal value exchange system, comprising means to:

obtain a cross-ecosystem currency exchange instruction;

determine one or more sources based on parsing the cross-ecosystem currency exchange instruction;

identify currency types associated with the sources;

determine exchange rates of the currency types relative to a standard currency;

obtain currency exchange restrictions and conditions associated with the sources;

generate, based on the currency exchange restrictions and conditions, currency exchange flow paths for currency transfer from the sources to destinations;

issue currency transfer requests to the sources and one of the destinations;

determine that the cross-ecosystem currency exchange has been completed; and provide a notification of completion of the cross-ecosystem currency exchange.

13. A processor-readable medium storing processor-issuable instructions to:

obtain a cross-ecosystem currency exchange instruction;

determine one or more sources based on parsing the cross-ecosystem currency exchange instruction;

identify currency types associated with the sources;

determine exchange rates of the currency types relative to a standard currency;

obtain currency exchange restrictions and conditions associated with the sources;

generate, based on the currency exchange restrictions and conditions, currency exchange flow paths for currency transfer from the sources to destinations;

issue currency transfer requests to the sources and one of the destinations;

determine that the cross-ecosystem currency exchange has been completed; and provide a notification of completion of the cross-ecosystem currency exchange.

14. A universal value exchange apparatus, comprising:

a memory;

a processor disposed in communication with said memory, and configured to issue a plurality of processing instructions stored in the memory, wherein the processor issues instructions to:

obtain a cross-ecosystem currency exchange instruction;

determine one or more sources based on parsing the cross-ecosystem currency exchange instruction;

identify currency types associated with the sources;

determine exchange rates of the currency types relative to a standard currency;

obtain currency exchange restrictions and conditions associated with the sources;

generate, based on the currency exchange restrictions and conditions, currency exchange flow paths for currency transfer from the sources to destinations;

issue currency transfer requests to the sources and one of the destinations;

determine that the cross-ecosystem currency exchange has been completed; and provide a notification of completion of the cross-ecosystem currency exchange.

15. A processor-implemented cross-ecosystem brokerage embodiment, comprising:

receiving an offer to carry out an exchange of a first ecosystem currency at a first exchange rate relative to a second ecosystem currency;

receiving user instructions to exchange the first ecosystem currency for a third ecosystem currency at a second exchange rate;

obtaining authorization to execute a cross-ecosystem exchange;

executing the cross-ecosystem exchange, wherein said executing includes:

reducing the user's first ecosystem currency balance by a first amount; and incrementing the user's third ecosystem currency balance by a second amount determined based on the second exchange rate; and charging the offer provider a third amount in the second ecosystem currency for carrying out the exchange of the first ecosystem currency.

16. The embodiment of claim 15, wherein offer provider is an issuer of the first ecosystem currency.

17. The embodiment of claim 15, wherein the first, second and third ecosystem currencies are selected from a group consisting of: (i) loyalty program currency; (ii) virtual currency; and (iii) financial currency.

18. The embodiment of claim 15, wherein obtaining the authorization includes:

providing the user the second amount of the third ecosystem currency obtainable upon executing the cross-ecosystem exchange; and soliciting from the user a response to execute the cross-ecosystem exchange.

19. The embodiment of claim 15, wherein reducing the user's first ecosystem currency balance includes:

notifying the offer provider the exchange of the first amount of the first ecosystem currency by the user, wherein the offer provider reduces the user's first ecosystem currency balance by the first amount.

20. The embodiment of claim 15, wherein the cross-ecosystem exchange is executed on a third ecosystem having the third ecosystem currency.

21. The embodiment of claim 15, wherein the third amount charged to the offer provider is determined based on the first amount of the first ecosystem currency and the first exchange rate relative to the second ecosystem currency.

22. The embodiment of claim 15, wherein the received offer includes one or more rules and restrictions.

23. The embodiment of claim 22, further comprising:

determining that the user instructions to exchange the first ecosystem currency for the third ecosystem currency at the second exchange rate meet the one or more rules and restrictions.

24. The embodiment of claim 23, further comprising:

requesting the user to modify the user instructions when the user instructions fail to meet the one or more rules and restrictions.

25. The embodiment of claim 15, wherein the offer provider is associated with a first ecosystem having the first ecosystem currency.

26. The embodiment of claim 25, wherein the first ecosystem has a bilateral relationship with a third ecosystem having the third ecosystem currency, allowing cross-ecosystem exchange between the first and third ecosystems.

27. The embodiment of claim 26, wherein the user is program member in third ecosystem.

28. A cross-ecosystem brokerage system, comprising means to:

receive an offer to carry out an exchange of a first ecosystem currency at a first exchange rate relative to a second ecosystem currency;

receive user instructions to exchange the first ecosystem currency for a third ecosystem currency at a second exchange rate;

obtain authorization to execute a cross-ecosystem exchange;

execute the cross-ecosystem exchange, wherein said executing includes:

reduce the user's first ecosystem currency balance by a first amount; and increment the user's third ecosystem currency balance by a second amount determined based on the second exchange rate; and charge the offer provider a third amount in the second ecosystem currency for carrying out the exchange of the first ecosystem currency.

29. A processor-readable medium storing processor-issuable instructions to:

receive an offer to carry out an exchange of a first ecosystem currency at a first exchange rate relative to a second ecosystem currency;

receive user instructions to exchange the first ecosystem currency for a third ecosystem currency at a second exchange rate;

obtain authorization to execute a cross-ecosystem exchange;

execute the cross-ecosystem exchange, wherein said executing includes:

reduce the user's first ecosystem currency balance by a first amount; and increment the user's third ecosystem currency balance by a second amount determined based on the second exchange rate; and charge the offer provider a third amount in the second ecosystem currency for carrying out the exchange of the first ecosystem currency.

30. A cross-ecosystem brokerage apparatus, comprising:

a memory;

a processor disposed in communication with said memory, and configured to issue a plurality of processing instructions stored in the memory, wherein the processor issues instructions to:

receive an offer to carry out an exchange of a first ecosystem currency at a first exchange rate relative to a second ecosystem currency;

receive user instructions to exchange the first ecosystem currency for a third ecosystem currency at a second exchange rate;

obtain authorization to execute a cross-ecosystem exchange;

execute the cross-ecosystem exchange, wherein said executing includes:

reduce the user's first ecosystem currency balance by a first amount; and increment the user's third ecosystem currency balance by a second amount determined based on the second exchange rate; and charge the offer provider a third amount in the second ecosystem currency for carrying out the exchange of the first ecosystem currency.

31. A processor-implemented gift card exchange and transaction facilitation embodiment, comprising:

receiving a request from a user to transfer funds from a first gift card to a second gift card, each of said gift cards being associated with different issuers;

determining an amount of funds associated the first gift card;

determining an equivalent amount of funds transferable to the second gift card;

querying a gift card database to determine a target gift card identifier having at least the equivalent amount of funds, said target gift card being associated with the issuer of the second gift card;

deallocating the amount of funds from the first gift card and the equivalent amount of funds from the target gift card;

allocating the equivalent amount of funds to the second gift card;

receiving a payment request corresponding to the user's purchase using the second gift card; and forwarding the payment to the issuer of the target gift card, wherein the issuer of the target gift card deducts the equivalent amount of funds from the target gift card; and deallocating the equivalent amount of funds from the second gift card.

32. The embodiment of claim 31, wherein the target gift card is associated with a second user associated with a complimentary request to transfer funds from a gift card issued by the second gift card issuer to a gift card issued by the first gift card issuer.

33. A processor-implemented gift card exchange and transaction facilitation embodiment, comprising:

receiving a request from a user to transfer funds from a source gift card issued by a first issuer to a destination gift card issued by a second issuer;

determining an amount of transfer funds associated the source gift card;

determining an equivalent amount of funds transferable to the destination gift card;

querying a gift card database to obtain a target gift card issued by the first issuer and a target gift card issued by the second issuer;

facilitating transfer of the amount of transfer funds from the source gift card to the target gift card issued by the first issuer; and facilitating transfer of the equivalent amount of funds from the target gift card issued by the second issuer to the destination gift card.

34. A processor-implemented low-latency value equivalent exchange embodiment, comprising:

receiving a specified consumer value equivalent swap request to exchange a value source for a value substitute as part of a purchase transaction;

determining a conversion exchange rate and amount of a denomination amount specified in the swap request from the value source to a denomination amount specified in the swap request for the value substitute;

identifying, within a low-latency purchase transaction time-frame, a target source for the value substitute having sufficient value to supply the swap request based on the determined conversion exchange rate and amount;

associating the value source with a holder of the target source by modifying a value source record;

associating the target source with the holder of the value source by modifying the value source record;

deallocating the determined conversion rate and amount specified in the swap request for the value source holder and allocating it to the target source holder by modifying the value source record to reduce network transactions and decrease network and transaction latency; and charging the determined conversion rate and amount specified in the swap request to the target source to assist the payment of the purchase transaction for the value source holder by using target source account information from a target source record to decrease network and transaction latency.

Further embodiments of the MCB-Platform illustrating a centralized information scoring may comprise:

A centralized personal information platform processor-implemented method, comprising: aggregating data records including search results, purchase transaction data, service usage data, service enrollment data, and social data; identifying data field types within the data records and their associated data values; identifying an entity from the data field types and their associated data values; generating, via a processor, correlations of the entity to other entities identifiable from the data field types and their associated data values; associating, via the processor, attributes to the entity by drawing inferences related to the entity from the data field types and their associated data values; generating an updated profile and social graph of the entity using the generated correlations and associated attributes; and providing the updated profile and social graph for an automated web form filling request.

Further embodiments of the MCB-Platform may comprise the following:

1. A merchant consumer bridging low-latency processor-implemented method embodiment, comprising:

receiving an activity request including merchant information associated with a merchant;

retrieving a previously stored merchant record from a database;

determining merchant information update indicia based on a comparison of the merchant information and the previously stored merchant record;

determining a confidence metric for the merchant information update;

retrieving a confidence requirement based on the activity request;

determining, within a low-latency processing time-frame, whether the determined confidence metric satisfies the retrieved confidence requirement;

performing the requested activity and updating the previously stored merchant record with the merchant information update indicia when the determined confidence metric satisfies the retrieved confidence requirement; and declining the activity request when the determined confidence metric satisfies the retrieved confidence requirement.

2. The method embodiment of embodiment 1, wherein the activity request comprises any of a transaction payment request, a merchant database update request, and an offer issuance request.

3. The method embodiment of embodiment 1, wherein the activity request is received from a merchant point of sale terminal.

4. The method embodiment of embodiment 2, wherein the transaction payment request further comprises consumer wallet information.

5. The method embodiment of embodiment 1, wherein the merchant record comprises any of a merchant ID, merchant address, merchant inventory, merchant alias, and merchant name.

6. The method embodiment of embodiment 1, wherein the merchant record comprises any of a merchant URL, merchant web server ID, and merchant web server address.

7. The method embodiment of embodiment 1, further comprising:

forming a query on the merchant database based on a merchant ID.

8. The method embodiment of embodiment 1, wherein merchant information update indicia comprises an inconsistent data field between the received merchant information and the previously stored merchant record.

9. The method embodiment of embodiment 1, wherein the confidence metric comprise a numeric value.

10. The method embodiment of embodiment 1, wherein the confidence metric is determined by a scoring component.

11. The method embodiment of embodiment 10, wherein the scoring component receives a variety of merchant related information.

12. The method embodiment of embodiment 11, wherein the variety of merchant related information comprises web claws from merchant websites.

13. The method embodiment of embodiment 11, wherein the variety of merchant related information comprises merchant statistics.

14. The method embodiment of embodiment 11, wherein the variety of merchant related information comprises prior transaction history with the merchant.

15. The method embodiment of embodiment 11, wherein the scoring component generate the confidence metric based on the received variety of merchant related information, wherein the confidence metric is indicative of a confidence level of accuracy of the merchant information update indicia.

16. The method embodiment of embodiment 1, wherein the confidence requirement comprises a numeric confidence metric threshold.

17. The method embodiment of embodiment 1, wherein the confidence requirement is dependent on the activity type.

18. The method embodiment of embodiment 1, wherein the confidence requirement comprises a threshold value of 0.8 to allow a transaction request.

19. The method embodiment of embodiment 1, wherein the confidence requirement comprises a threshold value of 0.5 to allow an offer issuance request.

20. The method embodiment of embodiment 1, wherein the confidence requirement comprises a threshold value of 0.5 to allow a merchant record update request.

21. A merchant consumer bridging system embodiment, comprising:

a memory;

a processor disposed in communication with said memory, and configured to issue a plurality of processing instructions stored in the memory, wherein the processor issues instructions to:

receive an activity request including merchant information associated with a merchant;

retrieve a previously stored merchant record from a database;

determine merchant information update indicia based on a comparison of the merchant information and the previously stored merchant record;

determine a confidence metric for the merchant information update;

retrieve a confidence requirement based on the activity request;

determine, within a low-latency processing time-frame, whether the determined confidence metric satisfies the retrieved confidence requirement;

perform the requested activity and updating the previously stored merchant record with the merchant information update indicia when the determined confidence metric satisfies the retrieved confidence requirement; and decline the activity request when the determined confidence metric satisfies the retrieved confidence requirement.

22. The system embodiment of embodiment 21, wherein the activity request comprises any of a transaction payment request, a merchant database update request, and an offer issuance request.

23. The system embodiment of embodiment 21, wherein the activity request is received from a merchant point of sale terminal.

24. The system embodiment of embodiment 22, wherein the transaction payment request further comprises consumer wallet information 25. The system embodiment of embodiment 21, wherein the merchant record comprises any of a merchant ID, merchant address, merchant inventory, merchant alias, and merchant 26. The system embodiment of embodiment 21, wherein the merchant record comprises any of a merchant URL, merchant web server ID, and merchant web server address.

27. The system embodiment of embodiment 21, wherein the processor further issues instructions to:

form a query on the merchant database based on a merchant ID.

28. The system embodiment of embodiment 21, wherein merchant information update indicia comprises an inconsistent data field between the received merchant information and the previously stored merchant record.

29. The system embodiment of embodiment 21, wherein the confidence metric comprise a numeric value.

30. The system embodiment of embodiment 21, wherein the confidence metric is determined by a scoring component.

31. The system embodiment of embodiment 30, wherein the scoring component receives a variety of merchant related information.

32. The system embodiment of embodiment 31, wherein the variety of merchant related information comprises web claws from merchant websites.

33. The system embodiment of embodiment 31, wherein the variety of merchant related information comprises merchant statistics.

34. The system embodiment of embodiment 31, wherein the variety of merchant related information comprises prior transaction history with the merchant.

35. The system embodiment of embodiment 31, wherein the scoring component generate the confidence metric based on the received variety of merchant related information, wherein the confidence metric is indicative of a confidence level of accuracy of the merchant information update indicia.

36. The system embodiment of embodiment 21, wherein the confidence requirement comprises a numeric confidence metric threshold.

37. The system embodiment of embodiment 21, wherein the confidence requirement is dependent on the activity type.

38. The system embodiment of embodiment 21, wherein the confidence requirement comprises a threshold value of 0.8 to allow a transaction request.

39. The system embodiment of embodiment 21, wherein the confidence requirement comprises a threshold value of 0.5 to allow an offer issuance request.

40. The system embodiment of embodiment 21, wherein the confidence requirement comprises a threshold value of 0.5 to allow a merchant record update request.

41. A merchant consumer bridging processor-readable storage medium embodiment storing processor-executable instructions executable by a processor to:

receive an activity request including merchant information associated with a merchant;

retrieve a previously stored merchant record from a database;

determine merchant information update indicia based on a comparison of the merchant information and the previously stored merchant record;

determine a confidence metric for the merchant information update;

retrieve a confidence requirement based on the activity request;

determine, within a low-latency processing time-frame, whether the determined confidence metric satisfies the retrieved confidence requirement;

perform the requested activity and updating the previously stored merchant record with the merchant information update indicia when the determined confidence metric satisfies the retrieved confidence requirement; and decline the activity request when the determined confidence metric satisfies the retrieved confidence requirement.

42. The medium embodiment of embodiment 41, wherein the activity request comprises any of a transaction payment request, a merchant database update request, and an offer issuance request.

43. The medium embodiment of embodiment 41, wherein the activity request is received from a merchant point of sale terminal.

44. The medium embodiment of embodiment 42, wherein the transaction payment request further comprises consumer wallet information.

45. The medium embodiment of embodiment 41, wherein the merchant record comprises any of a merchant ID, merchant address, merchant inventory, merchant alias, and merchant name.

46. The medium embodiment of embodiment 41, wherein the merchant record comprises any of a merchant URL, merchant web server ID, and merchant web server address.

47. The medium embodiment of embodiment 41, wherein the processor further issues instructions to:

form a query on the merchant database based on a merchant ID.

48. The medium embodiment of embodiment 41, wherein merchant information update indicia comprises an inconsistent data field between the received merchant information and the previously stored merchant record.

49. The medium embodiment of embodiment 41, wherein the confidence metric comprise a numeric value.

50. The medium embodiment of embodiment 41, wherein the confidence metric is determined by a scoring component.

51. The system embodiment of embodiment 50, wherein the scoring component receives a variety of merchant related information.

52. The system embodiment of embodiment 51, wherein the variety of merchant related information comprises web claws from merchant websites.

53 The system embodiment of embodiment 51, wherein the variety of merchant related information comprises merchant statistics.

The system embodiment of embodiment 51, wherein the variety of merchant related information comprises prior transaction history with the merchant.

55. The system embodiment of embodiment 51, wherein the scoring component generate the confidence metric based on the received variety of merchant related information, wherein the confidence metric is indicative of a confidence level of accuracy of the merchant information update indicia.

56 The medium embodiment of embodiment 41, wherein the confidence requirement comprises a numeric confidence metric threshold.

57. The medium embodiment of embodiment 41, wherein the confidence requirement is dependent on the activity type.

58. The medium embodiment of embodiment 41, wherein the confidence requirement comprises a threshold value of 0.8 to allow a transaction request.

59. The medium embodiment of embodiment 41, wherein the confidence requirement comprises a threshold value of 0.5 to allow an offer issuance request.

60. The medium embodiment of embodiment 41, wherein the confidence requirement comprises a threshold value of 0.5 to allow a merchant record update request.

61. A merchant-consumer bridging processor-implemented method embodiment to transform consumer and merchant registration information to product purchase transaction, comprising:

receiving consumer indentifying information from a consumer electronic wallet vehicle;

receiving merchant information and a proposed transaction from a merchant terminal;

verifying consumer and merchant qualification to engage in the proposed transaction;

initiating consumer payment by sending a payment approval to an electronic wallet account; and completing the proposed transaction by sending an approval to the merchant terminal.

62. A merchant-consumer bridging processor-implemented method embodiment to transform consumer and merchant registration information to product purchase transaction, comprising:

receiving information related to consumer opt-in activities of a consumer from a merchant;

retrieve a record of merchant offers;

generating a query based on the received information on the record of merchant offers;

obtaining a list of matched offers from the query; and sending the list of matched offers to the consumer.

In order to address various issues and advance the art, the entirety of this application for MERCHANT-CONSUMER BRIDGING PLATFORM APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MCB-Platform individual and/or enterprise user, database configuration and/or relational model, data type, data transmission and/or network framework, syntax structure, and/or the like, various embodiments of the MCB-Platform, may be implemented that enable a great deal of flexibility and customization. For example, aspects of the MCB-Platform may be adapted for exchanging securities, rights, obligations, debt, and/or the like. While various embodiments and discussions of the MCB-Platform have been directed to currency exchange, however, it is to be understood that the embodiments described herein may be readily configured and/or customized for a wide variety of other applications and/or implementations.

What is claimed is:

1. A merchant consumer bridging low-latency processor-implemented method for performing an activity request and updating a previously stored merchant record at a platform server that is remote from a merchant point of sale terminal, the method comprising:

receiving, via a computer network by one or more data processors of the platform server, the activity request including a merchant URL associated with a merchant;

retrieving, via the computer network by the one or more data processors, the previously stored merchant record from a database;

determining, by the one or more data processors, merchant information update indicia based on a comparison of a merchant website corresponding to the merchant URL and the previously stored merchant record;

determining, by the one or more data processors, a confidence metric for the activity request by:

scraping, by the one or more data processors, contents from the merchant website, processing, by the one or more data processors, the contents to determine further merchant information, matching, by the one or more processors, the previously stored merchant record to the further merchant information, wherein a match between the further merchant information and the previously stored merchant record indicates a value for the confidence metric, popping the merchant URL from a hash table, and adding the merchant URL to a list of seen URLs;

retrieving, by the one or more data processors, a confidence requirement that was previously defined for an activity type of the activity request, the activity type including one or more of a merchant information update request, and a consumer bridging offer issuance request, and the confidence requirement having a higher or lower value based on the activity type of the activity request;

determining, within a low-latency processing time-frame, whether the determined confidence metric satisfies the retrieved confidence requirement;

performing, by the one or more data processors, the requested activity and updating the previously stored merchant record with the further merchant information in response to the determined confidence metric satisfying the retrieved confidence requirement.

2. The method of claim 1, wherein the activity type comprises a transaction payment request, a merchant database update request, and an offer issuance request.

3. The method of claim 2, wherein the transaction payment request further comprises consumer wallet information.

4. The method of claim 1, wherein the activity request is received from a merchant point of sale terminal.

5. The method of claim 1, wherein the merchant record comprises any of a merchant ID, merchant address, merchant inventory, merchant alias, and merchant name.

6. The method of claim 1, wherein the merchant record comprises any of a merchant URL, merchant web server ID, and merchant web server address.

7. The method of claim 1, further comprising:

forming a query on the merchant database based on a merchant ID.

8. The method of claim 1, wherein merchant information update indicia comprises an inconsistent data field between the merchant website and the previously stored merchant record.

9. The method of claim 1, wherein the confidence metric comprises a numeric value.

10. The method of claim 1, wherein the confidence metric is determined by a scoring component.

11. The method of claim 10, wherein the scoring component receives a variety of merchant related information.

12. The method of claim 11, wherein the variety of merchant related information comprises web claws from merchant websites.

13. The method of claim 11, wherein the variety of merchant related information comprises merchant statistics.

14. The method of claim 11, wherein the variety of merchant related information comprises prior transaction history with the merchant.

15. The method of claim 11, wherein the scoring component generates the confidence metric based on the received variety of merchant related information, wherein the confidence metric is indicative of a confidence level of accuracy of the merchant information update indicia.

16. The method of claim 1, wherein the confidence requirement is dependent on the activity type.

17. The method of claim 1, wherein the confidence requirement comprises a threshold value of 0.8 to allow a transaction request.

18. The method of claim 1, wherein the confidence requirement comprises a threshold value of 0.5 to allow an offer issuance request.

19. A merchant consumer bridging system for performing an activity request and updating a previously stored merchant record at a platform server that is remote from a merchant point of sale terminal, the system comprising:

a memory;

a processor disposed in communication with said memory, and configured to issue a plurality of processing instructions stored in the memory, the processor issues instructions to:

receive the activity request including a merchant URL associated with a merchant;

retrieve the previously stored merchant record from a database;

determine merchant information update indicia based on a comparison of a merchant website corresponding to the merchant URL and the previously stored merchant record;

determine a confidence metric for the activity request by:

scraping, by the one or more data processors, contents from the merchant website, processing, by the one or more data processors, the contents to determine further merchant information, matching, by the one or more processors, the previously stored merchant record to the further merchant information, wherein a match between the further merchant information and the previously stored merchant record indicates a value for the confidence metric, popping the merchant URL from a hash table, and adding the merchant URL to a list of seen URLs;

retrieve a confidence requirement that was previously defined for an activity type of the activity request, the activity type including one or more of a merchant information update request, and a consumer bridging offer issuance request, and the confidence requirement having a higher or lower value based on the activity type of the activity request;

determine, within a low-latency processing time-frame, whether the determined confidence metric satisfies the retrieved confidence requirement; and perform the requested activity and updating the previously stored merchant record with the further merchant information in response to the determined confidence metric satisfying the retrieved confidence requirement.

20. A merchant consumer bridging processor-readable storage medium for performing an activity request and updating a previously stored merchant record at a platform server that is remote from a merchant point of sale terminal, the storage medium storing processor-executable instructions executable by a processor to:

receive the activity request including a merchant URL associated with a merchant;

retrieve the previously stored merchant record from a database;

determine merchant information update indicia based on a comparison of a merchant website corresponding to the merchant URL and the previously stored merchant record;

determine a confidence metric for the activity request by:

scraping, by the one or more data processors, contents from the merchant website, processing, by the one or more data processors, the contents to determine further merchant information, matching, by the one or more processors, the previously stored merchant record to the further merchant information, wherein a match between the further merchant information and the previously stored merchant record indicates a value for the confidence metric, popping the merchant URL from a hash table, and adding the merchant URL to a list of seen URLs;

retrieve a confidence requirement that was previously defined for an activity type of the activity request, the activity type including one or more of a merchant information update request, and a consumer bridging offer issuance request, and the confidence requirement having a higher or lower value based on the activity type of the activity request;

determine, within a low-latency processing time-frame, whether the determined confidence metric satisfies the retrieved confidence requirement; and perform the requested activity and updating the previously stored merchant record with the further merchant information in response to the determined confidence metric satisfying the retrieved confidence requirement.

* * * * *